US012561042B2

(12) United States Patent
Pastrana Vicente et al.

(10) Patent No.: US 12,561,042 B2
(45) Date of Patent: Feb. 24, 2026

(54) DEVICES, METHODS, AND GRAPHICAL USER INTERFACES FOR INTERACTING WITH THREE-DIMENSIONAL ENVIRONMENTS

(71) Applicant: Apple Inc., Cupertino, CA (US)

(72) Inventors: Israel Pastrana Vicente, Spring, TX (US); Jonathan Ravasz, Sunnyvale, CA (US); Hugo D. Verweij, Portola Valley, CA (US); Hana Z. Wang, Novato, CA (US); Kirsty Keatch, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 7 days.

(21) Appl. No.: 18/664,073

(22) Filed: May 14, 2024

(65) Prior Publication Data

US 2024/0411421 A1 Dec. 12, 2024

Related U.S. Application Data

(60) Provisional application No. 63/646,801, filed on May 13, 2024, provisional application No. 63/528,336, (Continued)

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/012* (2013.01); *G06F 3/0482* (2013.01); *G06F 3/0487* (2013.01); *G06F 3/04817* (2013.01)

(58) Field of Classification Search
CPC .... G06F 3/04815; G06F 3/012; G06F 3/0482; G06F 3/0487; G06F 3/04817;
(Continued)

(56) References Cited

U.S. PATENT DOCUMENTS

2014/0215383 A1    7/2014  Park-Ekecs et al.
2016/0026242 A1*   1/2016  Burns ................. G06F 3/04817
                                                             345/633
(Continued)

FOREIGN PATENT DOCUMENTS

AU          2020239727 A1      5/2021

OTHER PUBLICATIONS

Balkan Aral et al., "Parallax Scrolling" in "Flash 3D Cheats Most Wanted", https://dx.doi.org/10.1007/978-1-4302-0814-3_5>, Jan. 1, 2003, 4 pages.

(Continued)

*Primary Examiner* — Chanh D Nguyen
*Assistant Examiner* — Gloryvid Figueroa-Gibson
(74) *Attorney, Agent, or Firm* — Morgan, Lewis & Bockius LLP

(57) ABSTRACT

A computer system detects an input to invoke a home menu user interface. In response to detecting the input, the computer system displays, via one or more display generation components, the home menu user interface in a three-dimensional environment, including: if a viewpoint of a user in the three-dimensional environment had a first elevation relative to a reference plane in the three-dimensional environment, displaying the home menu user interface at a first height in the three-dimensional environment; and, if the viewpoint of the user in the three-dimensional environment had a second elevation relative to the reference plane in the three-dimensional environment, the second elevation being different from the first elevation, displaying the home menu user interface at a second height in the three-dimensional environment, the second height being different from the first height.

45 Claims, 141 Drawing Sheets

Related U.S. Application Data filed on Jul. 21, 2023, provisional application No. 63/470,912, filed on Jun. 4, 2023, provisional application No. 63/466,963, filed on May 16, 2023.

(51) Int. Cl.
    *G06F 3/0482*       (2013.01)
    *G06F 3/0487*       (2013.01)
    *G06F 3/04817*     (2022.01)

(58) Field of Classification Search
    CPC .......... G06F 2203/04802; G06F 3/017; G06F 3/011; G06F 3/04842; G06F 3/0485
    See application file for complete search history.

(56) References Cited

U.S. PATENT DOCUMENTS

2016/0231883 A1     8/2016    Zambetti et al.
2021/0286509 A1     9/2021    Tyler et al.
2023/0315247 A1    10/2023   Pastrana et al.
2024/0036646 A1*    2/2024    Yu ...................... G06F 3/04815

OTHER PUBLICATIONS

David Antonio Gomez Jauregui et al., "Design and Evaluation of 3D Cursors and Motion Parallax for the Exploration of Desktop Virtual Environments", 3D User Interfaces (3DUI), 2012 IEEE Symposium on IEEE, Mar. 4, 2012, 4 pages.
Keytreeuk: "Smart Vision—Interactive Augmented Reality, Hand Tracking using Kinects SAP HANA, NetWeaver Cloud", https://www.youtube.com/watch?v=87ggsGUK5iA, Nov. 25, 2012, 2 pages.
International Search Report and Written Opinion, dated Nov. 25, 2024, received in International Patent Application No. PCT/US2024/029514, which corresponds with U.S. Appl. No. 18/664,073, 31 pages.
Invitation to Pay, dated Oct. 10, 2025, received in International Patent Application No. PCT/US2025/032759, which corresponds with U.S. Appl. No. 19/229,726, 17 pages.

\* cited by examiner

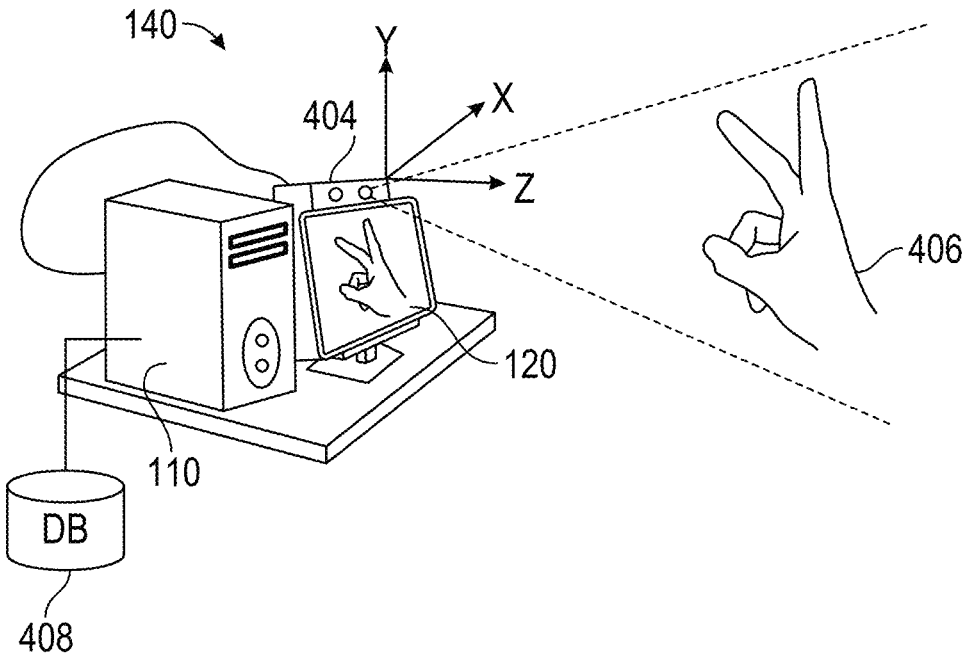
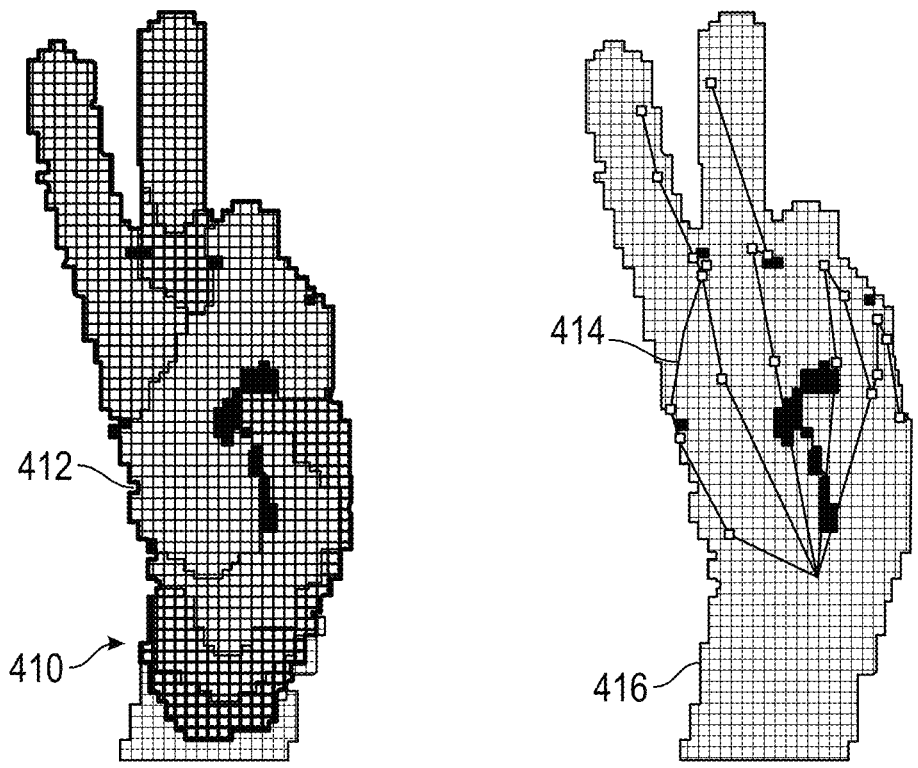
FIG. 4

Figure 7C1

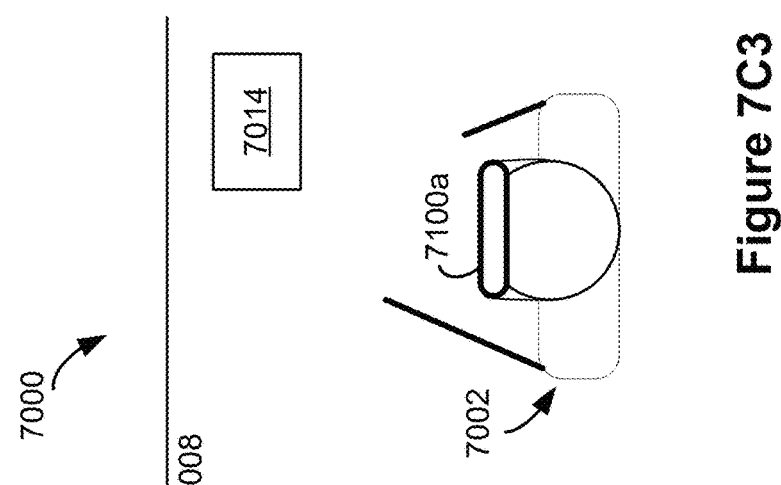
Figure 7C3
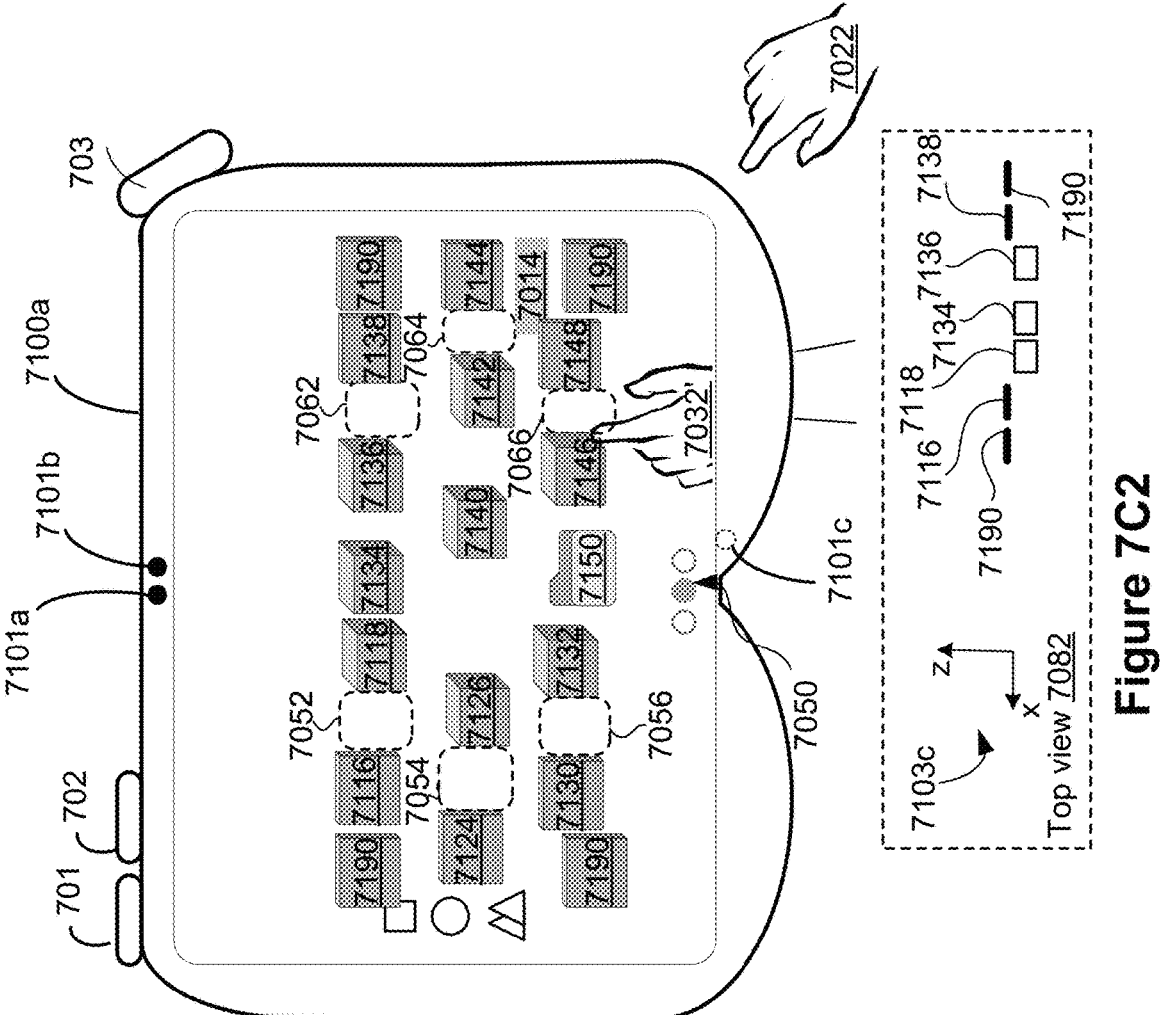
Figure 7C2

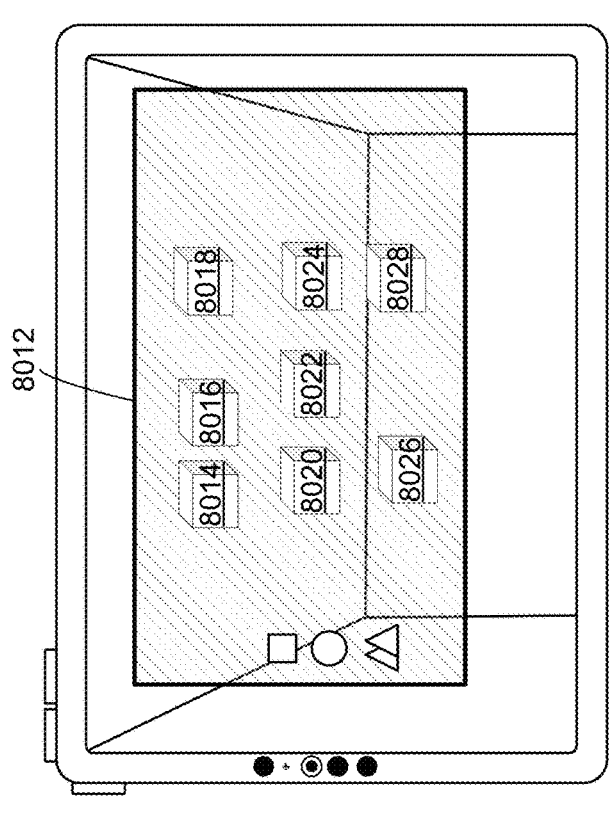
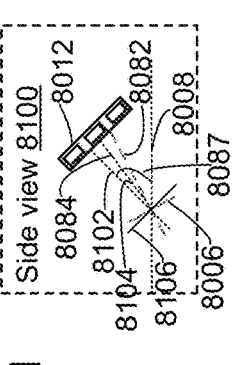
Figure 8F1
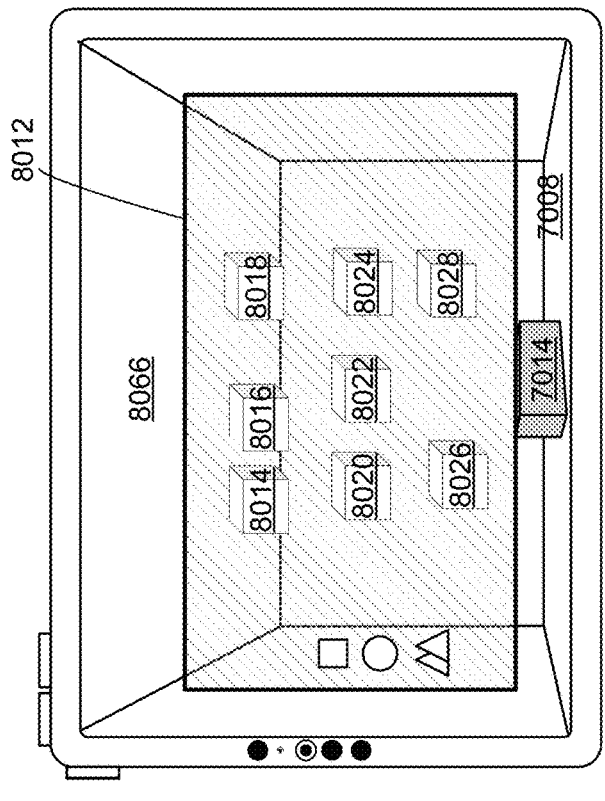
Figure 8E
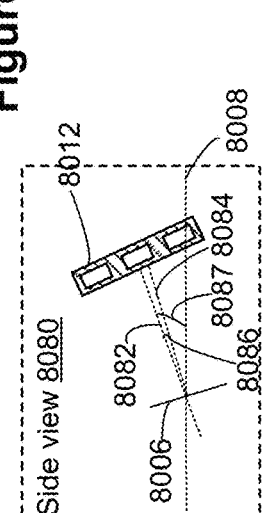

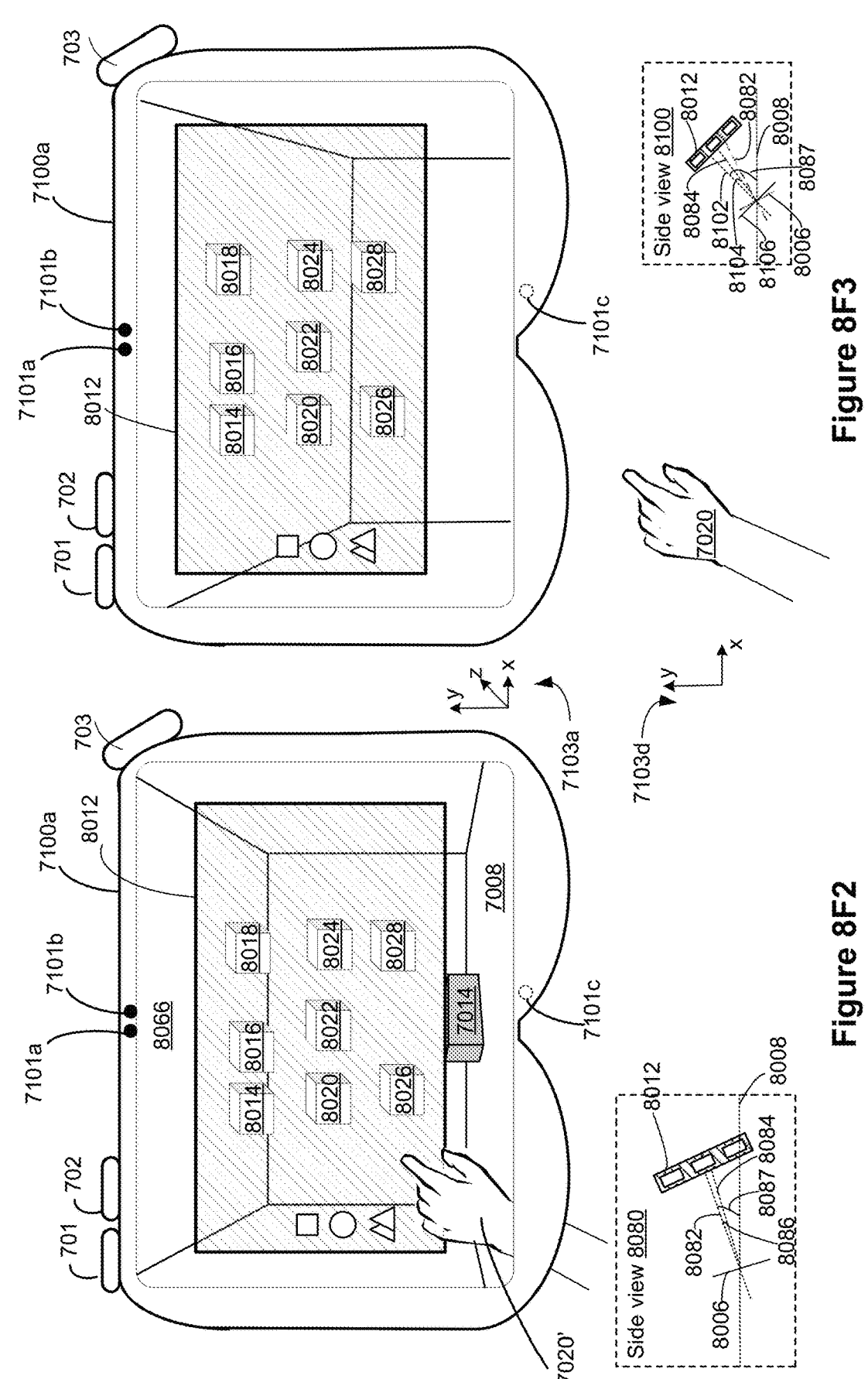
Figure 8F3
Figure 8F2

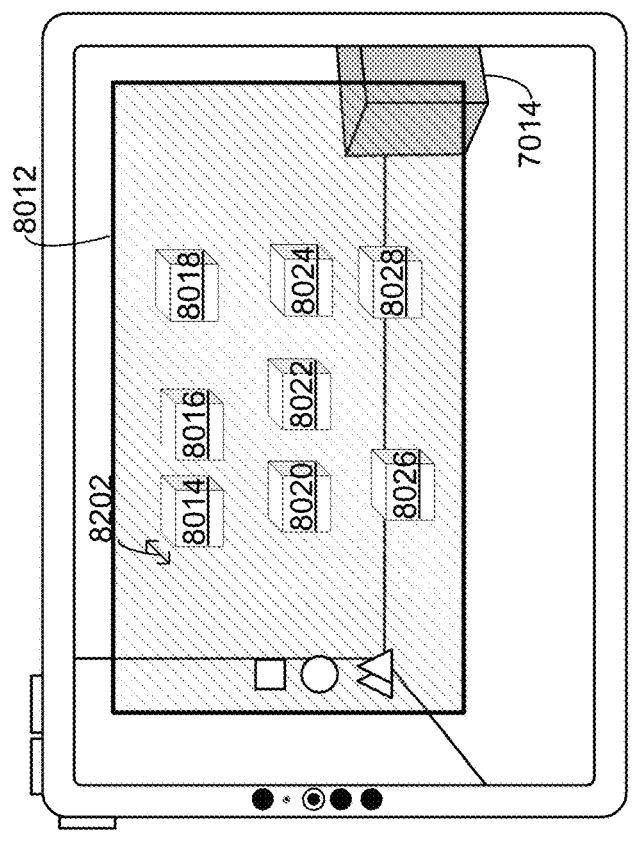
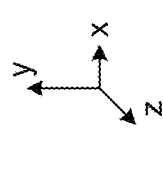
Figure 8J
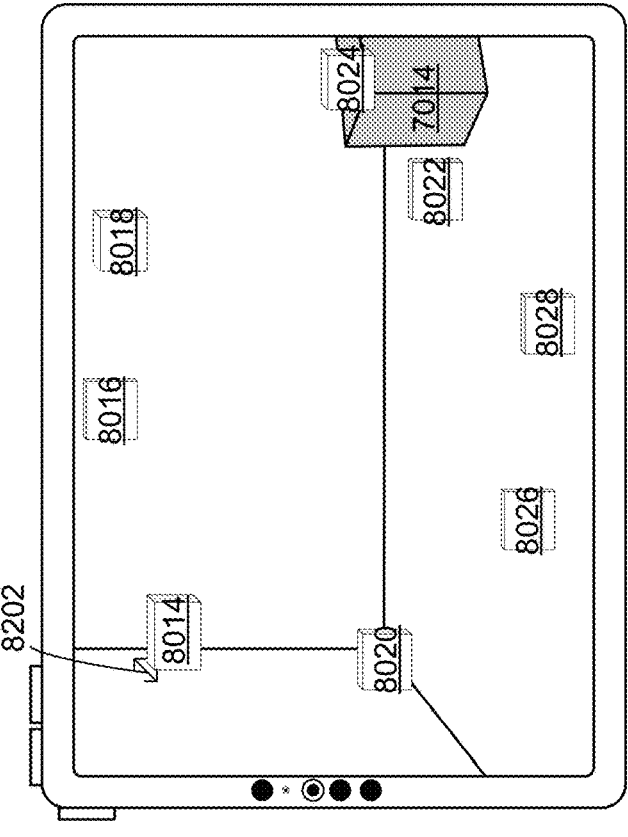
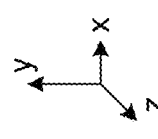
Figure 8I

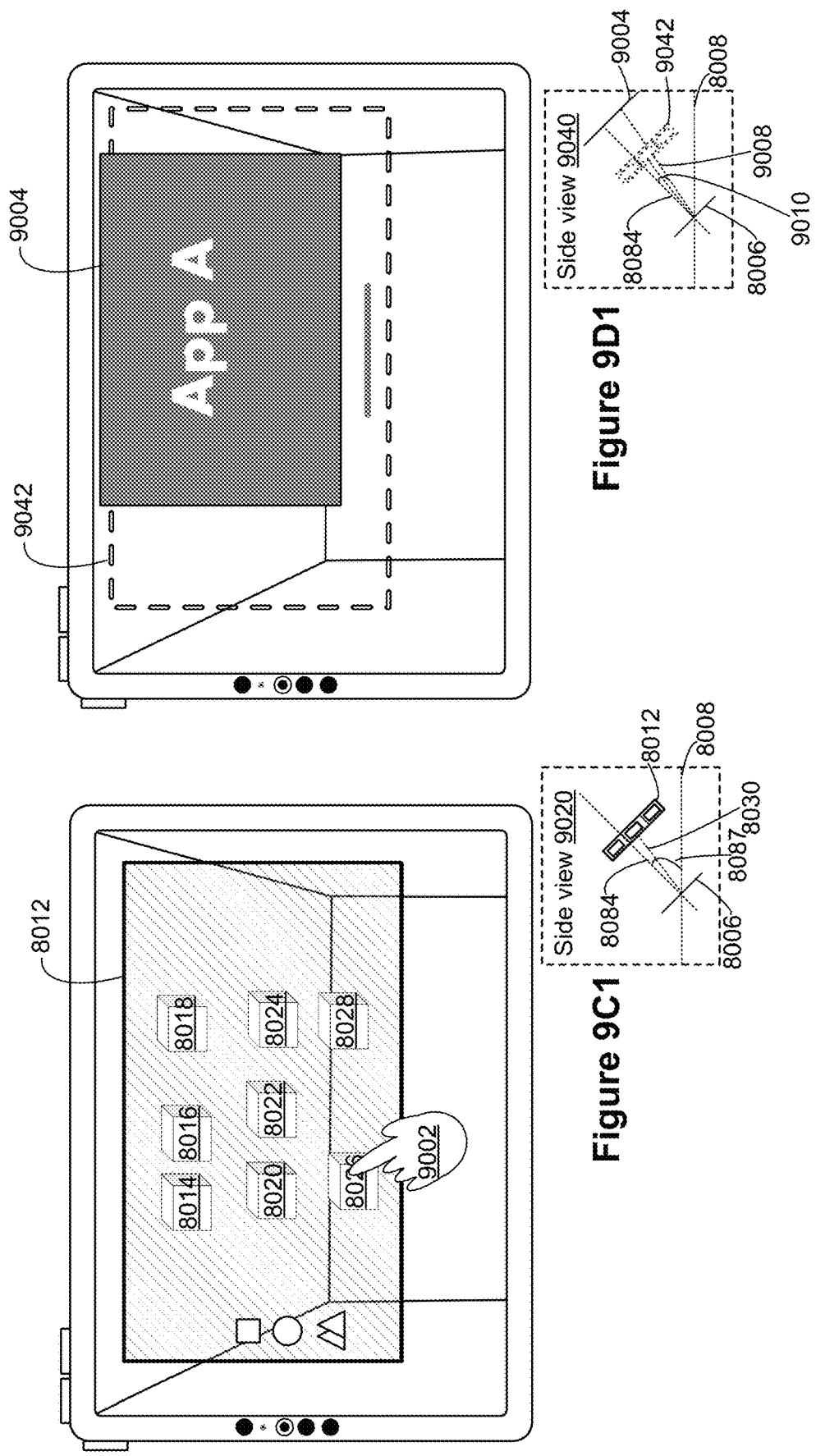
Figure 9D1
Figure 9C1

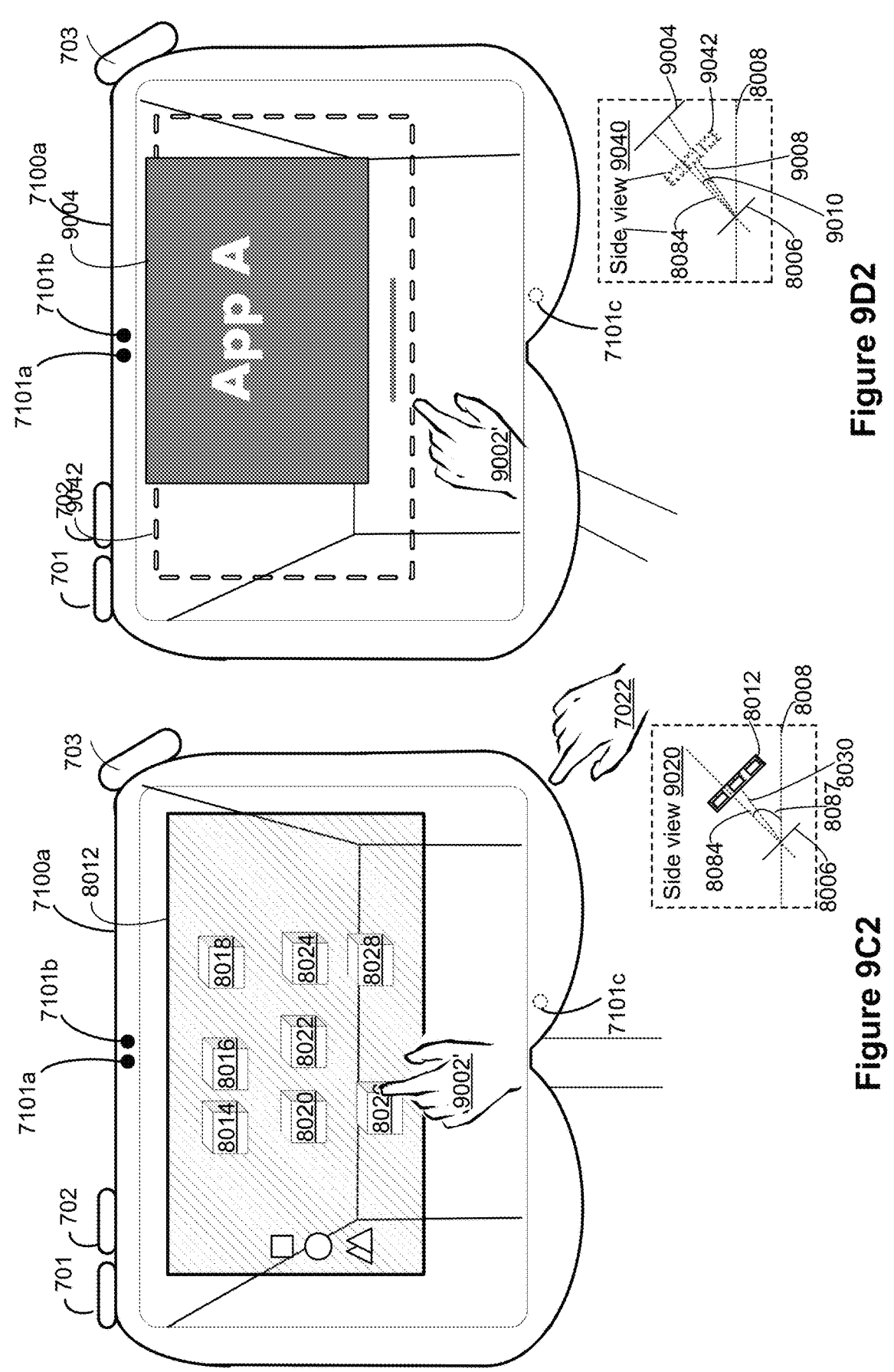
Figure 9D2
Figure 9C2

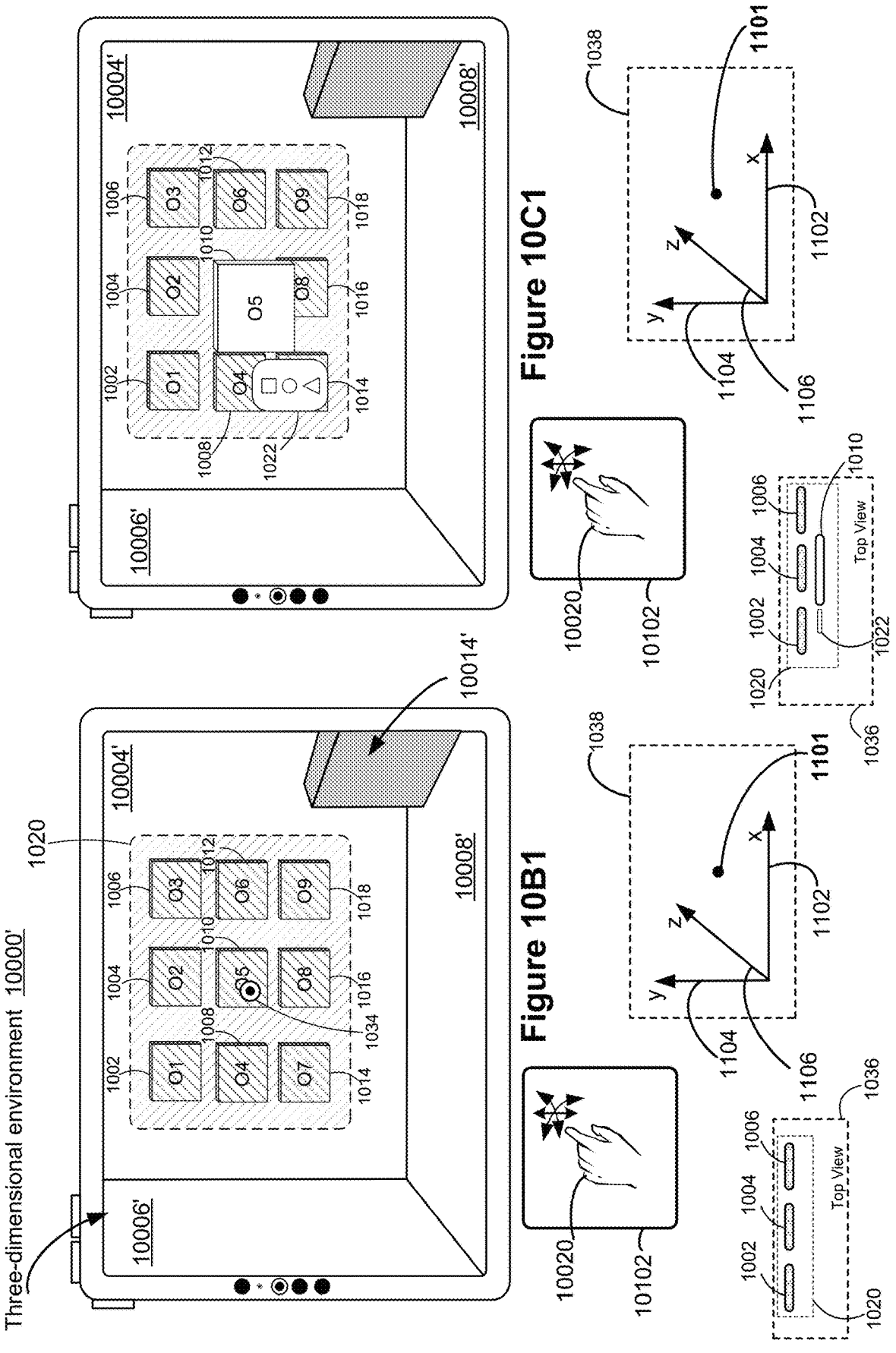
Figure 10C1
Figure 10B1

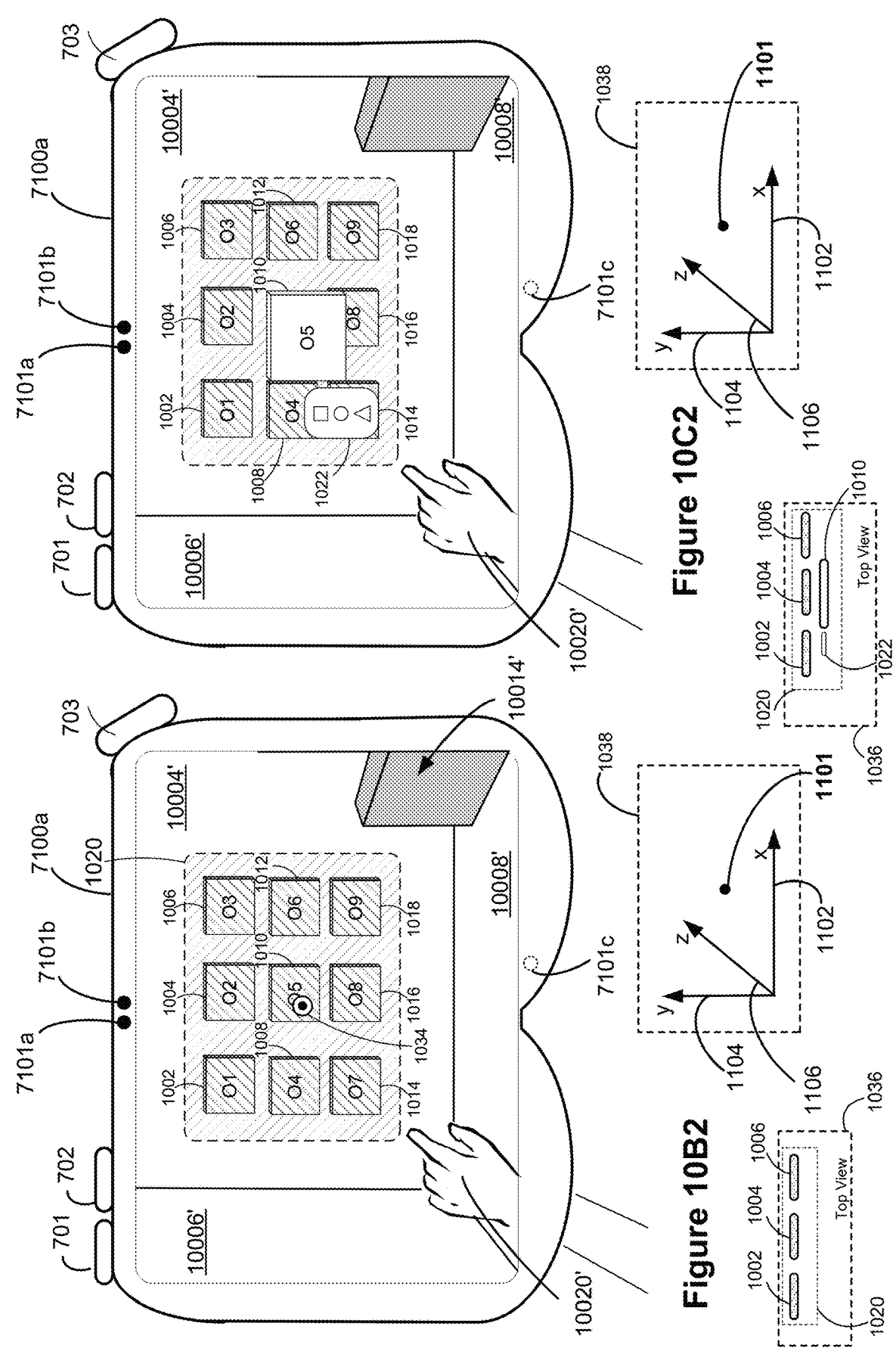
Figure 10C2
Figure 10B2

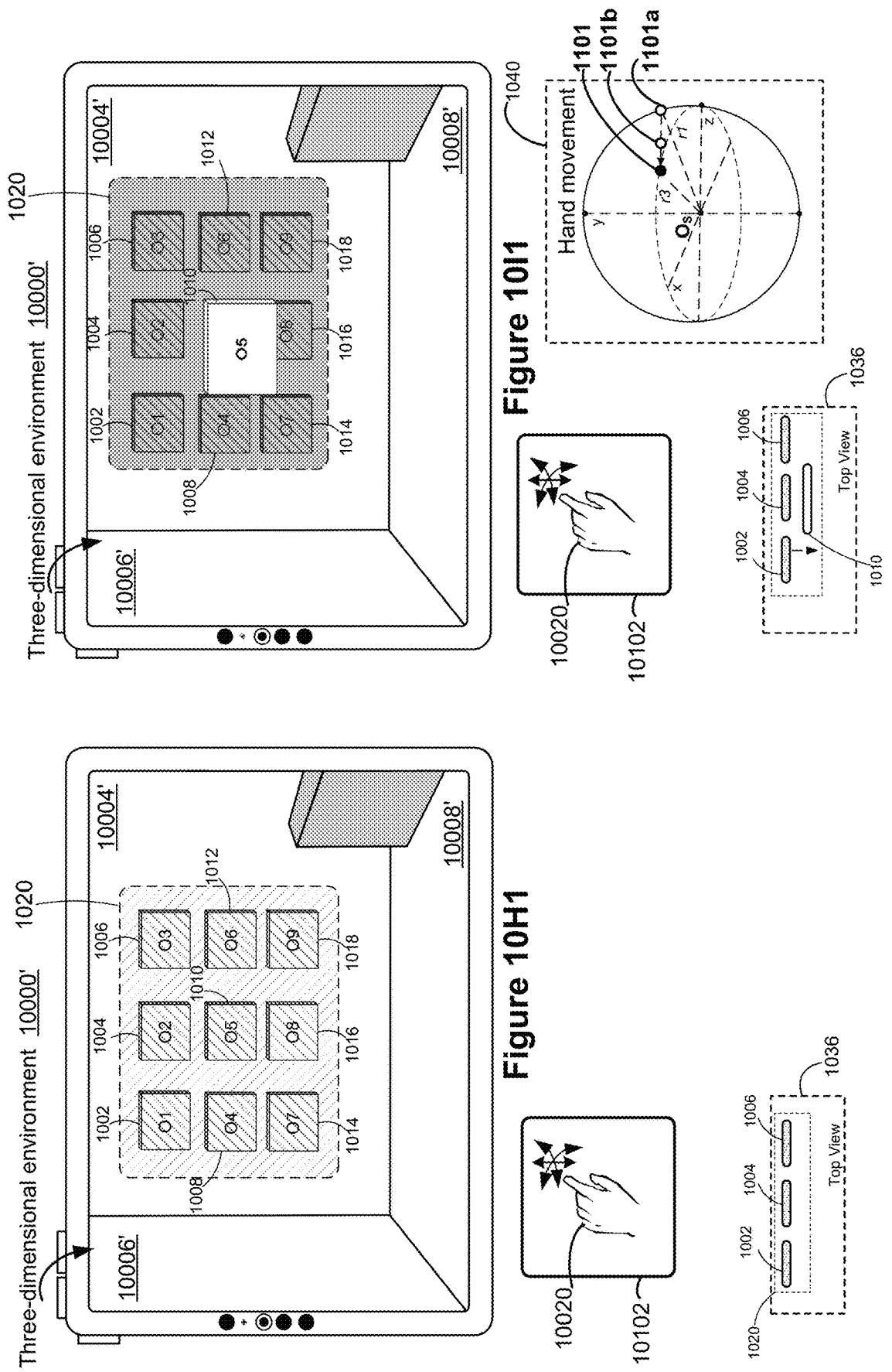
Figure 10I1
Figure 10H1

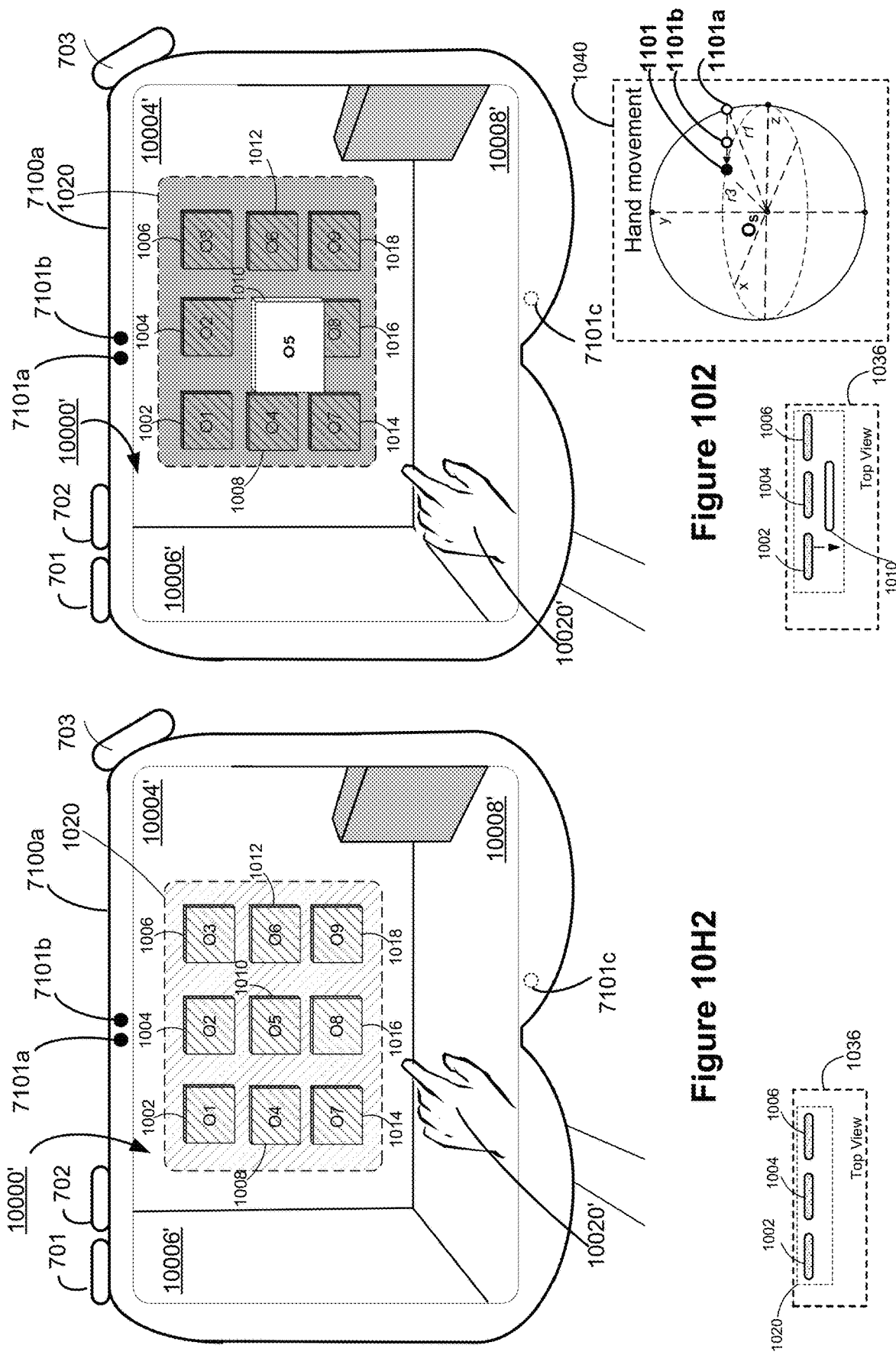
Figure 10I2
Figure 10H2

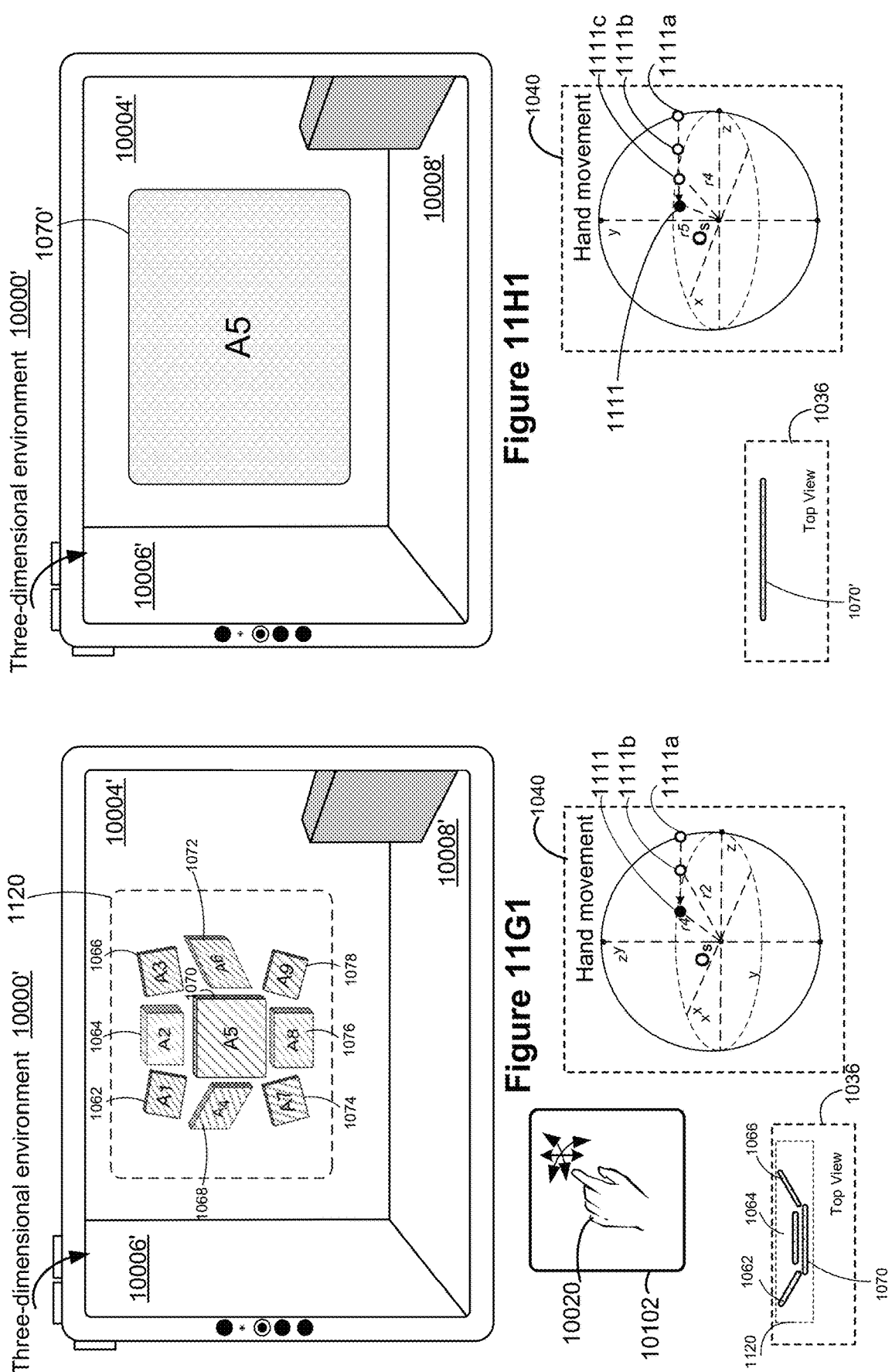
Figure 11H1
Figure 11G1

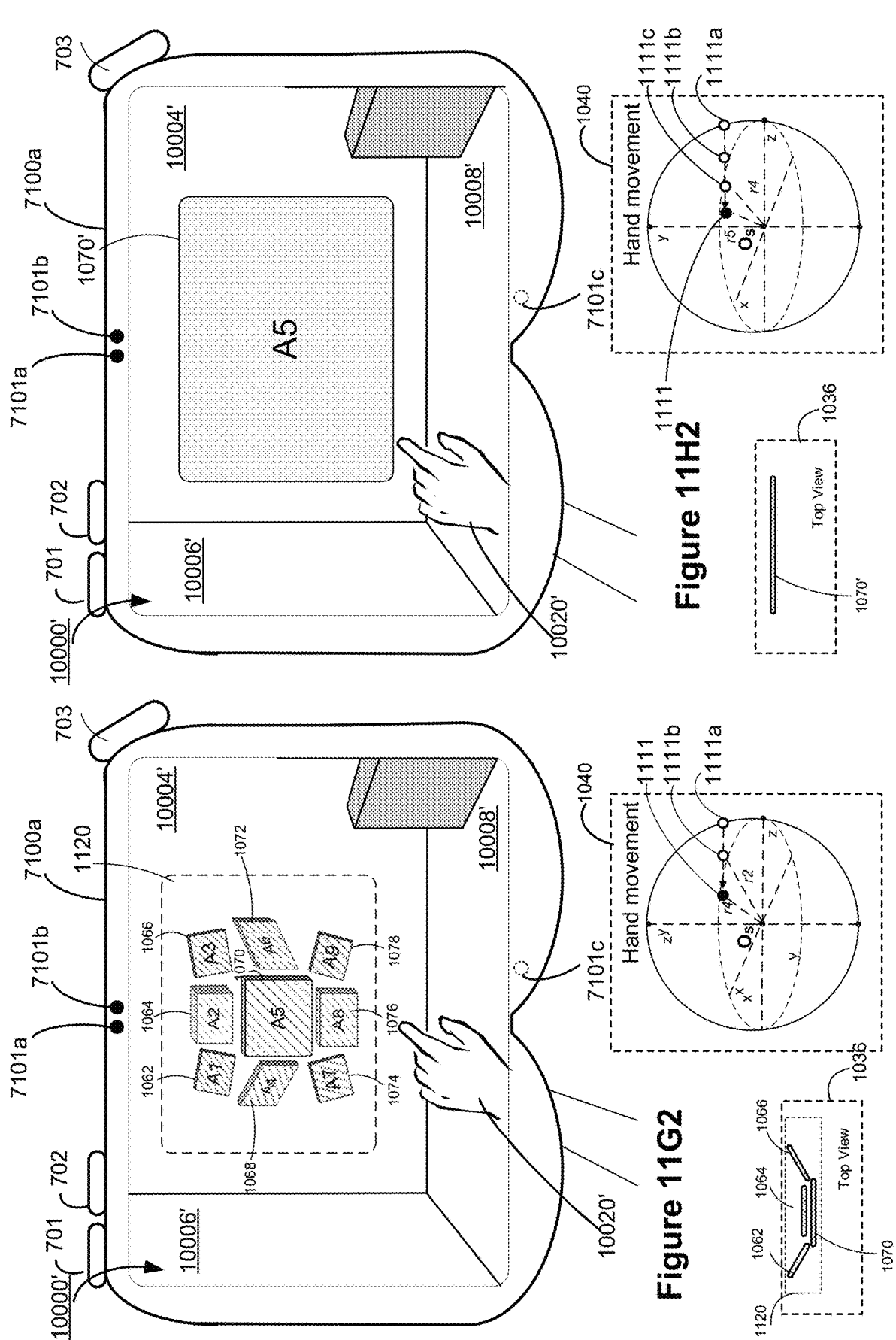
Figure 11H2
Figure 11G2

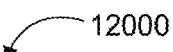12000

12002 While displaying, via one or more display generation components, an arrangement of icons in a home menu user interface within a three-dimensional environment, wherein the arrangement of icons includes a first set of icons and a second set of icons, detect a first user input for scrolling the arrangement of icons 12004 In response to detecting the first user input, move icons in the arrangement of icons, including:

12006 Move the first set of icons at a first speed

12008 Move the second set of icons at a second speed that is different from the first speed, wherein moving the first set of icons at the first speed and the second set of icons at the second speed causes a spatial relationship between icons in the first set of icons to change relative to icons in the second set of icons

Figure 12

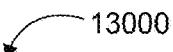

13000

13002 Detect a first input to the computer system to invoke a home menu user interface 13004 In response to detecting the first input, display, via one or more display generation components, the home menu user interface in a three-dimensional environment, including:

13006 In accordance with a determination that a viewpoint of a user in the three-dimensional environment had a first elevation relative to a reference plane in the three-dimensional environment, display the home menu user interface at a first height in the three-dimensional environment 13008 In accordance with a determination that the viewpoint of the user in the three-dimensional environment had a second elevation relative to the reference plane in the three-dimensional environment, wherein the second elevation is different from the first elevation, display the home menu user interface at a second height in the three-dimensional environment, wherein the second height is different from the first height

Figure 13

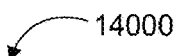

~14000

14002 Display, via one or more display generation components, a home menu user interface at a respective location 14004 While displaying the home menu user interface at the respective location, detect a first user input for launching an application from the home menu user interface 14006 In response to detecting the first user input for launching the application from the home menu user interface, display, at a respective application location, an application user interface associated with the application, including:

14008 In accordance with a determination that the home menu user interface was in a first home menu location, display the application user interface at a first application location that has a respective spatial offset from the first home menu location 14010 In accordance with a determination that the home menu user interface was in a second home menu location, wherein the second home menu location is different from the first home menu location, display the application user interface at a second application location that has the respective spatial offset from the second home menu location, wherein the second application location is different from the first application location

Figure 14

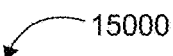
15000

15002 At a computer system that is in communication with a display generation component and with one or more input devices:

15004 While a view of a three-dimensional environment is visible via the display generation component, detect, via the one or more input devices, a first input directed to a first object in an arrangement of a plurality of objects that are arranged along a virtual surface in the three-dimensional environment 15006 During the first input, detect a first movement that includes movement in one or more directions that are substantially parallel to the virtual surface in the three-dimensional environment 15008 In response to detecting the first movement included in the first input:

15010 In accordance with a determination that the first movement includes movement that is substantially perpendicular to the virtual surface and that the movement that is substantially perpendicular to the virtual surface met first criteria prior to detection of the movement in the one or more directions that are substantially parallel to the virtual surface, remove the first object from the arrangement of the plurality of objects 15012 in accordance with a determination that the first movement does not include movement that is substantially perpendicular to the virtual surface that meets the first criteria prior to the detection of the movement in the one or more directions that are substantially parallel to the virtual surface, forgo removing the first object from the arrangement of the plurality of objects

Figure 15

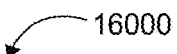

16000

16002 At a computer system that is in communication with a display generation component and with one or more input devices:

16004 While a view of a three-dimensional environment is visible via the display generation component, detect a first input that includes movement directed to a first object located at a respective position in the three-dimensional environment, wherein the movement includes movement in one or more directions relative to the respective position in the three-dimensional environment 16006 In response to detecting the movement directed to the first object, move the first object in accordance with the movement, including:

16008 In accordance with a determination that the movement included in the first input includes a first movement in a first direction with a first magnitude, move the first object to a first position different from the respective position in accordance with the first direction and the first magnitude of the first movement 16010 In accordance with a determination that the movement included in the first input includes a second movement in a second direction with a second magnitude, move the first object to a second position, different from the respective position and the first position, in accordance with the second direction and the second magnitude of the second movement 16012 After moving the first object in accordance with the movement included in the first input, detect an end of the first input 16014 In response to detecting the end of the first input:

16016 In accordance with a determination that the first input ended without meeting first criteria, restore display of the first object at the respective position after the first input has ended 16018 In accordance with a determination that the first input ended after meeting the first criteria, maintain display of the first object at a position that is different from the respective position

Figure 16

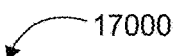
17000

17002 At a computer system that is in communication with a display generation component and with one or more input devices:

17004 While a view of a three-dimensional environment is visible via the display generation component, display an arrangement of a plurality of application icons in the three-dimensional environment 17006 While displaying the arrangement of the plurality of application icons in the view of the three-dimensional environment, detect, via the one or more input devices, a first movement input directed to the arrangement of the plurality of application icons 17008 In response to detecting the first movement input directed to the arrangement of the plurality of application icons:

17010 In accordance with a determination that the first movement input includes first movement in one or more directions that are substantially parallel to the arrangement of the plurality of application icons and that the first movement meets first criteria, scroll the arrangement of the plurality of application icons, including revealing a first set of applications icons that were not visible prior to detecting the first movement input 17012 In accordance with a determination that the first movement input is directed to a first application icon in the plurality of application icons and that the first movement input includes second movement in a direction that is substantially perpendicular to the arrangement of the plurality of application icons and that the second movement meets second criteria, launch a first application corresponding to the first application icon in the three-dimensional environment

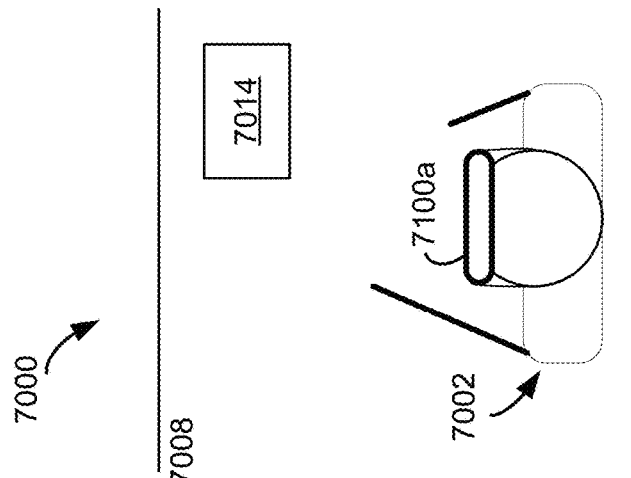
Figure 18B3
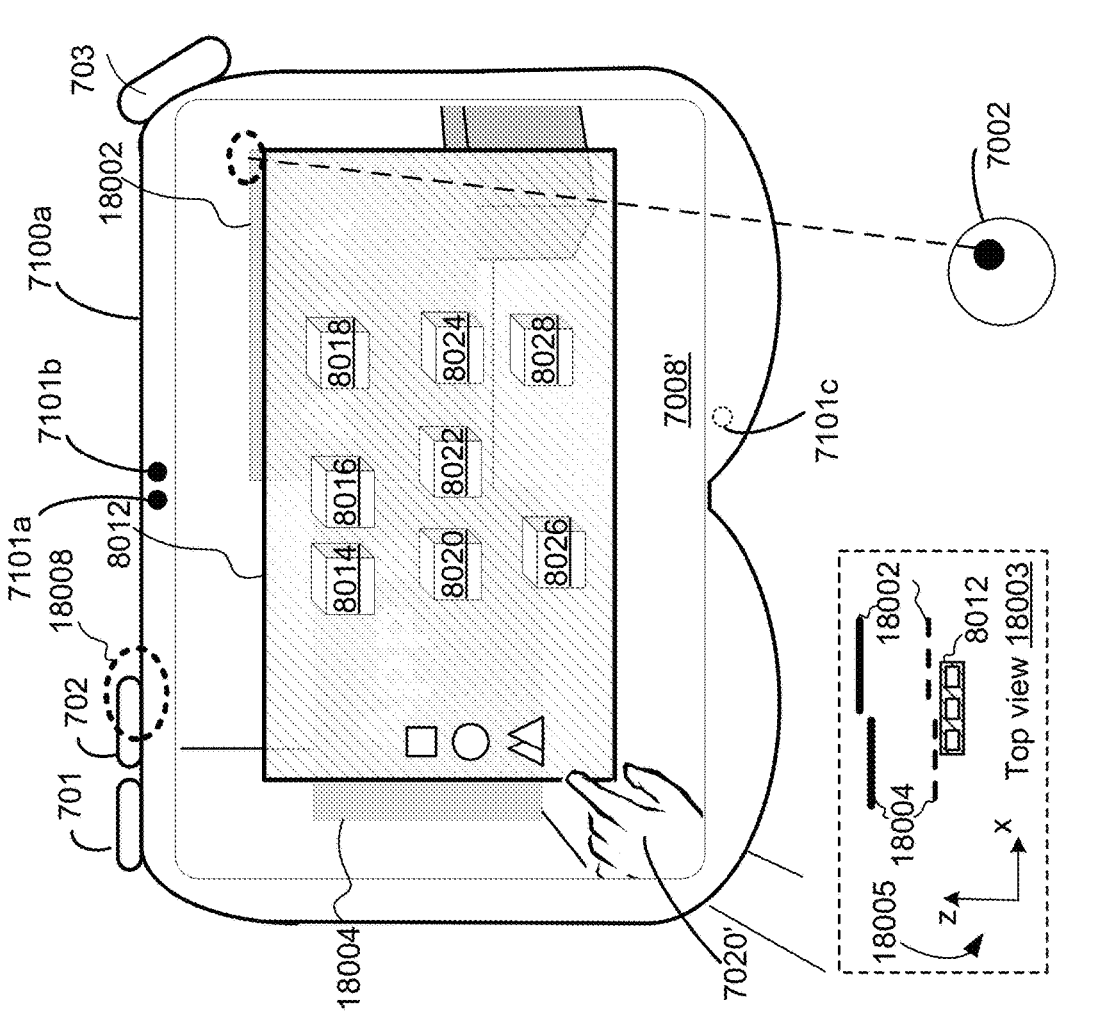
Figure 18B2

Figure 19B1

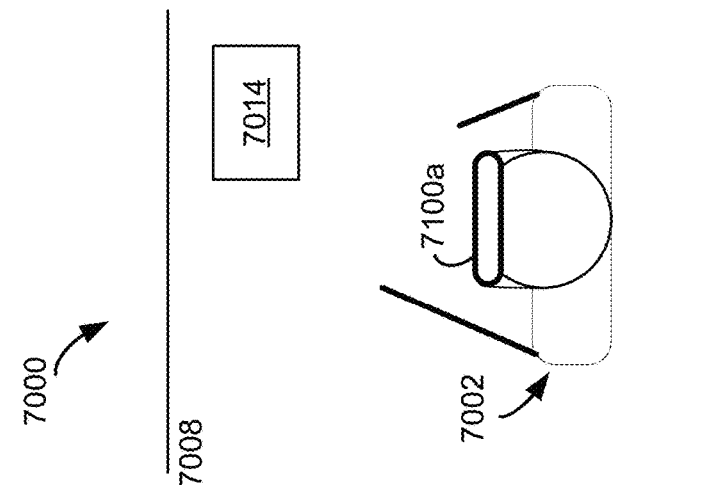
Figure 19B3
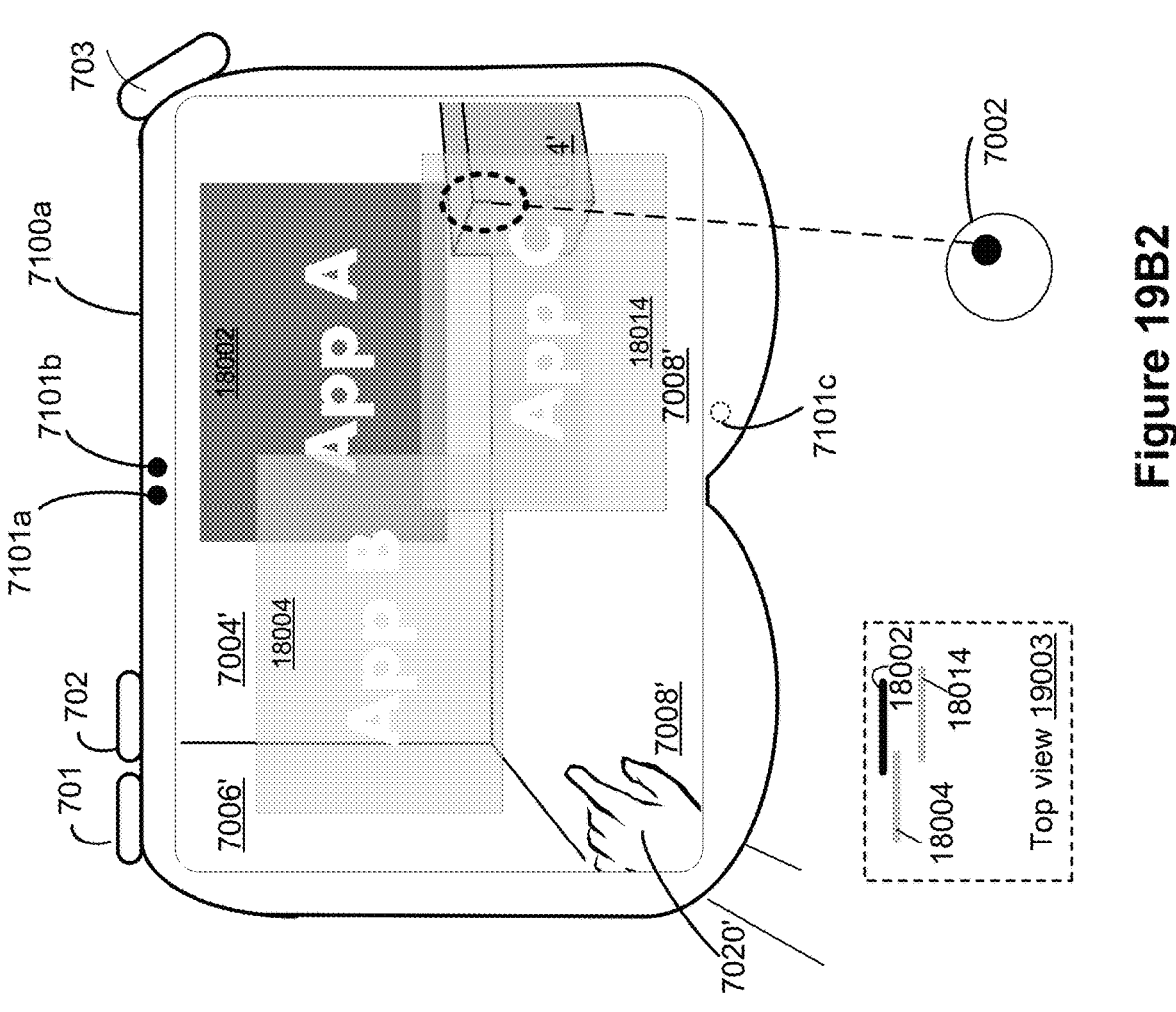
Figure 19B2

Top view 19007

Top view 19005

Figure 20F1

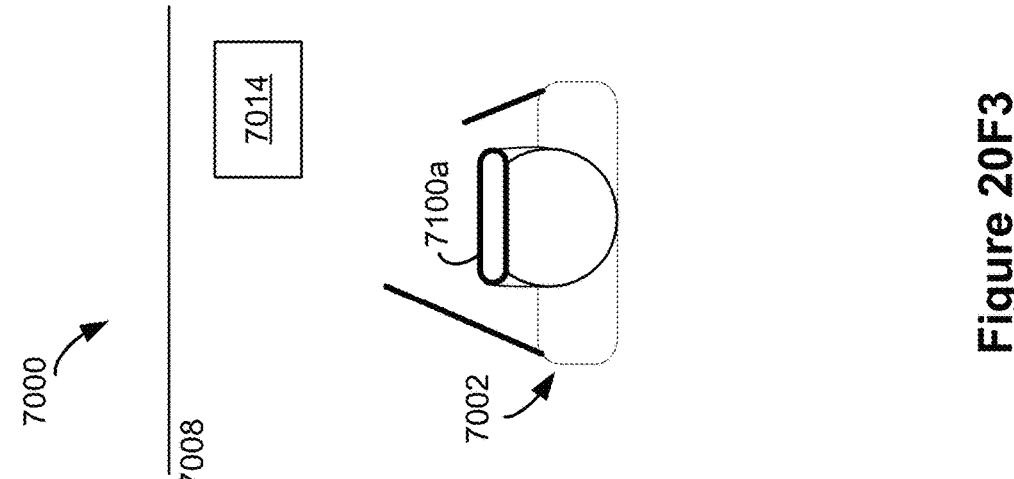
Figure 20F3
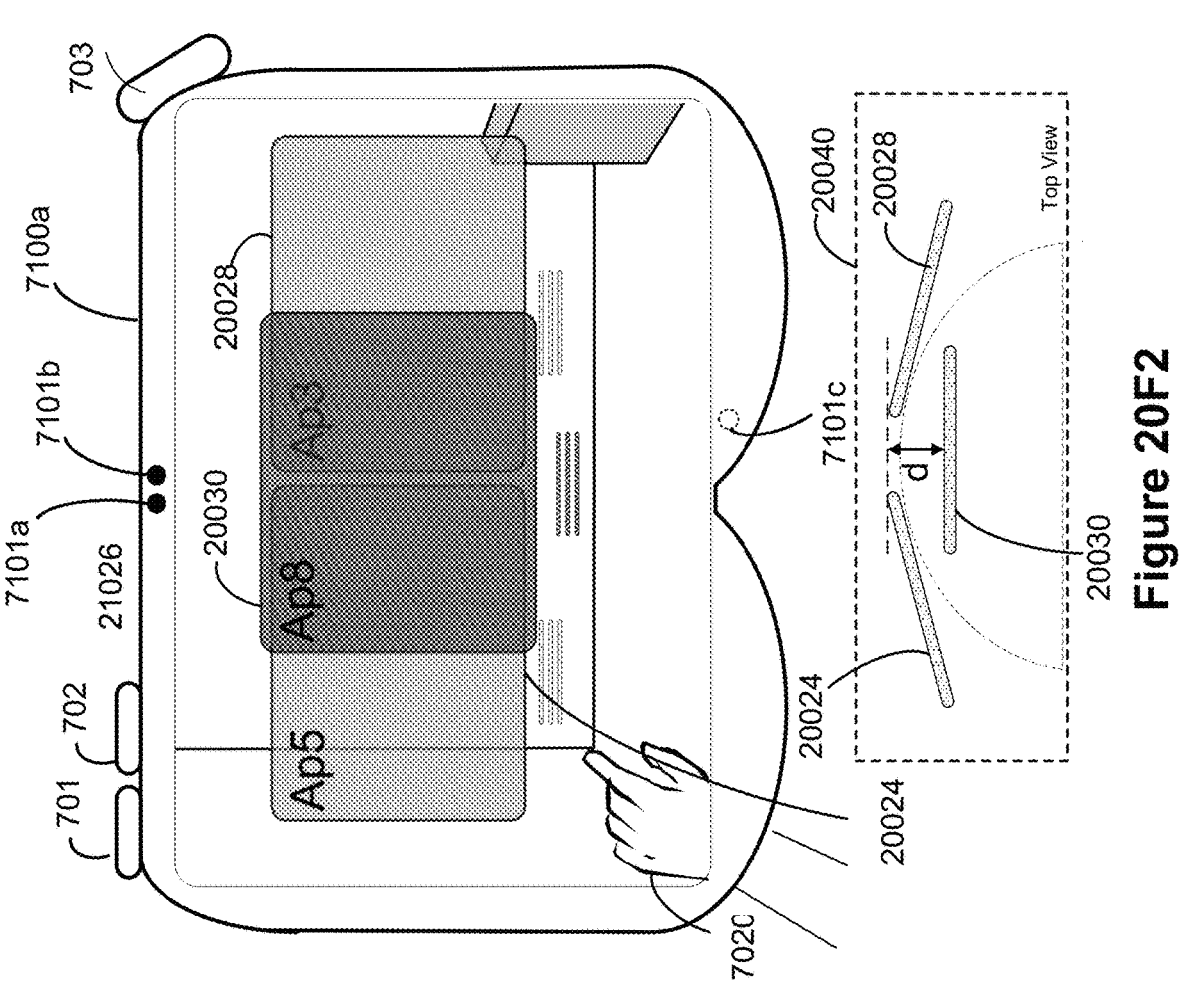
Figure 20F2

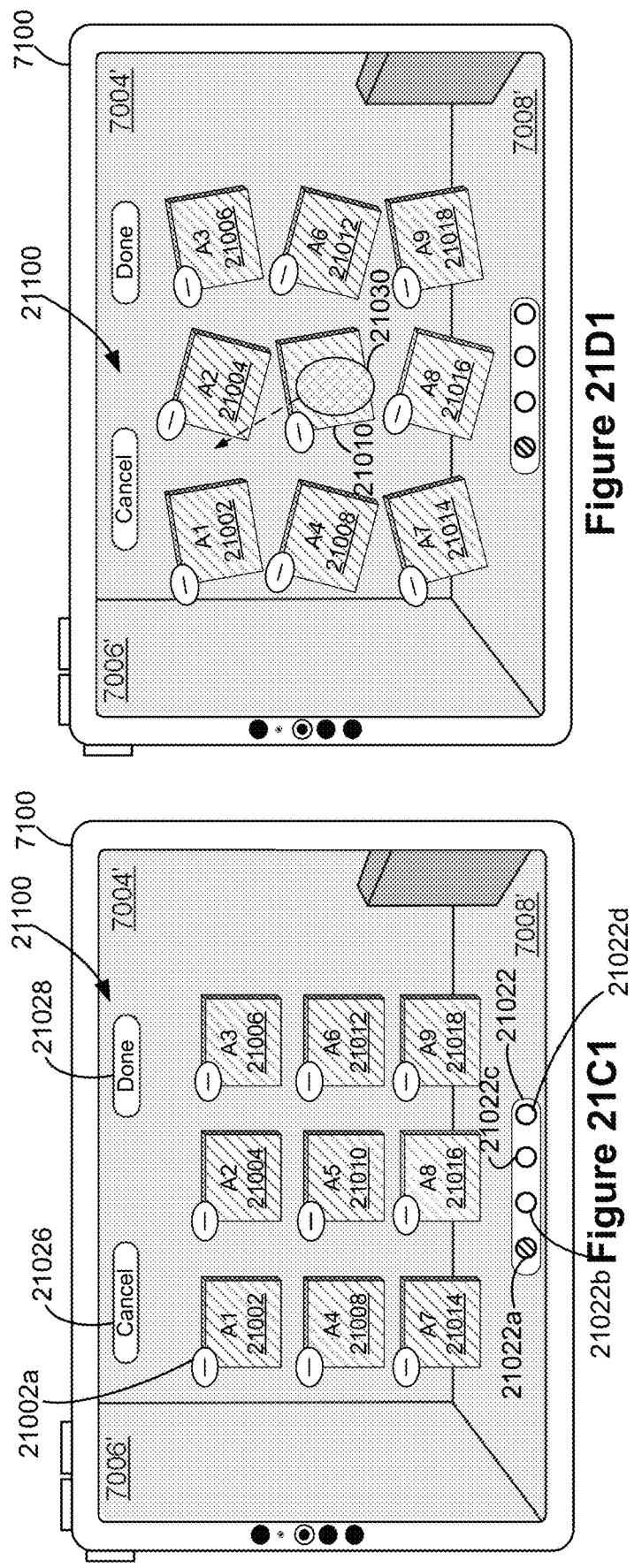
Figure 21D1
Figure 21C1

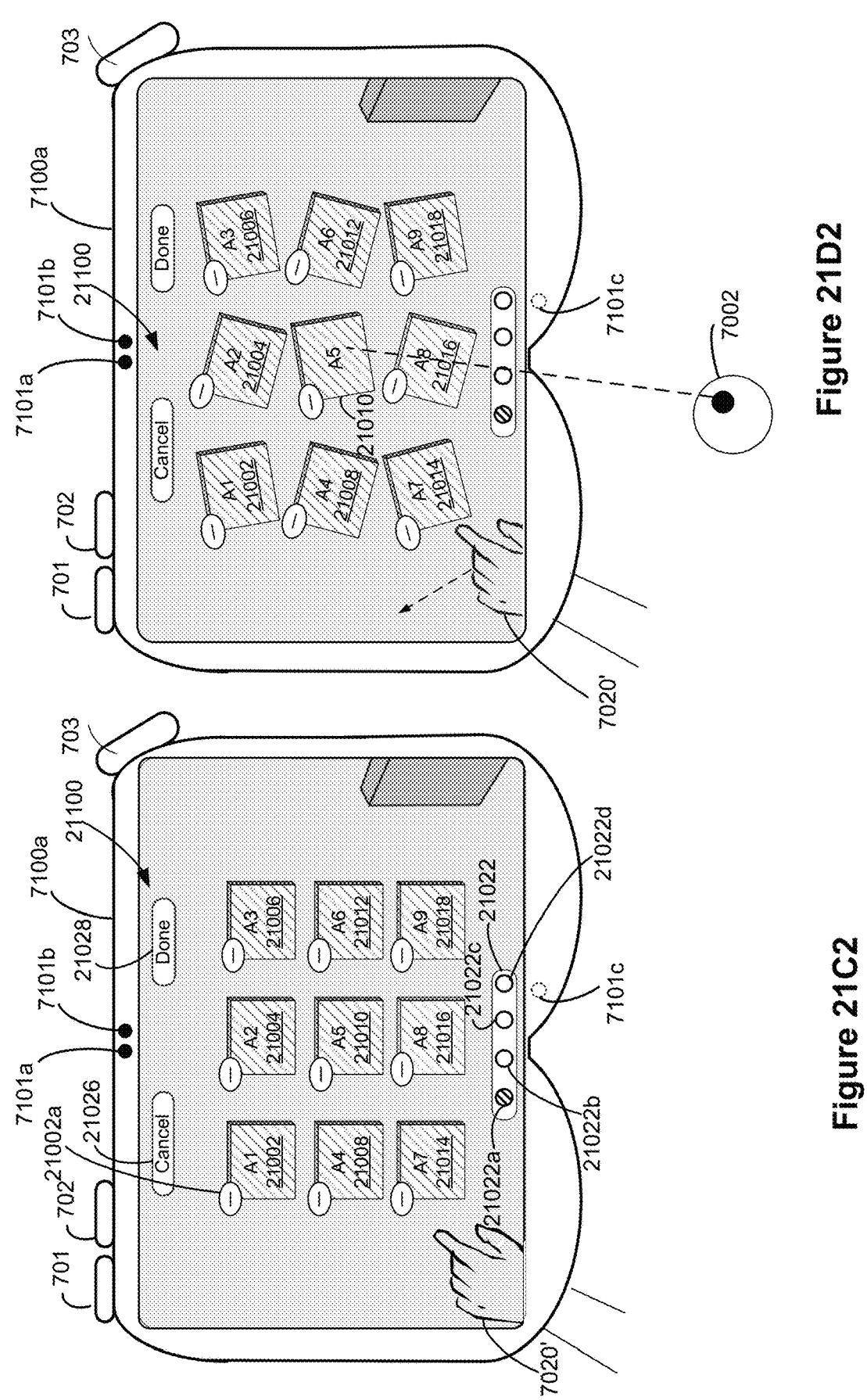
Figure 21D2
Figure 21C2

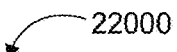
22000

22002 While displaying, via one or more display generation components, one or more application user interfaces within a three-dimensional environment, detect a first input corresponding to a request to display a home menu user interface 22004 In response to detecting the first input, concurrently display the home menu user interface and visually deemphasize the one or more application user interfaces, wherein visually deemphasizing a respective application user interface includes displaying a change in one or more visual characteristics of the respective application user interface.

Figure 22

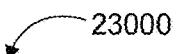
23000

23002 While displaying, via one or more display generation components, a respective user interface, detect a first input directed to a selectable user interface object corresponding to a first application displayed in the respective user interface 23004 In response to detecting the first input:

23006 In accordance with a determination that the first input is detected while a user interface of the first application is displayed at a first position within a viewport of a three-dimensional environment, visually emphasize the user interface of the first application at the first position

Figure 23

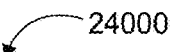
~24000

24002 Display a first object at a first location that is a first distance from a viewpoint of a user in a view of a three-dimensional environment

↓

24004 Detect an input corresponding to a request to display a second object at a second location that is a second distance from the viewpoint of the user in the view of the three-dimensional environment

↓

24006 In response to detecting the input corresponding to the request to display the second object at the second location:

24008 In accordance with a determination that displaying the second object at the second location results in more than a threshold amount of overlap between the first object and the second object from the viewpoint of the user and that a difference in depth between the first location and the second location is less than a respective threshold depth, display the first object at a third location and the second object at a fourth location, wherein the third location and the fourth location are selected such that less than the threshold amount of overlap between the first object and the second object is visible from the viewpoint of the user

Figure 24

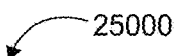

25000

25002 Display, via a display generation component, a first portion of an arrangement of selectable user interface objects in a view of a three-dimensional environment that includes a view of a portion of a physical environment that is visible via the display generation component, wherein the first portion of the arrangement of selectable user interface objects includes a first plurality of selectable user interface objects:

25004 While the first portion of the arrangement of selectable user interface objects is visible, detect, via the one or more input devices, a first input corresponding to a request to initiate a process for moving one or more selectable user interface objects relative to the arrangement of selectable user interface objects 25006 In response to detecting the first input:

25008 Reduce visual prominence of the portion of the physical environment in the view of the three-dimensional environment relative to a visual prominence of the first portion of the arrangement of selectable user interface objects 25010 Initiate the process for moving the one or more selectable user interface objects relative to the arrangement of selectable user interface objects

Figure 25

Physical environment 7000

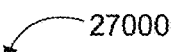
27000

27002 Display, in a viewport of a three-dimensional environment, a first application user interface at a respective location for the first application user interface that is at a respective depth position for the first application user interface 27004 Detect a first input corresponding to a request to display a second application user interface in the viewport of the three-dimensional environment 27006 In response to detecting the first input corresponding to the request to display the second application user interface:

27008 Display the second application user interface at a respective location for the second application user interface that is at a respective depth position for the second application user interface 27010 In accordance with a determination that the first application user interface is at a first location for the first application user interface with a first depth position for the first application user interface, the respective location for the second application user interface is a first depth position for the second application user interface 27012 In accordance with a determination that the first application user interface is at a second location for the first application user interface with a second depth position for the first application user interface that is different from the first depth position for the first application user interface, the respective location for the second application user interface is a second depth position for the second application user interface, different from the first depth position for the second application user interface

Figure 27

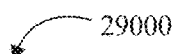 29000

29002 At a computer system that is in communication with a display generation component and with one or more input devices:

29004 Display, via the one or more display generation components, a first view of an environment, including displaying a first section of a first multi-section arrangement of a first plurality of user interface objects in the first view of the environment wherein the first section of the first multi-section arrangement of the first plurality of user interface objects includes a first subset of the first plurality of user interface objects.

29006 While displaying, via the one or more display generation components, the first section of the first multi-section arrangement of the first plurality of user interface objects in the first view of the environment, detecting, via the one or more input devices, one or more first user inputs that correspond to a request to activate the first reconfiguration mode for the first multi-section arrangement of the first plurality of user interface objects, wherein respective positions of one or more user interface objects in the first multi-section arrangement of the first plurality of user interface objects are adjustable by a user 29008 In response to detecting the one or more first user inputs that correspond to a request to activate a first reconfiguration mode for the first multi-section arrangement of the first plurality of user interface objects, display, via the one or more display generation components, the first multi-section arrangement of the first plurality of user interface objects in the first reconfiguration mode, including concurrently displaying the first section of the first multi-section arrangement of the first plurality of user interface objects, and a view of a first portion of a second section of the first multi-section arrangement of the first plurality of user interface objects, wherein the view of the first portion of the second section of the first multi-section arrangement includes first content that was not displayed with the first section of the first multi-section arrangement before the first multi-section arrangement of the first plurality of user interface objects is displayed in the first reconfiguration mode

Figure 29A

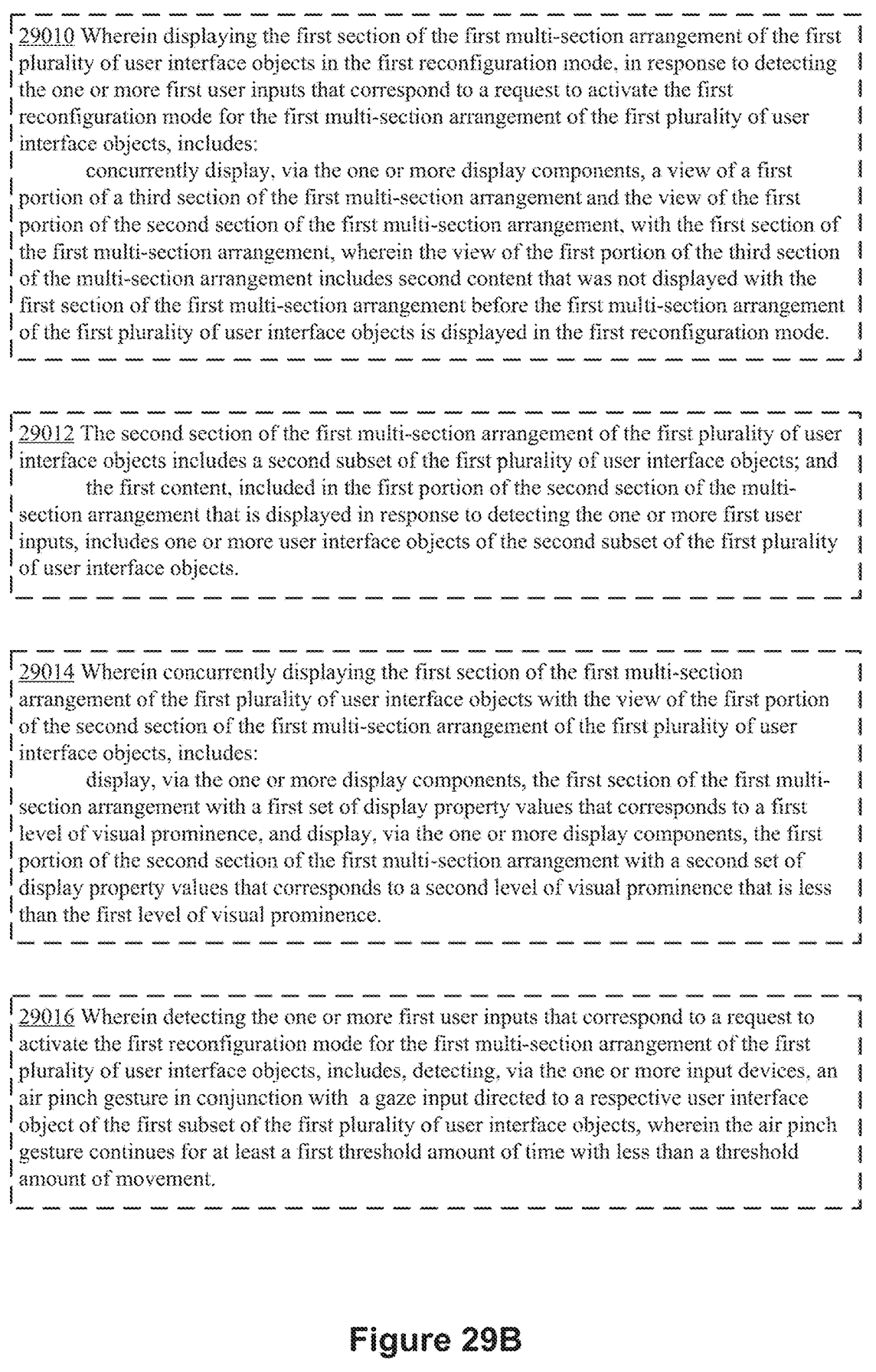

29010 Wherein displaying the first section of the first multi-section arrangement of the first plurality of user interface objects in the first reconfiguration mode, in response to detecting the one or more first user inputs that correspond to a request to activate the first reconfiguration mode for the first multi-section arrangement of the first plurality of user interface objects, includes:

concurrently display, via the one or more display components, a view of a first portion of a third section of the first multi-section arrangement and the view of the first portion of the second section of the first multi-section arrangement, with the first section of the first multi-section arrangement, wherein the view of the first portion of the third section of the multi-section arrangement includes second content that was not displayed with the first section of the first multi-section arrangement before the first multi-section arrangement of the first plurality of user interface objects is displayed in the first reconfiguration mode.

29012 The second section of the first multi-section arrangement of the first plurality of user interface objects includes a second subset of the first plurality of user interface objects; and the first content, included in the first portion of the second section of the multi-section arrangement that is displayed in response to detecting the one or more first user inputs, includes one or more user interface objects of the second subset of the first plurality of user interface objects.

29014 Wherein concurrently displaying the first section of the first multi-section arrangement of the first plurality of user interface objects with the view of the first portion of the second section of the first multi-section arrangement of the first plurality of user interface objects, includes:

display, via the one or more display components, the first section of the first multi-section arrangement with a first set of display property values that corresponds to a first level of visual prominence, and display, via the one or more display components, the first portion of the second section of the first multi-section arrangement with a second set of display property values that corresponds to a second level of visual prominence that is less than the first level of visual prominence.

29016 Wherein detecting the one or more first user inputs that correspond to a request to activate the first reconfiguration mode for the first multi-section arrangement of the first plurality of user interface objects, includes, detecting, via the one or more input devices, an air pinch gesture in conjunction with a gaze input directed to a respective user interface object of the first subset of the first plurality of user interface objects, wherein the air pinch gesture continues for at least a first threshold amount of time with less than a threshold amount of movement.

Figure 29B

29018 Displaying the first section of the first multi-section arrangement of the first plurality of user interface objects in the first reconfiguration mode, includes, displaying, for a respective user interface object of one or more user interface objects of the first plurality of user interface objects, display a respective deletion affordance, that when selected, causes the computer system to remove the respective user interface object from the first multi-section arrangement of the first plurality of user interface objects.

29020 Displaying the respective deletion affordance for the respective user interface object includes displaying the respective deletion affordance with a first appearance, and
the method includes:
while displaying, via the one or more display components, the respective deletion affordance for the respective user interface object with the first appearance, detect, via the one or more input devices, that attention of a user is directed to the respective deletion affordance for the respective user interface object; and
in response to detecting that the attention of the user is directed to the respective deletion affordance for the respective user interface object, display, via the one or more display components, the respective deletion affordance with a second appearance different from the first appearance.

29022 While the respective deletion affordance for the respective user interface object is displayed, detect, via the one or more input devices, an air pinch gesture; and
in response to detecting the air pinch gesture, in accordance with a determination that the attention of the user is directed to the respective deletion affordance for the respective user interface object, remove the respective user interface object from the first section of the first multi-section arrangement of the first plurality of user interface objects 29024 Wherein displaying the first section of the first multi-section arrangement of the first plurality of user interface objects in the view of the environment includes:
prior to displaying the first multi-section arrangement of the first plurality of user interface objects in the first reconfiguration mode, display, via the one or more display components, user interface objects in the first subset of the first plurality of user interface objects with less than a threshold amount of movement in a depth dimension that extends out from a viewpoint of the user; and
while displaying the first multi-section arrangement of the first plurality of user interface objects in the first configuration mode, display, via the one or more display components, the user interface objects in the first subset of the first plurality of user interface objects with respective movements that include more than the threshold amount of movement in the depth dimension.

Figure 29C

29026 Wherein displaying a respective user interface object in the first subset of the first plurality of user interface objects with a respective movement that includes more than the threshold amount of movement in the depth dimension includes:

displaying, via the one or more display components, oscillations of a first portion and a second portion of the respective user interface object relative to a respective anchor position of the respective user interface object in the depth dimension, wherein the first portion and the second portion of the respective user interface objects are located on opposing sides of the respective anchor position of the respective user interface object.

29028 Wherein the first multi-section arrangement of the first plurality of user interface objects is part of a first user interface that further includes a second multi-section arrangement of a second plurality of user interface objects, and the method includes:

while displaying a respective section of the first multi-section arrangement of the first plurality of user interface object:

in accordance with a determination that the first multi-section arrangement of the first plurality of user interface objects is not displayed in the first configuration mode, provide an input interface for navigating from the first multi-section arrangement to the second multi-section arrangement of the first user interface; and in accordance with a determination that the first multi-section arrangement of the first plurality of user interface objects is displayed in the first configuration mode, forgo providing the input interface for navigating from the first multi-section arrangement to the second multi-section arrangement of the first user interface.

29030 While displaying the first section of the first multi-section arrangement of the first plurality of user interface objects in the first reconfiguration mode, detect, via the one or more input devices, one or more second user inputs that meet object reflow criteria; and in response to detecting the one or more second user inputs that meet the object reflow criteria, reflow one or more user interface objects in the first multi-section arrangement of the first plurality of user interface objects between object placement locations in the first multi-section arrangement, including:

in accordance with a determination that a first user interface object of the one or more user interface objects that are being reflowed in the first multi-section arrangement is in a first row of the first multi-section arrangement and is moving to a destination location in a second row, different from the first row, of the first multi-section arrangement, move the first user interface object toward the destination location in a path that is at least partially behind one or more other user interface objects in the first row of the first multi-section arrangement.

Figure 29D

29032 In response to detecting the one or more second user inputs that meet the object reflow criteria, in accordance with a determination that the first user interface object is in the first row of the first multi-section arrangement and is moving to a destination location in the second row, different from the first row, of the first multi-section arrangement, push the first user interface object farther away from a viewpoint of a user, before moving the first user interface object toward the destination location in the path that is at least partially behind one or more other user interface objects in the first row of the first multi-section arrangement 29034 Wherein, in response to detecting the one or more second user inputs that meet the object reflow criteria, reflow one or more user interface objects in the first multi-section arrangement of the first plurality of user interface objects between object placement locations in the first multi-section arrangement, includes:

in accordance with a determination that the first user interface object of the one or more user interface objects that are being reflowed in the first multi-section arrangement is in the first row of the first multi-section arrangement and has a destination location in the first row of the first multi-section arrangement, move the first user interface object toward the destination location in a path that is at least partially in the first row of the first multi-section arrangement.

29036 Wherein displaying the first section of the first multi-section arrangement of the first plurality of user interface objects includes:

display, via the one or more display components, a respective accessory object for at least one user interface object of the first subset of the first plurality of user interface objects, concurrently with the at least one user interface object, wherein the at least one user interface object is displayed at a first depth, and the respective accessory object of the at least one user interface object is displayed at a second depth that is greater than the first depth.

29038 Wherein the respective accessory object of the at least one user interface object includes a control for initiating a first operation with respect to the at least one user interface object, when the respective accessory object is selected by a user input.

29040 Wherein the respective accessory object of the at least one user interface object includes a status indicator that indicates a current state of content associated with the at least one user interface object

Figure 29E

29042 Wherein the respective accessory object of the at least one user interface object includes a quantity indicator that indicates a current count of uncleared notifications associated with the at least one user interface object.

29044 Outputting, via one or more audio output devices, a first ambient sound, while displaying the environment via the one or more display components, wherein outputting the first ambient sound includes:

in accordance with a determination that the first multi-section arrangement is not displayed in the first reconfiguration mode, output the first ambient sound with a first set of values for one or more audio output parameters of the first ambient sound; and in accordance with a determination that the first multi-section arrangement is displayed in the first reconfiguration mode, output the first ambient sound with a second set of values, different from the first set of values, for the one or more audio output parameters of the first ambient sound, wherein the second set of values for the one or more audio output parameters of the first ambient sound corresponds to a reduced level of aural prominence than the first set of values for the one or more audio output parameters of the first ambient sound 29046 While displaying the view of the environment, including displaying the first section of the first multi-section arrangement of the first plurality of user interface objects, detecting, via the one or more input devices, a third user input that is directed to a respective object in the first section of the first multi-section arrangement; and in response to detecting the third user input that is directed to the respective object displayed in the first section of the first multi-section arrangement, in accordance with a determination that the third user input meets first interaction criteria with respect to the respective object, output, via one or more audio output devices, a first audio output corresponding to the third user input that meets the first interaction criteria, including:

in accordance with a determination that the first multi-section arrangement is not displayed in the first reconfiguration mode, output the first audio output with a third set of values for one or more audio output parameters of the first audio output; and in accordance with a determination that the first multi-section arrangement is displayed in the first reconfiguration mode, output the first audio output with a fourth set of values, different from the third set of values, for the one or more audio output parameters of the first audio output, wherein the fourth set of values for the one or more audio output parameters correspond to a different level of audio prominence than the third set of values for the one or more audio output parameters of the first audio output

Figure 29F

DEVICES, METHODS, AND GRAPHICAL USER INTERFACES FOR INTERACTING WITH THREE-DIMENSIONAL ENVIRONMENTS

RELATED APPLICATIONS

This application claims priority to U.S. Provisional Application Ser. No. 63/646,801, filed May 13, 2024, U.S. Provisional Application Ser. No. 63/528,336, filed Jul. 21, 2023, U.S. Provisional Application Ser. No. 63/470,912, filed Jun. 4, 2023, and U.S. Provisional Application Ser. No. 63/466,963, filed May 16, 2023, each of which is hereby incorporated by reference in its entirety.

TECHNICAL FIELD

The present disclosure relates generally to computer systems that are in communication with a display generation component and one or more input devices and that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient mechanisms for performing actions associated with navigating within an extended reality environment, systems that provide insufficient feedback for performing actions associated with virtual objects, systems that require a series of inputs to achieve a desired outcome in the extended reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method is performed at a computer system that is in communication with one or more display generation components and one or more input devices. The method includes, while displaying, via the one or more display generation components, an arrangement of icons in a home menu user interface within a three-dimensional environment, wherein the arrangement of icons includes a first set of icons and a second set of icons, detecting a first user input for scrolling the arrangement of icons. The method includes, in response to detecting the first user input, moving icons in the arrangement of icons, including: moving the first set of icons at a first speed; and moving the second set of icons at a second speed that is different from the first speed. Moving the first set of icons at the first speed and the second set of icons at the second speed causes a spatial relationship between icons in the first set of icons to change relative to icons in the second set of icons.

In accordance with some embodiments, a method is performed at a computer system that is in communication with one or more display generation components and one or more input devices. The method includes detecting a first input to the computer system to invoke a home menu user interface. The method includes, in response to detecting the first input, displaying via the one or more display generation components the home menu user interface in a three-dimensional environment, including: in accordance with a determination that a viewpoint of a user in the three-dimensional environment had a first elevation relative to a reference plane in the three-dimensional environment, displaying the home menu user interface at a first height in the three-dimensional environment; and, in accordance with a determination that the viewpoint of the user in the three-dimensional environment had a second elevation relative to the reference plane in the three-dimensional environment, wherein the second elevation is different from the first elevation, displaying the home menu user interface at a second height in the three-dimensional environment, wherein the second height is different from the first height.

In accordance with some embodiments, a method is performed at a computer system that is in communication with one or more display generation components and one or more input devices. The method includes displaying, via the one or more display generation components, a home menu user interface at a respective location. The method includes, while displaying the home menu user interface at the respective location, detecting a first user input for launching an application from the home menu user interface. The method includes, in response to detecting the first user input for launching the application from the home menu user interface, displaying, at a respective application location, an application user interface associated with the application, including: in accordance with a determination that the home menu user interface was in a first home menu location, displaying the application user interface at a first application location that has a respective spatial offset from the first home menu location; and, in accordance with a determination that the home menu user interface was in a second home menu location, wherein the second home menu location is different from the first home menu location, displaying the application user interface at a second application location that has the respective spatial offset from the second home menu location, wherein the second application location is different from the first application location.

In accordance with some embodiments, a method is performed at a computer system that is in communication with a display generation component and one or more input devices. The method includes, while a view of a three-dimensional environment is visible via the display generation component, detecting, via the one or more input devices, a first input directed to a first object in an arrangement of a plurality of objects that are arranged along a virtual surface in the three-dimensional environment. The method includes, during the first input, detecting a first movement that includes movement in one or more directions that are substantially parallel to the virtual surface in the three-dimensional environment. The method includes, in response to detecting the first movement included in the first input: in accordance with a determination that the first movement includes movement that is substantially perpendicular to the virtual surface and that the movement that is substantially perpendicular to the virtual surface met first criteria prior to detection of the movement in the one or more directions that are substantially parallel to the virtual surface, removing the first object from the arrangement of the plurality of objects; and, in accordance with a determination that the first movement does not include movement that is substantially perpendicular to the virtual surface that meets the first criteria prior to the detection of the movement in the one or more directions that are substantially parallel to the virtual surface, forgoing removing the first object from the arrangement of the plurality of objects.

In accordance with some embodiments, a method is performed at a computer system that is in communication with a display generation component and one or more input devices. The method includes, while a view of a three-dimensional environment is visible via the display generation component, detecting a first input that includes movement directed to a first object located at a respective position in the three-dimensional environment. The movement includes movement in one or more directions relative to the respective position in the three-dimensional environment. The method includes, in response to detecting the movement directed to the first object, moving the first object in accordance with the movement, including: in accordance with a determination that the movement included in the first input includes a first movement in a first direction with a first magnitude, moving the first object to a first position different from the respective position in accordance with the first direction and the first magnitude of the first movement; and, in accordance with a determination that the movement included in the first input includes a second movement in a second direction with a second magnitude, moving the first object to a second position, different from the respective position and the first position, in accordance with the second direction and the second magnitude of the second movement. The method includes, after moving the first object in accordance with the movement included in the first input, detecting an end of the first input; and, in response to detecting the end of the first input: in accordance with a determination that the first input ended without meeting first criteria, restoring display of the first object at the respective position after the first input has ended; and, in accordance with a determination that the first input ended after meeting the first criteria, maintaining display of the first object at a position that is different from the respective position.

In accordance with some embodiments, a method is performed at a computer system that is in communication with a display generation component and one or more input devices. The method includes, while a view of a three-dimensional environment is visible via the display generation component, displaying an arrangement of a plurality of application icons in the three-dimensional environment. The method includes, while displaying the arrangement of the plurality of application icons in the view of the three-dimensional environment, detecting, via the one or more input devices, a first movement input directed to the arrangement of the plurality of application icons. The method includes, in response to detecting the first movement input directed to the arrangement of the plurality of application icons: in accordance with a determination that the first movement input includes first movement in one or more directions that are substantially parallel to the arrangement of the plurality of application icons and that the first movement meets first criteria, scrolling the arrangement of the plurality of application icons, including revealing a first set of application icons that were not visible prior to detecting the first movement input; and, in accordance with a determination that the first movement input is directed to a first application icon in the plurality of application icons and that the first movement input includes second movement in a direction that is substantially perpendicular to the arrangement of the plurality of application icons and that the second movement meets second criteria, launching a first application corresponding to the first application icon in the three-dimensional environment.

In accordance with some embodiments, a method is performed at a computer system that is in communication with one or more display generation components and one or more input devices. The method includes, while displaying, via the one or more display generation components, one or more application user interfaces within a three-dimensional environment, detecting a first input corresponding to a request to display a home menu user interface. The method includes, in response to detecting the first input, concurrently displaying the home menu user interface and visually deemphasizing the one or more application user interfaces. Visually deemphasizing a respective application user interface includes displaying a change in one or more visual characteristics of the respective application user interface.

In accordance with some embodiments, a method is performed at a computer system that is in communication with one or more display generation components and one or more input devices. The method includes, while displaying, via the one or more display generation components, a respective user interface, detecting a first input directed to a selectable user interface object corresponding to a first application displayed in the respective user interface. The method includes in response to detecting the first input: in accordance with a determination that the first input is detected while a user interface of the first application is displayed at a first position within a viewport of a three-dimensional environment, visually emphasizing the user interface of the first application at the first positions.

In accordance with some embodiments, a method is performed at a computer system that is in communication with one or more display generation components and one or more input devices. The method includes, displaying a first object at a first location that is a first distance from a viewpoint of a user in a view of a three-dimensional environment, detecting an input corresponding to a request to display a second object at a second location that is a second distance from the viewpoint of the user in the view of the three-dimensional environment. The method includes in response to detecting the input corresponding to the request to display the second object at the second location: in accordance with a determination that displaying the second object at the second location results in more than a threshold amount of overlap between the first object and the second object from the viewpoint of the user and that a difference in depth between the first location and the second location is less than a respective threshold depth, displaying the first object at a third location and the second object at a fourth location. The third location and the fourth location are selected such that less than the threshold amount of overlap between the first object and the second object is visible from the viewpoint of the user.

In accordance with some embodiments, a method is performed at a computer system that is in communication with one or more display generation components and one or more input devices. The method includes, displaying, via the display generation component, a first portion of an arrangement of selectable user interface objects in a view of a three-dimensional environment that includes a view of a portion of a physical environment that is visible via the display generation component. The first portion of the arrangement of selectable user interface objects includes a first plurality of selectable user interface objects. The method includes, while the first portion of the arrangement of selectable user interface objects is visible, detecting, via the one or more input devices, a first input corresponding to a request to initiate a process for moving one or more selectable user interface objects relative to the arrangement of selectable user interface objects. The method includes in response to detecting the first input: reducing a visual prominence of the portion of the physical environment in the view of the three-dimensional environment relative to a visual prominence of the first portion of the arrangement of selectable user interface objects; and initiating the process for moving the one or more selectable user interface objects relative to the arrangement of selectable user interface objects.

In accordance with some embodiments, a method is performed at a computer system that is in communication with a display generation component and one or more input devices. The method includes displaying, in a viewport of a three-dimensional environment, a first application user interface at a respective location for the first application user interface that is at a respective depth position for the first application user interface. The method includes detecting a first input corresponding to a request to display a second application user interface in the viewport of the three-dimensional environment. The method includes, in response to detecting the first input corresponding to the request to display the second application user interface, displaying the second application user interface at a respective location for the second application user interface that is at a respective depth position for the second application user interface. In accordance with a determination that the first application user interface is at a first location for the first application user interface with a first depth position for the first application user interface, the respective location for the second application user interface is at a first depth position for the second application user interface; and, in accordance with a determination that the first application user interface is at a second location for the first application user interface with a second depth position for the first application user interface that is different from the first depth position for the first application user interface, the respective location for the second application user interface is at a second depth position for the second application user interface, different from the first depth position for the second application user interface.

In accordance with some embodiments, a method is performed at a computer system that is in communication with a display generation component and one or more input devices. The method includes, displaying, via the one or more display generation components, a first view of an environment, including displaying a first section of a first multi-section arrangement of a first plurality of user interface objects in the first view of the environment, wherein the first section of the first multi-section arrangement of the first plurality of user interface objects includes a first subset of the first plurality of user interface objects. The method further includes, while displaying, via the one or more display generation components, the first section of the first multi-section arrangement of the first plurality of user interface objects in the first view of the environment, detecting, via the one or more input devices, one or more first user inputs that correspond to a request to activate the first reconfiguration mode for the first multi-section arrangement of the first plurality of user interface objects, wherein respective positions of one or more user interface objects in the first multi-section arrangement of the first plurality of user interface objects are adjustable by a user. The method further includes, in response to detecting the one or more first user inputs that correspond to a request to activate a first reconfiguration mode for the first multi-section arrangement of the first plurality of user interface objects, displaying, via the one or more display generation components, the first multi-section arrangement of the first plurality of user interface objects in the first reconfiguration mode, including concurrently displaying the first section of the first multi-section arrangement of the first plurality of user interface objects, and a view of a first portion of a second section of the first multi-section arrangement of the first plurality of user interface objects, wherein the view of the first portion of the second section of the first multi-section arrangement includes first content that was not displayed with the first section of the first multi-section arrangement before the first multi-section arrangement of the first plurality of user interface objects is displayed in the first reconfiguration mode.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIGS. 7A-7I illustrate example techniques for scrolling representations displayed in a home menu user interface, in accordance with some embodiments.

FIGS. 8A-8J illustrate example techniques for displaying a home menu user interface, in accordance with some embodiments.

FIGS. 11A-11L illustrate example techniques for using a pluck gesture to launch applications in a mixed reality three-dimensional environment, in accordance with some embodiments.

FIG. 12 is a flow diagram of methods of scrolling representations displayed in a home menu user interface, in accordance with various embodiments.

FIG. 13 is a flow diagram of methods of displaying a home menu user interface, in accordance with various embodiments.

FIG. 14 is a flow diagram of methods of displaying an application user interface of an application by activating a representation of the application in a home menu user interface, in accordance with various embodiments.

FIG. 15 is a flow diagram of methods of using a pluck gesture to remove an object from a collection of objects in a mixed reality three-dimensional environment, in accordance with various embodiments.

FIG. 16 is a flow diagram of methods of providing continuous feedback to a user while performing a pluck gesture in a mixed-reality three-dimensional environment, in accordance with various embodiments.

FIG. 17 is a flow diagram of methods of using a pluck gesture to launch applications in a mixed reality three-dimensional environment, in accordance with various embodiments.

FIGS. 18A-18G illustrate example techniques for displaying a home menu user interface while one or more application user interfaces are present in a viewport of the three-dimensional environment, in accordance with some embodiments.

FIG. 22 is a flow diagram of methods of displaying a home menu user interface while one or more application user interfaces are present in a viewport of the three-dimensional environment, in accordance with various embodiments.

FIG. 23 is a flow diagram of methods of displaying, within a viewport of a three-dimensional environment, a user interface of an application in response to detecting a user input corresponding to a selection of a representation associated with the application, in accordance with various embodiments.

FIG. 24 is a flow diagram of methods of automatically rearranging overlapping objects in a mixed-reality three-dimensional environment, in accordance with various embodiments.

FIG. 25 is a flow diagram of methods of reconfiguring a home menu user interface in a mixed-reality three-dimensional environment, in accordance with various embodiments.

FIG. 27 is a flow diagram of methods of placing an application user interface in a viewport of a three-dimensional environment based on the presence of one or more other application user interfaces in the viewport and/or a position of the application user interface within the viewport, in accordance with various embodiments.

FIGS. 29A-29F are flow diagrams of methods of configuring a home menu user interface in an environment (e.g., a three-dimensional environment, a pseudo-three-dimensional environment, or another type of environment), in accordance with various embodiments.

DESCRIPTION OF EMBODIMENTS

Figure 1B:
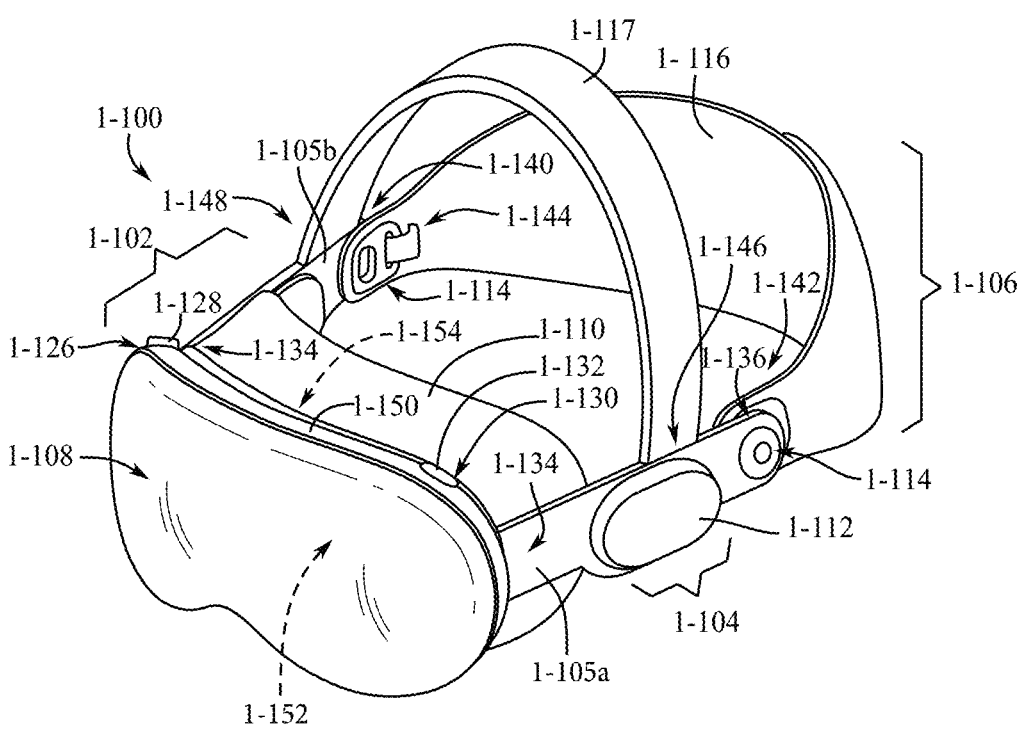
FIGS. 1B-1P are examples of a computer system for providing XR experiences in the operating environment of FIG. 1A.

The present disclosure relates to user interfaces for providing an extended reality (XR) experience to a user, in accordance with some embodiments. In some embodiments, the techniques disclosed herein are also applicable to three-dimensional environments, pseudo-three-dimensional environments, and/or two-dimensional environments (e.g., two-dimensional desktop environments and/or a full-screen display environments for a mobile device, such as a smartphone, a tablet device, a smartwatch, or another type of wearable device).

The systems, methods, and GUIs described herein improve user interface interactions with virtual/augmented reality environments in multiple ways.

In some embodiments, a computer system scrolls an arrangement of icons (e.g., the arrangement of icons spans more than a single page, and/or the arrangement of icons on two or more pages allows bi-directional scrolling) arranged across two or more rows in a way that allows some icons to move faster than other icons. A spatial relationship between a first icon (e.g., the first icon is in a first row of the arrangement, the first icon is in a third row of the arrangement) and a second icon (e.g., the second icon is in a second row of the arrangement, and/or the second icon is in a different row of the arrangement from the first icon) in the arrangement of icons changes as a result of the scrolling. Allowing a spatial relationship between the first icon and the second icon to change during the movement increases the flexibility of the types of arrangement of icons that can be presented to the user, and permits the use of arrangements of icons that allows respective icons to be more easily tracked while scrolling.

In some embodiments, a computer system displays a home menu user interface at a location in a XR three-dimensional environment based on a head elevation of the user when the home menu user interface is invoked. The location of the home menu user interface in the XR three-dimensional environment also depends on a rotational position of a viewpoint of the user. Optionally, the home menu user interface is displayed at a location in the XR three-dimensional environment independently of any gaze input from the user. Displaying the home menu user interface at a location based on a head elevation of a user, optionally independently of a user's gaze, reduces fatigue, and automatically presents the home menu user interface at an ergonomically favorable position to the user, without requiring manual adjustments from the user.

In some embodiments, a computer system displays a user interface of a first application at a first location in a XR three-dimensional environment based on a home menu location of a home menu user interface. The first location of the user interface of the first application has a consistent spatial relationship with respect to the home menu location. The first location of the user interface of the first application is optionally adjusted based on a user input after the computer system displays the user interface of the first application at the first location. Optionally, the computer system displays the application user interface at a modified application location that is offset vertically from the first location to prevent the user interface of the first application from intersecting a lower surface of the XR three-dimensional environment. Displaying the application user interface at a location that is based on the home menu location automatically presents both the home menu user interface and the application user interface at ergonomically favorable positions to the user, without requiring manual adjustments from the user.

In some embodiments, a computer system allows a user to use a pluck air gesture to interact with (e.g., drag and drop) and remove objects (e.g., photos, documents, or other content items of the same type) from a collection of objects (e.g., library, gallery, contents in folder, or other collection of objects) in a three-dimensional environment (e.g., a virtual or mixed reality environment). Different movement criteria are used to determine the user's intent to remove a respective object from the collection of objects and place the respective object at different locations in the three-dimensional environment. For example, the computer system disambiguates the user's input between removing the respective object from the collection of objects, scrolling the collection of objects, and moving the object within the collection of objects. Different threshold amounts of movement laterally, vertically, and towards the user, in conjunction with other input and movement criteria (e.g., maintaining an air pinch gesture), are used by the computer system to recognize the pluck air gesture. Using a special air gesture for removing an object from a collection of objects makes user-device interaction in the mixed-reality three-dimensional environment more efficient by reducing accidental or unwanted inputs. For example, using a pluck air gesture ensures that the computer system does not accidently scroll the collection of objects and/or move the object within the collection of objects, thereby reducing the number of inputs and/or amount of time needed to remove an object from a collection of objects and relocate the object in the three-dimensional environment.

In some embodiments, a pluck gesture is used to drag and drop (e.g., select and relocate) an object from a collection of objects displayed in a virtual surface or to launch an application from a home screen user interface in a three-dimensional environment (e.g., a virtual or mixed reality environment). In particular, if the selected object (or application icon) is moved relative to a virtual surface (or home user interface) in response to hand movement (e.g., movement towards a viewpoint of the user) and the selected object is released before a pluck movement threshold is met (e.g., an air pinch gesture is released before activating a pluckable state for the selected object), the selected object snaps back or restores its original position in the virtual surface, whereas the selected object maintains its location if released when the pluck movement threshold has been met. Further, the computer system provides other visual feedback while the pluck gesture is performed. For example, during the pluck gesture the object or application icon that is being pulled changes size, orientation, and position (optionally tilting the selected object or application icon toward a direction in which it is being pulled). Providing continuous visual feedback during the pluck gesture makes the user-device interaction more efficient by reducing unintended inputs and assisting the user when interacting with an object in a collection of objects in a mixed-reality three-dimensional environment.

In some embodiments, a pluck air gesture is used to launch an application from a home user interface displayed in a three-dimensional environment (e.g., a virtual or mixed reality environment). The pluck gesture is directed toward an application launch icon displayed in the three-dimensional environment, and the application icon while selected is pulled towards a viewpoint of a user. When the pluck gesture reaches a threshold amount of movement towards the viewpoint of the user, an application that corresponds to the selected application icon is launched. Using the pluck gesture to launch an application from a menu of application icons disambiguates the user's intent to launch the application or to scroll the menu of application icons, and/or to perform a different operation with respect to the application icon, thereby reducing accidental or unintended inputs and reducing the number of inputs and the amount of time needed to launch an application in a three-dimensional environment.

In some embodiments, while displaying one or more application user interfaces within a three-dimensional environment, a computer system detects a first input corresponding to a request to display a home menu user interface. In response to detecting the first input, the computer system concurrently displays the home menu user interface and visually deemphasizes the one or more application user interfaces. Concurrently displaying the home menu user interface and visually deemphasizing the one or more application user interfaces helps to reduce distraction from the one or more applications to the user while the user navigates the home menu user interface. By displaying the one or more applications, albeit with a visual deemphasis, the user continues to be presented with relevant information from the one or more application while navigating the home menu user interface.

In some embodiments, while displaying, via one or more display generation components, a respective user interface, a computer system detects a first input directed to a selectable user interface object corresponding to a first application displayed in the respective user interface; and in response to detecting the first input: in accordance with a determination that the first input is detected while a user interface of the first application is displayed at a first position within a viewport of the three-dimensional environment, the computer system visually emphasizes the user interface of the first application at the first position. Visually emphasizing the application user interface of the first application reminds the user that an instance of the first application is already open, without providing additional controls to the user, increasing operational efficiency of user-machine interactions by not having to wait for the first application to load. Visually emphasizing the application user interface of the first application also reduces a computing burden on the computer system to generate two instances of the application user interface of the first application, improving computing resource management of the computer system and prolonging a time before a battery of the computer system has to be recharged.

In some embodiments, a computer system automatically rearranges overlapping objects (e.g., open windows executed by one or more applications) in a mixed-reality three-dimensional environment. If a first object is placed in the mixed-reality three-dimensional environment such that the first object occludes a pre-existing second object (e.g., an object that is already visible in the mixed-reality three-dimensional environment before the first object is placed) by more than a threshold amount (e.g., a percentage, proportion, area, and/or other measurement) from a viewpoint of a user, and if the first object and the second object are also in a depth conflict (e.g., the first object and the second object are sufficiently close to each other in the depth dimension), the computer system automatically (e.g., without additional user inputs and/or conditions that need to be met) moves the pre-existing second object (e.g., the one that is being occluded by the first object), such that at least a threshold amount of visibility of the pre-existing second object is maintained. Automatically reducing occlusion between objects (e.g., thereby maintain visibility and/or quick access to the objects) in a mixed-reality three-dimensional environment reduces the number and/or complexity of inputs needed to rearrange objects, bring the objects to the foreground and/or otherwise interact with the objects in the mixed-reality three-dimensional environment, thereby making interaction with multiple objects more efficient.

In some embodiments, an improved mechanism for reconfiguring a home menu user interface (e.g., for launching applications) in a mixed-reality three-dimensional environment is provided. In conjunction with initiating a process for reconfiguring the home menu user interface (e.g., including activating an icon reconfiguration mode and a page configuration mode) and while the home menu user interface is being reconfigured, passthrough portions of the environment are visually deemphasized (e.g., reducing opacity, brightness, and/or darkening the passthrough portions) relative to an arrangement of application icons included in the home user interface. Maintaining visibility while reducing prominence of passthrough portions reduces potential motion sickness, improves safety, and improves multitasking by allowing a user to be cognizant of the physical environment while interacting with the home menu user interface (e.g., allowing a user to recognize obstacles in the physical environment and/or reducing a feeling of being unbalanced) without the need to provide additional inputs (e.g., without the need to switch back and forth between viewing virtual content to viewing the physical environment), thereby reducing the number and/or complexity of inputs needed to reconfigure a home menu user interface in a mixed-reality three-dimensional environment.

In some embodiments, a computer system displays a first application user interface in a view of a three-dimensional environment at a depth position for the first application user interface, and, in response to detecting an input corresponding to a request to display a second application user interface, the computer system displays the second application user interface at a respective depth position that is based on the depth position of the first application user interface. Displaying the second application user interface at a respective depth position that depends on the depth position of the first application user interface allows the second application user interface to be placed at an ergonomic depth position without changing the depth position of the first application user interface, thereby reducing a user's risk of motion sickness, and allows the second application user interface to be offset in other dimensions so that at least some of the first application user interface continues to be visible concurrently with the second application user interface, thereby reducing an amount of time needed to interact with application user interfaces on the computer system.

In some embodiments, an improved mechanism for reconfiguring a multi-section arrangement of a collection of user interface objects, optionally, of the same type (e.g., a respective arrangement of a multi-arrangement home menu user interface that include a collection of application icons, a collection of icons for contacts, a collection of icons for environments and/or experiences, a collection of controls, or a collection of objects of another object type or multiple object types) in an environment (e.g., mixed-reality three-dimensional environment, or another type of environment) is provided. While a respective section of the multi-section arrangement is displayed, the computer system detects an input for activating the reconfiguration mode (e.g., for rearranging user interface objects in the multi-section arrangement). In response to the input for activating the reconfiguration mode, the computer system activates the reconfiguration mode (optionally providing visual feedback that the reconfiguration mode is active, such as oscillating the user interface objects around their respective axes). In conjunction with activating the reconfiguration mode, the computer system displays preview of the adjacent sections, if any, of the multi-section arrangement, including optionally displaying some of the user interface objects that are located in the adjacent sections (e.g., optionally visually deemphasized or dimmed relative to user interface objects on the respective section). Displaying a preview of the adjacent sections (or other indication of the adjacent sections) in conjunction with activating the reconfiguration mode, assists a user and provides guidance to the user that moving a selected user interface object from the respective section to a different, adjacent section, is a valid configuration (e.g., one that the computer system can perform), thereby reducing the number of input and/or time needed to relocate a selected user interface object from one section to another in the multi-section arrangement. Further, the preview of the adjacent sections in the reconfiguration mode, is displayed prior to, or without the need for, movement input that drags a selected user interface object towards a respective adjacent page of the two adjacent pages, thereby reducing the number of input and/or time needed to rearrange a home menu user interface in a mixed-reality three-dimensional (e.g., the user does not have to drag the user interface object to discover whether there is an adjacent section or whether the dragged user interface object can be relocated to the adjacent section).

Figure 19A:
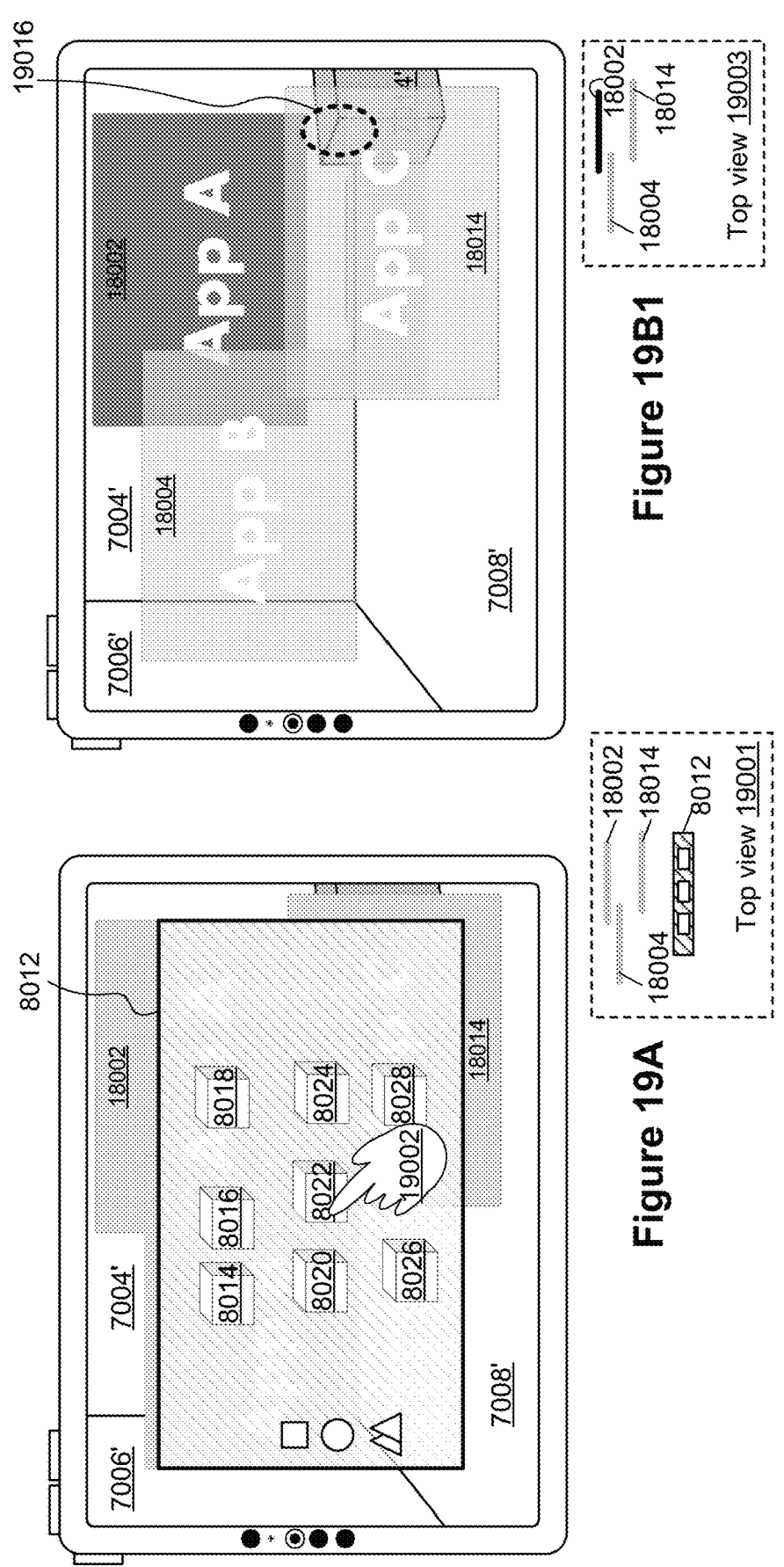
FIGS. 19A-19N illustrate example techniques for displaying, within a viewport of a three-dimensional environment, a user interface of an application in response to detecting a user input corresponding to a selection of a representation associated with the application, in accordance with some embodiments.
Figures 19M, 19N:
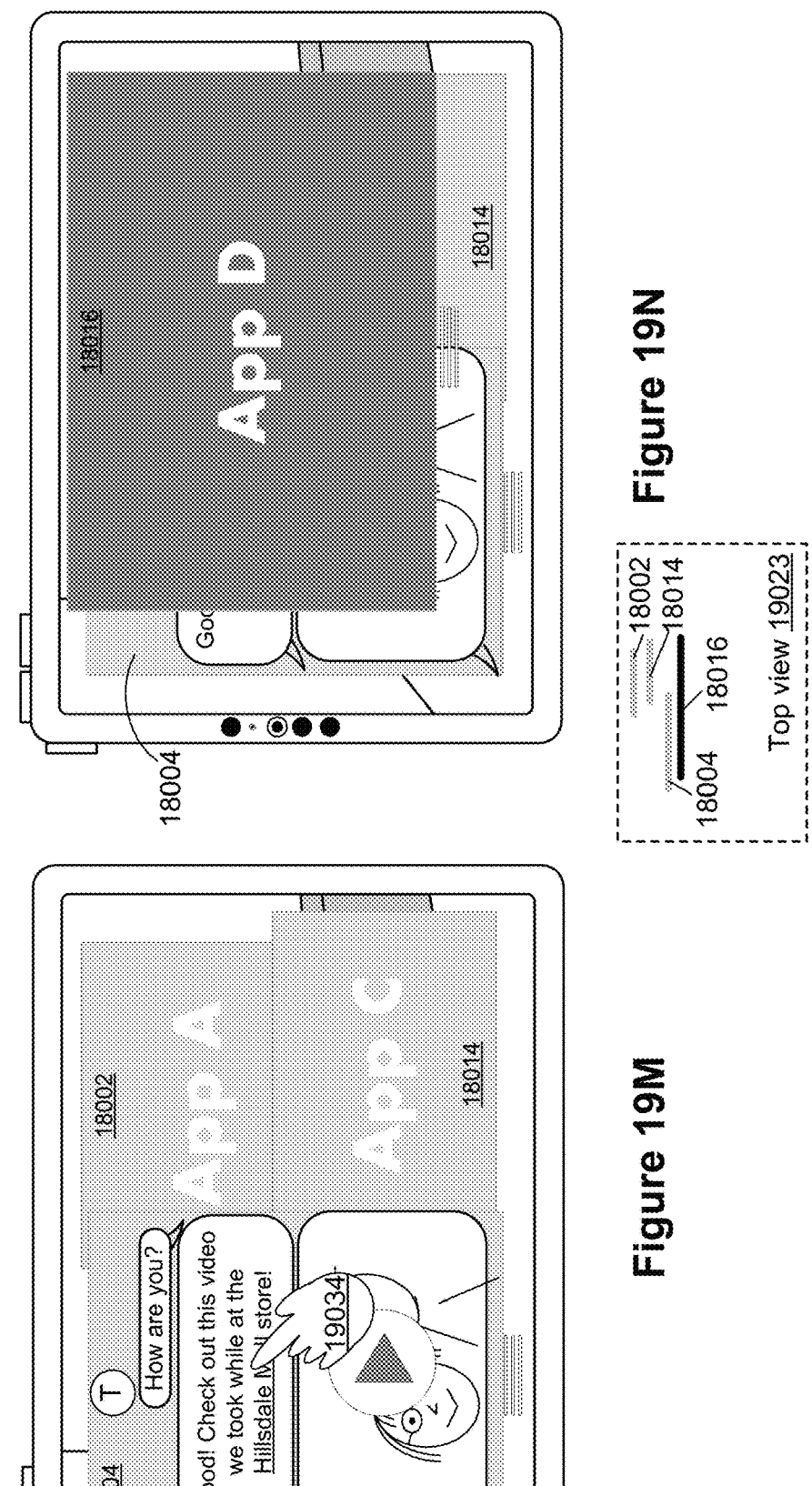
Figures 20A, 20B:
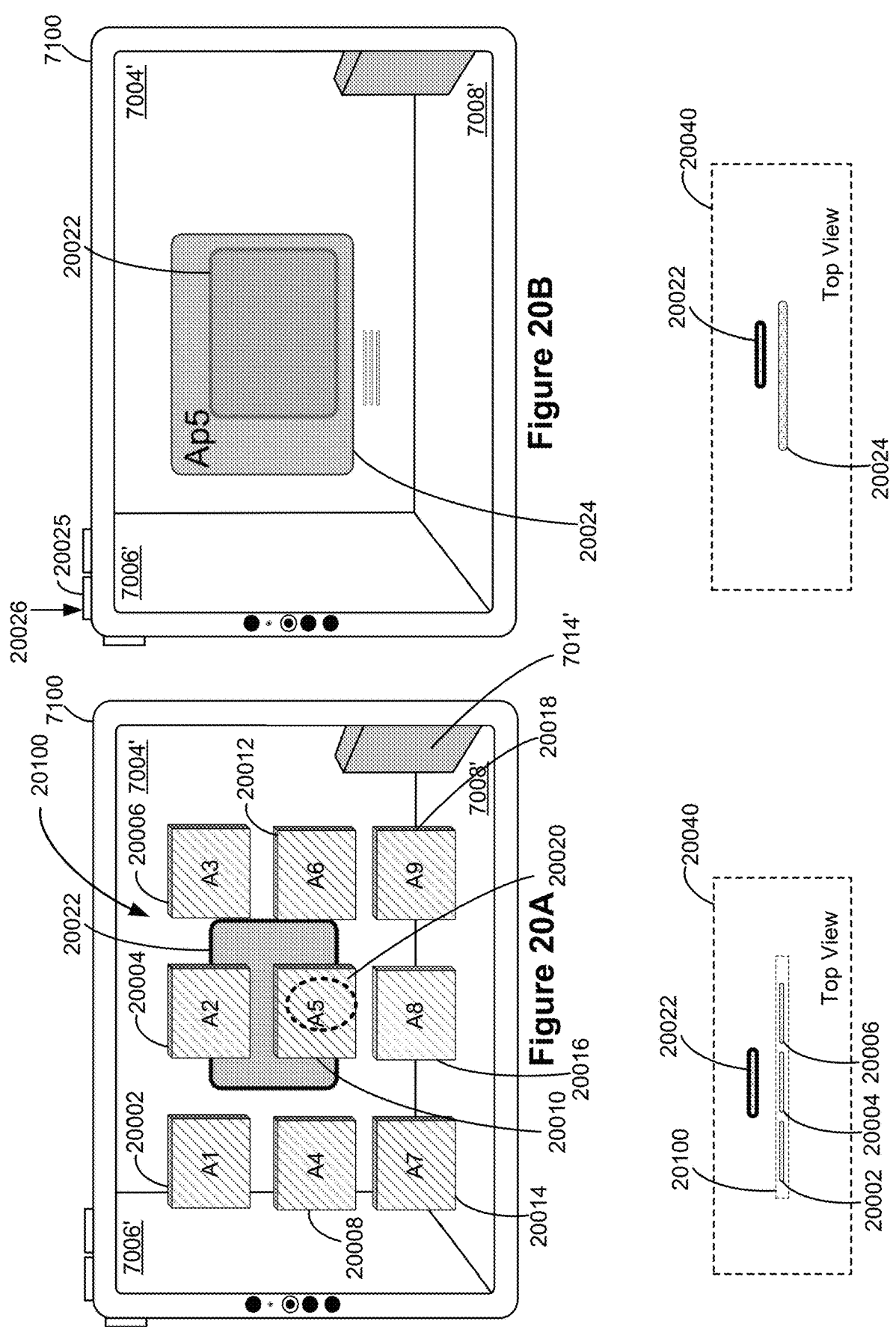
FIGS. 20A-20X illustrate example techniques for automatically rearranging overlapping objects in a mixed-reality three-dimensional environment, in accordance with some embodiments.
Figures 20W, 20X:
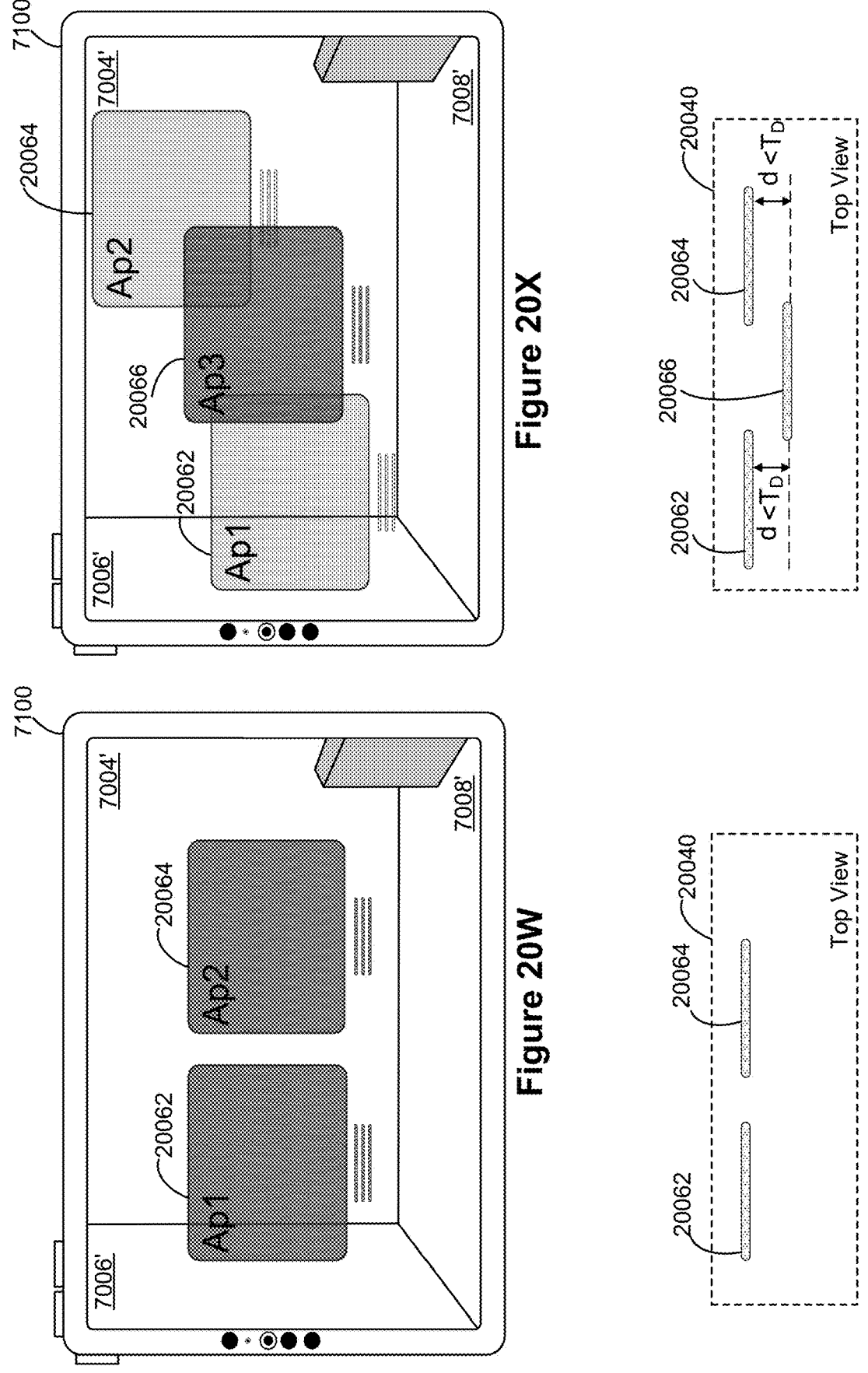
Figures 21A, 21B:
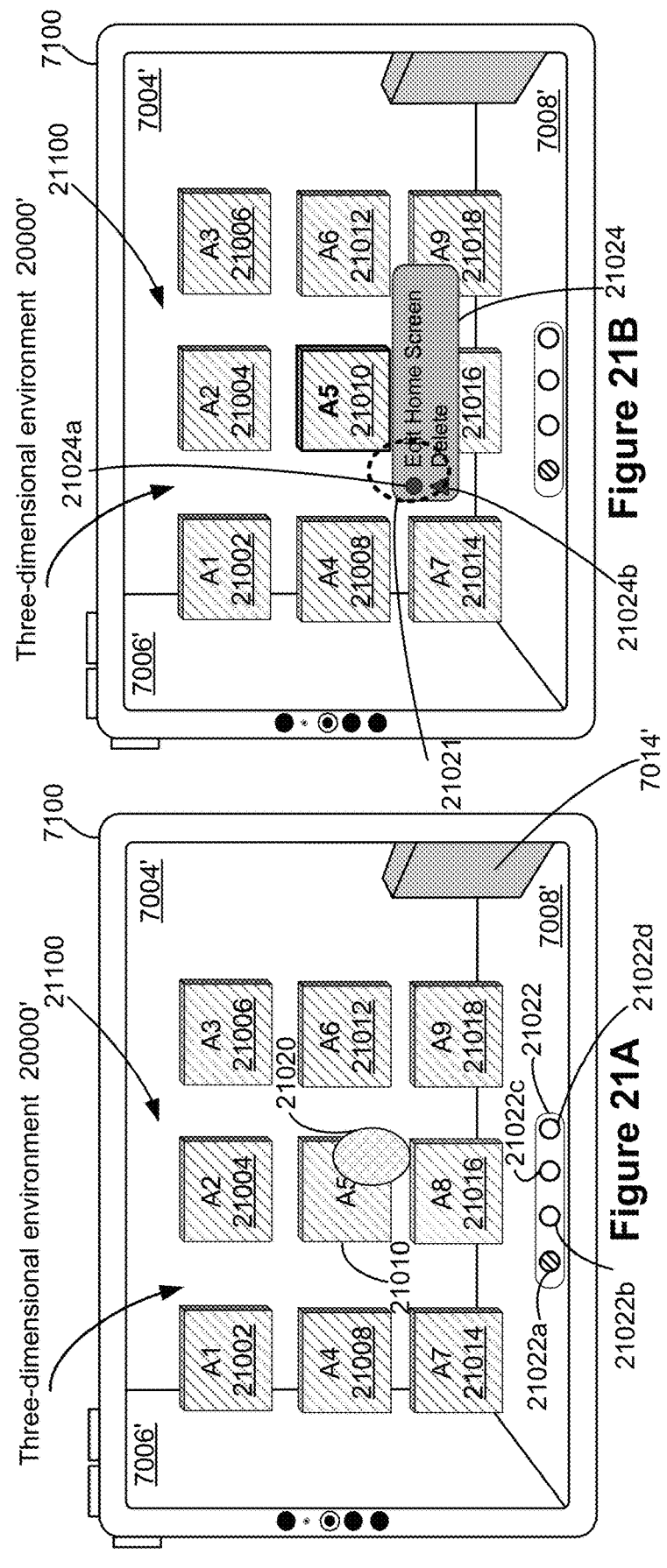
FIGS. 21A-21Y illustrate example techniques for reconfiguring a home menu user interface in a mixed-reality three-dimensional environment is provided, in accordance with some embodiments.
Figure 26A:
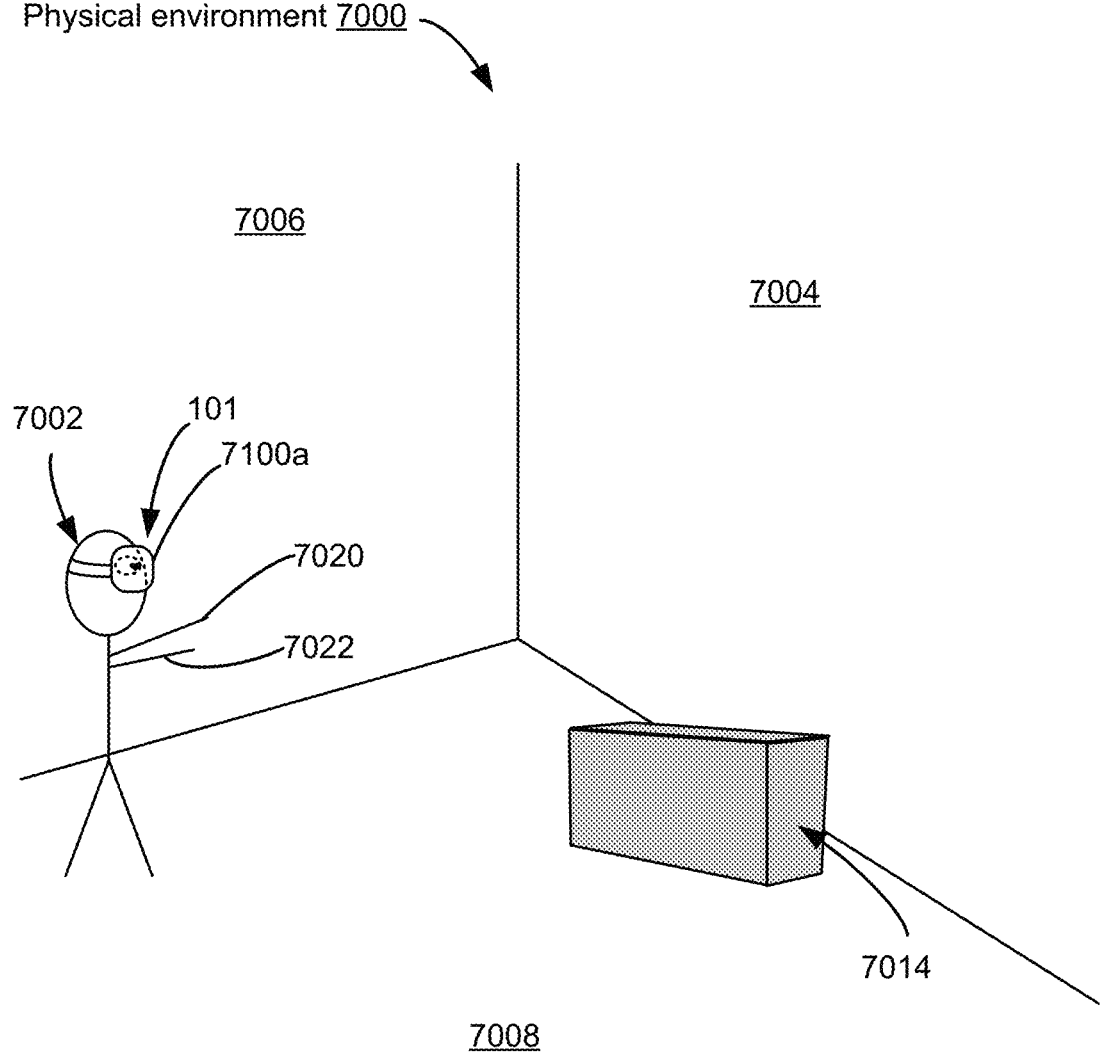
FIGS. 26A-26R illustrate example techniques for placing an application user interface in a viewport of a three-dimensional environment based on the presence of one or more other application user interfaces in the viewport and/or a position of the application user interface within the viewport, in accordance with some embodiments.
Figures 28A, 28B:
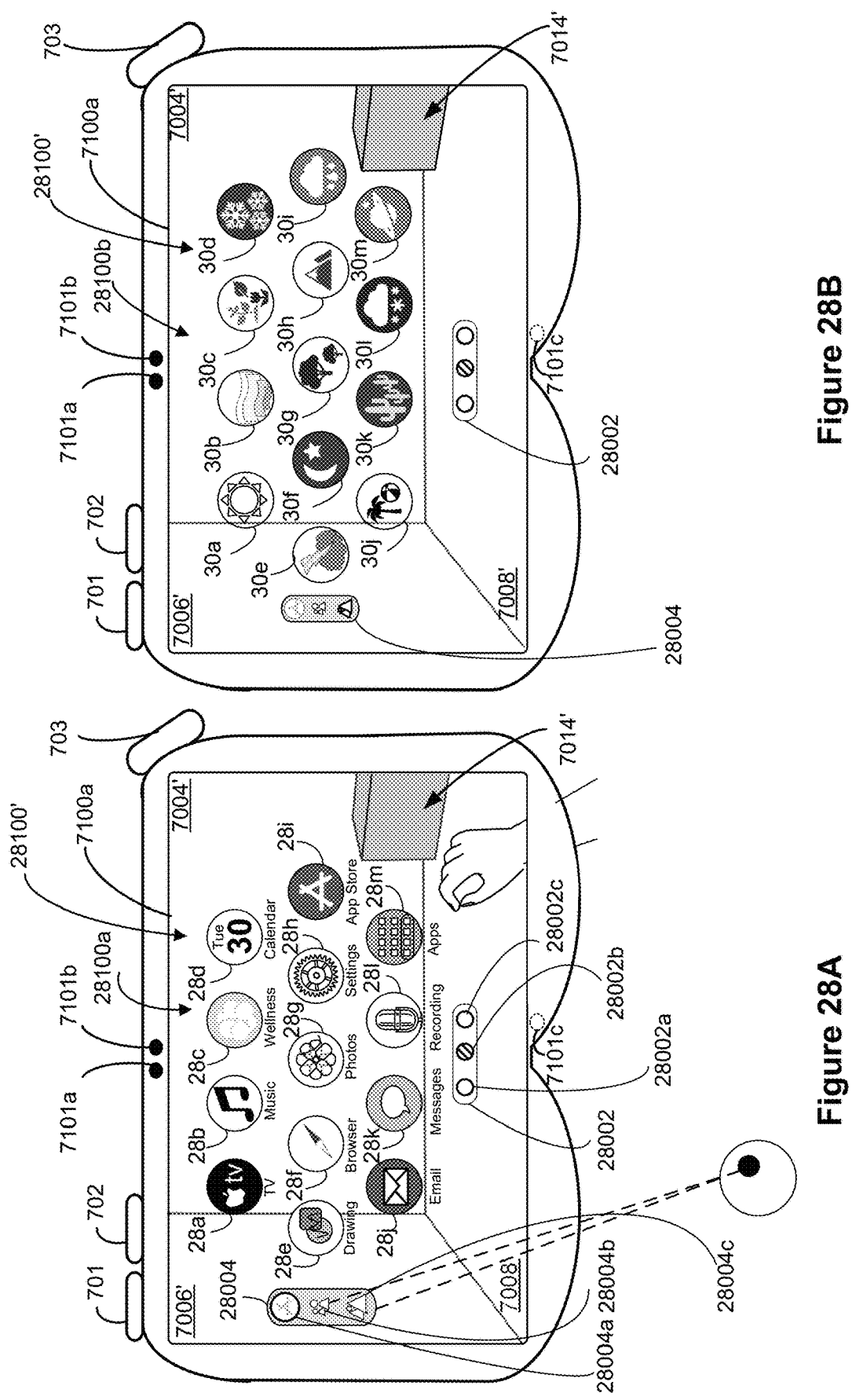
FIGS. 28A-28AI illustrate example techniques for configuring a home menu user interface in an environment (e.g., a three-dimensional environment, a pseudo-three-dimensional environment, or another type of environment), in accordance with some embodiments.

FIGS. 1A-6 provide a description of example computer systems for providing XR experiences to users. FIGS. 7A-7I illustrate example techniques for scrolling representations displayed in a home menu user interface, in accordance with some embodiments. FIGS. 8A-8J illustrate example techniques for displaying a home menu user interface, in accordance with some embodiments. FIGS. 9A-9O illustrate example techniques for displaying an application user interface, in accordance with some embodiments. FIGS. 10A-10Q illustrate example techniques for using a pluck gesture to remove an object from a collection of objects in a mixed reality three-dimensional environment, and for providing continuous feedback to a user while performing a pluck gesture in a mixed-reality three-dimensional environment, in accordance with some embodiments. FIGS. 11A-11L illustrate example techniques for using a pluck gesture to launch applications in a mixed reality three-dimensional environment, in accordance with some embodiments. FIG. 12 is a flow diagram of methods of scrolling representations displayed in a home menu user interface, in accordance with various embodiments. The user interfaces in FIGS. 7A-7I are used to illustrate the processes in FIG. 12. FIG. 13 is a flow diagram of methods of displaying a home menu user interface, in accordance with various embodiments. The user interfaces in FIGS. 8A-8J are used to illustrate the processes in FIG. 13. FIG. 14 is a flow diagram of methods of displaying an application user interface, in accordance with various embodiments. The user interfaces in FIGS. 9A-9O are used to illustrate the processes in FIG. 14. FIG. 15 is a flow diagram of methods of using a pluck gesture to remove an object from a collection of objects in a mixed reality three-dimensional environment, in accordance with various embodiments. FIG. 16 is a flow diagram of methods of providing continuous feedback to a user while performing a pluck gesture in a mixed-reality three-dimensional environment, in accordance with various embodiments. The user interfaces in FIGS. 10A-10Q are used to illustrate the processes in FIGS. 15 and 16. FIG. 17 is a flow diagram of methods of using a pluck gesture to launch applications in a mixed reality three-dimensional environment, in accordance with various embodiments. The user interfaces in FIGS. 11A-11L are used to illustrate the processes in FIG. 17. FIGS. 18A-18G illustrate example techniques for displaying a home menu user interface while one or more application user interfaces are present in a viewport of the three-dimensional environment, in accordance with some embodiments. FIGS. 19A-19N illustrate example techniques for displaying, within a viewport of a three-dimensional environment, a user interface of an application in response to detecting a user input corresponding to a selection of a representation associated with the application, in accordance with some embodiments. FIGS. 20A-20X illustrate example techniques for automatically rearranging overlapping objects in a mixed-reality three-dimensional environment, in accordance with some embodiments. FIGS. 21A-21Y illustrate example techniques for reconfiguring a home menu user interface in a mixed-reality three-dimensional environment is provided, in accordance with some embodiments. FIG. 22 is a flow diagram of methods of displaying a home menu user interface while one or more application user interfaces are present in a viewport of the three-dimensional environment, in accordance with various embodiments. The user interfaces in FIGS. 18A-18G are used to illustrate the processes in FIG. 22. FIG. 23 is a flow diagram of methods of displaying, within a viewport of a three-dimensional environment, a user interface of an application in response to detecting a user input corresponding to a selection of a representation associated with the application, in accordance with various embodiments. The user interfaces in FIGS. 19A-19N are used to illustrate the processes in FIG. 23. FIG. 24 is a flow diagram of methods of automatically rearranging overlapping objects in a mixed-reality three-dimensional environment, in accordance with various embodiments. The user interfaces in FIGS. 20A-20X are used to illustrate the processes in FIG. 24. FIG. 25 is a flow diagram of methods of reconfiguring a home menu user interface in a mixed-reality three-dimensional environment, in accordance with various embodiments. The user interfaces in FIGS. 21A-21Y are used to illustrate the processes in FIG. 25. FIGS. 26A-26R illustrate example techniques for placing an application user interface in a viewport of a three-dimensional environment based on the presence of one or more other application user interfaces in the viewport and/or a position of the application user interface within the viewport, in accordance with some embodiments. FIG. 27 is a flow diagram of methods of placing an application user interface in a viewport of a three-dimensional environment based on the presence of one or more other application user interfaces in the viewport and/or a position of the application user interface within the viewport, in accordance with various embodiments. The user interfaces in FIGS. 26A-26R are used to illustrate the processes in FIG. 27. FIGS. 28A-28AI illustrate example techniques for configuring a home menu user interface in an environment (e.g., a mixed-reality three-dimensional environment or another type of environment), in accordance with some embodiments. FIGS. 29A-29F are a flow diagram of an exemplary method 2900 for configuring a home menu user interface in an environment (e.g., a mixed-reality three-dimensional environment or another type of environment), in accordance with some embodiments. The user interfaces in FIGS. 28A-28AI are used to illustrate the processes described below, including the processes in FIGS. 29A-29F.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in an XR environment may be made in response to representations of physical motions (e.g., vocal commands). A person may sense and/or interact with an XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/ earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate an XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/ or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is an XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1A:
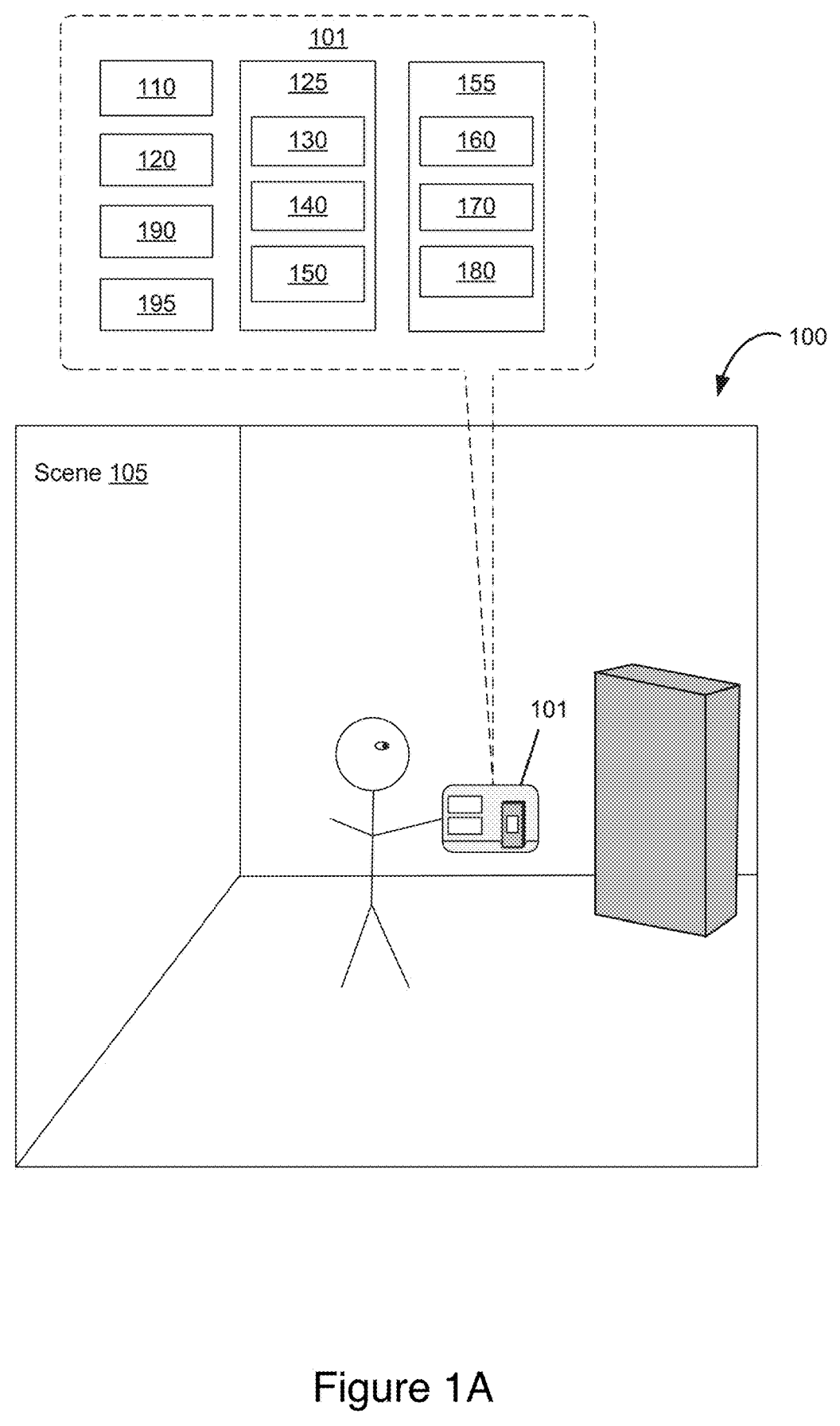
Figure 1C:
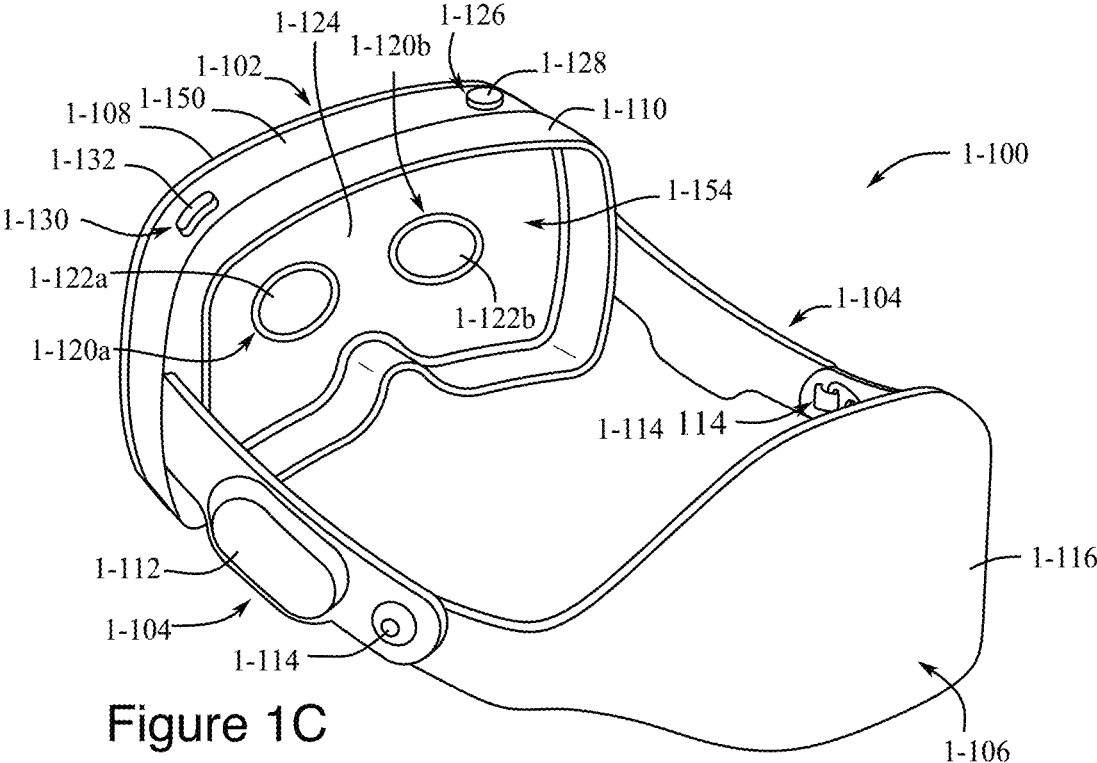
FIG. 1A is a block diagram illustrating an operating environment of a computer system for providing extended reality (XR) experiences in accordance with some embodiments.
Figure 1D:
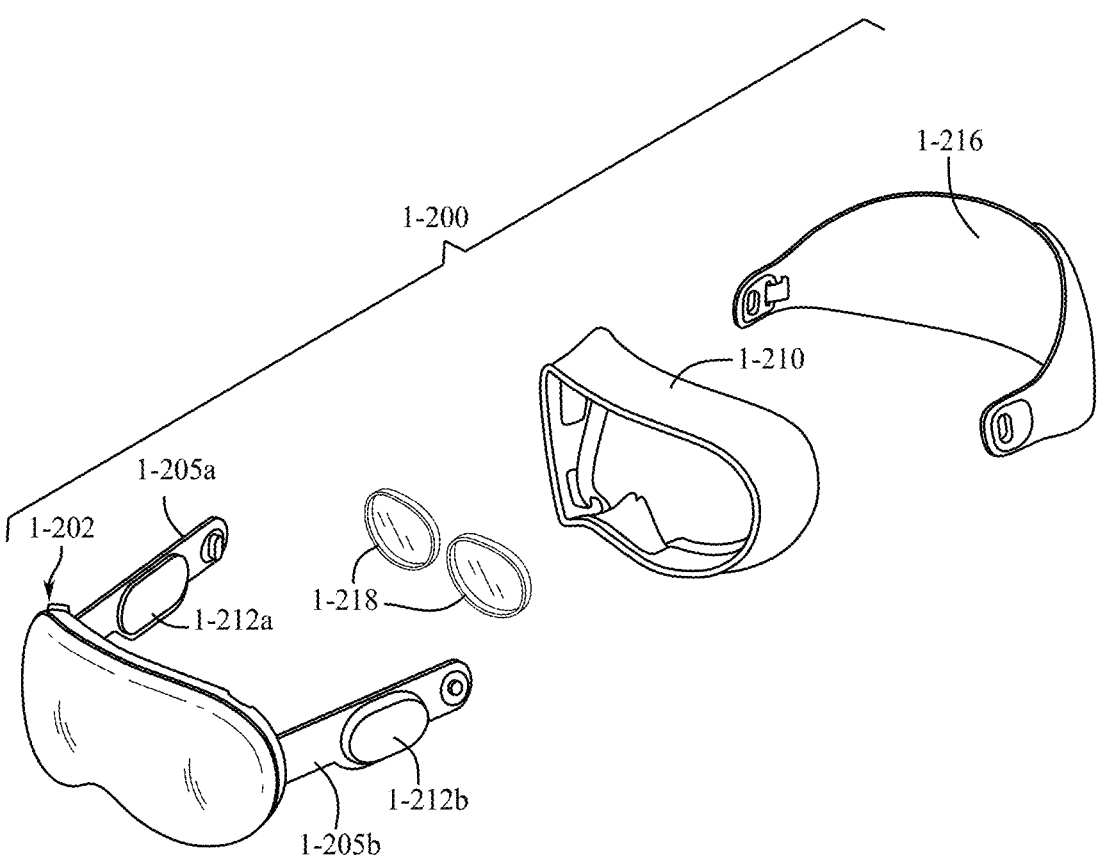
Figure 1E:
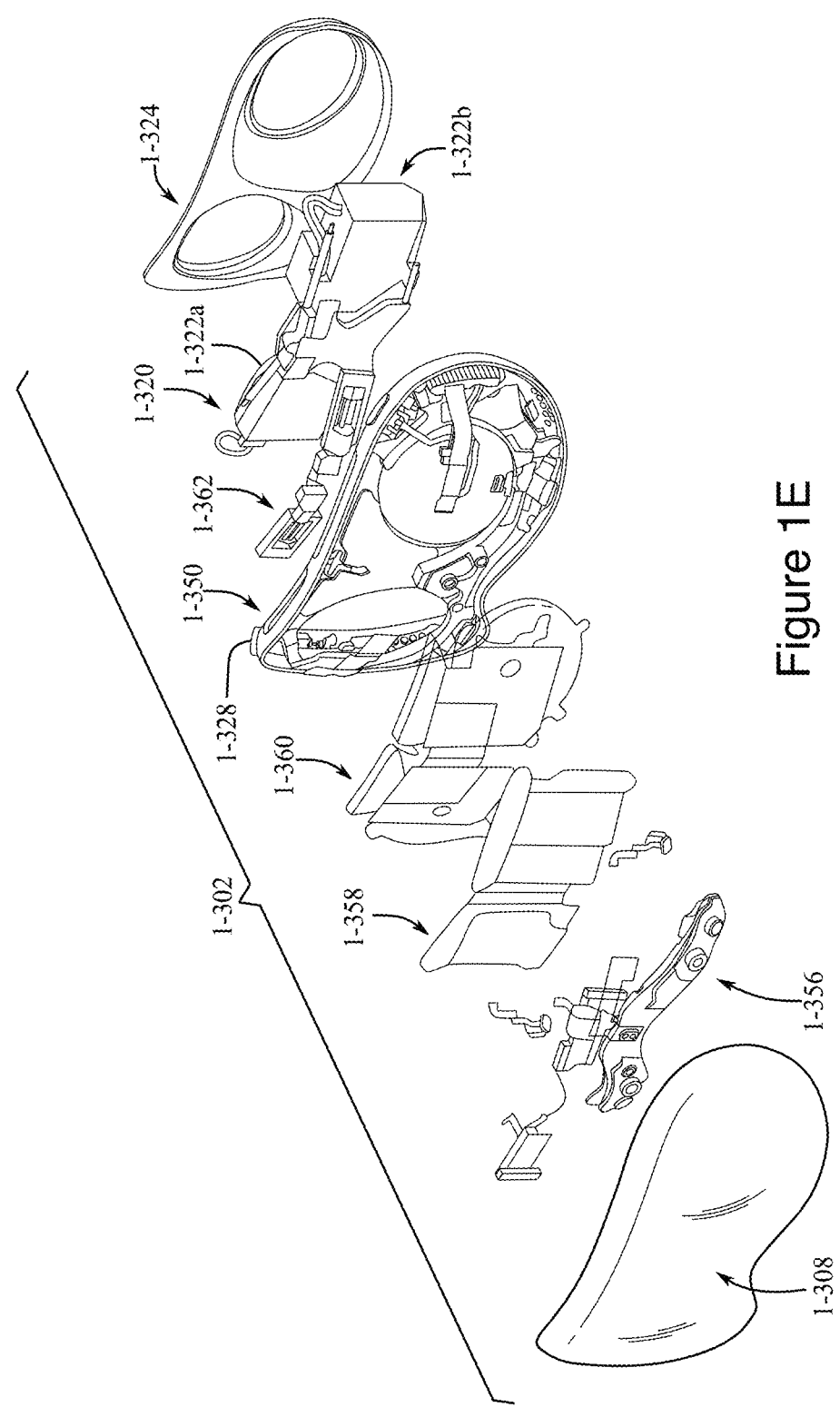
Figure 1F:
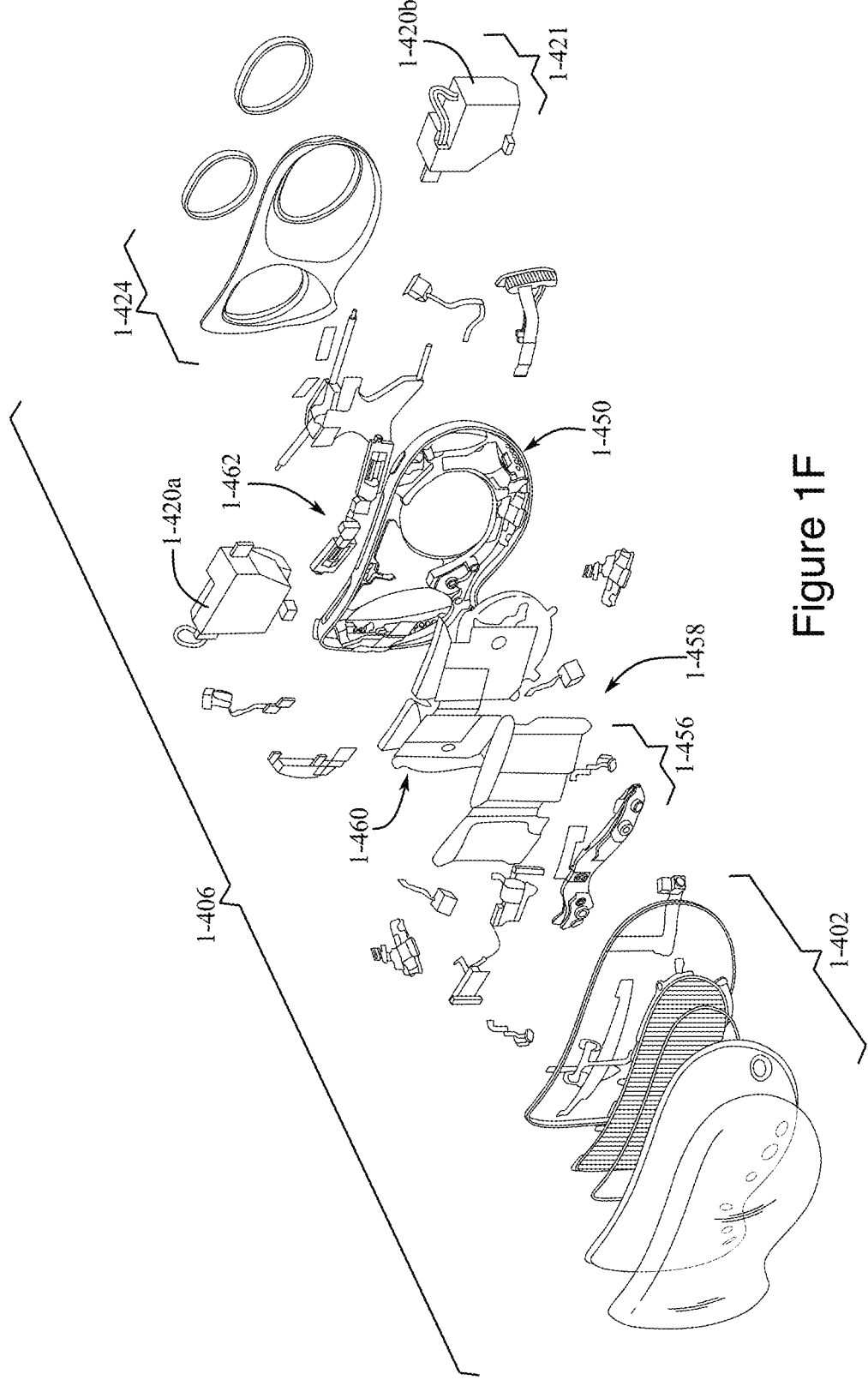
Figure 1G:
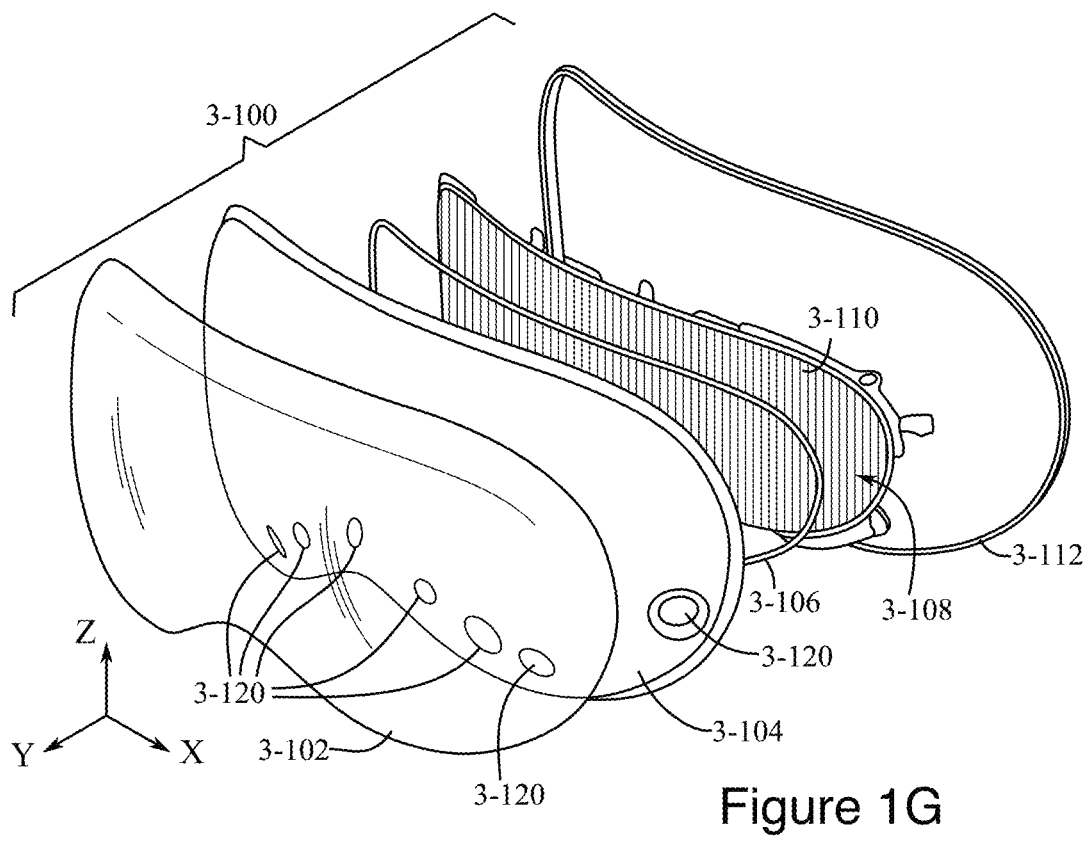
Figure 1H:
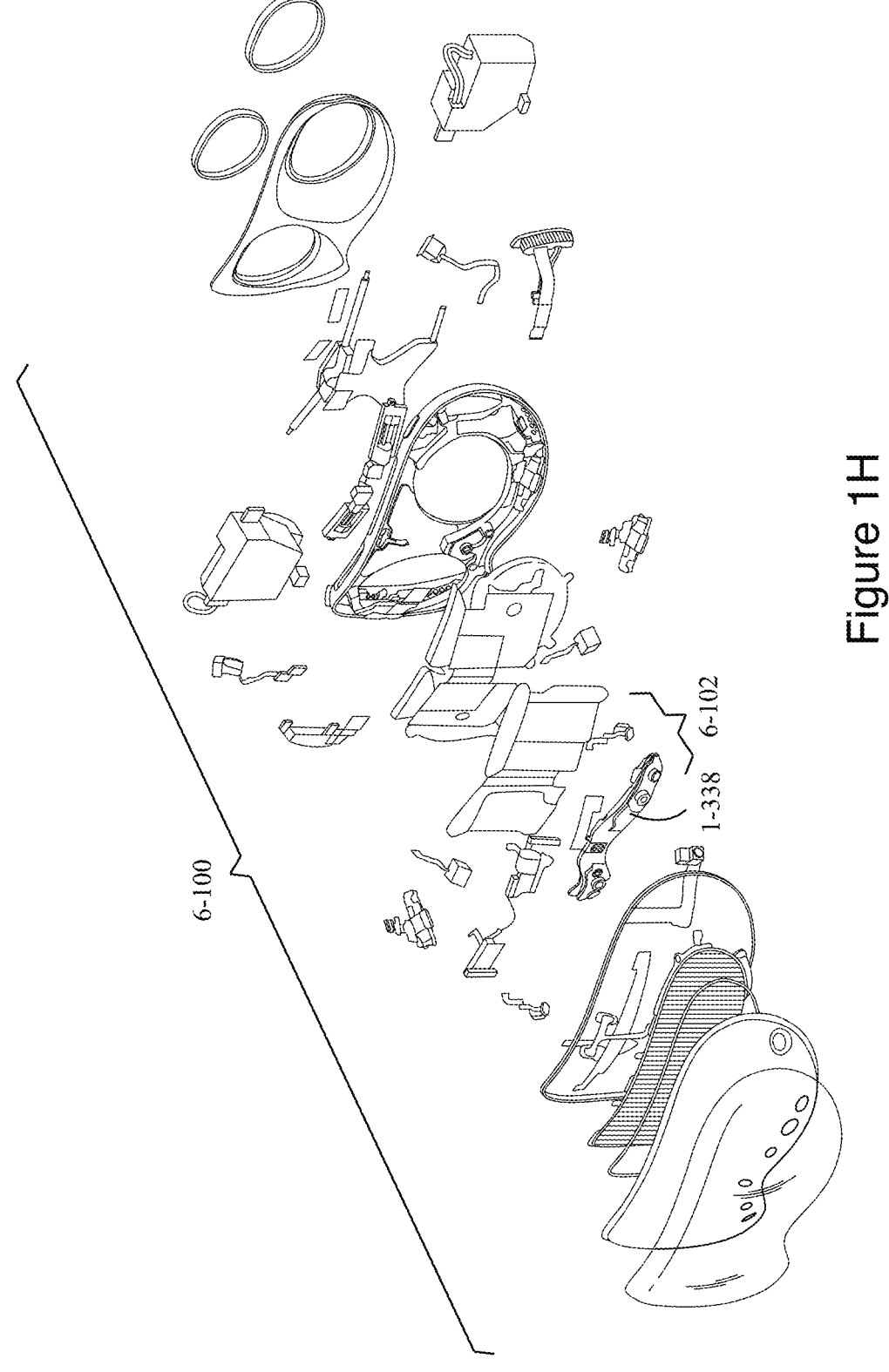
Figure 1I:
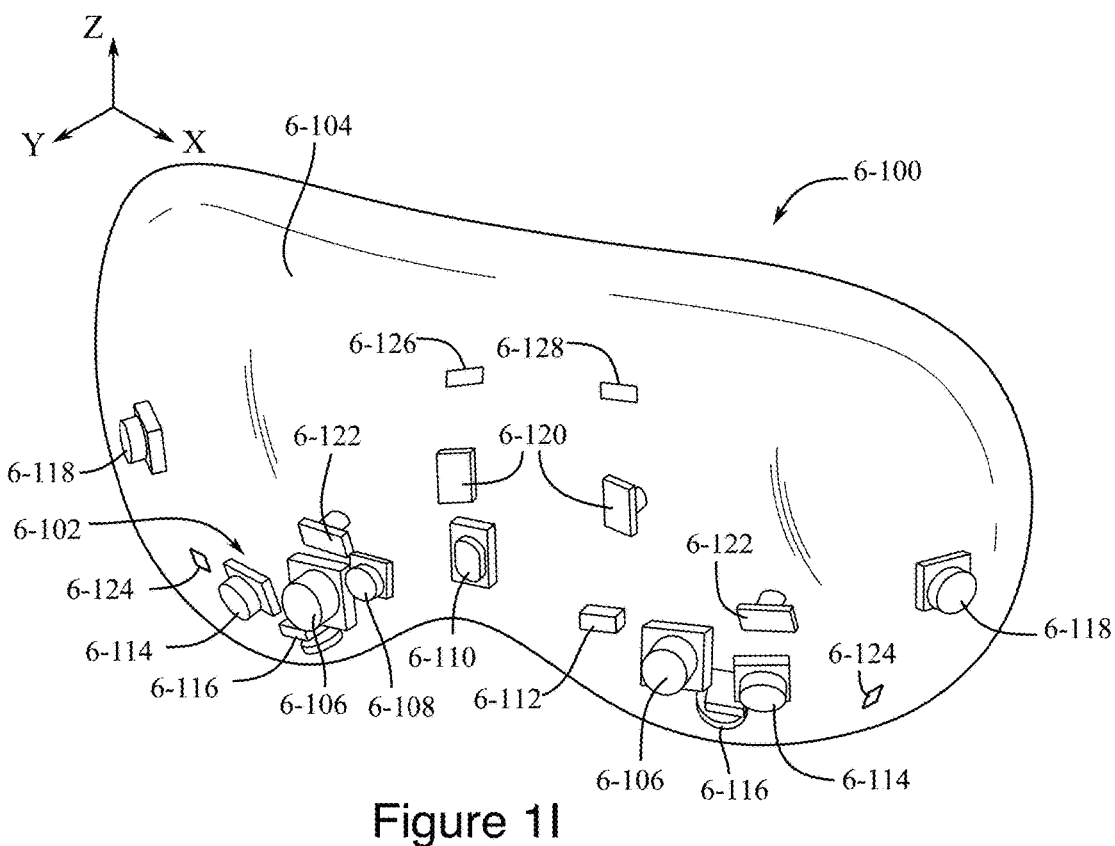
Figure 1J:
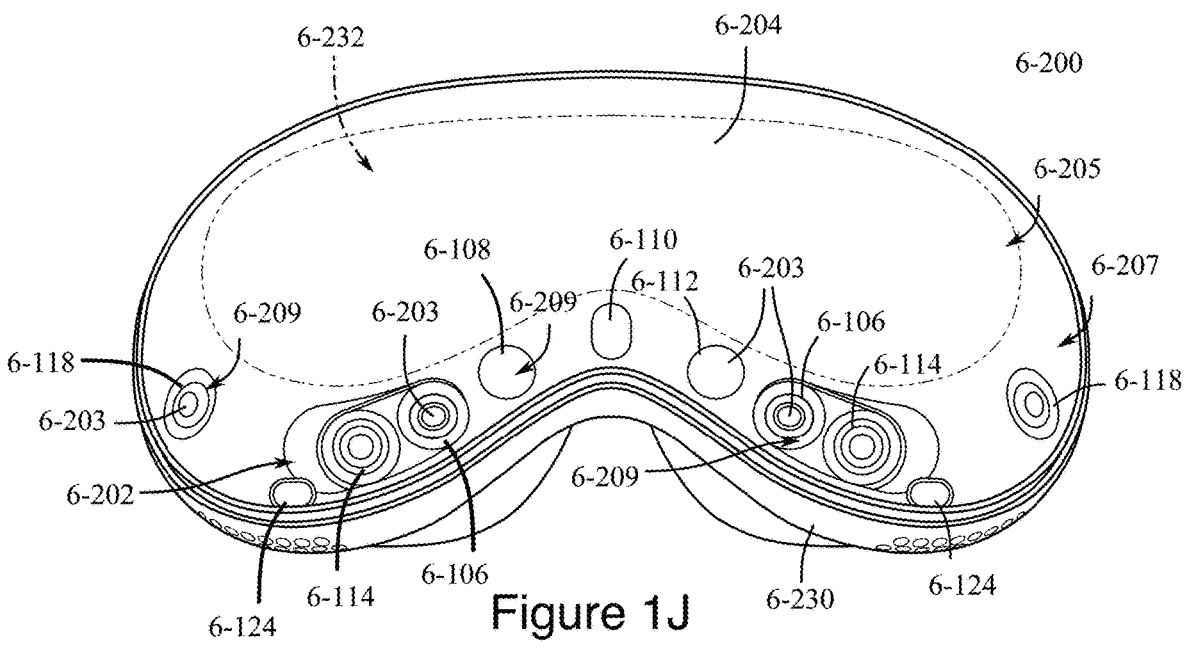
Figure 1K:
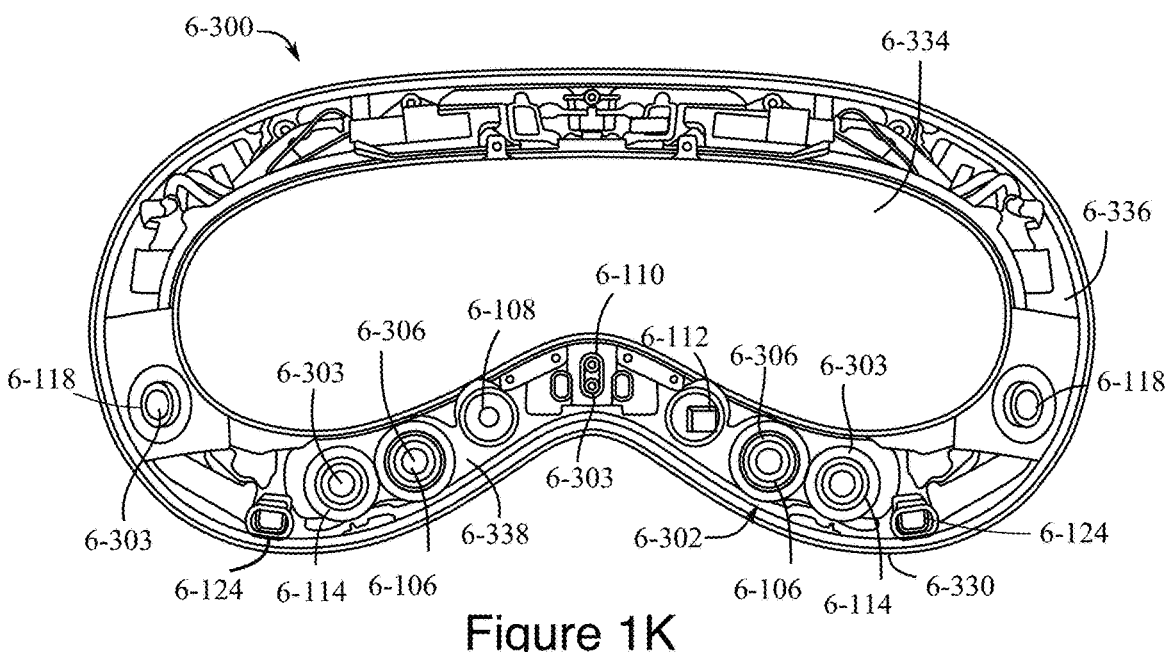
Figure 1L:
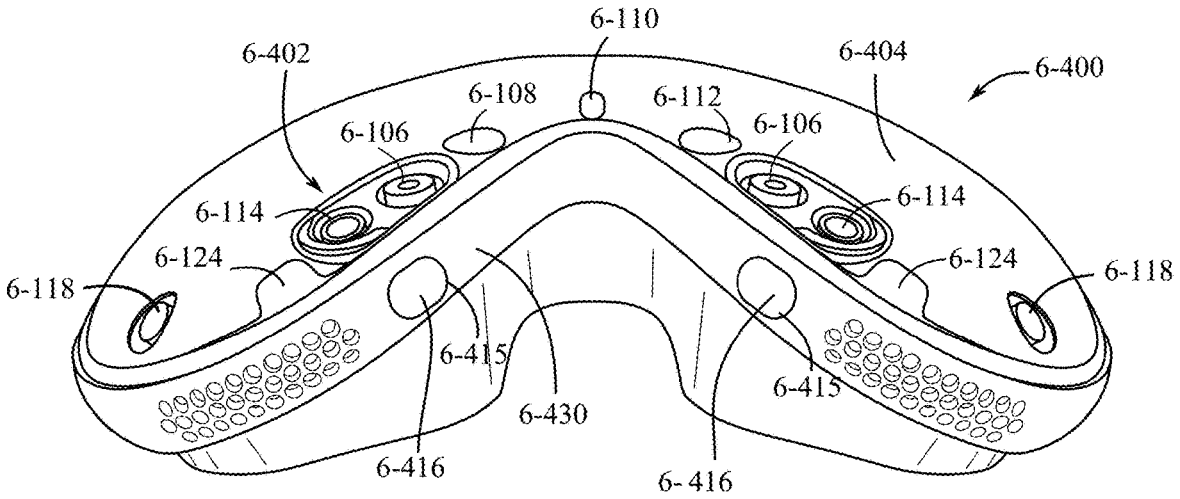
Figure 1M:
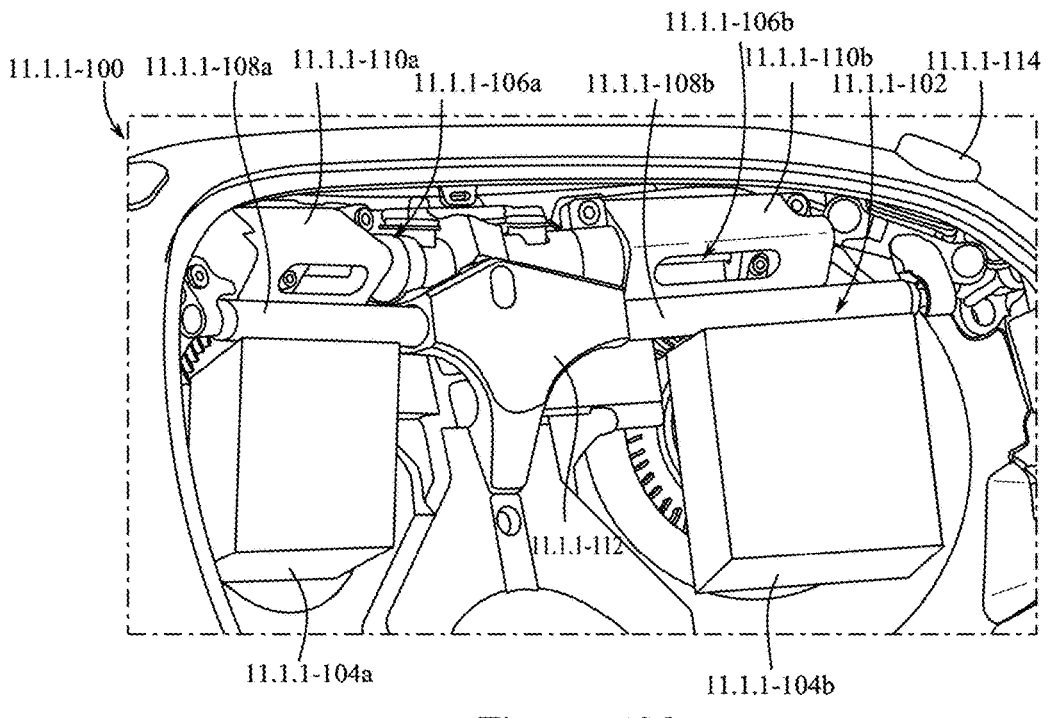
Figure 1N:
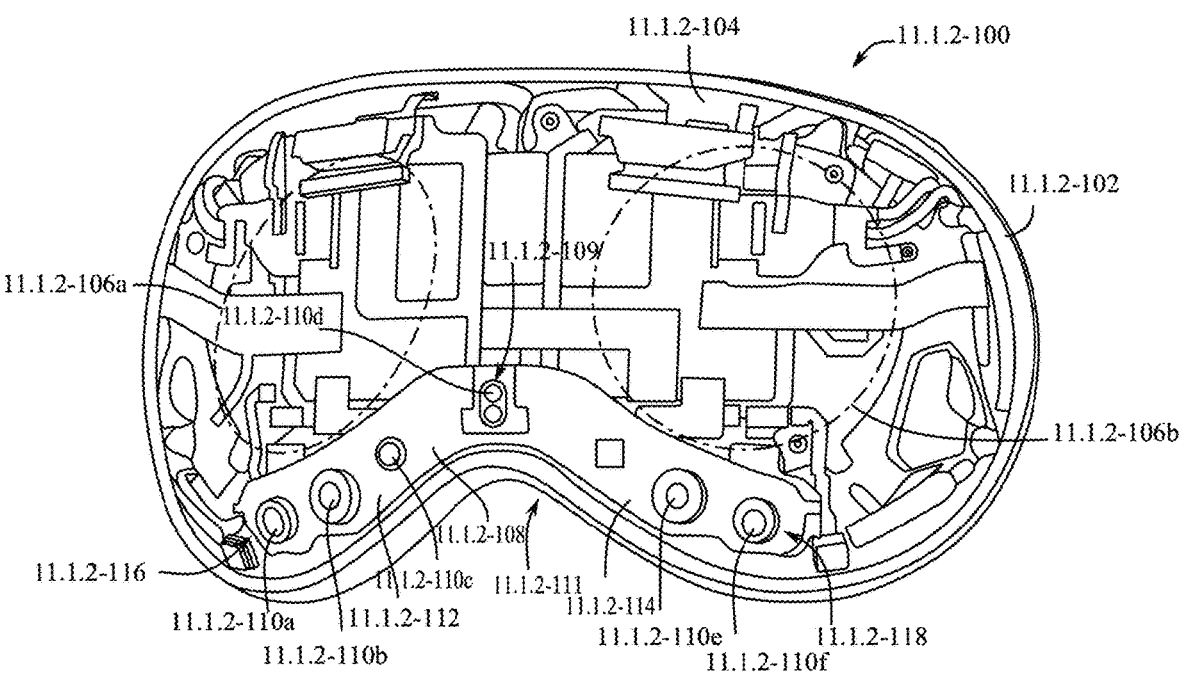
Figure 1O:
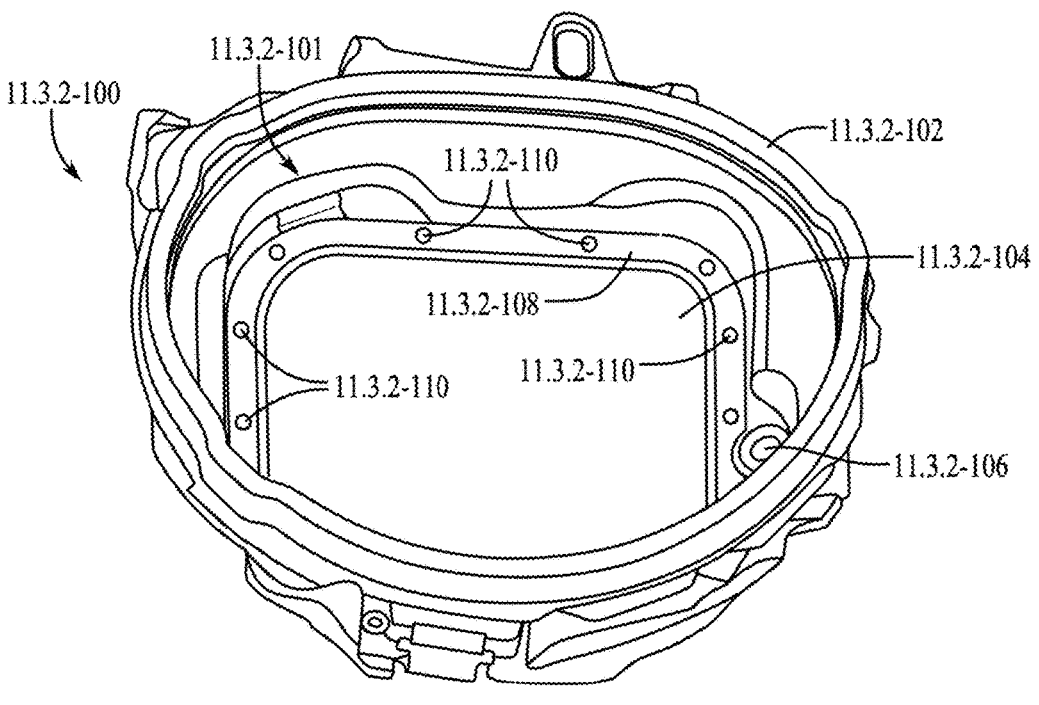
Figure 1P:
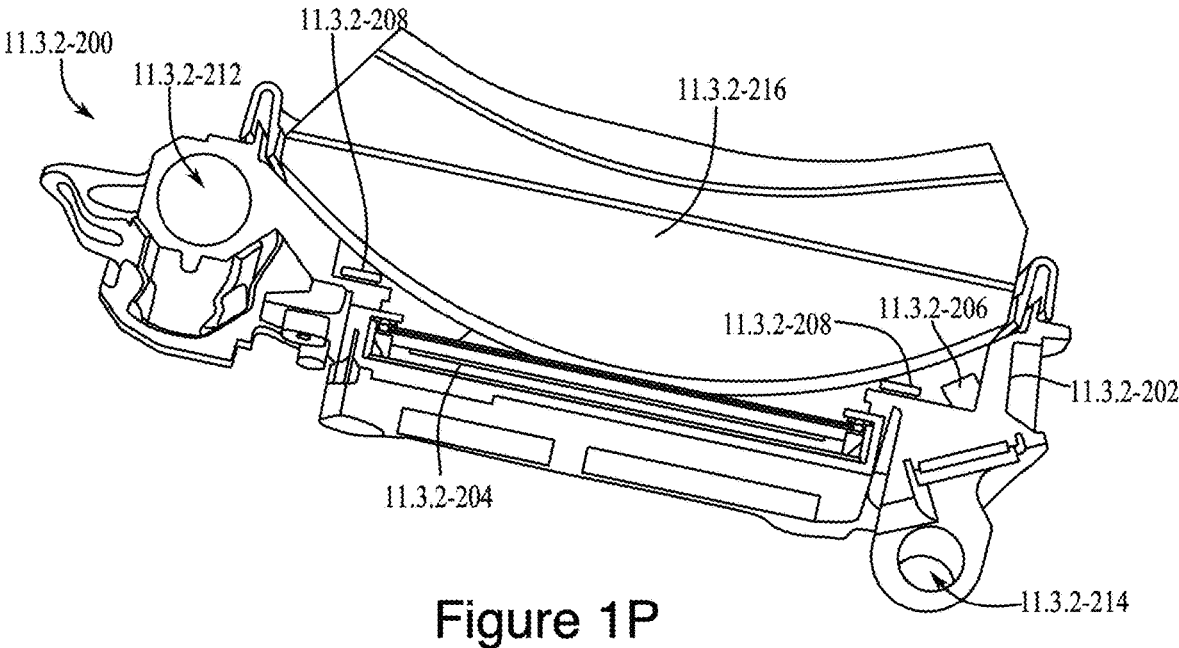

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/ or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-IF and described herein. Likewise, any of the features, components, and/or parts, including the arrangements and configurations thereof shown and described with reference to FIGS. 1D-IF can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-IF and described herein. Likewise, any of the features, components, and/or parts, including the arrangements and configurations thereof shown and described with reference to FIGS. 1B, 1C, and 1E-IF can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and IF and described herein. Likewise, any of the features, components, and/or parts, including the arrangements and configurations thereof shown and described with reference to FIGS. 1B-1D and IF can be included, either alone or in any combination, in the example of the devices, features, components, and parts shown in FIG. 1E.

FIG. 1F illustrates an exploded view of another example of a display unit 1-406 of an HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. For hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules

11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
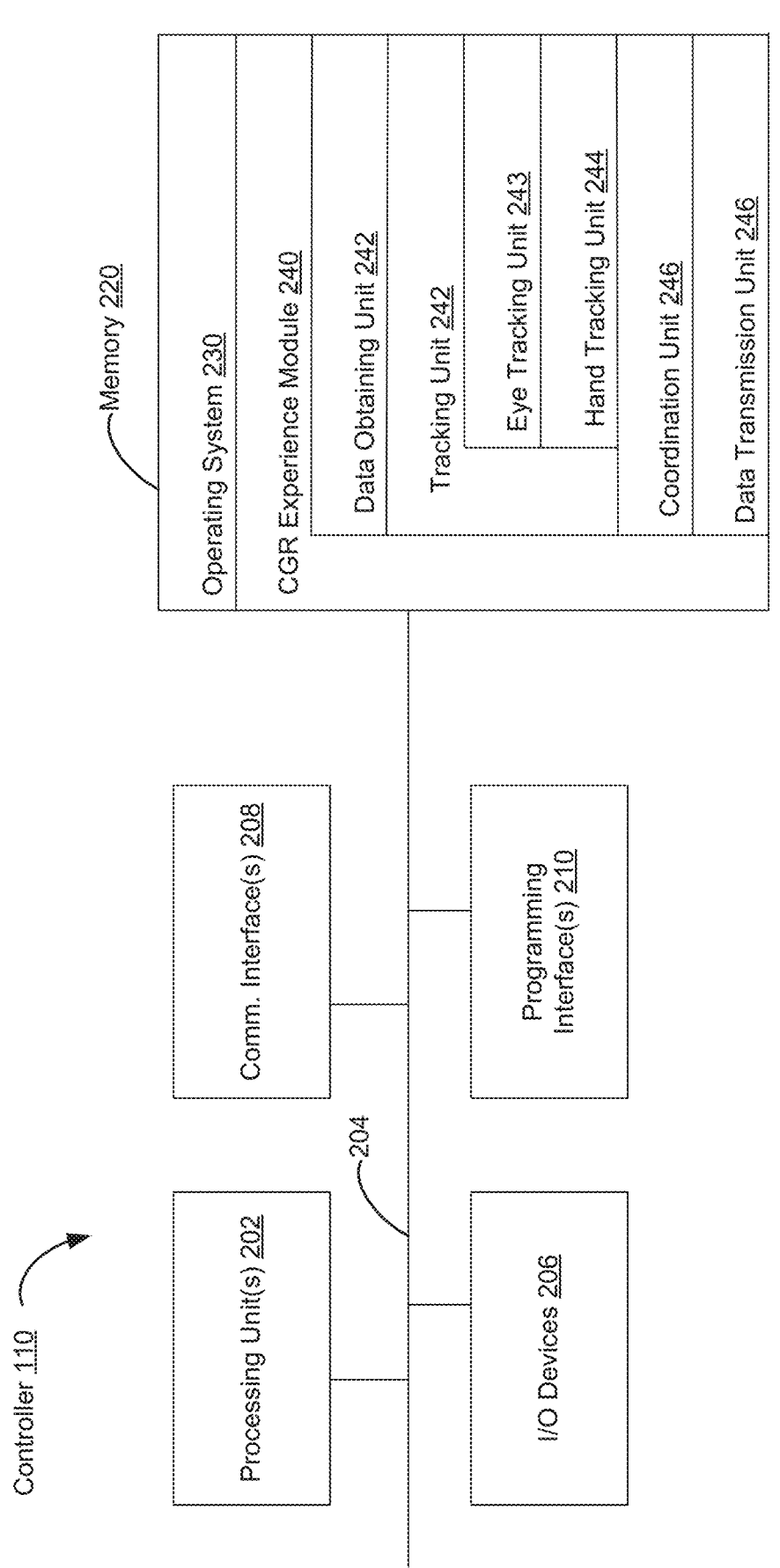
FIG. 2 is a block diagram illustrating a controller of a computer system that is configured to manage and coordinate an XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 245 and/or eye tracking unit 243. In some embodiments, the hand tracking unit 245 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 245 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 245), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 245), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
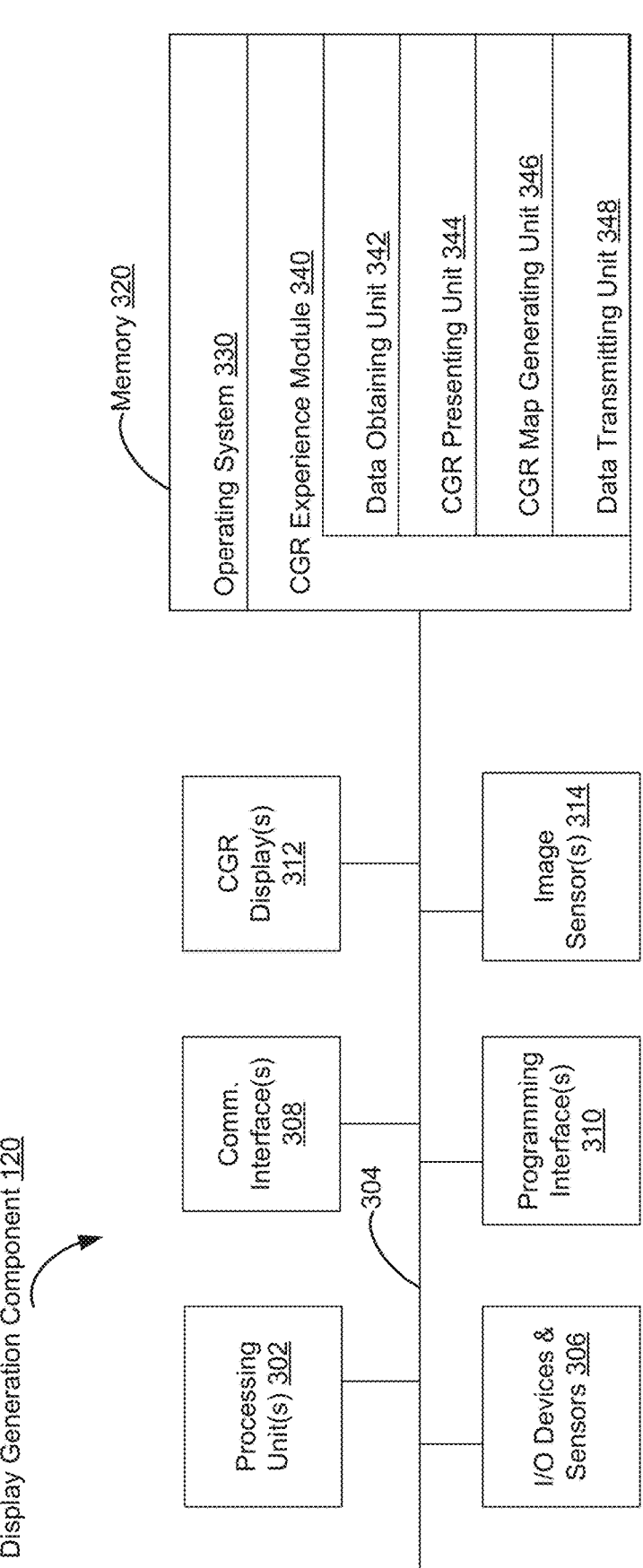
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transistor (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes an XR display for each eye of the user. In some embodiments, the one or more XR displays

312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and an XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, an XR presenting unit 344, an XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate an XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and meta-data therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR present-ing unit 344, the XR map generating unit 346, and the data transmitting unit 348 may be located in separate computing devices.

Moreover, FIG. 3 is intended more as a functional description of the various features that could be present in a particular implementation as opposed to a structural sche-matic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a par-ticular implementation.

FIG. 4 is a schematic, pictorial illustration of an example embodiment of the hand tracking device 140. In some embodiments, hand tracking device 140 (FIG. 1A) is con-trolled by hand tracking unit 245 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation com-ponent 120 (e.g., embedded in or attached to a head-mounted device). In some embodiments, the hand tracking device 140 is separate from the display generation compo-nent 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environment of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Applica-tion Program Interface (API) to an application running on the controller, which drives the display generation compo-nent 120 accordingly. For example, the user may interact with software running on the controller 110 by moving their hand 406 and/or changing their hand posture.

In some embodiments, the image sensors 404 project a pattern of spots onto a scene containing the hand 406 and capture an image of the projected pattern. In some embodi-ments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordi-nates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves their hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture is performed using a first hand of the user (e.g., a pinch input, a long pinch input, or a pinch and drag input), and, in conjunction with performing the pinch input using the first hand, a second pinch input is performed using the other hand (e.g., the second hand of the user's two hands). In some embodiments, movement between the user's two hands is performed (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
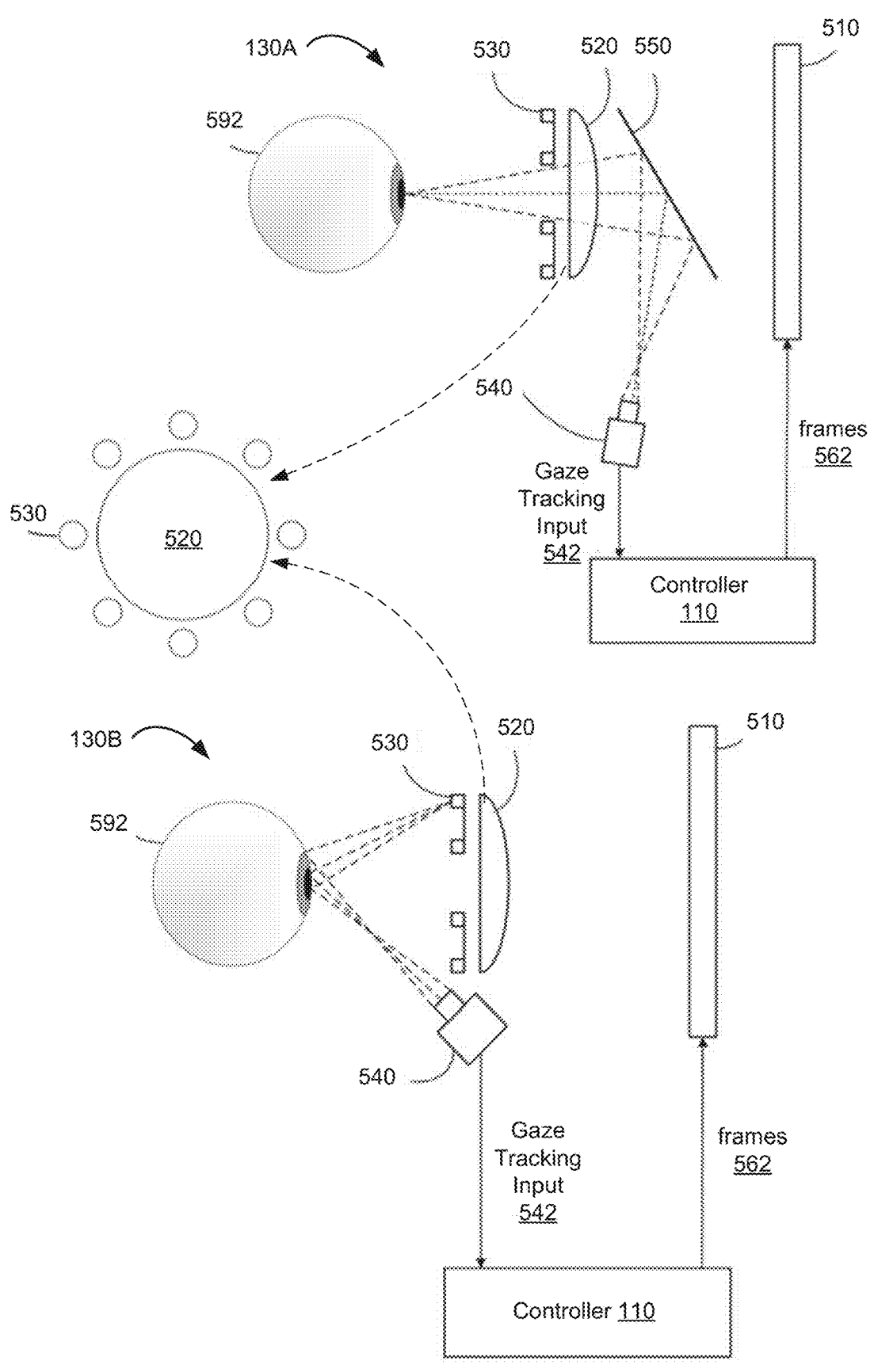
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or an XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
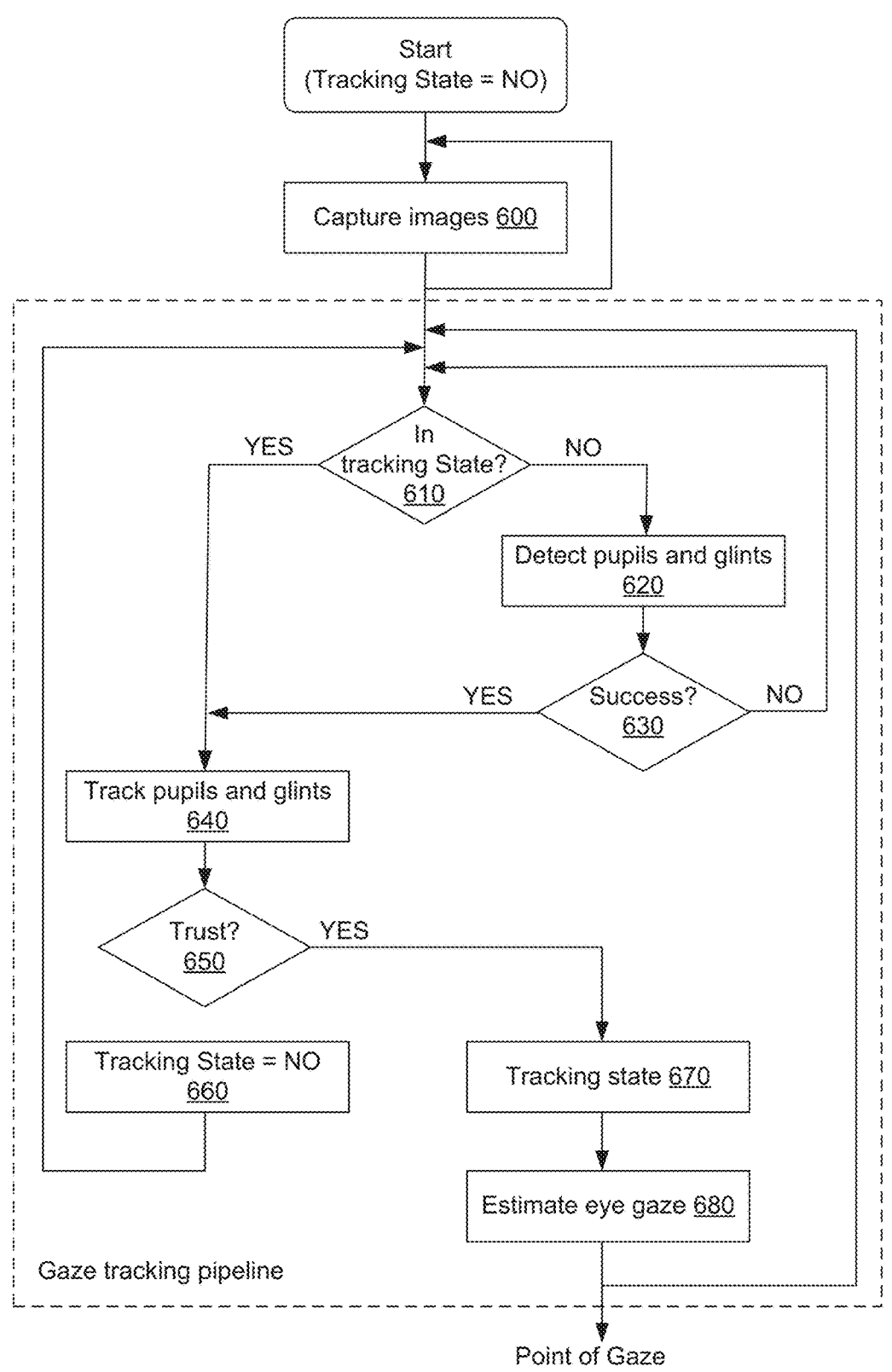
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real-world environment 602 are used to provide a XR experience to the user, for example, a mixed reality environment in which one or more virtual objects are superimposed over representations of real-world environment 602.

Thus, the description herein describes some embodiments of three-dimensional environments (e.g., XR environments) that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and one or more input devices.

FIGS. 7A-7I, 8A-8J, 9A-9O, 10A-10Q, 11A-11L, 18A-18G, 19A-19N, 20A-20X, 21A-21Y, 26A-26R, and 28A-28AI illustrate three-dimensional environments that are visible via a display generation component (e.g., display generation component 7100, display generation component 10100, or display generation component 120) of a computer system (e.g., computer system 101) and interactions that occur in the three-dimensional environments caused by user inputs directed to the three-dimensional environments and/or inputs received from other computer systems and/or sensors. In some embodiments, an input is directed to a virtual object within a three-dimensional environment by a user's gaze detected in the region occupied by the virtual object, or by a hand gesture performed at a location in the physical environment that corresponds to the region of the virtual object. In some embodiments, an input is directed to a virtual object within a three-dimensional environment by a hand gesture that is performed (e.g., optionally, at a location in the physical environment that is independent of the region of the virtual object in the three-dimensional environment) while the virtual object has input focus (e.g., while the virtual object has been selected by a concurrently and/or previously detected gaze input, selected by a concurrently or previously detected pointer input, and/or selected by a concurrently and/or previously detected gesture input). In some embodiments, an input is directed to a virtual object within a three-dimensional environment by an input device that has positioned a focus selector object (e.g., a pointer object or selector object) at the position of the virtual object. In some embodiments, an input is directed to a virtual object within a three-dimensional environment via other means (e.g., voice and/or control button). In some embodiments, an input is directed to a representation of a physical object or a virtual object that corresponds to a physical object by the user's hand movement (e.g., whole hand movement, whole hand movement in a respective posture, movement of one portion of the user's hand relative to another portion of the hand, and/or relative movement between two hands) and/or manipulation with respect to the physical object (e.g., touching, swiping, tapping, opening, moving toward, and/or moving relative to). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from sensors (e.g., image sensors, temperature sensors, biometric sensors, motion sensors, and/or proximity sensors) and contextual conditions (e.g., location, time, and/or presence of others in the environment). In some embodiments, the computer system displays some changes in the three-dimensional environment (e.g., displaying additional virtual content, ceasing to display existing virtual content, and/or transitioning between different levels of immersion with which visual content is being displayed) in accordance with inputs from other computers used by other users that are sharing the computer-generated environment with the user of the computer system (e.g., in a shared computer-generated experience, in a shared virtual environment, and/or in a shared virtual or augmented reality environment of a communication session). In some embodiments, the computer system displays some changes in the three-dimensional environment (e.g., displaying movement, deformation, and/or changes in visual characteristics of a user interface, a virtual surface, a user interface object, and/or virtual scenery) in accordance with inputs from sensors that detect movement of other persons and objects and movement of the user that may not qualify as a recognized gesture input for triggering an associated operation of the computer system.

In some embodiments, a three-dimensional environment that is visible via a display generation component described herein is a virtual three-dimensional environment that includes virtual objects and content at different virtual positions in the three-dimensional environment without a representation of the physical environment. In some embodiments, the three-dimensional environment is a mixed reality environment that displays virtual objects at different virtual positions in the three-dimensional environment that are constrained by one or more physical aspects of the physical environment (e.g., positions and orientations of walls, floors, surfaces, direction of gravity, time of day, and/or spatial relationships between physical objects). In some embodiments, the three-dimensional environment is an augmented reality environment that includes a representation of the physical environment. In some embodiments, the representation of the physical environment includes respective representations of physical objects and surfaces at different positions in the three-dimensional environment, such that the spatial relationships between the different physical objects and surfaces in the physical environment are reflected by the spatial relationships between the representations of the physical objects and surfaces in the three-dimensional environment. In some embodiments, when virtual objects are placed relative to the positions of the representations of physical objects and surfaces in the three-dimensional environment, they appear to have corresponding spatial relationships with the physical objects and surfaces in the physical environment. In some embodiments, the computer system transitions between displaying the different types of environments (e.g., transitions between presenting a computer-generated environment or experience with different levels of immersion, adjusting the relative prominence of audio/visual sensory inputs from the virtual content and from the representation of the physical environment) based on user inputs and/or contextual conditions.

In some embodiments, the display generation component includes a pass-through portion in which the representation of the physical environment is displayed or visible. In some embodiments, the pass-through portion of the display generation component is a transparent or semi-transparent (e.g., see-through) portion of the display generation component revealing at least a portion of a physical environment surrounding and within the field of view of a user (sometimes called "optical passthrough"). For example, the pass-through portion is a portion of a head-mounted display or heads-up display that is made semi-transparent (e.g., less than 50%, 40%, 30%, 20%, 15%, 10%, or 5% of opacity) or transparent, such that the user can see through it to view the real world surrounding the user without removing the head-mounted display or moving away from the heads-up display. In some embodiments, the pass-through portion gradually transitions from semi-transparent or transparent to fully opaque when displaying a virtual or mixed reality environment. In some embodiments, the pass-through portion of the display generation component displays a live feed of images or video of at least a portion of physical environment captured by one or more cameras (e.g., rear facing camera(s) of a mobile device or associated with a head-mounted display, or other cameras that feed image data to the computer system) (sometimes called "digital passthrough"). In some embodiments, the one or more cameras point at a portion of the physical environment that is directly in front of the user's eyes (e.g., behind the display generation component relative to the user of the display generation component). In some embodiments, the one or more cameras point at a portion of the physical environment that is not directly in front of the user's eyes (e.g., in a different physical environment, or to the side of or behind the user).

In some embodiments, when displaying virtual objects at positions that correspond to locations of one or more physical objects in the physical environment (e.g., at positions in a virtual reality environment, a mixed reality environment, or an augmented reality environment), at least some of the virtual objects are displayed in place of (e.g., replacing display of) a portion of the live view (e.g., a portion of the physical environment captured in the live view) of the cameras. In some embodiments, at least some of the virtual objects and content are projected onto physical surfaces or empty space in the physical environment and are visible through the pass-through portion of the display generation component (e.g., viewable as part of the camera view of the physical environment, or through the transparent or semi-transparent portion of the display generation component). In some embodiments, at least some of the virtual objects and virtual content are displayed to overlay a portion of the display and block the view of at least a portion of the physical environment visible through the transparent or semi-transparent portion of the display generation component.

In some embodiments, the display generation component displays different views of the three-dimensional environment in accordance with user inputs or movements that change the virtual position of the viewpoint of the currently displayed view of the three-dimensional environment relative to the three-dimensional environment. In some embodiments, when the three-dimensional environment is a virtual environment, the viewpoint moves in accordance with navigation or locomotion requests (e.g., in-air hand gestures, and/or gestures performed by movement of one portion of the hand relative to another portion of the hand) without requiring movement of the user's head, torso, and/or the display generation component in the physical environment. In some embodiments, movement of the user's head and/or torso, and/or the movement of the display generation component or other location sensing elements of the computer system (e.g., due to the user holding the display generation component or wearing the HMD), relative to the physical environment, cause corresponding movement of the viewpoint (e.g., with corresponding movement direction, movement distance, movement speed, and/or change in orientation) relative to the three-dimensional environment, resulting in corresponding change in the currently displayed view of the three-dimensional environment. In some embodiments, when a virtual object has a preset spatial relationship relative to the viewpoint (e.g., is anchored or fixed to the viewpoint), movement of the viewpoint relative to the three-dimensional environment would cause movement of the virtual object relative to the three-dimensional environment while the position of the virtual object in the field of view is maintained (e.g., the virtual object is said to be head locked). In some embodiments, a virtual object is body-locked to the user, and moves relative to the three-dimensional environment when the user moves as a whole in the physical environment (e.g., carrying or wearing the display generation component and/or other location sensing component of the computer system), but will not move in the three-dimensional environment in response to the user's head movement alone (e.g., the display generation component and/or other location sensing component of the computer system rotating around a fixed location of the user in the physical environment). In some embodiments, a virtual object is, optionally, locked to another portion of the user, such as a user's hand or a user's wrist, and moves in the three-dimensional environment in accordance with movement of the portion of the user in the physical environment, to maintain a preset spatial relationship between the position of the virtual object and the virtual position of the portion of the user in the three-dimensional environment. In some embodiments, a virtual object is locked to a preset portion of a field of view provided by the display generation component, and moves in the three-dimensional environment in accordance with the movement of the field of view, irrespective of movement of the user that does not cause a change of the field of view.

In some embodiments, as shown in 7A-7I, 8A-8J, 9A-9O, 10A-10Q, 11A-11L, 18A-18G, 19A-19N, 20A-20X, 21A-21Y, 26A-26R, and 28A-28AI, the views of a three-dimensional environment sometimes do not include representation(s) of a user's hand(s), arm(s), and/or wrist(s). In some embodiments, the representation(s) of a user's hand(s), arm(s), and/or wrist(s) are included in the views of a three-dimensional environment. In some embodiments, the representation(s) of a user's hand(s), arm(s), and/or wrist(s) are included in the views of a three-dimensional environment as part of the representation of the physical environment provided via the display generation component. In some embodiments, the representations are not part of the representation of the physical environment and are separately captured (e.g., by one or more cameras pointing toward the user's hand(s), arm(s), and wrist(s)) and displayed in the three-dimensional environment independent of the currently displayed view of the three-dimensional environment. In some embodiments, the representation(s) include camera images as captured by one or more cameras of the computer system(s), or stylized versions of the arm(s), wrist(s) and/or hand(s) based on information captured by various sensors). In some embodiments, the representation(s) replace display of, are overlaid on, or block the view of, a portion of the representation of the physical environment. In some embodiments, when the display generation component does not provide a view of a physical environment, and provides a completely virtual environment (e.g., no camera view and no transparent pass-through portion), real-time visual representations (e.g., stylized representations or segmented camera images) of one or both arms, wrists, and/or hands of the user are, optionally, still displayed in the virtual environment. In some embodiments, if a representation of the user's hand is not provided in the view of the three-dimensional environment, the position that corresponds to the user's hand is optionally indicated in the three-dimensional environment, e.g., by the changing appearance of the virtual content (e.g., through a change in translucency and/or simulated reflective index) at positions in the three-dimensional environment that correspond to the location of the user's hand in the physical environment. In some embodiments, the representation of the user's hand or wrist is outside of the currently displayed view of the three-dimensional environment while the virtual position in the three-dimensional environment that corresponds to the location of the user's hand or wrist is outside of the current field of view provided via the display generation component; and the representation of the user's hand or wrist is made visible in the view of the three-dimensional environment in response to the virtual position that corresponds to the location of the user's hand or wrist being moved within the current field of view due to movement of the display generation component, the user's hand or wrist, the user's head, and/or the user as a whole.

In some embodiments, hand or object movements are described as being substantially parallel or substantially perpendicular to a virtual surface (regardless of whether the virtual surface is displayed or is not visible). Movement that is described as substantially parallel to a virtual surface corresponds to movement within a predetermined threshold angle (e.g., 1 degree, 2 degrees, 3 degrees, 5 degrees, 10 degrees, an angle that is less than 45 degrees, or another threshold angle) of the virtual surface. Movement that is described as substantially perpendicular to the virtual surface corresponds to movement that is within a predetermined threshold angle (e.g., 90 degrees, 89 degrees, 88 degrees, 85 degrees, 80 degrees, an angle that is more than 45 degrees and less than 135 degrees, 91 degrees, 92 degrees, 93 degrees, 95 degrees, 100 degrees, 105 degrees, or another threshold angle) of the virtual surface. In some embodiments, the virtual surface faces toward a viewpoint of a user.

In some embodiments, objects are described as if connected to one another with a rubberband or as if connected to a surface with a rubberband. Movement of an object that is connected with a rubberband (to a surface or another object) refers to generating a simulated physical or pseudo-physical reaction where an object will initially resist movement when an input is being applied and when the input ends the object snaps back with a speed that initially increases after the end of the input and then gradually decreases over time as the object returns to a target position such as an initial position.

FIGS. 7A-7I illustrate examples of scrolling representations displayed in a home menu user interface. FIG. 12 is a flow diagram of an exemplary method 12000 for scrolling representations displayed in a home menu user interface. The user interfaces in FIGS. 7A-7I are used to illustrate the processes described below, including the processes in FIG. 12.

Figure 7A:
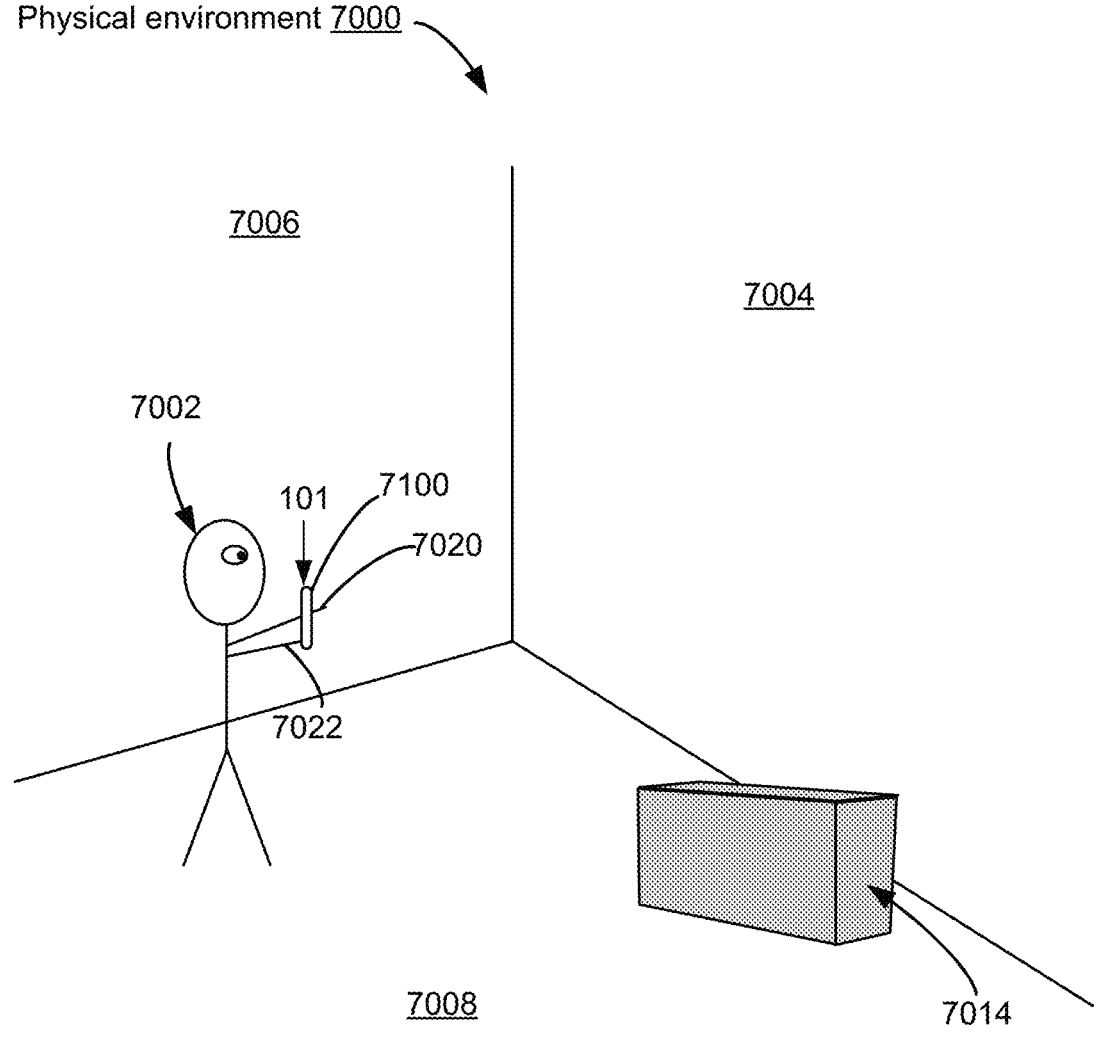

FIG. 7A illustrates an example physical environment 7000 that includes user 7002 interacting with computer system 101. As shown in the examples in FIGS. 7B-7I, display generation component 7100 of computer system 101 is a touchscreen held by user 7002. In some embodiments, display generation component 7100 of computer system 101 is a head-mounted display (e.g., head mounted display 7100a) worn on user 7002's head (e.g., what is shown in FIGS. 7B-7I as being visible via display generation component 7100 of computer system 101 corresponds to user 7002's field of view when wearing a head-mounted display). In some embodiments, display generation component 7100 is a standalone display, a projector, or another type of display. In some embodiments, computer system 101 is in communication with one or more input devices, including cameras or other sensors and input devices that detect movement of user 7002's hand(s), movement of user 7002's body as whole, and/or movement of user 7002's head in the physical environment. In some embodiments, the one or more input devices detect the movement and the current postures, orientations, and positions of user 7002's hand(s), face, head, and/or body as a whole. For example, in some embodiments, while the user's hand 7020 is within the field of view of the one or more sensors of HMD 7100*a* (e.g., within the field of view of the user), a representation of the user's hand 7020' is displayed in the user interface displayed (e.g., as a passthrough representation and/or as a virtual representation of the user's hand 7020) on the display of HMD 7100*a*. In some embodiments, while the user's hand 7022 is within the field of view of the one or more sensors of HMD 7100*a* (e.g., within the field of view of the user), a representation of the user's hand 7022' is displayed in the user interface displayed (e.g., as a passthrough representation and/or as a virtual representation of the user's hand 7022) on the display of HMD 7100*a*. In some embodiments, the user's hand 7020 and/or the user's hand 7022 are used to perform one or more gestures (e.g., one or more air gestures), optionally in combination with a gaze input. In some embodiments, the one or more gestures performed with the user's hand(s) 7020 and/or 7022 include a direct air gesture input that is based on a position of the representation of the user's hand(s) 7020' and/or 7022' displayed within the user interface on the display of HMD 7100*a*. For example, a direct air gesture input is determined as being directed to a user interface object displayed at a position that intersects with the displayed position of the representation of the user's hand(s) 7020' and/or 7022' in the user interface. In some embodiments, the one or more gestures performed with the user's hand(s) 7020 and/or 7022 include an indirect air gesture input that is based on a virtual object displayed at a position that corresponds a position at which the user's attention is currently detected (e.g., and/or is optionally not based on a position of the representation of the user's hand(s) 7020' and/or 7022' displayed within the user interface). For example, an indirect air gesture is performed with respect to a user interface object while detecting the user's attention (e.g., based on gaze or other indication of user attention) on the user interface object, such as a gaze and pinch (e.g., or other gesture performed with the user's hand).

In some embodiments, user inputs are detected via a touch-sensitive surface or touchscreen. In some embodiments, the one or more input devices include an eye tracking component that detects location and movement of user 7002's gaze. In some embodiments, display generation component 7100, and optionally, the one or more input devices and computer system 101, are parts of a head-mounted device that moves and rotates with user 7002's head in the physical environment, and changes a viewpoint of user 7002 in XR three-dimensional environment 8003 (FIG. 7B) provided via display generation component 7100. In some embodiments, display generation component 7100 is a heads-up display that does not move or rotate with user 7002's head or user 7002's body as a whole, but, optionally, changes the viewpoint of the user in XR three-dimensional environment 8003 in accordance with the movement of user 7002's head or body relative to display generation component 7100. In some embodiments, display generation component 7100 (e.g., a touchscreen) is optionally moved and rotated by user 7002's hand relative to physical environment 7000 or relative to user 7002's head, and changes the viewpoint of user 7002 in XR three-dimensional environment 8003 in accordance with the movement of display generation component 7100 relative to user 7002's head or face or relative to the physical environment. Physical environment 7000 includes physical wall 7004, physical wall 7006, and floor 7008. Physical environment 7000 also includes a physical object 7014, e.g., a box. User 7002 is holding display generation component 7100 with hand 7020 or hand 7022, or both.

In some embodiments, one or more portions of the view of physical environment 7000 that is visible to user 7002 via display generation component 7100 are digital passthrough portions that include representations of corresponding portions of physical environment 7000 captured via one or more image sensors of computer system 101. In some embodiments, one or more portions of the view of physical environment 7000 that is visible to user 7002 via display generation component 7100 are optical passthrough portions, in that user 7002 can see one or more portions of physical environment 7000 through one or more transparent or semi-transparent portions of display generation component 7100.

In some embodiments, the display generation component 7100 comprises a head mounted display (HMD) 7100*a*. For example, as illustrated in FIG. 7C1 (e.g., and FIGS. 8F2, 9C2-9D2, 10B2-10C2, 10H2-10I2, 11G2-11H2, 18B2, 19B2, 20F1, and 21C2-21D2), the head mounted display 7100*a* includes one or more displays that displays a representation of a portion of the three-dimensional environment 7000' that corresponds to the perspective of the user, while an HMD typically includes multiple displays including a display for a right eye and a separate display for a left eye that display slightly different images to generate user interfaces with stereoscopic depth, in the figures a single image is shown that corresponds to the image for a single eye and depth information is indicated with other annotations or description of the figures. In some embodiments, HMD 7100*a* includes one or more sensors (e.g., one or more interior- and/or exterior-facing image sensors 314), such as sensor 7101*a*, sensor 7101*b* and/or sensor 7101*c* for detecting a state of the user, including facial and/or eye tracking of the user (e.g., using one or more inward-facing sensors 7101*a* and/or 7101*b*) and/or tracking hand, torso, or other movements of the user (e.g., using one or more outward-facing sensors 7101*c*). In some embodiments, HMD 7100*a* includes one or more input devices that are optionally located on a housing of HMD 7100*a*, such as one or more buttons, trackpads, touchscreens, scroll wheels, digital crowns that are rotatable and depressible or other input devices. In some embodiments input elements are mechanical input elements, in some embodiments input elements are solid state input elements that respond to press inputs based on detected pressure or intensity. For example, in FIG. 7C1 (e.g., and FIGS. 8F2, 9C2-9D2, 10B2-10C2, 10H2-10I2, 11G2-11H2, 18B2, 19B2, 20F1, and 21C2-21D2), HMD 7100*a* includes one or more of button 701*a*, button 701*b* and digital crown 703 for providing inputs to HMD 7100*a*. It will be understood that additional and/or alternative input devices may be included in HMD 7100*a*.

FIG. 7C3 (e.g., and FIGS. 8F3, 18B3, 19B3, and 20F2) illustrates a top-down view of the user 7002 in the physical environment 7000. For example, the user 7002 is wearing HMD 7100*a*, such that the user's hand(s) 7020 and/or 7022 (e.g., that are optionally used to provide air gestures or other user inputs) are physically present within the physical environment 7000 behind the display of HMD 7100*a*.

FIG. 7C2 (e.g., and FIGS. 7C3, 8F2-8F3, 9C2-9D2, 10B2-10C2, 10H2-10I2, 11G2-11H2, 18B2-18B3, 19B2-

19B3, 20F1-20F2, and 21C2-21D2) illustrates an alternative display generation component of the computer system than the display illustrated in FIGS. 7A-7C1, 7D-8F1, 8G-9D1, 9E-10C1, 10D-10I1, 10J-11H1, 11I-11L, 18A-18B1, 18C-19B1, 19C-20E, 20F3-21D1 and 21D3-21Y). It will be understood that the processes, features and functions described herein with reference to the display generation component 7100 described in FIGS. 7A-7C1, 7D-8F1, 8G-9D1, 9E-10C1, 10D-10I1, 10J-11H1, 11I-11L, 18A-18B1, 18C-19B1, 19C-20E, 20F3-21D1 and 21D3-21Y are also applicable to HMD 7100*a*, illustrated in FIGS. 7C2-7C3, 8F2-8F3, 9C2-9D2, 10B2-10C2, 10H2-10I2, 11G2-11H2, 18B2-18B3, 19B2-19B3, 20F1-20F2, and 21C2-21D2.

Figure 7B:
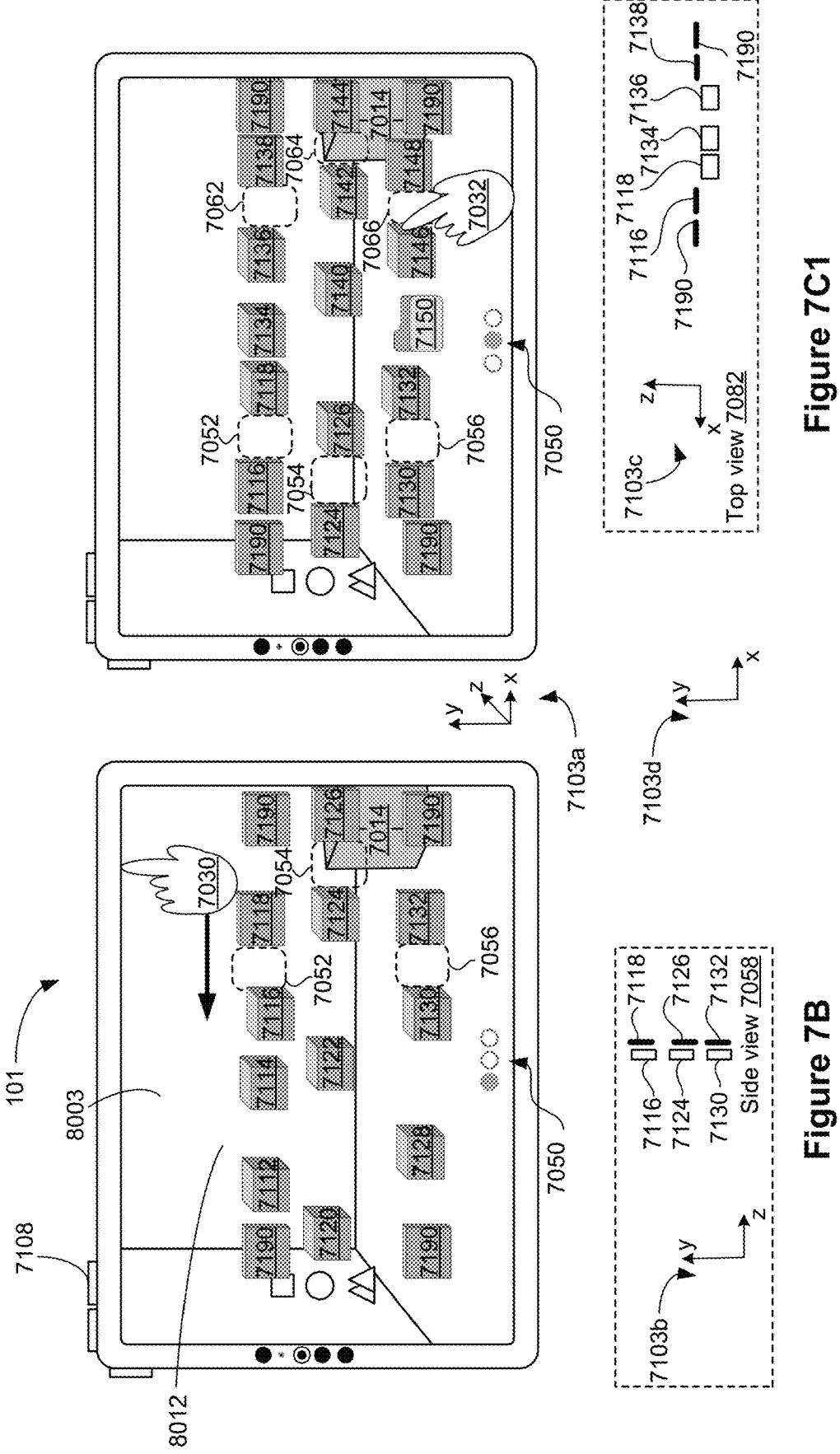

FIG. 7B shows home menu user interface 8012 displayed within XR three-dimensional environment 8003 in accordance with some embodiments. In FIG. 7B, environment 8003 without any visible boundaries and/or background user interface elements. In some embodiments, home menu user interface 8012 may be presented on a platter or a frame that provides a defined boundary for home menu user interface 8012 within XR three-dimensional environment 8003 that is visible to user 7002. Computer system 101 also displays a collection of representations 7112, 7114, 7116, 7118, 7120, 7122, 7124, 7126, 7128, 7130, 7132 (also collectively referred to herein as representations 7112-7132) and a number of (e.g., one or more) representations 7190 in home menu user interface 8012 in FIG. 7B. In some embodiments, the representations 7112-7132 and 7190 are arranged in a regular pattern (e.g., in a grid pattern, along a line, radially, circumferentially, and/or other patterns). In some embodiments, representations 7112-7132 and 7190 correspond to various software applications that can be executed on computer system 101 (e.g., an email application, a web browser, a messaging application, a maps application, a video player, or an audio player, or other software application). For example, user input (e.g., a pinch input, a tap input, a gaze input, and/or other input) directed to a representation (e.g., one of representations 7112-7132) in home menu user interface 8012 launches a software application associated with the representation. In some embodiments, the sizes of representations 7112-7132 and 7190 are the same (e.g., each having a size that is within a threshold variation such as ±1-5% of a respective size such as an average size of the representations).

In some embodiments, an arrangement for a collection of representations spans more than a single page. For example, a total lateral dimension of the arrangement of representations of a single collection (e.g., a collection of representations of applications, a collection of representations of people with whom user 7002 can initiate or maintain a communication session, or a collection of virtual environments) across multiple rows (e.g., three rows) exceeds a field of view of user 7002 that is visible via display generation component 7100. In another example, the number of representations in a collection of representations exceeds the number of representations that make up or fit on a single page of the arrangement. In such cases, the collection of representations is divided into two or more pages, and the arrangement of representations is displayed page-by-page to user 7002. In some embodiments, while the one or more representations that are associated with a respective page are displayed, one or more representations of one or more adjoining pages are also displayed (e.g., one or more representations that are associated with a prior page such as the previous page, and/or one or more representations that are associated with a subsequent page such as the next page). In some embodiments, computer system 101 displays pagination indicator 7050 to indicate that related content exists across multiple pages. In FIG. 7B, pagination indicator 7050 includes three dots indicating that there are three total pages of representations for the currently displayed collection of representations, and that the current page displayed is the first page of the three pages of representations (e.g., the first circle of pagination indicator 7050 is shaded while the second and third circles are unshaded, and/or another visual characteristic of the first element of pagination indicator 7050 is different from other elements of pagination indicator 7050). Although pagination indicator 7050 is displayed at a bottom portion of home menu user interface 8012 in FIG. 7B, pagination indicator 7050 may instead be positioned at a different portion (e.g., a top portion, or an edge portion) of home menu user interface 8012.

FIG. 7B shows four representations 7190 presented at four locations (e.g., four corners, and/or four peripheral positions) of home menu user interface 8012. In some embodiments, one or more representations 7190 are not displayed. In some embodiments, one or more representations 7190 do not move in response to user input 7030 (e.g., an air pinch and drag input, a swipe input, a gaze input, and/or other scrolling input) that scrolls representations displayed in home menu user interface 8012. For example, in some embodiments, none of the representations 7190 is displayed, and all displayed representations (e.g., representations 7112-7132, and/or other representations) respond (e.g., move, and/or change in one or more visual characteristics) to user input 7030 (e.g., a hand gesture, a gaze input, and/or other input) that scrolls representations displayed in home menu user interface 8012. For example, user input 7030 is a hand gesture that includes movement of user 7002's hand (e.g., a swipe input, and/or another type of movement input with a portion of user 7002's hand), such as a hand gesture that moves user 7002's hand from a first position relative to computer system 101 to a second position relative to computer system 101, different from the first position relative to computer system 101 (e.g., moving from a right hand side of computer system 101 to a left hand side of computer system 101, moving from a left hand side of computer system 101 to a right hand side of computer system 101, and/or moving from a top edge of computer system 101 to a bottom edge of computer system 101). In embodiments where display generation component 7100 of computer system 101 is a head-mounted display, representations 7190, representation 7126, and representation 7120 would be displayed in a peripheral region of a field of view of user 7002's eyes while looking at XR three-dimensional environment 8003 via display generation component 7100.

Within a particular page displayed to user 7002, representations 7112-7132 and optionally representations 7190 are arranged in a number of (e.g., one or more) rows. For example, three rows of representations are displayed in FIG. 7B. In some embodiments, a size of a space between adjacent representations displayed within a particular row is not the same for different pairs of adjacent representations (e.g., is not the same for every pair of adjacent representations, and/or is not the same for every pair of adjacent representations in a respective row). For example, in FIG. 7B, there is a wider gap along a lateral direction (e.g., an x-direction, as illustrated in coordinate diagrams 7103*a*, 7103*c*, and 7103*d*, which are representations of the coordinate system of XR three-dimensional environment 8003 in a perspective view that includes a simulated depth dimension visible via the display generation component 7100, a top sectional view, and a front view of home menu user interface 8012, respectively) between representation 7112 and representation 7114 than between representation 7114 and representation 7116. In some embodiments, a size of a space between adjacent representations in a particular row is substantially consistent for multiple pairs of adjacent representations (e.g., within a threshold variation such as ±1-5% of a respective spacing such as an average spacing between representations for a particular row). In some embodiments in which one or more representations from one or more adjoining (e.g., subsequent and/or prior) pages are also displayed, an additional spacing is provided between a last representation in particular row and a first representation of that particular row in the adjoining (e.g., subsequent, and/or prior) page. For example, even though FIG. 7B shows varying sizes of spaces between adjacent representations in the first row, a spacing 7052 separates representation 7116 (e.g., a rightmost representation in the first row of representations on a respective page of the arrangement such as a first page of the arrangement, and/or a rightmost representation in another row of representations) and representation 7118 (e.g., a leftmost representation in the first row of representations on an adjacent page of the arrangement such as a second page of the arrangement, and/or a leftmost representation in another row of representations). Similarly, a spacing 7054 separates representation 7124 (e.g., a rightmost representation in the second row of representations on the first page of the arrangement, and/or a rightmost representation in another row of representations) and representation 7126 (e.g., a leftmost representation in the second row of representations on the second page of the arrangement, and/or a leftmost representation in another row of representations). A spacing 7056 also separates representation 7130 on the first page from representation 7132 on the second page. Spacings 7052, 7054, and 7056 are in some embodiments larger than spacings between adjacent icons of the first page (e.g., adjacent representations of representations 7112, 7114, and 7116; or of representations 7122 and 7124; or of representations 7128 and 7130).

FIG. 7B illustrates that some representations, such as representations 7116, 7124 and 7130, have a more three-dimensional appearance (e.g., having a greater depth in a simulated depth dimension, such as extending along the z-direction (e.g., sometimes referred to as a depth dimension, as described in greater detail above) of coordinate diagram 7103*d* corresponding to the front view of home menu user interface 8012 as visible via computer system 101 in FIGS. 7B and 7C) and are more visually prominent (e.g., brighter, sharper, and/or more opaque) than one or more other displayed representations. For example, representations 7118, 7126, and 7132 are flatter and do not extend as far in the simulated depth dimension. Side view 7058, which illustrates a view of home menu user interface 8012 from the right side such that the coordinate system of XR three-dimensional environment 8003 is oriented as shown in coordinate diagram 7103*b* (e.g., the z-axis extending to the right and the x-axis extending out of the page), also illustrates that representations 7116, 7124, and 7130 extend further in the depth dimension than representations 7118, 7126, and 7132. In some embodiments, as shown in side view 7058, representations 7118, 7126, and 7132 are also pushed back relative to a viewpoint of the user (e.g., representations 7118, 7126, and 7132 are further from the viewpoint of the user along the depth dimension than representations 7116, 7124, and 7130, and/or be at a larger radial distance from the viewpoint of the user), the viewpoint of the user being located to the left of representations 7116, 7118, 7124, 7126, 7130, and 7132 in side view 7058.

In some embodiments, the arrangements of representations within a particular row may vary in position along a height dimension. For example, side view 7058 shows representation 7118 being positioned slightly higher (e.g., along the y-direction) as compared to representation 7116 in XR three-dimensional environment 8003, even though both representations are in the same row (e.g., the first row, or another row). In contrast, representation 7126 is positioned slightly lower (e.g., along the y-direction) in XR three-dimensional environment 8003 as compared to representation 7122, even though both representations are in the same (e.g., second, first, or third) row. In some embodiments, a second row (e.g., a middle row) has a wider extent (e.g., along the x-direction) compared to other rows (e.g., the first (or top) row and/or the third (or bottom) row). For example, a position of representation 7124 from the second row extends further out along the x direction (e.g., towards the right edge of home menu user interface 8012) as compared to representation 7116 and representation 7130. In addition, a position of representation 7120 from the second row extends further out along the x direction (e.g., towards the left edge of home menu user interface 8012) as compared to representation 7112 and representation 7128. A lateral extent of a particular row may be determined by a lateral separation (e.g., along the x-direction) between the position of the representation on the leftmost edge of the row and the position of the representation on the rightmost edge of the row. The second row thus has a wider extent than that of the other rows due to the positions of representation 7120 and representation 7124 being further apart than the position of representation 7112 is from the position of representation 7116, and further apart than the position of representation 7128 is from the position of representation 7130.

FIG. 7B also illustrates user input 7030 (e.g., an air swipe gesture, a swiping hand gesture input, or another input that includes a movement of user 7002's hand along a first direction depicted by the arrow next to user input 7030 in FIG. 7B, from right to left). In response to detecting user input 7030, computer system 101 displays an adjoining page (e.g., a subsequent page) of the representations as shown in FIG. 7C (e.g., FIGS. 7C1, 7C2 and 7C3, where a user interface analogous to the user interface shown in FIG. 7C1 is displayed on HMD 7100*a* in FIG. 7C2). The home menu user interface 8012 in FIG. 7C includes a collection of representations 7118, 7134, 7136, 7126, 7140, 7142, 7132, 7146 (also collectively referred to herein as representations 7118-7146) and a number of (e.g., one or more) representations 7190.

In FIGS. 7C, pagination indicator 7050 shows that computer system 101 is displaying a second page of representations (e.g., the second circle of pagination indicator 7050 is shaded while the first circle is now unshaded like the third circle). The second page of representations includes representations 7118, 7134, 7136, 7126, 7140, 7142, 7132, 7146 (also collectively referred to herein as representations 7118-7146) and a number of (e.g., one or more) representations 7190, and a folder 7150. Similar to representations on the first page of representations, in some embodiments, representations 7118-7146 are arranged in a regular pattern (e.g., in a grid pattern, along a line, radially, circumferentially, and/or other patterns) and correspond to various software applications that can be executed on computer system 101. Representation 7116, which was the rightmost representation of the first row displayed on the first page is now positioned at an edge (e.g., a left edge) of home menu user interface 8012, and has a deemphasized visual appearance while the second page of representations is displayed as in FIG. 7C relative to the visual appearance of representation 7116 while the first page of representations is displayed as in FIG. 7B. For example, representation 7116 in FIG. 7C is flattened along the simulated depth dimension, relative to representation 7116 in FIG. 7B and relative to representation 7118 of the second page of representations. In some embodiments, spacing 7052 is maintained between representation 7116 and representation 7118. In some embodiments, a size of spacing 7052 while the second page of representations is displayed may differ (e.g., become larger or smaller) from the size of spacing 7052 while the first page of representations is displayed. Spacings 7054 and 7056 may have similar characteristics as spacing 7052 (e.g., remaining at the same size if spacing 7052 stays constant in size, or increasing or decreasing in size with a corresponding increase or decrease in the size of spacing 7052).

Representation 7124, which extended furthest out toward one edge (e.g., the right edge, or a different edge) of home menu user interface 8012 compared to representations 7116 and 7130 during display of the first page of representations as shown in FIG. 7B, now extends furthest out towards an opposite edge (e.g., the left edge, or a different edge) of home menu user interface 8012 during display of the second page of representations as shown in FIG. 7C. One or more visual characteristics of representation 7124 are also deemphasized in FIG. 7C with respect to FIG. 7B, as described above for representation 7116 (e.g., representation 7124 becomes flattened in FIG. 7C as compared to representation 7124 shown in FIG. 7B). In some embodiments, the same visual deemphasis is applied to representations 7116, 7124, and 7130, to provide visual feedback to user 7002 that these representations are representations from respective rows of a preceding page of representations, such as to indicate that these representations are no longer interactable elements on the current page (e.g., the second page, or another page) of representations but could be brought into an interactable state by further user input (e.g., to reverse the page transition performed in response to user input 7030, such as by an air swipe gesture, a swiping hand gesture that includes movement toward a right hand portion of home menu user interface 8012, and/or a swiping air gesture or hand gesture in a different direction from that of user input 7030).

Pagination indicator 7050 indicates the presence of a third page of representations in the current collection of representations. In addition, while the second page of representations is displayed, spacing 7062 separates representation 7136 (e.g., a rightmost representation in the first row of the second page of representations) from representation 7138 (e.g., a leftmost representation in the first row of the third page of representations). To the right of respective spaces 7062, 7064, and 7066 are previews of representations 7138, 7144, and 7148 at the leftmost edges of the first, second, and third rows of representations, respectively, in the third page of representations. Representations 7138, 7144, and 7148 are visually deemphasized relative to representations 7136, 7142, and 7146 of the second page of representations, for example, to provide visual feedback to user 7002 that representations 7138, 7144, and 7148 are representations from respective rows of an adjacent (e.g., subsequent, or prior) page of representations and are not yet interactable elements on the current page (e.g., second page, or a different page) of representations, but could be brought into an interactable state by further user input (e.g., to transition to the next page of representations, such as by a swiping hand gesture that includes movement to the left of the home menu user interface 8012, and/or a swiping hand gesture in a different direction). In some embodiments, the same visual deemphasis that is applied to representations 7116, 7124, and 7130 in FIG. 7C is applied to representations 7138, 7144, and 7148 in FIG. 7C. In some embodiments, a different visual deemphasis (e.g., higher or lower transparency, higher or lower translucency, lower or higher intensity, lower or higher in contrast, more or less blurry, and/or more or less dimmed) is applied to representations 7116, 7124, and 7130, as compared to representations 7138, 7144, and 7148, to visually distinguish a preceding page of representations from the current page of representations in a different manner than the manner in which a subsequent page of representations is visually distinguished from the current page of representations. In some embodiments, instead of three rows of representations, home menu user interface 8012 may include two or four or more rows of representations.

Similar to the first page, the second row of representations in the second page of representations has the widest lateral extent compared to the top and bottom rows. For example, representation 7142 is furthest out towards a right edge of home menu user interface 8012 compared to representations 7136 and 7146, while representation 7126 is furthest out towards a left edge of home menu user interface 8012 compared to representations 7118 and 7132. In some embodiments, representations across all rows (e.g., three rows) in a particular page of representations are displayed in a plane (x-y plane) at a particular simulated depth position (e.g., a z location). Alternatively, representations across all rows (e.g., three rows) in a particular page of representations are displayed on a spherical surface representing a consistent radial distance from the viewpoint of user 7002. Due to the wider lateral extent of the middle row (e.g., second row) of representations, the representations (e.g., icons) in the second row move faster than representations in the first row or third row while being scrolled into or out of focus. For example, as the first page of representations is scrolled away (e.g., out of focus and/or at least partially out of view) and the second page of representations is scrolled in (e.g., into focus and/or fully into view), representation 7124 moves from the rightmost position in comparison to representations 7116 and 7130 as shown in FIG. 7B, to the leftmost position in comparison to representations 7116 and 7130 as shown in FIGS. 7C, thereby moving through the greatest distance along the x-direction, compared to the distance through which representations 7116 and 7130 move. Due to the higher speed at which representation 7124 must move during scrolling and the greater distance that representation 7124 traverses, a spatial relationship between representation 7124 and representation 7116 changes as a result of the scrolling operation. For example, instead of representation 7124 being positioned to the right of representation 7116, as shown in FIG. 7B, representation 7124 is positioned to the left of representation 7116, as shown in FIGS. 7C, after the scrolling operation. The spatial relationship between representation 7124 and representation 7130 changes in a similar manner. In some embodiments, visually deemphasized representations at the edges of the arrangement (e.g., representations 7116, 7124, 7130, 7138, 7144, 7148 and 7190 in FIG. 7C) are pushed back in the simulated depth dimension (e.g., z direction, and/or at a larger radial distance from the viewpoint of the user) as shown in top view 7082 of FIGS. 7C, which has a coordinate diagram 7103c in the coordinate system of XR three-dimensional environment 8003 that includes the x-axis extending to the left, while the z-axis extends upward, away from a viewpoint of the user (e.g., a viewpoint of the user is positioned below the representations, in top view 7082). In contrast, representations 7118, 7134, 7136, 7126, 7140, 7142, 7132, and 7146 are positioned along the simulated depth dimension at a location that is closer to a viewpoint of the user.

Figures 7D, 7E:
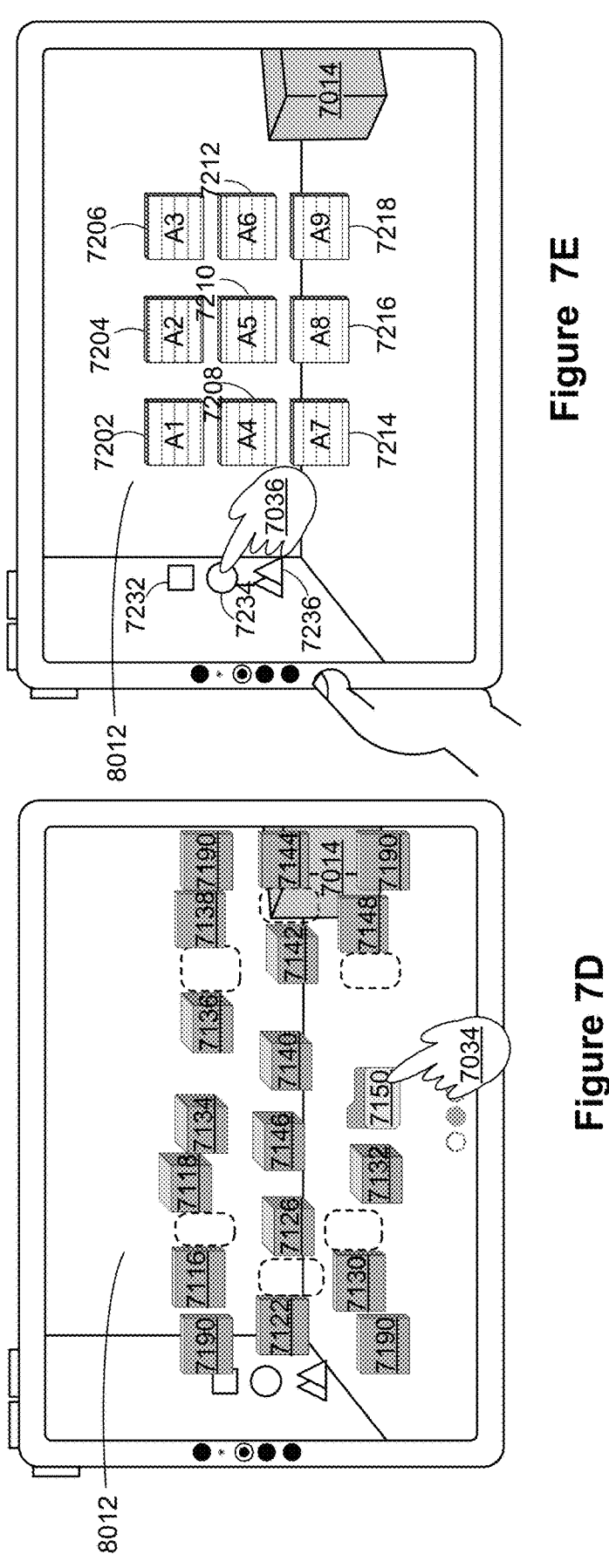

A position (e.g., along one or more of x, y, or z directions) of a representation in home menu user interface 8012 can be changed based on user input. In FIGS. 7C, a repositioning input such as user input 7032 (e.g., an air pinch and drag input, an air touch and drag, a drag or swipe input, a gaze input, and/or other movement input) (e.g., an air gesture 7032' in FIG. 7C2) is directed to representation 7146 located at a first position in a third row of the arrangement of representations. In FIG. 7D, in response to detecting movement of the repositioning input (e.g., from a location in the third row to a location in the second row), computer system 101 displays representation 7146 as having been moved to the second row of the arrangement of representations (e.g., between representations 7126 and 7140, or to a different location based on a termination position that corresponds to the repositioning input) from the prior location in the third row of the arrangement.

In contrast to representations that can be freely moved between locations on home menu user interface 8012, representations of applications that operate in a compatibility mode on computer system 101 are stored in a distinct folder, such as folder 7150, in the home menu user interface 8012, as shown in FIG. 7D. Applications that operate in a compatibility mode include binary compatible applications that are not optimized for XR three-dimensional environment 8003. In some embodiments, representations (e.g., icons) of applications that operate in a compatibility mode are automatically added to folder 7150 upon installation of the corresponding respective applications on computer system 101.

FIG. 7D illustrates that computer system 101 detects a selection input (e.g., user input 7034, or another user input (e.g., an air pinch input, an air tap input, a pinch input, a tap input, a gaze input, and/or other input)) directed to folder 7150. In response to detecting the selection input (e.g., user input 7034, or another user input (e.g., an air pinch input, an air tap input, a pinch input, a tap input, a gaze input, and/or other input)) directed to folder 7150, computer system 101 displays contents stored within folder 7150, as shown in FIG. 7E. Representations 7202, 7204, 7206, 7208, 7210, 7212, 7214, 7216, and 7218 (also collectively referred to herein as representations 7202-7218) correspond to binary compatible applications A1, A2, A3, A4, A5, A6, A7, A8 and A9, respectively. In some embodiments, representations 7202-7218 that populate folder 7150 cannot be repositioned within folder 7150 (e.g., representation 7128 of binary compatible application A9 located in the bottom row cannot be repositioned to another location within folder 7150) or moved outside of folder 7150. Other applications (e.g., applications that are optimized for XR three-dimensional environment 8003, such as those associated with representations 7112-7132) also cannot be added to or repositioned into folder 7150. Aggregating all the binary compatible applications in a separate folder automatically signals to user 7002 the nature of those applications, reducing the likelihood of user 7002 mistakenly deeming the application as malfunctioning in the XR three-dimensional environment 8003 because the binary compatible applications do not interact with user 7002 in a similar manner (e.g., by providing a more realistic three-dimensional or immersive experience to user 7002, or in another fashion that increases a sense of a simulated depth dimension) to applications that are optimized for the XR three-dimensional environment 8003. Furthermore, user 7002 may also have to access the binary compatible applications via one additional user input (e.g., having to first select folder 7150 before being able to select a representation of a binary compatible application within folder 7150), instead of directly accessing representations of optimized applications by directly navigating to a particular page of the collection of representations. In some embodiments, representations 7202, 7204, 7206, 7208, 7210, 7212, 7214, 7216, and 7218 are arranged in a geometric pattern (e.g., a regularly spaced grid arrangement, or an irregularly spaced grid-like arrangement) that is distinct from the offset pattern (e.g., with representation 7124 positioned further out to the right side of home menu user interface 8012 compared to representations 7116 and 7130, and representation 7120 positioned further out to the left side of home menu user interface 8012 compared to representations 7112 and 1728) shown in FIG. 7B, thereby providing a visual reminder to user 7002 that representations 7202-7218 are associated with applications that are not optimized for XR three-dimensional environment 8003. In some embodiments, representations of applications optimized for XR three-dimensional environment 8003 can also be placed in a user specified folder, and can be moved into and out of that user specified folder.

In addition to the collection of representations that corresponds to various software applications that can be executed on computer system 101, as shown in FIGS. 7B-7E, user 7002 is able to access other collections of representations via home menu user interface 8012. Home menu user interface 8012 includes tab 7234 for displaying representations of one or more other people with which user 7002 is able to initiate or maintain (e.g., continue) communication or otherwise interact with, or who are capable of interacting with user 7002, and tab 7306 for displaying one or more virtual environments that can be displayed as (or in) XR three-dimensional environment 8003, in addition to tab 7232 for displaying the representations of software applications. In some embodiments, the virtual environment includes virtual content that is computer generated content distinct from a passthrough portion of the physical environment. In some embodiments, additional tabs for displaying other representations are provided in home menu user interface 8012. In some embodiments, one or more of tab 7232, tab 7234, or tab 7236 are not presented in home menu user interface 8012. In FIG. 7E, tab 7232, tab 7234, and/or tab 7236 are arranged substantially linearly on a left portion of home menu user interface 8012. In some embodiments, tab 7232, tab 7234, and/or tab 7236 are displayed in other portions of the home menu user interface 8012 (e.g., top, right, bottom, or other portion(s)) In some embodiments, tab 7232, tab 7234, and/or tab 7236 are not arranged in any specific spatial relationship with respect to one another.

Figure 7G:
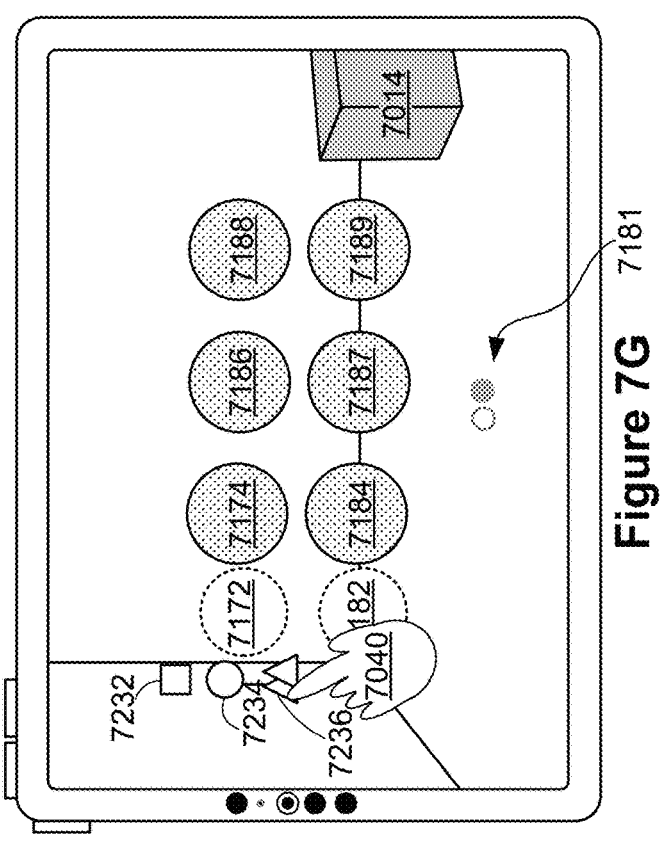
Figure 7F:
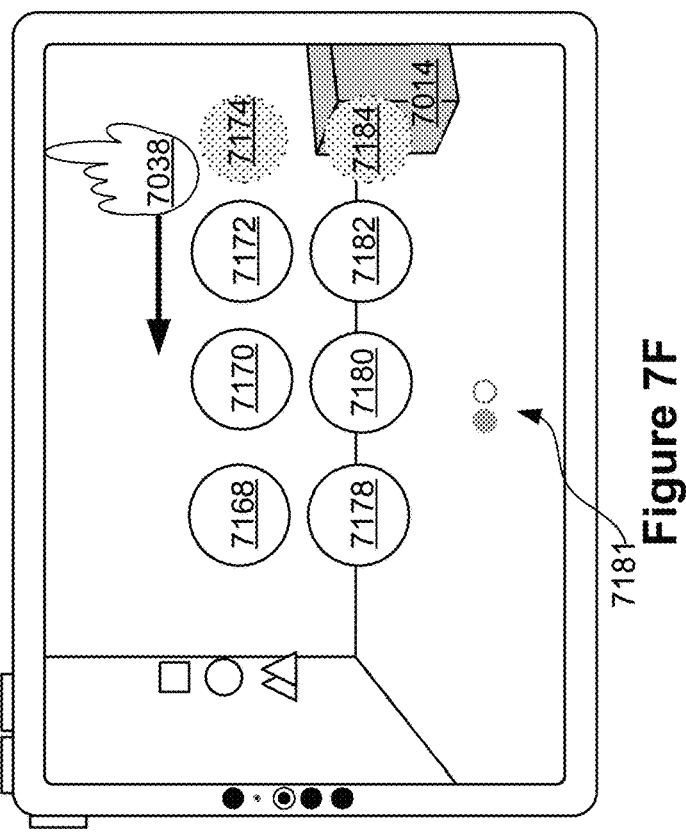

In response to detecting a user input (e.g., user input 7036 (e.g., an air pinch input, an air tap input, a pinch input, a tap input, a gaze input, and/or other input)) directed to (e.g., corresponding to, or on) tab 7234, computer system 101 updates home menu user interface 8012 to display a different collection of representations. For example, as shown in FIG. 7F, representations 7168, 7170, 7172, 7178, 7180, and 7182 (also referred to herein collectively as representations 7168-7182) of one or more other people are displayed, each representation activatable for initiating or maintaining communication with a corresponding person (e.g., representations of one or more other users interacting with, and/or capable of interacting with user 7002). For example, representation 7168 of a first user, representation 7170 of a second user, representation 7172 of a third user, representation 7178 of a fourth user, representation 7180 of a fifth user, and representation 7182 of a sixth user are shown. Indicator 7181 in FIG. 7F shows that there are two pages of representations for the displayed collection—the currently displayed first page, as indicated by the shaded first circle, and a next page, as indicated by the unshaded second circle.

In FIG. 7F, on a right edge of the home menu user interface 8012 is a visually deemphasized preview of a first representation 7174 in the first row of the second page of representations, and a visually deemphasized preview of a second representation 7184 in the second row of the second page of representations. In response to detecting user input 7038 (e.g., an air pinch input, an air tap input, a pinch input, a tap input, a gaze input, and/or other input) (FIG. 7F) for scrolling representations, computer system 101 displays a second page of representations that includes representations 7174, 7184, 7186, 7187, 7188, and 7189 (also referred to herein collectively as representations 7174-7189), as shown in FIG. 7G. Computer system 101 also displays, on an opposite edge to the right edge shown in FIG. 7F (e.g., a left edge), a visually deemphasized representation 7172 which is the last representation on the first row of the first page of representations, and a visually deemphasized representation 7182 which is the last representation on the second row of the first page of representations. Indicator 7181 is updated (e.g., such that the second circle is shaded, and the first circle is no longer shaded, and/or the second circle is visually distinguished in another manner from other elements in the indicator 7181) to indicate that the currently displayed representations are on a second page of the representations. Visually deemphasizing representations 7172 and 7182 provides visual feedback to user 7002 that the contacts associated with representations 7172 and 7182 are currently non-interactable but can be brought into focus (e.g., by a user input (e.g., an air pinch input, an air tap input, a pinch input, a tap input, a gaze input, and/or other input) directed to a right side of home menu user interface 8012 or by a rightward swipe on home menu user interface 8012, and/or by a user input that moves away from the right side of home menu user interface 8012 (e.g., an air pinch and drag input, an air drag input, a drag input, a click and drag input, a gaze input, and/or other input)). In contrast, the visual characteristics of representations 7174-7189 indicate that these representations are currently interactable for the user.

During the scrolling of representation 7172 and representation 7182 from the right edge of home menu user interface 8012 as shown in FIG. 7F to the left edge of home menu user interface 8012 as shown in FIG. 7G, a scrolling speed associated with the scrolling of representation 7172 is the same as a scrolling speed associated with the scrolling of representation 7182. In some embodiments, the scrolling speed associated with the scrolling of representation 7172 and the scrolling speed associated with the scrolling of representation 7182 are the same. As a result, a spatial relationship between representation 7172 and representation 7182 prior to the detection of user input 7038 (e.g., an air pinch and drag input, an air drag input, a drag input, a click and drag input, a gaze input, and/or other input)) (e.g., whereby representation 7172 is directly above representation 7182, along a y direction, while both are positioned near the right edge of home menu user interface 8012) is maintained during scrolling, and is the same after computer system 101 processes user input 7038 (e.g., in response to which representation 7172 remains directly above representation 7182, along the y direction, while both are positioned near the left edge of home menu user interface 8012).

Figures 7H, 7I:
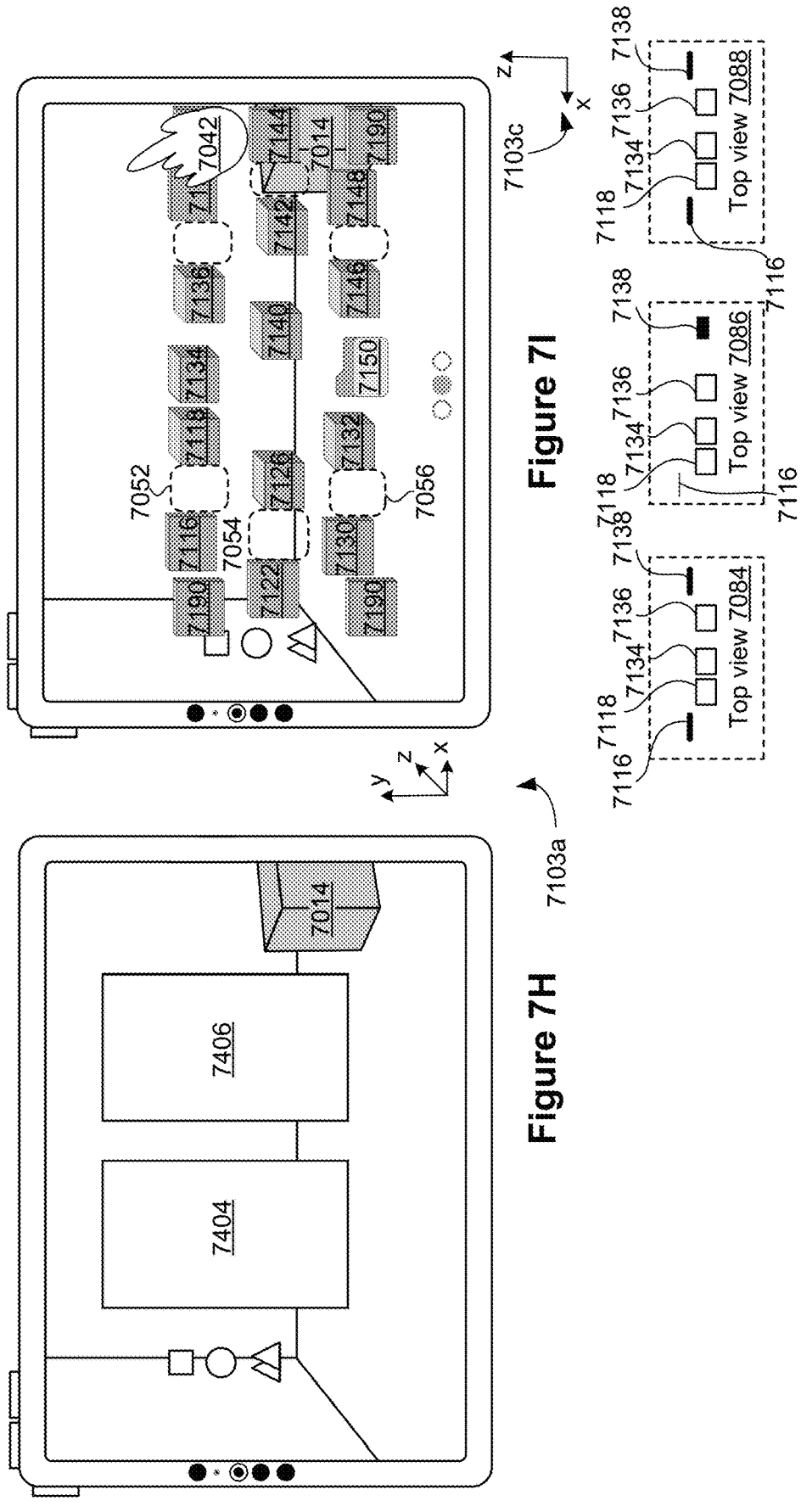

In response to detecting a selection input (e.g., user input 7040 of FIG. 7G (e.g., an air pinch input, an air tap input, a pinch input, a tap input, a gaze input, and/or other input)) directed to tab 7236, computer system 101 displays a different collection of representations 7404 and 7406, as shown in FIG. 7H. Representations 7404 and 7406 correspond to different virtual environments. Each virtual environment includes virtual content that is computer generated content distinct from a passthrough portion of the physical environment (e.g., a more spacious virtual environment is realistically simulated by obscuring or blocking out sensory inputs from the physical environment (e.g., blocking or replacing a view of a confined room, and/or removing (audio) echoes from a small physical space) to provide a virtual environment that is more conducive for user 7002 to interact within XR three-dimensional environment 8003. In some embodiments, the virtual environment includes virtual objects that are configured for user interaction. In some embodiments, the virtual environment includes virtual objects that are not configured for user interaction. In some embodiments, representations of more than two selectable virtual environments (e.g., one or more representations of virtual environments in addition to representations 7404 and 7406) are presented to user 7002. In some embodiments, in response to a user input (e.g., a pinch and drag input, a tap input, and/or a long press input, an air pinch and drag input, an air tap input, and/or a long air pinch input) directed to an edge of the user 7002's field of view, representations of additional selectable virtual environments are scrolled (e.g., by computer system 101) into the user 7002's field of view. For example, a pinch and drag input directed to a right edge of the virtual environment in user 7002's field of view optionally causes additional selectable virtual environments to enter into the user 7002's field of view, from the right. Similar to the scrolling of representations 7168-7182, representations 7404 and 7406 are scrolled at the same speed as each other. In some embodiments where representations of virtual environments are arranged on more than one row, the scrolling speeds for the representations of virtual environments are the same across the rows.

While FIGS. 7B-7G show how computer system 101 responds to a scrolling operation performed on home menu user interface 8012 to display an updated page of representations, FIG. 7I shows how computer system 101 responds to user input 7042 that does not meet criteria for completing a scrolling operation (e.g., to display an adjoining page of representations). The criteria include one or more of: a threshold amount of movement; a time-based criterion that requires the input to be maintained for at least a threshold amount of time, and/or a threshold amount of speed. User input 7042 (e.g., an air pinch and drag input, an air drag input, a drag input, a click and drag input, a gaze input, and/or other input)) includes a first portion of user input 7042 followed by a second portion of user input 7042.

Top view 7084 in FIG. 7I shows representations 7116, 7118, 7134, 7136 and 7138. For simplicity, representations 7190 are omitted in top views 7084, 7086, and 7088. In response to detecting the first portion of user input 7042 (e.g., the first portion of user input 7042 includes a first amount of movement towards the left, and/or other movement amounts along one or more different axes), representations 7116, 7118, 7134, 7136 and 7138 move laterally, in the same direction as a movement of the first portion of user input 7042 (e.g., move to the left, or move along one or more other directions). In addition, representation 7116 is visually deemphasized (e.g., because representation 7116 is being moved further out of focus in XR three-dimensional environment 8003, and/or because a characteristic of representation 7116 becomes less visually prominent). For example, representation 7116 becomes less visually prominent (e.g., more transparent, more translucent, displayed with lower intensity, lower in contrast, more blurred, and/or dimmer), as denoted by a thin line in top view 7086, compared with a thicker line in top view 7084. Optionally, visually deemphasizing representation 7116 may also include moving representation 7116 to a position further away from a viewpoint of the user (e.g., the viewpoint of the user is located below the representations shown in top views 7084, 7086, and 7088), for example, along a depth dimension, as shown in coordinate diagram 7103*a* in which the z-axis of the coordinate system of XR three-dimensional environment 8003 extends into the page from a front view of home menu user interface 8012, or as shown in coordinate diagram 7103*c* in the coordinate system of XR three-dimensional environment 8003 for the top view representation includes the z-axis extending upwards while the x-axis extends to the left. In contrast, representation 7138 increases in visual prominence (e.g., because representation 7138 is being moved further into focus in XR three-dimensional environment 8003, and/or because more user attention is directed at representation 7138). For example, representation 7138 becomes more opaque, sharper, displayed with higher intensity, higher in contrast, and/or brighter, as denoted by a black rectangle in top view 7086, compared with a thick line in top view 7084. Optionally, visually emphasizing representation 7138 may also include moving representation 7138 to a position closer to a viewpoint of the user (e.g., located below the representations shown in top views 7084, 7086, and 7088), for example, along the depth dimension (e.g., in an opposite direction than the movement of representation 7116 for visually deemphasizing representation 7116).

In response to detecting a second portion of user input 7042 that includes a termination or conclusion of user input 7042, and in accordance with a determination that the second portion of user input 7042 fails to satisfy the criteria for completing a scrolling operation (e.g., user input 7042 ends before meeting the criteria for completing a scrolling operation, and/or a different criterion for a different action having a higher priority than the scrolling operation is met by user input 7042), the changes shown in top view 7086 are at least partially reversed, and computer system 101 displays the representations as shown in top view 7088.

Thus, in accordance with the determination that the second portion of user input 7042 fails to satisfy the criteria for completing the scrolling operation, representation 7116 moves right (e.g., along x direction, or along another direction) so as to at least partially reverse the scrolling movement of representation 7116 shown between top view 7084 and top view 7086, and reverts to the visual characteristics (e.g., translucency, brightness, intensity, contrast, and/or sharpness) that were displayed for representation 7116 shown in top view 7084, so as to at least partially reverse the visual deemphasis of representation 7116 as representation 7116 was being scrolled further out of focus and/or out of view. Optionally, representation 7116 moves closer to a viewpoint of the user (e.g., along the z direction), back to the z-position shown in top view 7084. Similarly, representation 7138 also moves right (e.g., along x direction) so as to at least partially reverse the scrolling movement of representation 7138 shown between top view 7084 and top view 7086, and reverts to the visual characteristics (e.g., translucency, image brightness, intensity, contrast, and/or sharpness) that were displayed for representation 7138 shown in top view 7084, so as to at least partially reverse the visual emphasis of representation 7138 as representation 7138 was being scrolled more into focus and/or into view. Optionally, representation 7138 retreats from a viewpoint of the user (e.g., along the z direction), back to the z-position shown in top view 7084.

The changes and reversals of changes in the visual characteristics of the representations shown in top views 7084, 7086, and 7088 may be displayed continuously as an animation, such as a rubber-banding animation with respect to one or more of: location (e.g., translations along x and/or y directions, and/or rotations about an axis along a viewpoint of user 7002), simulated depth (e.g., translations along the depth dimension or radial direction), and/or visual emphasis/deemphasis. Reversals of changes in location (e.g., translation along x and/or y directions) may correspond to or simulate damped motion. For example, during scrolling, a displayed portion of the representations 7116, 7118, 7134, 7136, and 7138 may appear to bounce off of a boundary of home menu user interface 8012 when user input 7042 fails to meet the first criteria. The apparent bounce may correspond to a simulation of a viscous or elastic ball having momentum in a first direction striking an immovable and/or inelastic object, such as a wall. Alternatively or additionally, the motion of representations 7116, 7118, 7134, 7136, and 7138 while returning to their locations prior to the detection of the scrolling input 7042 may be damped, for example, by including a friction or dissipative term and/or by simulating the movement of a respective representation as a mass coupled with a spring. A parameter corresponding to the friction term may be adjustable, allowing representations 7116, 7118, 7134, 7136, and 7138 to reach equilibrium at the virtual boundary, or at a respective displacement from the virtual boundary.

Additional descriptions regarding FIGS. 7A-7I are provided below in reference to method 12000 described with respect to FIG. 12.

FIGS. 8A-8J illustrate examples of displaying a home menu user interface. FIG. 13 is a flow diagram of an exemplary method 13000 for displaying a home menu user interface. The user interfaces in FIGS. 8A-8J are used to illustrate the processes described below, including the processes in FIG. 13.

Figures 8A, 8B:
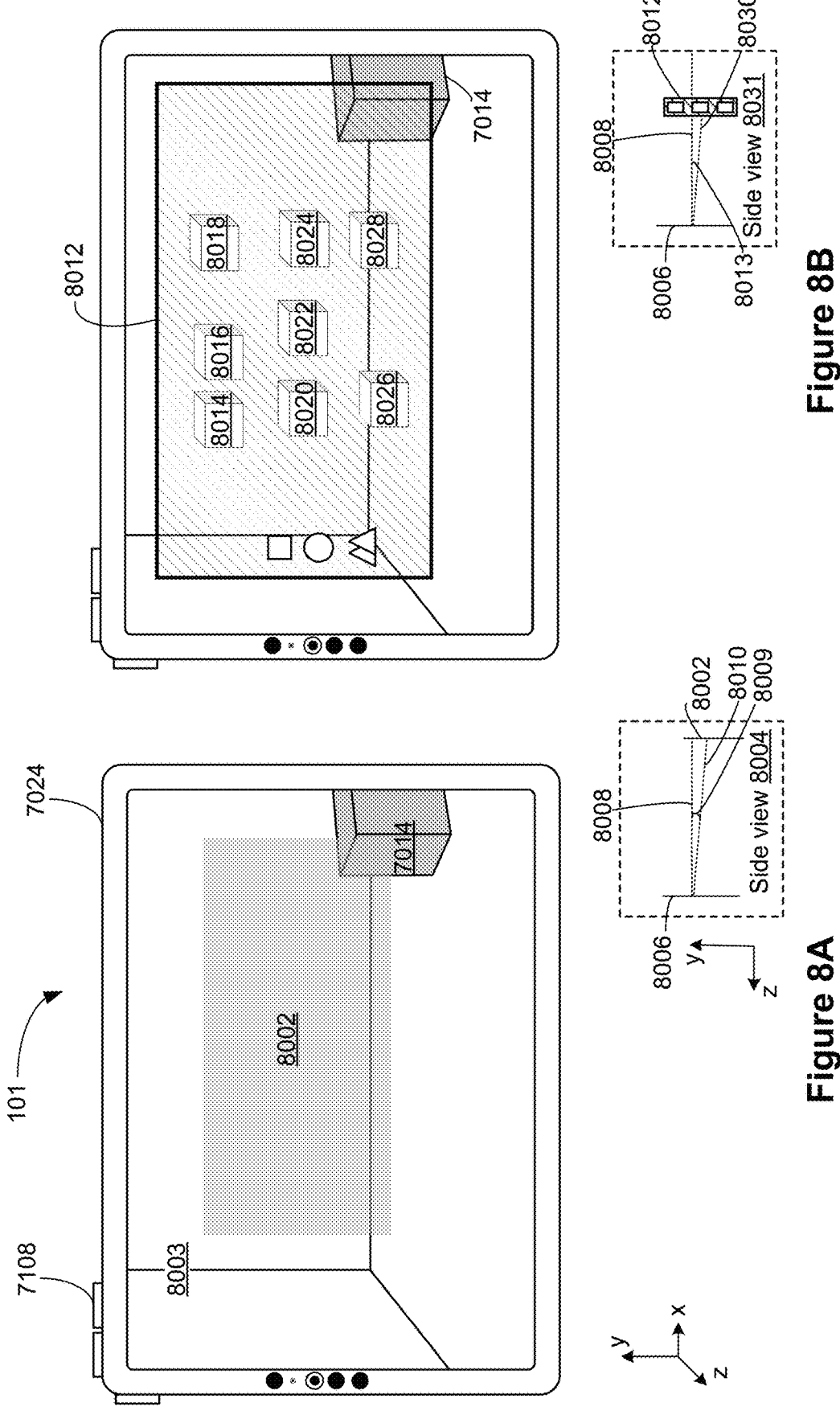

In FIG. 8A, an application user interface in a virtual three-dimensional environment is shown, in accordance with some embodiments. The computer system 101 displays an application user interface 8002 in an XR three-dimensional environment 8003. Portions of the XR three-dimensional environment 8003 shown in FIGS. 8A-8J are visible via display generation component 7100 of computer system 101 and correspond to user 7002's respective fields of view when wearing a head-mounted display. As shown in the examples in FIGS. 8A-8J, content that is visible via a display generation component 7100 of computer system 101 is displayed on a touchscreen held by user 7002. In some embodiments, display generation component 7100 of computer system 101 is a head-mounted display worn on user 7002's head (e.g., what is shown in FIGS. 8A-8J as being visible via display generation component 7100 of computer system 101 corresponds to user 7002's field of view when wearing a head-mounted display).

In some embodiments, the XR three-dimensional environment 8003 includes one or more computer-generated objects, also called virtual objects, which are not representations of physical objects in physical environment 7000. In some embodiments, application user interface 8002 corresponds to a user interface of a software application executing on computer system 101 (e.g., an email application, a web browser, a messaging application, a maps application, a video player, or an audio player, or other software application). In some embodiments, the application user interface 8002 is displayed in the middle portion (e.g., at an eye level of the user) of the XR three-dimensional environment 8003, within a central portion of a field of view of a user of the device (e.g., along a gaze direction of a user, providing the user 7002 with a head-on view of the application user interface 8002 such that the application user interface 8002 appears substantially at eye-level or slightly below eye-level to the user 7002). In some embodiments, substantially at eye-level of the user 7002 corresponds to a position that is within a threshold angular distance (e.g., ±1°, ±2°, ±3°, ±5°, ±10°, or other angle) of horizon 8008 from a viewpoint of the user. In some embodiments, the application user interface 8002 is displayed on a display of a handheld device such as a tablet or smartphone. For such a handheld device, the viewpoint of the user shifts as the handheld device is moved (e.g., so as to change the position and/or orientation of the handheld device) and/or as a position of a user relative to the handheld device changes (e.g., a user moving toward, away from, up, down, to the right, and/or to the left of the device). In some embodiments, the application user interface 8002 is displayed as XR content via an HMD or other wearable computing device. For an HMD, a change in a head elevation of the user has a concomitant change in a position of the HMD that may be detected by one or more sensors located on or in communication with the HMD. Hereinafter, descriptions of "head elevations" and corresponding user interfaces (e.g., shown in FIGS. 8A-8J and 9A-9O) are provided with respect to the elevation of a user's head while wearing an HMD. Nonetheless, the descriptions of "head elevations" apply analogously to changes in viewpoint of the user that are based on the movement (e.g., changes in position and/or orientation) of the handheld device.

A side view 8004 in FIG. 8A includes a line 8006 that represents a side profile of a representation of the user 7002 in environment 8003, and a side view of the application user interface 8002. A portion of the side profile (e.g., at an intersection of the line 8006 and a line 8010) coincides with a position of a viewpoint of the user 7002. Horizon 8008 represents a horizontal reference plane in the three-dimensional environment that is at an eye level of the user (e.g., typically when the user is in an upright or standing position, and though the user's gaze and/or head may be pointed in a direction other than horizontally) and is sometimes also referred to as the horizon. Horizon 8008 is a fixed reference plane that does not change with a change in the user 7002's head elevation (e.g., head elevation pointing up, or head elevation pointing down). A line 8010 extends from a portion of the user 7002 (e.g., a head portion, or an eye of the user 7002) along the line 8006 to a portion of the application user interface 8002. In some embodiments, the line 8010 intersects the application user interface 8002 in a central portion of the application user interface 8002. In some embodiments, the line 8010 intersects a top portion of the application user interface 8002.

In some embodiments, a distance between the application user interface 8002 and the viewpoint of the user 7002 is between 0.8-2.5 m (e.g., 1 m, 1.5 m, 2 m, or 2.4 m). In side view 8004, an angle 8009 between the line 8010 and horizon 8008 indicates that a characteristic portion (e.g., the central portion, a top portion, and/or an edge portion) of the application user interface 8002 is positioned slightly below the horizon 8008. In some embodiments, the angle 8009 is between 1°-10° (e.g., between 2°-5°, or about 3°). In some embodiments, the side view illustrates a z-y plane or coordinate view.

In some embodiments, display generation component 7100 is provided within housing 7024 of computer system 101. Button 7108 is provided on housing 7024 that encloses or surrounds display generation component 7100. Button 7108 is configured to detect two or more types of input (e.g., a press input, and/or a rotational input). For example, button 7108 is rotatable about a rotational axis in a counter-clockwise fashion or clockwise fashion. In some embodiments, button 7108 is configured to receive one or both of counter-clockwise and clockwise rotational inputs. In some embodiments, computer system 101 is able to detect an amount of rotation (e.g., the number of degrees through which the button 7108 is turned), and a direction of the rotation (e.g., counter-clockwise or clockwise) and perform a function based on the amount of rotation and the direction of the rotation. In some embodiments, button 7108 is a rotatable input element (e.g., a crown or knob).

In response to detecting a user input (e.g., a first user input on button 7108, a hand gesture such as an air gesture, a gaze and pinch gesture, a tap gesture, or a long press gesture), the computer system 101 presents home menu user interface 8012 in the XR three-dimensional environment 8003 as shown in FIG. 8B. In some embodiments, the user input is a first user input that includes a single press input to button 7108. In some embodiments, the first user input is a hand gesture (e.g., an air gesture, a gaze and pinch gesture, a tap gesture, or a long press gesture).

In some embodiments, application user interface 8002 is dismissed by the first user input (e.g., prior to home menu user interface 8012 being displayed, or in conjunction with or concurrently with home menu user interface 8012 being displayed in the XR three-dimensional environment 8003), as shown in FIG. 8B. In some embodiments, ceasing to display the application user interface 8002 includes displaying an animation of the application user interface 8002 that changes, such as by deemphasizing, one or more visual characteristics over time. For example, in some embodiments, the application user interface 8002 gradually becomes more translucent, shrinks in size, and/or becomes dimmer, blurred, and/or lower in contrast. Concurrently or sequentially, the home menu user interface 8012 increases in visual prominence (e.g., by increasing in size, transitioning from a translucent state into a more opaque, higher contrast, and/or brighter state) until the computer system 101 presents the home menu user interface 8012 shown in FIG. 8B.

In some embodiments, the home menu user interface 8012 is displayed in a central portion of a user's field of view, e.g., in a middle portion of the three-dimensional environment 8003, based on a head elevation of the user, and independent of the position of the application user interface 8002 that was previously displayed (shown in FIG. 8A). In some embodiments, a characteristic portion (e.g., a top portion) of the home menu user interface 8012 is above a corresponding portion of the application user interface 8002 (e.g., a top edge of the home menu user interface 8012 is above a top edge of the application user interface 8002, or a centroid of the home menu user interface 8012 is above a centroid of the application user interface 8002, or other characteristic portion).

Side view 8031 in FIG. 8B shows a side profile of a representation of the user 7002 (represented by line 8006) and a side view of the home menu user interface 8012 in a z-y plane or coordinate view. In some embodiments, the home menu user interface 8012 is displayed at a location closer to the user 7002 along a view direction (e.g., along the depth dimension) of the user 7002 as compared to the display of the application user interface 8002 (shown in FIG.

8A) (e.g., home menu user interface 8012 is closer to line 8006 in side view 8031 of FIG. 8B than application user interface 8002 is to line 8006 in side view 8004 of FIG. 8A). Line 8030 extends from a portion of the user 7002 (e.g., a head portion, or an eye of the user 7002) along line 8006 to a portion of home menu user interface 8012. In some embodiments, line 8030 intersects a central portion of home menu user interface 8012. In some embodiments, line 8030 intersects a top portion of home menu user interface 8012.

In some embodiments, a distance between home menu user interface 8012 and the viewpoint of user 7002 is between 0.5-1.5 m (e.g., 0.5 m, 0.8 m, 1 m, 1.2 m, or 1.4 m). As shown in side view 8031, angle 8013 between line 8030 and horizon 8008 indicates that home menu user interface 8012 is positioned below (e.g., slightly below) horizon 8008. In some embodiments, angle 8013 is between 1°-5° (e.g., between 1°-3°, or about 3°). In some embodiments, the viewpoint of user 7002 points along horizon 8008, as represented by line 8006 being perpendicular to horizon 8008. In addition, line 8006 is parallel to a plane of the home menu user interface 8012. For example, home menu user interface 8012 may be displayed in a vertical plane, perpendicular to horizon 8008.

Home menu user interface 8012 includes one or more collections of various representations, such as application icons, widgets, communication options, and/or affordances for displaying VR and/or AR backgrounds. In some embodiments, home menu user interface 8012 includes (e.g., at least) three collections of representations. FIG. 8B shows a first collection of representations that includes representation 8014, representation 8016, representation 8018, representation 8020, representation 8022, representation 8024, representation 8026, and representation 8028 (collectively, "representations 8014-8028") arranged in XR three-dimensional environment 8003. The representations 8014-8028 can occupy positions anywhere within XR three-dimensional environment 8003. In general, the representations are presented in a middle portion of XR three-dimensional environment 8003 (e.g., presenting the home menu user interface 8012 substantially in a central portion of a field of view of user 7002, displaying representations 8014-8028 substantially at eye level to user 7002). In some embodiments, substantially in a central portion of a field of view of the user 7002 corresponds to at least 75% of the total area of the home menu user interface 8012 (e.g., at least 80% of the total area, at least 90% of the total area, at least 95% of the total area) being within a central portion of a field of view of user 7002, and/or a centroid of the home menu user interface 8012 being within a threshold angular distance (e.g., within 1°, 2°, 3°, 5°, 10°, or other angle) of the head elevation of user 7002 (e.g., within the threshold angular distance of a normal vector originating from a head or eye portion of the user 7002). Presenting the home menu user interface 8012 substantially in a central portion of a field of view of user 7002 of the computer system 101 improves operational efficiency by obviating further inputs from the user (e.g., user 7002 having to lower or elevate her gaze, or having to visually search for home menu user interface 8012, and/or having to tilt/rotate user 7002's head to focus on home menu user interface 8012), and reduces the amount of time before beginning to navigate within home menu user interface 8012, improving the operational efficiency of the computer system 101.

Figures 8C, 8D:
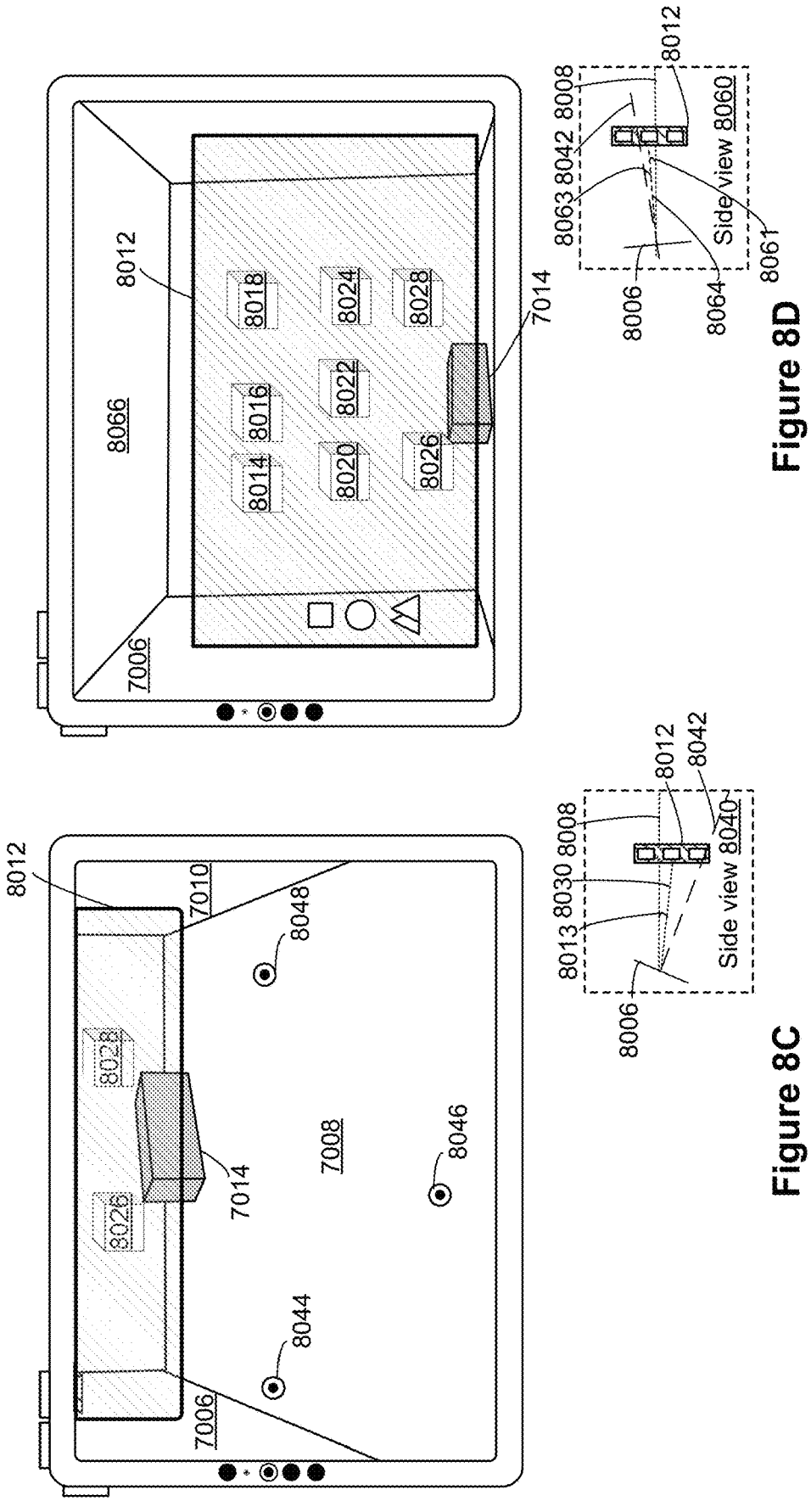
Figures 9A, 9B:
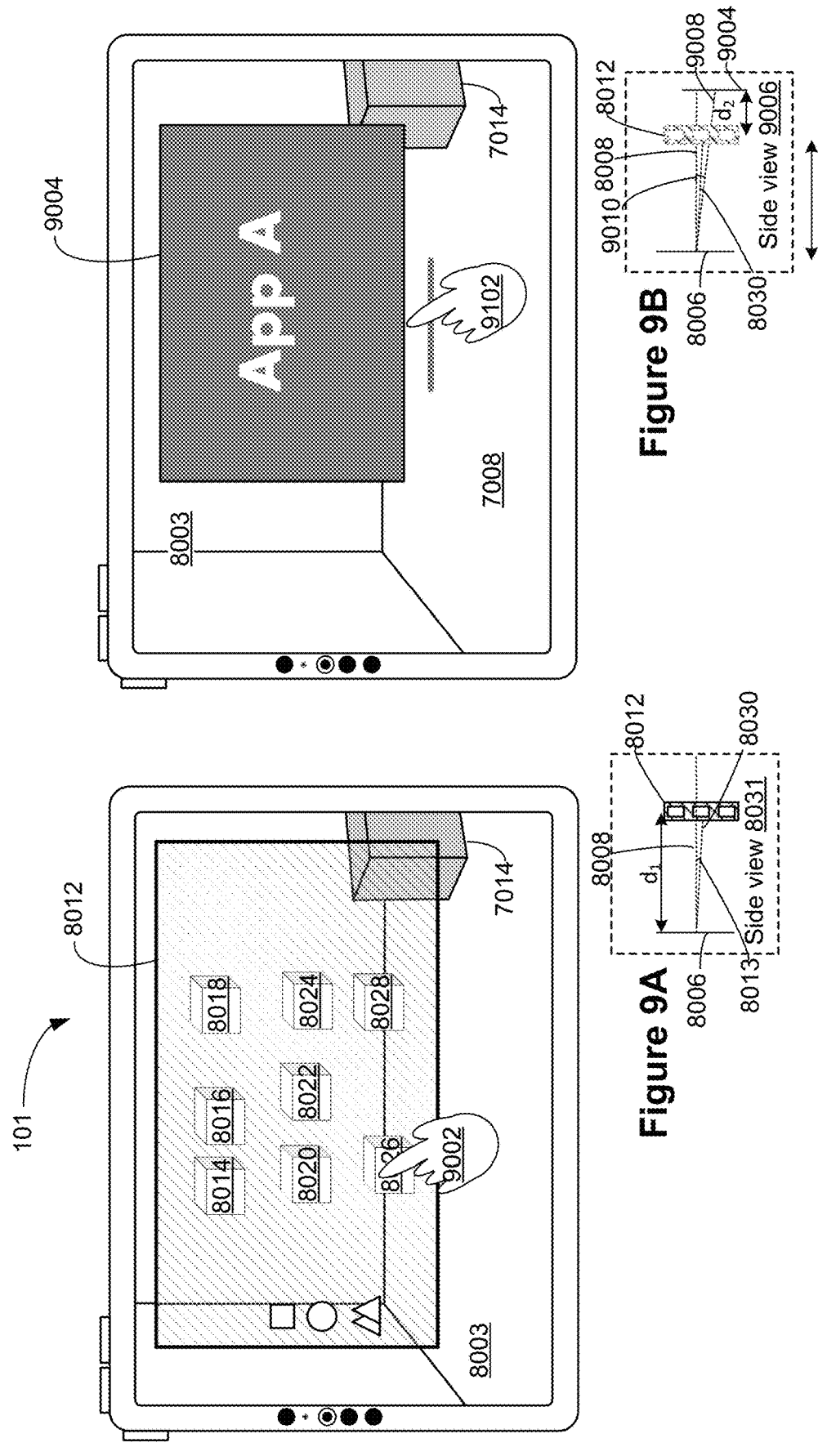
FIGS. 9A-9O illustrate example techniques for displaying an application user interface of an application by activating a representation of the application in a home menu user interface, in accordance with some embodiments.

FIG. 8C shows an invocation of the home menu user interface (e.g., by providing the user input to the button 7108 or by a hand gesture) by a user having a different viewpoint (e.g., a head elevation, or forward viewing direction from a handheld device, that is below horizon 8008) than in the scenario shown in FIGS. 8A and 8B. For example, the user 7002 lowers her viewpoint (e.g., by lowering her head, for a computer system 101 that is a head-mounted device) downwards towards the floor 7008 prior to (e.g., immediately prior to) invoking the home menu user interface 8012. In some embodiments, for a downward pointing viewpoint (e.g., head elevation) of the user 7002, the computer system 101 still displays home menu user interface 8012 at the same height in FIG. 8C as it was in FIG. 8B. As a result of the computer system 101 displaying the home menu user interface 8012 at the same height in FIG. 8C, at least a portion of the home menu user interface 8012 is displayed at a region away from (e.g., above, above along a y-direction, and/or at a higher altitude angle) a central portion of a field of view of the user when the viewpoint of the user is lowered.

In FIG. 8C, the computer system 101 makes visible (e.g., displays) a different portion of physical environment 7000 within the field of view of the user 7002 compared to FIG. 8B. For example, both wall 7010 and wall 7006 are shown within the field of view of the user 7002. In response to detecting a user input to invoke the home menu user interface 8012 (e.g., via the button 7108 or a hand gesture an air pinch input, an air tap input, a pinch input, a tap input, a gaze input, and/or other input) while the viewpoint of user 7002 is lowered to the field of view shown in FIG. 8C, the computer system 101 displays the height of home menu user interface 8012 at the same height in FIG. 8C as in FIG. 8B.

In some embodiments, while the elevation of the viewpoint of the user (e.g., head elevation) is lowered as shown in FIG. 8C, the user 7002 may direct her gaze at a first spatial location 8044 closer to the wall 7006, a second spatial location 8046 in a center portion of the room, or a third spatial location 8048 closer to the wall 7010 (e.g., the right wall). In some embodiments, the computer system 101, in response to detecting a user input to invoke the home menu user interface 8012 (e.g., via the button 7108 or a hand gesture, and/or a different user input such as an air pinch input, an air tap input, a pinch input, a tap input, a gaze input, and/or other input), still displays the home menu user interface 8012 at the same height, independently of the user's gaze, while the user's gaze is directed to different spatial locations, as shown in FIG. 8C (e.g., whether the user's gaze is directed to spatial location 8044, spatial location 8046, or spatial location 8048 when the user input to invoke the home menu user interface 8012 is detected, the home menu user interface 8012 is displayed as shown in FIG. 8C).

Accordingly, the lowered elevation of the viewpoint of the user in FIG. 8C described above is shown, in side view 8040, by line 8006 that is tilted downwards to represent that the viewpoint (e.g., head elevation) of the user 7002 points down towards floor 7008 while horizon 8008 remains constant as the reference horizontal plane (e.g., defined when the user 7002's head is in an upright position). In some embodiments, line 8030 intersects home menu user interface 8012 at the same location in FIG. 8C as in FIG. 8B. For example, line 8030 passes through a pivot point of the user 7002's head such that the point of intersection of the line 8030 with the line 8006 remains constant even when a head elevation of the user 7002 changes. Normal 8042 depicts a normal vector originating from a head or eye portion of the user 7002. Normal 8042 also describes a line of sight for the user 7002 at the head elevation shown by line 8006 in the side view 8040, and depicted in the field of view shown via computer system 101 in FIG. 8C. In some embodiments, a height of the home menu user interface 8012 stays constant or fixed for a first range of head elevations (e.g., for head elevations within the first range, regardless of the user's head elevation when the home menu user interface 8012 is invoked, the home menu user interface 8012 is displayed at the same height). In some embodiments, the first range of elevations includes a head elevation that is level with the horizon (as shown in FIG. 8B) to head elevations that point down as shown in FIG. 8C.

In some embodiments, instead of viewing the application user interface 8002 as shown in FIG. 8A at a substantially level head elevation prior to invoking the home menu user interface 8012, the user 7002 has a head elevation that is slightly above (e.g., between 1-10° above) the horizon prior to (e.g., immediately prior to) invoking home menu user interface 8012. In some embodiments, a substantially level head elevation corresponds to a head elevation of the user that is within a threshold angle (e.g., ±1°, ±2°, ±3°, ±5°, ±10°, or other angle) of horizon 8008. Accordingly, FIG. 8D illustrates a scenario in which the user input to invoke the home menu user interface 8012 (e.g., via the button 7108 or a hand gesture) is detected while the viewpoint or head elevation of user 7002 is slightly above the horizon.

In FIG. 8D, the computer system 101 displays the field of view of the user 7002 prior to (e.g., just prior to) invoking the home menu user interface 8012. The field of view includes a portion of ceiling 8066, and floor 7008 is not within the field of view of user 7002. Upon invoking home menu user interface 8012 (e.g., by providing the user input to the button 7108 or by a hand gesture), computer system 101 displays the home menu user interface 8012 at a height that is at slightly elevated position, as shown in FIG. 8D. In side view 8060, home menu user interface 8012 is vertical such that a plane of home menu user interface 8012 is perpendicular to the horizon 8008. For example, horizon 8008 is a plane parallel to the floor 7008 and located at an eye-level height of the user 7002. Normal 8042 shows the line of sight for the user 7002 at the head elevation shown by line 8006 in side view 8060. The head elevation depicted in side view 8060 corresponds to the field of view that is displayed by the computer system 101 in FIG. 8D. In some embodiments, a height of the home menu user interface 8012 is dynamic for a second range of head elevations. In some embodiments, the second range of elevations includes head elevations that are above horizon 8008 (as shown in FIG. 8D, FIG. 8E, and FIG. 8F). The height of the home menu user interface 8012 for elevations within the second range of elevations is based on the elevation at the time the home menu user interface is invoked. In contrast, the height at which the home menu user interface 8012 is displayed is fixed once the home menu user interface is invoked and does not change dynamically after invocation.

Line 8064 connects a portion of the user 7002 (e.g., a head portion, or an eye of the user 7002) along the line 8006 to a portion of the home menu user interface 8012. In some embodiments, line 8064 intersects a central portion of home menu user interface 8012. In some embodiments, line 8064 intersects a top portion of the home menu user interface 8012. As shown in side view 8060, angle 8061 between line 8064 and horizon 8008 indicates that the home menu user interface 8012 is positioned above (e.g., slightly above) horizon 8008. In some embodiments, angle 8061 is between 0.1°-10° (e.g., between 1°-5°, or about 3°). Angle 8063 between line 8064 and normal 8042 indicates that the home menu user interface 8012 is positioned below (e.g., slightly below) the line of sight of the user 7002 represented by normal 8042. In some embodiments, angle 8063 is between 0.1°-5° (e.g., between 1°-4°, or about) 3°.

In some embodiments, the display of home menu user interface 8012 across two or more of FIGS. 8B-8G occurs sequentially but not in any particular order. For example, the computer system 101 displays the home menu user interface 8012 as shown in FIG. 8B (or any of FIGS. 8C-FIG. 8G), before the home menu user interface 8012 is dismissed by user input (e.g., interaction with an application, or by a user input to hardware button 7108). The user then changes a head elevation prior to revoking the home menu user interface 8012. In some embodiments, the home menu user interface 8012 is subsequently displayed as shown in any one of FIGS. 8C-FIG. 8G, depending on a head elevation and/or a rotational posture of the user.

In some embodiments, an orientation of the home menu user interface 8012 (e.g., vertical orientation of home menu user interface with respect to horizon 8008) stays constant or fixed for a third range of head elevations. In some embodiments, the third range of elevations includes head elevations that are above the horizon (e.g., the third range of elevations includes normal 8042 making an angle with horizon 8008 of up to 10°, 15°, or 20°, or other threshold angle between 0.1°-30° above horizon 8008) and head elevations that are at the horizon or pointed down. In some embodiments, the third range of elevations is different from the first range of elevations (e.g., head elevations that span a head elevation that is level with horizon 8008 to head elevations that point down). In some embodiments, the third range of elevations is different from the second range of elevations (e.g., head elevations that point up). In some embodiments, the third range of elevations includes at least a portion of the first range of elevations and at least a portion of the second range of elevations.

In some embodiments, a side profile of a representation of the user 7002 as represented by line 8006 is not parallel to a plane of home menu user interface 8012. For example, the home menu user interface 8012 is displayed in a vertical plane, perpendicular to the horizon 8008, although line 8006 is tilted upwards from horizon 8008, as shown in side view 8060 of FIG. 8D.

In accordance with line 8006 tilting upwards (e.g., showing a lifting of the head elevation of the user 7002 from horizon 8008), the viewpoint of the user of the XR three-dimensional environment 8003 depicted in FIG. 8D shows a portion of ceiling 8066. In some embodiments, line 8064 passes through a pivot point of the user 7002's head such that the point of intersection of the 8064 with the line 8006 remains constant even when a head elevation of the user 7002 changes. In some embodiments, the line 8064 intersects with home menu user interface 8012 in FIG. 8D at the same location on home menu user interface 8012 as where the line 8030 intersects home menu user interface 8012 in FIGS. 8C and 8D.

FIG. 8E and FIG. 8F show invocation of home menu user interface 8012 for two different viewpoints of user 7002 (e.g., alternative outcomes in response to the same invocation of home menu user interface 8012 based on which viewpoint user 7002 has when invoking home menu user interface 8012, or respective outcomes in response to two different invocations of home menu user interface 8012), in accordance with some embodiments. In FIG. 8E, side view 8080 illustrates that user 7002 has a head elevation indicated by line 8006 prior to (e.g., immediately prior to) providing a user input (e.g., an air pinch input, an air tap input, a pinch input, a tap input, a gaze input, and/or other input) for displaying home menu user interface 8012. In response to detecting the user input for displaying the home menu user interface 8012 while the user has a head elevation indicated by the line 8006, the environment 8003 at a first elevation, as shown in FIG. 8E. In FIG. 8E, the computer system 101 displays home menu user interface 8012 in conjunction with a field of view of the user. Both a portion of the floor 7008 and a portion of a ceiling 8066 are within the field of view of the user.

In side view 8080, line 8082 is perpendicular to line 8006 and indicates a head elevation of the user. Line 8084 extends from a portion of the user 7002 (e.g., a head portion, or an eye of the user 7002) along the line 8006 to a portion of home menu user interface 8012. In some embodiments, line 8084 intersects home menu user interface 8012 in a central portion of home menu user interface 8012. In some embodiments, line 8084 intersects a top portion of home menu user interface 8012. In some embodiments, the computer system 101 displays home menu user interface 8012 at a height slightly below line 8082 (e.g., slightly below eye level of the user at the head elevation depicted in side view 8080). Angle 8086 between line 8082 and line 8084 (shown in FIG. 8E) is similar to angle 8063 between line 8042 and line 8064 (FIG. 8D), except the orientation of the plane of the home menu user interface 8012 is perpendicular to horizon 8008 in FIG. 8D, whereas the plane of the home menu user interface 8012 is perpendicular to line 8082 (and not horizon 8008) in FIG. 8E. Angle 8086 may have values within a first range of angles of between 1°-5° (e.g., between 1°-3°, or about 3°).

In some circumstances, angle 8087 between horizon 8008 and the viewpoint of the user (e.g., line 8082 in FIG. 8E and line 8102 in FIG. 8F) may be greater than a threshold angle (e.g., greater than an angle between 5 degrees and 30 degrees, or other threshold angle), such that the head elevation of the user is within a fourth range of elevations exceeding a threshold angle. In some embodiments, angle 8087 is below a maximum angle of 85°, 80°, 75°, or other maximum angles above horizon 8008. Within the fourth range of elevations, the orientation of the home menu user interface 8012 is tilted towards the user such that a plane of the home menu user interface 8012 is parallel to line 8006. In addition, the positioning (e.g., a height at which the home menu user interface is placed) of the home menu user interface 8012 for elevations within the fourth range of elevations is dynamically linked to the elevation at the time the home menu user interface is invoked (e.g., in accordance with the fourth range of elevations at least partially overlapping with the second range of elevations for which the resulting height of home menu user interface 8012 is elevation-dependent). Similar to the display characteristics of the home menu user interface 8012 after invocation for the second range of elevations, the height at which the home menu user interface 8012 is displayed is fixed once the home menu user interface is invoked and does not change dynamically after invocation.

In some embodiments, the computer system 101 ceases a display of home menu user interface 8012 (e.g., home menu user interface 8012 is dismissed) in response to detecting a user interaction with a representation of an application (e.g., the representation 8026) displayed on the home menu user interface 8012 (e.g., the user interaction is a user input for launching an application, a tap input, an air gesture, or a gaze input directed at the representation 8026). In some embodiments, home menu user interface 8012 is dismissed by a second user input (e.g., a second button press) for dismissing home menu user interface 8012. In some embodiments, home menu user interface 8012 may be dismissed by a hand gesture or by a user directing her gaze at a user interface object (e.g., a user interface element such as an application user interface element that is spatially separated from home menu user interface 8012). In some embodiments, the user interface element may be displaced along one or more of a X, Y, or Z direction from home menu user interface 8012.

In some embodiments, after the home menu user interface 8012 is dismissed, the user may change her head elevation to a different head elevation. An example of a different head elevation is shown in side view 8100 of FIG. 8F. Line 8006 representing a side profile of a representation of the user 7002 associated with the previous head elevation (of FIG. 8E) is shown for reference in addition to the current side profile 8106. Normal 8102, which indicates the head elevation of side profile 8106, is higher than horizon 8008. In FIGS. 8F, the computer system 101 displays a field of view associated with the head elevation corresponding to the side profile 8106. In FIGS. 8F, the computer system 101 displays the field of view of the user before (e.g., immediately prior to) a user input to display the home menu user interface 8012 is detected.

In FIGS. 8F, the computer system 101 does not show any portion of the floor 7008 as being visible in the user's field of view. Instead, the computer system 101 makes visible (e.g., displays) a larger portion of the ceiling 8066 compared to the field of view displayed in FIG. 8E. In side view 8100, line 8084 connects the portion of the user 7002 (e.g., a head portion, or an eye of the user 7002) along a representation 8106 of the side profile to a portion (e.g., the same portion as shown in FIG. 8E) of the home menu user interface 8012. In some embodiments, line 8084, as shown in side view 8100, still intersects the home menu user interface 8012 at the same location on the home menu user interface 8012, but the angle 8087 between the line 8102 and the horizon 8008 in side view 8100 of FIG. 8F is larger than the angle 8087 shown in the side view 8080 of FIG. 8E. Both the angle 8087 in FIG. 8E and FIG. 8F corresponds to user 7002's head elevation being within the fourth range of elevations, for which the home menu user interface 8012 is tilted towards a viewpoint of the user, in addition to being dynamically positioned based on a head elevation of the user at the time of invoking the home menu user interface 8012 (optionally due to user 7002's' head elevation being in the second range of elevations).

An angle 8104 between the line 8102 and the line 8084 has values within a first range of angles between 1°-5° (e.g., between 1°-3°, or about 3°). In some embodiments, the size of angle 8104 in FIG. 8F is the same as the size of angle 8086 in FIG. 8E. In some embodiments, the size of angle 8104 is different (e.g., smaller) than the size of angle 8086. In some embodiments, the home menu user interface 8012 is tilted towards the viewpoint of the user such that side profile 8106 is parallel to the plane of home menu user interface 8012 shown in side view 8100.

Figures 8G, 8H:
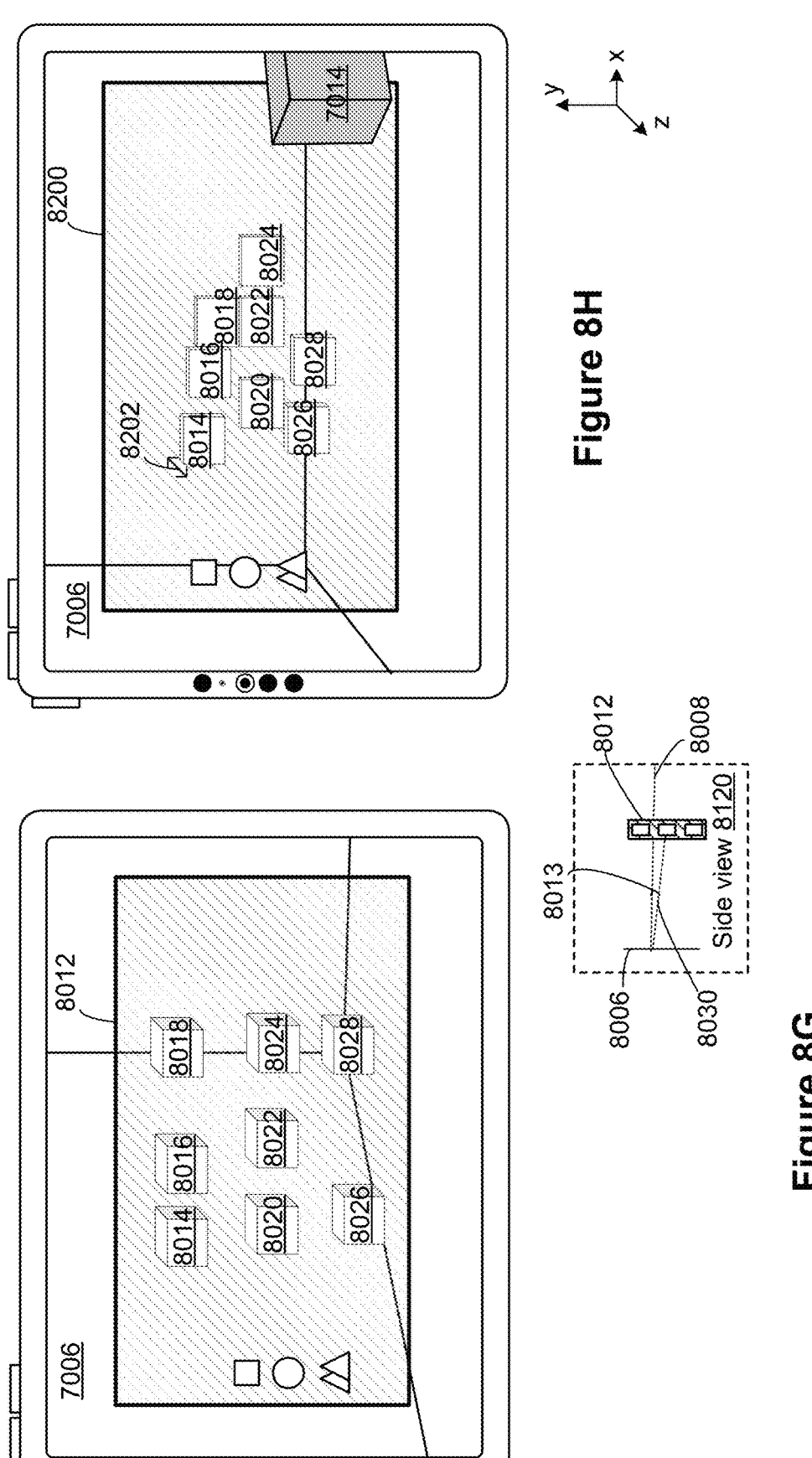

In FIG. 8G, the computer system 101 displays a different field of view that includes a display of the home menu user interface 8012, in accordance with some embodiments. In some embodiments, in addition to displaying home menu user interface 8012 at a location that depends on a head elevation of the user (e.g., the head elevation corresponds to an altitude in a horizontal coordinate system defined with the user at a reference (e.g., origin) position, or the head elevation makes a polar angle φ with respect to a vertical axis, in a spherical coordinate system defined with the user at a reference (e.g., origin) position), a location of home menu user interface 8012 may also depend on an azimuthal angle, measured in either the horizontal coordinate system or the spherical coordinate system. The azimuthal angle is defined with reference to a horizontal reference plane (e.g., the horizon 8008) and describes a rotational position of a view point of the user about a vertical axis (e.g., about a neck, or a spine of the user).

Prior to invoking the home menu user interface (e.g., immediately prior to), the user's head or body position may have a different rotational posture, compared to the rotational posture shown in FIG. 8B. The user's rotational posture may be defined by a rotation of the user's head or a rotation of the user's body. For example, FIG. 8G shows a field of view of a user after the user rotates her head or her body (e.g., counter-clockwise from the view shown in FIG. 8B) about a vertical axis (e.g., an axis that is perpendicular to horizon 8008). In some embodiments, the head elevation of the user is defined as an angle above or below horizon 8008. In FIG. 8G, the computer system 101 makes visible (e.g., displays) a field of view that includes a larger portion of wall 7006, due to the rotational posture of the user's body (e.g., a head rotation of the user relative to a neck axis of the user or any other axis that is perpendicular to the ground or horizon 8008).

In some embodiments, home menu user interface 8012 does not change in its position after being displayed. For example, the placement of home menu user interface 8012 is dependent on one or more of a head elevation and a rotational posture of the user prior to (e.g., immediately prior to) the user input to invoke the home menu user interface. In some embodiments, the computer system 101 displays home menu user interface 8012 so that the home menu user interface 8012 faces the user. In some embodiments, a height of the home menu user interface 8012, as shown in side view 8120 in FIG. 8G, is identical to the height of the home menu user interface 8012 as shown in the side view 8031 in FIG. 8B, except for a lateral placement (e.g., along a x-axis, or on a spherical surface representing a consistent radial distance from the viewpoint of the user but at a different azimuthal angle). In other words, the home menu user interface 8012 is displayed at a first rotational position in the three-dimensional environment 8003 in FIG. 8B, and the home menu user interface is displayed at a second rotational position, different from the first rotational position, in the three-dimensional environment 8003 in FIG. 8G. In some embodiments, the first rotational position is determined based on a first rotational posture of the user, and the second rotational position is determined based on a second rotational posture of the user. In some embodiments, the user maintains the same head elevation in the first rotational position as in the second rotational position (e.g., as shown in FIG. 8B and FIG. 8G).

In some embodiments, the computer system 101 selects a rotational position of the home menu user interface independently of (e.g., as an independent variable of) a height placement (e.g., an elevation, altitude, or a magnitude of a polar angle φ with respect to a vertical axis) of home menu user interface 8012. In some embodiments, the height placement (e.g., altitude) at which the home menu user interface 8012 is placed is based on the head elevation of the user as described in reference to FIGS. 8B to 8F (e.g., rather than on the rotational posture of the user).

FIG. 8H illustrates how representations displayed on the home menu user interface are presented to the user, in accordance with some embodiments. FIG. 8H in combination with FIG. 8J illustrate an example animation of the home menu user interface being displayed in response to a user input (e.g., an air pinch input, an air tap input, a pinch input, a tap input, a gaze input, and/or other input) invoking the home menu user interface.

In some embodiments, the computer system 101 displays a placement tile or a temporary frame 8200 in response to detecting a user input for invoking the home menu user interface. In some embodiments, the position of the placement tile or temporary frame 8200 is as described for the home menu user interface 8012 in reference to FIGS. 8B-8H. In some embodiments, the placement tile is not displayed, or is displayed as a transparent temporary frame. A collection of representations of applications (e.g., icons of applications) is presented in a first spatial region of the temporary frame 8200. In some embodiments, as shown in FIG. 8H, the first spatial region is a central region of the temporary frame 8200. For example, the representations 8014, 8016, 8018, 8020, 8022, 8024, 8026 and 8028 appear in a center portion of temporary frame 8200. In some embodiments, the representations of applications shown in FIG. 8H expand out and are arranged on the home menu user interface 8012 as shown in FIG. 8J.

In some embodiments, visual characteristics of the representations of applications change over time or at different times as the representations appear. In some embodiments, visual characteristics gradually change over time as the home menu user interface 8012 appears. For example, the representations may be arranged concentrically and expand outwards in a first animation (e.g., as from FIG. 8H to FIG. 8J). In some embodiments, the first animation may change a visual emphasis of representations of applications. The first animation optionally includes changing three-dimensional visual characteristics of the representations of applications such as changing a depth dimension from a viewpoint of a user (e.g., decreasing a depth dimension from the viewpoint of the user to increase the visual emphasis). For example, thickness 8202 (e.g., along the depth dimension) of representation 8014 may increase as the first animation progresses from FIG. 8H to FIG. 8J, or from FIG. 8I to FIG. 8J. Alternatively or additionally, a position of temporary frame 8200 (and one or more representations 8014-8028 displayed thereon) may also be further away from the viewpoint of the user in the depth dimension in FIG. 8H or FIG. 8I compared to a z-position of the home menu user interface 8012 in FIG. 8J. In other words, the first animation may cause one or more of representations 8014-8028 to move closer to the user along the z direction. In some embodiments, the first animation optionally includes increasing specular reflections that simulate light from the three-dimensional environment reflecting from the edges of the representations of applications (e.g., the light may originate from simulated light sources and/or one or more physical light sources in a physical environment corresponding to the displayed three-dimensional environment). In some embodiments, changing the three-dimensional visual characteristics includes increasing an intensity and/or size of shadows cast by the representations of applications (e.g., representations 8014-8028 in FIG. 8H or 81) in a displayed three-dimensional environment 8003 based on one or more sources of light in the three-dimensional environment, such as simulated or computer-generated light sources and/or physical light sources in a physical environment corresponding to the displayed three-dimensional environment. In some embodiments, increasing the visual emphasis includes increasing a separation between layers of a user interface element (e.g., increasing z-separation between layers of a respective representation 8014-8028) to different degrees along at least one dimension in response to different user interactions including a user directing attention to the user interface element. In some embodiments, a less translucent and/or sharper version of the representation or applications may appear as the visual prominence of the representations of applications increases with the progress of the animation. For example, representation 8014 in FIG. 8H and/or FIG. 8I may be more translucent and/or less sharp than representation 8014 in FIG. 8J.

FIG. 8I describes how representations displayed on the home menu user interface are presented to the user, in accordance with some embodiments. FIG. 8I in combination with FIG. 8J illustrates another example animation of the home menu user interface being displayed in response to a user input invoking the home menu user interface.

The collection of representations of applications (e.g., icons of applications) is presented in a first spatial region of user 7002's field of view with respect to environment 8003. In some embodiments, as shown in FIG. 8I, the first spatial region is a peripheral region of the user's field of view of environment 8003. For example, the representations 8014, 8016, 8018, 8020, 8022, 8024, 8026 and 8028 appear in a peripheral region of the portion of environment 8003 that is visible in user 7002's field of view. In some embodiments, the representations of applications shown in FIG. 8I coalesce inwards and are arranged on the home menu user interface 8012 as shown in FIG. 8J.

In some embodiments, the representations (e.g., representations of applications, representations of people with whom the user may be able to communicate, and or representations of virtual environments) may be arranged in a regular grid pattern. In some embodiments, the representation of applications may be in an irregular grid arrangement that includes a lateral offset between adjacent rows. In some embodiments, a spacing between representations is constant within a particular row (e.g., the spacing between pairs of adjacent representations in the particular row is the same).

Additional descriptions regarding FIGS. 8A-8J are provided below in reference to method 13000 described with respect to FIG. 13.

FIGS. 9A-9O illustrate examples of displaying an application user interface of an application by activating a representation of the application in a home menu user interface. FIG. 14 is a flow diagram of an exemplary method 14000 for displaying an application user interface of an application by activating a representation of the application in a home menu user interface. The user interfaces in FIGS. 9A-9O are used to illustrate the processes described below, including the processes in FIG. 14.

As shown in the examples in FIGS. 9A-9O, content that is visible via display generation component 7100 of computer system 101 is displayed on a touch screen held by user 7002. In some embodiments, display generation component 7100 of computer system 101 is a head-mounted display worn on user 7002's head (e.g., what is shown in FIGS. 9A-9O as being visible via display generation component 7100 of computer system 101 corresponds to user 7002's field of view when wearing a head-mounted display).

FIG. 9A shows a home menu user interface in accordance with some embodiments. For illustration purposes, FIG. 9A shows home menu user interface 8012 at the same position as home menu user interface 8012 shown in FIG. 8B. Similarly, side view 8031 in FIG. 9A matches side view 8031 shown in FIG. 8B. FIG. 9A also illustrates user input 9002 (e.g., a hand gesture, such as a tap input or a pinch input, or a gaze input, and/or a different type of input) directed to a user interface element (e.g., a representation of an application, or an icon of an application) such as representation 8026. In response to detecting user input 9002

(e.g., an air pinch input, an air tap input, a pinch input, a tap input, a gaze input, and/or other input) directed at representation 8026 displayed on home menu user interface 8012, computer system 101 dismisses home menu user interface 8012 (e.g., ceases to display home menu user interface 8012) in conjunction with (e.g., prior to, or concurrently with) displaying application user interface 9004 of Application A (e.g., Application A is a web browsing application, a document editing application, a calendar application, an email application, or other application) as shown in FIG. 9B. In some embodiments, computer system 101 maintains display of home menu user interface 8012 until a predetermined number of applications have been selected (e.g., display of home menu user interface 8012 is maintained until after a representation of a second software application has been selected, display of home menu user interface 8012 is maintained until after a representation of a third software application has been selected, or display of home menu user interface 8012 is maintained until after a representation of a fourth software application has been selected).

In FIG. 9B, side view 9006 shows the placement of application user interface 9004 relative to home menu user interface 8012. For example, home menu user interface 8012 is shown in dotted lines in side view 9006 at its previous position depicted in FIG. 9A (e.g., the same position as in side view 8031 of FIG. 9A, which represents the position of home menu user interface 8012 prior to computer system 101 dismissing home menu user interface 8012 in conjunction with launching application user interface 9004 corresponding to representation 8026). The location of home menu user interface 8012 shown in FIG. 9A and in side view 8031 of FIG. 9A is a first home menu location, and the corresponding location of the application user interface 9004 shown in FIG. 9B is a first application location that is associated with the first home menu location. In some embodiments, the first application location has a fixed spatial relationship to the first home menu location that includes an offset along at least one dimension (e.g., a depth dimension, along the z-axis, and/or a height dimension, along the y-axis). In some embodiments, application user interface 9004 is centered on home menu user interface 8012, such that a central portion of the application user interface 9004 is laterally centered about a central portion of home menu user interface 8012 (e.g., along a lateral dimension or x-direction, and/or at a respective azimuthal angle with respect to a viewpoint of the user) even though the application user interface 9004 is positioned behind (e.g., along the depth dimension, further from the viewpoint of user 7002, and/or at a greater radial distance from the viewpoint of the user) a location where home menu user interface 8012 was previously displayed (e.g., the previous location of home menu user interface 8012 as shown in FIG. 9A). In some embodiments, computer system 101 displays application user interface 9004 at a location in XR three-dimensional environment 8003 that is lower (e.g., a respective amount lower along a y-direction, closer to floor 7008, such as lowered by between 1-3° as determined from a viewpoint of user 7002, and/or a respective amount lower along an altitude angle from the viewpoint of the user) than a location (e.g., a height position) of home menu user interface 8012 (FIG. 9A).

Line 8006 in side view 9006 of FIG. 9B represents the side profile of a representation of user 7002. Horizon 8008 spans from line 8006 representing user 7002 to application user interface 9004. A portion of the side profile (e.g., at an intersection of line 8006 and line 8008, or at a different location) coincides with a portion of user 7002 such as the position of a viewpoint of the user 7002 (e.g., based on a head portion or an eye of the user 7002, and/or a different part of the body of user 7002). Line 9008 extends from the portion of the user 7002 (e.g., a head portion, or an eye of the user 7002, and/or a different part of the body of user 7002) along line 8006 to a portion of application user interface 9004. In some embodiments, line 9008 intersects the application user interface 9004 at a characteristic portion of (e.g., central portion, or top portion, and/or an edge portion) application user interface 9004. In some embodiments, line 9008 makes a larger angle 9010 with respect to horizon 8008 compared to angle 8013 between line 8030 and horizon 8008 (FIG. 9A). For example, angle 9010 may be between 3°-7° while angle 8013 may be between 1°-5°.

In some embodiments, application user interface 9004 is located behind home menu user interface 8012 by more than half a distance between a viewpoint of the user 7002 (or a position of the side profile of the representation of user 7002 represented by line 8006) and home menu user interface 8012. For example, a distance between home menu user interface 8012 and user 7002, as shown in side view 8031, is $d_1$. A distance $d_2$ between a location of home menu user interface 8012 (prior to being dismissed) and a location of the application user interface 9004 is such that $d_2 > 0.5\ d_1$. In some embodiments, $d_1$ is between 0.5 m to 1.5 m, and $d_2$ is between 0.25 m and 1 m.

Application user interface 9004 shown in FIG. 9B is displayed in a plane that is substantially perpendicular to horizon 8008. For a range of head elevations, including the head elevation shown in side views 8031 and 9006, in which the user's viewpoint is substantially parallel to horizon 8008, application user interface 9004 is displayed in the plane that is substantially perpendicular to horizon 8008. In some embodiments, an application user interface that is substantially perpendicular to horizon 8008 is within ±3-10° of a normal to horizon 8008. In some embodiments, a viewpoint that is substantially parallel to horizon 8008 corresponds to a viewpoint that is within ±3-10° of horizon 8008.

FIGS. 9C and 9D show launching of an application from a home menu user interface that is at a different home menu location compared to the first home menu location shown in FIG. 9A. For example, the home menu user interface in FIG. 9C was invoked while the user's head elevation is different from that shown in FIG. 9A due to a change in the viewpoint of the user (e.g., as the user moves a touchscreen device or turns their head while wearing a head-mounted display). In FIGS. 9C, computer system 101 thus displays home menu user interface 8012 at a second home menu location (e.g., the second home menu location is elevated above horizon 8008 compared to the first home menu location shown in FIG. 9A) and the field of view visible via the display generation component 7100 of computer system 101 in FIG. 9C corresponds to that shown in FIG. 8F (e.g., the user's head elevation and rotational posture are the same in FIG. 9C and FIG. 8F). While computer system 101 displays home menu user interface 8012 at the second home menu location, also shown in side view 9020, computer system 101 detects user input 9002 (e.g., an air pinch input, an air tap input, a pinch input, a tap input, a gaze input, and/or other input) (e.g., user input 9002' corresponding to a direct air gesture in FIG. 9C2) directed to representation 8026. User input 9002 launches the application associated with representation 8026 from home menu user interface 8012. In response to detecting user input 9002, computer system 101 displays application user interface 9004 at a second application location shown in FIG. 9D (e.g., FIGS. 9D1 and 9D2). In some embodiments, the second application location has the fixed spatial relationship to the second home menu location, including the offset along at least one dimension (e.g., a depth dimension, along the z-axis, and/or a height dimension, along the y-axis), the same as the fixed spatial relationship between home menu user interface 8012 shown in FIG. 9A and application user interface 9004 shown in FIG. 9B.

Normal 8084 in side view 9020 depicts a normal vector originating from a head or eye portion of user 7002, and is perpendicular to line 8006 that shows a side profile of a representation of user 7002. Line 8030 extends from the portion of user 7002 (e.g., a head portion, or an eye of user 7002) along line 8006 to a portion (e.g., the same portion as shown in FIG. 9A) of home menu user interface 8012. In side view 9020, home menu user interface 8012 is positioned substantially parallel to line 8006 (e.g., neither line 8006 nor home menu user interface 8012 is substantially perpendicular to horizon 8008, and/or at least a majority of an area of home menu user interface 8012 is above horizon 8008). In some embodiments, home menu user interface 8012 positioned substantially parallel to line 8006 is within a threshold angle (e.g., ±1°, ±2°, ±3°, ±5°, ±10°, or other angle) of line 8006. Angle 8087 between horizon 8008 and normal 8084 has a value in a second range of angles corresponding to a range of head elevations in which the user's viewpoint is more than a threshold angle above horizon 8008. In some embodiments, the second range of angles includes angles that are greater than 5°, 10°, 15°, 30°, 45°, or other threshold angle. In some embodiments, normal 8084 also depicts a line of sight for user 7002 at the head elevation shown in side view 9020, while the field of view associated with that viewpoint of the user (e.g., the viewpoint corresponds to a particular head elevation) is also depicted in FIG. 9C.

FIG. 9D shows a dashed line frame 9042 at the second home menu location, representing the location of home menu user interface 8012 just prior to computer system 101 dismissing home menu user interface 8012 (e.g., in response to detecting user input 9002 directed to representation 8026). Application user interface 9004 is displayed at a second application location behind dashed line frame 9042 and centered with respect to dashed line frame 9042 in at least one dimension (e.g., a lateral dimension, or along the x axis). Side view 9040 in FIG. 9D shows application user interface 9004 displayed in a plane substantially parallel to a plane of home menu user interface 8012 (e.g., and not substantially perpendicular to horizon 8008, and/or at least a majority of an area of application user interface 9004 is above horizon 8008). In some embodiments, application user interface 9004 that is positioned substantially parallel to home menu user interface 8012 is within a threshold angle (e.g., ±1°, ±2°, ±3°, ±5°, ±10°, or other angle) of home menu user interface 8012. In some embodiments, as shown in FIGS. 9C and 9D, both home menu user interface 8012 and application user interface 9004 are positioned above horizon 8008. In some embodiments, line 9008 in FIGS. 9D, which extends from the portion of user 7002 (e.g., the head portion, or an eye of user 7002, and/or a different part of the body of user 7002) to the characteristic portion of application user interface 9004, forms angle 9010 with normal 8084. In some embodiments, angle 9010 in FIG. 9D is identical in magnitude to angle 9010 in FIG. 9B. In some embodiments, the spatial relationship between a location of home menu user interface 8012 and a corresponding application user interface 9004 launched from a representation positioned on home menu user interface 8012 is the same regardless of the position and orientation of home menu user interface 8012 (e.g., whether application user interface 9004 is launched from representation 8026 in home menu user interface 8012 of FIG. 9B or of FIG. 9D). In some embodiments, the placement of application user interface 9004 in FIG. 9D relative to home menu user interface 8012 and/or the viewpoint of user 7002 follows the same parameters as those described above for FIG. 9B.

Figures 9E, 9F:
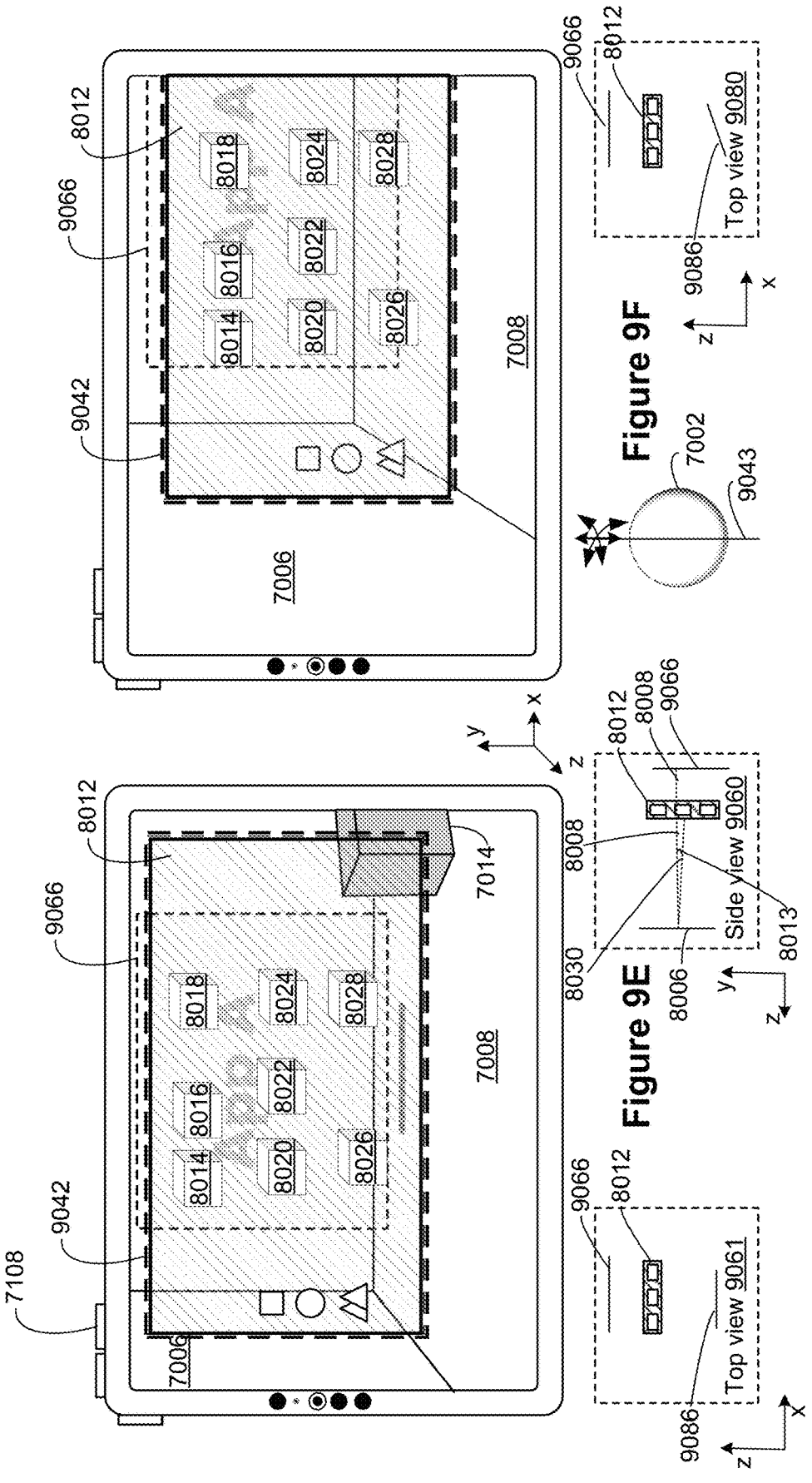

FIGS. 9E and 9F each show a subsequent invocation of home menu user interface 8012, where home menu user interface 8012 is displayed at a same position in XR three-dimensional environment 8003 upon reinvocation. The field of view visible via the display generation component 7100 as shown in FIG. 9E is the same as the field of view visible via display generation component 7100 in FIGS. 9A and 9B. Similar to FIGS. 9D, dashed line frame 9042 in FIG. 9E shows a prior location of home menu user interface 8012 (e.g., the prior placement of home menu user interface 8012 from which application interface 9004 was launched), which was displayed in response to a first user input (e.g., a first press of hardware button 7108, hand gesture, air gesture, gaze input, and/or other input). For example, FIG. 9E illustrates a view of XR three-dimensional environment 8003 after computer system 101 dismisses home menu user interface 8012 at the prior placement in response to detecting a user input directed at representation 8026. While displaying application user interface 9004, computer system 101 detects a second user input (e.g., a second press of hardware button 7108, hand gesture, air gesture, gaze input, and/or other input). A rotational posture and head elevation of the user when the second user input is detected is the same as that when the first user input resulting in the prior invocation of home menu user interface 8012 was detected (e.g., the user maintained the same rotational posture and head elevation between the prior invocation of home menu user interface 8012 and the subsequent invocation of home menu user interface 8012, or the user has changed her rotational posture and/or head elevation, but returned to the same rotational posture and head elevation at or prior to the time of the subsequent invocation of home menu user interface 8012).

In response to detecting the second user input, computer system 101 displays home menu user interface 8012 (e.g., the subsequent invocation) at the same position, within dashed line frame 9042, because the user is in the same position at the prior invocation of home menu user interface 8012 and at the subsequent invocation of home menu user interface 8012. Accordingly, due to the user being at the same position for each of the two invocations of home menu user interface 8012, home menu user interface 8012 is displayed at the same location (e.g., the first home menu location) in FIG. 9E as in FIG. 9A. In some embodiments, in conjunction or concurrently with displaying home menu user interface 8012 at the subsequent invocation, application user interface 9004 is visually deemphasized (e.g., application user interface 9004 becomes visually less prominent such as by becoming more translucent, defocused, less sharp, more blurred, lower in contrast, more transparent, or dimmer), illustrated as application user interface 9066 in FIG. 9E. Visually deemphasized application user interface 9066 may allow the user to better focus on navigating or interacting with home menu user interface 8012. In some embodiments, visually deemphasizing application user interface 9004 includes ceasing to display application user interface 9004.

Top view 9061 in FIG. 9E shows representation 9086 of a viewpoint of user 7002 and a position of home menu user interface 8012 upon the subsequent invocation. A location of home menu user interface 8012 in response to the second invocation is independent of the position of application user interface 9004 (e.g., in the example of FIG. 9E, home menu user interface 8012 following the second invocation coincidentally still has the same fixed spatial relationship with application user interface 9004, which in fact is due to home menu user interface 8012 being redisplayed at the first home menu location upon the second invocation in accordance with the viewpoint of user 7002 not having sufficiently changed between the successive invocations of home menu user interface 8012). Side view 9060 in FIG. 9E shows home menu user interface 8012 at the same location as in side view 8031 of FIG. 9A.

In FIG. 9F, in contrast to FIG. 9E, a rotational posture of the user has changed from that at the previous invocation of home menu user interface 8012 (e.g., as shown in FIG. 9A). For example, in FIG. 9F, the user's viewpoint is rotated counterclockwise about a vertical axis 9043 (e.g., parallel to a y-axis, and/or about an axis perpendicular to horizon 8008) compared to the rotational posture of the user in FIG. 9A. For example, a field of view visible via display generation component 7100 shown in FIG. 9F includes a larger portion of wall 7006, and physical object 7014 is no longer within the field of view visible via display generation component 7100.

In response to detecting a user input (e.g., a button press, crown rotation, an air pinch input, an air tap input, a pinch input, a tap input, a gaze input, and/or other input) for a subsequent invocation of the home menu user interface, and optionally, in accordance with a determination that a change in a head elevation and/or rotational posture of a user between a prior invocation of home menu user interface 8012 and a subsequent invocation of home menu user interface 8012 is less than a threshold change, as is the case in FIG. 9F, the computer system 101 displays home menu user interface 8012 at the same location (e.g., the first home menu location) as was previously displayed in FIG. 9A and FIG. 9E, even though the field of view of the user has changed. In some embodiments, the threshold may include a threshold rotation angle (e.g., ±3°, ±5°, ±10°, or other angle). In some embodiments, the threshold may include a threshold elevation angle change (e.g., ±0.5°, ±1°, ±3°, or other angle). In some embodiments, the threshold may include a threshold distance (e.g., greater than 10 cm, or greater than 30 cm). In some embodiments, the placement of home menu user interface 8012 at the subsequent invocation is made independently of the previous placement of home menu user interface 8012 (e.g., rather than the computer system 101 actively making the determination whether the change in the head elevation and/or the rotational posture is within a threshold, the placement of home menu user interface 8012 is simply determined based on the current head elevation and/or rotational posture of the user).

Between FIG. 9A and FIG. 9E, the head elevation of the user stays constant, whereas a rotational posture of the user has changed (e.g., counterclockwise or clockwise) at the subsequent invocation, compared to the prior invocation. Accordingly, top view 9080 in FIG. 9F shows representation 9086 of the viewpoint of user 7002 rotated counterclockwise (e.g., a rotation of her head, a rotation of her entire body), towards her left.

In contrast to displaying home menu user interface 8012 at the same location (e.g., first home menu location) as that shown in FIGS. 9A, 9E and 9F, in some embodiments, the user may move in the physical environment in addition to rotating and/or elevating a portion of her body (e.g., her head) to a new posture, or otherwise move by more than a threshold amount.

Figure 9H:
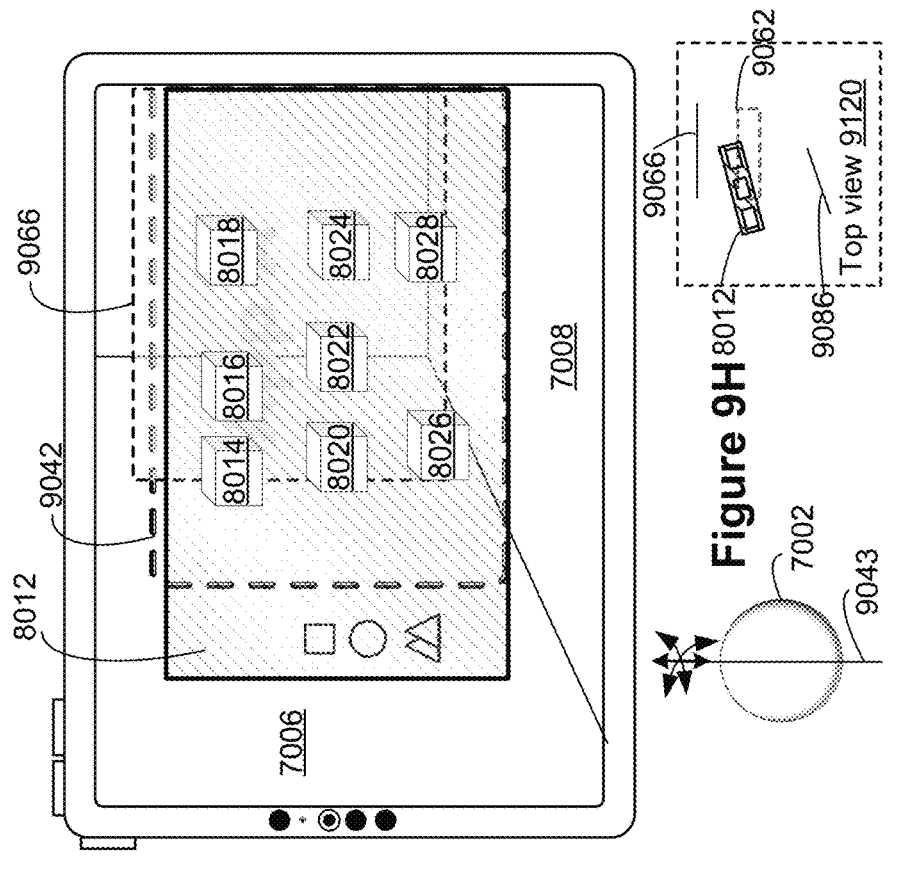
Figure 9G:
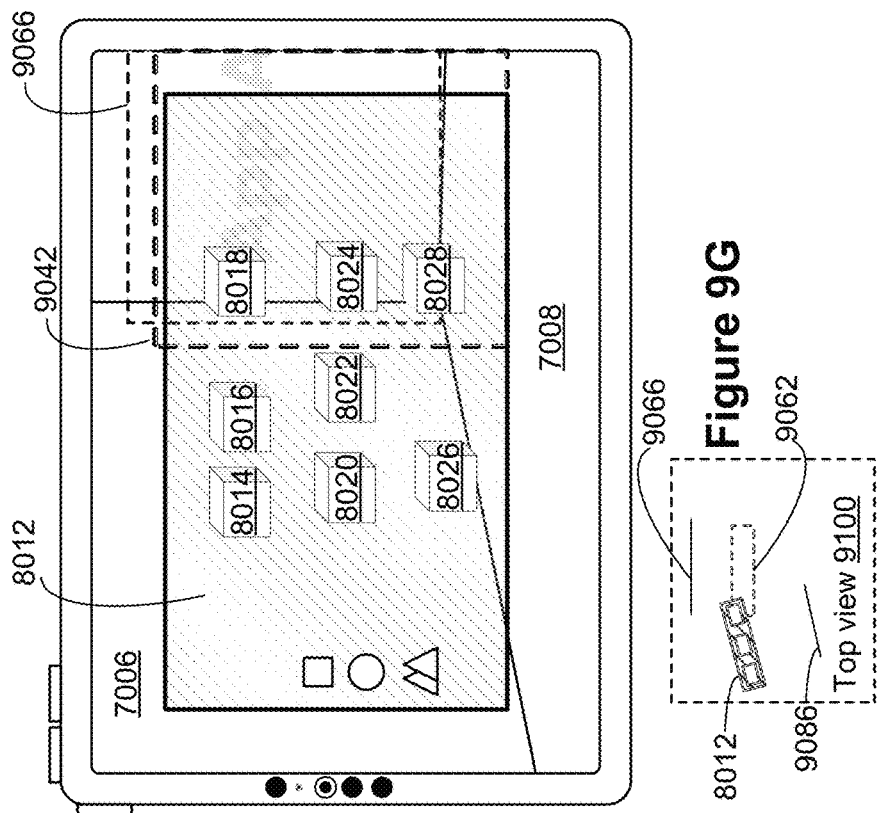

FIGS. 9G and 9H each show a subsequent invocation of home menu user interface 8012. In contrast to FIGS. 9E and 9F, in which a portion of a body (e.g., the head) of the user has not moved by more than a threshold amount between a prior invocation (e.g., immediately prior) and a subsequent invocation of home menu user interface 8012, FIG. 9G shows an example in which the user has moved her head and/or body by more than the threshold amount.

In accordance with a determination that a change in a head elevation and/or rotational posture of a user between a prior invocation of home menu user interface 8012 and a subsequent invocation of home menu user interface 8012 is greater than the threshold amount, as shown in FIG. 9G, and in response to detecting a user input (e.g., a button press, an air pinch input, an air tap input, a pinch input, a tap input, a gaze input, and/or other input) to reinvoke home menu user interface 8012, computer system 101 displays home menu user interface 8012 at an updated position that is displaced (e.g. along one or more of the y-direction and the x direction) from a previous position (e.g., first home menu location) of home menu user interface 8012. Top view 9100 shows dashed line frame 9062 representing the previous position of home menu user interface 8012 in response to the previous invocation (e.g., most recent prior invocation, or a prior invocation not immediately preceding the current invocation) and the current position of home menu user interface 8012 upon the subsequent invocation. A portion of home menu user interface 8012 overlaps with dashed line frame 9042 in FIG. 9G.

Similarly, FIG. 9H shows another example scenario in which the threshold for displaying the home menu user interface at a new location for a subsequent invocation is met (e.g., due to rotation and/or tilt of user 7002's head exceeding a threshold amount of angular change required for displaying the home menu user interface at a new location). FIG. 9H shows a smaller magnitude of change (e.g., relative to a posture of the user at the prior invocation) compared to the posture shown in FIG. 9G. As a result, top view 9120 shows a larger amount of overlap between home menu user interface 8012 and dashed line frame 9042. The field of view visible via display generation component 7100 in FIG. 9H also includes a larger portion of wall 7006 compared to the field of view visible in FIG. 9A.

In some embodiments, for changes in user posture (e.g., a rotational posture, or a displacement in one or more of a x, or z direction) that exceed the threshold, the placement of home menu user interface at its new location is based on head elevations and/or a rotational posture of the user, as described in FIGS. 8A-8G, independently of the location of the application user interface (e.g., visually deemphasized application user interface 9066) the user interacted with, prior to the subsequent invocation of the home menu user interface.

Unlike home menu user interface 8012, which remains in the same position after invocation until home menu user interface 8012 is dismissed (e.g., by launching an application from home menu user interface 8012, or by a subsequent user input to the hardware button 7108), a user can change a position of application user interface 9004 after the application is displayed (e.g., launched from home menu user interface 8012). For example, in response to detecting user input 9102 (e.g., an air pinch input, an air tap input, a pinch input, a tap input, a gaze input, and/or other input) (FIG. 9B) directed to the application user interface 9004

(e.g., to a frame grabber of the application user interface 9004), computer system 101 changes a position of application user interface 9004 in accordance with user input 9102 (e.g., moving application user interface 9004 as user input 9102 moves, or moving application interface 9004 by a discrete jump to the updated position upon conclusion of user input 9102). User input 9102 includes one or more of a selection input (e.g., performed with an air tap or air pinch input, gaze input, a button press, or a tap on a touch-sensitive surface) and/or a movement input (e.g., performed with an air pinch and drag, or gaze, or a hardware input that is followed by movement of the hardware input device). In FIG. 9B, user input 9102 includes a movement input that shifts the application user interface 9004 upwards and leftwards (e.g., along the y-axis and the x-axis) to the position shown in FIG. 9I. User input 9102 shifts application user interface 9004 leftward to cover a larger portion of wall 7006 that is made visible by the display generation component 7100. Side view 9140 in FIG. 9I shows that a greater portion of application user interface 9004 is elevated above horizon 8008 than in side view 9006 in FIG. 9B.

Thus, in some circumstances, home menu user interface 8012 can be repositioned from a current location to a different (e.g., user-requested, or automatically suggested) location by first being dismissed from its current position (e.g., by a press input on hardware button 7108, launching an application from the home menu user interface, or interacting with an application user interface concurrently displayed with the home menu user interface), and then being re-invoked (e.g., by a press input on hardware button 7108, by a hand gesture, or a gaze input, and/or another type of input) at a different location based on changed rotational posture and/or changed head elevation of the user, as described with respect to FIGS. 8B-8G and FIGS. 9G and 9H.

Unlike FIGS. 9B-9H, FIG. 9J shows a different spatial relationship between a position of home menu user interface 8012 and a position of application user interface 9004 launched from home menu user interface 8012, compared to the spatial relationship illustrated in FIGS. 9B and 9D. In some circumstances, a height dimension (e.g., along the y-axis) of application user interface 9004' is larger than a vertical distance (e.g., along the y-axis) between floor 7008 and horizon 8008. As shown in side view 9160 of FIG. 9J, in such a scenario, at least a portion of application user interface 9004' would intersect (e.g., collide with, or be blocked by) floor 7008 if line 9008 were to have the same magnitude of angle 9010 and intersect application user interface 9004' at the same characteristic portion as that shown in FIG. 9B.

Figures 9I, 9J:
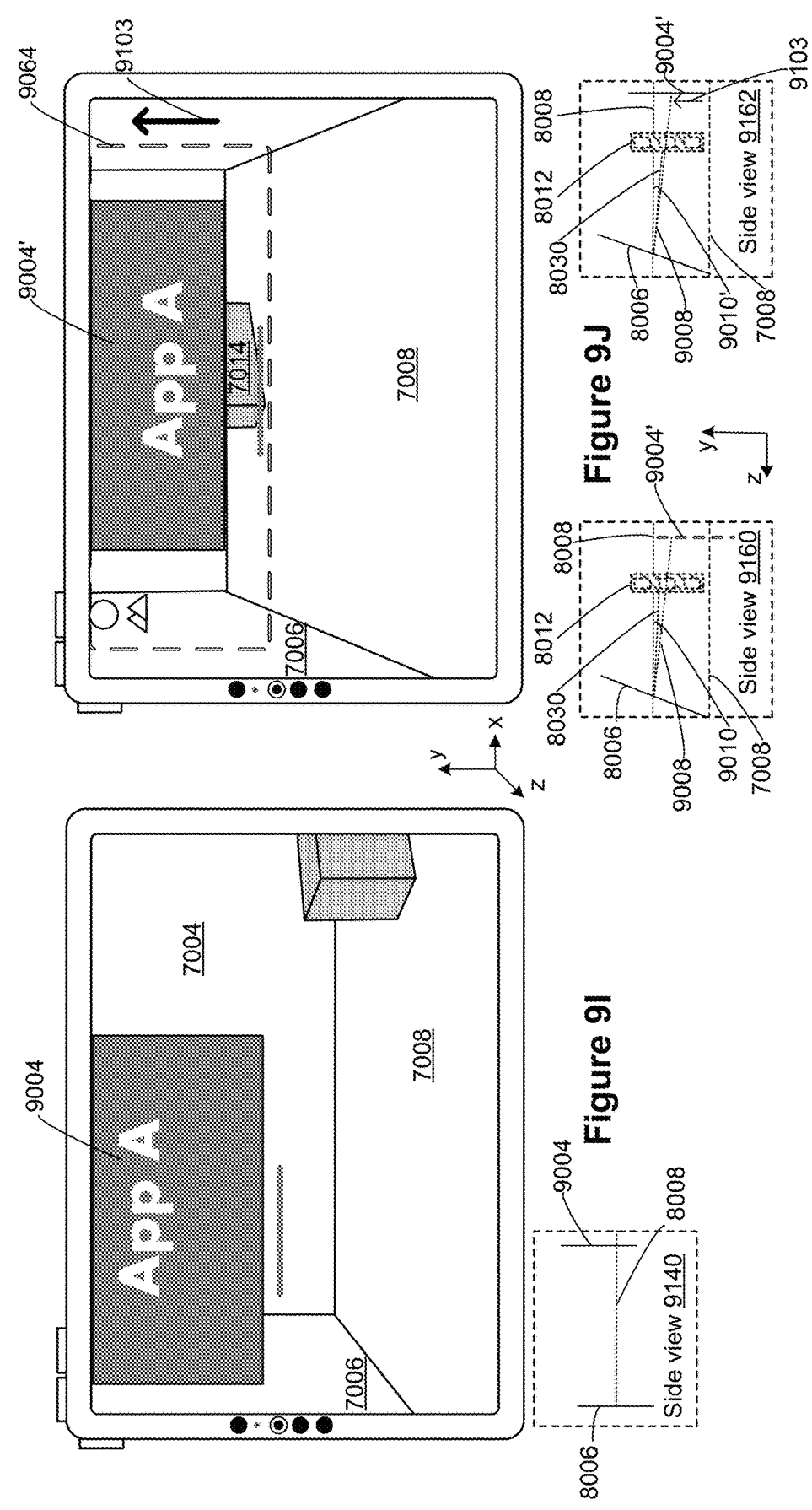

Instead of displaying application user interface 9004' at a position having the spatial relationship described in reference to FIGS. 9B and 9D, computer system 101 displays application user interface 9004' at a vertically offset position (e.g., offset to a position that is higher relative to line 9008 compared to that shown in FIGS. 9B and 9D), indicated schematically by arrow 9103 in FIG. 9J so that a lowest portion of application user interface 9004' does not intersect and is not blocked by floor 7008, as shown in side view 9162. For example, the vertically offset position results in an angle 9010' that is smaller than angle 9010 (e.g., angle 9010' is between 0.1° to 1.5° smaller, or more depending on the size of application 9004', than angle 9010). In some embodiments, a distance (e.g., along a depth dimension, and/or a radial distance from the viewpoint of the user) of application user interface 9004' from a viewpoint of the user remains the same (e.g., is the same as the distance between the viewpoint of the user and application user interface 9004) even though the vertical offset is changed.

While side views 9160 and 9162 show line 8006 that represents a side profile of a representation of user 7002 as pointing downwards (e.g., having a head elevation that points lower than horizon 8008), the vertical offset of application user interface 9004' is also provided in scenarios in which the viewpoint of the user is parallel to or above horizon 8008. For example, in some embodiments, horizon 8008 is repositioned at a lower height for a user who is sitting on the ground, such as on floor 7008 (e.g., horizon 8008 is re-positioned at eye-level height of the user who is sitting), and application user interface 9004' is displayed at a vertically offset position if a height dimension (e.g., along the y-direction) of application user interface 9004' is larger than the vertical distance (e.g., along the y-direction) between the (lowered) horizon 8008 and floor 7008. The vertical placement of the application user interface 9004' is still offset, in such a scenario, even though the head elevation of the user is level with respective to horizon 8008 (e.g., not pointing down towards floor 7008, nor up towards the ceiling).

Figures 9K, 9L:
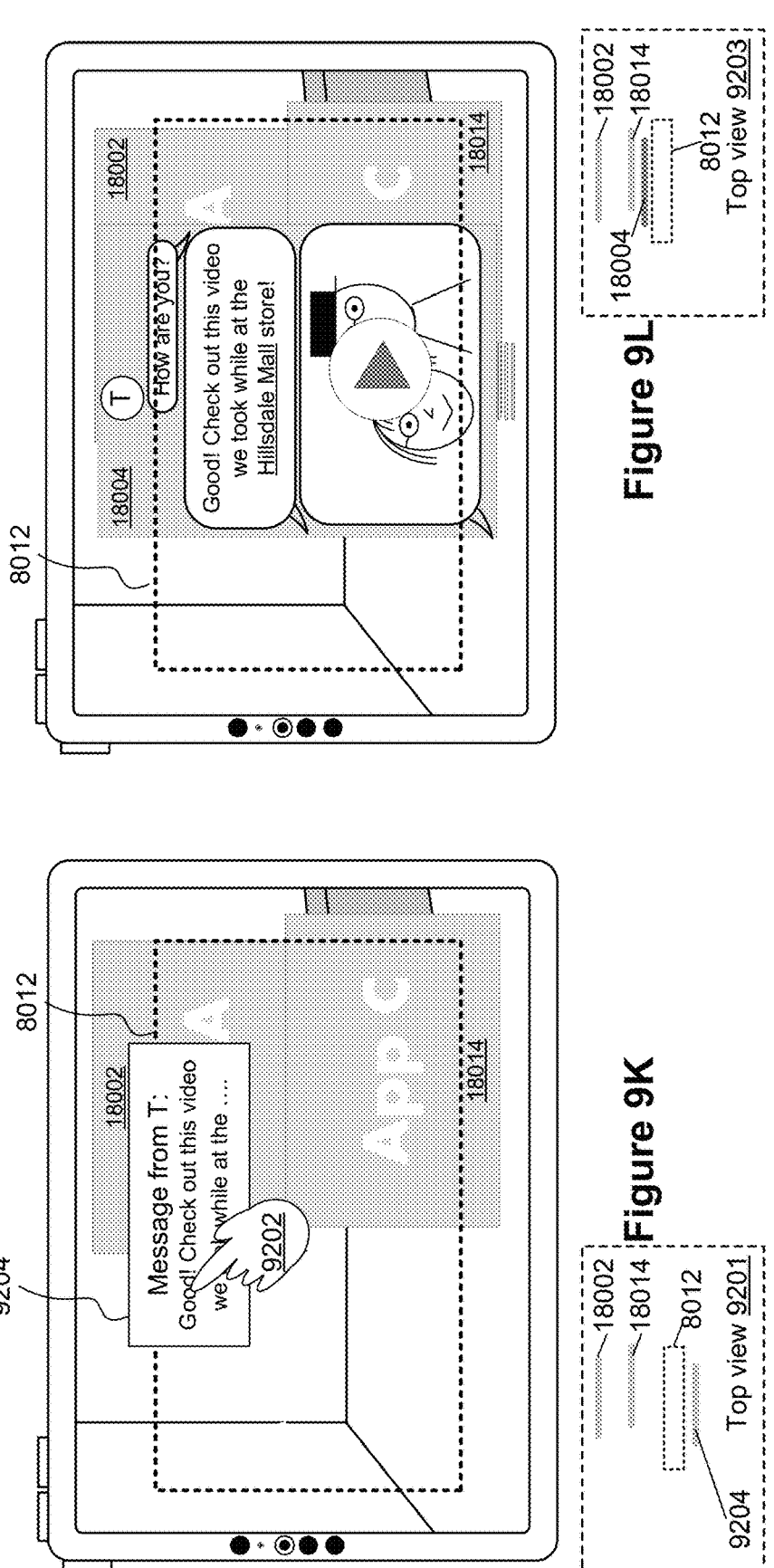

FIGS. 9K-9L show an example of displaying a user interface of an application in response to detecting a user input that corresponds to a selection, in a notification message, of a selectable representation associated with a respective application (e.g., an air pinch input, an air tap input, a pinch input, a tap input, a gaze input, and/or other input directed to the selectable representation associated with the respective application).

FIG. 9K shows user interface 18002 of a first application, Application A, and user interface 18014 of a second application, Application C, and notification message 9204 in a viewport of the three-dimensional environment. In some embodiments, the notification message is a message generated by a system application and provides an update about a status of computer system 101. In some embodiments, the notification message corresponds to a received/incoming event associated with a respective application. Home menu user interface 8012, represented by a dotted frame, is either displayed in the viewport at the location indicated by the dotted frame, or would be displayed at that location in the three-dimensional environment if invoked, while the viewport in FIG. 9K is displayed. Top view 9201 shows that notification message 9204 is displayed at a location closer to a viewpoint of the user than user interfaces 18002 and 18014.

In the example shown in FIG. 9K, notification message 9204 is a notification about an incoming instant-messaging communication from T (e.g., a user of a different electronic device than the electronic device displayed in FIG. 9K). In some embodiments, the notification message provides brief or abbreviated information about the incoming event or communication. In response to detecting user input 9202 (e.g., an air pinch input, an air tap input, a pinch input, a tap input, a gaze input, and/or other input) directed to notification message 9204, a user interface of an application associated with the notification message is displayed in the viewport, as shown in FIG. 9L. For example, user interface 18004 corresponds to a user interface of an instant-messaging application that is associated with the content of notification message 9204. User interface 18004 is displayed at a location associated with home menu user interface 8012 (e.g., with a fixed spatial offset from a location of home menu user interface 8012 in the viewport), as further described above in reference to FIGS. 9A-9J, and method 14000 of FIG. 14. Top view 19203 shows that user interface

18004 is displayed at a location further from the viewpoint of the user than home menu user interface 8012.

Figure 9N:
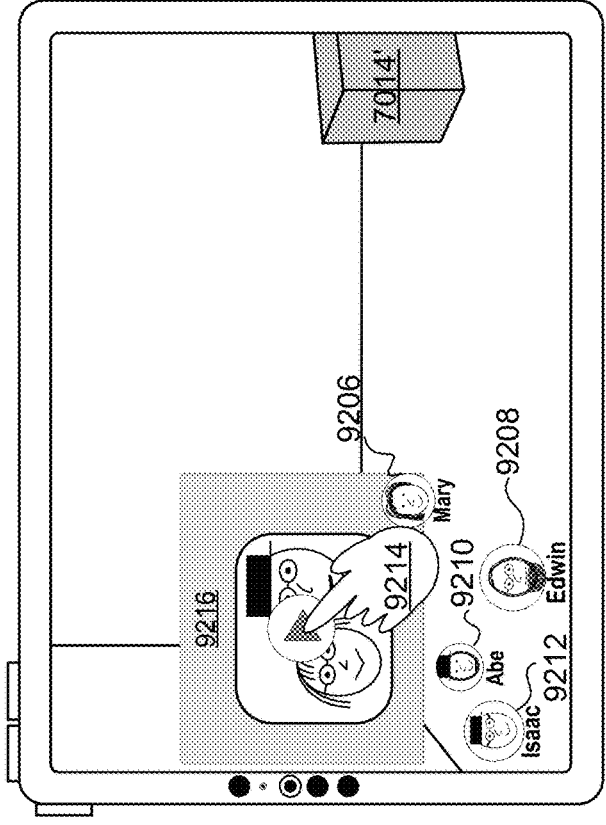
Figure 9M:
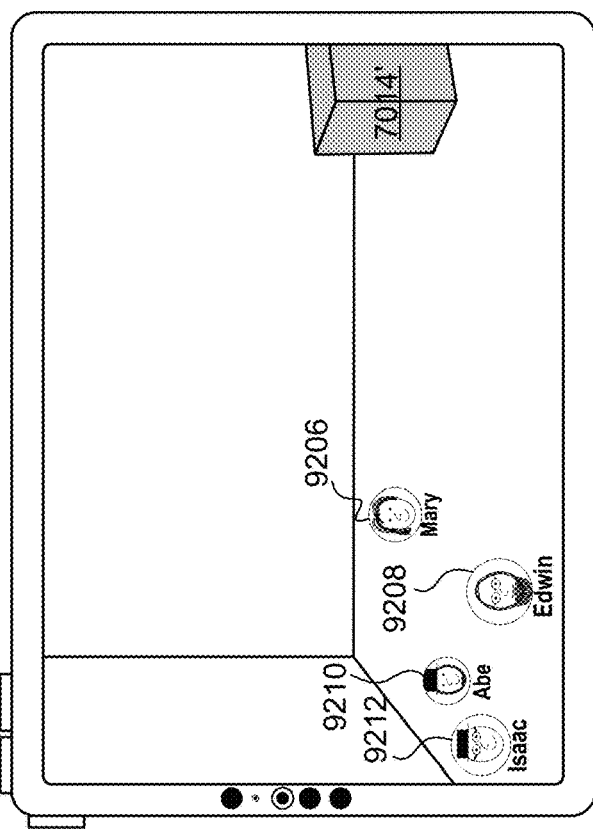
Figure 9O:
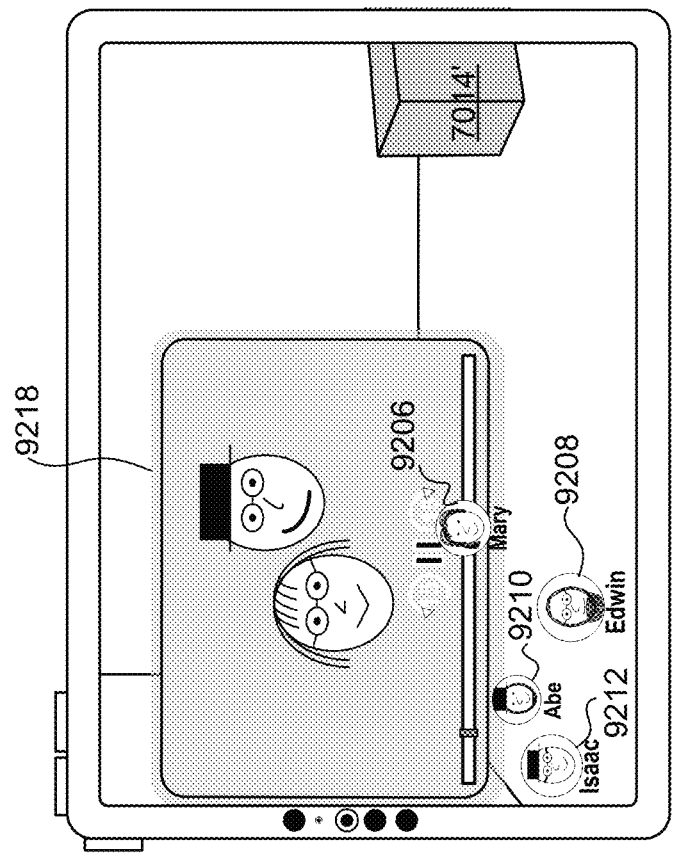
Figure 10A:
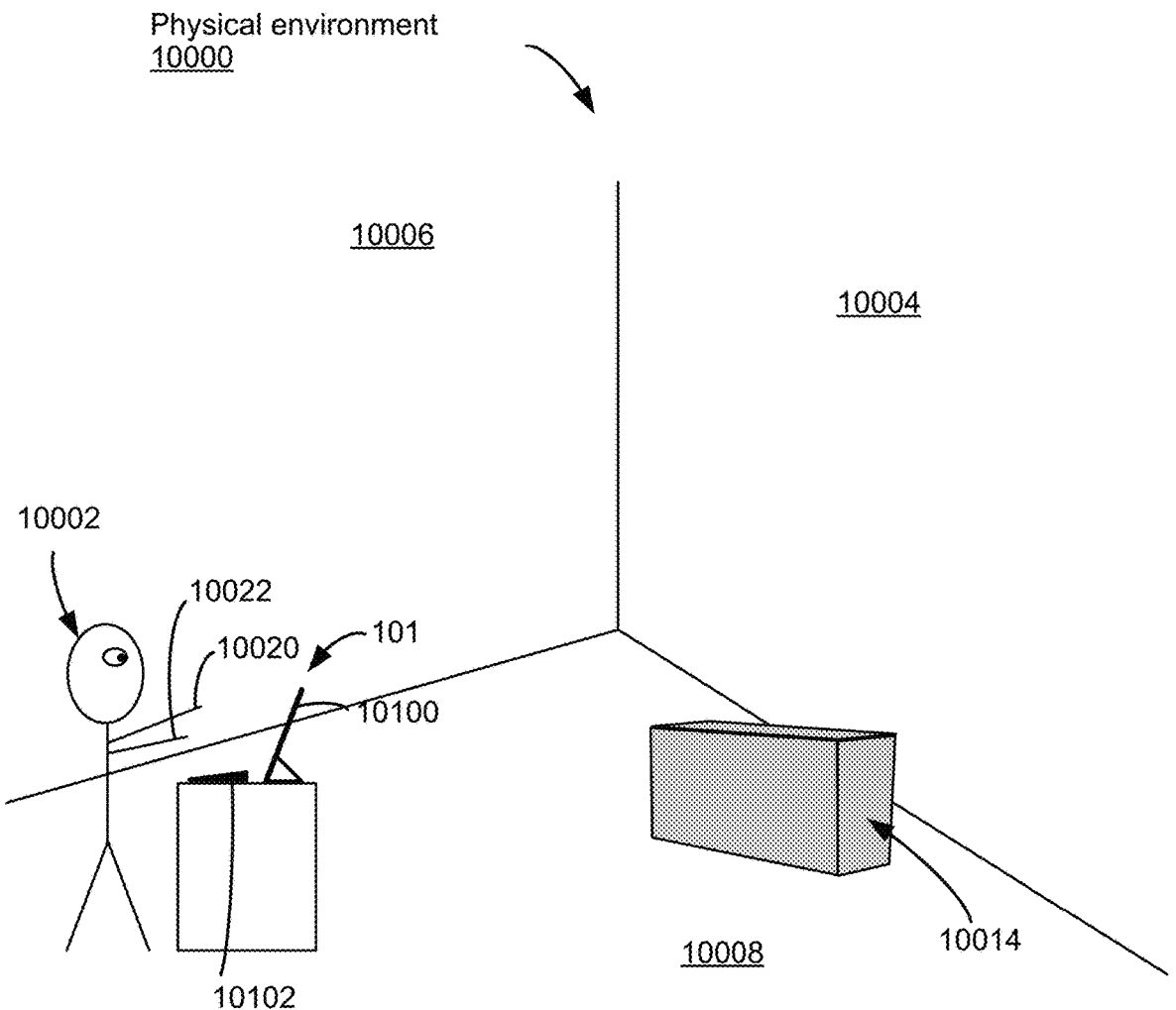
FIGS. 10A-10Q illustrate example techniques for using a pluck gesture to remove an object from a collection of objects in a mixed reality three-dimensional environment, and for providing continuous feedback to a user while performing a pluck gesture in a mixed-reality three-dimensional environment, in accordance with some embodiments.

FIGS. 9M-9O show an example of displaying a user interface of an application in a real-time communication session.

FIG. 9M shows representations 9206, 9208, 9210, and 9212 of four participants in a real-time communication session. In some embodiments, FIG. 9M is a viewport of the three-dimensional environment from a viewpoint of a user who is a participant in the real-time communication session, but whose representation is not displayed in the viewport (e.g., there are at least five participants to the real-time communication session). In some embodiments, the viewport illustrated in FIG. 9M is the viewport of one of the four participants.

FIG. 9N shows the user introducing media playback content in user interface 9216 to the real-time communication session. In some embodiments, the user shares the media playback content on computer system 101 within the real-time communication session, and the opened playback content is displayed on a user interface at a location (e.g., automatically placed a default location, or automatically placed at a location that maximizes a viewing area of the media playback content for a majority of the participants) corresponding to the real-time communication session. In some embodiments, the user drags user interface 9216 from a different portion of the three-dimensional environment to a region of the three-dimensional environment within which the real-time communication session takes place. In some scenarios, once the media playback content is within the region of the real-time communication session, the placement of the media playback content is automatically determined and executed by computer system 101. In some embodiments, after the media playback content is placed within the real-time communication session, in response to detecting user input 9214 (e.g., a tap input, click input, or air gesture) that corresponds to selection of the selectable representation of the media playback content in user interface 9216, one or more (e.g., all, or a majority of) participants in the real-time communication are enabled to view the content within the real-time communication session, as shown in FIG. 9O. In some embodiments, the user interface 9216 is not visible to other participants in the real-time communication session until user input 9214 (e.g., an air pinch input, an air tap input, a pinch input, a tap input, a gaze input, and/or other input) is detected by the computer system 101.

In some embodiments, the viewport shown in FIG. 9M transitions directly to the viewport shown in FIG. 9O if another participant (e.g., a participant other than the user whose viewport of the three-dimensional environment is displayed in FIGS. 9M-9O) adds the media playback content in user interface 9216 to the real-time communication session.

In FIG. 9O, user interface 9218 corresponding to the activation of the playback of media content displayed in user interface 9216 is displayed in the viewport for one or more participants of the real-time communication session. In some embodiments, user interface 9218 is placed (e.g., at a location) near a representation of one or more participants of the real-time communication sessions (e.g., nearest to the representation of the participant who activated the display of the media playback content, or nearest to a representation of a participant selected by the user who activates the display of the media playback content). In some embodiments, user interface 9218 is placed at a location visible to one or more of the participants of the real-time communication session.

Additional descriptions regarding FIGS. 9A-9O are provided below in reference to method 14000 described with respect to FIG. 14.

FIGS. 10A-10Q illustrate examples of using a pluck gesture for removing (e.g., or dragging and dropping) an object from a collection of objects in a mixed reality three-dimensional environment, and example techniques for providing continuous feedback to a user while performing a pluck gesture in a mixed-reality three-dimensional environment. FIG. 15 is a flow diagram of an exemplary method 15000 for using a pluck gesture to remove an object from a collection of objects in a mixed reality three-dimensional environment. FIG. 16 is a flow diagram of an exemplary method 16000 for providing continuous feedback to a user while performing a pluck gesture in a mixed-reality three-dimensional environment. The user interfaces in FIGS. 10A-10Q are used to illustrate the processes described below, including the processes in FIGS. 15 and 16.

FIG. 10A illustrates an example physical environment 10000 that includes user 10002 interacting with computer system 101. As shown in the examples in FIGS. 10A-10Q, display generation component 10100 of computer system 101 is a touchscreen placed on a table in front of user 10002. In some embodiments, the display generation component of computer system 101 is a head-mounted display worn on user 10002's head (e.g., what is shown in FIGS. 10A-10Q and FIGS. 11A-11L as being visible via display generation component 10100 of computer system 101 corresponds to user 10002's field of view when wearing a head-mounted display). In some embodiments, the display generation component is a standalone display, a projector, or another type of display. In some embodiments, the computer system is in communication with one or more input devices, including cameras or other sensors and input devices that detect movement of the user's hand(s), movement of the user's body as whole, and/or movement of the user's head in the physical environment. In some embodiments, the one or more input devices detect the movement and the current postures, orientations, and positions of the user's hand(s), face, and/or body as a whole. In some embodiments, user inputs are detected via a touch-sensitive surface or touchscreen (e.g., trackpad 10102). In some embodiments, the one or more input devices include an eye tracking component that detects location and movement of the user's gaze. In some embodiments, the display generation component, and optionally, the one or more input devices and the computer system, are parts of a head-mounted device that moves and rotates with the user's head in the physical environment, and changes the viewpoint of the user in the three-dimensional environment provided via the display generation component. In some embodiments, the display generation component is a heads-up display that does not move or rotate with the user's head or the user's body as a whole, but, optionally, changes the viewpoint of the user in the three-dimensional environment in accordance with the movement of the user's head or body relative to the display generation component. In some embodiments, the display generation component (e.g., a touchscreen) is optionally moved and rotated by the user's hand relative to the physical environment or relative to the user's head, and changes the viewpoint of the user in the three-dimensional environment in accordance with the movement of the display generation component relative to the user's head or face or relative to the physical environment.

Physical environment 10000 includes a physical object 10014, physical walls 10004 and 10006, and a physical floor 10008. Computer system 101 is positioned in front of user

10002, such that user 10002's left hand 10020 and right hand 10022 are free to interact with computer system 101. Computer system 101 includes or is in communication with a display generation component 10100 and trackpad 10102 (e.g., representing an input surface, such as a touch-sensitive surface, or a surface that is not touch-sensitive, where inputs via the non-touch-sensitive surface (e.g., or via a touch-sensitive surface that is not being used to detect touch inputs) are detected via one or more sensors that track the location and/or movement of the inputs (e.g., optical sensors tracking the user's hands and/or fingers relative to the non-touch-sensitive surface, such as by tracking movement of the user's hands on a desk, table, or on another portion of the user's body such as their leg or arm).

In some embodiments, one or more portions of the view of physical environment 10000 that is visible to user 10002 via display generation component 10100 are digital pass-through portions that include representations of corresponding portions of physical environment 10000 captured via one or more image sensors of computer system 101. In some embodiments, one or more portions of the view of physical environment 10000 that is visible to user 10002 via display generation component 10100 are optical passthrough portions, in that user 10002 can see one or more portions of physical environment 10000 through one or more transparent or semi-transparent portions of display generation component 10100.

FIG. 10B (e.g., FIGS. 10B1 and 10B2 where a user interface analogous to the user interface shown in FIG. 10B1 is displayed on HMD 7100a in FIG. 10B2) illustrates a view of a three-dimensional environment 10000' that is visible to user 10002 via display generation component 10100 of computer system 101. The view of the three-dimensional environment 10000' (also called view 10000' for ease of reference) of FIG. 10B optionally includes representations of objects in a physical environment such as physical environment 10000 (e.g., as captured by one or more cameras of computer system 101) or optical views of objects in the physical environment (e.g., as visible through one or more transparent or semi-transparent portions of display generation component 10100). For example, in FIGS. 10B, the representation or optical view of three-dimensional environment 10000' includes representation (or optical view) 10004' of wall 10004 of FIG. 10A (also called wall 10004' for ease of reference), representation (or optical view) 10006' of wall 10006 of FIG. 10A (also called wall 10006' for ease of reference), representation (or optical view) 10008' of physical floor 10008 of FIG. 10A (also called floor 10008' for ease of reference), and representation (or optical view) 10014' of physical box 10014 of FIG. 10A (also called box 10014' for ease of reference) and/or a representation of the user's hand 10020'.

In addition, view 10000' includes one or more computer-generated objects, also called virtual objects, displayed via display generation component 10100, such as virtual region 1020 (e.g., which is not a representation or optical view of a physical region in physical environment 10000), and objects 1002, 1004, 1006, 1008, 1010, 10I2, 1014, 1016, and 1018 (also collectively called objects 1002-1018 or O1 1002-O9 1018 for case of reference) (e.g., which are not representations or optical views of physical objects in physical environment 10000). In some embodiments, virtual region 1020 corresponds to a user interface of a software application executing on computer system 101 (e.g., a photos application, file management application, document management application, or other software application). In some embodiments, the virtual region 1020 represents a gallery, a folder, or other collection of objects 1002-1018 (and optionally other objects that are not visible in FIG. 10B but are part of the collection of objects included in virtual region 1020). In some embodiments, objects 1002-1018 correspond to items of the same type (e.g., images, documents, thumbnails, books, representations of web pages), similar type, or items of different types. In some embodiments, virtual region 1020 is transparent or semi-transparent. In some embodiments, virtual region 1020 constrains free movement of objects 1002-1018 in view 10000'. For example, if objects 1002-1018 are scrolled, objects 1002-1018 move within boundaries of virtual region 1020. The dashed region (e.g., outline, or the like) that delineates virtual region 1020 is included in FIGS. 10B-10Q for illustrative purposes and is optionally not displayed via display generation component 10100.

With reference to FIGS. 10B-10Q, top view 1036 illustrates virtual region 1020 and objects 1002-1018 as seen from above (e.g., from the top) (e.g., instead of seen from the front as in view 10000'). For example, top view 1036 illustrates that, looking from above, objects 1002, 1004, and 1006 (also collectively called objects 1002-1006 for case of reference) are visible while objects 1008, 1010, 10I2, 1014, 1016, and 1018 are occluded by objects 1002-1006 (e.g., objects 1002-1006 occlude objects 1008, 1010, 10I2, 1014, 1016, and 1018 when looking from above since objects 1002-1018 are displayed at the same distance from user 10002 (specifically, when viewed from above, object 1002 occludes objects 1008 and 1014; object 1004 occludes object 1010 and 1016; and object 1006 occludes object 1012 and 1018)).

With reference to FIGS. 10B-10E, view 1038 illustrates a representation of a Cartesian coordinate system of the three-dimensional environment 10000'. The Cartesian system shown in view 1038 is based on three mutually perpendicular coordinate axes: the x-axis 1102, the y-axis 1104, and the z-axis 1106. For a given view 1038 for a respective figure, the current location 1101 of hand 10020 in physical environment 10000 corresponds to a simulated location in the Cartesian coordinate system that is illustrated with a black dot in view 1038 (e.g., as in FIG. 10B). A respective preceding simulated location of hand 10020 in the Cartesian system is illustrated with a white-filled circle in view 1038 (e.g., as in FIG. 10D). Movement of hand 10020 (distance and direction) in the physical environment 10000 is illustrated with a dashed arrow representing corresponding movement in the Cartesian coordinate system of the three-dimensional environment (e.g., as in FIG. 10D). For example, left-right movements of hand 10020 in the physical environment 10000 correspond to x-axis movements in the Cartesian system, up-down movements in the physical environment 10000 (in directions substantially perpendicular to the left-right movements) correspond to y-axis movements in the Cartesian system, and other movements in physical environment 10000 toward or away from user 10002 correspond to z-axis movements in the Cartesian system. Further, left-right movements of hand 10020 in the physical environment 10000 correspond to simulated left-right movements in the three-dimensional environment 10000', up-down movements in the physical environment 10000 (in directions substantially perpendicular to the left-right movements) correspond to simulated up-down movements in the three-dimensional environment 10000', and other movements in physical environment 10000 toward or away from a viewpoint of user 10002 correspond to simulated movements toward or away from the viewpoint of user

10002 (e.g., at an origin of the Cartesian system) in the three-dimensional environment 10000'.

In some embodiments, another coordinate system such as a radial coordinate system or spherical coordinate system (e.g., the spherical coordinate system illustrated in FIGS. 10F-11L) is used to represent movement and locations of hand 10020.

With reference to FIGS. 10B-10Q, gaze and/or air gestures, including direct and/or indirect pinch gestures, are used to interact with objects 1002-1018 in view 10000', according to some embodiments. In some embodiments, touch inputs detected via trackpad 10102 are used to interact with objects 1002-1018 in view 10000' in addition to or alternatively to using air gestures and/or gaze (e.g., left-right movements along trackpad 10102 correspond to x-axis movements in the Cartesian system, up-down movements along trackpad 10102 (in directions perpendicular to the left-right movements) correspond to y-axis movements in the Cartesian system, and other movements normal to trackpad 10102 (such as contact intensity applied to and/or height above trackpad 10102) correspond to z-axis movements in the Cartesian system).

FIG. 10B illustrates a scenario in which user 10002 is interacting with object O5 1010. Cursor 1034 in FIG. 10B indicates that user 10002's attention is directed to object O5 1010 as captured by one or more cameras of computer system 101 (e.g., user 10002's gaze is directed to a location in object O5 1010). In some embodiments, when user 10002's gaze is directed to object O5 1010, object O5 1010 is the target of user 10002's inputs. While user 10002's gaze is directed to a location in object O5 1010, computer system 101 detects a gesture, such as a long air pinch gesture performed with hand 10020 (e.g., an index and thumb finger of hand 10020 making contact with one another for a threshold amount of time while hand 10020 remains stationary by not moving more than a threshold amount during the threshold amount of time).

FIG. 10C (FIGS. 10C1 and 10C2) shows a transition from FIG. 10B in response to the computer system 101 detecting the long air pinch gesture while user 10002's gaze is directed to the location in object O5 1010. Since the long air pinch gesture does not involve a movement input, current location 1101 of hand 10020 in FIG. 10C is not changed relative to the location 1101 of hand 10020 in FIGS. 10B, as illustrated in view 1038. In response to detecting the long air pinch gesture, context menu 1022 for virtual object O5 1010 is displayed in view 10000'. Context menu 1022 includes one or more control options for performing one or more functions with respect to virtual object O5 1010 (e.g., delete, remove from collection, share, copy, designate as favorite, and/or other control options). In conjunction with displaying the context menu 1022, object O5 1010 slightly pops out (e.g., from the plane of the other objects in virtual region 1020), e.g., moves towards user 10002 as illustrated in top view 1036 of FIG. 10C. In some embodiments, in addition to moving towards user 10002, object O5 1010 enlarges and/or reveals a preview of content of object O5 1010. Further, in response to detecting the long air pinch gesture, object O5 1010 enters a "pluckable" state in which object O5 1010 can be dragged out, pulled out or otherwise removed from virtual region 1020 in response to further inputs directed to the object (e.g., movement towards the viewpoint of the user, lateral or vertical movement, or a combination of movement towards the viewpoint of the user, lateral movement and/or vertical movement. For example, while object O5 1010 is in the "pluckable" state, object O5 1010 can be disassociated from the collection of objects 1002-1018 and relocated in view 10000' in response to movement inputs (e.g., continuous movement in any direction and/or a subsequent gesture, such as a short pinch followed by a drag gesture). In some embodiments, if user 10002 releases the air pinch gesture before a threshold amount of time has passed (e.g., the amount of time used as a criterion to determine whether an air pinch is a short air pinch or a long air pinch), the object O5 1010 does not enter the "pluckable" state, and context menu 1022 is not displayed. In some embodiments, an audio effect is provided when object O5 1010 enters the "pluckable" state. In some embodiments, while object O5 1010 is selected (e.g., while the long air pinch detected in FIG. 10B is maintained or in response to a subsequent air pinch gesture), the computer system 101 detects lateral movement (e.g., in a leftward direction, in the example of FIGS. 10C-10E) of the hand 10020 in the physical environment 10000, e.g., movement of hand 10020 substantially parallel to virtual region 1020.

Figures 10D, 10E:
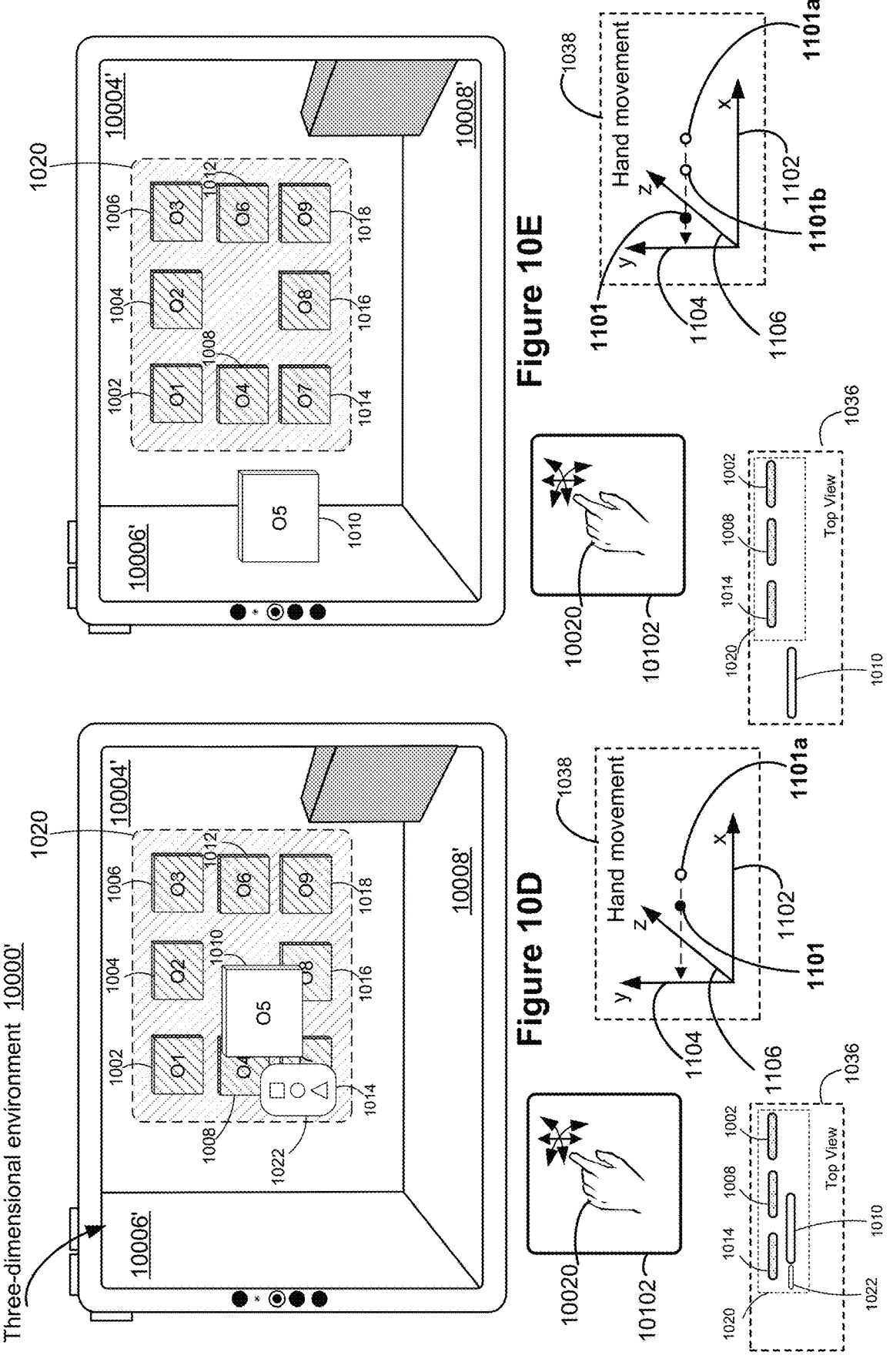

FIG. 10D shows a transition from FIG. 10C in response to detecting the lateral movement of the hand 10020 in the physical environment 10000 while object O5 1010 is selected (e.g., while an air pinch is maintained). For example, view 1038 illustrates movement of hand 10020 from previous location 1101*a* (which optionally corresponds to location 1101 of hand 10020 in view 1038 in FIGS. 10B-10C) to current location 1101 (e.g., parallel or along x-axis 1102, where a plane of virtual region 1020 (e.g., facing user 10002) is also parallel to x-axis 1102). Also, top view 1036 shows movement of object O5 1010 (and context menu 1022) in a leftward direction, where object O5 1010 is not yet removed from the collection of objects 1002-1018 included in virtual region 1020. In FIG. 10D, view 1038 also indicates that further (continuous) movement of hand 10020 in a leftward direction is detected while object O5 1010 is selected, e.g., further lateral movement that is substantially parallel to virtual region 1020.

FIG. 10E shows a transition from FIG. 10D in response to detecting the further lateral movement of hand 10020, such that the lateral movement of hand 10020 (e.g., relative to when object O5 1010 entered the "pluckable" state as shown in FIG. 10C) meets a threshold amount of movement along x-axis 1102. In response to detecting movement of hand 10020 that reaches the threshold amount of movement along x-axis 1102, object O5 1010 is removed from the virtual region 1020 and positioned to the left side of virtual region 1020. For example, view 1038 illustrates the movement path of hand 10020 from previous location 1101*a* (which optionally corresponds to location 1101 of hand 10020 in view 1038 in FIGS. 10B-10C) to location 1101*b* (which optionally corresponds to location 1101 of hand 10020 in view 1038 in FIG. 10D) and then to current location 1101 in FIG. 10E (e.g., via movement parallel or along x-axis 1102 and/or substantially parallel to virtual region 1020). Also, top view 1036 shows movement of object O5 1010 in the leftward direction outside virtual region 1020 (e.g., in accordance with the leftward movement of hand 10020 to and beyond current location 1101 in FIG. 10E). In conjunction with removing object O5 1010 from virtual region 1020, object O5 1010 is removed from or disassociated from the collection of objects 1002-1018 included in virtual region 1020 (in response to detecting the movement of hand 10020 that reaches the threshold amount of movement along x-axis 1102). In some embodiments, in conjunction with removing object O5 1010 from virtual region 1020, context menu 1022 is hidden from display (e.g., as illustrated in FIG. 10E).

In some embodiments, once in the "pluckable" state as illustrated in FIGS. 10C, object O5 1010 is removed from the collection of objects 1002-1018 included in virtual region 1020 in response to detecting movement of hand 10020 that reaches a threshold amount of movement along y-axis 1104 and/or z-axis 1106. In some embodiments, respective threshold amounts of movement along x-axis 1102, y-axis 1104, and/or z-axis 1106 required to remove a "pluckable" object from the collection are the same amount or different amounts. For example, the threshold amount of movement along z-axis 1106 that is needed to remove "pluckable" object O5 1010 is shorter than the respective threshold amounts of movement along x-axis 1102 or y-axis 1104. In some embodiments, an object such as object O5 1010 can be transitioned to the "pluckable" state and thus removed from the collection of objects 1002-1018 without first detecting a long pinch gesture (e.g., without the initial air pinch gesture meeting the threshold duration for a long pinch gesture), as described in more detail herein with reference to FIGS. 10F-10Q.

Figures 10F, 10G:
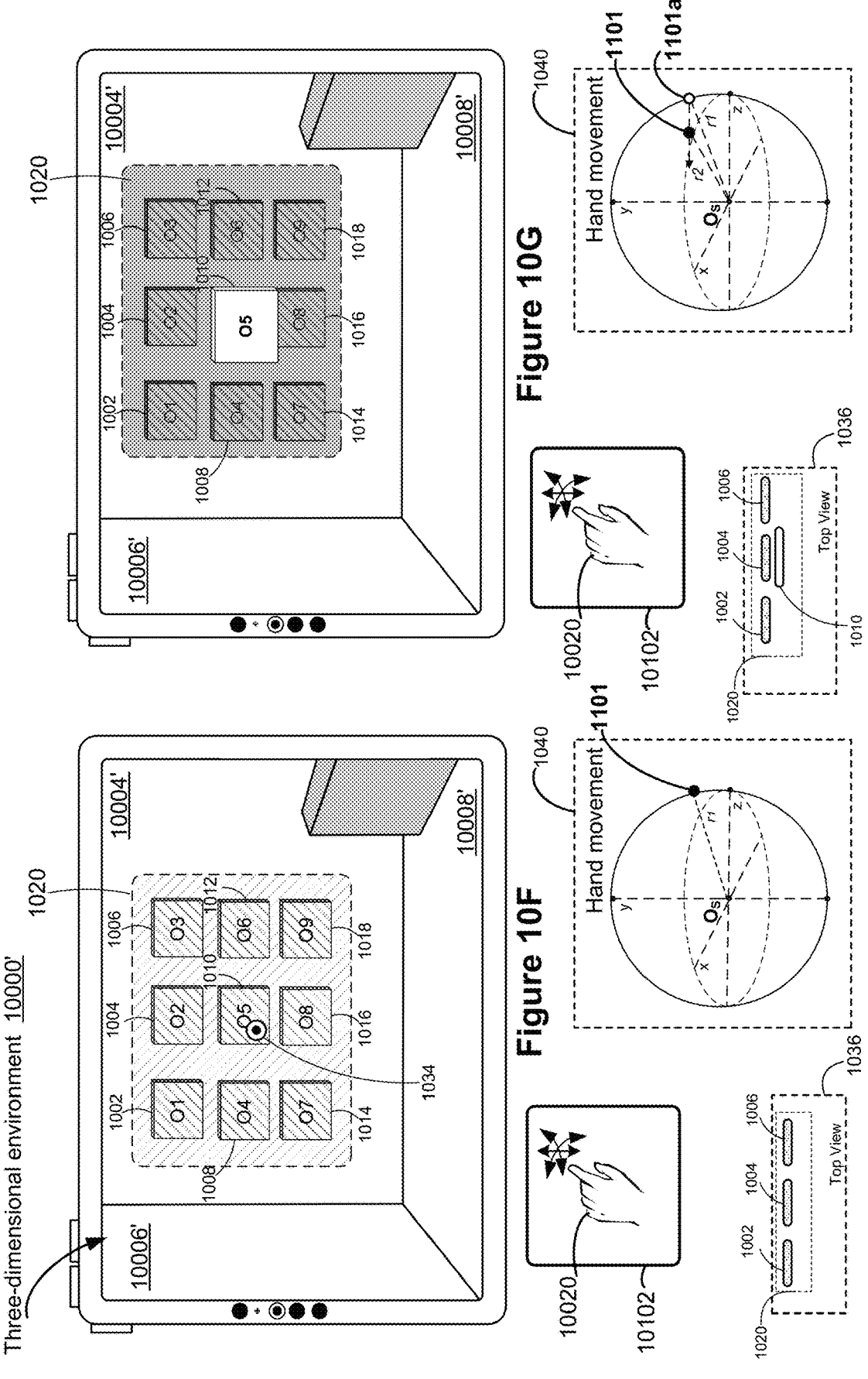

FIG. 10F illustrates a scenario in which user 10002 is interacting with object O5 1010. Cursor 1034 in FIG. 10F illustrates that user 10002's attention is directed to object O5 1010 as captured by one or more cameras of computer system 101 (e.g., user 10002's gaze is directed to a location in object O5 1010). While user 10002's gaze is directed to a location in object O5 1010, computer system 101 detects an air pinch gesture (e.g., an index and thumb finger of hand 10020 making contact with one another, without yet meeting the threshold duration required for a long air pinch gesture as described in FIGS. 10B-10E) performed with hand 10020 and, in response, the computer system 101 selects object O5 1010. Since the air pinch gesture does not involve movement input, hand 10020 in FIG. 10F remains at a respective location in physical environment 10000 that corresponds to current location 1101 of hand 10020 on a surface of a spherical coordinate system of three-dimensional environment 10000' centered at a respective origin as described as follows, and as illustrated in view 1040.

With reference to FIGS. 10F-10Q, view 1040 illustrates a representation of a spherical coordinate system of the three-dimensional environment 10000'. In the spherical system, shown in view 1040, location 1101 of hand 10020 is determined based on radial distance r1 to the origin point O$_S$ (also referred to as pivot point O$_S$) of the spherical coordinate system, the polar angle, and the azimuthal angle of the orthogonal projection. A location in the spherical system may also or alternatively be represented using three mutually perpendicular coordinate axes: the x-axis, the y-axis, and the z-axis, as also illustrated in view 1040. The hand movement diagrams in FIGS. 10F-10G, 10I-10Q, 11A-11E, 11G-11H, and 11J-11L show a side view relative to a viewpoint of the user (e.g., a view that is roughly perpendicular to a line of sight of the user so that the "z" depth dimension is shown horizontally). Movement of hand 10020 (distance and direction) in the physical environment 10000 is illustrated with a dashed arrow in the spherical coordinate system of the three-dimensional environment 10000'. Current location 1101 of hand 10020 in the spherical coordinate system is illustrated with a black dot in view 1040. A respective preceding location of hand 10020 in the spherical system is illustrated with a white-filled circle in view 1040. In some embodiments, another coordinate system such as a radial coordinate system or Cartesian coordinate system is used to represent, in the three-dimensional environment 10000', corresponding movement and locations of hand 10020 in the physical environment 10000.

In some embodiments, when using a spherical coordinate system, hand movements and/or locations are determined relative to the origin point $O_S$ of the coordinate system (e.g., as opposed to relative to user interfaces displayed in the three-dimensional environment). In some embodiments, the spherical coordinate system is centered or oriented around a portion of user 10002's body (also referred to herein as a user-centric spherical coordinate system). For example, origin point $O_S$ is optionally set to a location in user 10002's shoulder, chest, elbow, wrist, head, or other part of user 10002's body (e.g., the computer system determines an approximate location of a respective body part) and movements of user 10002's hands up-down, left-right, and forward-backward are mapped to coordinates in the spherical coordinate system. In some embodiments, using a user-centric spherical coordinate system makes the user-device interaction more efficient and ergonomic when using air gestures. For example, if user 10002 gazes up at a top corner (e.g., left or right) of an application user interface, to pull or drag a draggable object from the top corner, the threshold amount of movement that is needed is determined relative to user 10002 as opposed to relative to the application user interface (e.g., user 10002 needs to pull towards user 10002's body as opposed to move away from the application user interface). In some embodiments, as user 10002's hand(s) are moving, origin point $O_S$ switches or moves from one part of user 10002's body to another based on the gesture that is being performed, thereby reducing accidental or unwanted inputs. For example, when user 10002 is performing a pluck gesture, the location of origin point $O_S$ is moved to user 10002's shoulder (optionally from user 10002's elbow) and when user 10002 is performing a scrolling input, the location of origin point $O_S$ is moved to user 10002's elbow (optionally from user 10002's shoulder).

While object O5 1010 is selected (e.g., in response to the air pinch gesture of FIG. 10F), the computer system detects movement of hand 10020 towards a viewpoint of user 10002 (e.g., away from virtual region 1020). For example, while user 10002's gaze is directed to a location in object O5 1010, an air pinch gesture performed with hand 10020, that caused the computer system to select object O5 1010, is maintained (e.g., an index and thumb finger of hand 10020 make contact with one another, and the contact between the index and thumb fingers is maintained), and the computer system detects (via one or more cameras of computer system 101) movement of hand 10020 towards user 10002 in the physical environment 10000. In some embodiments, the movement of hand 10020 towards user 10002 is substantially perpendicular to (e.g., normal to a surface or plane of) virtual region 1020.

FIG. 10G illustrates a transition from FIG. 10F in response to detecting the movement of hand 10020 towards the viewpoint of user 10002 while the air pinch is maintained and the object O5 1010 is selected. For example, view 1040 illustrates the movement of hand 10020 from previous location 1101a (which corresponds to location 1101 in view 1040 of FIG. 10F) to current location 1101 (e.g., towards user 10002's body). Further, view 1040 illustrates that the radial distance of current location 1101 from origin point $O_S$ is r2 and the radial distance from the previous location 1101a to the origin point $O_S$ is r1, where r1 is greater than r2. Accordingly, in response to the movement of hand 10020 towards the viewpoint of user 10002, the radial distance to origin point $O_S$ is shortened.

In response to the detection of the movement of hand 10020 towards the viewpoint of user 10002 while object O5 1010 is selected, object O5 1010 moves towards the viewpoint of the user 10002. In some embodiments, in conjunction with moving object O5 1010 towards the viewpoint of the user 10002 (e.g., after, before, in response to moving object O5 1010 towards the viewpoint of the user 10002, or in response to an event that causes the device to move object O5 1010 towards the viewpoint of the user 10002), object O5 1010 enters a "peek" state," in which a preview of content included in object O5 1010 is displayed and/or object O5 1010 is enlarged. Top view 1036 illustrates the movement of object O5 1010 towards the viewpoint of user 10002 and away from other objects in the set of objects 1002-1018 (e.g., away from object 1002, 1004, 1006, 1008, 1012, 1014, 1016, and 1018) in the virtual region 1020. Optionally, in conjunction with displaying the preview of object O5 1010 (e.g., after, before, in response to displaying the preview of object O5, or in response to an event that causes the device to display the preview of object O5), the rest of the objects in virtual region 1020 (and/or the virtual region 1020 Itself) are blurred and/or otherwise reduced in visual prominence. In some embodiments, displaying the preview of content included in object O5 1010 and/or blurring other objects in virtual region 1020 provides visual feedback to user 10002 that object O5 1010 can be plucked out or removed from the collection of objects 1002-1018 with further or subsequent hand movement. In some embodiments, in conjunction with moving object O5 1010 towards the viewpoint of the user 10002, a shadow is cast from object O5 1010 onto virtual region 1020, thereby providing visual feedback to user 10002 that object O5 1010 can be plucked out or removed from the collection of objects 1002-1018 with further or subsequent hand movement. In some embodiments, an audio effect is provided by the computer system 101 when object O5 1010 enters the "peek" state.

In some embodiments, if an end of an air pinch gesture that holds a selected object such as object O5 1010 is released prior the movement of the hand towards the user meets a "pluckable" state, e.g., while object O5 1010 is in the "peek" state, object O5 1010 snaps back to a position object O5 1010 was in prior detection of the movement of the hand towards the user, as described in more detail below with reference to FIGS. 10G-10H.

In some circumstances, while object O5 1010 is in the "peek" state as in FIG. 10G, and before movement of hand 10020 in the direction towards user 10002 (or a viewpoint of user 10002) meets a threshold amount of movement (e.g., that is needed to transition object O5 1010 to a "pluckable" state), the computer system 101 detects a release of the air pinch gesture performed with hand 10020. In some embodiments, whether the movement of hand 10020 towards user 10002 or user 10002's viewpoint meets the threshold amount of movement is determined using the movement of hand 10020 since selection of object O5 (e.g., relative to the current location 1101 of hand 10020 in FIG. 10F) or using the movement of hand 10020 since object O5 entered the "peek" state (e.g., relative to the current location 1101 of hand 10020 in FIG. 10G).

Accordingly, FIG. 10H (FIGS. 10H1 and 10H2) illustrates a transition from 10G in response to detecting the release of the air pinch gesture before movement of hand 10020 towards the viewpoint of user 10002 meets the threshold amount of movement (e.g., before object O5 1010 transitions to a "pluckable" state optionally from the "peek state"). In response to detecting the release of the air pinch gesture before movement of hand 10020 towards the viewpoint of user 10002 meets the threshold amount of movement, object O5 1010 (or the preview of content of object O5 1010) snaps back or restores its position in virtual region 1020 (e.g., returns to its original position at the second row and the second column in the arrangement of objects O1 1002-O9 1018). Top view 1036 in FIG. 10H illustrates that object O5 1010 is moved away from user 10002 and back to virtual region 1020. In some embodiments, snapping the selected object O5 1010 back to its original position in the three-dimensional environment (e.g., in a virtual region 1020) is animated. In some embodiments, in conjunction with snapping object O5 1010 back to its original position, visual changes that indicated that the object can be plucked out are reversed (e.g., at least partially). For example, darkening and/or blurring of virtual region 1020 is reversed, and/or enlargement and/or preview of content of object O5 1010 is reversed, as illustrated in FIG. 10H.

In some embodiments, restoring display of object O5 1010 at the respective position in virtual region 1020 includes reversing any lateral or vertical movement of the object O5 1010 that was performed in response to user 10002 pulling object O5 1010 laterally or vertically, respectively. In some embodiments, restoring display of object O5 1010 at the respective position in virtual region 1020 includes animating movement of object O5 1010 away from user 10002 and back towards virtual region 1020 to the position in virtual region 1020 where object O5 1010 was located prior to being moved in response to user 10002's movement inputs. In some embodiments, snapping object O5 1010 back to the respective position in virtual region 1020 includes tilting object O5 1010 relative to the virtual surface (e.g., restoring object O5 1010 to an orientation that is substantially parallel to virtual region 1020).

In some circumstances, while object O5 1010 is in the "peek" state as in FIG. 10G, the computer system 101 detects further movement of hand 10020 in the direction towards user 10002 (or a viewpoint of user 10002), where the further movement of hand 10020 meets the threshold amount of movement (e.g., a "pluck" threshold) while the air pinch is maintained.

Accordingly, FIG. 10I (e.g., FIGS. 1011 and 1012) illustrates a transition from 10G in response to detecting the further movement of hand 10020 (e.g., after object O5 1010 has entered the "peek" state in FIG. 10G) in the direction towards user 10002 (or a viewpoint of user 10002) that meets the threshold amount of movement (e.g., a "pluck" threshold). In response to detecting the further movement of hand 10020 in the direction towards user 10002 (e.g., pulling object O5 1010 out of virtual region 1020) that meets the threshold amount of movement, object O5 1010 moves further toward user 10002 and is plucked out, retrieved, or removed from virtual region 1020 (and collection of objects 1002-1018). For example, view 1040 illustrates movement of hand 10020 from location 1101a (corresponding to location 1101 in FIG. 10F) to location 1101b (corresponding to location 1101 in FIG. 10G), and then from location 1101b to current location 1101 in FIG. 10I (e.g., further towards user 10002's body). Further, view 1040 illustrates that the radial distance of current location 1101 in FIG. 10I from origin point $O_S$ is r3 and the radial distance from the previous location 1101b to the origin point $O_S$ was r2, where r2 is greater that r3 (e.g., hand 10020 moved closer to user 10002's body). At radial distance r3 from origin point $O_S$, the movement of hand 10020 has met the predetermined threshold for movement toward user 10002, thus activating the pluckable state for object O5 1010. Accordingly, object O5 1010 has entered the "pluckable" state, in which, if a release of the air pinch is detected, object O5 1010 maintains its position away from virtual region 1020, as shown in FIGS. 101, that resulted from the movement of hand 10020 meeting the threshold amount of movement (e.g., as opposed to snapping back to its original position in virtual region 1020, such as in response to the air pinch being released before the movement of hand 10020 met the threshold amount of movement, as described herein with reference to FIG. 10H). In the pluckable state, object O5 1010 is dragged out or removed from the collection of objects O1-O9 1002-1018, and from the pluckable state object O5 1010 can then be dropped anywhere in the three-dimensional environment 10000'.

In some embodiments, in conjunction with object O5 1010 being further moved toward user 10002, object O5 1010 is tilted in the direction in which object O5 1010 is being pulled. In some embodiments, an audio effect is provided by the computer system 101 in accordance with object O5 1010 entering the "pluckable" state. In some embodiments, the audio effect that is provided for object O5 1010 entering the "peek" state is different from the audio effect that is provided for object O5 1010 entering the "pluckable" state. In some embodiments, as the user is pulling object O5 1010 before object O5 1010 has entered the "pluckable" state, object O5 1010 appears to visually resist further movement of hand 10020 towards user 1002, e.g., as if object O5 1010 is attached to virtual region 1020 by a rubber band. In some embodiments, the simulated resistance provides visual feedback to user 10002 that further movement is needed to remove or pull-out object O5 1010 from the collection of objects O1-O9 1002-1018. In some embodiments, once the threshold for activating the pluckable state is met, object O5 1010 (or the preview of object O5 1010) appears to catch up to hand 10020, by initially appearing to move faster and eventually slowing down as object O5 1010 gets closer to hand 10020. In some embodiments, once object O5 1010 is stretched or pulled in one direction, the selected object O5 1010 resists further movement in the same direction more than it resists movement in a different direction (e.g., as if object O5 1010 is attached to the virtual region 1020 by a rubber band).

In some embodiments, if an object such as object O5 1010 is in the "pluckable" state, the object can be moved outside the borders of a virtual region that bounds the collection of objects (e.g., virtual region 1020) in response to subsequent movements. For example, as described in more detail in FIGS. 10J-10K, object O5 1010 is moved outside virtual region 1020 in response to later movement detected after object O5 1010 has entered the "pluckable" state.

In some circumstances, after object O5 1010 enters the pluckable state, the computer system 101 detects lateral movement of hand 10020 (e.g., sideways or left-right relative to user 10002, e.g., rather than forward-backward relative to user 10002). The lateral movement of hand 10020 optionally follows the movement towards user 10002 without releasing the air pinch. In some embodiments, the lateral movement of hand 10020 is performed after the air pinch is released and while object O5 1010 is re-selected in response to another, subsequent air pinch gesture (e.g., the lateral movement of hand 10020 is performed during the subsequent air pinch gesture).

Figures 10J, 10K:
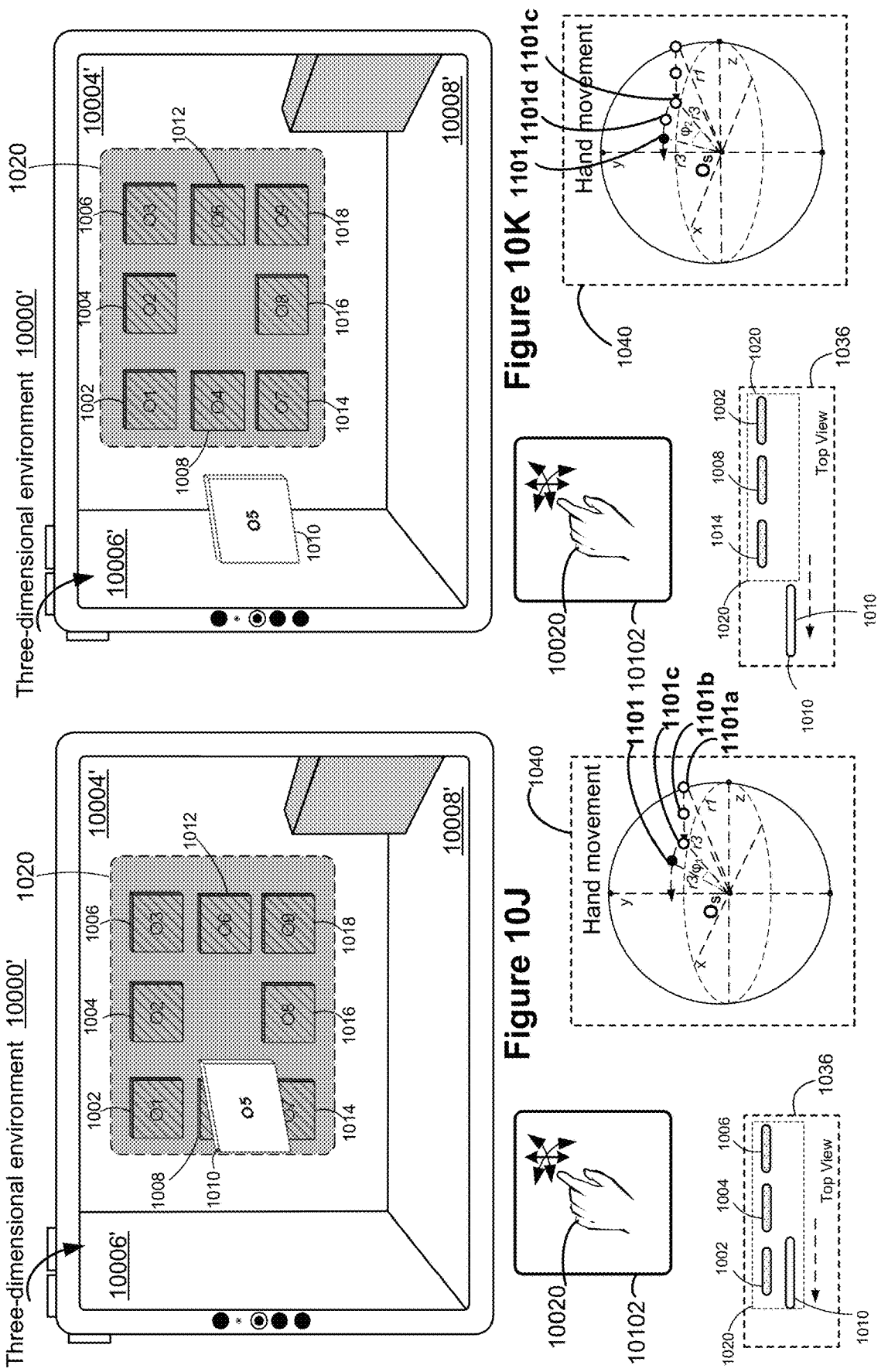

Accordingly, FIG. 10J illustrates a transition from FIG. 10I in response to detecting the lateral movement of hand 10020 while object O5 1010, which is in the pluckable state, is selected. View 1040 illustrates movement of hand 10020 in the physical environment 10000 from previous location 1101c (which corresponds to location 1101 in FIG. 10I) to current location 1101 in FIG. 10J while maintaining or substantially maintaining the radial distance r3 from origin point $O_S$ (e.g., while maintaining or substantially maintaining a respective distance from a respective surface of the spherical coordinate system $O_S$). Further, view 1040 illustrates that the angle between previous location 1101c and current location 1101 (e.g., as viewed from origin $O_S$) is $\varphi_1$. In response to detecting the lateral movement of hand 10020 from location 1101c to location 1101, object O5 1010 moves in a leftward direction towards a left edge of virtual region 1020. Top view 1036 illustrates the movement of object O5 1010 towards the left edge of virtual region 1020. In some embodiments, object O5 1010 is tilted or changes orientation in the direction object O5 1010 is being pulled, as illustrated in the three-dimensional environment 10000' in FIGS. 10J-10K (e.g., and would be illustrated in top view 1036 in FIGS. 10J-10K if for example object O5 1010 were rotated counterclockwise (e.g., with the right end raised above the left end)). From the scenario of FIG. 10J, further or continuous lateral movement of hand 10020 in the leftward direction is detected.

Accordingly, FIG. 10K illustrates a transition from 10J in response to detecting the further lateral movement of hand 10020 in the leftward direction. View 1040 illustrates movement of hand 10020 in the physical environment 10000 from previous location 1101d (which corresponds to location 1101 in FIG. 10J) to current location 1101 in FIG. 10K while maintaining or substantially maintaining the radial distance r3 from origin point $O_S$ (e.g., while maintaining or substantially maintaining a respective distance from a respective surface of the spherical coordinate system $O_S$). Further, view 1040 illustrates that during the further lateral movement of hand 10020, the angle between location 1101c (which corresponds to location 1101c in FIG. 10J) and current location 1101 has increased from $\varphi_1$ to $\varphi 2$ while radial distance r2 from origin point $O_S$ is maintained. The increase in the angle from 1 to $\varphi 2$ represents, in the spherical coordinate system, the additional distance traveled by the further lateral movement of hand 10020 in the physical environment 10000. The additional distance travelled, as represented by the increase in the angle from $\varphi_1$ to $\varphi_2$, causes the computer system to move object O5 outside virtual region 1020 in FIG. 10K from inside virtual region 1020 (e.g., from a position at the left edge of virtual region 1020 in FIG. 10J). Since object O5 1010 is in the "pluckable" state, object O5 1010 is freely removed out of virtual region 1020 and moved in a leftward direction in response to detecting the lateral movement of hand 10020 in the leftward direction (e.g., in accordance with magnitude and direction of movement of hand 10020). Top view 1036 illustrates this movement of object O5 1010 outside virtual region 1020.

In some embodiments, if an object such as object O5 1010 is not in the "pluckable" state, the object cannot be moved outside the borders of a virtual region (e.g., in contrast to FIGS. 10J-10K in which object O5 1010 is in the pluckable state and is moved outside the bounds of virtual region 1020). For example, FIGS. 10L-10M illustrate a scenario in which object O5 1010 remains within the borders of the virtual region in response to the same lateral movements as described in relation to 10J-10K that are sufficient to cause the computer system to move the O5 1010 outside borders of the virtual region 1020.

In some circumstances, after object O5 1010 enters the "peek" state in FIG. 10G but before object O5 1010 has entered the pluckable state, lateral movement of hand 10020 in the leftward direction is detected (e.g., in contrast to FIGS. 101-10K in which object O5 1010 is already in the pluckable state when lateral movement of hand 10020 is detected). Accordingly, FIG. 10L illustrates a transition from FIG. 10G in response to detecting the lateral movement of hand 10020 while object O5 1010 is selected yet is not in the pluckable state. View 1040 illustrates that the movement of hand 10020 in the physical environment 1000 is from previous location 1101b (e.g., corresponding to the location 1101 of hand 10020 in FIG. 10G before meeting the "pluck" threshold) to current location 1101 (e.g., while maintaining or substantially maintaining radial distance r2 from origin point $O_S$, e.g., before reaching radial distance r3 at which an object enters the pluckable state). Further, view 1040 illustrates that the angle between previous location 1101b and current location 1101 is $\varphi_3$. Angle $\varphi_3$ represents, in the spherical coordinate system, a distance traveled by the lateral movement of hand 10020 in the physical environment 10000. In some embodiments, angle $\varphi_3$ corresponds to an amount of movement sufficient to cause the computer system to move object O5 to a position at the left edge of virtual region 1020, as illustrated in three-dimensional environment 10000' in FIG. 10L. In some embodiments, angle $\varphi_3$ is equal to angle $\varphi_1$ in view 1040 of FIG. 10J, where angle $\varphi_1$ also corresponds to a movement amount sufficient to cause the computer system to move object O5 to a position at the left edge of virtual region 1020, as illustrated in FIG. 10J. In response to detecting the lateral movement of hand 10020 from location 1101b to current location 1101, object O5 1010 moves in a leftward direction towards the left edge of virtual region 1020. Top view 1036 illustrates this movement of object O5 1010 towards the left edge of virtual region 1020.

Figures 10L, 10M:
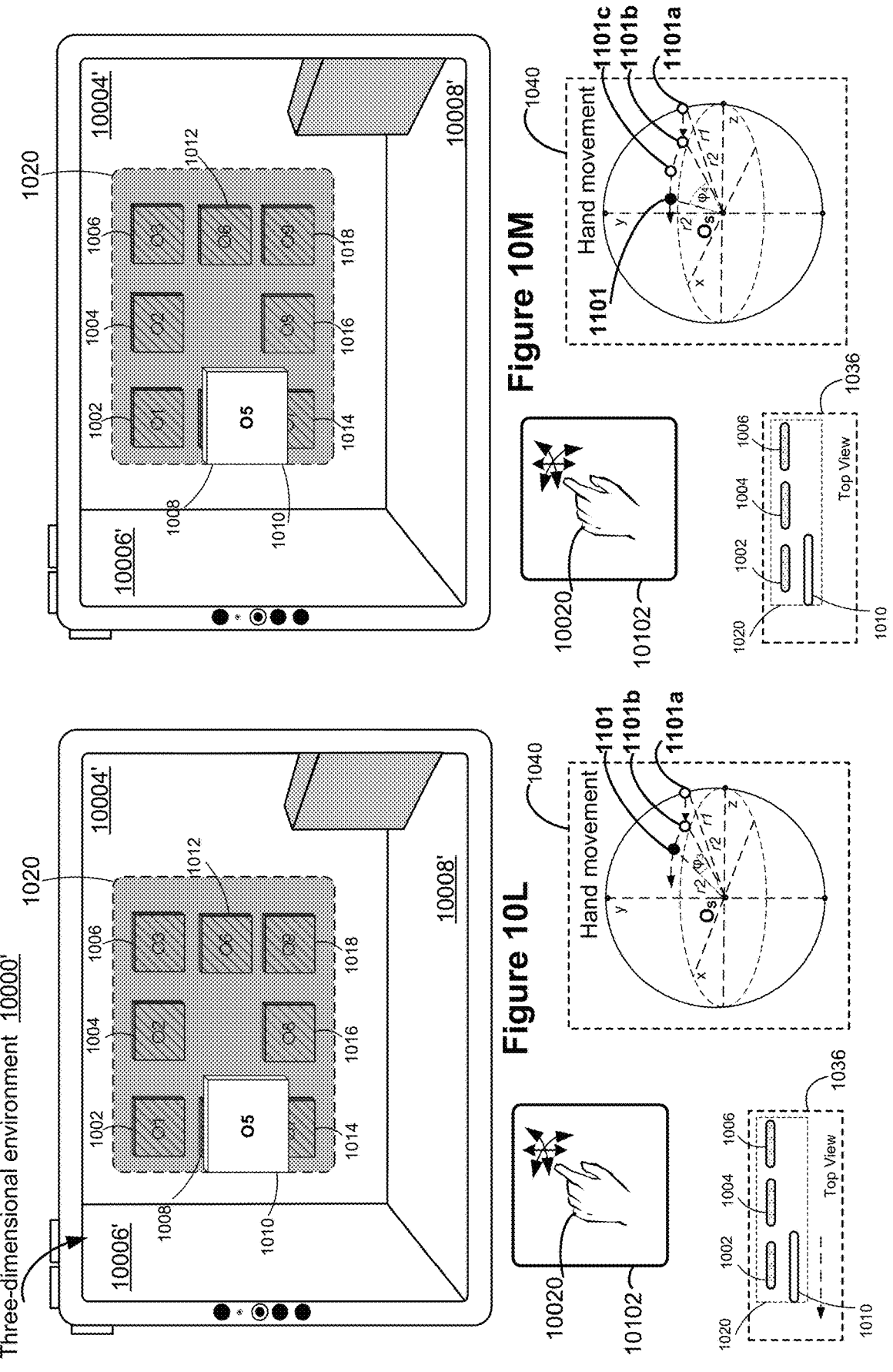

From the scenario of FIG. 10L, further lateral movement of hand 10020 in the leftward direction is detected. As illustrated in view 1040 of FIG. 10M, the further lateral movement of hand 10020 corresponds to movement of hand 10020 from the location 1101 of hand 10020 in FIG. 10L (e.g., previous location 1101c) to current location 1101 in FIG. 10M (e.g., after hand 10020 moved from location 1101b to location 1101c). FIG. 10M accordingly illustrates a transition from FIG. 10L in response to detecting the further lateral movement of hand 10020 in the leftward direction. View 1040 in FIG. 10M illustrates that during the further lateral movement of hand 10020 the angle between location 1101b (which corresponds to location 1101b in FIG. 10L) and current location 1101 has increased from $\varphi_3$ to $\varphi_4$ while the radial distance r2 from origin point $O_S$ is maintained). The increase in the angle from $\varphi_3$ to $\varphi 4$ represents, in the spherical coordinate system, the additional distance traveled by the further lateral movement of hand 10020 in the physical environment 10000. In some embodiments, angle $\varphi 4$ is equal to or greater than angle $\varphi_2$. While the additional distance travelled by hand 10020, as represented by the increase in the angle from $\varphi_1$ to $\varphi_2$, causes the computer system to move object O5 outside virtual region 1020 in FIGS. 10J-10K, the same or greater distance travelled by hand 10020, as represented by the increase in the angle from $\varphi_3$ to $\varphi_4$, does not cause the computer system move object O5 outside virtual region 1020 in FIGS. 10L-10M. For example, FIG. 10M shows that object O5 1010 remains within the boundaries of virtual region 1020 even though the detected further lateral movement of hand 10020 would otherwise have sufficient magnitude to move object O5 1010 out of virtual region 1020. Top view 1030 in FIG. 10M also illustrates that object O5 1010 remains within the boundaries of virtual region 1020 in response to the lateral movement of hand 10020 in the leftward direction from location 1101c (corresponding to location 1101 in FIG. 10L where object O5 1010 is at the left edge of virtual region 1020) to location 1101.

In some embodiments, after object O5 1010 enters the "peek" state in FIG. 10G, further movement of hand 10020 in any direction (e.g., substantially parallel to virtual region 1020 (e.g., parallel to a surface, such as a user-facing surface, of virtual region 1020), and/or at an angle, including substantially perpendicular, to (e.g., the surface of) virtual region 1020, and/or a combination thereof) that meets a predetermined threshold amount of movement (e.g., a "pluck" threshold) is used as a condition for activating the "pluckable" state for object O5 1010. In some embodiments, before object O5 1010 enters the pluckable state, movement in directions other than the direction towards user 10002 offsets progress (e.g., based on movement in the direction towards user 10002) made towards meeting the predetermined threshold (e.g., the "pluck" threshold) for activating the pluckable state for object O5 1010.

In some embodiments, if an object such as object O5 1010 is not in the "pluckable" state, the object cannot be moved outside the borders of a virtual region (e.g., in contrast to FIGS. 10J-10K in which object O5 1010 is in the pluckable state and is moved outside the bounds of virtual region 1020). For example, FIGS. 10N-10Q illustrate a scenario in which object O5 1010 remains within the borders of the virtual region 1020 in response to a vertical movement that would be sufficient to cause the computer system to move the O5 1010 outside the borders of the virtual region 1020 if object O5 1010 were in the pluckable state.

Figures 10N, 10O:
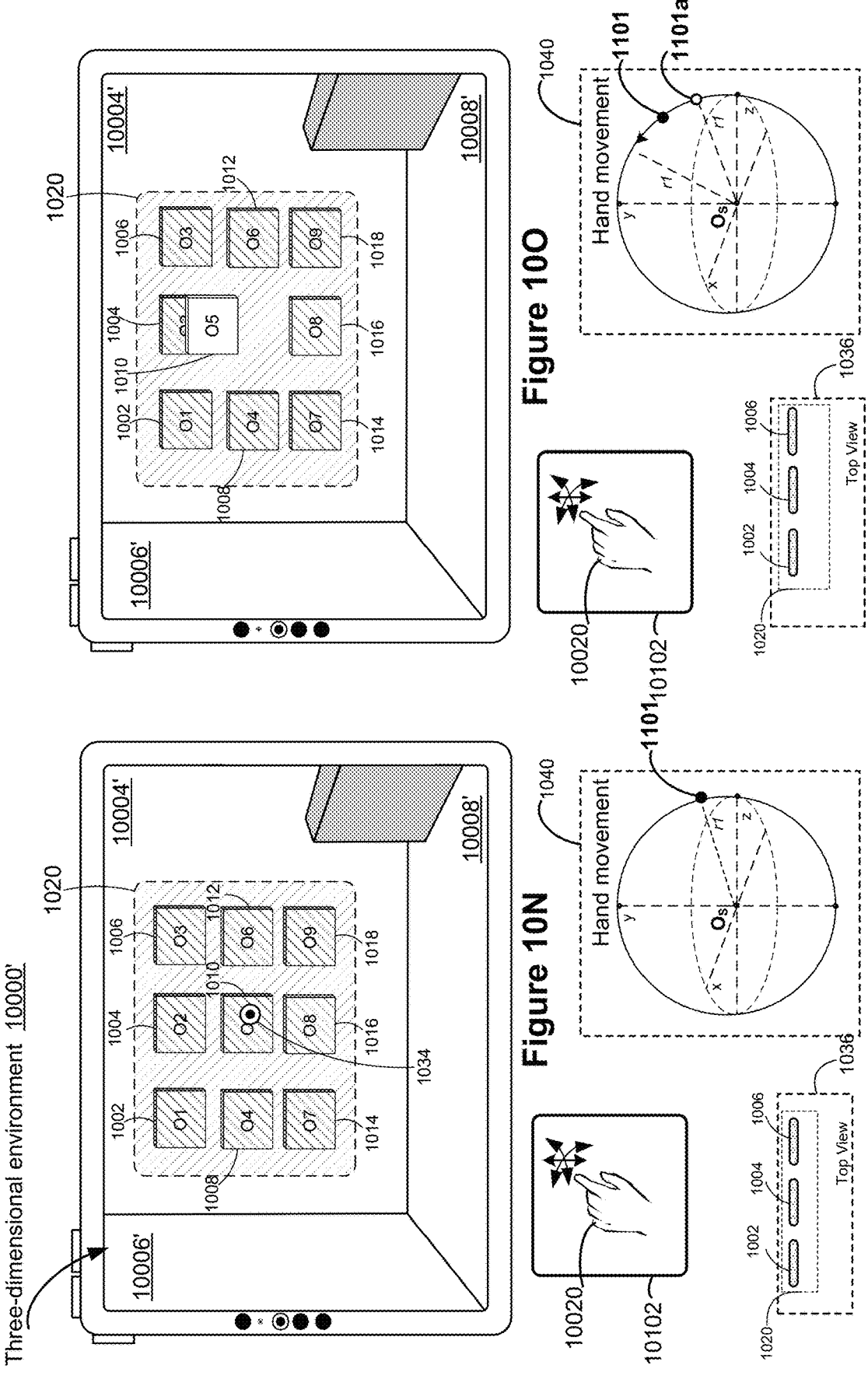
Figures 10P, 10Q:
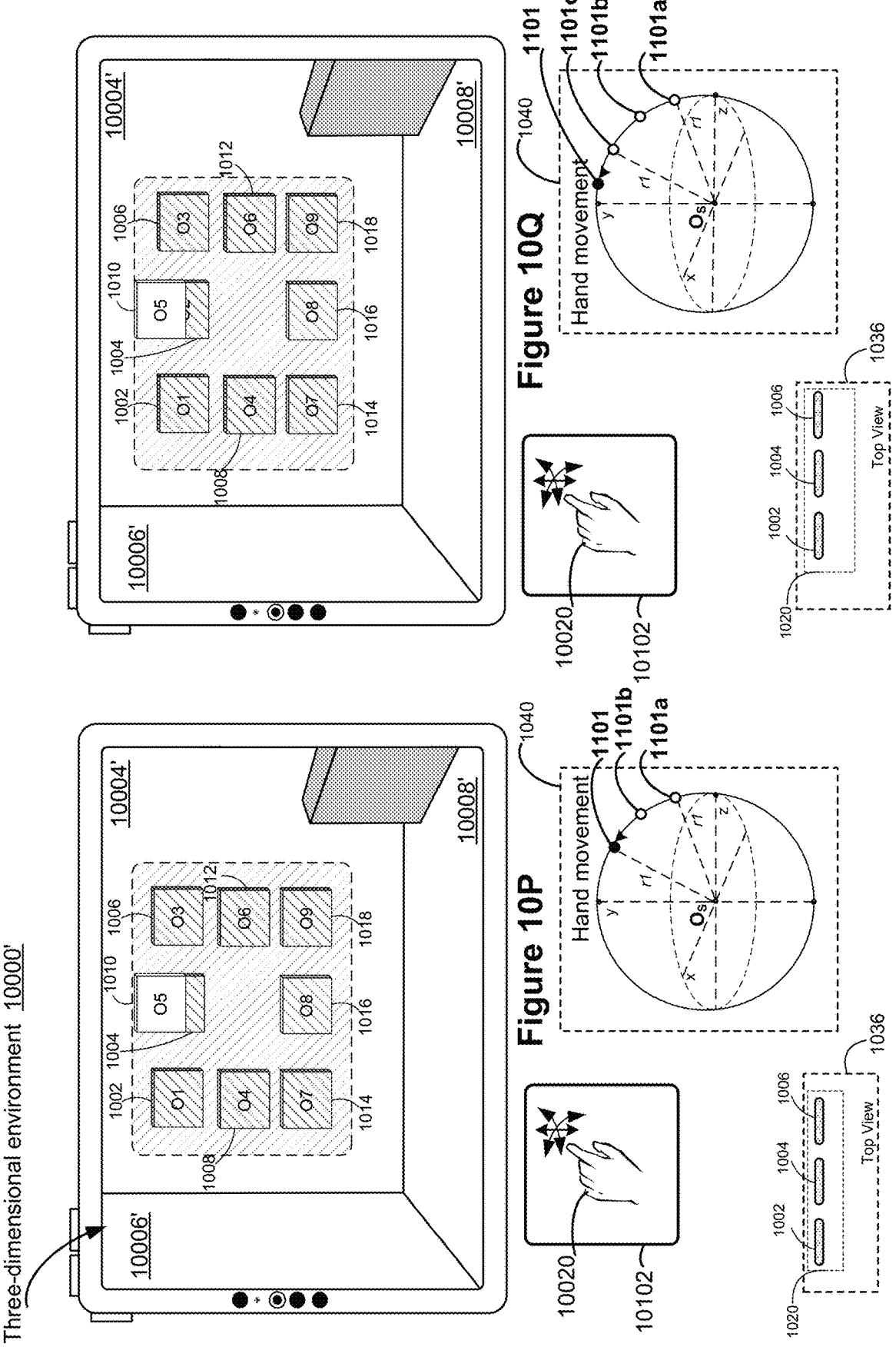

FIG. 10N illustrate a scenario in which user 10002 is interacting with object O5 1010. Cursor 1034 illustrates user 10002's attention is directed to object O5 1010 as captured by one or more cameras of computer system 101 (e.g., user 10002's gaze is directed to a location in object O5 1010). While user 10002's gaze is directed to a location in object O5 1010, computer system 101 detects an air pinch gesture performed with hand 10020 and, in response, the computer system selects object O5 1010. Because the air pinch gesture does not involve movement of hand 10020 (e.g., lateral movement, vertical movement, or movement towards user 10002), current location 1101 of hand 10020 in FIG. 10N remains on the surface of the spherical coordinate system at a radial distance r1 from origin point $O_S$, as illustrated in view 1040 of FIG. 10N.

From the scenario of FIG. 10N, while object O5 1010 is selected, the computer system 101 detects vertical movement of hand 10020 in an upward direction (e.g., as opposed to towards user 10002). For example, while user 10002's gaze is directed to a location in object O5 1010 and the air pinch gesture selecting object O5 1010 is maintained with hand 10020 (e.g., contact between the index and thumb fingers is maintained), the computer system detects (via one or more cameras of computer system 101) vertical movement of hand 10020 in the upward direction in the physical environment 10000. In some embodiments, the vertical movement of hand 10020 in the upward direction is substantially parallel to virtual region 1020 (e.g., substantially parallel to the front surface of virtual region 1020 facing user 10002).

FIG. 10O illustrates a transition from FIG. 10N in response to detecting the vertical movement of hand 10020 in the upward direction. View 1040 illustrates the movement of hand 10020 from previous location 1101*a* (e.g., location 1101 of hand 10020 in FIG. 10N, before the vertical movement of hand 10020 is detected) to current location 1101 in FIG. 10O, where the radial distance r1 from origin point $O_S$ is substantially maintained (e.g., no substantial movement towards user 10002 is detected). In response to detecting the vertical movement of hand 10020 in the upward direction, object O5 1010 moves in the upward direction (optionally in accordance with the magnitude and/or direction of the movement of hand 10020) towards a top edge of virtual region 1020. In some embodiments, object O5 1010 is shown to move over object O2 1004. In some embodiments, object O5 1010 pushes object O2 1004 sideways as object O2 1004 is within the movement path of object O5 1010. Further, from the scenario of FIG. 10O, while object O5 1010 is selected, the computer system 101 detects subsequent vertical movement of hand 10020 in the upward direction.

FIG. 10P illustrates a transition from FIG. 10O in response to detecting the subsequent vertical movement of hand 10020 in the upward direction while object O5 1010 continues to be selected. View 1040 in FIG. 10P illustrates the movement path of hand 10020 from the original location at 1101*a* (e.g., corresponding to location 1101 in FIG. 10N) to a next location 1101*b* (e.g., corresponding to location 1101 in FIG. 10O), and then to current location 1101 in FIG. 10P, where the radial distance r1 from origin point $O_S$ to the respective locations 1101, 1101*b*, and 1101*a* in FIG. 10P is substantially maintained (e.g., no substantial movement towards user 10002 is detected, and hand 10020 substantially moves along or across the surface of the spherical coordinate system). In response to the detection of the subsequent vertical movement of hand 10020 in the upward direction, object O5 1010 moves even further in the upward direction (optionally in accordance with the magnitude and/or direction of the movement of hand 10020) to the top edge of virtual region 1020. Further, from the scenario of FIG. 10P, while object O5 1010 continues to be selected, the computer system 101 detects further subsequent vertical movement of hand 10020 in the upward direction.

FIG. 10Q illustrates a transition from FIG. 10P in response to detecting the further subsequent vertical movement of hand 10020 in the upward direction while object O5 1010 continues to be selected. View 1040 in FIG. 10Q illustrates the movement path of hand 10020 from location 1101*a* through location 1101*b* and then location 1101*c* (e.g., corresponding to location 1101 in FIG. 10P), and finally from location 1101*c* to current location 1101 in FIG. 10Q, where the radial distance r1 from origin point $O_S$ to the respective locations 1101, 1101*c*, 1101*b*, and 1101*a* in FIG. 10Q is substantially maintained (e.g., no substantial movement towards user 10002 is detected, and hand 10020 substantially moves along or across the surface of the spherical coordinate system). In response to detecting the subsequent vertical movement of hand 10020 in the upward direction, object O5 1010 resists further movement in the upward direction beyond the top edge of virtual region 1020. Since object O5 1010 is not in the pluckable state, object O5 1010 can be moved within the bounds of virtual region 1020 but not beyond the bounds of virtual region 1020.

Additional descriptions regarding FIGS. 10A-10Q are provided below in reference to method 15000 described with respect to FIG. 15 and method 16000 described with respect to FIG. 16.

FIGS. 11A-11L illustrate examples of using a pluck gesture to launch applications in a mixed reality three-dimensional environment. FIG. 17 is a flow diagram of an exemplary method 17000 for using a pluck gesture to launch applications in a mixed reality three-dimensional environment. The user interfaces in FIGS. 11A-11L are used to illustrate the processes described below, including the processes in FIG. 17.

Figures 11A, 11B:
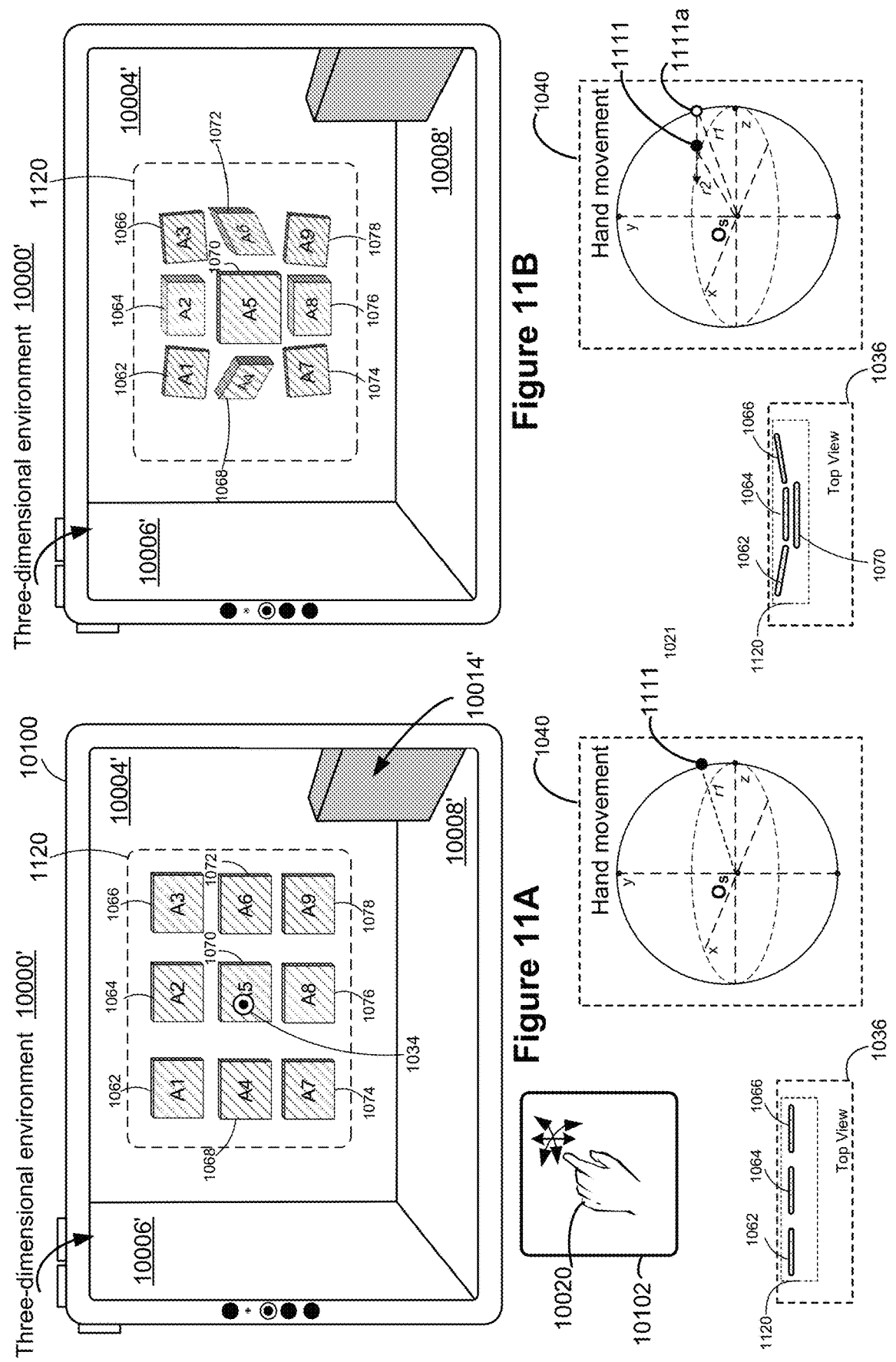

FIG. 11A illustrates a view of a three-dimensional environment 10000' that is visible to user 10002 via display generation component 10100 of computer system 101. The view of the three-dimensional environment 10000' (also called view 10000' for ease of reference) of FIG. 11A optionally includes representations of objects in a physical environment such as physical environment 10000 (e.g., as captured by one or more cameras of computer system 101) or optical views of objects in the physical environment (e.g., as visible through one or more transparent or semi-transparent portions of display generation component 10100). For example, in FIG. 11A, the representation or optical view of three-dimensional environment 10000' includes wall 10004', wall 10006', floor 10008', and box 10014' as described herein with reference to FIGS. 10A-10B.

In addition, view 10000' includes one or more computer-generated objects displayed via display generation component 10100, such as home user interface 1120 (e.g., which is not a representation or optical view of a physical region in physical environment 10000), and application icons A1 1062, A2 1064, A3 1066, A4 1068, A5 1070, A6 1072, A7 1074, A8 1076, and A9 1078 (also collectively called application icons A1 1062-A9 1078 or application icons 1062-1078) (e.g., which are not representations or optical views of physical objects in physical environment 10000). Home user interface 1120 corresponds to a user interface for launching applications via inputs directed to application icons A1 1062-A9 1078. In some embodiments, elements of home user interface 1120 itself other than the application icons are not visible or displayed (e.g., the dashed outline of home user interface 1120, shown in FIG. 11A for reference, is not displayed). In some embodiments, home user interface 1120 is paginated, e.g., including multiple pages (e.g., or multi-sectional, including multiple sections) and application icons A1 1062-A9 1078 are displayed in the first page of the multiple pages (e.g., or first section of the multiple sections). In some embodiments, home user interface 1120 is transparent or semi-transparent. In some embodiments, home user interface 1120 constrains free movement of application icons A1 1062-A9 1078 in view 10000'. For example, if application icons A1 1062-A9 1078 are scrolled, application icons A1 1062-A9 1078 move within boundaries of home user interface 1120. The dashed outline that delineates home user interface 1120 is included in FIGS. 11A-11L for illustrative purposes and is optionally not displayed via display generation component 10100.

With reference to FIGS. 11A-11L, gaze and/or air gestures, including direct or indirect pinch gestures, are used to interact with application icons A1 1062-A9 1078 in view 10000', according to some embodiments. In some embodiments, touch inputs detected via trackpad 10102 are used to interact with application icons A1 1062-A9 1078 in view 10000' in addition to or alternatively to using air gestures and/or gaze.

With reference to FIGS. 11A-11L, top view 1036 illustrates home user interface 1120 and application icons A1 1062-A9 1078 as seen from above (e.g., instead of seen from the front as in view 10000'). For example, top view 1036 illustrates that, looking from above, application icons A1 1062, A2 1064, and A3 1066 are visible while application icons A4 1068 and A7 1074 are occluded by application icon A1 1062, application icons A5 1070 and A8 1076 are occluded by application A2 1064, and application icons A6 1072 and A9 1078 are occluded by application A3 1066 (e.g., the occlusion when looking from above occurs because application icons A1 1062-A9 1078 are displayed at the same distance from user 10002).

With reference to FIGS. 11A-11L, view 1040 illustrates a representation of a spherical coordinate system of the three-dimensional environment 10000'. The spherical system shown in view 1040 in FIGS. 11A-11L is used to represent movement of hand 10020 in the physical environment 10000. For example, movement of hand 10020 (e.g., distance and direction) in the physical environment 10000 is illustrated with a dashed arrow in the spherical coordinate system, current location 1111 of hand 10020 is illustrated with a black dot, and a respective preceding location of hand 10020 is illustrated with a white-filled circle in view 1040. In some embodiments, another coordinate system such as a radial coordinate system or Cartesian coordinate system is used to represent, in the three-dimensional environment 10000', corresponding movement and locations of hand 10020 in the physical environment 10000.

Figures 11C, 11D:
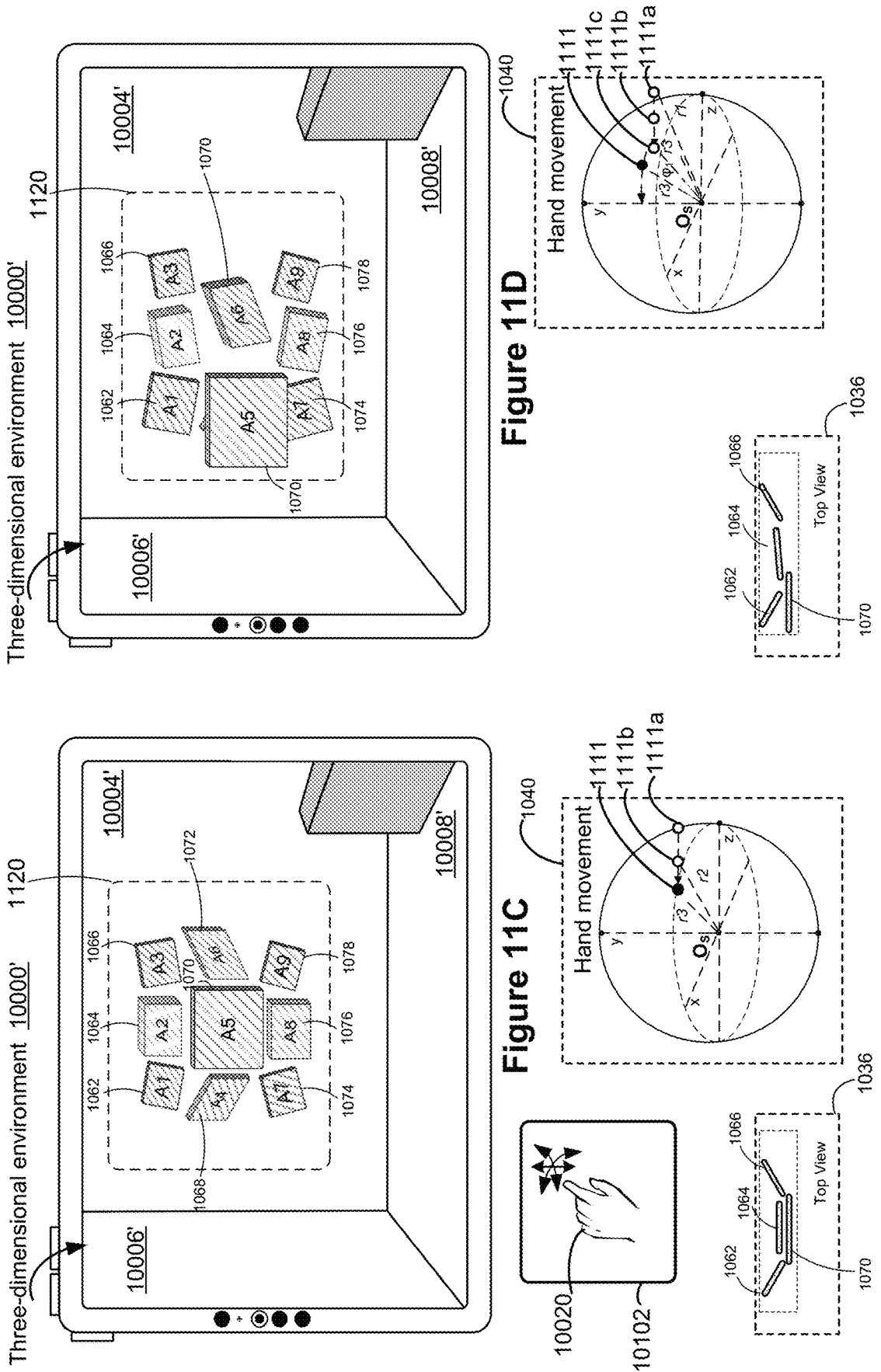

In some embodiments, FIGS. 11A-11D illustrate an example of launching an application, such as an application corresponding to application icon A5 1070, using a pluck gesture that is pulling an application launch icon, such as application icon A5 1070. Further, FIGS. 11A-11C illustrate that the computer system 101 continuously provides visual feedback while the application launch icon is being pulled, including moving and/or tilting the application launch icon optionally in conjunction with moving and/or tilting application launch icons adjacent to the application launch icon, such as application icons 1062, 1064, and 1066.

FIG. 11A illustrates a scenario in which user 10002 is interacting with application icon A5 1070. Cursor 1034 illustrates that user 10002's attention is directed to application icon A5 1070 as captured by one or more cameras of computer system 101 (e.g., user 10002's gaze is directed to a location in application icon A5 1070). While user 10002's gaze is directed to a location in application icon A5 1070, computer system 101 detects an air pinch performed with hand 10020 and, in response, computer system 101 selects application icon A5 1070. Because the air pinch gesture does not involve movement input, current location 1111 of hand 10020 in FIG. 11A remains on the surface of the spherical coordinate system, as illustrated in view 1040.

From the scenario of FIG. 11A, while application icon A5 1070 is selected, the computer system detects movement of hand 10020 towards a viewpoint of user 10002 (e.g., away from home user interface 1120). For example, while user 10002's gaze is directed to a location in application icon A5 1070, an air pinch gesture is maintained with hand 10020, and the computer system 101 detects (e.g., via one or more cameras of computer system 101) movement of hand 10020 towards user 10002 in the physical environment 10000 (e.g., pulling application icon A5 1070 towards user 10002 using a pluck gesture). In some embodiments, the movement of hand 10020 towards user 10002 is substantially perpendicular to home user interface 1120 (e.g., normal to a plane of home user interface 1120, such as the plane in which the application icons A1 1062-A9 1078 are arranged by default in the absence of movement input directed to home user interface 1120).

FIG. 11B illustrates a transition from FIG. 11A in response to detecting the movement of hand 10020 towards the viewpoint of user 10002 while the air pinch is maintained and application icon A5 1070 is selected (e.g., in response to detecting the pulling of application icon A5 1070 towards user 10002). For example, view 1040 in FIG. 11B illustrates movement of hand 10020 from previous location 1111a (e.g., corresponding to current location 1111 in FIG. 11A) to current location 1111 in FIG. 11B (e.g., towards user 10002's body). Further, view 1040 illustrates that the radial distance of current location 1111 from origin point $O_S$ is r2 and the radial distance from the previous location 1111a to the origin point $O_S$ is r1, where r1 is greater than r2.

Accordingly, in response to the movement of hand 10020 towards the viewpoint of user 10002, the radial distance to origin point O$_S$ is shortened.

In response to the detection of the movement of hand 10020 towards the viewpoint of user 10002 while the air pinch is maintained and application icon A5 1070 is selected, continuous visual feedback is provided. For example, application icon A5 1070 is pulled forward or towards user 10002 (e.g., in accordance with magnitude and/or direction of movement of hand 10020). In some embodiments, some application icons move forward (e.g., application icons A5 1070, A4 1068, A6 1072, A2 1064, and A8 1076) and some application icons move backwards (e.g., application icons A1 1062, A3 1066, A7 1074, and A9 1078). In some embodiments, application icons A1 1062-A9 1078 are moved according to a predetermined physics model that simulates movement of application icons A1 1062-A9 1078 that are coupled with one or more flexible connections (e.g., application icons A1 1062-A9 1078 move as if they are connected on fabric or via rubberbands). In some embodiments, application icons adjacent to the application icon that is being pulled (e.g., application icon A5 1070) move in a direction towards a viewpoint of user 10002 and optionally tilt. For example, top view 1036 illustrates movement and/or tilting of nearby or adjacent application icons 1062, 1064, and 1066 in response to detecting the movement of hand 10020 that pulls application icon 1070 towards user 10002.

In some embodiments, user 10002 continues to pull application icon A5 1070 towards user 10002 (e.g., computer system 101 detects further movement of hand 10020 towards the viewpoint of user 10002 while application icon A5 1070 is selected). FIG. 11C illustrates a transition from FIG. 11B in response to detecting the continuous pulling of application icon A5 1070 towards user 10002. For example, view 1040 illustrates that hand 10020 has moved to current location 1111 in FIG. 11C from location 1111*b* (e.g., corresponding to current location 1111 in FIG. 11B), after having moved to location 1111*b* from location 1111*a* (e.g., corresponding to current location 1111 in FIG. 11A) (e.g., the movement path of hand 10020 towards user 10002's body). Further, view 1040 illustrates that the radial distance of current location 1111 from origin point O$_S$ is r3 and the radial distance from the previous location 1111*b* to the origin point O$_S$ is r2, where r2 is greater than r3. Accordingly, in response to the movement of hand 10020 towards the viewpoint of user 10002, the radial distance to origin point O$_S$ is shortened. As user 10002 further moves hand 10020 towards user 10002's body (e.g., pulling application icon A5 1070 towards user 10002), application icon A5 1070 continues to move towards user 10002 and computer system 101 continues to provide visual feedback. For example, as shown in view 10000', application icons 1062, 1064, 1066, 1068, 1072, 1074, 1076, and 1078 further move and/or tilt in respective directions in accordance with the pulling of application icon A5 1070. Top view 1036 in FIG. 11C illustrates that application icon A5 1070 is pulled forward or towards user 10002 (optionally in conjunction with enlarging application icon A5 1070) and that application icons A1 1062, A2 1064, and A3 1066 are also pulled further towards user 10002 (optionally, in conjunction with further tilting or changing orientation), relative to FIG. 11B. Further, from the scenario of FIG. 11C, while application icon A5 1070 continues to be selected, subsequent lateral movement of hand 10020 in a leftward direction is detected.

FIG. 11D illustrates a transition from FIG. 11C in response to detecting the subsequent lateral movement of hand 10020 in the leftward direction. For example, view

1040 in FIG. 11D illustrates movement of hand 10020 to current location 1111 in FIG. 11D from previous location 1111*c* (e.g., corresponding to location 1111 in FIG. 11C). Further, view 1040 illustrates that the radial distance of current location 1111 from origin point O$_S$ remains r3 (e.g., substantially the same as the radial distance from the previous location 1111*c* to the origin point O$_S$), consistent with the movement of hand 10020 being substantially parallel to home user interface 1120. Angle $\varphi_1$ between current location 1111 and location 1111*c* in the spherical coordinate system in view 1040 represents distance traveled by the lateral movement of hand 10020 in the physical environment 10000. As user 10002 is pulling application icon A5 1070 in the leftward direction, the computer system 101 continuously provides visual feedback. For example, as user 10002 is pulling application icon A5 1070 in the leftward direction, application icon A5 1070 moves towards the left edge (optionally not visible) of home user interface 1120, and adjacent application icons also are pulled in the same direction as application icon A5 1070 (e.g., other application icons of the application icons 1062-1078 tilt and move along with application icon A5 1070 as if connected to application icon A5 1070 via rubberbands), as illustrated in top view 1036. Further, in FIG. 11D, the computer system 101 detects that the movement of hand 10020 meets a "pluck" threshold amount of movement. In some embodiments, the pluck threshold amount of movement is a combination of the amount of movement of hand 10020 towards user 10002 and the amount of movement of hand 10020 in a lateral direction, such as the leftward direction, and requires that movement towards user 10002 precede movement in the leftward direction (or other lateral movement).

Figures 11E, 11F:
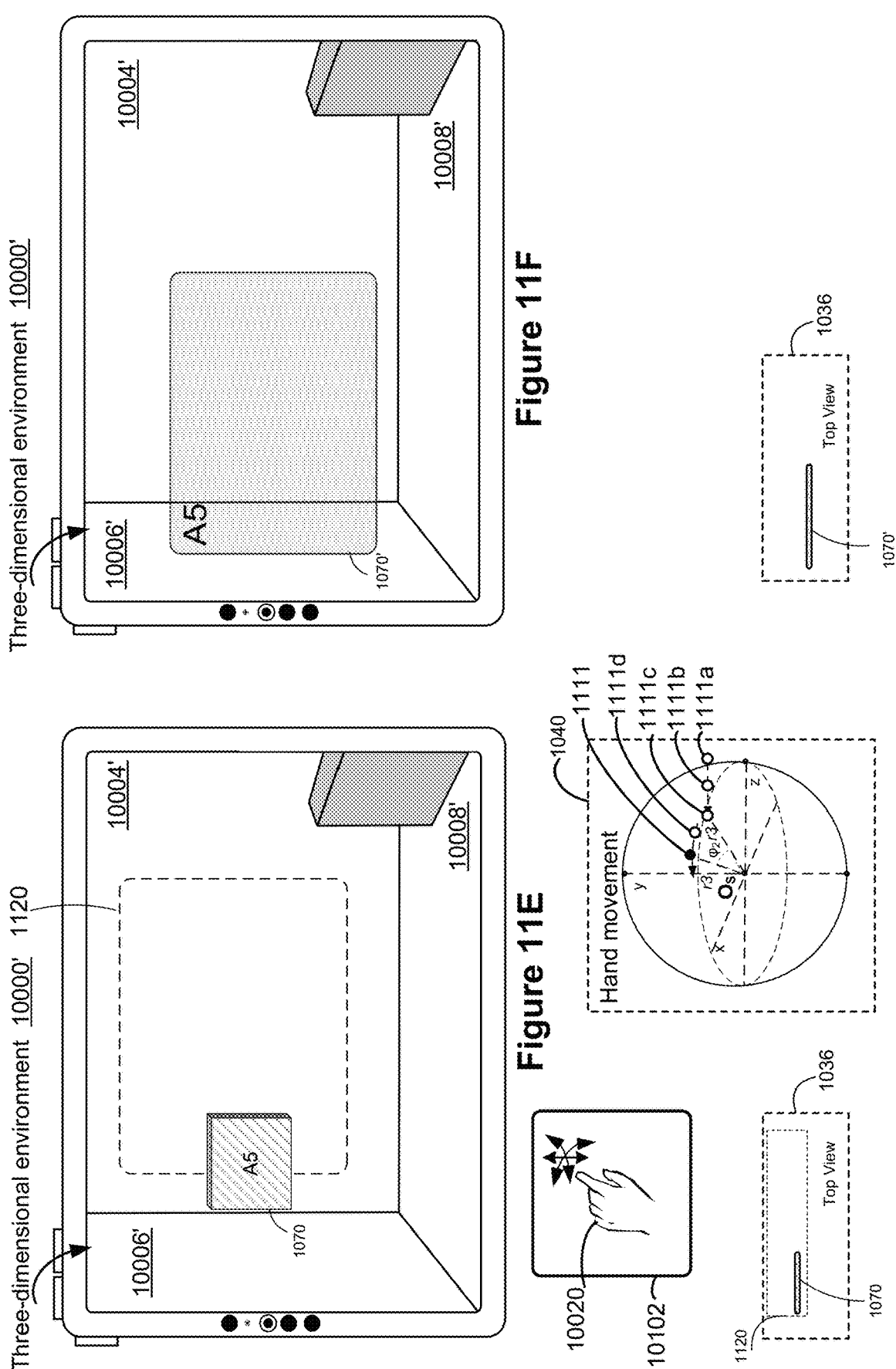

In some embodiments, FIG. 11E illustrate a scenario where movement of a hand meets the "pluck" threshold amount of movement while an application icon, such as application icon A5 1070, is being pulled in accordance with movement of the hand.

FIG. 11E illustrates a transition from FIG. 11D in response to detecting that the movement of hand 10020 met the pluck threshold (e.g., the pluck gesture is successfully performed). For example, view 1040 shows movement of hand 10020 substantially parallel to home user interface 1120 from location 1111*d* (e.g., corresponding to location 1111 in FIG. 11D) to current location 1111 in FIG. 11E following the movement of hand 10020 from location 1111*c* (e.g., corresponding to location 1111 in FIG. 11C) to location 1111*d*. Further, view 1040 illustrates that the angle between current location 1111 and location 1111*d* has increased from $\varphi_1$ to $\varphi_2$, while radial distance r3 from origin point O$_S$ is maintained. The increase in the angle from $\varphi_1$ to $\varphi_2$ represents, in the spherical coordinate system, the lateral movement of hand 10020 in the physical environment 10000. The amount of distance travelled by the lateral movement of hand 10020, as represented by $\varphi_2$ in the spherical coordinate system, is sufficient to meet the pluck threshold. Accordingly, in response to detecting that the lateral movement of hand 10020 met the pluck threshold, the computer system 101 ceases to display other application icons in the home user interface 1120, thereby providing visual feedback to user 10002 that a gesture was performed that met the criteria for launching the application corresponding to application icon A5 (e.g., application icons A1 1062-A4 1068 and A6 1072-A9 1078 other than application icon A5 1070 are hidden). Top view 1036 illustrates that only application icon A5 1070 remains in view 10000'. Further, from the scenario of FIG. 11E, the computer system 101 detects a release of the air pinch gesture (e.g., an end of the pluck gesture), so as to release or drop application icon A5 1070.

FIG. 11F illustrates an example of launching an application, such as an application corresponding to application icon A5 1070, in response to detecting an end of the pluck gesture (e.g., a depinch input while performing an air pinch gesture, a lift off gesture, or another input indicating an end of the gesture), in accordance with some embodiments.

Accordingly, FIG. 11F illustrates a transition from FIG. 11E in response to detecting the end of the pluck gesture. In response to detecting the end of the pluck gesture (e.g., dropping application icon A5 1070 in view 10000'), the application corresponding to application icon A5 is launched and user interface 1070' of the application corresponding to application icon A5 is displayed. In some embodiments, user interface 1070' of the application corresponding to application icon A5 is displayed at a location where application icon A5 1070 is dropped (e.g., user interface 1070' is centered on or otherwise aligned in one or more dimensions to the location in the three-dimensional environment 10000' where application icon A5 1070 was dropped). Top view 1036 in FIG. 11F illustrates that user interface 1070' of the application corresponding to application icon A5 is displayed in view 10000' and that the computer system 101 has ceased to display application icon A5 and the home user interface 1120, including application icons A1 1062-A9 1078.

While FIGS. 11C-11F illustrate successful completion of a pluck gesture involving movement of hand 10020 that includes both movement towards user 10002 and lateral movement that is substantially parallel to home user interface 1120, FIGS. 11G-11H illustrate successful completion of a pluck gesture involving movement of hand 10020 (e.g., an indirect air gesture performed with representation of hand 10020' in FIG. 11G2) primarily in a direction towards user 10002 (e.g., without lateral movement that is substantially parallel to home user interface 1120). Accordingly, FIG. 11G (e.g., FIGS. 11G1 and 11G2) illustrates a transition from FIG. 11B in response to computer system 101 detecting continuous (e.g., or further) movement of hand 10020 towards user 10002 from the scenario of FIG. 11B, such as by user 10002 continuing to pull application icon A5 1070. Accordingly, in FIGS. 11G, view 1040 illustrates movement of hand 10020 from location 1111b (e.g., corresponding to location 1111 in FIG. 11B) to current location 1111 (e.g., the movement path of hand 10020 towards user 10002's body). Further, view 1040 illustrates that the radial distance of current location 1111 from origin point O$_S$ is r4 and the radial distance from the previous location 1111b to the origin point O$_S$ is r2, where r2 is greater than r4. Accordingly, in response to the movement of hand 10020 towards the viewpoint of user 10002, the radial distance to origin point O$_S$ is shortened. As user 10002 further moves hand 10020 towards user 10002's body (e.g., pulling application icon A5 1070 towards user 10002), application icon A5 1070 continues to move towards user 10002 and computer system 101 continues to provide visual feedback. For example, as shown in view 10000', application icons 1062, 1064, 1066, 1068, 1072, 1074, 1076, and 1078 further move and/or tilt in respective directions in accordance with the pulling of application icon A5 1070. Top view 1036 in FIG. 11G illustrates that application icon A5 1070 is pulled forward or towards user 10002 (optionally, in conjunction with enlarging application icon A5 1070) and that application icons A1 1062, A2 1064, and A3 1066 are also pulled further towards user 10002 (optionally, in conjunction with further tilting or changing orientation), relative to FIG. 11B. FIG. 11G also illustrates the position and orientation of application icons A1 1062-A9 1078 just as the movement of hand 10020 towards user 10002 is about to meet the pluck gesture threshold for launching an application.

In some embodiments, in response to detecting that the pluck gesture succeeds (e.g., the movement threshold is met), the computer system 101 displays an extent or outline of user interface 1070' of the application that is about to be launched. In some embodiments, the extent or outline corresponds to or has the appearance of a window pane. In some embodiments, the window pane is blank (e.g., content of the application corresponding to application icon A5 is not visible in the window pane). In some embodiments, the window pane is transparent or translucent.

Accordingly, FIG. 11H (e.g., FIGS. 11H1 and 11H2) illustrates a transition from FIG. 11G in response to detecting that the movement of hand 10020 towards user 10002 met the pluck gesture threshold (e.g., pluck gesture succeeded). In some embodiments, the pluck threshold is met when, as illustrated in view 1040, the movement of hand 10020 reaches current location 1111 in FIGS. 11H, which is at radial distance r5 from origin point O$_S$, where radial distance r5 is shorter than radial distance r4 from previous location 1111c (e.g., which corresponds to location 1111 in FIG. 11G). In response to detecting that the movement of hand 10020 towards user 10002 met the pluck gesture threshold, the application corresponding to application icon A5 is launched and application user interface 1070' of the application corresponding to application icon A5 is displayed in view 10000'. Application user interface 1070' is displayed in place of home user interface 1120 (e.g., the computer system 101 ceases to display home user interface 1120, including application icons A1 1062-A9 1078), as illustrated in view 10000' and in top view 1036 in FIG. 11H.

Figures 11I, 11J:
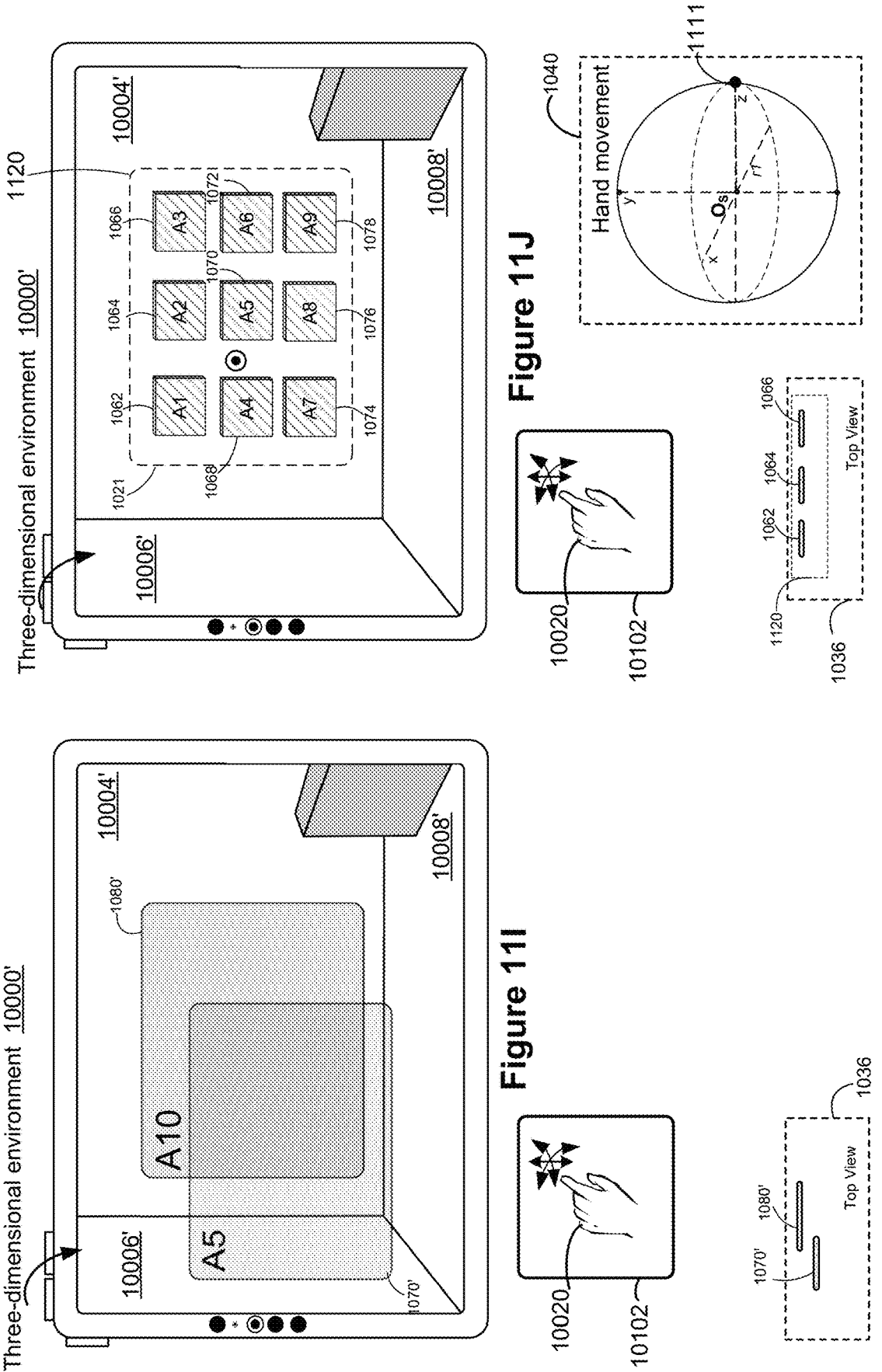

In some embodiments, before launching the application corresponding to application icon A5, one or more other applications are open, such as application A10. FIG. 11I illustrates a transition from FIG. 11E in response to detecting that the movement of hand 10020 met the pluck gesture threshold (e.g., the pluck gesture succeeded). In a scenario where application A10 is open and running in the background when the pluck gesture succeeds and the application corresponding to application icon A5 is launched, application user interface 1070' of the application corresponding to application icon A5 is displayed in view 10000' concurrently with user interface 1080' of application A10. For example, in response to detecting that the movement of hand 10020 met the pluck gesture threshold, user interface 1080' of application A10 is redisplayed at a location where user interface 1080' of application A10 was previously displayed (e.g., before being hidden when home user interface 1120 was invoked), and user interface 1070' of the application corresponding to application icon A5 is displayed as stacked in front of user interface 1080' of application A10. In some embodiments, user interface 1070' corresponding to application icon A5 is displayed at a location that corresponds to a location where application icon A5 1070 was dropped.

Figures 11K, 11L:
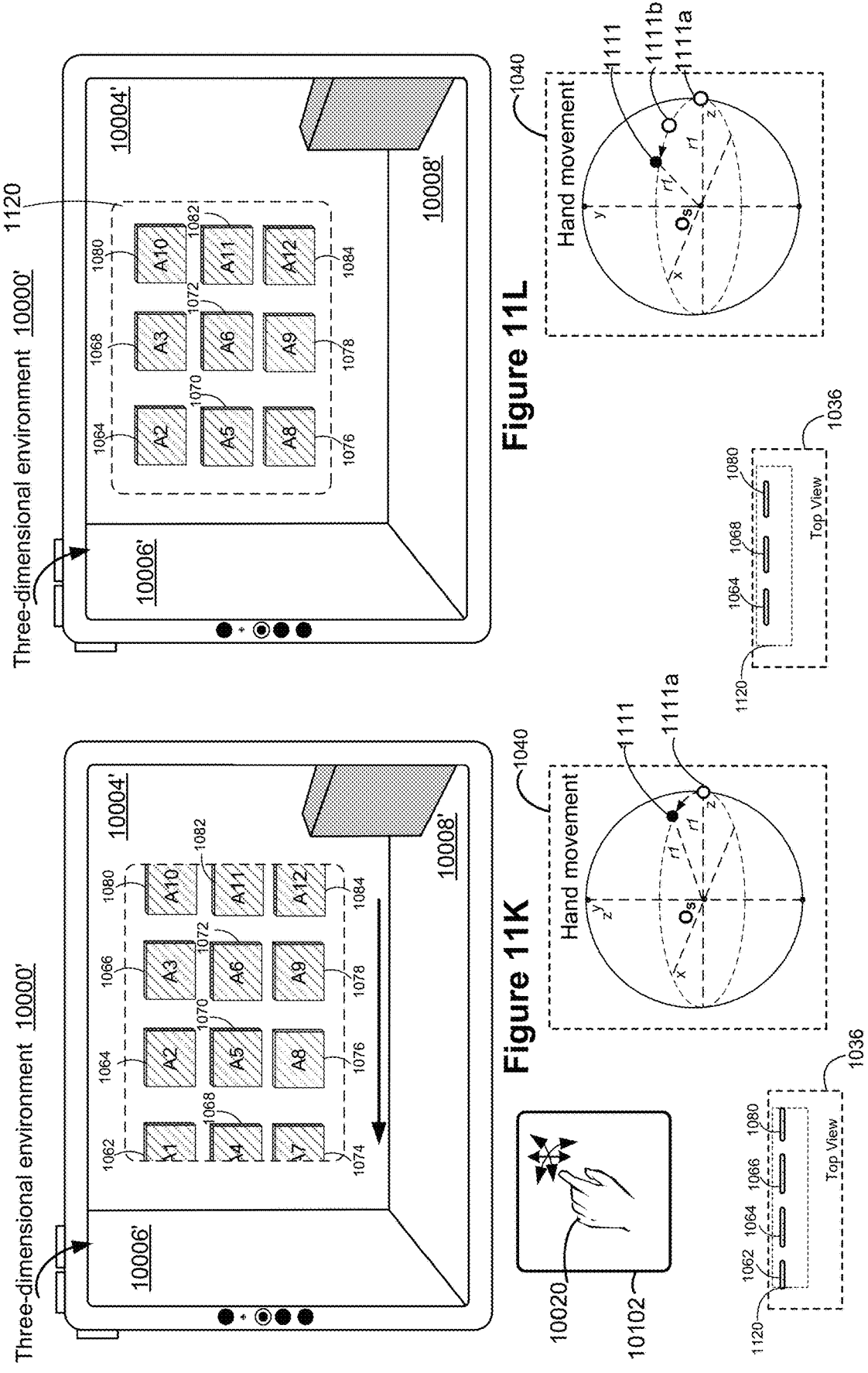

While FIGS. 11C-11F and FIGS. 11G-11H illustrate that the computer system launches an application in response to successful completion of a pluck gesture involving a threshold amount of movement of hand 10020 towards user 10002 that precedes any lateral movement that is substantially parallel to home user interface 1120, FIGS. 11J-11L illustrate that the computer system scrolls application icons displayed in the home user interface 1120 in accordance with a determination that a lateral movement that is substantially parallel to home user interface 1120 is not preceded by the threshold amount of movement of hand 10020 towards user 10002 required for the pluck gesture.

FIG. 11J illustrates a scenario where user 10002 is interacting with home user interface 1120. For example, user 10002 gazes at a location within home user interface 1120 as indicated by cursor 1034. While user 10002's gaze is directed to a location within home user interface 1120, computer system 101 detects an air pinch performed with hand 10020. Since the air pinch gesture does not involve movement input, current location 1111 of hand 10020 in FIG. 11J remains at a location on the surface of the spherical coordinate system during the air pinch gesture, as illustrated in view 1040.

FIG. 11K illustrates a transition from FIG. 11J in response to the computer system 101 detecting (e.g., via one or more cameras of computer system 101), while the air pinch is maintained, lateral movement of hand 10020 in a leftward direction in the physical environment 10000 (e.g., a scrolling input). In some circumstances, the movement of hand 10020 in the leftward direction is substantially parallel to home user interface 1120. View 1040 in FIG. 11K illustrates the scrolling input as movement of hand 10020 from location 1111a (e.g., corresponding to location 1111 in FIG. 11J) to current location 1111 in FIG. 11K along the surface of the spherical coordinate system, where radial distance r1 from location 1111a to origin point O$_S$ is substantially maintained during the scrolling input.

As illustrated in FIG. 11K, in response to the detecting of the lateral movement of hand 10020 in the leftward direction while the air pinch is maintained, application icons in home user interface 1120 are scrolled. In particular, FIG. 11K illustrates an intermediate state of scrolling home user interface 1120. For example, the intermediate state of home user interface 1120 in FIG. 11K illustrates the process of moving from the first page or section of home user interface 1120 to the second page or section of home user interface 1120. In the intermediate state of home user interface 1120 during the scrolling input some application icons have partially disappeared, and other application icons have partially appeared. For example, application icons A1 1062, A4 1068, and A7 1074 that were displayed in the leftmost column of home user interface 1120 prior to when the scrolling input was detected are partially hidden from display due to the scrolling input (e.g., due to being scrolled past an extent of home user interface 1120), and application icons A10 1080, A11 1082, and A12 1084 that were previously undisplayed prior to when the scrolling input was detected are partially revealed in response to detecting the scrolling input, as illustrated in top view 1036 in FIG. 11K. Further, in response to detecting the scrolling input, other application icons in the home user interface 1120 are shifted in the leftward direction. For example, application icons A2 1064, A3 1966, A5 1070, A6 1072, A8 1076, and A9 1078 are shifted in the leftward direction (e.g., within and relative to home user interface 1120). In some embodiments, during the scrolling, application icons in home user interface 1120 move laterally without moving vertically or without moving away or towards user 10002 (e.g., application icons in home user interface 1120 remain at the same distance or the same respective distances away from user 10002). In some embodiments, application icons at the leftmost and rightmost columns (e.g., or left and right edge of home user interface 1120) move away from user 10002's viewpoint, as if application icons A1 1062-A12 1084 are sliding over a curvature during the scrolling input (e.g., as application icons move from the side edges of home user interface 1120 toward the center of home user interface 1120, the application icons move closer to user 10002's viewpoint). In some embodiments, during the scrolling input, application icons in the center (e.g., application icons A2 1064, A3 1966, A5 1070, A6 1072, A8 1076, and A9 1078) do not change their distance away from user 10002, where application icons at the edges of home user interface 1120 (e.g., application icons A1 1062, A4 1068, A7 1074 and application icons A10 1080, A11 1082, and A12 1084) change the distance away from user 10002.

FIG. 11L illustrates a transition from FIG. 11K in response to detecting completion of the scrolling input to transition from the first to the second page of home user interface 1120. View 1040 illustrates the completion of the scrolling input as continued movement of hand 10020 from location 1111b (e.g., corresponding to location 1111 in FIG. 11K) along the surface of the spherical coordinate system to the current location 1111, following the movement of hand 10020 from location 1111a (e.g., corresponding to location 1111 in FIG. 11J) to location 1111b as described herein with reference to FIGS. 11J-11K, where radial distance r1 from location 1111 to origin point O$_S$ is substantially maintained during the scroll. In FIG. 11L, the second page of the home user interface 1120 is fully displayed, where application icons A1 1062, A4 1068, and A7 1074 are completely hidden from display (e.g., and optionally can be revealed again in response to a scrolling input in the rightward direction) and application icons A10 1080, A11 1082, and A12 1084 are completely revealed and displayed in the rightmost column of home user interface 1120.

Additional descriptions regarding FIGS. 11A-11L are provided below in reference to method 17000 described with respect to FIG. 17.

FIG. 12 is a flow diagram of an exemplary method 12000 for scrolling representations displayed in a home menu user interface, in accordance with some embodiments. In some embodiments, method 12000 is performed at a computer system (e.g., computer system 101 in FIG. 1A) including one or more display generation components (e.g., display generation component 120 in FIGS. 1A, 3, and 4, display generation component 7100 in FIG. 7A, a heads-up display, a display, a touchscreen, and/or a projector) and one or more input devices (e.g., color sensors, infrared sensors, and other depth-sensing cameras that point downward at a user's hand and/or forward from user 7002's head, a button, a dial, a rotatable input element, a switch, a moveable hardware input device, and/or a solid-state hardware input device). In some embodiments, the method 12000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 12000 are, optionally, combined and/or the order of some operations is, optionally, changed.

While displaying, via the one or more display generation components, an arrangement of icons (e.g., the arrangement extends in a first direction and a second direction orthogonal to the first direction; the arrangement is a regular arrangement) in a home menu user interface within a three-dimensional environment (e.g., in FIG. 7B, representations 7112-7132 are displayed in an arrangement that extends in both a x-direction and y-direction within XR three-dimensional environment 8003), wherein the arrangement of icons includes a first set of icons (e.g., representations 7112, 7114, and 7116 in FIG. 7B) and a second set of icons (e.g., representations 7120, 7122, and 7124 in FIG. 7B), the computer system detects (12002) a first user input (e.g., user input 7030 in FIG. 7B, which may be a swipe input, a gaze input, a tap input, and/or other input such an air pinch and drag input, an air swipe input or a digital crown rotation input)) for scrolling the arrangement of icons (e.g., along the second direction, such as the x-direction; for example, user input 7030 (e.g., an air pinch input, an air tap input, a pinch input, a tap input, a gaze input, and/or other input) in FIG. 7B includes movement towards a left side of home menu user interface 8012 to scroll home menu user interface 8012 laterally, and/or user input may be an input along one or more other directions, such as along a diagonal direction with respect to home menu user interface 8012). In response to detecting the first user input, the computer system moves (12004) icons in the arrangement of icons (e.g., representations 7116, 7124, and 7130 move from their respective positions shown in FIG. 7B to new positions shown in FIG. 7C). Moving icons in the arrangement of icons includes moving (12006) the first set of icons (e.g., in a first direction) at a first speed (e.g., representation 7116 moves from the position shown in FIG. 7B to the position shown in FIGS. 7C, at a first speed, and representations 7112 and 7114 move out of view at the first speed, and/or representation 7128 moves out of view at the first speed); and moving (12008) the second set of icons (e.g., in the first direction) at a second speed that is different from the first speed (e.g., representation 7124 moves from the position shown in FIG. 7B to the position shown in FIGS. 7C, at a second speed that is higher than the first speed, and representations 7120 and 7122 move out of view at the second speed, and/or representation 7128 moves out of view at the first speed), wherein moving the first set of icons at the first speed and the second set of icons at the second speed causes a spatial relationship between icons in the first set of icons to change relative to icons in the second set of icons (e.g., in FIG. 7B, representation 7124 is displayed to the right of representation 7116 while in FIGS. 7C, representation 7124 is displayed to the left of representation 7116).

Allowing a spatial relationship between the first icon and the second icon to change during the movement increases the flexibility in the types of arrangement of icons that can be presented to the user, increasing operational efficiency of user-machine interactions.

In some embodiments, the second speed is faster than the first speed. For example, the distance moved by representation 7124 from an initial position shown in FIG. 7B to the updated position shown in FIG. 7C is larger than the distance moved by representation 7116 between FIGS. 7B and 7C, and as a result, the second speed is faster than the first speed. Allowing one set of icons to move faster than another set of icons increases the flexibility in the types of arrangement of icons that can be presented to the user, increasing operational efficiency of user-machine interactions. Having different sets of icons be moved at different speeds helps a user in distinguishing, identifying and locating icons during a scrolling process.

In some embodiments, an arrangement of the second set of icons is larger in at least one dimension (e.g., having more objects (e.g., in the center row, and/or in a different row), and/or have a larger spacing between pairs of objects) than an arrangement of the first set of icons. For example, in FIG. 7B, the second row (e.g., the center row, and/or in a different row) has a wider extent than does the first row (e.g., a lateral distance between representation 7120 and representation 7124 in the second row is greater than a lateral distance between representation 7112 and representation 7116 in the first row, and/or a lateral distance between representation 7126 and representation 7142 in the second row is greater than a lateral distance between representation 7132 and representation 7146 in the first row), and representation 7124 moves faster (e.g., with a higher speed, and/or is repositioned at the updated location more quickly) from the initial position of representation 7124 shown in FIG. 7B to the updated position of representation 7124 shown in FIG. 7C than representation 7116 moves from the initial position of representation 7116 shown in FIG. 7B to the updated position of representation 7116 shown in FIG. 7C. Allowing an arrangement of one set of icons to be larger in at least one dimension compared to an arrangement of a different set of icons increases the flexibility in the types of arrangement of icons that can be presented to the user, increasing operational efficiency of user-machine interactions. Having arrangements of icons that have different dimensions helps a user in distinguishing, identifying and locating icons during a scrolling process.

In some embodiments, the computer system displays the arrangement of icons that includes the first set of icons and the second set of icons substantially in a plane (e.g., in a particular z-plane). In some embodiments, the icons have respective simulated spatial locations in a three-dimensional environment. In some embodiments, the simulated spatial locations are in a same respective plane or same smooth surface (e.g., a spherical surface representing a consistent radial distance from the viewpoint of the user). In some embodiments, the movement of the arrangement of icons moves the icons within the respective plane. Accordingly, in some embodiments, the first row of icons moves faster within the respective plane than does the second row of icons. In some embodiments, the icons are substantially in a plane in that the icons all intersect a same plane (e.g., a z-plane), such as when the back surfaces of the icons are flush with the plane, the front surfaces of the icons are flush with the plane, and/or the plane passes through at least a portion of each icon. In some embodiments, the icons are substantially in a plane in that at least a portion of each of the icons is within a threshold distance of the plane (e.g., for each icon, a distance between the plane and a surface of the respective icon is less than the threshold distance).

For example, representation 7124 and representation 7116 shown in FIGS. 7B and 7C are positioned in a plane (e.g., extending along the x-direction and the y-direction) at a particular z position, and representation 7124 moves faster over a wider lateral extent compared to representation 7116, which moves slower over a narrower lateral extent. Presenting the arrangement of icons substantially in a plane improves visibility of the icons that are presented to the user while the different scrolling speeds of the icons in the arrangement increases the flexibility in the types of arrangement of icons that can be presented to the user, increasing operational efficiency of user-machine interactions. Presenting the arrangement of icons substantially in a plane helps a user in distinguishing, identifying and locating icons during a scrolling process.

In some embodiments, while displaying an icon in the second set of icons at a first edge (e.g., right edge) of the arrangement, the computer system displays the icon further than other icons in the arrangement of icons in a first direction corresponding to the first edge (e.g., an icon at the right edge of the first row of the arrangement is positioned further to the right than other icons at the right edges of other rows). The computer system moves the icon in the second set of icons (e.g., in response to detecting the first user input) to a second edge of the arrangement of icons such that the icon is further than other icons in the arrangement of icons in a second direction corresponding to the second edge (e.g., moving the icon in the second set of icons as a result of input provided by the user (e.g., the rows shift as the input progress or in response to the input; an icon at the left edge of the first row of the arrangement is positioned further to the left than other icons at the left edges of other rows), wherein the second edge is opposite (or substantially opposite) the first edge (e.g., right versus left), and the second direction is opposite (or substantially opposite) the first direction (e.g., the right edge of a row extending further rightward, versus the left edge of the row extending further leftward).

For example, in FIG. 7B, representation 7124 is closer to a right edge of home menu user interface 8012 than are representation 7116 and representation 7130. In response to detecting user input 7030, computer system 101 scrolls the arrangement of representations to the arrangement shown in FIG. 7C. In FIGS. 7C, representation 7124 is closer to a left edge of home menu user interface 8012 than are representation 7116 and representation 7130. Displaying an icon further than other icons in a first direction corresponding to a first edge while displaying the icon at the first edge and moving the icon to a second edge so that the icon is further than other icons in the arrangement in a second direction corresponding to the second edge helps maintain consistency of the arrangement of icons across different scrolling pages, and allows a larger number of icons to be presented within that one row, increasing an operational efficiency by presenting more icons to a user, while the arrangement of icons helps the user in distinguishing, identifying and locating icons during a scrolling process, increasing operational efficiency of user-machine interactions. Furthermore, providing a scrollable home menu user interface in response to the first input efficiently provides the user with a larger range of applications, people, virtual environments or other operations than would be possible with a static, non-scrollable home menu user interface.

In some embodiments, the computer system displays icons at one or more edges of the arrangement of icons (e.g., a left edge, a right edge, but not a top edge or a bottom edge, the edge is perpendicular to a scrolling direction) with one or more deemphasized visual characteristics (e.g., relative to interior icons not at edges of the arrangement, deemphasizing visual characteristics include blurring, fading, or flattening the icons and/or reducing a size of the icons).

For example, home menu user interface 8012 and top view 7082 in FIG. 7C show that representations 7116 and 7138 at the edges are deemphasized, in that these representations are flattened compared to representations 7118, 7134, and 7136, which have a more three-dimensional appearance (e.g., extends into a simulated depth dimension, or the depth dimension). Displaying icons at edges of the arrangement with a deemphasized visual characteristic provides a visual indication to a user regarding a scrolling dimension on a page of icons, without having to provide additional controls to the user, and helps a user in distinguishing, identifying and locating icons during a scrolling process, increasing operational efficiency of user-machine interactions. Displaying icons at edges of the arrangement with a deemphasized visual characteristic provides an indication to a user of the spatial extent of the icons that would be shifted during the scrolling process. Displaying icons at edges of the arrangement with a deemphasized visual characteristic also gives visual emphasis to interactable icons in the current page of icons while indicating that there are more icons on other pages (e.g., which are currently non-interactable but can be brought into focus).

In some embodiments, the computer system displays icons positioned away from edges of the arrangement of icons (e.g., a left edge, a right edge, but not a top edge or a bottom edge, the edge is perpendicular to a scrolling direction) with a three-dimensional visual characteristic (e.g., the three-dimensional visual characteristic is a depth dimension from a viewpoint of a user, the three-dimensional visual characteristic includes specular reflection(s) simulating light from the three-dimensional environment reflecting from the edges, the light may originate from simulated light sources and/or one or more physical light sources in physical environment 7000 corresponding to the displayed three-dimensional environment, the three-dimensional visual characteristic includes shadows cast by user interface elements in a displayed three-dimensional environment based on one or more sources of light in the three-dimensional environment, such as simulated or computer-generated light sources and/or physical light sources in physical environment 7000 corresponding to the displayed three-dimensional environment, and/or the three-dimensional visual characteristic includes separating layers of a user interface element to different degrees along at least one dimension in response to different user interactions including a user directing attention to the user interface element).

For example, in FIGS. 7C, representations 7118, 7134, and 7136, which are not at the edges of the home menu user interface 8012, have a more three-dimensional appearance (e.g., extending further in a simulated depth dimension, or the z-direction) compared to representations 7116 and 7138. Displaying icons positioned away from edges of the arrangement with a three-dimensional visual characteristic provides a visual indication to a user regarding a scrolling dimension on a page of icons, without having to provide additional controls to the user, and helps a user in distinguishing, identifying and locating icons during a scrolling process, increasing operational efficiency of user-machine interactions. Displaying icons at edges of the arrangement with a deemphasized visual characteristic also gives visual emphasis to interactable icons in the current page of icons while indicating that there are more icons on other pages (e.g., which are currently non-interactable but can be brought into focus).

In some embodiments, the computer system displays icons at edges of the arrangement of icons (e.g., a left edge, a right edge, but not a top edge or a bottom edge; and/or an edge that is perpendicular to a scrolling direction (e.g., an edge that icons being scrolled are moved across while being scrolled out of focus or view)) with a displacement along a simulated depth dimension (e.g., pushed back in a simulated depth dimension, further from a viewpoint of a user) relative to icons positioned away from edges of the arrangement of icons.

For example, home menu user interface 8012 and top view 7082 in FIG. 7C shows that representations 7116 and 7138, which are at the edges, are pushed back in a simulated depth dimension (e.g., the depth dimension) away from a viewpoint of the user, compared to representations 7118, 7134, and 7136. Displaying icons at edges of the arrangement with a displacement along a simulated depth dimension provides a visual indication to a user regarding a scrolling dimension on a page of icons, without having to provide additional controls to the user, and helps a user in distinguishing, identifying and locating icons during a scrolling process, increasing operational efficiency of user-machine interactions. Displaying icons at edges of the arrangement with a deemphasized visual characteristic also gives visual emphasis to interactable icons in the current page of icons while indicating that there are more icons on other pages (e.g., which are currently non-interactable but can be brought into focus).

In some embodiments, the computer system detects a second user input (e.g., a swipe input; a gaze input; a tap input, an air pinch and drag input, an air drag input, a drag input, a click and drag input, a gaze input, and/or other movement input) for scrolling the arrangement of icons (e.g., along the second direction). While (e.g., and in response to) detecting the second user input, the computer system changes one or more visual characteristics of the arrangement of icons (e.g., in a respective direction corresponding to a direction of movement of the second user input). The computer system detects an end of the second user input. In response to detecting the end of the second user input (e.g., a depinch input while performing an air pinch gesture, a lift off gesture, or another input indicating an end of the gesture), (e.g., where the second user input fails to satisfy first criteria (e.g., a scrolling amount of the arrangement of icons in a respective direction prior to detecting the end of the second user input is below a distance threshold, a gaze dwell time for scrolling the arrangement of icons is shorter than a time threshold, a time interval between a start and the end of the second user input is shorter than a time threshold)), the computer system at least partially reverses the changing of the one or more visual characteristics of the arrangement of icons (e.g., displaying a rubber banding effect for icons at an edge of the arrangement of icons).

For example, in response to detecting a first portion of user input 7042 (e.g., an air pinch input, an air tap input, a pinch input, a tap input, an air pinch and drag input, an air drag input, a drag input, a click and drag input, a gaze input, and/or other input)), computer system 101 changes visual characteristics of representation 7116 at a left edge of the arrangement of representations and changes visual characteristics of representation 7138 at a right edge of the arrangement of representations from that indicated in home menu user interface 8012 and top view 7084 to that indicated in top view 7086 of FIG. 7I. Representation 7116 becomes less visually prominent going from top view 7084 to top view 7086, while representation 7138 becomes more visually prominent going from top view 7084 to top view 7086. In response to detecting a second portion of user input 7042, computer system 101 at least partially reverses the changes in visual characteristics of representations 7116 and 7138, as indicated in the transition to top view 7088 from top view 7086. Partially reversing the changing of the one or more visual characteristics of the arrangement of icons provides a visual indication to a user that the second user input did not cause all of the earlier displayed changes to persist, without having to provide additional controls to the user (e.g., to prompt the user to provide a third user input to change the display). Partially reversing the changing of the one or more visual characteristics helps a user in distinguishing, identifying and locating icons that are interactable via the second user input during a scrolling process, increasing operational efficiency of user-machine interactions. Displaying icons at edges of the arrangement with a deemphasized visual characteristic also gives visual emphasis to interactable icons in the current page of icons while indicating that there are more icons on other pages (e.g., which are currently non-interactable but can be brought into focus).

In some embodiments, changing the one or more visual characteristics of the arrangement of icons includes scrolling the arrangement of icons in a respective direction, and at least partially reversing the changing of the one or more visual characteristics of the arrangement of icons includes at least partially reversing the scrolling of the arrangement of icons in the respective direction. Partially reversing the scrolling of the arrangement of icons in the respective direction provides a visual indication to a user that the second user input did not cause the position of the scrolled arrangement to persist, without having to provide additional controls to the user (e.g., to prompt the user to provide a third user input to scroll the arrangement of icons).

For example, in response to detecting a first portion of user input 7042, computer system 101 changes a location of representation 7116 and a location of representation 7138 by moving representations 7116 and 7138 from their original positions shown in top view 7084 towards the left as shown in top view 7086 of FIG. 7I, and similarly shifts the locations of representations 7118, 7134, and 7136 to the left. In response to detecting a second portion of user input 7042, computer system 101 at least partially reverses the changes in locations of representation 7116 and 7138, as well as the changes in locations of representations 7118, 7134, and 7136, as shown in top view 7088. Partially reversing the scrolling of the arrangement of icons in the respective direction helps a user in distinguishing, identifying and locating icons that are interactable via the second user input during a scrolling process, increasing operational efficiency of user-machine interactions. Displaying icons at edges of the arrangement with a deemphasized visual characteristic also gives visual emphasis to interactable icons in the current page of icons while indicating that there are more icons on other pages (e.g., which are currently non-interactable but can be brought into focus).

In some embodiments, changing the one or more visual characteristics of the arrangement of icons includes changing a deemphasized visual characteristic of icons in the arrangement of icons, and at least partially reversing the changing of the one or more visual characteristics of the arrangement of icons includes at least partially reversing the changing of the deemphasized visual characteristic of the icons (e.g., at least partially returning the deemphasized visual characteristic to the respective values in response to detecting the end of the second user input, (e.g., detecting a depinch input while performing an air pinch gesture, a lift off gesture, or another input indicating an end of the gesture)).

For example, in response to detecting a first portion of user input 7042, computer system 101 changes one or more visual characteristics of representation 7116 by decreasing a visual emphasis of representation 7116 (e.g., making representation 7116 more transparent, more translucent, displayed with lower intensity, lower in contrast, more blurred, dimmer, or reduced in size) as shown in top view 7086 of FIG. 7I. In response to detecting a second portion of user input 7042, computer system 101 at least partially reverses the changes in the visual emphasis of representation 7116, as shown in top view 7088, by increasing the visual emphasis of representation 7116 (e.g., making representation 7116 less transparent, less translucent, displayed with a higher intensity, higher in contrast, sharper, brighter or increased in size). Conversely, in response to detecting the first portion of user input 7042, computer system changes one or more visual characteristics of representation 7138 by increasing the visual emphasis of representation 7138 and, in response to detecting the second portion of user input 7042, at least partially reverses the changes in the visual emphasis of representation 7138 by decreasing the visual emphasis of representation 7138. Partially reversing the changing of the deemphasized visual characteristic of the icons provides a visual indication to a user that the second user input did not cause all of the earlier displayed changes to persist, without having to provide additional controls to the user (e.g., to prompt the user to provide a third user input to change the display). Partially reversing the changing of the deemphasized visual characteristic of the icons helps a user in distinguishing, identifying and locating icons that are interactable via the second user input, increasing operational efficiency of user-machine interactions. Displaying icons at edges of the arrangement with a deemphasized visual characteristic also gives visual emphasis to interactable icons in the current page of icons while indicating that there are more icons on other pages (e.g., which are currently non-interactable but can be brought into focus).

In some embodiments, changing the one or more visual characteristics of the arrangement of icons includes moving one or more icons of the arrangement of icons along a simulated depth dimension, and at least partially reversing the changing of the one or more visual characteristics of the arrangement of icons includes at least partially reversing the moving of the one or more icons along the simulated depth dimension (e.g., at least partially returning the respective displacements to the respective values in response to detecting the end of the second user input (e.g., detecting a depinch input while performing an air pinch gesture, a lift off gesture, or another input indicating an end of the gesture)). Partially reversing the moving of the one or more icons along the simulated depth dimension provides a visual indication to a user that the second user input did not cause the position along the simulated depth dimension of the scrolled arrangement to persist, without having to provide additional controls to the user (e.g., to prompt the user to provide a third user input to change the display).

For example, in response to detecting a first portion of user input 7042, computer system 101 changes a position of representation 7116 and a position of representation 7138 along a simulated depth dimension (e.g., z direction) by moving representations 7116 and 7138 from their original positions in home menu user interface 8012 shown in top view 7084 to different distances from a viewpoint of the user as shown in top view 7086 of FIG. 7I (e.g., representation 7116 being moved further away from the viewpoint of the user, whereas representation 7138 is moved closer to the viewpoint of the user, and/or other displacements along the simulated depth dimension). In response to detecting a second portion of user input 7042 (e.g., an air pinch input, an air tap input, a pinch input, a tap input, a gaze input, an air pinch and drag input, an air drag input, a drag input, a click and drag input, and/or other input), computer system 101 at least partially reverses the changes in positions of representation 7116 and 7138, along the simulated depth dimension, as shown in top view 7088 (e.g., representation 7116 being moved closer to the viewpoint of the user again, whereas representation 7138 is moved further from the viewpoint of the user again, and/or other displacements along the simulated depth dimension that result in representation 7116 and representation 7138 being moved to positions closer to those shown in top view 7084). Partially reversing the moving of the one or more icons along the simulated depth dimension helps a user in distinguishing, identifying and locating icons that are interactable via the second user input, increasing operational efficiency of user-machine interactions. Displaying icons at edges of the arrangement with a deemphasized visual characteristic (e.g., an increased depth, along the simulated depth dimension, from a viewpoint of the user) also gives visual emphasis to interactable icons in the current page of icons while indicating that there are more icons on other pages (e.g., which are currently non-interactable but can be brought into focus).

In some embodiments, the first set of icons and the second set of icons correspond to a first page of the arrangement of icons. In response to detecting the first user input, the computer system displays at least a portion of a second page of the arrangement of icons including a third set of icons and a fourth set of icons, wherein a first additional spacing between the first set of icons and the third set of icons is greater than a spacing between adjacent icons in the first set of icons, and a second additional spacing between the second set of icons and the fourth set of icons is greater than a spacing between adjacent icons in the second set of icons. In some embodiments, in accordance with the additional spacing, a spacing or distance between an icon in one set of icons (e.g., the first set or the second set) and an adjacent icon in the next set of icons (e.g., the third set or the fourth set, respectively) is greater than a spacing or distance between adjacent icons in either set of icons (e.g., adjacent icons in the first set, in the second set, in the third set, or in the fourth set).

For example, a first page of representations is displayed in FIG. 7B, and a second page of representations is displayed in FIG. 7C (e.g., in response to detecting user input 7030 such as an air pinch and drag input, an air drag input, a drag input, a click and drag input, a gaze input, scrolling home menu user interface 8012). Spacings 7052, 7054, and 7056 in FIG. 7B demarcate representations of the first page (displayed on the left side of spacings 7052, 7054, and 7056) from representations of the second page (displayed on the right side of spacings 7052, 7054, and 7056). As described herein with reference to FIGS. 7B and 7C, spacings 7052, 7054, and 7056 are in some embodiments larger than spacings between adjacent icons of the first page (e.g., adjacent representations of representations 7112, 7114, and 7116; or of representations 7122 and 7124; or of representations 7128 and 7130) and between adjacent icons of the second page (e.g., adjacent representations of representations 7118, 7134, and 7136; or of representations 7126, 7140, and 7142; or of representations 7132, 7150, and 7146). Displaying a second additional spacing between the second set of icons and the fourth set of icons that is greater than a spacing between adjacent icons in the second set of icons provides a visual indication to a user of the page-wise arrangement or division of the arrangement of icons, and provides feedback about icons that are interactable in the current page of icons while indicating that there are more icons on other pages (e.g., which are currently non-interactable but can be brought into focus). Visually separating the previous page of icons from the current page of icons also makes it easier for the user to identify the relevant icons (e.g., highlighting/emphasizing a relevant arrangement of icons across multiple pages of icons) and helps a user in distinguishing, identifying and locating icons that are interactable, increasing operational efficiency of user-machine interactions.

In some embodiments, while displaying the first page of the arrangement of icons, including displaying the first set of icons and the second set of icons, the computer system displays a first indicator of a paginated view corresponding to the first page. While displaying the second page of the arrangement of icons, the computer system displays a second indicator of the paginated view corresponding to the second page. Displaying a first indicator of a paginated view corresponding to the first page provides a visual indication to a user of a position of the currently displayed page of icons among all the available pages of icons, and provides feedback about icons that are interactable in the current page of icons while indicating that there are more icons on other pages (e.g., which are currently non-interactable but can be brought into focus).

For example, pagination indicator 7050 in FIGS. 7B-7C shows that a first page of representations is displayed in FIG. 7B, and a second page of representations is displayed in FIG. 7C. Displaying the first indicator also helps a user navigate across multiple pages of icons, reducing the amount of time needed to reach the desired page of icons containing the icon the user intends to interact with, increasing operational efficiency of user-machine interactions. Furthermore, providing a scrollable home menu user interface in response to the first input efficiently provides the user with a larger range of applications, people, virtual environments or other operations than would be possible with a static, non-scrollable home menu user interface.

In some embodiments, the computer system displays icons in the first set of icons and icons in the second set of icons as icons having a same size in one or more dimensions (e.g., a same height, same width, same height and width, and/or same size and shape). For example, representations 7112-7132 in FIG. 7B have the same size (e.g., height and width). Displaying icons in the first set of icons and icons in the second set of icons as icons having a same size in one or more dimensions increases the flexibility in the types of arrangement of icons that can be presented to the user, by indicating to the user that representations having a same size in one or more dimensions are the same type of scrollable elements (e.g., representations of applications), increasing operational efficiency of user-machine interactions.

In some embodiments, the icons are representations of software applications executable on the computer system. The computer system detects a third user input (e.g., an air pinch input, an air tap input, a pinch input, a tap input, a gaze input, and/or other input) directed to a respective icon representing a respective software application that is executable on the computer system. In response to detecting the third user input directed to the respective icon, the computer system displays (e.g., in a foreground of the three-dimensional environment, causing the software application corresponding to the representation to run in the foreground, as a focused application) an application user interface of the respective software application.

For example, representations 7112-7132 in FIG. 7B, and similar representations 7134, 7136, 7138, 7140, 7142, 7144, 7146, and 7148 in FIG. 7C correspond to icons of various software applications that can be executed on computer system 101 (e.g., an email application, a web browser, a messaging application, a maps application, a video player, or an audio player, or other software application). Allowing different arrangements of icons to be presented to the user allows a user to quickly access and navigate a collection of applications in a home menu user interface, without displaying additional controls, minimizing the number of inputs required to select a desired operation, improving performance and operational efficiency of the computer system.

In some embodiments, in response to detecting the first user input: the computer system displays a first animation of at least a subset of the first set of icons and at least a subset of the second set of icons that includes changing one or more visual characteristics to deemphasize at least the subset of the first set of icons and at least the subset of the second set of icons; and the computer system displays a second animation of at least a subset of a third set of icons and at least a subset of a fourth set of icons (e.g., the first and second sets of icons correspond to a first page of the arrangement of icons and the third and fourth sets of icons correspond to an adjacent, second page of the arrangement of icons) that includes at least partially reversing the first animation. In response to detecting the third user input (e.g., for launching the application user interface of the software application, or in response to detecting an input such as a press on a hardware input device such as a crown), the computer system ceases to display the home menu user interface, including displaying the first animation of icons in the arrangement of icons that includes changing the one or more visual characteristics to deemphasize the icons in the arrangement of icons over time. In response to detecting a fourth user input to invoke the home menu user interface, the computer system displays the home menu user interface including displaying the second animation that includes at least partially reversing the first animation. (e.g., ceasing to display the home menu user interface includes displaying a first animation that changes a visual emphasis of icons). In some embodiments, the first animation includes changing three-dimensional visual characteristics such as changing a depth dimension from a viewpoint of a user (e.g., increasing a depth dimension from the viewpoint of the user to decrease the visual emphasis), decreasing specular reflections that simulate light from the three-dimensional environment reflecting from the edges of the icons, the light may originate from simulated light sources and/or one or more physical light sources in physical environment 7000 corresponding to the displayed three-dimensional environment, the three-dimensional visual characteristic includes decreasing an intensity or size of shadows cast by icons in a displayed three-dimensional environment based on one or more sources of light in the three-dimensional environment, such as simulated or computer-generated light sources and/or physical light sources in physical environment 7000 corresponding to the displayed three-dimensional environment, or decreasing the visual emphasis includes decreasing a separation between layers of a user interface element to different degrees along at least one dimension in response to different user interactions including a user directing attention to the user interface element. In some embodiments, visual characteristics for different icons may change at different times as the icons appear. In some embodiments, visual characteristics gradually change over time as the home menu user interface appears.

For example, in response to detecting user input 7042 (e.g., an air pinch and drag input, an air drag input, a drag input, a click and drag input, a gaze input, and/or other input)) (FIG. 7I), computer system 101 displays an animation of representation 7116 at an edge (e.g., a left edge, or a different edge) of the arrangement moving left (e.g., along the x direction, or a different direction have a component along the x direction) and being visually deemphasized as representation 7116 leaves (e.g., hides from, and/or is at least partially obscured from) the field of view of the user as show in FIG. 7I and top views 7084 and 7086. Similarly, in response to detecting user input 7042, computer system 101 displays an animation of representation 7138 at a different edge (e.g., a right edge, or a different edge) of the arrangement moving left (e.g., along the x direction, or a different direction having a component along the x direction) and being visually emphasized as representation 7138 enters a more central portion of the field of view of user 7002. The animation for scrolling and increasing the visual emphasis of representations (e.g., representation 7138, and/or representation 7144) into a field of view of user 7002 in response to detecting the user input 7042 is optionally the same as the animation used for showing representations 8014-8028 in FIG. 8B, 8H, or 8I, in response to home menu user interface 8012 being invoked. The animation for hiding and decreasing the visual emphasis of representations (e.g., representation 7116, and/or representation 7122) while scrolling the arrangement of representations out of a field of view of user 7002 in response to detecting the user input 7042 is optionally the same as the animation used for hiding representations 8014-8028 as home menu user interface 8012 is dismissed while transitioning from FIG. 9A to FIG. 9B.

Ceasing to display the home menu user interface, including displaying the first animation of icons in the arrangement of icons that is the same animation for deemphasizing at least the subset of the first set of icons in response to scrolling the arrangement of icons helps a user in distinguishing, identifying and locating icons that are interactable via the second user input, increasing operational efficiency of user-machine interactions. Displaying icons at edges of the arrangement with a deemphasized visual characteristic (e.g., an increased depth, along the simulated depth dimension, from a viewpoint of the user) also gives visual emphasis to interactable icons in the current page of icons while indicating that there are more icons on other pages (e.g., which are currently non-interactable but can be brought into focus).

In some embodiments, the computer system detects a fifth user input (e.g., an air pinch input, an air tap input, a pinch input, a tap input, an air pinch and drag input, an air drag input, a drag input, a click and drag input, a gaze input, and/or other input) for displaying a different portion of the home menu user interface. In response to detecting the fifth user input, the computer system displays a second arrangement of icons corresponding to the different portion of the home menu user interface, wherein the second arrangement of icons includes a fifth set of icons and a sixth set of icons. In some embodiments, icons in the second arrangement of icons correspond to different types of functions of the computer system (e.g., icons for initiating communications with other people, icons for displaying computer-generated environments, or other icons) than the icons in the first arrangement of icons (e.g., icons for launching applications). The computer system detects a sixth user input for scrolling the second arrangement of icons. In response to detecting the sixth user input, the computer system moves the fifth set of icons and the sixth set of icons, including: moving the fifth set of icons (e.g., in a first direction) at a third speed; and moving the sixth set of icons (e.g., in the first direction) at the third speed, and maintaining a spatial relationship between icons in the fifth set of icons and icons in the sixth set of icons.

For example, representations 7116 and 7124 in FIGS. 7B-7C allow respective applications associated with these representations to be launched. As home menu user interface 8012 is scrolled, representation 7116 moves from the position shown in FIG. 7B to the position shown in FIGS. 7C, at a first speed that is different from a second speed at which representation 7124 moves from the position shown in FIG. 7B to the position shown in FIG. 7C. In contrast, representation 7174 and representation 7184 (e.g., displayed in response to user input 7036 directed to tab 7234 (FIG. 7E) to request display of a different collection of representations, as described herein with reference to FIGS. 7E-7F, and/or automatically displayed when a communication application is launched) allow user 7002 to initiate or maintain communications with other people. Representation 7174 moves from the position of representation 7174 shown in FIG. 7F to the position of representation 7174 shown in FIG. 7G, at a same speed as representation 7184 moves from the position of representation 7184 shown in FIG. 7F to the position of representation 7184 shown in FIG. 7G. In another example, representation 7404 and representation 7406 (e.g., displayed in response to user input 7040 directed to tab 7236 (FIG. 7G) to request display of yet another collection of representations, as described herein with reference to FIGS. 7G-7H, and/or automatically displayed when a related application is launched) allow the user 7002 to display different computer-generated virtual environments within XR three-dimensional environment 8003. Computer system 101 is configured to scroll representations 7404 and 7406 at the same speed as each other in response to detecting user input for scrolling representations 7404 and 7406 (e.g., an air pinch input, an air tap input, a pinch input, a tap input, an air pinch and drag input, an air drag input, a drag input, a click and drag input, a gaze input, and/or other input).

Maintaining a spatial relationship between icons in the fifth set of icons and icons in the sixth set of icons while moving the fifth set of icons and the sixth set of icons helps a user in distinguishing these sets of icons from icons that are representations of applications, increasing operational efficiency of user-machine interactions. Furthermore, providing a scrollable home menu user interface in response to the fifth input efficiently provides the user with a larger range of applications, people, virtual environments or other operations than would be possible with a static, non-scrollable home menu user interface.

In some embodiments, the icons include a first representation of a first person, and a second representation of a second person, the first representation and the second representation for initiating (e.g., or continuing) communication with the first person and the second person respectively. The computer system detects a fifth user input directed to the first representation of the first person (e.g., an air pinch input, an air tap input, a pinch input, a tap input, an air pinch and drag input, an air drag input, a drag input, a click and drag input, a gaze input, and/or other input). In response to detecting the fifth user input directed to the first representation of the first person: the computer system displays a user interface for initiating (e.g., starting, joining, or re-joining/continuing) a communication session with the first person.

For example, representation 7174 associated with a first person and representation 7184 associated with a second person in FIG. 7G correspond to representations that allow user 7002 to initiate or maintain communications with other people (e.g., via user input activating one or more such representations, and/or via automatic activation based on predictions by computer system 101). Allowing different arrangements of icons to be presented to the user allows a user to quickly access and navigate a collection of representations in the home menu user to interact with other people, without displaying additional controls, minimizing the number of inputs required to select a desired operation, improving performance and operational efficiency of the computer system.

In some embodiments, the icons are representations of computer-generated three-dimensional environments (e.g., virtual or augmented-reality environments). The computer system detects a sixth user input directed to a respective icon (e.g., an air pinch input, an air tap input, a pinch input, a tap input, an air pinch and drag input, an air drag input, a drag input, a click and drag input, a gaze input, and/or other input). In response to detecting the sixth user input directed to the respective icon, the computer system displays a computer-generated three-dimensional environment corresponding to the respective icon.

For example, representation 7404 and representation 7406 in FIG. 7H correspond to different computer-generated environments that a user can select to be displayed as the XR three-dimensional environment 8003. Allowing different arrangements of icons to be presented to the user allows a user to quickly access and navigate a collection of representations for changing a virtual environment for that user, without displaying additional controls, minimizing the number of inputs required to select a desired operation, improving performance and operational efficiency of the computer system.

In some embodiments, the computer system displays, in the arrangement of icons, a folder for one or more software applications executable on the computer system that operate in a compatibility mode (e.g., software applications configured to execute on a second computer system with a different type of operating system or environment from that of the computer system, such as binary compatible applications that were not optimized for an AR/VR environment). For example, folder 7150 in FIG. 7D, when activated by user input 7034 of FIG. 7D, provides access to representations 7202, 7204, 7206, 7208, 7210, 7212, 7214, 7216, and 7218 as shown in FIG. 7E, which allow respective corresponding applications associated with these representations to be launched. The applications associated with representations 7202-7218 operate in a compatibility mode that may not be optimized for XR three-dimensional environment 8003. Displaying a folder for one or more software applications executable on the computer system that operate in a compatibility mode allows a user in an XR three-dimensional environment to quickly access software applications that are not optimized for an XR three-dimensional environment while easily discerning a difference in the nature of those applications (e.g., binary compatible applications that were not optimized for an AR/VR environment vs. applications that are optimized for the XR three-dimensional environment), improving performance and operational efficiency of the computer system. The user would not have to waste time troubleshooting or be confused about features of those applications (e.g., behaviors that are not optimized for the XR three-dimensional environment), which enhances the operability of the device and makes the user-device interface more efficient and, additionally, reduces power usage and improves battery life of the device by enabling the user to use the device more quickly and efficiently. Displaying the folder for applications that operate in a compatibility mode improves efficiency of the computer system by bringing together the group of binary compatible applications and allowing the user to see the collection of binary compatible applications in the computer system at a single location without actually opening the applications up. The speed of a user's navigation through various representations can be improved and the user can more quickly access desired data stored in, and functions of applications included in, the computer system.

In some embodiments, the computer system loads a software application configured to operate in the compatibility mode onto the computer system. In response to the software application being loaded onto the computer system, the computer system automatically populates the folder with an icon associated with the software application configured to operate in the compatibility mode. The computer system detects a seventh user input (e.g., an air pinch input, an air tap input, a pinch input, a tap input, an air pinch and drag input, an air drag input, a drag input, a click and drag input, a gaze input, and/or other input) directed to the icon associated with the software application configured to operate in the compatibility mode. In response to detecting the seventh user input directed to the icon associated with the software application configured to operate in the compatibility mode, the computer system displays (e.g., in a foreground of the three-dimensional environment, causing the software application corresponding to the representation to run in the foreground, as a focused application) an application user interface of the software application operating in the compatibility mode.

For example, representations 7202, 7204, 7206, 7208, 7210, 7212, 7214, 7216, and 7218 in FIG. 7E are automatically added to folder 7150 (shown in FIG. 7D) when applications associated with respective representations 7202-7218 are added to computer system 101. Automatically populating the folder with an icon associated with the software application configured to operate in the compatibility mode allows a user in an XR three-dimensional environment to quickly access software applications that are not optimized for an XR three-dimensional environment while easily discerning a difference in nature of those applications (e.g., binary compatible applications that were not optimized for an AR/VR environment) vs. applications that are optimized for the XR three-dimensional environment, improving performance and operational efficiency of the computer system.

In some embodiments, while the icon associated with the software application configured to operate in the compatibility mode is displayed at a first location, the computer system detects an eighth user input (e.g., an air pinch input, an air tap input, a pinch input, a tap input, an air pinch and drag input, an air drag input, a drag input, a click and drag input, a gaze input, and/or other input) directed to the icon and corresponding to a request to reposition the icon from the first location (e.g., to a different location within the folder or to move the icon out of the folder). In response to detecting the eighth user input, the computer system maintains the icon at the first location (e.g., forgoing repositioning the icon). For example, in FIG. 7E, computer system 101 prepopulates representations 7202-7218 in folder 7150 as respective binary compatible applications are installed in computer system 101. A position of any of representations 7202-7218 cannot be changed nor can any of the representations 7202-7218 be moved out of folder 7150 by user input. Maintaining the icon at the first location allows a user to easily discern, while interacting with the icon (e.g., by attempting to reposition or move the icon out of the folder) a difference in nature of the application corresponding to the icon (e.g., a binary compatible application that is not optimized for an XR three-dimensional environment vs. an application that is optimized for the XR three-dimensional environment), improving performance and operational efficiency of the computer system.

In some embodiments, the computer system detects a ninth user input (e.g., an air pinch input, an air tap input, a pinch input, a tap input, an air pinch and drag input, an air drag input, a drag input, a click and drag input, a gaze input, and/or other input) directed to an icon corresponding to a representation of a software application executable on the computer system, wherein the icon is positioned at a second location outside the folder, and the ninth user input corresponds to a request to move the icon into the folder. In response to detecting the ninth user input, the computer system maintains the icon at the second location without adding the icon to the folder. For example, representations 7116, 7122, and 7130, in FIG. 7D, which correspond to representations of applications that are optimized for XR three-dimensional environment 8003, cannot be added to folder 7150. Maintaining the icon at the second location without adding the icon to the folder, automatically curates the folder to contain software applications that are not optimized for an XR three-dimensional environment, which allows the user to more easily discern a difference in the nature of applications in the folder (e.g., binary compatible applications that were not optimized for an AR/VR environment vs. applications outside the folder that are optimized for the XR environment).

In some embodiments, aspects/operations of methods 13000, 14000, 15000, 16000, 17000, 22000, 23000, 24000, 25000, 27000, and 29000 may be interchanged, substituted, and/or added between these methods. For brevity, these details are not repeated here.

FIG. 13 is a flow diagram of an exemplary method 13000 for displaying a home menu user interface, in accordance with some embodiments. In some embodiments, method 13000 is performed at a computer system (e.g., computer system 101 in FIG. 1A) that includes one or more display generation components (e.g., display generation component 120 in FIGS. 1A, 3, and 4, a heads-up display, a display, a touchscreen, and/or a projector) and one or more input devices (e.g., a camera, a color sensor, an infrared sensor, or a depth-sensing camera, that points downward at a user's hand or a camera that points forward from the user's head, a button 7108, a dial, a rotatable input element, a switch, a moveable hardware input device, and/or a solid-state hardware input device). In some embodiments, the method 13000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 13000 are, optionally, combined and/or the order of some operations is, optionally, changed.

The computer system detects (13002) a first input to the computer system (e.g., a press input on the button 7108 in FIG. 8A, or an air gesture) to invoke a home menu user interface. In response to detecting the first input, the computer system displays (13004) via the one or more display generation components the home menu user interface in a three-dimensional environment, including: in accordance with a determination that a viewpoint of a user in the three-dimensional environment had a first elevation relative to a reference plane in the three-dimensional environment (e.g., a first head elevation of a user is detected using a gyroscope, using an inertia measurement unit, or other sensor housed within the computer system), displaying (13006) the home menu user interface at a first height in the three-dimensional environment; and in accordance with a determination that the viewpoint of the user in the three-dimensional environment had a second elevation relative to the reference plane in the three-dimensional environment, wherein the second elevation is different from the first elevation, displaying (13008) the home menu user interface at a second height in the three-dimensional environment, wherein the second height is different from the first height. For example, in FIG. 8B, the computer system displays the home menu user interface 8012 at a first height that is different from a second height at which the computer system displays the home menu user interface 8012 in FIG. 8D (e.g., a head elevation of the user in FIG. 8D is higher (e.g., above a horizontal reference plane 8008 in the three-dimensional environment) than the head elevation of the user in FIG. 8B, and the computer system 101 displays the home menu user interface 8012 at a correspondingly greater height in FIG. 8D compared to the height of the home menu user interface

8012 in FIG. 8B). In another example, in FIG. 8C, the computer system still displays the home menu user interface 8012 at the first height that is the same as the first height at which the computer system displays the home menu user interface 8012 in FIG. 8B even though the head elevation of the user in FIG. 8C is lower (e.g., below the horizontal reference plane 8008 in the three-dimensional environment) than the head elevation of the user in FIG. 8B. In yet another example, in FIG. 8E, the computer system displays the home menu user interface 8012 at a third height in the XR three-dimensional environment 8003 that is different from a fourth height at which the computer system displays the home menu user interface 8012 in FIG. 8F (e.g., FIGS. 8F1, 8F2 and 8F3, where a user interface analogous to the user interface shown in FIG. 8F1 is displayed on HMD 7100a in FIG. 8F2) (e.g., a head elevation of the user in FIG. 8F is higher (e.g., above the horizontal reference plane 8008 in the three-dimensional environment by a larger angle) than the head elevation of the user in FIG. 8E, and the computer system 101 displays the home menu user interface 8012 at a correspondingly greater height in FIG. 8F compared to the height of the home menu user interface 8012 in FIG. 8E)

Displaying the home menu user interface at a location based on a head elevation of a user, optionally independently of a user's gaze, reduces fatigue, and automatically presents the home menu user interface at an ergonomically favorable position to the user, without requiring manual adjustments from the user, increasing operational efficiency of user-machine interactions.

In some embodiments, detecting the first input to the computer system to invoke the home menu user interface includes detecting a press input on the one or more input devices (e.g., the one or more input devices include a button 7108 (FIG. 8A), such as a dial, rotatable input element, switch, a moveable hardware input device or a solid-state hardware input device that includes a physical or solid state button that may optionally be a rotatable input mechanism such as a digital crown that is used to change a level of immersion with the three-dimensional environment). In some embodiments, the one or more input devices detect localized sensor input such as intensity or force sensor input, and the computer system uses the localized sensor input from the solid-state hardware input device to trigger corresponding operations and optionally provides tactile feedback such as haptic feedback corresponding to the detected inputs. For example, as described herein with reference to FIGS. 8B-8G, the computer system 101 displays the home menu user interface 8012 in a field of view of the user in response to detecting an input (e.g., a press input) to the button 7108. Using a hardware or solid-state button reduces the number of moving parts, which improves reliability, and allows the computer system to be reconfigurable (e.g., by a firmware update that allows the solid-state button to provide different feedback, to offer other functionality, to receive additional types of inputs). Using a single input to an input device (e.g., provided on a housing of one or more display generation components, through which portions of the physical environment and the virtual environment are rendered visible, a dedicated button such as a solid state button, or a hardware button) to receive the first input allows a user (e.g., without having to interact with the user interface of any software application) intuitive top level access to different collections of representations, without displaying additional controls (e.g., without requiring the user to navigate through user interface elements), increasing operational efficiency of user-machine interactions based on the single input. The use of the single input to the input device reduces the amount of time needed to navigate within a virtual environment or XR environment. The physical location of the input device provides an intuitive and reliable mechanism (e.g., a tactile touch/mechanical actuation mechanism) for receiving user inputs, which improves the reliability and operational efficiency of the device (e.g., computer system). Using an input device that includes a solid-state button reduces the number of moving parts and allows the system to be reconfigurable (e.g., by a firmware update that allows the solid-state button to provide different feedback, to offer other functionality, to receive additional types of inputs), improving performance and efficiency of the device (e.g., computer system).

In some embodiments, detecting the first input to the computer system to invoke the home menu user interface includes detecting a hand gesture (e.g., an air gesture, a tap gesture, a pinch gesture, and/or other gestures). For example, as described herein with reference to FIG. 8B, the computer system 101 displays the home menu user interface 8012 in a field of view of the user 7002 in response to detecting an input to invoke the home menu user interface 8012 that optionally is or includes a hand gesture (e.g., an air gesture, a tap gesture, a pinch gesture, and/or other gestures). Invoking the home menu user interface using a hand gesture allows a user to quickly access and navigate a collection of applications in the home menu user interface and/or change a virtual environment for that user and/or interact with additional users regardless of whatever process (e.g., while a first application is running) is in progress, without displaying additional controls, minimizing the number of inputs required to select a desired operation, improving performance and efficiency of the device (e.g., computer system). Furthermore, providing in response to the first input a home menu user interface having sections that can be navigated by the user efficiently provides the user with a larger range of applications, people, virtual environments or other operations than would be possible with a static home menu user interface.

In some embodiments, in response to detecting the first input, displaying, via the one or more display generation components, the home menu user interface in the three-dimensional environment includes: in accordance with a determination that the viewpoint of the user in the three-dimensional environment had a third elevation relative to the reference plane in the three-dimensional environment and the third elevation is within a first range of elevations (e.g., both the first elevation and the third elevation are in the first range of elevations), wherein the third elevation is different from the first elevation, displaying the home menu user interface at the first height in the three-dimensional environment. For example, as described herein with reference to FIGS. 8B-8C, for a user having a head elevation within a range of head elevations that is pointing level (e.g., parallel to a reference horizontal plane in the three-dimensional environment, or horizon 8008) or downward, in response to detecting a user input to display the home menu user interface, the computer system 101 displays the home menu user interface 8012 at the same height (e.g., home menu user interface 8012 is displayed at the same height in FIG. 8B as in FIG. 8C). Displaying the home menu user interface at the first height for viewpoints of the user that are within a first range of elevations helps to automatically maintain the home menu user interface at an ergonomically favorable position to the user. A user's viewpoints within the first range of elevations may be temporary, and maintaining the home menu user interface at the first height helps to orient the user in the XR three-dimensional environment by anchoring the display of the home menu user interface at the ergonomically favorable position, optionally independently of a user's gaze, reduces fatigue, without requiring manual adjustments from the user, increasing operational efficiency of user-machine interactions.

In some embodiments, the first range of elevations includes elevations that are parallel to or lower than a horizontal plane extending from a viewpoint of a user (e.g., the horizontal plane is at an eye level of a user) in the three-dimensional environment. For example, as described herein with reference to FIGS. 8B-8C, the range of head elevations for which the home menu user interface 8012 is displayed at a same height optionally includes head elevations pointing level (e.g., parallel to a reference horizontal plane in the three-dimensional environment, or horizon 8008) or downward (e.g., below horizon 8008). Displaying the home menu user interface at the first height for viewpoints of the user that are within a first range of elevations that is parallel to or lower than a horizontal plane extending from a viewpoint of a user helps to automatically maintain the home menu user interface at an ergonomically favorable position to the user even when the first range of elevations are directed below a horizontal plane. A user's viewpoints within the first range of elevations may be temporary (e.g., checking for hazards on the ground, or attending to an interruption below eye level (or on the ground level)), and the home menu user interface can be invoked even while the user's viewpoints are within the first range of elevations. In some embodiments, the invoked home menu user interface would not interfere with the user's viewpoints within the first range of elevations, and once the user's viewpoint leaves the first range of elevations, the home menu user interface would be presented at the ergonomically favorable position, without the user having to first be out of the first range of elevations prior to invoking the home menu user interface. Maintaining the home menu user interface at the first height helps to orient the user in the XR three-dimensional environment by anchoring the display of the home menu user interface at the ergonomically favorable position, optionally independently of a user's gaze, reduces fatigue, without requiring manual adjustments from the user, increasing operational efficiency of user-machine interactions.

In some embodiments, in response to detecting the first input, displaying, via the one or more display generation components, the home menu user interface in the three-dimensional environment includes: in accordance with a determination that the viewpoint of the user in the three-dimensional environment had a fourth elevation relative to the reference plane in the three-dimensional environment, wherein the fourth elevation is different from the second elevation and both the fourth elevation and the second elevation are within a second range of elevations (e.g., the second range of elevations is different from the first range of elevations), displaying the home menu user interface at a third height in the three-dimensional environment, wherein the third height is different from the second height (e.g., the third height is proportional to the fourth elevation, the third height is dynamically linked to the fourth elevation at the time the home menu user interface is invoked, the third height is fixed once the home menu user interface is invoked and does not change dynamically after invocation). For example, in FIG. 8D, the head elevation of the user is in a second range of head elevations (e.g., the computer system 101 displays a corresponding field of view in FIG. 8D associated with the head elevation of the user being in the second range of head elevations, which is different from the head elevation of the user in FIG. 8B) and the computer system 101 displays the home menu user interface 8012 at a height in FIG. 8D that is different from the height at which the home menu user interface 8012 is displayed in FIG. 8B. Further, as an example, in FIG. 8E, the head elevation of the user is in the second range of head elevations (e.g., the computer system 101 displays a corresponding field of view in FIG. 8E associated with the head elevation of the user being in the second range of head elevations, which is different from the head elevations of the user in FIG. 8B and FIG. 8D) and the computer system 101 displays the home menu user interface 8012 at a height in FIG. 8E that is dynamic (e.g., dynamically based on the head elevation of the user at the time of invocation of the home menu user interface, or (immediately) prior to invoking the home menu user interface). Accordingly, in FIG. 8E, the computer system 101 displays home menu user interface at a height that is different from the height at which the home menu user interface 8012 is displayed in FIG. 8B and FIG. 8D. Displaying the home menu user interface at a third height in the three-dimensional environment that is different from the second height for viewpoints of a user having a second range of elevations (e.g., resulting in different heights of the home menu user interface for different elevations of the viewpoint of the user) helps to automatically maintain the home menu user interface at an ergonomically favorable position to the user, without requiring manual adjustments from the user, optionally independently of a user's gaze, reduces fatigue, increasing operational efficiency of user-machine interactions.

In some embodiments, the second range includes elevations higher than a horizontal plane extending from a viewpoint of a user (e.g., the horizontal plane is at an eye level of a user) in the three-dimensional environment. For example, in FIGS. 8D and 8E, the head elevation of the user is pointing up, relative to a reference horizontal plane in the three-dimensional environment, or horizon 8008), and the computer system 101 displays respective fields of view that include varying corresponding portions of the ceiling 8066 (e.g., a larger portion of the field of view is occupied by the ceiling 8066 as the user's head elevation increases). Displaying the home menu user interface at a third height in the three-dimensional environment that is different from the second height for viewpoints of a user having a second range of elevations that includes elevations higher than a horizontal plane extending from a viewpoint of a user (e.g., resulting in different heights of the home menu user interface for different elevations of the viewpoint of the user) helps to automatically maintain the home menu user interface at an ergonomically favorable position to the user, without requiring manual adjustments from the user, optionally independently of a user's gaze, reduces fatigue, increasing operational efficiency of user-machine interactions.

In some embodiments, in response to detecting the first input, displaying, via the one or more display generation components, the home menu user interface in the three-dimensional environment includes: in accordance with a determination that the viewpoint of the user in the three-dimensional environment had a fifth elevation relative to the reference plane in the three-dimensional environment that is within a third range of elevations, displaying the home menu user interface at a fourth height in the three-dimensional environment, a plane of the home menu user interface at the fourth height being perpendicular to a horizontal plane in the three-dimensional environment (e.g., the plane of the home menu user interface is substantially vertical, or the plane of the home menu user interface is a vertically oriented smooth surface (e.g., a spherical surface representing a consistent radial distance from the viewpoint of the user)). In some embodiments, a substantially vertical home menu user interface corresponds to a home menu user interface that is within a threshold (e.g., ±1°, ±2°, ±3°, ±5°, ±10°, or other angle) of a normal to horizon 8008. In some embodiments, in accordance with a determination that the viewpoint of the user in the three-dimensional environment had a tenth elevation relative to the reference plane in the three-dimensional environment that is within the third range of elevations, the computer system displays the home menu user interface at a ninth height in the three-dimensional environment, a plane of the home menu user interface at the ninth height being perpendicular to the horizontal plane in the three-dimensional environment. For example, in FIGS. 8B-8D, the computer system 101 displays home menu user interface 8012 such that a plane of the home menu user interface 8012 is substantially vertical and perpendicular to a reference horizontal plane in the three-dimensional environment, such as the horizon 8008 in FIGS. 8B-8D, for a third range of head elevations (e.g., the third range of head elevations including the head elevations of user 7002 in FIGS. 8B, 8C, and 8D). In some embodiments, a substantially vertical home menu user interface corresponds to a home menu user interface that is within a threshold (e.g., ±1°, ±2°, ±3°, ±5°, ±10°, or other angle) of a normal to horizon 8008. Displaying the home menu user interface such that a plane of the home menu user interface at a fourth height is perpendicular to a horizontal plane in the three-dimensional environment for viewpoints of the user that are within a third range of elevations helps to automatically maintain the home menu user interface at an ergonomically favorable position to the user, without requiring manual adjustments from the user, optionally independently of a user's gaze, reduces fatigue, increasing operational efficiency of user-machine interactions.

In some embodiments, the third range of elevations is different from a first range of elevations and different from a second range of elevations, the first range of elevations includes elevations that are parallel to or lower than a horizontal plane extending from a viewpoint of a user (e.g., the horizontal plane is at an eye level of a user) in the three-dimensional environment and the second range includes elevations higher than the horizontal plane extending from the viewpoint of the user (e.g., the horizontal plane is at an eye level of a user) in the three-dimensional environment. In some embodiments, the first range of elevations includes elevations of the viewpoint of the user for which the home menu user interface is displayed at a same elevation regardless of the elevation of the viewpoint of the user (e.g., as described herein with reference to FIGS. 8B-8C). In some embodiments, the second range of elevations includes elevations of the viewpoint of the user for which the home menu user interface is displayed at different elevations for different elevations of the viewpoint of the user (e.g., as described herein with reference to FIGS. 8D and 8E). For example, the third range of head elevations spans head elevations having corresponding fields of view depicted in each of FIG. 8B, FIG. 8C, and FIG. 8D. The third range of head elevations includes at least a portion of the first range of head elevations (e.g., a downward pointing head elevation indicated by normal 8042 in the side view 8040 of FIG. 8C), and at least a portion of the second range of elevations (e.g., in side view 8060 of FIG. 8D, an upward pointing head elevation in which normal 8042 is above horizon 8008). As such, the third range of head elevations is distinct from the first range of head elevations and from the second range of head elevations. Having the third range of elevations be different from the first range of elevations and different from the second range of elevations helps to maintain a visual consistency in the display of the home menu user interface. Otherwise, the plane of the home menu user interface would change (e.g., from being perpendicular to a horizontal plane in the three-dimensional environment to not being perpendicular) upon a viewpoint of the user in the three-dimensional environment crossing the horizon 8008. Because horizon 8008 is at eye-level of the user, a user may frequently cross this horizontal plane while interacting in the XR three-dimensional environment. Having the third range of elevations be different from the first range of elevations and different from the second range of elevations helps to keep the home menu user interface displayed at an ergonomically favorable orientation with respect to the user, without requiring manual adjustments from the user, optionally independently of a user's gaze, reduces fatigue, increasing operational efficiency of user-machine interactions.

In some embodiments, in response to detecting the first input, displaying, via the one or more display generation components, the home menu user interface in the three-dimensional environment, includes: in accordance with a determination that the viewpoint of the user in the three-dimensional environment had a sixth elevation relative to the reference plane in the three-dimensional environment, wherein the sixth elevation is different from the fifth elevation, and the sixth elevation is within a fourth range of elevations, wherein the fourth range of elevations is different from the third range of elevations, displaying the home menu user interface such that a plane of the home menu user interface is tilted toward a viewpoint of the user (e.g., toward a horizontal plane in the three-dimensional environment, optionally such that the plane of the home menu user interface is not perpendicular to the horizontal plane) in the three-dimensional environment. In some embodiments, the fourth range of elevations is different from the third range of elevations (e.g., the fourth range of elevations includes elevations higher than those of the third range of elevations). For example, in FIGS. 8E and 8F, the computer system 101 displays the home menu user interface 8012 such that a plane of home menu user interface 8012 is tilted with respect to a reference horizontal plane (e.g., as the horizon 8008) in the XR three-dimensional environment 8003, for a fourth range of head elevations (e.g., including the head elevations of user 7002 in FIGS. 8E-8F and higher, and excluding lower head elevations such as the head elevation of user 7002 in FIG. 8D). Displaying the home menu user interface such that a plane of the home menu user interface is tilted toward a viewpoint of the user for viewpoints of the user that are within a fourth range of elevations, helps to automatically maintain the home menu user interface at an ergonomically favorable orientation to the user, without requiring manual adjustments from the user, optionally independently of a user's gaze, reduces fatigue, increasing operational efficiency of user-machine interactions.

In some embodiments, in response to detecting the first input, displaying, via the one or more display generation components, the home menu user interface in a three-dimensional environment includes: in accordance with a determination that the viewpoint of the user in the three-dimensional environment had a first rotation about a vertical axis perpendicular to the reference plane (e.g., a first azimuth relative to the reference plane), displaying the home menu user interface (e.g., at a fifth height in the three-dimensional environment, rotational coordinates and elevation coordinates are orthogonal, an elevation (e.g., the fifth height) of the first rotational position is determined based on characteristics of the elevation of the viewpoint of the user described with respect to other aspects of method 1300) at a first rotational position in the three-dimensional environment corresponding to the first rotation (e.g., such that a plane of the home menu user interface is aligned with a viewpoint of the user; in some embodiments, the plane of the home menu user interface is oriented to face a user head-on, a surface normal of the home menu user interface is parallel to a viewing direction of a user); and in accordance with a determination that the viewpoint of the user in the three-dimensional environment had a second rotation about the vertical axis perpendicular to the reference plane (e.g., a second azimuth relative to the reference plane), the second rotation being different from the first rotation, displaying the home menu user interface (e.g., at the fifth height in the three-dimensional environment and) at a second rotational position in the three-dimensional environment corresponding to the second rotation (e.g., such that a plane of the home menu user interface is aligned with a viewpoint of the user, an elevation of the second rotational position is determined based on characteristics of the elevation of the viewpoint of the user described with respect to other aspects of method 13000), wherein the second rotational position is different from the first rotational position. For example, in FIG. 8G, the user's head and/or body is rotated counterclockwise relative to the user's position in FIG. 8B, and the computer system 101 displays a corresponding field of view that includes a larger portion of the wall 7006 than in FIG. 8B, in conjunction with displaying the home menu user interface 8012 at the same height as that shown in FIG. 8B. Displaying the home menu user interface at a rotational position in the three-dimensional environment corresponding to a rotation of a user's viewpoint about a vertical axis perpendicular to the reference plane helps to automatically maintain the home menu user interface at an ergonomically favorable orientation to the user, without requiring manual adjustments from the user, optionally independently of a user's gaze, reduces fatigue, increasing operational efficiency of user-machine interactions.

In some embodiments, in response to detecting the first input, displaying, via the one or more display generation components, the home menu user interface in a three-dimensional environment includes: in accordance with a determination that the viewpoint of the user in the three-dimensional environment had an eighth elevation relative to a reference plane in the three-dimensional environment and a gaze of the user is directed at a first spatial location, displaying the home menu user interface at a seventh height in the three-dimensional environment; and in accordance with a determination that the viewpoint of the user in the three-dimensional environment had the eighth elevation relative to the reference plane in the three-dimensional environment and the gaze of the user is directed at a second spatial location distinct from the first spatial location, displaying the home menu user interface at the seventh height in the three-dimensional environment. For example, as described herein with reference to FIG. 8C, the computer system 101 displays the home menu user interface 8012 at the same location regardless of whether the user's gaze is directed at a first spatial location 8044, at a second spatial location 8046, or at a third spatial location 8048, prior to invoking the home menu user interface 8012, and/or after invoking the home menu user interface 8012. Displaying the home menu user interface at the seventh height in the three-dimensional environment independently of the gaze of the user (e.g., second spatial location or the first spatial location) helps to reduces fatigue (e.g., not requiring the gaze to be directed to any particular region), and also allows the user to multitask (e.g., directing the gaze to a different task/operation) while invoking the home menu user interface, increasing operational efficiency of user-machine interactions.

In some embodiments, displaying the home menu user interface at the first height in the three-dimensional environment includes displaying the home menu user interface at a respective height (e.g., 0.1, 0.2, 0.5, 1, 1.5, 2, 3, 5, or 10 degrees) below a horizontal plane extending from a viewpoint of a user in the three-dimensional environment. For example, in FIGS. 8B, 8C, and 8G, the computer system 101 displays home menu user interface 8012 such that a height of a middle portion of the home menu user interface 8012 is below horizon 8008, and the angle 8013 in side views 8031 (FIG. 8B), 8040 (FIG. 8C), and 8120 (FIG. 8G) extends below horizon 8008. Displaying the home menu user interface below a horizontal plane extending from a viewpoint of a user in the three-dimensional environment helps to automatically maintain the home menu user interface at an ergonomically favorable position to the user, without requiring manual adjustments from the user, optionally independently of a user's gaze, reduces fatigue, increasing operational efficiency of user-machine interactions.

In some embodiments, displaying the home menu user interface includes displaying icons in the home menu user interface progressively (e.g., sequentially) in a concentric arrangement (e.g., a first subset of the icons is displayed in a center portion of the home menu user interface, and a second subset of icons is progressively arranged around an outer region of the first subset of icons, or a first subset of the icons is displayed in a peripheral portion of the home menu user interface, and a second subset of icons is progressively arranged around an inner region of the first subset of icons, toward a center portion of the home menu user interface). In some embodiments, the computer system displays an animation of the icons in the home menu user interface progressively appearing and/or moving into place from the periphery toward the center of the home menu user interface or outward from the center of the home menu user interface. For example, in FIG. 8H, after the home menu user interface 8012 is invoked (e.g., in response to the user input invoking the home menu user interface 8012), the representations of applications 8014-8028 appear in a center portion of a temporary frame 8200 and expand outwards to the arrangement of representations of applications in FIG. 8J. In another example, in FIG. 8I, the representations of applications 8014-8028 appear in a peripheral portion of a field of view of the user and move toward a center portion of the home menu user interface 8012 to form the arrangement of representations of applications in FIG. 8J. Displaying representations of applications (e.g., icons) in the home menu user interface progressively (e.g., sequentially) in a concentric arrangement emphasizes the arrangement of icons and provides an indication to the user about the presence and locations of interactable elements (e.g., the icons), without the user having to visually search for icons in the home menu user interface, increasing operational efficiency of user-machine interactions.

In some embodiments, displaying the home menu user interface includes increasing the visual emphasis of icons displayed in the home menu user interface over time. In some embodiments, as explained with respect to method 12000, increasing visual emphasis of icons includes changing three-dimensional visual characteristics such as changing a depth dimension from a viewpoint of a user (e.g., decreasing a depth dimension from the viewpoint of the user to increase the visual emphasis), increasing specular reflections that simulate light from the three-dimensional environment reflecting from the edges of the icons, the light may originate from simulated light sources and/or one or more physical light sources in a physical environment corresponding to the displayed three-dimensional environment, the three-dimensional visual characteristic includes increasing an intensity or size of shadows cast by icons in a displayed three-dimensional environment based on one or more sources of light in the three-dimensional environment, such as simulated or computer-generated light sources and/or physical light sources in a physical environment corresponding to the displayed three-dimensional environment, or increasing the visual emphasis includes increasing a separation between layers of a user interface element to different degrees along at least one dimension in response to different user interactions including a user directing attention to the user interface element. In some embodiments, visual characteristics for different icons may change at different times as the icons appear. In some embodiments, visual characteristics gradually change over time as the home menu user interface appears. In some embodiments, as explained with respect to method 12000, the visual characteristics of one or more icons in the home menu user interface are changed during scrolling of the home menu user interface; for example, icons that are at the edge of the home menu user interface and not in focus (e.g., being part of an adjacent portion of the home menu user interface such as a next or previous page of icons) increase in visual emphasis while being scrolled into focus (e.g., while scrolling to the next or previous page of icons), and decrease in visual emphasis while reverting to being out of focus (e.g., if the scrolling is incomplete). In some embodiments, changes in the visual characteristics of icons over time as the home menu appears are the same type of changes as when icons that are not in focus are scrolled into focus (e.g., and the opposite type of changes as when the icons revert to being out of focus). For example, in FIG. 8H, representations 8014-8028 or other icons appearing on temporary frame 8200 have visual characteristics that gradually change over time as home menu user interface 8012 appears; optionally, the visual characteristics change at different times as the representations appear. For example, computer system 101 changes one or more visual characteristics of representations 8014-8028 by increasing a visual emphasis of one or more representations 8014-8028 (e.g., making one or more representations 8014-8028 less transparent, more opaque, displayed with higher intensity, higher in contrast, less blurred, brighter, or induced in size), similar to the effects shown for representation 7138 in top view 7086 of FIG. 7I. Increasing the visual emphasis of icons displayed in the home menu user interface over time icons emphasizes the icons and provides an indication to the user about the presence and locations of interactable elements (e.g., the icons), without the user having to visually search for icons in the home menu user interface, increasing operational efficiency of user-machine interactions.

In some embodiments, an elevation of a viewpoint of the user with respect to the reference plane corresponds to an elevation of a user's head with respect to the reference plane (e.g., changes in the elevation of the user's head with respect to the reference plane changes the elevation of the viewpoint of the user). For example, in FIG. 8B, the view of environment 8003 that is visible via computer system 101 is from a viewpoint of user 7002 that corresponds to and is based on an elevation of user 7002's head in the scenario of FIG. 8B, whereas in FIG. 8D, the view of environment 8003 that is visible via computer system 101 is from the viewpoint of the user 7002 based on the user's head elevation in the scenario of FIG. 8D, which is higher than the user's head elevation in FIG. 8B, so FIG. 8D shows a portion of ceiling 8066 whereas FIG. 8B does not. In another example, in FIG. 8E, the view of environment 8003 that is visible via computer system 101 is from the viewpoint of the user 7002 based on the user's head elevation in the scenario of FIG. 8E, which is higher than the user's head elevation in FIG. 8D. Due to the higher elevation of the user's viewpoint in FIG. 8E compared to the elevation of the user's viewpoint in FIG. 8D, the computer system 101 displays a larger portion of the ceiling 8066 in FIG. 8E than in 8D. Having an elevation of a viewpoint of the user with respect to the reference plane correspond to an elevation of a user's head with respect to the reference plane helps to automatically maintain the home menu user interface at an ergonomically favorable position to the user, without requiring manual adjustments from the user, optionally independently of a user's gaze, reduces fatigue, increasing operational efficiency of user-machine interactions.

In some embodiments, the computer system ceases to display the home menu user interface (which was displayed in response to detecting the first input). The computer system detects a second input to the computer system (e.g., a button press, or an air gesture) to invoke the home menu user interface after the home menu user interface has ceased to be displayed. In response to detecting the second input, and in accordance with a determination that the viewpoint of the user in the three-dimensional environment had a ninth elevation relative to the reference plane in the three-dimensional environment (e.g., head elevation of a user is detected using a gyroscope, using an inertia measurement unit, or other sensor housed within the computer system), wherein the ninth elevation is different from the first elevation and from the second elevation, the computer system displays the home menu user interface at an eighth height in the three-dimensional environment. In some embodiments, as explained with respect to other aspects of method 13000, the eighth height is determined based at least partly on whether the ninth elevation is within the first range or the second range, and/or an orientation (e.g., vertical versus tilted toward a viewpoint of the user) of the home menu user interface at the eighth height is determined based at least partly on whether the ninth elevation is within the third range or the fourth range. The second input enables redisplaying the home menu user interface after it has ceased to be displayed, without displaying additional controls. For example, FIGS. 8B-8F each illustrate a different head elevation of user 7002 and optionally, for each respective head elevation, the corresponding placement of home menu user interface 8012 in response to a user input (e.g., a button press, crown rotation, an air pinch input, an air tap input, a pinch input, a tap input, an air pinch and drag input, an air drag input, a drag input, a click and drag input, a gaze input, and/or other input) invoking the home menu user interface while user 7002 has the respective head elevation (e.g., any of FIGS. 8B-8F illustrates the resulting position and orientation of home menu user interface 8012 when invoked for the particular head elevation shown). In a particular example, FIGS. 8E and 8F illustrate the fields of view of the user at two separate invocations of the home menu user interface 8012. In FIG. 8E, the computer system 101 displays a corresponding field of view associated with the viewpoint of the user based on the user's head elevation, and the computer system 101 displays the home menu user interface 8012 at a height in FIG. 8E that is different from the height at which the home menu user interface 8012 is displayed in FIGS. 8F, in accordance with the user 7002's head elevation in FIG. 8E being different from the user 7002's head elevation in FIG. 8F (and, in some embodiments, in accordance with a determination that both head elevations in FIGS. 8E and 8F are in a range of head elevations for which the height of home menu user interface 8012 is based on head elevation). In FIGS. 8F, based on a change in the user's head elevation, the computer system 101 displays the concomitant change in the field of view associated with the viewpoint of the user based on the user's head elevation, which is higher than the user's head elevation in FIG. 8E. For example, the computer system 101 displays a larger portion of the ceiling 8066 in FIGS. 8F, and the floor 7008 is outside the field of view in FIG. 8F. In response to the user invoking (e.g., re-invoking after dismissing) the home menu user interface at the head elevation shown in FIGS. 8F, the computer system 101 displays the home menu user interface 8012 at a higher height due to the higher elevation of the user's viewpoint in FIG. 8F compared to the elevation of the user's viewpoint in FIG. 8E. Allowing the additional input to invoke redisplay of the home menu user interface while the viewpoint of the user in the three-dimensional environment had a ninth elevation relative to the reference plane in the three-dimensional environment provides an easy way for the user to return to the home menu user interface based on a second input regardless of whatever process the user might have been using on the device after dismissing the home menu user interface, and without restricting the second input to have to occur at a specific head elevation, and helps to automatically display the home menu user interface at an ergonomically favorable position to the user, without requiring manual adjustments from the user, optionally independently of a user's gaze, reduces fatigue, increasing operational efficiency of user-machine interactions.

In some embodiments, the computer system detects a third input (e.g., a button press, crown rotation, an air pinch input, an air tap input, a pinch input, a tap input, an air pinch and drag input, an air drag input, a drag input, a click and drag input, a gaze input, and/or other input) corresponding to a request to cease to display the home menu user interface (e.g., the third input is an input indicative of the user turning away from the home menu user interface, the third input is a press of a button, or the third input is a signal to launch an app form the home menu user interface). In response to detecting the third input, the computer system ceases to display the home menu user interface. For example, FIG. 9A illustrates computer system 101 detecting user input 9002 directed to representation 8026 displayed on home menu user interface 8012. In response to detecting user input 9002, computer system 101 dismisses home menu user interface 8012 (e.g., ceases to display home menu user interface 8012) in conjunction with (e.g., prior to, or concurrently with) displaying application user interface 9004 of Application A as shown in FIG. 9B. Ceasing to display the home menu user interface in response to detecting the third input provides an efficient way to terminate navigational activities on the home menu user interface. No additional controls have to be provided to the user, and the user does not need to navigate through any additional user interface control elements to exit the home menu user interface, improving operational efficiency of the device.

In some embodiments, ceasing to display the home menu user interface in response to detecting the third input includes (e.g., gradually) ceasing to display the home menu user interface by (e.g., gradually) transitioning icons displayed in the home menu user interface through a plurality of intermediate states with increasing amounts of deemphasis of the icons over time (e.g., by flattening, dimming, pushing back in a direction away from a viewpoint of the user (e.g., in a z direction), and/or blurring the icons). For example, home menu user interface 8012 gradually cease to be displayed as computer system 100 replaces display of home menu user interface 8012 (FIG. 9A) with application user interface 9004 (FIG. 9B). Representations 8014-8028 or other icons on home menu user interface 8012 have visual characteristics that gradually change over time as home menu user interface 8012 ceases to be displayed; optionally, the visual characteristics change at different times as the representations cease to be displayed. For example, computer system 101 changes one or more visual characteristics of representations 8014-8028 by decreasing a visual emphasis of one or more representations 8014-8028 (e.g., making one or more representations 8014-8028 more transparent, more translucent, displayed with lower intensity, lower in contrast, more blurred, dimmer, or reduced in size), similar to the effects shown in top view 7086 of FIG. 7I. Transitioning icons displayed in the home menu user interface through a plurality of intermediate states with increasing amounts of deemphasis of the icons over time indicates to the user that the interactable elements on the home menu user interface would soon cease to be interactable and cease to be displayed. Should the user want to continue interacting with the home menu user interface (e.g., the third input was an accidental/inadvertent input), the user can more quickly re-invoke the home menu user interface based on the reminder provided by the transition through the plurality of intermediate states.

In some embodiments, aspects/operations of methods 12000, 14000, 15000, 16000, 17000, 22000, 23000, 24000, 25000, 27000, and 29000 may be interchanged, substituted, and/or added between these methods. For brevity, these details are not repeated here.

FIG. 14 is a flow diagram of an exemplary method 14000 for displaying an application user interface, in accordance with some embodiments. In some embodiments, method 14000 is performed at a computer system (e.g., computer system 101 in FIG. 1A) including one or more display generation components (e.g., display generation component 120 in FIGS. 1A, 3, and 4, a heads-up display, a display, a touchscreen, and/or a projector) and one or more input devices (e.g., a camera, a color sensor, an infrared sensor, or a depth-sensing camera, that points downward at a user's hand or forward from the user's head, a hardware button 7108, a dial, a rotatable input element, a switch, a moveable hardware input device, and/or a solid-state hardware input device). In some embodiments, the method 14000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 14000 are, optionally, combined and/or the order of some operations is, optionally, changed.

The computer system displays (14002), via the one or more display generation components, a home menu user interface at a respective location (e.g., home menu user interface 8012 in FIG. 9A is at a first home menu location below horizon 8008, the first home menu location being optionally independent of a user's gaze, and the home menu user interface 8012 is displayed in XR three-dimensional environment 8003). While displaying the home menu user interface at the respective location, the computer system detects (14004) a first user input (e.g., a button press, a crown rotation, an air pinch input, an air tap input, a pinch input, a tap input, an air pinch and drag input, an air drag input, a drag input, a click and drag input, a gaze input, and/or other input) for launching an application from the home menu user interface (e.g., user input 9002 directed to representation 8026 in FIG. 9A, such as an air gesture) In some embodiments, user interface elements are displayed in a three-dimensional environment as a cluster of icons and represent a home menu user interface or launch pad for the computer system, such as icons for launching applications, icons for starting communication sessions (e.g., the icons corresponding to different users other than the user), icons for starting computer-generated experiences, group icons for different categories of user interface objects, container objects such as folders or groups, a home button, a dock, a root menu, or other user interface elements for performing operations in and interacting with the three-dimensional environment, respective icons in the cluster of icons are activatable to perform one or more operations in the third-dimensional environment (e.g., launching applications or experiences, opening files or folders, or the like). In response to detecting the first user input for launching the application from the home menu user interface, the computer system displays (14006) at a respective application location, an application user interface associated with the application (e.g., application user interface 9004 displayed in FIG. 9B), including: in accordance with a determination that the home menu user interface was (e.g., immediately preceding the launching of the application) in a first home menu location (e.g., for example, home menu user interface 8012 in FIG. 9A is at a first home menu location), displaying (14008) the application user interface at a first application location that has (or is selected so as to have) a respective spatial offset from the first home menu location (e.g., application user interface 9004 in FIG. 9B is at a first application location behind the first home menu location, from a viewpoint of the user, with the respective spatial offset from the first home menu location along a depth dimension and/or in a height dimension, such as behind the first home menu location by a non-zero distance, from a viewpoint of the user); and in accordance with a determination that the home menu user interface was in a second home menu location (e.g., for example, home menu user interface 8012 in FIG. 9C (e.g., FIGS. 9C1 and 9C2) is at a second home menu location), wherein the second home menu location is different from the first home menu location, displaying (14010) the application user interface at a second application location that has (or is selected so as to have) the respective spatial offset from the second home menu location, wherein the second application location is different from the first application location (e.g., application user interface 9004 in FIG. 9D is at a second application location behind the second home menu location, the location of application user interface 9004 being at a different location in XR three-dimensional environment 8003 in FIG. 9D than in FIG. 9B, and the second application location is centered on the home menu user interface at the second home menu location).

Displaying the application user interface at a second application location that has the respective spatial offset obviates the need for the user to visually search for the application user interface in the three-dimensional environment, increasing operational efficiency of user-machine interactions. Displaying the application user interface at a location based on the home menu location reduces fatigue, and automatically presents both the home menu user interface and the application user interface at ergonomically favorable positions to the user, without requiring manual adjustments from the user, increasing operational efficiency of user-machine interactions.

In some embodiments, the first application location is centered with respect to at least one axis (e.g., centered laterally on home, but optionally not along the height dimension or a depth dimension) on the first home menu location (and in some embodiments the second application location is centered on the second home menu location). For example, as described herein with reference to FIGS. 9A and 9B, the computer system 101 displays the application user interface 9004 in FIG. 9B at a first application location that is laterally centered (e.g., along an x-direction) with respect to the first home menu location shown in FIG. 9A. For example, a central portion of application user interface 9004 is positioned at the same position along the x-direction as a central portion of home menu user interface 8012. Similarly, the computer system 101 displays the application user interface 9004 in FIG. 9D at a second application location that is laterally centered (e.g., along an x-direction) with respect to the second home menu location shown in FIG. 9C. Centering the first application location with respect to at least one axis on the first home menu location obviates or reduces the need for the user to visually search for the application user interface in the three-dimensional environment, increasing operational efficiency of user-machine interactions. Centering the first application location with respect to at least one axis on the first home menu location reduces fatigue, and automatically presents both the home menu user interface and the application user interface at ergonomically favorable positions to the user, without requiring manual adjustments from the user, increasing operational efficiency of user-machine interactions.

In some embodiments, in accordance with a determination that the first home menu location and the second home menu location are within a first height range (e.g., the first home menu location being associated with a first head elevation of the user when a first home invocation user input is detected, the second home menu location being associated with a second head elevation of the user when a second home invocation user input is detected, where the first head elevation and the second head elevation are both within a first range of head elevations) in a three-dimensional environment, the computer system displays the application user interface such that a plane of the application user interface is perpendicular to a horizontal plane in the three-dimensional environment (e.g., the plane of the application user interface is perpendicular to a horizontal plane for a first range of head elevations). For example, in FIGS. 9B and 9D, the computer system 101 displays application user interface 9004 such that a plane of application user interface 9004 is substantially perpendicular to (e.g., vertical with respect to) a reference horizontal plane in the three-dimensional environment, such as horizon 8008 in FIGS. 9B and 9D. Displaying the application user interface such that a plane of the application user interface is perpendicular to a horizontal plane in the three-dimensional environment helps to automatically maintain the application user interface at an ergonomically favorable position to the user, without requiring manual adjustments from the user, optionally independently of a user's gaze, reduces fatigue, increasing operational efficiency of user-machine interactions.

In some embodiments, the first application location is behind (e.g., by a distance that is more than a respective distance that is optionally based on the distance between the user and the first home menu location, such as by more than half a distance between the user and the first home menu location) the first home menu location from a viewpoint of a user in a three-dimensional environment. For example, in side view 9006 of FIG. 9B, a first application location of application user interface 9004 is behind (e.g., along the depth dimension, and/or at a larger radial distance away from the viewpoint of the user) a previous location (e.g., a first home menu location) of home menu user interface 8012 (shown in dotted lines in side view 9006) by an amount $d_2$. In side view 8031 of FIG. 9A, the first home menu location of home menu user interface 8012 is at a distance $d_1$ from a viewpoint of the user, represented by a portion of line 8006. In some embodiments, $d_2$ is at least 0.5 times $d_1$. Having the first application location be behind the first home menu location from a viewpoint of a user in a three-dimensional environment allows a wider extent (e.g., along at least one direction, along a width (e.g., x) and a height (e.g., y)) of the application user interface to be presented to the user within the user's field of view, allowing more information to be presented to the user, increasing operational efficiency of user-machine interactions. Displaying the home menu user interface closer to the viewpoint of the user in the three-dimensional environment allows the user to make more focused adjustments (e.g., scrolling one or more collections of representations of applications, virtual environments, and/or people) at a z-position that is more ergonomically favorable (e.g., closer) to the user, without requiring manual adjustments from the user, increasing operational efficiency of user-machine interactions.

In some embodiments, displaying the application user interface at the respective application location includes displaying the application user interface at a respective height (e.g., 0.1, 0.2, 0.5, 1, 1.5, 2, 3, 5, or 10 degrees) below the home menu user interface previously displayed at the respective location. For example, in FIGS. 9B and 9D, the computer system 101 displays application user interface 9004 such that a height of a middle portion of application user interface 9004 is below a height of a middle portion of home menu user interface 8012, which is below horizon 8008, and the angle 9010 in side views 9006 (FIG. 9B) and 9040 (FIG. 9D) is larger than angle 8013 in side view 8031 of FIG. 9A. Displaying the application user interface at a respective height below the home menu user interface helps to automatically maintain the application user interface at an ergonomically favorable position to the user, without requiring manual adjustments from the user, optionally independently of a user's gaze, reduces fatigue, increasing operational efficiency of user-machine interactions.

In some embodiments, in response to detecting the first user input for launching the application from the home menu user interface, the computer system ceases to display the home menu user interface. (e.g., ceasing to display the home menu user interface includes displaying a first animation that changes a visual emphasis of icons, such as in an at least partial reversal of the changes in visual emphasis of icons in the home menu user interface that occurs as the home menu user interface appears, as described herein with reference to method 13000). In some embodiments, the first animation includes changing three-dimensional visual characteristics such as changing a depth dimension from a viewpoint of a user (e.g., increasing a depth dimension from the viewpoint of the user to decrease the visual emphasis); decreasing specular reflections that simulate light from the three-dimensional environment reflecting from the edges of the icons, where the light may originate from simulated light sources and/or one or more physical light sources in a physical environment corresponding to the displayed three-dimensional environment; decreasing an intensity or size of shadows cast by icons in a displayed three-dimensional environment based on one or more sources of light in the three-dimensional environment, such as the simulated or computer-generated light sources and/or physical light sources in a physical environment corresponding to the displayed three-dimensional environment; or decreasing the visual emphasis by decreasing a separation between layers of a user interface element to different degrees along at least one dimension in response to different user interactions including a user directing attention to the user interface element. In some embodiments, visual characteristics for different icons may change at different times as the icons appear. In some embodiments, visual characteristics gradually change over time as the home menu user interface appears.

For example, in response to user input 9002 directed at representation 8026 to launch an application associated with representation 8026 as shown in FIG. 9A, home menu user interface 8012 is dismissed prior to, in conjunction with, or concurrently with application user interface 9004 being displayed in XR three-dimensional environment 8003, as shown in FIG. 9B. Ceasing to display the home menu user interface in response to detecting the first user input for launching the application from the home menu user interface obviates the need for displaying additional controls to dismiss the home menu user interface and reduces the number of inputs required. The user does not need to waste time to separately/manually close the home menu user interface, thereby improving performance and operational efficiency of the device (e.g., computer system). Ceasing to display the home menu user interface allows the application user interface to be centered with respect to at least one axis on the first home menu location while not obscuring the application user interface, which obviates the need for the user to rotate or change her viewpoint to view the application user interface, increasing operational efficiency of user-machine interactions.

In some embodiments, after ceasing to display the home menu user interface, the computer system detects a second user input to the computer system (e.g., a button press, or an air gesture) to invoke the home menu user interface. In response to detecting the second user input, the computer system displays, via the one or more display generation components, the home menu user interface in a three-dimensional environment (e.g., including: in accordance with a determination that a viewpoint of the user in the three-dimensional environment had a first elevation relative to a reference plane in the three-dimensional environment, displaying the home menu user interface at a first height in the three-dimensional environment). In some embodiments, displaying the home menu user interface includes increasing the visual emphasis of icons displayed in the home menu user interface over time, as explained with respect to displaying the home menu user interface in method 13000, and analogously to the rubber banding effect that is displayed when scrolling the arrangement of icons is incomplete as described with reference to method 12000. In some embodiments, as explained with respect to methods 12000 and 13000, increasing the visual emphasis of icons includes changing three-dimensional visual characteristics such as changing a depth dimension from a viewpoint of a user (e.g., decreasing a depth dimension from the viewpoint of the user to increase the visual emphasis); increasing specular reflections that simulate light from the three-dimensional environment reflecting from the edges of the icons, where the light may originate from simulated light sources and/or one or more physical light sources in a physical environment corresponding to the displayed three-dimensional environment; increasing an intensity or size of shadows cast by icons in a displayed three-dimensional environment based on one or more sources of light in the three-dimensional environment, such as simulated or computer-generated light sources and/or physical light sources in a physical environment corresponding to the displayed three-dimensional environment; or increasing the visual emphasis by increasing a separation between layers of a user interface element to different degrees along at least one dimension in response to different user interactions including a user directing attention to the user interface element. In some embodiments, visual characteristics for different icons may change at different times as the icons appear. In some embodiments, visual characteristics gradually change over time as the home menu user interface appears.

For example, after home menu user interface 8012 has been dismissed (e.g., after launching application user interface 9004), a user can revoke home menu user interface 8012, for example, by a user input to hardware button 7108, as described herein with reference to FIGS. 9E-9H. Displaying the home menu user interface in response to detecting the second user input enables the home menu user interface to be re-displayed after it has been dismissed, without displaying additional controls. Allowing the second user input to invoke redisplay of the home menu user interface provides an easy way for the user to return to the home menu user interface based on the second user input regardless of whatever process the user might have been using on the computer system after dismissing the home menu user interface. The second user input enables the user to directly navigate to a top-level home menu user interface, and then to navigate through different collections of representations (e.g., representation of applications, people, and/or virtual environments) in the home menu user interface, without displaying additional controls.

In some embodiments, while a viewpoint of the user has a first location in the three-dimensional environment, the computer system detects a third user input to invoke the home menu user interface. The home menu user interface is displayed at the respective location in response to the third user input; and the second user input is detected while the viewpoint of the user has a second location in the three-dimensional environment. In response to detecting the second user input: in accordance with a determination that a difference between the first location and the second location is less than a threshold amount (e.g., due to change in elevation with respect to a reference plane in the three dimensional environment, change by a first rotational amount about a vertical axis in the three dimensional environment, and/or change within a two dimensional plane (e.g., based on user 7002 walking around)), the computer system displays the home menu user interface at the respective location; and in accordance with a determination that the difference between the first location and the second location is more than the threshold amount (e.g., due to change in elevation with respect to a reference plane in the three dimensional environment, change by a first rotational amount about a vertical axis in the three dimensional environment, and/or change within a two dimensional plane (e.g., based on user 7002 walking around)), the computer system displays the home menu user interface at a third home menu location different from the respective location. In some embodiments, as explained with respect to method 14000, a position (e.g., height and/or rotational position) and/or orientation (e.g., vertical versus tilted toward a viewpoint of a user) of the home menu user interface displayed at the third home menu location is determined based at least partly on an elevation (e.g., altitude) and/or rotation (e.g., azimuth) of the viewpoint of the user, just prior to providing the third user input (e.g., based at least partly on whether the elevation of the viewpoint of the user is within the first range or the second range, and/or whether the elevation of the viewpoint of the user is within the third range or the fourth range).

When a user's head position (e.g., head elevation, or head rotation) changes by less than a threshold amount, home menu user interface 8012 is invoked at the same location, as described herein for example with reference to FIGS. 9E and 9F, where home menu user interface 8012 is re-invoked at a position that is coincident with dashed line frame 9042, which represents the previous (e.g., most recent prior, or a prior location from a prior invocation not immediately preceding the current invocation) location of home menu user interface 8012. When a user's head position changes by more than a threshold amount, home menu user interface 8012 is re-invoked at a new location, based on the user's head position at the time of the second invocation of home menu user interface, as described herein for example with reference to FIGS. 9G and 9H, and optionally independently of a location of an application user interface the user interacted with prior to re-invoking home menu user interface (e.g., application user interface 9004). Displaying the home menu user interface at a respective location in accordance with a determination that a difference between the first location and the second location is less than a threshold amount, helps to maintain continuity in a display of the home user interface within a general region of a field of view of the user. Displaying the home menu user interface at a third home menu location different from the respective location in accordance with a determination that the difference between the first location and the second location is more than the threshold amount, automatically displays the home menu user interface at an ergonomically favorable position to the user, without requiring manual adjustments from the user, optionally independently of a user's gaze, reduces fatigue, increasing operational efficiency of user-machine interactions.

In some embodiments, the threshold amount is based on a lateral movement (e.g., a translation of the head of the user along one or more orthogonal axes, such as along x, y, z directions) of a head of a user. For example, as described herein with reference to FIG. 9G, in accordance with a determination that the leftward lateral movement of the user's head, from the position of a viewpoint of the user shown by representation 9086 in top view 9061 of FIG. 9E to the position shown in top view 9100 of FIG. 9G, is greater than the threshold amount, computer system 101 displays home menu user interface 8012 at a different location shown in FIG. 9G compared to the location shown in FIG. 9E. Displaying a home menu user interface at a position based on a threshold determined from a lateral movement of a head of the user enables the home menu user interface to be displayed at a position that is ergonomically favorable to the user, without requiring manual adjustments from the user and without having to display additional controls.

In some embodiments, the threshold amount is based on an angular tilt (e.g., tilting or rotation of the user's head while at least a portion of a user's neck does not change in its location) of a head of a user. For example, as described herein with reference to FIGS. 9G-9H, in accordance with a determination that the counterclockwise rotation of the user's head, from the orientation of the viewpoint of the user shown by representation 9086 in top view 9061 of FIG. 9E to the orientation shown in top view 9100 of FIG. 9G or to the orientation shown in top view 9120 of FIG. 9H, is greater than the threshold amount, computer system 101 displays home menu user interface 8012 at a different location, as shown in FIGS. 9G-9H, compared to the location shown in FIG. 9E. Displaying a home menu user interface at a position based on a threshold determined from an angular tilt of a head of the user enables the home menu user interface to be displayed at a position that is ergonomically favorable to the user, without requiring manual adjustments from the user and without having to display additional controls.

In some embodiments, while displaying the application user interface at the respective application location, the computer system detects a fourth user input (e.g., an air pinch input, an air tap input, an air drag input, a pinch input, a tap input, a swipe input, a gaze input, and/or other input) for moving the application user interface. In response to detecting the fourth user input, the computer system moves the application user interface from the respective application location to a third application location different from the respective application location. For example, in response to user input 9102 directed at application user interface 9004 (e.g., at a frame grabber of application user interface 9004) as shown in FIG. 9B, application user interface 9004 is moved to a different position within XR three-dimensional environment 8003, as shown in FIG. 9I. Moving the application user interface from the respective application location to a third application location different from the respective application location obviates the need for displaying additional controls. For example, no additional controls need to be provided to a user to cease display of the application user interface at the current location, and re-launch the application at a new location from a home menu user interface positioned at a different position, improving performance and operational efficiency of the computer system.

In some embodiments, in accordance with a determination that a portion (e.g., along a vertical/height dimension) of the application user interface when displayed at a fourth application location with the respective spatial offset (the same respective spatial offset) from the respective home menu location would intersect (e.g., due to a size or height of the application user interface) a lower surface (e.g., a lower physical surface, a floor) of a three-dimensional environment (and the physical environment), the computer system displays the application user interface at a modified application location that is offset vertically from the fourth application location such that the application user interface does not intersect the lower surface (e.g., smaller or shorter application user interfaces could be placed at the fourth location without intersecting with a lower surface, but larger or taller application user interfaces would have to be offset vertically up because they would intersect with the lower surface if placed at the fourth location). In some embodiments, in accordance with a determination that the portion (e.g., along a vertical/height dimension) of the application user interface when displayed at the fourth application location with the respective spatial offset from the respective home menu location would not intersect the lower surface (e.g., a lower physical surface, a floor) of the three-dimensional environment (and the physical environment), the computer system displays the application user interface at the fourth application location. In some embodiments, the fourth application location at which the application user interface is displayed (e.g., if the application user interface does not intersect the lower surface) or from which the application user interface is offset (e.g., so as not to intersect the lower surface) is determined based on applying the respective spatial offset to the respective home menu location, which in some embodiments, as explained with respect to method 14000, is based at least partly on an elevation (e.g., altitude) and/or rotation (e.g., azimuth) of the viewpoint of the user just prior to detection of a user input that resulted in the display of the home menu user interface at the respective location (e.g., based at least partly on whether the elevation of the viewpoint of the user is within the first range or the second range, and/or whether the elevation of the viewpoint of the user is within the third range or the fourth range).

For example, in FIG. 9J, a height (e.g., along a y-direction) of application user interface 9004' is larger than a vertical distance (e.g., along the y-direction) from a lower physical surface (e.g., floor 7008) to horizon 8008. To prevent a portion of the application user interface 9004' from intersecting or colliding with a lower physical surface (e.g., floor 7008) or be blocked by the lower physical surface, computer system 101 displays application user interface 9004' at a higher (e.g., along the y-direction) application location. The offset position of the application user interface has a different spatial relationship with respect to home menu user interface 8012 compared to the spatial relationship between application user interface 9004 of FIG. 9B and the home menu user interface 8012 of FIG. 9A, for example, and between application user interface 9004 of FIG. 9D and home menu user interface 8012 of FIGS. 9C, in another example. For example, angle 9010' shown in side view 9162 of FIG. 9J is smaller than angle 9010 shown in side view 9006 in FIG. 9B and angle 9010 shown in side view 9040 in FIG. 9D (e.g., angle 9010' is smaller than angle 9010 by 0.1°-1.5° or more). Displaying the application user interface at a modified application location that is offset vertically from the fourth application location such that the application user interface does not intersect the lower surface prevents information displayed to the user from being truncated, and automatically maintains the application user interface at an ergonomically favorable position to the user, without requiring manual adjustments from the user, optionally independently of a user's gaze, reduces fatigue, increasing operational efficiency of user-machine interactions.

In some embodiments, while displaying the home menu user interface at a fourth home menu location, wherein the fourth home menu location is different from the first home menu location and from the second home menu location, the computer system detects a fifth user input (e.g., a button press, a crown rotation, an air pinch input, an air tap input, a pinch input, a tap input, an air pinch and drag input, an air drag input, a drag input, a click and drag input, a gaze input, and/or other input) for launching the application from the home menu user interface. In response to detecting the fifth user input, the computer system displays the application user interface at a fifth application location that has (or is selected so as to have) the respective spatial offset (e.g., the fifth application location is centered on the home menu user interface at the fifth location) from the fourth home menu location, wherein the fifth application location is different from the first application location and from the second application location (in some embodiments in response to detecting the fifth user input, the computer system also ceases to display the home menu user interface, optionally in conjunction with displaying the application user interface at the fifth application location).

For example, in FIGS. 9C, user input 9002 is directed to representation 8026 when home menu user interface 8012 is at a second home menu location different from the first home menu location shown in FIG. 9A, and application user interface 9004 is launched at a second application location shown in FIGS. 9D, having the same spatial relationship with respect to the second home menu location as application user interface 9004 at the first application location has with the first home menu location (FIG. 9B). Similarly, if home menu user interface 8012 is at yet another home menu location when representation 8026 is selected to launch application user interface 9004, application user interface 9004 is displayed at yet another application location with the same spatial relationship to home menu user interface 8012 (e.g., assuming sufficient distance above a surface such as floor 7008). Displaying the application user interface at a third application location (different from the first application location and from the second application location) that has the respective spatial offset from the fourth home menu location, provides an easy way for the user to display the application user interface based on the updated home menu location and helps to automatically display the application user interface at an ergonomically favorable position to the user when the user invokes the application again from the fourth home menu location, without requiring manual adjustments from the user, optionally independently of a user's gaze, reduces fatigue, increasing operational efficiency of user-machine interactions.

Figure 19D:
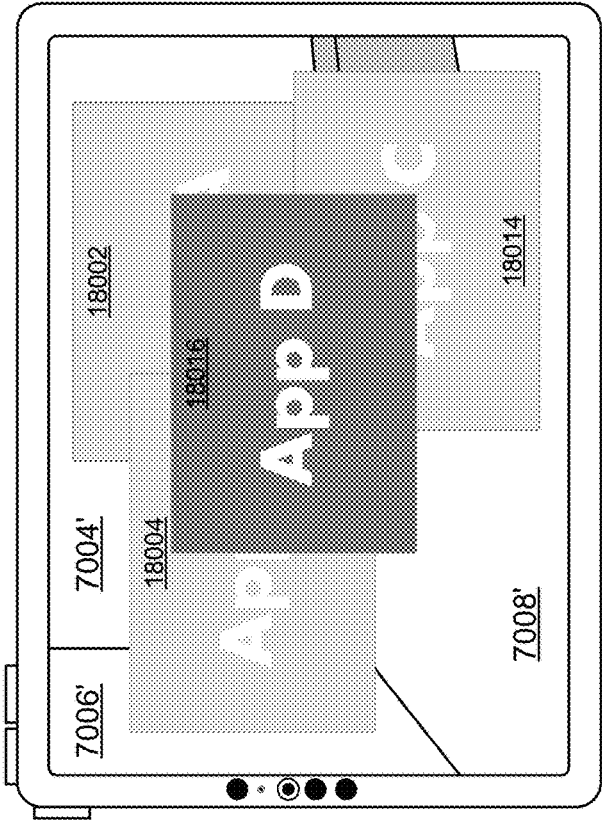

In some embodiments, the computer system detects a sixth user input (e.g., an air pinch input, an air tap input, a pinch input, a tap input, an air pinch and drag input, an air drag input, a drag input, a click and drag input, a gaze input, and/or other input) corresponding to a request to display a user interface of a respective application from a notification message (e.g., the sixth user input is a selection, in a notification message, of a selectable representation associated with a respective application, and/or the notification message provides an update or is a received/incoming event associated with the respective application); and in response to detecting the sixth user input, the computer system displays the user interface of the respective application at a respective application location based on a location in a three-dimensional environment that is associated with the home menu user interface. In some embodiments, the home menu user interface is displayed at the location in the three-dimensional environment. In some embodiments, at the time the sixth user input is detected, the home menu user interface would be displayed at the location in the three-dimensional environment if invoked. For example, as described herein with reference to FIGS. 19A and 19D, in response to detecting user input 19002 corresponding to selection of representation 8022 (FIG. 19A) associated with Application D, computer system 101 displays a user interface of the application corresponding to representation 8022 (e.g., user interface 18016 of Application D) at a location that corresponds to a location of home menu user interface 8012, as illustrated in FIG. 19D. For example, as described herein with reference to FIG. 9K, in response to detecting user input 9202 corresponding to selection of a selectable user interface object associated with Application B from a notification message 9204, computer system 101 displays user interface 18004 of Application B at a location that corresponds to a location where home menu user interface 8012 is displayed or would be displayed if invoked in the current viewport, as shown in FIG. 9L. Displaying an application user interface at a location corresponding to a home menu user interface in response to detecting a user input corresponding to selection of a selectable user interface object from a notification message enables the application user interface to be displayed at a location at which the user is more likely to expect to see the application user interface displayed, reducing the need for the user to search in the viewport for the application user interface, without having to display additional controls.

In some embodiments, the computer system detects a seventh user input (e.g., an air pinch input, an air tap input, a pinch input, a tap input, an air pinch and drag input, an air drag input, a drag input, a click and drag input, a gaze input, and/or other input) corresponding to a request to display a user interface of a respective application (e.g., the respective application is the same as the application associated with the application user interface, or the respective application is different from the application associated with the application user interface, the seventh user input corresponds to a selection of a selectable representation associated with the respective application, such as a hyperlink, or media object, or a communication message); and in response to detecting the seventh user input: in accordance with a determination that the seventh user input corresponds to interaction with the home menu user interface, the computer system displays the user interface of the respective application at a location that corresponds to a location of the home menu user interface; and (e.g., in accordance with a determination that the seventh user input corresponds to a request to launch the application user interface from the home menu user interface and in accordance with a determination that the home menu user interface was in the first home menu location, displaying the application user interface at the first application location that has the respective spatial offset from the first home menu location); in accordance with a determination that the seventh user input corresponds to interaction with a respective user interface object that is different from the home menu user interface (e.g., a notification or alert, a user interface of the respective application, or a user interface of a different application), the computer system displays a user interface of the respective application at a location that corresponds to a location of the respective user interface object that is different from the home menu user interface (e.g., displaying a new window at a location that corresponds to a location of a window from which the new window was launched). In some embodiments, the respective application location is offset from the respective user interface object that is different from the home menu user interface. In some embodiments, the respective application location coincides with the respective user interface object that is different from the home menu user interface.

For example, as described herein with reference to FIGS. 19A and 19D, in response to detecting user input 19002 corresponding to selection of representation 8022 (FIG. 19A) associated with Application D, computer system 101 displays a user interface of the application corresponding to representation 8022 (e.g., user interface 18016 of Application D) at a location that corresponds to a location of home menu user interface 8012, as illustrated in FIG. 19D. In contrast, as described herein with reference to FIG. 19M for example, in response to detecting user input 19034 corresponding to selection of a selectable hyperlink displayed in user interface 18004 of an instant messaging application, computer system 101 displays user interface 18016 of Application D at a location that corresponds to a location of user interface 18004, as shown in FIG. 19N. Displaying an application user interface at a location corresponding to a user interface (e.g., home menu user interface 8012 or another application user interface) from which the application is launched enables the application user interface to be displayed at a location at which the user is more likely to expect to see the application user interface displayed, reducing the need for the user to search in the viewport for the application user interface, without having to display additional controls.

In some embodiments, the location that corresponds to a location of the respective user interface object is shifted relative to the location of the respective user interface object (e.g., is vertically and laterally offset from the respective user interface object, to ensure that auxiliary user interface elements, such as the frame grabbers, for both the user interface of the respective application and the respective user interface object are visible, the user interface of the respective application is offset vertically above and to a right or is offset vertically above and to a left of the respective user interface object). In some embodiments, in accordance with a determination that the respective user interface object is located at a first position in the three-dimensional environment, the user interface of the respective application is displayed at a second position that is offset vertically and laterally to the first position, and in accordance with a determination that the respective user interface object is located at a third position in the three-dimensional environment different from the first position, the user interface of the respective application is displayed at a fourth position that is offset vertically and laterally to the second position, wherein the fourth position is different from the second position. For example, as described herein with reference to FIG. 19N, computer system 101 displays user interface 18016 of Application D at a location that is shifted relative to the location of user interface 18004. Displaying the user interface of the respective application at a location that is shifted relative to the location of the respective user interface object from which the user interface of the respective application is launched enables auxiliary user interface elements for both the user interface and the respective user interface object to remain visible and accessible to the user, without the user having to manually offset their respective positions or having to display additional controls.

In some embodiments, the respective application location that corresponds to a location of the user interface of the respective application is closer to a viewpoint of the user the location of the respective user interface object. In some embodiments, in accordance with a determination that the respective user interface object is located at a first depth from a viewpoint of the user, the user interface of the respective application is displayed at a second depth, closer to the viewpoint of the user than the first depth, and in accordance with a determination that the respective user interface object is located at a third depth from the viewpoint of the user different from the first depth, the user interface of the respective application is displayed at a fourth depth, closer to the viewpoint of the user than the third depth, wherein the fourth depth is different from the second depth. For example, as described herein with reference to FIG. 19N, computer system 101 displays user interface 18016 of Application D at a location that is closer to a viewpoint of the user than user interface 18004, from which user interface 18016 was launched. Displaying the user interface of the respective application at a location that is closer to the viewpoint of the user than the user interface from which the respective application was launched makes it easier for the user to see the user interface of the respective application and reduces the need for the user to search within the viewport for the user interface of the respective application.

In some embodiments, the computer system detects an eighth user input (e.g., an air pinch input, an air tap input, a pinch input, a tap input, an air pinch and drag input, an air drag input, a drag input, a click and drag input, a gaze input, and/or other input) corresponding to a request to display a user interface of a respective application from a real-time communication session (e.g., with representations of one or more other users displayed on a platter associated with the real-time communication session, with three-dimensional representations of one or more other users displayed in a region of the three-dimensional environment, and/or the eighth user input is provided by a different user); and in response to detecting the eighth user input, the computer system displays the user interface of the respective application at a respective application location that corresponds to a location of one or more elements in the real-time communication session.

In some embodiments, in accordance with a determination that the eighth user input corresponds to a request to launch the application user interface from the home menu user interface and in accordance with a determination that the home menu user interface was in the first home menu location, displaying the application user interface at the first application location that has the respective spatial offset from the first home menu location; and in accordance with a determination that the eighth user input corresponds to a request to launch the application user interface (e.g., a media file such as a video clip, a movie, an audio clip, a livestream, a game application, a document such as a text document, spreadsheet, or presentation, or a map) from a real-time communication session, the computer system displays the user interface of the respective application at the respective application location that corresponds to the real-time communication session. In some embodiments, the real-time communication session includes three-dimensional representations of one or more other participants displayed in a region of the three-dimensional environment, and the respective application location is within or adjacent the region of the three-dimensional environment, in proximity to one or more representations of one or more of the participants in real-time communication session that corresponds to the three-dimensional environment. In some embodiments, the respective application location is placed in a designated viewing region of the real-time communication session such as in between spatial locations corresponding to multiple participants in the real-time communication session (e.g., for a game or other communal activity). In some embodiments, the respective application location is placed in a designated viewing region of the real-time communication session such as in front of spatial locations corresponding to multiple participants in the real-time communication session (e.g., for a video, content editing/creation application, or other application user interface that is displayed as a window). In some embodiments, the respective application location is placed next to the user who invoked the respective application via the eighth user input, the respective application location is a location in the three-dimensional environment that is visible to some (e.g., all, or a majority) of the one or more users. In some embodiments, the real-time communication session is displayed in a respective region, together with representations of one or more other users, and the respective application location is displayed offset (e.g., vertically, laterally, or along a depth dimension) from the respective region).

For example, as described herein with reference to FIGS. 19A and 19D, in response to detecting user input 19002 corresponding to selection of representation 8022 (FIG. 19A) associated with Application D, computer system 101 displays a user interface of the application corresponding to representation 8022 (e.g., user interface 18016 of Application D) at a location that corresponds to a location of home menu user interface 8012, as illustrated in FIG. 19D. For example, as described herein with reference to FIG. 9N, in response to detecting user input 9214 corresponding to selection of a selectable user interface object (e.g., a media playback content item) displayed in user interface 9216, computer system 101 displays user interface 9218 at a location that corresponds to a location of a real-time communication session that includes representations 9206, 9208, 9210, and 9212 of four participants, as shown in FIG. 9O (e.g., rather than at a location that corresponds to a location of home menu user interface 8012, as indicated in FIG. 9L). Displaying an application user interface at a location corresponding to a real-time communication session in response to a determination that the user input corresponding to the selection of a selectable user interface object is detected within the real-time communication session enables the application user interface to be displayed at a location at which the user and other participants of the real-time communication session are more likely to expect to see the application user interface displayed, reducing the need for the user and other participants to search in their respective viewports for the application user interface, without having to display additional controls.

In some embodiments, displaying the application user interface at the respective application location (e.g., with the respective spatial offset from the respective location of the home menu user interface) includes displaying the application user interface at a vertical position that is determined relative to a reference horizontal plane (e.g., a horizontal plane determined based on gravity or a detected horizon) (e.g., and not based on a direction of the user's head, and/or not based on a direction of the user's gaze). For example, in response to detecting a user input to display application user interface 9004 while line 8006, which represents a side profile of a representation of user 7002, points below horizon 8008 (as shown in side view 9160 in FIG. 9J), computer system 101 displays application user interface 9004 at a vertical position that is determined relative to horizon 8008, and is perpendicular to horizon 8008. For example, as described herein with reference to side view 9020 of FIGS. 9D, in response to detecting a user input corresponding to a request to display application user interface 9004 while angle 8087 is above horizon 8008, computer system 101 displays application user interface 9004 at an orientation that is tilted toward the user and at a vertical position that is determined relative to horizon 8008. Or, for example, in response to detecting a user input corresponding to a request to display application user interface 9004' while line 8006, which represents a side profile of a representation of user 7002, points downwards below horizon 8008 (as shown in side view 9160 in FIG. 9J), and in accordance with a determination that a height dimension of application user interface 9004' is smaller than a vertical distance between floor 7008 and horizon 8008, computer system 101 displays home menu user interface 8012 at a vertical position that is determined relative to horizon 8008. Displaying an application user interface at a vertical position that is relative to a horizontal reference plane rather than a head elevation of the user's head enables the application user interface to be displayed at a vertical position that is ergonomically favorable to the user, without requiring manual adjustments from the user and without having to display additional controls.

In some embodiments, displaying the home menu user interface at the respective location includes: in accordance with a determination that an elevation angle of a head of a user (e.g., at a corresponding viewpoint of a user, changes in an elevation angle of the head of the user reflects a change in an orientation of the user's head while a height of the user's shoulder, or a height of the user remains constant. At a smaller or negative (e.g., below the reference horizontal plane) elevation angle, the user's chin is lowered (e.g., angled downward). At a larger (e.g., above the reference horizontal plane) elevation angle, the user's chin is raised (e.g., angled upward)) in the three-dimensional environment is above a reference horizontal plane, the computer system displays the home menu user interface at an orientation that is angled toward the viewpoint of the user with an angle that is determined based on a magnitude of the elevation angle of the head above the reference horizontal plane (e.g., tilted towards the user, and/or the orientation of the home menu user interface is not perpendicular to the horizontal plane). In some embodiments, in accordance with a determination that the elevation angle of the head is at a first angle above the reference horizontal plane, the home menu user interface is displayed at a first orientation that is angled toward the viewpoint of the user, and in accordance with a determination that the elevation angle of the head is at a second angle above the reference horizontal plane, different from the first angle, the home menu user interface is displayed at a second orientation that is angled toward the viewpoint of the user, wherein the second orientation is different from the first orientation); and in accordance with a determination that the head elevation of the user (e.g., and the corresponding viewpoint of the user) in the three-dimensional environment is below the reference horizontal plane, displaying the home menu user interface at a respective (e.g., default) orientation that is independent of a magnitude of the elevation angle of the head below the reference horizontal plane (e.g., not angled toward the viewpoint of the user) (e.g., the orientation of the home menu user interface is perpendicular to the horizontal plane). In some embodiments, in accordance with a determination that the elevation angle of the head is at a first angle below the reference horizontal plane, the home menu user interface is displayed at a first orientation, and in accordance with a determination that the elevation angle of the head is at a second angle below the reference horizontal plane, different from the first angle, the home menu user interface is displayed at the first orientation.

For example, as described in reference to FIGS. 9C, in response to detecting a user input (e.g., a button press, a crown rotation, an air pinch input, an air tap input, a pinch input, a tap input, an air pinch and drag input, an air drag input, a drag input, a click and drag input, a gaze input, and/or other input) corresponding to a request to display home menu user interface 8012 while angle 8087 has a value in a second range of angles above horizon 8008, computer system 101 displays home menu user interface 8012 at an orientation that is tilted toward the user. In contrast, as described in reference to side view 8040 of FIG. 8C, in response to detecting a user input corresponding to a request to display home menu user interface 8012 while line 8006, which represents a side profile of a representation of user 7002, points downwards below horizon 8008, computer system 101 displays home menu user interface 8012 at an orientation that is independent of a magnitude of an angle between normal 8042 and horizon 8008. Disambiguating whether to display a home menu interface at an orientation that is tilted toward the user or at an orientation that is independent of a magnitude of a head elevation of the user based on whether the head elevation is above or below a horizontal reference plane enables the home menu user interface to be displayed at a respective orientation that is ergonomically favorable to the user, without requiring manual adjustments from the user and without having to display additional controls.

In some embodiments, displaying the application user interface includes: in accordance with a determination that an elevation angle of a head of a user (e.g., and a corresponding viewpoint of the user) in the three-dimensional environment is above a reference horizontal plane, displaying the application user interface at an orientation that is tilted toward the user (e.g., the orientation of the application user interface is not perpendicular to the horizontal plane). In accordance with a determination that the elevation angle of the head of the user (e.g., and the corresponding viewpoint of the user) in the three-dimensional environment is below the reference horizontal plane, the computer system displays the application user interface at a respective (e.g., default) orientation that is independent of the head elevation (e.g., not angled toward the viewpoint of the user; the orientation of the home menu user interface is perpendicular to the horizontal plane; the orientation of the application user interface is perpendicular to the horizontal plane). For example, as described herein with reference to side view 9020 of FIG. 9C and side view 9040 of FIGS. 9D, in response to detecting a user input corresponding to a request to display application user interface 9004 while angle 8087 has a value in a second range of angles above horizon 8008, computer system 101 displays application user interface 9004 at an orientation that is tilted toward the user. In contrast, as described in reference to side view 8040 of FIG. 9J, in response to detecting a user input to display home menu user interface 8012 while line 8006, which represents a side profile of a representation of user 7002, points downwards, computer system 101 displays application user interface 9004' at an orientation that is independent of a magnitude of an angle between normal 8042 and horizon 8008. Disambiguating whether to display an application user interface at an orientation that is tilted toward the user or at an orientation that is independent of a magnitude of a head elevation of the user based on whether the head elevation is above or below a horizontal reference plane enables the application user interface to be displayed at a respective orientation that is ergonomically favorable to the user, without requiring manual adjustments from the user and without having to display additional controls.

In some embodiments, displaying the home menu user interface at the respective location includes displaying the home menu user interface within an angular range with respect to a horizontal reference plane (e.g., the horizontal reference plane is the horizon, and the angular range is between 0-80 degrees from the horizon, and/or the angular range for the application user interface is based on and smaller than the angular range of the home menu user interface) (e.g., if the user attempts to move the home menu user interface beyond the angular range, the computer system blocks such a movement, positions the home menu user interface within the angular range, and/or moves the home menu user interface back within the angular range). In some embodiments, in response to detecting a user input corresponding to a request to display the home menu user interface at a location outside the angular range, the computer system forgoes displaying the home menu user interface or displays the home menu user interface within the angular range (e.g., at a closest point within the angular range to where the user attempted to launch the home menu user interface). For example, as described herein with reference to side view 9020 of FIGS. 9C, the computer system 101 displays home menu user interface 8012, and optionally, application user interface 9014 (as shown in side view 9040 of FIG. 9D) at a position having an associated angle 8087 between horizon 8008 and normal 8084 that is below a maximum angle of 85°, 80°, 75° or other maximum angle above horizon 8008. Displaying the home menu user interface and/or application user interface at a position having an associated angle relative to a horizontal reference plane that is below a maximum angle automatically restricts placement of the home menu user interface and/or application user interface to more ergonomically favorable locations that reduce the need for the user to search within the viewport for the home menu user interface and/or application user interface, without displaying additional controls.

In some embodiments, aspects/operations of methods 12000, 13000, 15000, 16000, 17000, 22000, 23000, 24000, 25000, 27000, and 29000 may be interchanged, substituted, and/or added between these methods. For brevity, these details are not repeated here.

FIG. 15 is a flow diagram of an exemplary method 15000 for using a pluck gesture to remove an object from a collection of objects in a mixed reality three-dimensional environment, in accordance with some embodiments. In some embodiments, method 15000 is performed (15002) at a computer system (e.g., computer system 101 in FIG. 1A) that is in communication with a display generation component (e.g., display generation component 120 in FIGS. 1A, 3, and 4, a heads-up display, a head-mounted display (HMD), a display, a touchscreen, a projector, a tablet, a smartphone, and other displays) and with one or more input devices (e.g., one or more optical sensors and/or eye-tracking devices). In some embodiments, the method 15000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 15000 are, optionally, combined and/or the order of some operations is, optionally, changed.

As described herein, method 15000 provides an improved input mechanism for interacting with a collection of user interface objects (e.g., photos in a gallery, documents in a folder, icons in a menu, or other collection or arrangement of user interface objects) in a mixed-reality three-dimensional environment. A pluck gesture is used to select, extract (e.g., pull out), and/or relocate a user interface object from a collection of user interface objects (optionally, objects of the same type that are displayed in the same virtual surface in the mixed-reality three-dimensional environment). The pluck gesture (e.g., an air gesture) includes movement of a hand towards a viewpoint of the user while a pinch is maintained. When the pluck gesture reaches a threshold amount of movement towards the viewpoint of the user, an object that is in focus enters a "pluckable" state. In the "pluckable" state, the object can be removed or pulled out from the collection of objects in response to further inputs directed to the object (e.g., movement towards the viewpoint of the user, lateral or vertical movement, or a combination of movement towards the viewpoint of the user, lateral movement and/or vertical movement). Using the pluck gesture to remove and relocate an object from a collection of objects disambiguates the user's intent to relocate the object within the collection of objects, to extract and relocate the object outside the collection of objects, to scroll the collection of objects, and/or to perform a different operation with respect to the object, thereby reducing accidental or unintended inputs and reducing the number of inputs and the amount of time needed to pull out an object from the collection of objects. Further, using an air pluck gesture instead of a hardware controller or other input device makes a drag and drop operation more ergonomic and efficient in a three-dimensional environment.

In the method 15000, while a view of a three-dimensional environment is visible via the display generation component, the computer system detects (15004), via the one or more input devices, a first input directed to a first object in a first arrangement of a plurality of objects (e.g., a collection or gallery of images, notes, documents, messages, search results, and other group of content items of the same time) that are arranged along a virtual surface (e.g., a virtual platter, a window, a container object, and/or another virtual region, such as virtual region 1020 in FIGS. 10B-10Q, that can be positioned and/or moved as a unit relative to the viewpoint of the user in the view of the three-dimensional environment) in the three-dimensional environment. In some embodiments, the environment is a three-dimensional environment (e.g., three-dimensional environment 10000' in FIGS. 10B-10Q) that includes one or more computer-generated portions (e.g., virtual content overlaid onto, projected onto, and/or replacing display of one or more portions of a representation or view of a physical environment) and optionally one or more passthrough portions (e.g., camera view (digital passthrough), or direct passthrough (optical passthrough)). In some embodiments, the first input is a gaze input optionally in combination with an air pinch gesture, or in combination with an air pinch gesture maintained for more than a predetermined amount of time (e.g., long pinch). In some embodiments, the virtual surface corresponds to a virtual region having designated borders, e.g., height and/or length, where a collection of items of the same type are displayed, optionally, at the same depth from a viewpoint of a user. Optionally, borders of the virtual region are not visible. In some embodiments, the first arrangement of a plurality of objects corresponds to a grid of content items, where the grid can be of one or more dimensions. For example, in some embodiments, the content items are displayed in an array (e.g., 1×N grid, an M×N grid, a honey-comb pattern, or other spatial arrangements or layout; In some embodiments, the virtual surface is flat or curved). During the first input, the computer system detects (15006) a first movement (e.g., an air gesture performed by a user's hand or a controller device) that includes movement in one or more directions that are substantially parallel to the virtual surface in the three-dimensional environment. For example, lateral movement from location 1101c in FIG. 10J to location 1101 in FIG. 10K, lateral movement from location 1101b in FIG. 10L to location 1101 in FIG. 10M, or vertical movement from location 1101 in Figure N (e.g., corresponding to location 1101a in FIGS. 10O-10Q) to location 1101 in FIG. 10Q. In some embodiments, the movement in one or more directions that are substantially parallel to the virtual surface includes movement components that are less than a threshold angle (e.g., one degree, two degrees, or another angular threshold that corresponds to a substantially parallel/non-orthogonal movement relative to the plane or surface of the first virtual region). In response to detecting (15008) the first movement included in the first input (e.g., in response to detecting the first movement while the first object is selected) and in accordance with a determination that the first movement includes movement that is substantially perpendicular to the virtual surface and that the movement that is substantially perpendicular to the virtual surface met first criteria prior to detection of the movement in the one or more directions that are substantially parallel to the virtual surface, the computer system removes (15010)

the first object from the arrangement of the plurality of objects (and optionally the computer system moves the first object in accordance with the movement in the one or more directions that are substantially parallel to the virtual surface). For example, in FIGS. 10G and 10I object O5 1010 is plucked out (e.g., enters a pluckable state) and removed from collection of collection of objects 1002-1018 in response to movement of hand 10020 in a direction towards user 10002 (e.g., or a viewpoint of user 10002) that meets a threshold amount of movement (e.g., that is needed to transition object O5 1010 to a "pluckable" state).

In some embodiments, the first criteria requires that the movement that is substantially perpendicular to the virtual surface includes more than a threshold amount of movement, and that the movement is pulling away from the virtual surface toward a viewpoint of the user, or toward the user; and/or the movement is not preceded by more than a threshold amount of movement that is substantially parallel to the virtual surface. In some embodiments, removing the first object from the arrangement of the plurality of objects includes pulling the object out of the virtual surface, such that the first object is no longer part of the collection of objects included in the virtual surface and/or the first object can freely be relocated in the three-dimensional environment in response to movement input. In some embodiments, movement that is substantially parallel to the virtual surface corresponds to movement within a predetermined threshold angle of the virtual surface (e.g., 1 degree, 2 degrees, 3 degrees, 5 degrees, 10 degrees, an angle that is less than 45 degrees, or another threshold angle). In some embodiments, movement that is substantially perpendicular to the virtual surface includes movement that is within a predetermined threshold angle (e.g., 90 degrees, 89 degrees, 88 degrees, 85 degrees, 80 degrees, an angle that is more than 45 degrees and less than 135 degrees, 91 degrees, 92 degrees, 93 degrees, 95 degrees, 100 degrees, 105 degrees, or another threshold angle). In some embodiments, the virtual surface faces toward a viewpoint of the user.

In response to (15008) detecting the first movement included in the first input (e.g., in response to detecting the first movement while the first object is selected) and in accordance with a determination that the first movement does not include movement that is substantially perpendicular to the virtual surface that meets the first criteria (e.g., the movement includes less than the threshold amount of movement, and/or the movement does not pull away from the front surface of the first virtual region toward a viewpoint of the user, or toward the user before moving transversely relative to the first virtual region) prior to the detection of the movement in the one or more directions that are substantially parallel to the virtual surface, the computer system forgoes (15012) removing the first object from the arrangement of the plurality of objects (and, optionally the computer system forgoes moving the first object relative to the arrangement of the plurality of objects in accordance with the movement in the one or more directions that are parallel to the virtual surface). For example, FIGS. 10L-10M illustrate a scenario in which object O5 1010 remains within the borders of the virtual region in response to lateral movements that would otherwise be sufficient to cause the computer system to move the O5 1010 outside the borders of the virtual region 1020 had the lateral movement been preceded by movement that is substantially perpendicular to the virtual surface that met first criteria.

In some embodiments, forgoing to remove the first object from the arrangement of the plurality of objects includes maintaining display of the first object within the virtual surface, e.g., forgoing pulling the object out of the virtual surface and moving in a region outside of the virtual surface in accordance with the movement in the one or more directions that are substantially parallel to the virtual surface. In some embodiments, a pluck gesture that includes movement of a hand towards a viewpoint of the user while a pinch gesture is maintained is used to remove or retrieve the first object from the arrangement of the plurality of objects. In some embodiments, when the pluck gesture reaches a threshold amount of movement towards the viewpoint of the user, the first object that is being moved reaches a "pluckable" state. In the "pluckable" state the first object can be removed from the arrangement of the plurality of objects in response to further inputs directed to the first object (e.g., further movement towards the viewpoint of the user, lateral or vertical movement, or a combination of movement towards the viewpoint of the user, lateral movement and/or vertical movement). In some embodiments, if the pinch gesture is released before the movement of the hand towards the user reaches the threshold amount of movement (e.g., before the first object enters the "pluckable" state), the first object snaps back or restores its position in the arrangement of the plurality of objects. For example, in FIG. 10H, object O5 1010 (e.g., or the preview of content of object O5 1010) snaps back or restores its position in virtual region 1020 (e.g., returns to its original position at the second row and the second column in the arrangement of objects O1 1002-O9 1018) in response to detecting the release of the air pinch gesture before movement of hand 10020 towards the viewpoint of user 10002 meets the threshold amount of movement.

In some embodiments, if the pinch gesture is released after the movement of the hand towards the user reaches the threshold amount of movement (e.g., while the first object is in the "pluckable" state), an updated position of the first object determined in accordance with the movement of the hand towards the user is maintained (e.g., as described in more detail herein with reference to method 16000. In some embodiments, the first object is selected in response to detecting a pinch gesture while a user is gazing toward the first object (e.g., indirect air gesture). In some embodiments, the first object is selected in response to direct pinch gesture, where location of the hand user's hand reaches out and directly interacts with the first object (e.g., direct air gesture).

Using the amount of hand movement perpendicular to a virtual surface where a collection of objects are located (e.g., an amount of movement towards a viewpoint of the user) as a condition for removing an object from the collection of objects makes the user-device more efficient by helping disambiguate the user's intent to pull out the object or to perform a different operation with respect to the object or the collection of objects, thereby reducing the number of errors, accidental input, and/or unwanted relocations of the selected object visible in a mixed-reality three-dimensional environment.

In some embodiments, in response to detecting the first movement included in the first input and in accordance with a determination that the first movement does not include movement that is substantially perpendicular to the virtual surface that meets the first criteria (e.g., the movement includes less than the threshold amount of movement, and/or the movement does not pull away from the virtual surface toward a viewpoint of the user, or toward the user before moving transversely relative to the first virtual region) prior to the detection of the movement in the one or more directions that are substantially parallel to the virtual surface, the computer system performs a first operation (e.g., moving the first object within the bounds of the virtual surface, scrolling objects in the virtual surface, and/or other operations with respect to the first object and/or the virtual surface) without removing the first object from the arrangement of the plurality of objects. For example, FIGS. 10N-10Q illustrate a scenario in which object O5 1010 remains within the borders of the virtual region 1020 in response to a vertical movement that would be sufficient to cause the computer system to move the O5 1010 outside the borders of the virtual region 1020 had the lateral movement been preceded by movement that is substantially perpendicular to the virtual surface that met first criteria (e.g., if object O5 1010 were in the pluckable state).

Using the amount of hand movement towards a viewpoint of the user and away from the virtual surface (e.g., and optionally other characteristic of the hand movement, such as speed, velocity, and/or magnitude) as criteria to disambiguate between activating a pluckable state for a selected object and performing a different operation (e.g., scrolling), makes the user-device more efficient by reducing the number of errors, accidental input, and/or unwanted relocations of the selected object.

In some embodiments, performing the first operation includes scrolling the plurality of objects in the virtual surface (e.g., as described herein with reference to FIG. 11K). Using the amount of hand movement towards a viewpoint of the user and away from the virtual surface (e.g., and optionally other characteristic of the hand movement, such as speed, velocity, and/or magnitude) as criteria to disambiguate between activating a pluckable state for a selected object and scrolling the collection of objects included in the virtual surface, makes the user-device more efficient by reducing the number of errors, accidental input, and/or unwanted relocations of the selected object.

In some embodiments, performing the first operation includes moving the first object within the virtual surface (e.g., within the bounds of a virtual region) in accordance with the movement in the one or more directions that are substantially parallel to the virtual surface (e.g., object O5 1010 in FIGS. 10L-10M and 10N-10Q is moved within the bounds of virtual region 1020). Using the amount of hand movement towards a viewpoint of the user and away from the virtual surface (e.g., amount, speed, and/or other characteristic of the hand movement) as criteria to disambiguate between activating a pluckable state for a selected object and moving the selected object within the collection of objects included in the virtual surface, makes the user-device more efficient by reducing the number of errors, accidental input, and/or unwanted relocations of the selected object.

In some embodiments, in response to detecting the first movement included in the first input and in accordance with a determination that the movement that is substantially perpendicular to the virtual surface is preceded by earlier movement in one or more directions that are substantially parallel to the virtual surface and a determination that the earlier movement in the one or more directions that are substantially parallel to the virtual surface meets second criteria (e.g., there is more than a threshold amount of movement in the parallel directions prior to detection of movement in the perpendicular direction), the computer system forgoes removing the first object from the arrangement of the plurality of objects (e.g., the first criteria would not be met if the movement in the perpendicular direction relative to the virtual surface that is detected after more than a threshold amount of parallel movement relative to the virtual surface has been detected). For example, z-movement (e.g., towards the user) is ignored if the z-movement is detected after a threshold amount of x-y movement has been detected, even if the z movement exceeds a threshold amount of movement (and is optionally followed by x-y movement). For example, if, a movement towards the user is that meets the threshold amount required to enter the pluckable state is detected in the scenario of FIG. 10Q in which object O5 1010 is moved to the top edge of virtual region 1020 (e.g., in response to more than the threshold amount of movement in the parallel directions), object O5 1010 would not enter the pluckable state. Forgoing using hand movement towards a viewpoint of the user as a condition for activating a pluckable state for a selected object, in accordance with a determination that more than a threshold amount of horizontal or vertical hand movement precedes the hand movement towards the viewpoint of the user, makes the user-device more efficient by helping disambiguate between activating a pluckable state for a selected object and scrolling the collection of objects or moving the selected object within the collection of objects.

In some embodiments, in response to detecting the first movement included in the first input and in accordance with a determination that the first movement includes movement that is substantially perpendicular to the virtual surface and before the movement that is substantially perpendicular to the virtual surface meets the first criteria, displaying a visual indication that the first object is removable from the arrangement of the plurality of objects with continuation of the first movement (e.g., in conjunction with pulling object O5 1010 towards a viewpoint of the user in FIG. 10G, virtual region 1020 is darkened and/or blurred, object O5 1010 is enlarged, and/or a preview of content of object O5 1010 is displayed). Examples of the visual indication include, but are not limited to, blurring, darkening, shrinking of the virtual surface along with other objects of the plurality of objects in the in the arrangement of the plurality of objects, and/or otherwise reducing visibility or prominence of virtual surface (and objects displayed therein) relative to the first object (e.g., the object that is being pulled). In some embodiments, the visual indication includes enlarging the first object and/or displaying a preview of content of the first object. In some embodiments, the visual indication includes pulling the first object away from the first virtual region but returning to the first virtual region if the continued movement of the first movement input is not detected (e.g., thereby indicating that further movement is necessary to pluck our or remove the first object from the virtual region). In some embodiments, the visual indication provides feedback that the selected object entered a pluckable state, thereby indicating that optionally further hand movement (e.g., while the object is selected) can cause removal of the selected object from the collection of objects. Providing visual feedback (e.g., in response to detecting hand movement towards the viewpoint of the user and away from the virtual surface) that a selected object can be plucked out (e.g., separated from the virtual surface or otherwise removed from the collection of objects) makes the user-device interaction more efficient by indicating to the user that the operational context for the selected object has changed, thereby guiding the user when navigating a collection of objects in a complex mixed reality three-dimensional environment (e.g., environment with various real and virtual objects, some of which are part of the same collection).

In some embodiments, while the visual indication is displayed (e.g., while object O5 1010 is in the "peek" state as in FIG. 10G), the computer system detects the movement that is substantially perpendicular to the virtual surface, where the computer system removes the first object from the arrangement of the plurality of objects in accordance with a determination that the movement that is substantially perpendicular to the virtual surface met the first criteria. For example, while object O5 1010 is in the "peek" state as in FIG. 10G, the computer system 101 detects further movement of hand 10020 in the direction towards user 10002 (e.g., or a viewpoint of user 10002) that meets the "pluck" threshold, and the computer system 101 removes object O5 1010 from virtual region 1020 in FIG. 10I. Removing a selected object that is in a pluckable state in response to movement towards a viewpoint of the user makes the user-device interaction more efficient by helping the user place and relocate user interface objects in a complex mixed reality three-dimensional environment.

In some embodiments, the movement in the one or more directions that are substantially parallel to the virtual surface is detected while the visual indication is displayed. The computer system removes the first object from the arrangement of the plurality of objects (e.g., and moves of the first object in accordance with the movement in the one or more directions that are substantially parallel to the virtual surface) in response to detecting the movement in the one or more directions that are substantially parallel to the virtual surface. For example, in FIG. 10G while object O5 1010 is in the "peek" state, lateral or vertical movement can cause object O5 1010 to enter the pluckable state. Removing a selected object that is in a pluckable state in response to lateral or vertical hand movement (e.g., substantially parallel to the virtual surface that includes the collection of objects) makes the user-device interaction more efficient by helping the user place and relocate user interface objects in a complex mixed reality three-dimensional environment.

In some embodiments, the visual indication includes automatically (e.g., without user input) moving the first object in a direction that is substantially perpendicular to the virtual surface (e.g., towards a user and/or a viewpoint of the user and further away from the virtual surface). For example, in FIG. 10G, object O5 1010 is moved towards the user relative to FIG. 10F to visually indicate that object O5 1010 can be removed or plucked out from virtual region 1020. Popping a selected object out of the virtual surface in accordance with a determination the selected object enters a pluckable state provides visual feedback indicating to the user that the operational context for the selected object has changed, thereby making the user-device interaction more efficient.

In some embodiments, the visual indication includes casting a shadow of the first object onto the virtual surface. For example, as described herein with reference to FIG. 10G, a shadow can be cast by object O5 1010 onto virtual region 1020. Casting a shadow of a selected object onto the virtual surface in accordance with a determination the selected object enters a pluckable state, provides visual feedback indicating to the user that the operational context for the selected object has changed, thereby making the user-device interaction more efficient.

In some embodiments, while displaying the visual indication, the computer system detects respective movement of the first input. In response to detecting the respective movement of the first input, the computer system displays a change in the visual indication based on the respective movement of the first input. In some embodiments, the change in the visual indication has a direction that is based on a direction of the respective movement of the first input and/or has a magnitude that varies based on or in accordance with magnitude of the respective movement of the first input. For example, in FIGS. 101-10J, object O5 1010 is tilted towards the direction in which object O5 1010 is being pulled. In some embodiments, if the visual indication corresponds to a preview of the first object, the change in the visual indication corresponds to change in position of the preview of the first object. In some embodiments, if the visual indication corresponds to a shadow that is being cast onto the virtual surface, the change in the visual indication corresponds to changing position of the shadow along with changing the position of the first object in accordance with the respective movement. In some embodiments, if the visual indication corresponds to movement of the object in the direction that is substantially perpendicular to the virtual surface, changing the visual indication corresponds to further moving the first object from one position to another in accordance with the subsequent movement. Changing position, size, or orientation of a visual indication (e.g., a preview that is being displayed or shadow that is being cast) of the pluckable state of the selected object in accordance with a direction and/or movement of input detected after the visual indication is displayed provides (optionally continuous) assistance or guidance to the user when removing and relocating the selected object out of the collection of objects.

In some embodiments, displaying the change in the visual indication includes moving the first object in a direction that is substantially perpendicular to the virtual surface in accordance with the respective movement (e.g., magnitude and/or direction of the respective movement). For example, object O5 1010 in FIG. 10I further pops out of virtual region 1020 relative to FIG. 10G in response to user pulling object O5 1010. Moving the selected object (which is optionally in a pluckable state) in accordance with direction of the hand movement away from the virtual surface and/or towards the viewpoint of the user provides continued visual feedback and/or guides the user in removing the selected object from the collection of objects and relocating the selected object in a mixed-reality three-dimensional environment.

In some embodiments, displaying the change in the visual indication includes moving the first object in one or more directions that are substantially parallel to the virtual surface in accordance with the respective movement (e.g., magnitude and/or direction of the respective movement). For example, object O5 1010 is pulled or moved in a leftward direction in FIG. 10J. Moving the selected object (which is optionally in a pluckable state) in accordance with direction of the hand movement (e.g., lateral or vertical movement that is optionally substantially parallel to the virtual surface) provides continued visual feedback and/or guides the user in removing the selected object from the collection of objects and relocating the selected object in a mixed-reality three-dimensional environment.

In some embodiments, displaying the change in the visual indication includes tilting the first object in a direction of the respective movement. For example, object O5 1010 is tilted in a direction that object O5 1010 is being pulled in FIGS. 101-10J. In some embodiments, tilting the first object in a direction of the respective movement is performed according to a predetermined physics model that simulates movement of the first object as though the first object is connected to the virtual surface via a spring or rubber band, including tilting in the direction of the respective movement (e.g., up or down and/or to the left or to the right). Tilting and/or changing orientation of the selected object based on a direction in which the selected object is being pulled provides continued visual feedback and/or guides the user in removing the selected object from the collection of objects and relocating the selected object in a mixed-reality three-dimensional environment.

In some embodiments, in response to detecting the first movement included in the first input and in accordance with a determination that the first movement includes movement that is substantially perpendicular to the virtual surface and that the movement that is substantially perpendicular to the virtual surface is detected before a threshold amount of movement in the one or more directions that are substantially parallel to the virtual surface is detected, the computer system displays a visual indication that the first object is removable from the arrangement of the plurality of objects with continuation of the first movement. In some embodiments, in response to detecting the first movement included in the first input and in accordance with a determination that the first movement includes movement that is substantially perpendicular to the virtual surface and that the movement that is substantially perpendicular to the virtual surface is detected after a threshold amount of movement in the one or more directions that are substantially parallel to the virtual surface is detected, forgoing displaying a visual indication that the first object is removable from the arrangement of the plurality of objects with continuation of the first movement. For example, in FIG. 10G, object O5 1010 is moved in a direction towards the user and is enlarged to provide visual feedback that object O5 1010 can be plucked out in accordance with a determination that movement towards the user is not preceded by a predetermined amount of lateral and/or vertical movement, whereas no such visual feedback would be provided if the movement towards the user is preceded by the predetermined amount of lateral and/or vertical movement. Providing visual feedback that a selected object can be plucked out when the movement towards the user that plucks out the selected object is not preceded by a predetermined amount of lateral and/or vertical movement, and forgoing such visual feedback when the movement towards the user is preceded by the predetermined amount of lateral and/or vertical movement, makes the user-device interaction more efficient by indicating to the user that the operational context for the selected object has changed, thereby guiding the user when navigating and/or interacting with a collection of objects in a mixed reality three-dimensional environment.

In some embodiments, in response to detecting the first movement included in the first input and in accordance with a determination that the first movement includes a first amount of movement that is substantially perpendicular to the virtual surface, the computer system displays a first visual indication that the first object is removable from the arrangement of the plurality of objects with continuation of the first movement (e.g., the first visual indication corresponds enlarging the first object and/or displaying a preview of content of the first object). In some embodiments, in response to detecting the first movement included in the first input and in accordance with a determination that the first movement includes a second amount of movement (e.g., the second amount of movement is greater than the first amount of movement) that is substantially perpendicular to the virtual surface, displaying a second visual indication that the first object is removable from the arrangement of the plurality of objects with continuation of the first movement (e.g., the second visual indication corresponds to moving the first object (optionally, while displaying the preview of content of the first object), including initiation a drag and drop operation). For example, in FIG. 10G, in response to detecting the movement towards the user while object O5 1010 is selected, object O5 1010 enters a peek state in which object O5 1010 is enlarged and a preview of content of object O5 1010 is revealed, and in response to further movement towards the user while object O5 1010 is selected, object O5 1010 is further moved in accordance with the further movement and object O5 1010 is tilted in the direction in which object O5 1010 is being pulled, as illustrated in FIGS. 101-10J. In some embodiments, the second visual indication is different from the first visual indication. In some embodiments, the first visual indication indicates that the first object entered a pluckable state (e.g., in which state if the selected object is released, the first object no longer snaps back to its original position in the virtual surface), and the second visual indication indicates that a drag and drop operation with respect to the first object is initiated. Providing one type of visual indication when the first object enters a pluckable state and a different type of visual indication when a drag and drop operation with respect to the first object is initiated makes the user-device interaction more efficient by guiding the user when removing and/or relocating an object from a collection of objects in a complex mixed reality three-dimensional environment.

In some embodiments, in accordance with a determination that the movement that is substantially perpendicular to the virtual surface has met the first criteria, the computer system outputs an audio effect (e.g., indicating that the first object can be plucked out or removed out from the arrangement of the plurality of objects). For example, in FIGS. 101, the computer system outputs an audio effect in accordance with a determination that object O5 1010 entered the pluckable state (e.g., the movement that pulls object O5 1010 substantially perpendicular to the virtual region 1020 has met the first criteria). In some embodiments, a first type of audio feedback (e.g., or audio effect) is provided when the first object that is being plucked enters a pluckable state. In some embodiments, a second type of audio feedback (e.g., or audio effect) is provided when a drag and drop operation is initiated with respect to the first object. In some embodiments, a continuous audio feedback is provided when the first object is being plucked out from the collection of objects in the virtual surface. Providing audio feedback when the selected object enters the pluckable state and/or when a drag and drop operation with respect to the selected object is initiated makes the user-device interaction more efficient by guiding the user when removing and/or relocating an object from a collection of objects in a complex mixed reality three-dimensional environment.

In some embodiments, the audio effect is outputted in conjunction with displaying a preview of the first object (e.g., before the first object has entered the pluckable state). For example, in FIG. 10G, the computer system outputs an audio effect in accordance with a determination that object O5 1010 entered the "peek" state (e.g., before the movement that pulls object O5 1010 substantially perpendicular to the virtual region 1020 has met the first criteria). In some embodiments, providing the audio effect in conjunction with displaying a preview of the first object indicate that the first object can be plucked out, pulled out or otherwise removed from the arrangement of the plurality of objects. Providing audio feedback when the selected object enters the pluckable state and/or the peek state (e.g., in which a preview of the first object is displayed), makes the user-device interaction more efficient by guiding the user when removing and/or relocating an object from a collection of objects in a complex mixed reality three-dimensional environment.

In some embodiments, in response to detecting the first movement included in the first input and in accordance with a determination that the first movement includes a first threshold amount of movement that is substantially perpendicular to the virtual surface and that the first threshold amount of movement that is substantially perpendicular to the virtual surface is detected before the movement in the one or more directions that are substantially parallel to the virtual surface is detected, removing the first object from the arrangement of the plurality of objects, wherein the first threshold amount of movement is less than a second threshold amount of movement substantially parallel to the virtual surface that is required to remove the first object from the arrangement of the plurality of objects (e.g., less than 0.5, 1.0, 1.5, 2.0, 2.5 cm or other amount of movement). In some embodiments, removing the first object from the arrangement of the plurality of objects corresponds to initiating and/or completing a drag and drop operation with respect to the first object. In some embodiments, as described herein with reference to FIG. 10E, a shorter threshold amount of movement in a direction towards the user (e.g., away from the virtual surface) is needed to remove and/or pluck out the first object from the arrangement of the plurality of objects compared to an amount of movement in a lateral or vertical direction (e.g., substantially parallel to the virtual surface) that is needed to remove the first object from the arrangement of the plurality of objects. Using a shorter threshold amount of movement as a condition to complete a pluck operation with respect to a selected object if the movement is in a direction towards the user (e.g., away from the virtual surface), and a longer threshold amount of movement if the movement is in a lateral or vertical direction, provides an ergonomically improved input mechanism for removing an object from the collection of objects in a mixed-reality three-dimensional environment, thereby making the user-device interaction more efficient.

In some embodiments, the movement that is substantially perpendicular to the virtual surface is measured relative to a viewpoint of a user. For example, whether movement of hand 10020 meets the threshold for pluck in FIGS. 10F-101 is measured relative to a viewpoint of user 10002. In some embodiments, a user-centric coordinate system is used to determine location and distance travelled of a user's hand (e.g., the spherical coordinate system illustrated in view 1040 in FIGS. 10F-10Q or FIGS. 11A-11L), where to remove an object from the virtual surface the movement perpendicular to the virtual surface is measured as a distance away from a viewpoint of a user (e.g., as opposed to measured relative to the virtual surface). Using a user-centric coordinate system to recognize air gestures and determine amounts of hand movement provides an ergonomically improved input mechanism for interacting with objects in a mixed-reality three-dimensional environment (e.g., dragging and dropping the object or relocating the object within the collection of objects), thereby making the user-device interaction more efficient.

In some embodiments, the first object is displayed at a respective position (e.g., a starting position or initial position at which the first object was located prior to detecting the input) in the three-dimensional environment prior detecting the first input. In method 15000, the computer system detects a respective movement that is substantially perpendicular to the virtual surface (e.g., user's hand moves towards the user and away from the virtual surface, optionally, while performing an air gesture such as a pinch). In response to detecting the respective movement that is substantially perpendicular to the virtual surface, the computer system moves the first object in a direction that is substantially perpendicular to the virtual surface (e.g., the first object is moved towards the user or a viewpoint of the user).

In some embodiments, the first object is also optionally enlarged, and content of the first object is revealed or otherwise displayed in the first object) to a position that is different from the respective position (e.g., a first position, a second position, or another position that is the position of the first object determined in accordance with the movement that is substantially perpendicular to the virtual surface). After moving the first object in a direction that is substantially perpendicular to the virtual surface, the computer system detects an end of the first input (e.g., a depinch input while performing an air pinch gesture, a lift off gesture, or another input indicating an end of the gesture). In response to detecting the end of the first input and in accordance with a determination that the first input ended without the respective movement that is substantially perpendicular to the virtual surface meeting the first criteria (e.g., without meeting a distance and/or magnitude threshold), the computer system restores display of the first object at the respective position (e.g., the first object snaps back to the respective position). For example, object O5 1010 snaps back to virtual region 1020 in FIG. 10H from a position that is closer to the user in FIG. 10G, in accordance with a determination that a release of the pinch is detected without the movement towards the user meeting the pluck threshold. In some embodiments, in accordance with a determination that the first input ended after meeting the first criteria (e.g., after the predetermined movement threshold has been reached), the computer system maintains display of the first object at a position (e.g., the first position, the second position, or another position that is the position of the first object at the time that the end of the first input was detected) that is different from the respective position. In some embodiments, restoring display of the first object at the respective position includes animating movement of the first object from the position that is different from the respective position back to the respective position (e.g., movement away from the user and towards the virtual surface is animated). In some embodiments, the animation includes shrinking the first object back to the size the first object was in, removing a shadow that was being cast by the first object, reversing some or all tilting that was being displayed, and/or changing orientation of the first object back to face the user, or otherwise reversing changes made with respect to the first object in response to the respective movement that is substantially perpendicular to the virtual surface (e.g. as described herein with reference to FIG. 10H). Snapping a selected object back to its original position in the collection of objects on the virtual surface provides visual feedback that the selected object is not in a pluckable state yet (e.g., due to the hand movement not meeting the criteria for activating the pluckable state), thereby making the user-device interaction more efficient by reducing unintended inputs and the number of inputs needed to pull or pluck out an object from a collection of objects.

In some embodiments, the first object is displayed at a respective position (e.g., a starting position or initial position at which the first object was located prior to detecting the input) in the three-dimensional environment prior to detecting the first input. In method 15000, the computer system detects the movement included in the first input that is substantially perpendicular to the virtual surface (e.g., user's hand moves towards the user and away from the virtual surface, optionally, while performing an air gesture such as a pinch). In response to detecting the movement that is substantially perpendicular to the virtual surface, the computer system moves the first object (e.g., or a preview of the first object) in a direction that is substantially perpendicular to the virtual surface (e.g., the first object is moved in the same, or substantially same, direction as the direction of movement of the input, such as towards the user or a viewpoint of the user) at decreasing speed as the movement included in the first input that is substantially perpendicular to the virtual surface gets closer to a threshold amount of movement. For example, from the "peek" state in FIG. 10G to the "pluckable" state in FIGS. 101, object O5 1010 appears to resist the pulling of object O5 1010 (e.g., as if the selected object is attached to the virtual surface by a rubber band). In some embodiments, in conjunction with moving the first object in the direction of the movement of the input in the first input, the first object is also optionally enlarged, and content of the first object is revealed or otherwise displayed in the first object.

In some embodiments, in accordance with a determination that the movement that is substantially perpendicular to the virtual surface reaches or meets the threshold amount of movement, the first object is no longer moved with a decreasing speed and/or the first object is moved in accordance with magnitude (e.g., speed, velocity, or distance) of the movement that is substantially perpendicular to the virtual surface. In some embodiments, as the user's hand moves in a direction towards the user but before a predetermined threshold amount of movement is reached (e.g., a threshold where a pluck operation occurs or where a drag and drop operation can occur), the first object appears to move with greater difficulty, more slowly, or less as the user's hand moves closer to the predetermined threshold amount of movement. In other words, for a first amount of movement (e.g., "x" amount) of the hand before the predetermined amount of movement is reached, the first object is moved a second amount of movement (e.g., "y" amount), and for further movement of the hand by the same first amount, before the predetermined amount of movement is reached (e.g., "x" amount), the first object is moved a third amount of movement (e.g., "z" amount), where the third amount of movement is less than the second amount of movement (e.g., "z" is less than "y"). For example, a visual effect is provided where the first object appears to resist a pulling gesture. In some embodiments, when the predetermined threshold amount of movement is reached, a drag and drop operation can be performed in accordance with a continued movement, where the first object can be removed or retrieved from the virtual surface and moved to a different location and/or surface outside the arrangement of the plurality of objects. In some embodiments, if the first input ends before the threshold amount of movement is reached, the first object restores or snaps back to the respective position in the three-dimensional environment. Providing a visual effect that simulates resistance when the selected object is being pulled out from the collection of objects (e.g., as if the selected object is attached to the virtual surface by a rubber band), provides a visual feedback to a user that further movement is needed to remove the object from the collection of objects and/or that the selected object has not yet entered the pluckable state, thereby making the user-device interaction more efficient by reducing unintended inputs and the number of inputs needed to pull or pluck out an object from a collection of objects.

In some embodiments, the movement included in the first input that is perpendicular to the virtual surface is performed with a first hand. In method 15000, in response to detecting the movement that is substantially perpendicular to the virtual surface and in accordance with a determination that the movement included in the first input that is substantially perpendicular to the virtual surface reaches the threshold amount of movement, the computer system moves the first object with increasing speed towards the first hand (e.g., movement of the first object is snapped towards the first hand based on distance the first hand travelled and/or velocity of the movement of the first hand). For example, from the "peek" state in FIG. 10G to the "pluckable" state in FIGS. 10I, object O5 1010 appears to resist the pulling objects (e.g., as if the selected object is attached to the virtual surface by a rubber band) and then, in accordance with a determination that object O5 1010 has entered the pluckable state, object O5 1010 appears to catch up to the movement pulling the object O5 1010. In some embodiments, the snapping movement of the first object towards the user slows down after travelling a predetermined amount with the increased speed. In some embodiments, the speed of movement of the first object towards the first hand is increased during an initial portion and slowed down as the first object gets closer to the first hand. In some embodiments, before reaching the threshold where the pluckable state is activated, the first object appears to resist the pulling movement performed by the first hand, and once the threshold is met, the first object appears to catch up to the first hand, where initially the catching up appears to occur faster and eventually slows down as the first object gets closer to the first hand. Providing a visual effect where the selected object catches up or snaps towards a hand of the user that performs the pulling gesture provides visual feedback to the user that the performed pulling action has reached the threshold where the pluckable state is activated, thereby making the user-device interaction more efficient by guiding and assisting the user when plucking out or dragging an object out of a collection of objects in a mixed-reality three dimensional environment.

In some embodiments, the first movement includes movement that is substantially perpendicular to the virtual surface. In method 15000, in response to detecting the first movement included in the first input and while detecting the movement that is substantially perpendicular to the virtual surface, the computer system tracks progress of the detected movement towards meeting the first criteria (e.g., progress is tracked towards meeting a threshold amount of movement in a direction that is substantially perpendicular to the virtual surface). Before the detected movement meets the first criteria (e.g., before the threshold amount of movement is reached), the computer system detects second movement in one or more directions that are substantially parallel to the virtual surface. In response to detecting the second movement in the one or more directions that are substantially parallel to the virtual surface, the computer system offsets the tracked progress of the detected movement towards meeting the first criteria based on the second movement in the one or more directions that are substantially parallel to the virtual surface (e.g., the tracked progress is reduced based on distance travelled by the second movement). For example, in FIG. 10G, any progress that has been made toward meeting the pluck threshold by moving object O5 1010 to the peek state is offset by lateral or vertical movement that is detected prior to object O5 1010 entering the pluckable state in FIG. 10I. Offsetting progress made towards meeting the threshold amount of movement needed to activate the pluckable state in response to detecting movement of the hand in directions that are not substantially perpendicular to the virtual surface (e.g., parallel to the virtual surface) helps disambiguate the user's intent to pluck out the selected object, scroll the collection of objects, and/or relocate the selected object within the collection of objects, thereby reducing unintended inputs and the number of inputs needed to pull or pluck out an object from a collection of objects.

In some embodiments, the first movement includes movement that is substantially perpendicular to the virtual surface. In method 15000, while detecting the movement that is substantially perpendicular to the virtual surface, the computer system tracks progress of the detected movement towards meeting the first criteria (e.g., progress is tracked towards meeting a threshold amount of movement in a direction that is substantially perpendicular to the virtual surface, such as the "pluck" threshold). Before the detected movement meets the first criteria (e.g., before the threshold amount of movement is reached), the computer system detects second movement in one or more directions that are substantially parallel to the virtual surface. In response to detecting the second movement in the one or more directions that are substantially parallel to the virtual surface and in accordance with a determination that the first object is a first type of object (e.g., a draggable object or object that can be pulled out of the arrangement of plurality of objects as unit, such as object O5 1010 of FIG. 10G), the computer system offsets the tracked progress of the detected movement towards meeting the first criteria based on the second movement in the one or more directions that are substantially parallel to the virtual surface (e.g., the tracked progress is reduced based on distance travelled by the second movement). In response to detecting the second movement in the one or more directions that are substantially parallel to the virtual surface and in accordance with a determination that the first object is a second type of object (e.g., a scrollable view of a document, webpage or other object), the computer system forgoes offsetting the tracked progress of the detected movement towards meeting the first criteria based on the second movement in the one or more directions that are substantially parallel to the virtual surface (e.g., the tracked progress is reduced based on distance travelled by the second movement). Offsetting progress made towards meeting the threshold amount of movement needed to activate the pluckable state for a first type of object (e.g., draggable object) but not for a second type of object (e.g., scrollable view of a collection of objects) helps disambiguate the user's intent to pluck out the selected object from the collection of objects or scroll the collection of objects, thereby reducing unintended inputs and the number of inputs needed to pull or pluck out an object from a collection of objects.

In some embodiments, aspects/operations of methods 12000, 13000, 14000, 16000, 17000, 22000, 23000, 24000, 25000, 27000, and 29000 may be interchanged, substituted, and/or added between these methods. For brevity, these details are not repeated here.

FIG. 16 is a flow diagram of an exemplary method 16000 for providing continuous feedback to a user while performing a pluck gesture in a mixed-reality three-dimensional environment, in accordance with some embodiments. In some embodiments, method 16000 is performed (16002) at a computer system (e.g., computer system 101 in FIG. 1A) that is in communication with a display generation component (e.g., display generation component 120 in FIGS. 1A, 3, and 4, a heads-up display, a head-mounted display (HMD), a display, a touchscreen, a projector, a tablet, a smartphone, and other displays) and with one or more input devices (e.g., one or more optical sensors and/or eye-tracking devices). In some embodiments, the method 16000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 16000 are, optionally, combined and/or the order of some operations is, optionally, changed.

As described herein, method 16000 provides continuous visual feedback during a pluck gesture that is used to drag and drop (e.g., select and relocate) a user interface object from a collection of user interface objects displayed in a virtual surface in a mixed reality three-dimensional environment. In particular, if a selected object is moved relative to the virtual surface in response to hand movement (e.g., movement towards a viewpoint of the user) and the selected object is released before a movement threshold is met (e.g., an air pinch gesture is released before activating a pluckable state for the selected object), the selected object snaps back or restores its original position in the virtual surface (e.g., the position in which the selected object was in prior detecting the hand movement). Snapping a selected object back to its original position in the collection of objects on the virtual surface provides visual feedback that the selected object is not in a pluckable state yet (e.g., due to the hand movement not meeting the criteria for activating the pluckable state), thereby making the user-device interaction more efficient by reducing unintended inputs and the number of inputs needed to pull or pluck out an object from a collection of objects. Optionally, further visual feedback is provided during the pluck gesture, such as changing orientation, position, and/or size of the selected object, including tilting the selected object toward a direction in which the selected object is being pulled, thereby making the user-device interaction more efficient by reducing unintended inputs and assisting the user when interacting with an object in a collection of objects in a mixed-reality three-dimensional environment.

In the method 16000, while a view of a three-dimensional environment is visible via the display generation component, the computer system detects (16004) a first input that includes movement (e.g., an air gesture performed by a user's hand or a controller device) directed to a first object (e.g., a first object of a plurality of objects included in a first virtual region, such as virtual region 1020) located at a respective position (e.g., a starting position or initial position at which the first object was located prior to detecting the input) in the three-dimensional environment, wherein the movement includes movement in one or more directions relative to the respective position in the three-dimensional environment. In some embodiments, the environment is a three-dimensional environment that includes one or more computer-generated portions (e.g., virtual content overlaid onto, projected onto, and/or replacing display of one or more portions of a representation or view of a physical environment) and optionally one or more passthrough portions (e.g., camera view (digital passthrough), or direct passthrough (optical passthrough)).

In response to detecting the movement directed to the first object, the computer system moves (16006) the first object in accordance with the movement. Moving (16006) the first object in accordance with the movement includes (16008), in accordance with a determination that the movement included in the first input includes a first movement in a first direction with a first magnitude, moving the first object to a first position different from the respective position in accordance with the first direction and the first magnitude of the first movement. Moving (16006) the first object in accordance with the movement includes (16010), in accordance with a determination that the movement included in the first input includes a second movement in a second direction with a second magnitude, moving the first object to a second position, different from the respective position and the first position, in accordance with the second direction and the second magnitude of the second movement.

After moving the first object in accordance with the movement included in the first input, the computer system detects (16012) an end of the first input. In response to detecting the end of the first input (e.g., a depinch input while performing an air pinch gesture, a lift off gesture, or another input indicating an end of the gesture) and in accordance with a determination that the first input ended without meeting first criteria (e.g., without meeting a distance and/or magnitude threshold), the computer system restores (16016) display of the first object at the respective position (e.g., the first object snaps back to the first position) after the first input has ended. In response to detecting the end of the first input (e.g., a depinch input while performing an air pinch gesture, a lift off gesture, or another input indicating an end of the gesture) t and in accordance with a determination that the first input ended after meeting the first criteria (e.g., after the predetermined movement threshold has been reached), the computer system maintains (16018) display of the first object at a position (e.g., the first position, the second position, or another position that is the position of the first object at the time that the end of the first input was detected) that is different from the respective position.

In some embodiments, the first object is part of a collection or an arrangement of objects. In some embodiments, if the first input meets the first criteria, the first input is recognized by the computer system as a pluck gesture that is described in more detail herein with reference to method 15000. When the first input meets the first criteria, the first object enters a "pluckable" state. In the "pluckable" state the first object can be removed from the arrangement of the plurality of icons in response to further inputs directed to the first object (e.g., further movement towards the viewpoint of the user, lateral or vertical movement, or a combination of movement towards the viewpoint of the user, lateral movement and/or vertical movement). For example, as described herein with reference to FIGS. 10F-10H, if an end of an air pinch gesture that holds a selected object such as object O5 1010 is released prior the movement of the hand towards the user meets a threshold required to enter the "pluckable" state, e.g., while object O5 1010 is in the "peek" state, object O5 1010 snaps back to a position object O5 1010 was in prior detection of the movement of the hand towards the user, and if the end of the air pinch gesture is detected after the movement of the hand towards the user meets a threshold required to enter the "pluckable" state, position of object O5 1010 is maintained, as described herein with reference to FIGS. 101-10K.

In some embodiments, while the view of a three-dimensional environment is visible via the display generation component, the computer system detects, via the one or more input devices, a first selection input (e.g., a gaze input optionally in combination with an air pinch gesture, or in combination with an air pinch gesture maintained for more than a predetermined amount of time (e.g., long pinch)) directed to the first object in the three-dimensional environment, wherein the movement directed to the first object and included in the first input is detected while the first object is selected as a result of the first selection input. For example, while user 10002's gaze is directed to object O5 1010 in FIG. 10F (e.g., thereby being a target of user 10002's inputs as illustrated by cursor 1034), computer system 101 detects a computer system 101 detects an air pinch gesture performed with hand 10020 and, in response, the computer system 101 selects object O5 1010. In some embodiments, a visual indication is provided that the first object is selected in response to the first selection input. For example, the visual indication includes popping the first object out slightly away from the virtual surface and towards a viewpoint of the user (e.g., as illustrated in FIG. 10G), enlarging the first object, or displaying a selection ring around the first object. Providing a visual indication that a target object from a collection of objects is selected makes the user-device interaction more efficient by providing visual feedback to the user that the user's input is successfully recognized by the system, thereby guiding the user when plucking out or dragging an object out of a collection of objects in a mixed-reality three-dimensional environment.

In some embodiments, while the view of a three-dimensional environment is visible via the display generation component, and prior to detecting the movement (e.g., an air gesture performed by a user's hand or a controller device) directed to a first object, the computer system detects, via the one or more input devices, a selection input (e.g., a gaze input optionally in combination with an air pinch gesture, or in combination with an air pinch gesture maintained for more than a predetermined amount of time (e.g., long pinch)) directed to the first object (e.g., the first object is included in an arrangement of a plurality of objects optionally displayed on a virtual surface). In response to detecting the selection input and in accordance with a determination that the selection input is a first type of selection input (e.g., a pinch gesture optionally combined with a gaze input directed at the first object), the computer system selects the first object (e.g., the first object is put into focus or becomes the currently active object). In response to detecting the selection input and in accordance with a determination that the selection input is a second type of selection input (e.g., a long pinch gesture, where the pinch is maintained), the computer system displays a visual indication (e.g., the visual indication includes enlarging the first object; displaying a preview of content of the first object; displaying a selection ring around the first object, and/or moving or popping out the first object in a direction towards a viewpoint of a user) that the first object is movable in the three-dimensional environment (e.g., removable from among an arrangement of a plurality of objects with a continuation of the selection input directed to the first object that includes movement of the selection input). For example, in FIGS. 10C, the computer system displays a context menu 1022 in response to a long pinch selection input of object O5 1010 detected in the scenario of FIGS. 10B, and the computer system selects object O5 1010 in FIG. 10F (optionally displaying visual feedback that the object has been selected, such as enlarging object O5 1010 or displaying a selection ring around object O5 1010). In some embodiments, a first type of visual indication is provided when the first object is selected in response to a first type of selection input, and a second type of visual indication is provided when the first object is selected in response to the second type of selection input. Providing a first type of visual indication in response to a first type of selection input and a second type of visual indication in response to a second type of selection input makes the user-device interaction more efficient by providing visual feedback when the target object is selected and when the target object enters a state in which the target object can be pulled out from the collection of objects, thereby guiding the user when plucking out or dragging an object out of a collection of objects in a mixed-reality three-dimensional environment In some embodiments, the first selection input is a long selection input (e.g., a long pinch, where a pinch gesture is maintained for a predetermined amount of time optionally while a gaze of a user is directed at the first object) (e.g., as described herein with reference to FIGS. 10B-10C). Using a long selection input to initiate a drag and drop operation with respect to a target object in a collection of objects helps disambiguate the user's intent to remove a target object from the collection of objects, or to perform a different operation with respect to the target object or the collection of objects, thereby making the user-device interaction more efficient when interacting with objects in a mixed-reality three-dimensional environment.

In some embodiments, in response to detecting the long selection input, the computer system displays a menu of control options (e.g., a context menu, such as context menu 1022 in FIG. 10C) associated with the first object (e.g., option to share the first object, option to delete the first object, option to copy the first object, option to remove the first object from the arrangement of the plurality of objects, option to designate the first object as favorite, and/or other control options associated with the first object). For example, in FIGS. 10C, the computer system displays a context menu 1022 in response to a long pinch selection input of object O5 1010 detected in the scenario of FIG. 10B. While the context menu 1022 in FIG. 10C is displayed, object O5 1010 can be dragged out of the collection of objects in virtual region 1020 in response to further inputs. Displaying a context menu for performing operations with respect to a selected object in a collection of objects in response to a long selection input provides visual feedback to the user that the selected object can be dragged and dropped and provides an efficient way to perform additional operations with respect to the selected object, making the user-device interaction more efficient by reducing the number of errors, accidental input, and the time needed to perform actions with respect to the selected object.

In some embodiments, while the menu of control options is displayed at a third position and the first object is displayed at a fourth position, the computer system detects a respective input directed to the first object, wherein the respective input includes movement in one or more directions. In response to detecting the respective input, the computer system moves the first object to an updated position in accordance with the movement in the one or more directions, wherein the movement of the first object to the updated position changes a position of the first object relative to the menu (e.g., moving the first object while maintaining display of the menu of controls options in the third position, or moving the first object more than the menu of controls is moved so that a distance between or a relative angle between the first object and the menu changes as the first object moves). For example, in response to movement inputs directed to object O5 1010 in FIGS. 10C, the context menu 1022 stays put or moves less than the object O5 1010 (e.g., and any content preview displayed therein) as object O5 1010 moves in response to the movement inputs. In some embodiments, the display of the context menu is maintained in accordance with a determination that the respective input does not meet threshold amount of movement criteria (e.g., before the computer system recognizes the respective input as a pluck gesture). In accordance with a determination that the respective input meets threshold amount of movement criteria (e.g., the computer system recognizes the respective input as the pluck gesture), the context menu ceases to be displayed, and the first object is removed from the arrangement of objects. Changing a position of the selected object relative to the context menu as the selected object is being dragged provides visual feedback to a user that the system recognizes the initiated drag and drop operation with respect to the selected object, thereby making the user-device interaction more efficient by reducing unintended inputs and assisting the user when interacting with an object in a collection of objects in a mixed-reality three-dimensional environment.

In some embodiments, the movement directed to the first object includes a movement in a direction towards a viewpoint of the user. In some embodiments, the first object is included in an arrangement of a plurality of objects displayed on a virtual surface, and the movement towards the viewpoint of the user is movement away from the virtual surface that is substantially perpendicular to the virtual surface (e.g., for a virtual surface that faces toward the viewpoint of the user). For example, while object O5 1010 is selected (e.g., in response to an air pinch gesture) in FIG. 10F, the computer system detects movement in the direction towards the viewpoint of the user, and moves object O5 1010 towards the viewpoint of the user, as illustrated in in FIG. 10G. Using hand movement towards a viewpoint of the user as a precondition to initiating a pluck operation (or a drag operation) with respect to the selected object makes the user-device more efficient by helping disambiguate the user's intent to pull out the object or to perform a different operation with respect to the object or the collection of objects, thereby reducing the number of errors, accidental input, and/or unwanted relocations of the selected object visible in a mixed-reality three-dimensional environment.

In some embodiments, in response to detecting the movement directed to the first object, the computer system tilts the first object based on a direction of the movement directed to the first object (e.g., if the movement is directed towards a viewpoint of a user, the first object is tilted slightly towards the user). For example, in conjunction with object O5 1010 being further moved toward user 10002, object O5 1010 is tilted in the direction in which object O5 1010 is being pulled, as illustrated in FIG. 10I. In some embodiments, the first object is tilted in a direction in which the first object is being pulled or dragged (e.g., the first object is angled to face toward the right if the movement directed to the first object is toward the right of the viewpoint of the user, downward if the movement directed to the first object is toward the viewpoint of the user and downward, and/or other tilt direction(s)). Tilting and/or changing orientation of the selected object based on a direction in which the selected object is being pulled provides continued visual feedback and/or guides the user in removing the selected object from the collection of objects and relocating the selected object in a mixed-reality three-dimensional environment.

In some embodiments, the first object tilts in (e.g., toward) the direction of the movement directed to the first object (e.g., to visually indicate a direction in which the first object is being moved). For example, in conjunction with object O5 1010 being further moved toward user 10002, object O5 1010 is tilted in the direction in which object O5 1010 is being pulled, as illustrated in FIGS. 10I-10J. In some embodiments, tilting the first object in a direction of the respective movement is performed according to a predetermined physics model that simulates movement of the first object as though the first object is connected to the virtual surface via a spring or a rubber band, including tilting in the direction of the respective movement (e.g., up or down and/or to the left or to the right). Tilting and/or changing orientation of the selected object to face a direction in which the selected object is being pulled provides continued visual feedback and/or guides the user in removing the selected object from the collection of objects and relocating the selected object in a mixed-reality three-dimensional environment.

In some embodiments, in response to detecting the movement directed to the first object, the computer system moves the first object (or a preview of the first object) at a decreasing speed as the movement included in the first input gets closer to a threshold amount of movement. For example, from the "peek" state in FIG. 10G to the "pluckable" state in FIGS. 101, object O5 1010 appears to resist the pulling of object O5 1010 (e.g., as if the selected object is attached to the virtual surface by a rubber band) towards the viewpoint of user 10002. In some embodiments, the first object appears to resist continued movement in the same direction. For example, for a first amount of movement (e.g., "x" amount) of the hand before the threshold amount of movement is reached, the first object is moved a second amount of movement (e.g., "y" amount), and for further movement of the hand by the same first amount, before the threshold amount of movement is reached (e.g., "x" amount), the first object is moved a third amount of movement (e.g., "z" amount), where the third amount of movement is less than the second amount of movement (e.g., "z" is less than "y"). The first object visually appears to resist a pulling gesture, such that the first object appears to move with greater difficulty, more slowly, or less as the user's hand moves closer to the threshold amount of movement. In some embodiments, the threshold amount of movement is used as a condition to activate a pluckable state for the first object. Providing a visual effect that simulates resistance when the selected object moves closer to the threshold amount of movement (e.g., as if the selected object is attached to a virtual surface by a rubber band), provides visual feedback to a user that further movement is needed to complete a drag and drop operation with respect to the selected object, thereby making the user-device interaction more efficient by reducing unintended inputs and the number of inputs needed to complete a drag and drop operation in a mixed reality three-dimensional environment.

In some embodiments, the movement included in the first input includes a third movement in a third direction with a third magnitude. In the method 16000, before detecting that the first input meets the first criteria and in response to detecting the movement directed to the first object, the computer system moves the first object to a fifth position different from the respective position in accordance with the third direction and the third magnitude of the third movement. After moving the first object to the fifth position in accordance with the third direction and the third magnitude of the third movement, the computer system detects a second input that includes movement (e.g., continuous or further movement, such as where the second input is a continuation of the first input) directed to the first object. In response to detecting the second input that includes a respective amount of movement directed to the first object and in accordance with a determination that the movement included in the second input includes movement in a direction that is different from the third direction, the computer system moves the first object by a first amount (e.g., moving the first object from the fifth position to a sixth position different from the fifth position in accordance with the direction of the second input). In response to detecting the second input that includes a respective amount of movement directed to the first object and in accordance with a determination that the movement included in the second input includes movement in the third direction, the computer system moves the first object by a second amount that is less than the first amount (e.g., moving the first object from the fifth position to a seventh position different from the fifth position in accordance with the third direction, wherein the sixth position is further away from the fifth position than the seventh position is from the fifth position). In some embodiments, once a selected object is stretched or pulled in one direction, the selected object resists further movement in the same direction more than it resists movement in a different direction (e.g., as if the selected object is attached to the virtual surface by a rubber band). For example, after object O5 1010 enters the "peek" state in FIG. 10G in response to pulling object O5 1010 towards the viewpoint of the user, object O5 1010 appears to resist further pulling of object O5 1010 towards the viewpoint of the user more than pulling of object O5 1010 in a lateral or vertical direction. Providing a visual effect that simulates resistance of the selected object when the object is being pulled, where the strength of the simulated resistance is based on the direction in which the selected object is being pulled, provides visual feedback to a user of the extent to which the selected object is successfully pulled and/or the progress towards the threshold in which the selected object enters a pluckable state and/or is successfully removed from the collection of objects, thereby making the user-device interaction more efficient by reducing unintended inputs and the number of inputs needed to pull or pluck out an object from a collection of objects.

In some embodiments, in response to detecting the movement directed to the first object of the first input and in accordance with a determination that the movement is substantially horizontal and parallel to a virtual surface (e.g., on which the first object is positioned), the computer system moves the first object horizontally in a leftward or rightward direction in accordance with direction of the movement. For example, in FIGS. 10J-10K, object O5 1010 is moved in the leftward direction in response to lateral movement of hand 10020 from location 1101c to location 1101 (via location 1101d) in FIG. 10K. In some embodiments, in response to detecting the movement directed to the first object of the first input and in accordance with a determination that the movement is substantially vertical and parallel to the virtual surface, the computer system moves the first object vertically in an upward or downward direction in accordance with direction of the movement. For example, in FIGS. 10O-10P, object O5 1010 is moved in the upward direction in response to vertical movement of hand 10020 from location 1101a to location 1101 (via location 1101b) in FIG. 10P. In some embodiments, in response to detecting the movement directed to the first object of the first input and in accordance with a determination that the movement is substantially perpendicular to the virtual surface, the computer system moves the first object in a direction substantially perpendicular to the virtual surface in accordance with direction of the movement. For example, in FIG. 10G, in response to the detection of the movement of hand 10020 from previous location 1101a (which corresponds to location 1101 in view 1040 of FIG. 10F) to location 1101 in FIG. 10G towards the viewpoint of user 10002 while object O5 1010 is selected, object O5 1010 moves towards the viewpoint of the user 10002. In some embodiments, the first object can be pulled in different directions in the mixed-reality three-dimensional environment, including left, right, up, down, and forward (e.g., towards a viewpoint of the user and away from the virtual surface on which the first object is displayed). In some embodiments, visual feedback is provided when the first object is pulled, including by changing orientation, position, and size of the selected object and/or tilting the selected object toward a direction in which the selected object is being pulled, thereby making the user-device interaction more efficient by reducing unintended inputs and assisting the user when interacting with an object in a collection of objects in a mixed-reality three-dimensional environment. Enabling movement of a selected object in all directions in a mixed-reality three-dimensional environment provides the user with more control over the mixed-realty three-dimensional environment, thereby reducing the number of inputs and/or the amount of time needed to interact with objects in the three-dimensional environment.

In some embodiments, in accordance with a determination that the movement that is substantially horizontal and parallel to the virtual surface meets a first threshold amount of movement, the computer system forgoes restoring display of the first object at the respective position after the first movement input has ended; (e.g., the first object maintains its current position as opposed to snapping back to the first position). In some embodiments, if the first movement input ends without the movement that is substantially horizontal and parallel to the virtual surface meeting the first threshold amount of movement, the first object snaps back to the first position. In accordance with a determination that the movement that is substantially vertical and parallel to the virtual surface meets the first threshold amount of movement, the computer system forgoes restoring display of the first object at the respective position after the first movement input has ended. In accordance with a determination that the movement that is substantially perpendicular to the virtual surface meets a second threshold amount of movement, the computer system forgoes restoring display of the first object at the respective position after the first movement input has ended, wherein the second threshold amount of movement is shorter than (e.g., less movement than) the first threshold amount of movement. For example, once object O5 1010 has entered the "pluckable" state in FIGS. 101, if object O5 1010 is released (e.g., end of the input pulling object O5 1010 is detected), object O5 1010 maintains respective location as opposed to snapping back to its position in virtual region 1020. In some embodiments, the first object is included in a collection of objects, and in accordance with determination that the movement directed to the first object of the first input meets the first threshold amount of movement or the second threshold amount of movement, the first object is removed from the collection of objects (e.g., the first object is plucked out, such that the first object is no longer included in the collection of objects). Using a shorter threshold amount of movement as a condition to complete a pluck operation with respect to a selected object of a collection of objects if the movement is in a direction towards the user (e.g., away from the virtual surface), and a longer threshold amount of movement if the movement is in a lateral or vertical direction, provides an ergonomically improved input mechanism for removing an object from the collection of objects in a mixed-reality three-dimensional environment, thereby making the user-device interaction more efficient.

In some embodiments, the first threshold amount of movement is based on amount of movement in one or more directions relative to the respective position in the three-dimensional environment. In some embodiments, the second threshold amount of movement is based on amount of movement in one or more directions relative to the respective position in the three-dimensional environment. For example, while object O5 1010 is in the "peek" state as in FIG. 10G, further movement towards the viewpoint of the user or in other directions, such as lateral, vertical, or a combination thereof, can be used as a condition to trigger the pluckable state for object O5 1010. In some embodiments, progress towards meeting a movement threshold used as condition for plucking out a selected object is combined from movements of a user's hand in multiple directions. Using combined movements in multiple directions towards meeting the threshold for relocating the selected object allows some degree of imprecision of the hand movement, thereby reducing the number of inputs and/or the amount of movement needed to relocate a selected object in the mixed reality three-dimensional environment.

In some embodiments, restoring display of the first object at the respective position after the first movement input has ended includes animating movement of the first object to the respective position, including snapping the first object back to the respective position in a virtual surface. For example, the snapping back object of O5 1010 as illustrated in FIGS. 10G-10H is animated. In some embodiments, restoring display of the first object at the respective position includes animating movement of the first object from a position that is different from the respective position back to the respective position (e.g., movement away from the user and towards the virtual surface is animated). In some embodiments, the animation includes shrinking the first object back to the size the first object was in, removing a shadow that was being cast by the first object, reversing some or all tilting that was being displayed, and/or changing orientation of the first object back to face the user, or otherwise reversing changes made with respect to the first object in response to the movement included in the first input. In some embodiments, the snapping movement of the first object towards the virtual surface slows down after travelling a predetermined amount with the increased speed. In some embodiments, the speed of movement of the first object towards the virtual surface is increased during an initial portion and slowed down as the first object gets closer to the virtual surface. Snapping the selected object back to its original position in the three-dimensional environment (e.g., on a virtual surface and/or in a collection of objects on the virtual surface) provides visual feedback that the selected object is not successfully relocated (e.g., due to the hand movement not meeting the criteria for relocating the selected object) and helps disambiguate between inputs intended to relocate the selected object and other user inputs with respect to the selected object, thereby making the user-device interaction more efficient by reducing unintended inputs and the number of inputs needed to relocate a selected object in the mixed reality three-dimensional environment.

In some embodiments, snapping the first object back to the respective position includes moving the first object in a direction substantially parallel to the virtual surface. In some embodiments, the first object is in included in an arrangement of a plurality of objects displayed on the virtual surface, and the first object is snapped back to the respective position in the arrangement of the plurality of objects included in the virtual surface. For example, if object O5 1010 is moved laterally while object O5 1010 is in the "peek" state as in FIG. 10G, this lateral movement is reversed when object O5 1010 snaps back. In some embodiments, restoring display of the first object at the respective position includes reversing lateral or vertical movement of the first object. Snapping the selected object back to its original position on a virtual surface, including moving the first object in the direction parallel to the virtual surface, provides visual feedback that the selected object is not successfully relocated (e.g., due to the hand movement not meeting the criteria for relocating the selected object) and helps disambiguate between inputs intended to relocate the selected object and other user inputs with respect to the selected object, thereby making the user-device interaction more efficient by reducing unintended inputs and the number of inputs needed to relocate a selected object in the mixed reality three-dimensional environment.

In some embodiments, snapping the first object back to the respective position includes moving the first object in a direction substantially perpendicular to the virtual surface (e.g., or in a direction that is away from a viewpoint of the user). For example, the movement towards the viewpoint of the user that caused object O5 1010 to enter the "peek" state is reversed when object O5 1010 snaps back (e.g., FIG. 10G). In some embodiments, restoring display of the first object at the respective position includes animating movement of the first object away from the user and towards a virtual surface in which the first object was located prior to moving the first object from the respective position. Snapping the selected object back to its original position on a virtual surface, including moving the first object towards the virtual surface and away from a viewpoint of the user, provides visual feedback that the selected object is not successfully relocated (e.g., due to the hand movement not meeting the criteria for relocating the selected object) and helps disambiguate between inputs intended to relocate the selected object and other user inputs with respect to the selected object, thereby making the user-device interaction more efficient by reducing unintended inputs and the number of inputs needed to relocate a selected object in the mixed reality three-dimensional environment.

In some embodiments, snapping the first object back to the respective position includes tilting the first object relative to the virtual surface (e.g., restoring the first object to an orientation that is substantially parallel to the virtual surface). For example, tilting of object O5 1010 that was caused by movement towards the viewpoint of the user FIG. 10G is reversed when object O5 1010 snaps back. Snapping the selected object back to its original position on a virtual surface, including tilting the first object relative the virtual surface, provides visual feedback that the selected object is not successfully relocated (e.g., due to the hand movement not meeting the criteria for relocating the selected object) and helps disambiguate between inputs intended to relocate the selected object and other user inputs with respect to the selected object, thereby making the user-device interaction more efficient by reducing unintended inputs and the number of inputs needed to relocate a selected object in the mixed reality three-dimensional environment.

In some embodiments, aspects/operations of methods 12000, 13000, 14000, 15000, 17000, 22000, 23000, 24000, 25000, 27000, and 29000 may be interchanged, substituted, and/or added between these methods. For brevity, these details are not repeated here.

FIG. 17 is a flow diagram of an exemplary method 17000 for using a pluck gesture to launch applications in a mixed reality three-dimensional environment, in accordance with some embodiments. In some embodiments, method 17000 is performed (17002) at a computer system (e.g., computer system 101 in FIG. 1A) that is in communication with a display generation component (e.g., display generation component 120 in FIGS. 1A, 3, and 4, a heads-up display, a head-mounted display (HMD), a display, a touchscreen, a projector, a tablet, a smartphone, and other displays) and with one or more input devices (e.g., one or more optical sensors and/or eye-tracking devices). In some embodiments, the method 17000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 17000 are, optionally, combined and/or the order of some operations is, optionally, changed.

As described herein, method 17000 provides an improved input mechanism for launching an application in a mixed-reality three-dimensional environment. A pluck gesture is used to launch an application from a menu of application icons (e.g., a home menu) displayed in a virtual surface in the three-dimensional environment. The pluck gesture is an air gesture that includes movement of a hand towards a viewpoint of the user while a pinch is maintained and while a respective application icon is selected. When the pluck gesture reaches a threshold amount of movement towards the viewpoint of the user, an application that corresponds to the selected application icon is launched. Using the pluck gesture to launch an application from a menu of application icons disambiguates the user's intent to launch the application or to scroll the menu of application icons, and/or to perform a different operation with respect to the application icon, thereby reducing accidental or unintended inputs and reducing the number of inputs and the amount of time needed to launch an application in a three-dimensional environment. Further, using an air pluck gesture instead of a hardware controller or other input device makes user interaction with the application icons in the menu more ergonomic and efficient.

In the method 17000, while a view of a three-dimensional environment is visible via the display generation component, the computer system displays (17004) an arrangement of a plurality of application icons (e.g., icons for launching applications) in the three-dimensional environment. In some embodiments, the three-dimensional environment is a three-dimensional environment that includes one or more computer-generated portions and optionally one or more pass-through portions. In some embodiments, the arrangement of the plurality of application icons is displayed in a virtual plane or in virtual region having designated borders, e.g., height and/or length, where a collection of items of the same type are displayed, optionally, at the same depth from a viewpoint of a user. Optionally, borders of the virtual region are not visible. In some embodiments, the application icons are arranged in a grid, where the grid can be of one or more dimensions. For example, in some embodiments, the application icons are displayed in an array (e.g., 1×N grid, an M×N grid, a honeycomb pattern, or other spatial arrangements or layout). While displaying the arrangement of the plurality of application icons in the view of the three-dimensional environment, the computer system detects (17006), via the one or more input devices, a first movement input directed to the arrangement of the plurality of application icons.

In response to (17008) detecting the first movement input directed to the arrangement of the plurality of application icons and in accordance with a determination that the first movement input includes first movement in one or more directions that are substantially parallel to the arrangement of the plurality of application icons and that the first movement meets first criteria (e.g., the first movement exceeds a threshold amount of movement in the one or more directions that are substantially parallel to the arrangement of the plurality of application icons, and/or the first movement is not preceded by more than a threshold amount of movement in directions that are substantially perpendicular to the arrangement of the plurality of application icons that are optionally included in a first virtual region), the computer system scrolls (17010) the arrangement of the plurality of application icons, including revealing a first set of application icons that were not visible prior to detecting the first movement input. For example, as described herein with reference to FIGS. 11J-11L, in response to detecting the movement of hand 10020 leftward substantially parallel to home user interface 1120, application icons in home user interface 1120 are scrolled.

In response to (17008) detecting the first movement input directed to the arrangement of the plurality of application icons and in accordance with a determination that the first movement input is directed to a first application icon in the plurality of application icons and that the first movement input includes second movement in a direction that is substantially perpendicular to the arrangement of the plurality of application icons and that the second movement meets second criteria (e.g., the second movement exceeds a threshold amount of movement in the perpendicular direction, and/or the second movement is not preceded by more than a threshold amount of movement in directions that are substantially parallel to the arrangement of the plurality of application icons), the computer system launches (17012) a first application corresponding to the first application icon in the three-dimensional environment. For example, as described herein with reference to FIGS. 11A-11F, in response to detecting the movement of hand 10020 pulling application icon A5 1070, and in accordance with the movement of hand 10020 being substantially perpendicular to home user interface 1120 and meeting a "pluck" threshold amount of movement, an application corresponding to application icon A5 1070 is launched, and user interface 1070' of the launched application is displayed.

In some embodiments, the arrangement of the plurality of application icons corresponds to a home user interface for launching applications via inputs directed to one or more of the plurality of application icons. In some embodiments, in response to launching the first application, the home user interface including the arrangement of the plurality of application icons is hidden from display. In some embodiments, the home user interface is invoked in response to an air gesture or a press on a physical button. In some embodiments, launching includes starting an application that was not previously running (e.g., where the state of the application is optionally determined based on stored information with respect to running the application); opening or redisplaying an application that was previously running in the background (e.g., minimized or otherwise hidden); opening a new user interface of the application or a user interface from one or more already opened and visible user interfaces of the application; or, otherwise bringing a user interface of the application to a foreground. In some embodiments, a pluck gesture that is directed to the first application is used to launch the first application (e.g., as described in more detail herein with reference to method 15000.

In some embodiments, launching the first application corresponding to the first application icon in the three-dimensional environment includes displaying a user interface of the first application at a first position in the three-dimensional environment that is selected in accordance with one or more characteristic values of the first movement input (e.g., based on the movement direction(s), speeds, acceleration, movement paths, start location, movement distances, and/or other movement characteristics of the first movement input). For example, in FIG. 11F, user interface 1070' of the application corresponding to application icon A5 is displayed at a location where application icon A5 1070 is dropped. Launching an application at a location determined based on an air gesture, such as a pluck gesture, instead of launching the application at a predetermined location, provides more control over organization of the mixed-reality three-dimensional environment (e.g., reducing visual clutter of open application windows) without the need to use additional input devices, thereby making the user-device more efficient and ergonomic.

In some embodiments, the one or more characteristic values of the first movement input includes one of a speed and direction of the first movement input. In some embodiments, the first application is launched in response to an air fling gesture that is directed to the first application icon, where the movement is sufficiently long (e.g., travels at least a predetermined amount of distance) and/or sufficiently fast (e.g., does not take more than a predetermined amount of time to travel the predetermined amount of distance). For example, in FIG. 11F, user interface 1070' of the application corresponding to application icon A5 can optionally be displayed at a location determined based on a speed and/or direction of an air fling gesture (e.g., as opposed to a pluck gesture that involves movement to towards the user followed by lateral movement or a pluck gesture that primarily involves movement towards the user). Launching an application at a location determined based on an air fling gesture (e.g., in accordance with direction, speed, and/or velocity of the fling gesture), instead of launching the application at a predetermined location or at a location where the application icon that corresponds to the application is dropped, provides more control over organization of the mixed-reality three-dimensional environment (e.g., reducing visual clutter of open application windows) without the need to use additional input devices, thereby making the user-device more efficient and ergonomic In some embodiments, the one or more characteristic values of the first movement input includes an end location of the first movement input. For example, in FIG. 11F, user interface 1070' the application corresponding to application icon A5 is displayed at a location where application icon A5 1070 is dropped. Launching an application at a location determined based on a drop location of a pluck gesture (e.g., an air drag and drop gesture), instead of launching the application at a predetermined location, provides more control over organization of the mixed-reality three-dimensional environment (e.g., reducing visual clutter of open application windows) without the need to use additional input devices, thereby making the user-device more efficient and ergonomic.

In some embodiments, launching the first application corresponding to the first application icon in the three-dimensional environment includes displaying a first user interface of the first application. In the method 17000, the computer system detects a selection input directed to a second application icon in the plurality of application icons (e.g., an air pinch gesture, optionally performed in conjunction with a gaze input directed at the second application icon; an air tap, a double tap, a long pinch, and/or other type of selection input). In response to detecting the selection input directed to the second application icon, the computer system launches a second application corresponding to the second application icon in the three-dimensional environment, including displaying a second user interface of the second application without displaying the first user interface of the first application. For example, if in the scenario of FIG. 11I, a selection input is directed to an application icon corresponding to a respective application different from the applications for which user interface 1070' and 1080' are displayed, a user interface of the respective application is displayed in the three-dimensional environment 10000' without displaying user interfaces 1070' and 1080'. In some embodiments, when the first application is launched, the home user interface including the arrangement of the plurality of application icons ceases to be displayed in conjunction with displaying the first user interface of the first application. In some embodiments, the home user interface is reinvoked prior to detecting the selection input directed to the second application icon. In some embodiments, one or more user interfaces of one or more applications are visible in the three-dimensional environment prior detecting the first movement input directed to the arrangement of application icons (e.g., directed to the home user interface). In some embodiments, when the home user interface is invoked, the one or more user interfaces of the one or more applications cease to be displayed. In some embodiments, when the first application is launched (e.g., the first application is launched from the home user interface), the first user interface of the first application is displayed without displaying the one or more user interfaces of the one or more applications. In some embodiments, when the first application is launched, the first user interface of the first application is displayed in conjunction with redisplaying the one or more user interfaces of the one or more applications (optionally the one or more user interfaces of the one or more applications are redisplayed at the same positions or relative positions the one or more user interfaces were in before launching the first application and/or before displaying the home user interface including the arrangement of the plurality of application icons). In some embodiments, while displaying the one or more user interfaces of the one or more applications, a request to display the home user interface is detected. In response to detecting the request to display the home user interface, the home user interface is displayed concurrently with the already displayed one or more user interfaces of the one or more applications, where the one or more user interfaces of the one or more applications are optionally displayed with reduced prominence (e.g., reduced opacity and/or brightness). Launching an application in conjunction with ceasing to display other visible applications in response to detecting a (e.g., single) selection input (e.g., an air pinch gesture directed to a respective application icon) reduces the number and extent of inputs needed to unclutter a view of the three-dimensional environment and make room for previously undisplayed application, thereby making the user-device interaction more efficient and ergonomic.

In some embodiments, the computer system detects a user input directed to a third application icon in the plurality of application icons. In response to detecting the user input directed to the third application icon and in accordance with a determination that the user input directed to the third application icon corresponds to a selection input (e.g., an air tap, a double tap, a long pinch, and/or other selection input), the computer system launches a third application corresponding to the third application icon in the three-dimensional environment, including displaying a third user interface of the third application at a predetermined location (e.g., a location determined by the system as opposed to a user-defined location or location determined based on the user input). For example, in response to detecting a selection input directed to application icon A5 1070 in FIG. 11A, the application corresponding to application icon A5 is launched and application user interface 1070' of the application corresponding to application icon A5 is displayed in place of home user interface 1120 in view 10000', as illustrated in FIG. 11H. In some embodiments, the predetermined location at which the third user interface is displayed has a respective spatial relationship to the home user interface that is described in more detail herein with reference to method 14000. In response to detecting the user input directed to the third application icon and in accordance with a determination that the user input directed to the third application icon corresponds to a second movement input that includes movement in a direction that is substantially perpendicular to the arrangement of the plurality of application icons and that the second movement input meets the second criteria, the computer system launches the third application corresponding to the third application icon, including displaying the third user interface of the third application at a second position in the three-dimensional environment that is selected in accordance with one or more characteristic values of the second movement input (e.g., a user-defined location and/or a location that is based on one or more of the movement direction(s), speeds, acceleration, movement paths, start location, movement distances, and/or other movement characteristics of the second movement input). For example, FIG. 11F illustrate an example of launching an application corresponding to application icon A5 and displaying the user interface 1070' of the application corresponding to application icon A5 at a location based on a drop location of application icon A5. In some embodiments, a selection input is a different type of input than a movement input that includes movement in a direction that is substantially perpendicular to the arrangement of the plurality of application icons (e.g., a selection input is a stationary input and/or does not include movement in one or more directions, such as a direction that is substantially perpendicular). Launching an application and displaying the application at a predetermined location (e.g., a default location or location determined by the system) in response to detecting a selection input (e.g., air pinch), and at a user specified location (e.g., based on a detected drop location) in response to detecting a pluck gesture provides more control over organization of the mixed-reality three-dimensional environment (e.g., reducing visual clutter of open application windows) without the need to use additional input devices, thereby making the user-device more efficient and ergonomic.

In some embodiments, while displaying one or more user interfaces of one or more applications, the computer system detects a user input directed to a fourth application icon in the plurality of application icons. In response to detecting the user input directed to the fourth application icon and in accordance with a determination that the user input directed to the fourth application icon corresponds to a selection input, the computer system launches a fourth application corresponding to the fourth application icon in the three-dimensional environment, including displaying a fourth user interface of the fourth application without displaying (e.g., after having ceased to display, or in conjunction with ceasing to display) the one or more user interfaces of the one or more applications (e.g., the user interface of the fourth application replaces the currently displayed user interfaces of other applications). For example, if in the scenario of FIG. 11I, a selection input is directed to an application icon corresponding to a respective application different from the applications for which user interface 1070' and 1080' are displayed, a user interface of the respective application is displayed in the three-dimensional environment 10000' without displaying user interfaces 1070' and 1080'. In response to detecting the user input directed to the fourth application icon and in accordance with a determination that the user input directed to the fourth application icon corresponds to a third movement input that includes movement in a direction that is substantially perpendicular to the arrangement of the plurality of application icons and that the third movement input meets the second criteria, the computer system launches the fourth application corresponding to the fourth application icon, including displaying the fourth user interface of the fourth application in the three-dimensional environment concurrently with displaying (e.g., while maintaining display or in conjunction with redisplaying) the one or more user interfaces of the one or more applications (e.g., user-defined location and/or a location that is based on one or more of the movement direction(s), speeds, acceleration, movement paths, start location, movement distances, and/or other movement characteristics of the second movement input). For example, in FIG. 11I, in response to a successful pluck gesture directed to application icon A5, application user interface 1070' of the application corresponding to application icon A5 is displayed in front of user interface 1080' of application A10 that was running in the background during the pluck gesture. Launching and displaying an application in conjunction with ceasing to display other visible applications in response to detecting a (e.g., single) selection input (e.g., an air pinch gesture), and displaying the application in addition to or concurrently with the other visible applications in response to a pluck gesture, provides more control over organization of the mixed-reality three-dimensional environment without the need to use additional input devices, thereby making the user-device more efficient and ergonomic.

In some embodiments, in response to detecting the first movement input directed to the arrangement of the plurality of application icons and in accordance with a determination that the first movement input is directed to the first application icon in the plurality of application icons and that the first movement input includes the second movement in the direction that is substantially perpendicular to the arrangement of the plurality of application icon, the computer system displays, prior to launching the first application, visual feedback (optionally continuously) indicating movement of the first application icon in the three-dimensional environment, including (e.g., sequentially) displaying a plurality of intermediate states of the visual feedback indicating movement of the first application icon through a plurality of intermediate positions in the three-dimensional environment. For example, FIG. 11G illustrates that application icon A5 1070 is pulled forward or towards user 10002 (optionally in conjunction with enlarging application icon A5 1070) and that application icons A1 1062, A2 1064, and A3 1066 are also pulled further towards user 10002 (optionally, in conjunction with tilting or changing orientation), relative to FIG. 11B. Providing continuous visual feedback during a pluck gesture that is used to launch the application from the menu of application icons makes the user-device interaction more efficient and reduces unintended inputs, erroneous inputs, and the inputs needed to launch an application by continuously guiding the user during the pluck gesture and provide feedback to the user on how the system responds to the user input.

In some embodiments, displaying the visual feedback includes moving the first application icon towards a viewpoint of a user (e.g., in accordance with second movement that pulls the first application icon towards the user or the viewpoint of the user). For example, FIG. 11G illustrates that application icon A5 1070 is pulled forward or towards user 10002 (optionally, in conjunction with enlarging application icon A5 1070) during the pluck gesture. Providing continuous visual feedback, including moving the selected application icon towards a viewpoint of the user during the pluck gesture, makes the user-device interaction more efficient and reduces unintended inputs, erroneous inputs, and the inputs needed to launch an application by continuously guiding the user during the pluck gesture and provide feedback to the user on how the system responds to the user input.

In some embodiments, displaying the visual feedback includes moving the first application icon in a first direction that is substantially parallel to the arrangement of the plurality of application icons, wherein the first application icon is moved in the first direction for no more than a predetermined threshold amount. In some embodiments, displaying the visual feedback also includes moving the first application icon in a second direction that is opposite of the first direction, wherein the first application icon is moved in the second direction for no more than the predetermined threshold amount. For example, while application icon A5 1070 is being pulled in a leftward direction, application icon A7 1070 flexes in the leftward direction, and while the application icon A5 1070 is being pulled in the rightward direction, the application icon A7 1070 flexes in the rightward direction. In some embodiments, the selected application icon flexes side to side in response to or in directions of respective movements, wherein the flexing is performed according to a predetermined physics model that simulates movement of the selected object as though the selected object is connected to the virtual surface via a spring or rubber band (e.g., as described in more detail herein with reference to method 16000). Providing a visual effect that simulates resistance when the selected application icon moves closer to the threshold amount of movement provides visual feedback to a user that further movement is needed to complete the application launch operation using the pluck gesture, thereby making the user-device interaction more efficient by reducing unintended inputs and the number of inputs needed to complete the application launch operation in a mixed reality three-dimensional environment using the pluck gesture.

In some embodiments, displaying the visual feedback includes moving a first set of application icons of the plurality of application icons based on the direction and a magnitude of the second movement included in the first movement input, wherein the first set of application icons is different from the first application icon. In some embodiments, application icons adjacent to the first application icon move in a direction towards a viewpoint of the user and optionally tilt in a direction of the second movement. For example, as described herein with reference to FIGS. 11B-11C, in conjunction with moving application icon A5 1070 towards the user during the pluck gesture, the computer system also moves adjacent application icons A4 1068, A6 1072, A2 1064, and A8 1076 toward the user (optionally, in conjunction with tilting or changing orientation). Shifting other application icons adjacent to the selected application icon based on magnitude and direction of a drag input (e.g., or a pluck gesture) provides additional and continuous visual feedback and guidance to the user during the drag gesture, thereby making the user-device interaction more efficient and reducing unintended inputs, erroneous inputs, and the number of inputs needed to launch an application.

In some embodiments, moving the first set of application icons includes moving a first subset of the first set of application icons (e.g., application icons that are near or adjacent the first application icon) in a direction towards a viewpoint of a user based on the direction and a magnitude of the second movement included in the first movement input. In some embodiments, the first subset of the first set of application icons is moved forward gradually as the second movement progresses. In some embodiments, the first subset of the first set of application icons is moved progressively more slowly relative to the second movement as the amount of movement of the second movement increases. For example, as described herein with reference to FIGS. 11B-11C, in conjunction with moving application icon A5 1070 towards the user during the pluck gesture, the computer system also moves adjacent application icons A4 1068, A6 1072, A2 1064, and A8 1076 toward the user (optionally, in conjunction with tilting or changing orientation). Moving application icons adjacent to the selected application icon forward gradually as the selected application icon is dragged or plucked toward the user or in different directions provides additional and continuous visual feedback and guidance to the user during the drag gesture, thereby making the user-device interaction more efficient and reducing unintended inputs, erroneous inputs, and the number of inputs needed to launch an application.

In some embodiments, moving the first set of application icons includes moving a second subset of the first set of application icons (e.g., application icons that are near the first application icon but not adjacent to the first application icon, such as icons separated from the first application icon by one or more other application icons) in a direction away from a viewpoint of a user based on the direction and a magnitude of the second movement included in the first movement input. In some embodiments, during the pluck gesture, some application icons move backwards (e.g., application icons A1 1062, A3 1066, A7 1074, and A9 1078, as described herein with reference to FIGS. 11B-11C). In some embodiments, the second subset of the first set of application icons is moved backward gradually as the second movement progresses. In some embodiments, the second subset of the first set of application icons is moved progressively more slowly relative to the second movement as the amount of movement of the second movement increases. Moving other application icons that are non-adjacent to the selected application icon backward gradually as the selected application icon is dragged or plucked toward the user or in the different directions provides additional and continuous visual feedback and guidance to the user during the drag gesture, thereby making the user-device interaction more efficient and reducing unintended inputs, erroneous inputs, and the number of inputs needed to launch an application.

In some embodiments, displaying the visual feedback includes moving the plurality of application icons according to a predetermined physics model that simulates movement of objects that are coupled with one or more flexible connections (e.g., the plurality of application icons move as if they are connected on fabric or via rubberbands). For example, in FIGS. 11B-11D application icons A1 1062-A9 1078 are moved according to a predetermined physics model that simulates movement of application icons A1 1062-A9 1078 that are coupled with one or more flexible connections (e.g., application icons A1 1062-A9 1078 move as if they are connected on fabric or via rubberbands). In some embodiments, moving an object as if it is connected to a rubberband refers to generating a simulated physical or pseud-physical reaction where an object will initially resist movement when an input is being applied and when the input ends the object snaps back with a speed that initially increases after the end of the input and then gradually decreases over time as the object returns to a target position such as an initial position. In some embodiments, the plurality of application icons are moved as the second movement progresses. In some embodiments, the plurality of application icons are moved progressively more slowly relative to the second movement as the amount of movement of the second movement increases. Moving application icons gradually, as if connected on fabric or via rubberbands, as the selected application icon is dragged or plucked toward the user or in the different directions provides additional and continuous visual feedback and guidance to the user during the drag gesture, thereby making the user-device interaction more efficient and reducing unintended inputs, erroneous inputs, and the number of inputs needed to launch an application.

In some embodiments, in response to detecting the first movement input directed to the arrangement of the plurality of application icons and in accordance with the determination that the first movement input includes the first movement in the one or more directions that are substantially parallel to the arrangement of the plurality of application icons and that the first movement meets the first criteria (e.g., the first movement exceeds a threshold amount of movement in the transverse directions, and/or the first movement is not preceded by more than a threshold amount of movement in directions that are substantially orthogonal to the first virtual region), the computer system maintains display of the plurality of application icons at a same distance away from a viewpoint of a user while scrolling the arrangement of the plurality of application icons. For example, as described herein with reference to FIGS. 11J-11L, application icons A1 1062-A12 1084 maintain distance away from the viewpoint of the user while being scrolled. In response to detecting the first movement input directed to the arrangement of the plurality of application icons and in accordance with a determination that the first movement input is directed to the first application icon in the plurality of application icons and that the first movement input includes the second movement in the direction that is substantially perpendicular to the arrangement of the plurality of application icons (e.g., towards a viewpoint of the user), the computer system moves, prior to the second movement meeting the second criteria, a second set of application icons in a direction that is substantially perpendicular to the arrangement of the plurality of application icons (e.g., some icons adjacent to the first application icon move in a direction towards the viewpoint of the user, and optionally other icons move in a direction away from the view point of the user). For example, as described herein with reference to FIGS. 11B-11C, application icons A4 1068, A6 1072, A2 1064, and A8 1076 are moved toward the user (optionally, in conjunction with tilting or changing orientation) during the pluck gesture. In some embodiments, when scrolling application icons in the menu, the application icons shift laterally without moving the application icons toward or away from a viewpoint of the user. In some embodiments, some application icons move toward the viewpoint of the user and other application icons move away from the viewpoint of the user when a selected application icon is plucked or dragged in a direction toward the user (e.g., to launch the application corresponding to the selected application icon). Maintaining distance of the application icons from the viewpoint of the user when scrolling, and moving application icons toward and away from the viewpoint of the user when using a pluck gesture directed at a selected application icon, makes the user-device interaction more efficient and reduces unintended inputs, erroneous inputs, and the inputs needed to launch an application by continuously guiding the user during a pluck input or a scroll input, thereby providing feedback to the user on how the system responds to the user input.

In some embodiments, moving the second set of application icons in the direction that is substantially perpendicular to the arrangement of the plurality of application icons includes moving a first subset of the second set of application icons (e.g., application icons that are near or adjacent the first application icon) in a direction towards the viewpoint of the user. In some embodiments, the first subset of the second set of application icons is moved forward gradually as the second movement progresses. In some embodiments, the first subset of the second set of application icons is moved progressively more slowly relative to the second movement as the amount of movement of the second movement increases. For example, as described herein with reference to FIGS. 11B-11C, during the pluck gesture, some application icons move forward (e.g., application icons A5 1070, A4 1068, A6 1072, A2 1064, and A8 1076). Moving application icons adjacent to the selected application icon forward gradually as the selected application icon is dragged or plucked toward the user or in different directions provides additional and continuous visual feedback and guidance to the user during the drag gesture, thereby making the user-device interaction more efficient and reducing unintended inputs, erroneous inputs, and the number of inputs needed to launch an application.

In some embodiments, moving the second set of application icons in the direction that is substantially perpendicular to the arrangement of the plurality of application icons includes moving a second subset of the second set of application icons (e.g., application icons that are near the first application icon but not adjacent to the first application icon, such as icons separated from the first application icon by one or more other application icons) in a direction away from the viewpoint of the user. In some embodiments, the second subset of the second set of application icons is moved backward gradually as the second movement progresses. In some embodiments, the second subset of the second set of application icons is moved progressively more slowly relative to the second movement as the amount of movement of the second movement increases. For example, as described herein with reference to FIGS. 11B-11C, during the pluck gesture, some application icons move forward (e.g., application icons A5 1070, A4 1068, A6 1072, A2 1064, and A8 1076) and some application icons move backwards (e.g., application icons A1 1062, A3 1066, A7 1074, and A9 1078). Moving other application icons that are non-adjacent to the selected application icon backward gradually as the selected application icon is dragged or plucked toward the user or in the different directions provides additional and continuous visual feedback and guidance to the user during the drag gesture, thereby making the user-device interaction more efficient and reducing unintended inputs, erroneous inputs, and the number of inputs needed to launch an application.

In some embodiments, in response to detecting the first movement input directed to the arrangement of the plurality of application icons and in accordance with the determination that the first movement input includes the first movement in the one or more directions that are substantially parallel to the arrangement of the plurality of application icons and that the first movement meets the first criteria (e.g., the first movement exceeds a threshold amount of movement in the transverse directions, and/or the first movement is not preceded by more than a threshold amount of movement in directions that are substantially orthogonal to the first virtual region), the computer system moves a third set of application icons in one or more directions that are substantially perpendicular to the arrangement of the plurality of application icons (e.g., toward and/or away from a viewpoint of the user), wherein the third set of applications are located at one or more edges of the arrangement of the plurality of application icons. For example, in FIG. 11K, during the scrolling input application icons at the leftmost and rightmost columns (e.g., or left and right edge) of home user interface 1120 move away from user 10002's viewpoint, as if application icons A1 1062-A12 1084 are sliding over a curvature during the scrolling input.

Further in response to detecting the first movement input directed to the arrangement of the plurality of application icons and in accordance with the determination that the first movement input includes the first movement in the one or more directions that are substantially parallel to the arrangement of the plurality of application icons and that the first movement meets the first criteria, the computer system maintains a fourth set of application icons at a same distance away from a viewpoint of a user, wherein the fourth set of application icons are located at a center of the arrangement of the plurality of application icons (e.g., away from and within the edges of the arrangement of the plurality of application icons). For example, during the scrolling input, application icons in the center (e.g., application icons A2 1064, A3 1966, A5 1070, A6 1072, A8 1076, and A9 1078) do not change their distance away from user 10002, where application icons at the edges of home user interface 1120 (e.g., application icons A1 1062, A4 1068, A7 1074 and application icons A10 1080, A11 1082, and A12 1084) change the distance away from user 10002 (e.g., FIG. 11K). In some embodiments, when scrolling application icons in the menu, the application icons in the middle or center section of the menu shift laterally without moving toward or away from a viewpoint of the user, and application icons at the edges of the menu shift or tilt as if sliding over a curved surface (e.g., thereby moving toward or away from the viewpoint of the user). In some embodiments, application icons near or adjacent to a selected application icon that is plucked or dragged in a direction toward the user move toward the viewpoint of the user and other application icons, which are near or adjacent to the application icons that move toward the user, move away from the viewpoint of the user when a selected application icon is plucked or dragged in a direction toward the user (e.g., to launch the application corresponding to the selected application icon). Maintaining distance, from a viewpoint of the user, of application icons in the middle section of the menu and shifting icons at the edges of the menu as if sliding over a curved surface when scrolling makes the user-device interaction more efficient and reduces unintended inputs, erroneous inputs, and the inputs needed to launch an application by continuously guiding the user during a scroll input, thereby providing feedback to the user on how the system responds to the user input.

In some embodiments, in response to detecting the first movement input directed to the arrangement of the plurality of application icons and in accordance with the determination that the first movement input is directed to the first application icon in the plurality of application icons and that the first movement input includes the second movement in the direction that is substantially perpendicular to the arrangement of the plurality of application icons and that the second movement meets the second criteria, the computer system displays a visual indication of an extent of the first application (e.g., size, shape, borders, and/or location of a user interface that corresponds to the launched first application). For example, in FIG. 11F, in response to detecting that the pluck gesture succeeds (e.g., the movement threshold is met) and before launching the application corresponding to application icon A5, the computer system 101 can display an extent or outline of user interface 1070' of the application that is about to be launched. In some embodiments the launching of the first application corresponding to the first application icon includes the displaying of the visual indication of the extent of the first application (e.g., a window pane or other area or that will be occupied by the application when it launches) (e.g., prior to displaying a user interface of the first application that includes content of the first application). Displaying an extent or outline of the application that is about to be launched in accordance with a determination that the pluck gesture meets the criteria for launching the application provides visual feedback to the user about size and/or location of the application before displaying the application, thereby making the user-device more efficient by providing the user with an opportunity to adjust placement of the application (e.g., by changing the drop location) and providing more control over organization of the mixed-reality three-dimensional environment (e.g., reducing visual clutter of open application windows).

In some embodiments, the visual indication includes a representation of an area that will be occupied by the first application when the first application launches (e.g., as described herein with reference to FIGS. 11F-11H). Displaying a window pane of the application that is about to be launched in accordance with a determination that the pluck gesture meets the criteria for launching the application provides visual feedback to the user about size and/or location of the application before displaying the application, thereby making the user-device more efficient by providing the user with an opportunity to adjust placement of the application (e.g., by changing the drop location) and providing more control over organization of the mixed-reality three-dimensional environment (e.g., reducing visual clutter of open application windows).

In some embodiments, the representation of the area that will be occupied by the first application is blank (e.g., does not include content of the first application). Displaying a blank window pane of the application that is about to be launched in accordance with a determination that the pluck gesture meets the criteria for launching the application provides visual feedback to the user about size and/or location of the application before displaying the application, thereby making the user-device more efficient by providing the user with an opportunity to adjust placement of the application (e.g., by changing the drop location) while also reducing the processing load on the computer system (e.g., since content of the application need not be displayed). For example, in FIG. 11F, in response to detecting that the pluck gesture succeeds (e.g., the movement threshold is met) and before launching the application corresponding to application icon A5, the computer system 101 can display a window pane that delineates an extent of user interface 1070' of the application that is about to be launched and optionally the window pane is blank.

In some embodiments, one or more objects in the three-dimensional environment are visible through the representation of the area that will be occupied by the first application (e.g., the window pane is transparent, semi-transparent, or otherwise has a glass effect, such that one or more virtual objects or one or more optical representations of physical objects are visible through the window pane). For example, the window pane that delineates an extent of user interface 1070' of the application that is about to be launched optionally has a glass effect allowing a user to see virtual objects and real objects in the three-dimensional environment 10000' through the window pane (e.g., FIG. 11F). Displaying a transparent or translucent window pane of the application that is about to be launched provides visual feedback to the user about size and/or location of the application before displaying the application while at the same time allows the user to better orient the application in the physical environment (e.g., as the user is able to see the physical environment through the window pane).

In some embodiments, in response to detecting the first movement input directed to the arrangement of the plurality of application icons and in accordance with a determination that the first movement input is directed to the first application icon in the plurality of application icons and that the first movement input includes the second movement in the direction that is substantially perpendicular to the arrangement of the plurality of application icons and that the second movement included in the first movement input met the second criteria, the computer system ceases display other application icons of the plurality of application icons. In some embodiments, the first application icon remains visible while the remaining application icons in the plurality of application icons cease to be displayed in response to successful removal (e.g., meeting the second criteria) of the first application icon from the plurality of applications icon but before the first application is launched. For example, FIG. 11E illustrates that in response to detecting that the lateral movement of hand 10020 met the pluck threshold, the computer system 101 ceases to display other application icons in the home user interface 1120 (e.g., application icons A1 1062-A4 1068 and A6 1072-A9 1078 other than application icon A5 1070 are hidden). In some embodiments ceasing display of the plurality of application icons includes ceasing display of the first application icon because, as described herein, successful removal (e.g., meeting the second criteria) of the first application icon from the plurality of application icons in conjunction with release of the first application icon results in display of a user interface of the first application corresponding to the first application icon. Hiding application icons in the menu other than the application icon that is being dragged (optionally, in conjunction with displaying a window of the application that is about to be launched) in accordance with a determination that the pluck gesture meets the criteria for launching the application provides visual feedback to the user about the pluck gesture meeting the criteria for launching the application, thereby making the user-device interaction more efficient by continuously guiding the user during the pluck gesture and providing feedback to the user of how the system responds to the user input.

In some embodiments, prior to displaying the arrangement of the plurality of application icons in the three-dimensional environment, the computer system displays one or more user interfaces of one or more open applications (e.g., the one or more user interfaces of the one or more open applications are displayed at one or more locations in the three-dimensional environment). The computer system detects a user input corresponding to a request to display the arrangement of the plurality of application icons (e.g., an input detected on a physical (hardware) button, or an air gesture that has a predetermined configuration, or an air gesture that is directed at a user interface control). In response to detecting the user input corresponding to the request to display the arrangement of the plurality of application icons, the computer system ceases displaying the one or more user interfaces of the one or more open applications, and displaying the arrangement of the plurality of application icons in the view of the three-dimensional environment. In response to detecting the first movement input directed to the arrangement of the plurality of application icons and in accordance with a determination that the first movement input is directed to the first application icon in the plurality of application icons and that the first movement input includes the second movement in the direction that is substantially perpendicular to the arrangement of the plurality of application icons and that the second movement included in the first movement input met the second criteria, the computer system redisplays the one or more user interfaces of the one or more open applications (and optionally ceasing display of the plurality of application icons). In some embodiments, the one or more user interfaces of the one or more open applications are redisplayed at the one or more locations that correspond to the locations where the one or more user interfaces were displayed prior to (e.g., or immediately prior) to being hidden from display. For example, in FIG. 11I, in response to detecting that the movement of hand 10020 met the pluck gesture threshold, user interface 1080' of application A10 is redisplayed at a location where user interface 1080' of application A10 was previously displayed (e.g., before being hidden when home user interface 1120 was invoked), and user interface 1070' of the application corresponding to application icon A5 is displayed as stacked in front of user interface 1080' of application A10. In some embodiments, the one or more user interfaces of the one or more open applications are not hidden or ceased to be displayed when the home user interface is invoked. In some embodiments, in accordance with a determination that the first movement input is directed to the first application icon in the plurality of application icons and that the first movement input includes the second movement in the direction that is substantially perpendicular to the arrangement of the plurality of application icons and that the second movement included in the first movement input does not meet the second criteria, the system forgoes redisplaying the one or more user interfaces of the one or more open applications. Restoring display of applications previously hidden during the pluck gesture in accordance with a determination that the pluck gesture meets the criteria for launching the application makes the user-device more efficient by reducing the number and extent of inputs needed to restore state of the three-dimensional environment (e.g., immediately) prior to detecting the pluck gesture.

In response to detecting the first movement input directed to the arrangement of the plurality of application icons and in accordance with a determination that the first movement input is directed to the first application icon in the plurality of application icons and that the first movement input includes the second movement in the direction that is substantially perpendicular to the arrangement of the plurality of application icons and that the second movement included in the first movement input met the second criteria, the computer system displays a user interface of the first application in conjunction with redisplaying the one or more user interfaces of the one or more open applications. For example, in FIG. 11I user interface 1080' of application A10 can remain displayed during the pluck gesture, and user interface 1070' of the application corresponding to application icon A5 is displayed as stacked in front of user interface 1080' of application A10 in response to detecting that the movement of hand 10020 met the pluck gesture threshold. In some embodiments, the user interface of the first application is displayed at a predetermined location, or a location determined based on user input. In some embodiments the launching of the first application corresponding to the first application icon includes the displaying of the user interface of the first application, optionally after initially displaying a visual indication of the extent of the first application without content of the first application. In some embodiments, in accordance with a determination that the first movement input is directed to the first application icon in the plurality of application icons and that the first movement input includes the second movement in the direction that is substantially perpendicular to the arrangement of the plurality of application icons and that the second movement included in the first movement input does not meet the second criteria, the computer system forgoes displaying a user interface of the first application in conjunction with redisplaying the one or more user interfaces of the one or more open applications. Displaying the application at a user specified drop location concurrently with other visible applications in response to a pluck gesture provides more control over organization of the mixed-reality three-dimensional environment without the need to use additional input devices, thereby making the user-device more efficient and ergonomic.

In some embodiments, aspects/operations of methods 12000, 13000, 14000, 15000, 16000, 22000, 23000, 24000, 25000, 27000, and 29000 may be interchanged, substituted, and/or added between these methods. For brevity, these details are not repeated here.

FIGS. 18A-18G illustrate examples of displaying a home menu user interface while one or more application user interfaces are present in a viewport of the three-dimensional environment. FIG. 22 is a flow diagram of an exemplary method 22000 for displaying a home menu user interface and one or more application user interfaces in a viewport of the three-dimensional environment. The user interfaces in FIGS. 18A-18G are used to illustrate the processes described below, including the processes in FIG. 22.

Figure 18A:
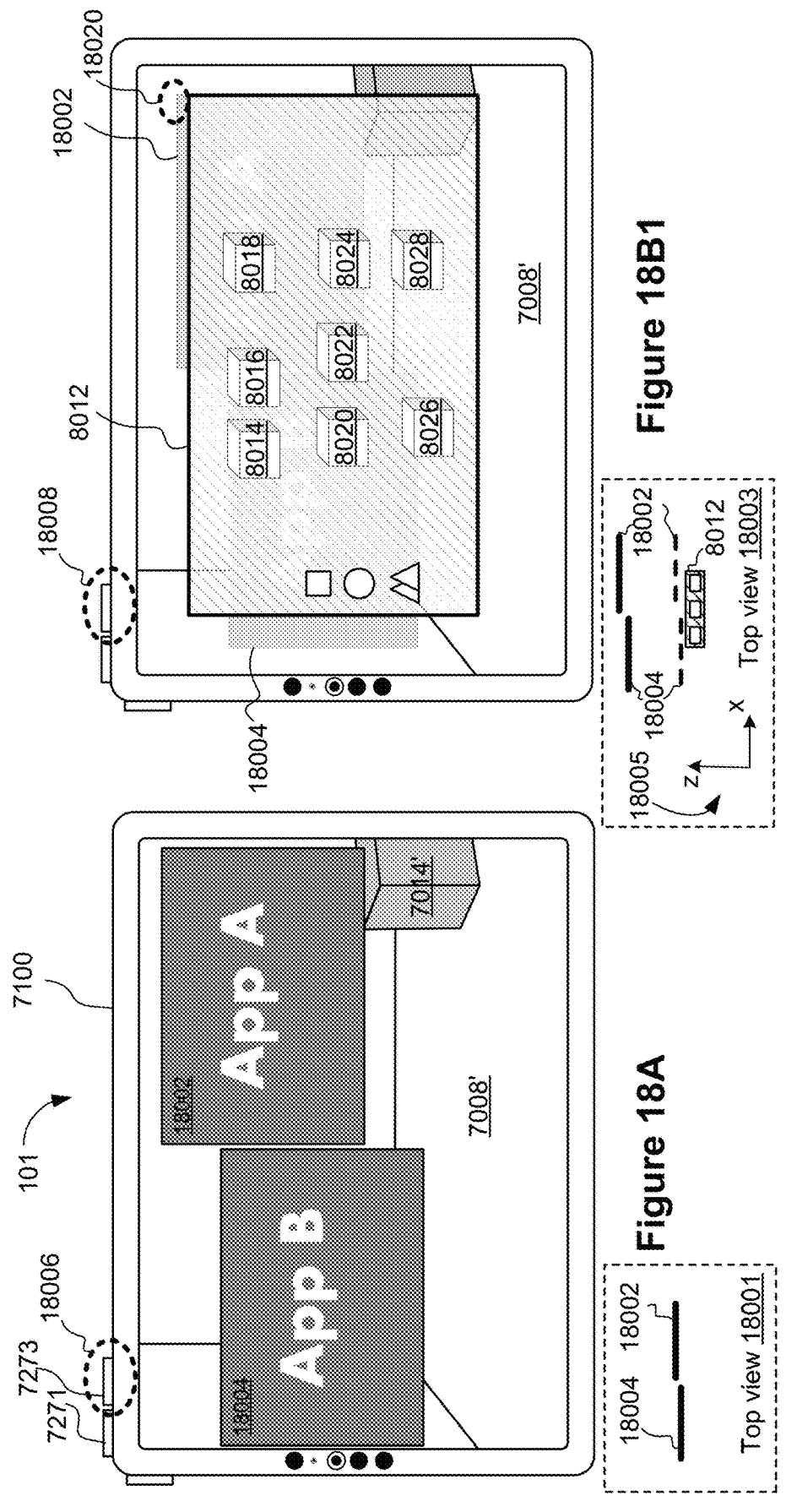

FIG. 18A illustrates a viewport of a three-dimensional environment in which respective application user interfaces of two applications and representation 7014' of physical object 7014 are displayed. In FIG. 18A, the respective user interfaces of respective applications within the viewport include user interface 18002 of a first application, Application A, and user interface 18004 of a second application, Application B. In some embodiments, one or more additional application user interfaces of respective applications are displayed in the three-dimensional environment outside the viewport shown in FIG. 18A. In some embodiments, user interfaces 18002 and 18004 of Applications A and B are displayed in an augmented reality, a virtual reality environment, or an extended reality (XR) environment. For example, such XR environments include representations of real-world objects and representations of virtual objects, and the user interfaces 18002 and 18004 display computer-generated content situated within the XR environments.

FIG. 18A also illustrates user input 18006 via button 7273 and corresponding to a request to display (e.g., invoke and/or launch) home menu user interface 8012 (e.g., shown in FIG. 18B (e.g., FIGS. 18B1, 18B2 and 18B3, where a user interface analogous to the user interface shown in FIG. 18B1 is shown on HMD 7100a in FIG. 18B2). Buttons 7271 and 7273 are provided on a housing of computer system 101 that encloses or surrounds display generation component 7100. In some embodiments, user input 18006 is a respective type of input (e.g., a button press directed to one or more of button 7271 and/or button 7273, a rotational input to button 7271 and/or button 7273, a hand gesture such as an air gesture, a gaze and pinch gesture, a tap gesture, a long press gesture, or other system gesture associated with the home menu user interface).

In FIG. 18A, the viewport of the three-dimensional environment does not include home menu user interface 8012. In some embodiments, home menu user interface 8012 is not displayed in the three-dimensional environment outside the viewport either, prior to detecting the user input. In some embodiments, home menu user interface 8012 is present in a portion of the three-dimensional environment outside the viewport illustrated in FIG. 18A. In such scenarios, the user input corresponding to the request to display home menu user interface 8012 recenters home menu user interface 8012 from a location outside the viewport of the three-dimensional environment to a characteristic portion (e.g., a central portion, or a portion that is slightly below a viewpoint of the user) of the current viewport. Top view 18001 of FIG. 18A illustrates respective locations of user interface 18002 of the first application and user interface 18004 of the second application prior to displaying home menu user interface 8012, as seen from above (e.g., from the top, and/or instead of seen from the front as in the viewport illustrated in FIG. 18A). In some embodiments, Application A and Application B are the same application (e.g., user interfaces 18002 and 18004 are different user interfaces of the same application). In some embodiments, Application A and Application B are different applications.

FIG. 18B illustrates that, in response to detecting user input 18006, computer system 101 displays home menu user interface 8012 at a characteristic portion (e.g., a central portion of the viewport, in a portion of the viewport that is lower than a viewpoint of the user, closer to representation 7008' of floor, such as lowered by between 0.1°-20° as determined from a viewpoint of user 7002, and/or a respective amount lower along an altitude angle from the viewpoint of the user) of the viewport. In some embodiments, the characteristic portion of the viewport is at a vertical position that is higher than one or more of user interface 18002 of the first application and user interface 18004 of the second application. In some embodiments, home menu user interface 8012 is displayed closer to the viewpoint of the user, in the simulated depth dimension of the three-dimensional environment, than one or more of user interface 18002 of the first application and user interface 18004 of the second application are to the viewpoint of the user (e.g., home menu user interface 8012 is positioned closer than the closest of the one or more application user interfaces). The representations 8014, 8016, 8018, 8020, 8022, 8024, 8026, and 8028 in home menu user interface 8012 are associated with (e.g., and activatable to launch or open) different respective software applications executable on computer system 101.

Top view 18003 of FIG. 18B illustrates, in dashed lines, the respective locations of user interface 18002 and user interface 18004, prior to home menu user interface 8012 being displayed, which correspond to the positions of user interfaces 18002 and 18004 shown in top view 18001 of FIG. 18A. Respective locations of user interface 18002 and user interface 18004 when home menu user interface 8012 is displayed in the viewport shown in FIG. 18B are depicted in solid lines. In some embodiments, while displaying home menu user interface 8012 at the characteristic portion of the viewport, user interface 18002 and user interface 18004 are displayed with reduced visual prominence, for example, by having reduced opacity, decreased brightness and/or are pushed back along a depth dimension (e.g., a z-direction, and/or along a radial direction from a viewpoint of the user). In some embodiments, as illustrated in the front view of the viewport shown in FIGS. 18B, user interface 18004 and user interface 18002 appear smaller than shown in FIG. 18A, as they are shifted away in a depth dimension from a viewpoint of the user. In some embodiments, home menu user interface 8012 is displayed at a location closer to a viewpoint of the user, relative to user interfaces 18002 and 18004 of respective applications, along the depth dimension, as described in reference to method 14000, and shown in top view 18003 of FIG. 18B. Coordinate diagram 18005 indicating the coordinate system of the three-dimensional environment for top view 18003 includes the z-axis (e.g., depth dimension, and/or along a radial direction) extending upwards while the x-axis extends to the right. The depth dimension (e.g., or z-direction, and/or a radial direction) extends into the page from the viewport shown in FIGS. 18B, while the height dimension (e.g., or y-direction, and/or an altitude angle direction) extends up and down the viewport shown in FIG. 18B. In some embodiments, concurrently with displaying home menu user interface 8012, previously displayed user interfaces are offset from their respective original positions in one or more directions other than the simulated depth dimension. For example, in some embodiments, the user interfaces 18002 and 18004 are displaced laterally, closer to a periphery of the viewport, and/or displaced vertically, away from a central portion of the viewport.

Figures 18C, 18D:
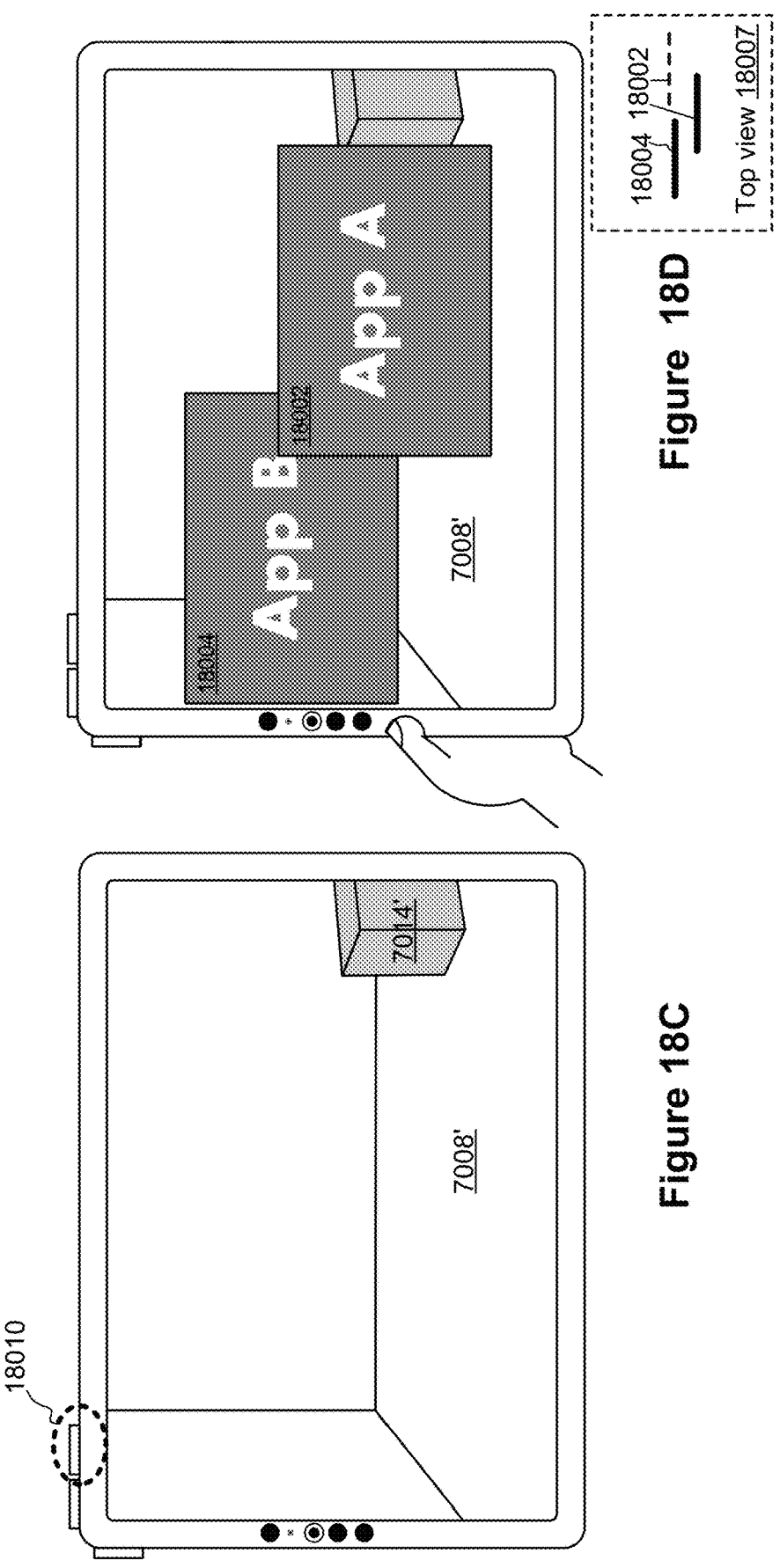

FIGS. 18B-18C illustrate ceasing to display a home menu user interface in response to detecting another user input via button 7273. In particular, FIG. 18B illustrates user input 18008 that is optionally a same type of input as that of user input 18006 of FIG. 18A. FIG. 18C illustrates a transition from FIG. 18B in response to detecting user input 18008. As illustrated in FIG. 18C, computer system 101 ceases to display home menu user interface 8012 and user interfaces 18002 and 18004. In addition, in FIG. 18C, one or more portions of a physical environment corresponding to the three-dimensional environment in the viewport shown in FIG. 18B (e.g., one or more visible portions of the physical environment including digital and/or optical passthrough portions) prior to detecting user input 18008 (e.g., while concurrently displaying home menu user interface 8012 and the visually deemphasized one or more user interfaces 18002 and 18004) continue to be visible (e.g., via the one or more display generation components) in the viewport after detecting user input 18008. For example, representation 7014' of physical object 7014 and representation 7008' of the floor continue to be visible in the viewport illustrated in FIG. 18C.

FIG. 18B in combination with FIG. 18D illustrate ceasing to display a home menu user interface in response to detecting interaction with a displayed user interface other than the home menu user interface, such as with an application user interface. Accordingly, FIG. 18B illustrates user input 18020 (e.g., an air pinch input, an air tap input, a pinch input, a tap input, an air pinch and drag input, an air drag input, a drag input, a click and drag input, a gaze input, and/or other input) directed to user interface 18002 to interact with user interface 18002. In some circumstances, user input 18020 is detected instead of user input 18008 (e.g., user input 18008 and user input 18020 represent alternatives to each other rather than concurrently detected inputs). In some embodiments, as illustrated in FIG. 18D, in response to detecting user input 18020 directed to a user interface other than home menu user interface 8012, computer system 101 ceases to display home menu user interface 8012. For example, in response to detecting a user interaction (e.g., an air pinch input, an air tap input, a pinch input, a tap input, an air pinch and drag input, an air drag input, a drag input, a click and drag input, a gaze input, and/or other input that meets a gaze dwell time threshold) with user interface 18002 and/or user interface 18004, computer system 101 ceases to display home menu user interface 8012 and performs an operation associated with the user interaction with user interface 18002 and/or user interface 18004. For example, FIG. 18D illustrates scenarios where user input 18020 includes a movement input (e.g., an air pinch and drag input, an air drag input, a drag input, a click and drag input, a gaze input, and/or other movement input), and computer system 101 repositions user interface 18002 to an updated location based on the movement input in response (e.g., the updated location is associated with a position that corresponds to an end of the movement input). In some embodiments, user input 18020 includes a gaze input and a selection input, such as a gaze input and tap input, or a gaze input and a pinch input.

Top view 18007 of FIG. 18D illustrates, as a dashed line, the prior location of user interface 18002 in FIG. 18B relative to the current location of user interface 18002 (shown as a solid line) as a result of user input 18020 of FIG. 18B. As shown in the example illustrated in FIG. 18D, user input 18020 changes a position of user interface 18002 in a x-y plane (e.g., user interface 18002 in FIG. 18D is shifted downward and to the left of its previous position shown in FIG. 18B) in addition to bringing user interface 18002 closer to a viewpoint of the user, along a simulated depth dimension.

Figures 18E, 18F:
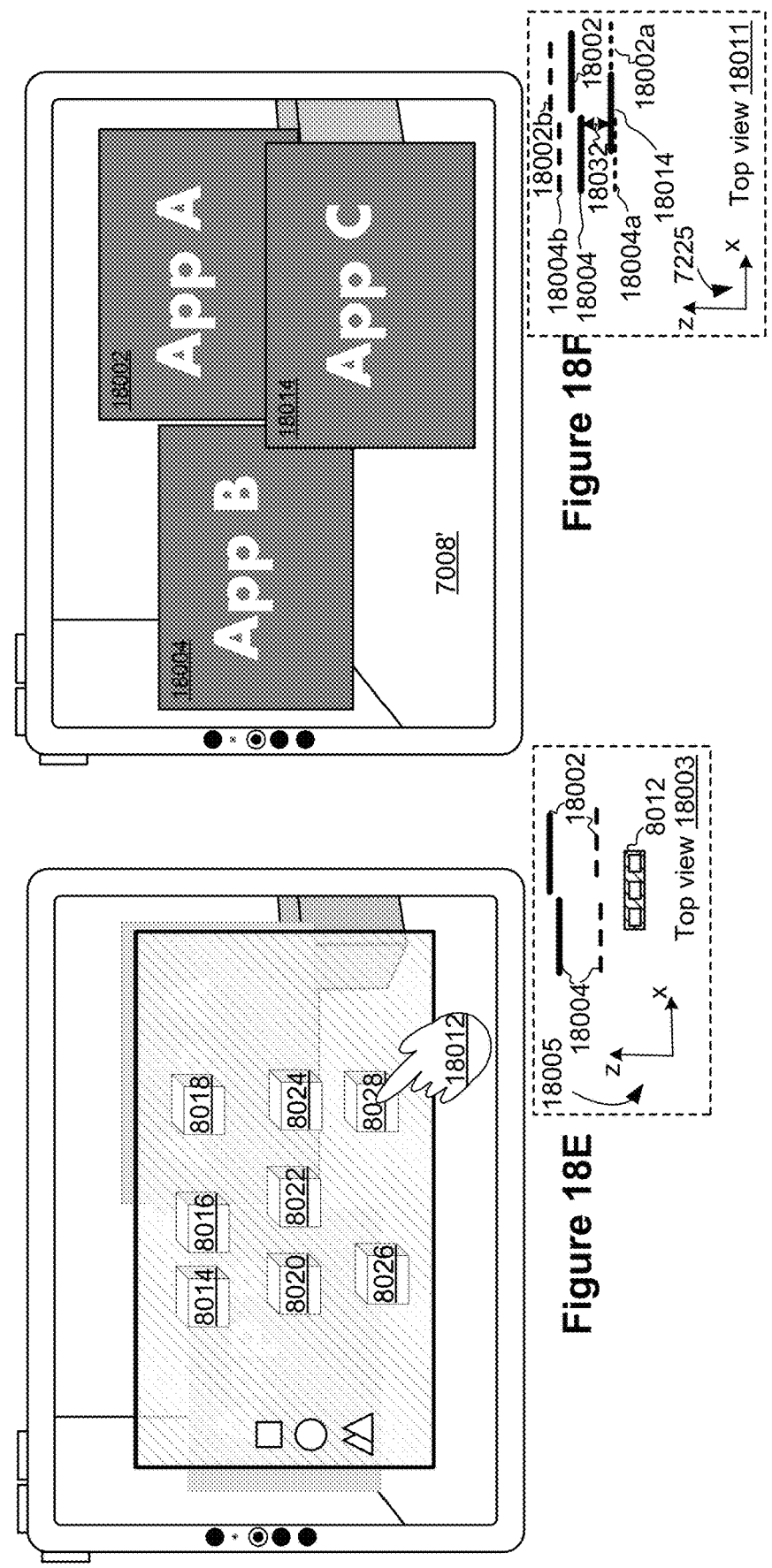

Returning to FIG. 18C, FIG. 18C in combination with FIG. 18E illustrate invoking (or, optionally, reinvoking) a home menu user interface in response to detecting another user input via button 7273. In particular, FIG. 18C illustrates detecting user input 18010 (e.g., a button press, a crown rotation, an air pinch input, an air tap input, a pinch input, a tap input, an air pinch and drag input, an air drag input, a drag input, a click and drag input, a gaze input, and/or other input) that is optionally a same type of input as that of user inputs 18006 (FIG. 18A) and 18008 (FIG. 18B). In response to detecting user input 18010, as illustrated in FIG. 18E, computer system 101 displays home menu user interface 8012 and user interfaces 18002 and 18004 that were previously dismissed by user input 18008 (FIG. 18B). The viewport illustrated in FIG. 18E is similar to the viewport illustrated in FIGS. 18B, in which home menu user interface 8012 is positioned closer to a viewpoint of the user, along a simulated depth dimension, than each of Application A and user interface 18004 of Application B. In some embodiments, as illustrated in FIG. 18E, user interfaces 18002 and 18004 are redisplayed at the same respective locations in response to detecting user input 18010 as before being dismissed.

In FIG. 18E, while displaying home menu user interface 8012, computer system 101 detects user input 18012 corresponding to a selection of representation 8028 (e.g., a tap input, an air tap input, a pinch input, a gaze input that meets a gaze dwell time threshold, a combination of a gaze input and a pinch input, a voice command, and/or a different type of input directed to representation 8028) displayed in home menu user interface 8012. For example, representation 8028 is associated with Application C. In some embodiments, representation 8028 includes an application icon of Application C.

In response to detecting user input 18012 of FIG. 18E, computer system 101 launches Application C, displaying application user interface 18014 of Application C (e.g., Application C is a web browsing application, a document editing application, a calendar application, an email application, or other applications). In addition, computer system 101 dismisses home menu user interface 8012 (e.g., ceases to display home menu user interface 8012, or repositions home menu user interface 8012 to a location outside the viewport of the three-dimensional environment) in conjunction with (e.g., prior to, or concurrently with) displaying application user interface 18014 of Application C, as shown in FIG. 18F. User interfaces 18002 and 18004 continue to be displayed in the viewport illustrated in FIG. 18F after computer system 101 displays application user interface 18014 and ceases to display home menu user interface 8012 in response to detecting user input 18012.

Top view 18011 shows user interface 18014, displayed in response to detecting user input 18012, being spaced apart along a depth dimension (e.g., z-dimension and/or along a radial direction from a viewpoint of the user) from user interfaces 18004 and 18002. In some embodiments, depth offset 18032 between newly displayed user interface 18014 and previously displayed user interfaces 18004 and 18002 is due to computer system 101 displaying user interface 18014 at a location closer, along the depth dimension, to a viewpoint of the user. Displaying user interface 18014 at a location closer to the viewpoint of the user enables the user to locate the newly launched application more easily, without having to search within the viewport.

In some embodiments, upon the displaying of user interface 18014 and the dismissing of home menu user interface 8012 in response to detecting user input 18012 as shown in FIG. 18F, the previously displayed user interfaces 18002 and 18004 (e.g., which were displayed in FIG. 18E at positions that were further from a viewpoint of the user, prior to home user interface 1812 being dismissed) move forward toward a viewpoint of the user from their prior positions. For example, top view 18011 of FIG. 18F shows that the positions of user interfaces 18002 and 18004 (indicated with solid lines) are in front of and closer to the viewpoint of the user than positions 18002*b* and 18004*b* (e.g., indicated with dashed lines, and respectively representing the positions at which user interfaces 18002 and 18004 were displayed while home menu user interface 8012 was also displayed in FIG. 18E). In some embodiments, user interface 18014 is displayed at a default depth position where user interfaces 18002 and 18004 were previously displayed in the viewport shown in FIG. 18A. Accordingly, in response to detecting user input 18012, the previously displayed user interfaces 18002 and 18004 are repositioned further back along the depth dimension from their respective previous locations before user interface 18014 was also displayed, such that user interfaces 18002 and 18004 are moved backward to accommodate displaying user interface 18014 as the foremost application user interface. For example, the locations of user interfaces 18002 and 18004 along the depth dimension while displayed in the viewport illustrated in FIG. 18A are depicted as dotted lines 18002*a* and 18004*a*, respectively, in top view 18011 of FIG. 18F, for comparison with the current locations of user interfaces 18002 and 18004 in top view 18011 (e.g., depicted in top view 18011 as solid lines).

In some embodiments, instead of launching user interface 18014 from a home menu user interface 8012 as shown in FIG. 18E, user interface 18014 is displayed in response to a user input corresponding to a selection of a selectable representation, displayed in a user interface of a different application, that invokes the application associated with user interface 18018, as further described herein with reference to FIGS. 19K-19N. In such scenarios, upon displaying of user interface 18014, the previously displayed user interfaces (e.g., user interface 18002 and 18004) are pushed back from their original positions (e.g., prior to display of home menu user interface 8012, and/or as depicted in dotted lines in top view 18011) along the depth dimension to the positions depicted in solid lines in top view 18011.

In some embodiments, user interface 18014 is placed at a position even closer to a viewpoint of the user than the depth positions of user interfaces 18004 and 18002 shown in FIG. 18A. For example, based on characteristics of the application associated with representation 8026 (e.g., a likely duration of interaction of the application, and/or a likely amount of user engagement with the application), such as because the user is more likely to interact for a longer period of time with user interfaces 18002 and/or 18004, compared to user interface 18014 (e.g., user interface 18014 is a user interface of a calculator application, or other applications that the user is likely to interact with only for a short time period), computer system 101 maintains user interfaces 18004 and 18002 at their current positions (e.g., at respective depths that are more ergonomically favorable than that of user interface 18014).

Figure 18G:
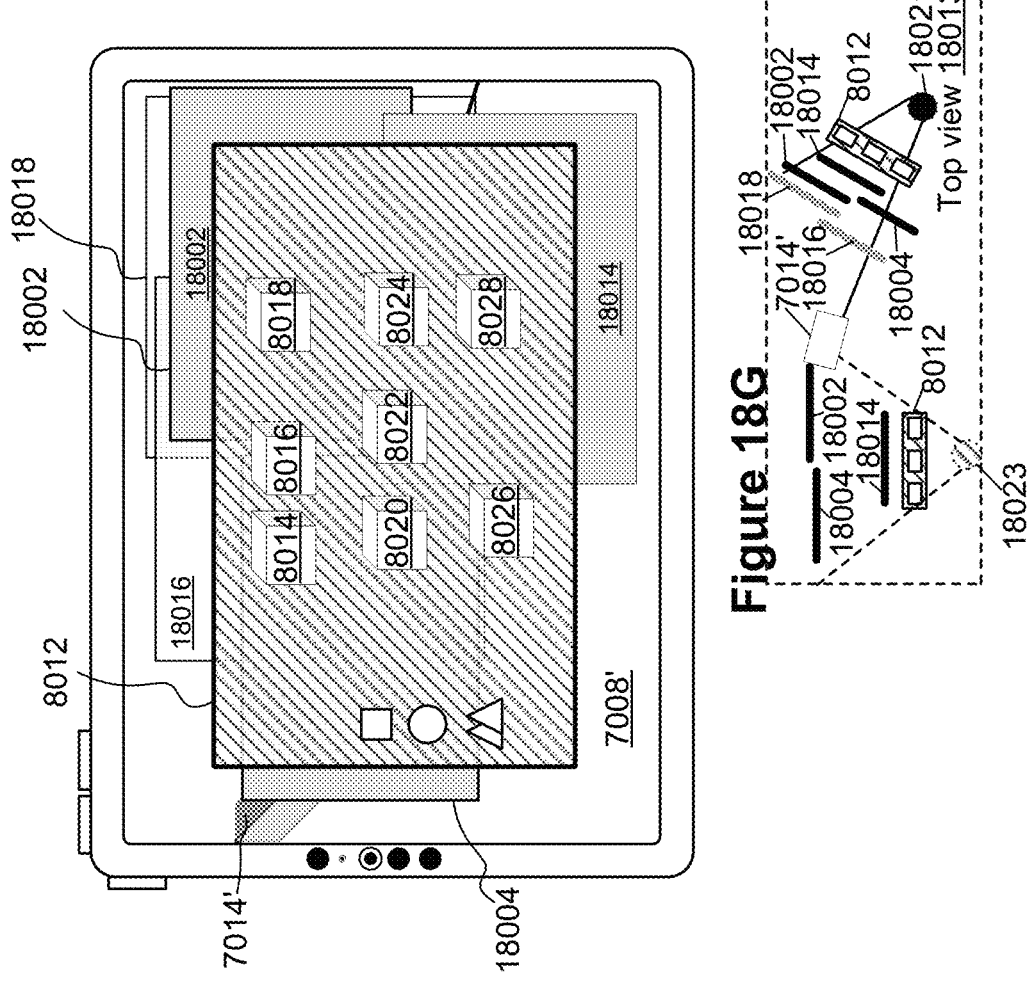

FIG. 18G illustrates an example of resuming display of home menu user interface at a second location of the three-dimensional environment, different from a first location of the three-dimensional environment where the home menu user interface was previously displayed.

In some embodiments, the viewport illustrated in FIG. 18G is a current viewport and is different from a previous viewport, such as that shown in FIG. 18F, due to movement of a user (e.g., the user may walk in the physical environment) and/or changes in a posture of a user (e.g., the user may rotate her head or body to a different posture).

In some embodiments, a user may doff or otherwise put away computer system 101 (e.g., placed in a backpack or otherwise transport) to take computer system 101 to a new location, or the user moves to the new location while donning computer system 101. In some embodiments, the user does not dismiss home menu user interface 8012 from the viewport illustrated in FIG. 18E prior to moving the computer system 101 to the new location. For a home menu user interface that is world-locked, moving the computer system 101 to a new location while home menu user interface is displayed in the previous viewport does not result in an automatic display of home menu user interface 8012 in the current/new viewport.

Top view 18013 in FIG. 18G shows prior viewpoint 18023 of the user and current viewpoint 18021 of the user. Representation 7014' of physical object 7014 is present in the viewport associated with prior viewpoint 18023 and in the viewport associated with current viewpoint 18021. Also displayed in the viewport associated with prior viewpoint 18023 are respective application user interfaces of three applications and home menu user interface 8012. The three application user interfaces are user interface 18002 of a first application, Application A; user interface 18004 of a second application, Application B; and user interface 18014 of a third application, Application C. Optionally, prior viewpoint 18023 of the user corresponds to a viewport that is visible in response to detecting an input to invoke home menu user interface 8012 over displayed application user interfaces 18002, 18004, and 18014 (e.g., another instance of user input 18006 via button 7273 (FIG. 18A), in a transition from the scenario of FIG. 18F). In some embodiments, prior viewpoint 18023 of the user is a viewpoint of the user when the user last used computer system 101. In some embodiments, a time interval between the last usage of computer system 101 and a current usage of computer system 101 to display the current viewport is greater than 1 minute, 5 minutes, 15 minutes, 30 minutes, 2 hours, 3 hours, or other minimum time threshold, and/or less than 12 hours, 10 hours, or other maximum time threshold beyond which information about a previous state of computer system 101 during the last usage is no longer retained.

In response to detecting a user input corresponding to a request to display home menu user interface in the viewport associated with current viewpoint 18021, the three application user interfaces that were previously displayed in the viewport associated with prior viewpoint 18023 are redisplayed in the viewport associated with current viewpoint 18021, as illustrated in FIG. 18G. In some embodiments, one or more additional application user interfaces of respective applications that were located outside the viewport associated with prior viewpoint 18023 in the three-dimensional environment are also displayed in the viewport associated with current viewpoint 18021 (e.g., application user interfaces located throughout the three-dimensional environment are reconsolidated in the viewport associated with current viewpoint 18021). For example, user interface 18016 of a first additional application and user interface 18018 of a second additional application are displayed in the viewport associated with current viewpoint 18021, in response to detecting the user input corresponding to a request to display home menu user interface 8012 at the new location. In some embodiments, user interfaces of additional applications that were outside of the previous viewport associated with viewpoint 18023 are displayed further away, along a depth dimension, from current viewpoint 18021 of the user compared to user interfaces of respective applications that were presented in the previous viewport (e.g., user interfaces 18002, 18004, and 18014), as shown in top view 18013.

Additional descriptions regarding FIGS. 18A-18G are provided below in reference to method 22000 described with respect to FIG. 22.

FIGS. 19A-19N illustrate examples of displaying, within a viewport of a three-dimensional environment, a user interface of an application in response to detecting a user input (e.g., an air pinch input, an air tap input, a pinch input, a tap input, an air pinch and drag input, an air drag input, a drag input, a click and drag input, a gaze input, and/or other input) corresponding to a selection of a representation associated with the application. FIG. 23 is a flow diagram of an exemplary method 23000 for displaying a user interface of an application in response to detecting a user input corresponding to a selection of a representation associated with the application. The user interfaces in FIGS. 19A-19N are used to illustrate the processes described below, including the processes in FIG. 23.

FIGS. 19A-19D illustrate different scenarios of displaying a user interface of an application depending on whether a user interface of the application is already displayed in the viewport of the three-dimensional environment at the time the user input to display the application is detected. FIGS. 19K-19N are analogous to FIGS. 19A-19D, except that, in FIG. 19K, the selectable representation of the application is displayed on user interfaces other than a home menu user interface as is the case illustrated in FIG. 19A.

FIG. 19A illustrates home menu user interface 8012, which is positioned closer to a viewpoint of the user, along a simulated depth dimension, than each of user interface 18002 of Application A, user interface 18004 of Application B, and user interface 18014 of Application C. In FIG. 19A, while displaying home menu user interface 8012, computer system 101 detects user input 19002 corresponding to a selection of representation 8022 (e.g., an air tap input directed to representation 8022, a pinch input directed to representation 8022, a gaze input directed to representation 8022 that meets a gaze dwell time threshold, a combination of a gaze input and a pinch input, a voice command, and/or a different type of input) displayed on home menu user interface 8012. Representation 8022 is a selectable user interface object for displaying or launching a user interface of an application associated with the representation 8022. For example, representation 8022 is associated with Application A. In some embodiments, representation 8022 includes an application icon of Application A.

In response to detecting user input 19002, and in accordance with a determination that an application corresponding to representation 8022 has a user interface that is currently displayed in the viewport, computer system 101 dismisses home menu user interface 8012 (e.g., ceases to display home menu user interface 8012, or repositions home menu user interface 8012 to a location outside the viewport of the three-dimensional environment) in conjunction with (e.g., prior to, or concurrently with) visually emphasizing user interface 18002 of Application A, as illustrated in FIG. 19B (e.g., FIGS. 19B1, 19B2 and 19B3, where a user interface analogous to the user interface shown in FIG. 19B1 is shown on HMD 7100a in FIG. 19B2). Visually emphasizing a user interface includes displaying a change in one or more visual characteristics of the application user interface. For example, user interface 18002 in FIG. 19B is more opaque (e.g., has a higher opacity, or is less translucent) than user interfaces 18004 and 18012 in FIGS. 19B, and is also more opaque than user interface 18002 immediately prior to detecting user input 19002, as shown in FIG. 19A. Other ways of visually emphasizing user interface 18002 are described with reference to the flow diagram for method 23000. In some embodiments, a different user interface is displayed closer to the viewpoint of the user compared to the visually emphasized user interface. For example, user interface 18014 of Application C is displayed at a depth position that is closer to the viewpoint of the user than the visually emphasized user interface 18002, as shown in top view 19003 of FIG. 19B. In such scenarios, computer system 101 prevents user interface 18014 from being visually emphasized while user interface 18002 is visually emphasized.

In response to detecting user input 19002, and in accordance with a determination that an application (e.g., Application D) corresponding to representation 8022 has a user interface that is not currently displayed in the viewport, computer system 101 dismisses home menu user interface 8012 (e.g., ceases to display home menu user interface 8012, or repositions home menu user interface 8012 to a location outside the viewport of the three-dimensional environment) in conjunction with (e.g., prior to, or concurrently with) displaying a user interface of the application corresponding to representation 8022 (e.g., user interface 18016 of Application D), as illustrated in FIG. 19D. In some embodiments, user interface 18016 of Application D is displayed at a default location in the viewport that has a (e.g., predefined) spatial relationship with respect to a location of home menu user interface 8012 from which Application D is launched. Default placement of the user interface 18016 of Application D relative to the home menu user interface 8012 is described in detail in reference to FIGS. 9A-9J. In some embodiments, user interface 18016 in FIG. 19D is more opaque than user interfaces 18002, 18004 and 18014, as shown in FIG. 19D. Other ways of visually emphasizing user interface 18016 are described with reference to the flow diagram for method 23000.

A loading time for displaying a user interface of an application in a viewport is the time between detecting the user input for launching the application to the time content (e.g., all of the content, a majority of the content) of the application is displayed in the user interface of the application.

Figure 19C:
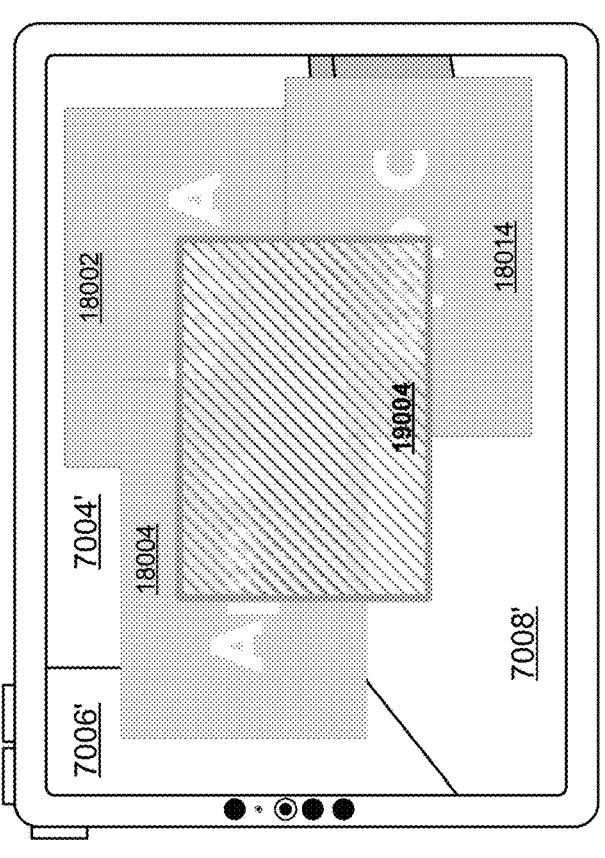

In some embodiments, in response to detecting user input 19002 corresponding to selection of representation 8022 for displaying a user interface of an application associated with the representation, and in accordance with a determination that the loading time for the application is equal to or longer than a waiting time threshold (e.g., at least 5 seconds, 10 seconds, 30 seconds, 45 seconds or another waiting time value) (or in accordance with a determination that content related to the application has not yet loaded, or has not yet completed loading, upon expiration of the waiting time threshold), computer system 101 displays a temporary frame 19004 at a location (e.g., a default location, or a different location) corresponding to where user interface 18016 would be displayed after the loading time has elapsed, as illustrated in FIG. 19C. In some embodiments, temporary frame 19004 displays no or limited content related to the application. Optionally, temporary frame 19004 has the same shape and size as user interface 18016 and provides visual feedback to the user that computer system 101 is initializing the requisite processes for displaying content related to the application (e.g., to reduce a likelihood of the user repeatedly selecting representation 8022 due to a mistaken perception that computer system 101 has not responded to the initial user input 19002 for displaying the user interface of the application).

In some embodiments, in response to detecting user input 19002 corresponding to selection of representation 8022 for displaying a user interface of an application associated with the representation, and in accordance with a determination that the loading time for the application is shorter than a waiting time threshold (e.g., less than 5 seconds, 10 seconds, 30 seconds, 45 seconds, or another waiting time value), computer system 101 forgoes displaying the temporary frame 19004 illustrated in FIG. 19C, and directly displays user interface 18016 at the default location of the viewport, as illustrated in FIG. 19D.

Figures 19E, 19F:
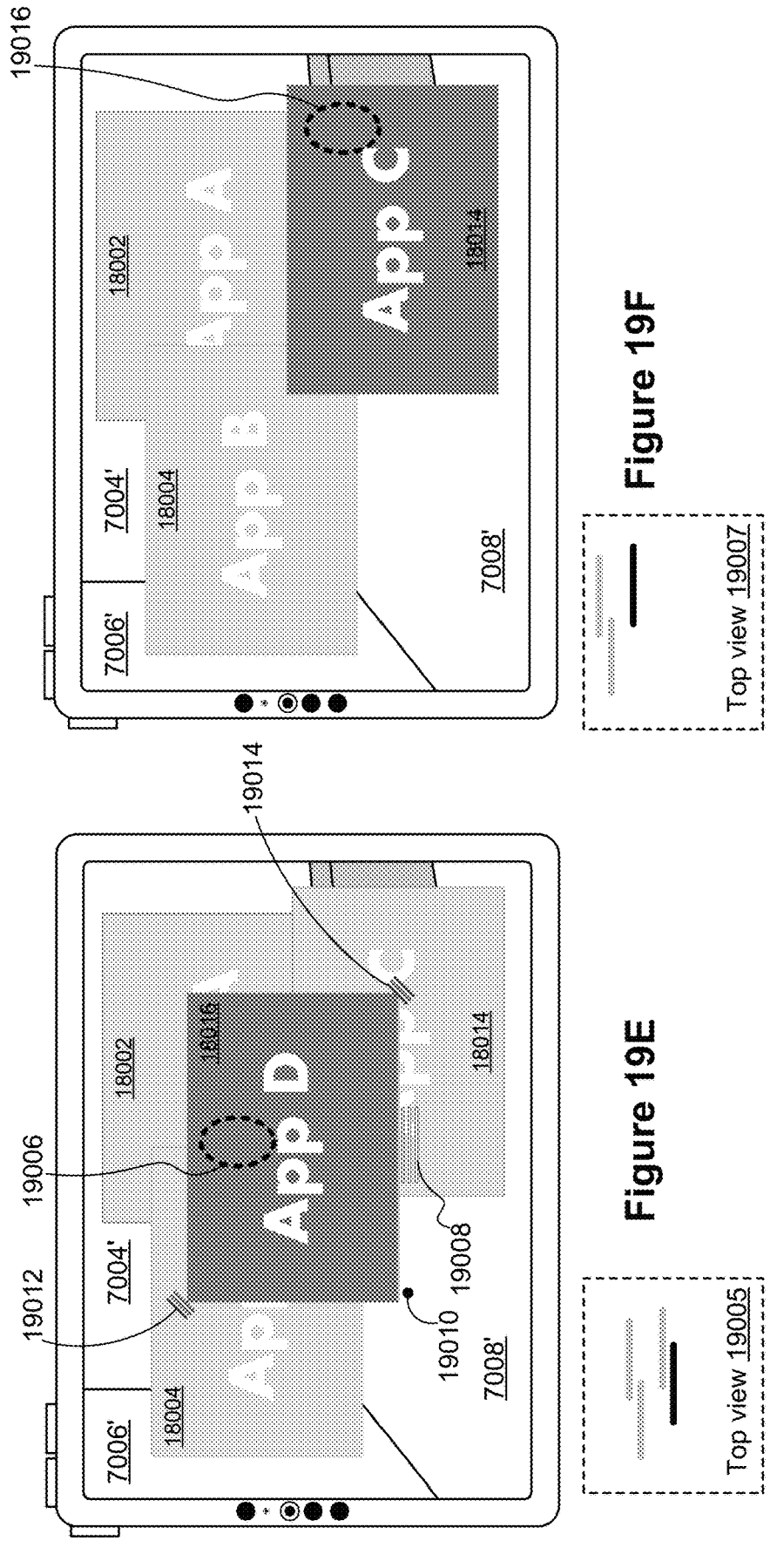

FIGS. 19D-19E illustrate displaying various auxiliary user interface elements associated with user interface 18016. FIG. 19D illustrates an initial display of user interface 18016 in response to detecting user input 19002 (FIG. 19A), or subsequent to the display of temporary frame 19004 (FIG. 19C). In FIG. 19D, auxiliary user interface elements, besides a main user interface element showing content of Application D, are not displayed.

FIG. 19E shows user interface 18016 at a later time (e.g., 0.1 second after, 1 second after, 2 seconds after, 5 seconds after, 10 seconds after, or other threshold amount of time), after the viewport illustrated in FIG. 19D is displayed. In some embodiments, auxiliary user interface elements, such as application selection affordance or grabber 19008, close affordance 19010, resize affordance 19012, and resize affordance 19014 are automatically displayed, in proximity to (e.g., within a threshold proximity of) user interface 18016 of Application D, within, or after, a threshold amount of time (e.g., 0.1 second, 1 second, 2 seconds, 5 seconds, 10 seconds, or other threshold amount of time) the main user interface element associated with Application D is displayed in the viewport. In some embodiments, one or more of the auxiliary user interface elements are activatable to manipulate the main user interface element. For example, when activated, grabber 19008 allows a user to select, reposition or otherwise interact with the main user interface element (e.g., of the user interface for Application D) associated with grabber 19008.

In some embodiments, grabber 19008 is displayed with the main user interface element (e.g., in response to detecting attention of user being directed to user interface 18016, or in accordance with a determination that display of the main user interface element meets time criteria) to which attention of the user is directed. In some embodiments, application selection affordances (e.g., grabbers) are displayed on (or with) one or more (e.g., all, or a majority of) user interfaces within the viewport, optionally to all user interfaces within the three-dimensional environment, including those that are outside the viewport. In some embodiments, auxiliary user interface elements are displayed outside of the main user interface element of user interface 18016, optionally, in proximity to (e.g., within a threshold proximity of) the corresponding main user interface element in the three-dimensional environment, and optionally may be displayed so as to appear to be separate from and/or floating nearby (e.g., in proximity to) the main user interface element. Further details about application selection affordance, resize affordances 19012 and 19014, and close affordances 19010 are described with reference to the flow diagram for method 23000.

In some embodiments, as shown in FIG. 19D, the newly displayed (e.g., most recently, or latest displayed) user interface 18016 is visually emphasized relative to other user interfaces displayed in the viewport (e.g., user interface 18002, 18004 and 18014). In FIG. 19E, in accordance with a determination that attention 19006 of the user (e.g., a gaze input meeting a gaze dwell time threshold or other criteria) directed to user interface 18016 meets attention criteria (e.g., remains on user interface 18016 for a threshold amount of time of at least 2 seconds, at least 5 seconds, or at least a different threshold amount of time), computer system 101 maintains the visual emphasis of user interface 18016. Top view 19005 shows visual emphasis of user interface 18016 relative to user interfaces 18002, 18004 and 18014.

In contrast, returning to the viewport illustrated in FIG. 19B in which user interface 18002 is visually emphasized, in accordance with a determination that attention of the user does not meet attention criteria with respect to user interface 18002 (e.g., gaze input of the user is not directed to user interface 18002, or does not persist, for at least a threshold length of time while user interface 18002 is visually emphasized, and/or the user interacts with other user interfaces), computer system 101 at least partially reverses the visual emphasis of user interface 18002 (e.g., by visually deemphasizing user interface 18002, and/or returning user interface 18002 to a state having similar visual characteristics as those of other user interfaces displayed within the viewport). In some embodiments, in response to detecting attention 19016 (see FIG. 19F) of the user being directed to a different user interface, such as user interface 18014 of Application C, computer system 101 visually emphasizes user interface 18014 of Application C, in conjunction with or concurrently with visually deemphasizing user interface 18002, as illustrated in FIG. 19F. Top view 19007 shows visual emphasis of user interface 18014 relative to user interfaces 18002 and 18004.

Figures 19G, 19H:
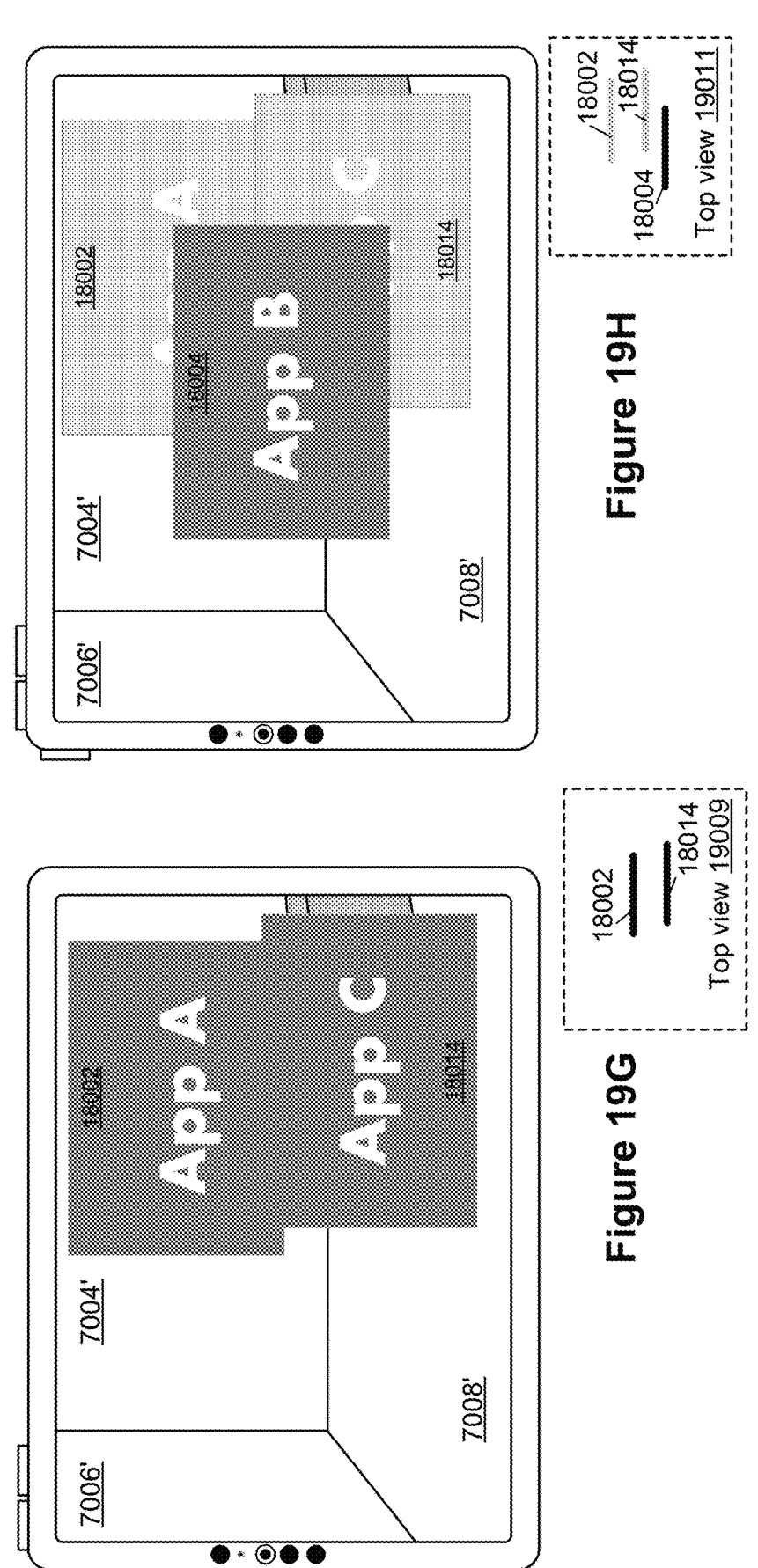
Figure 19J:
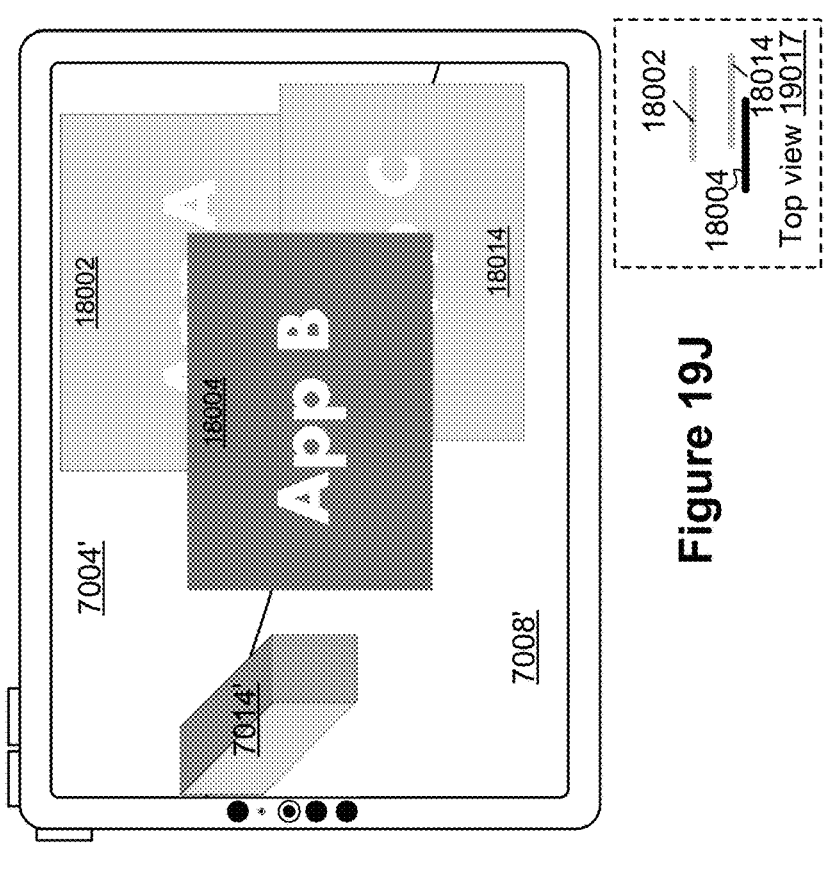

The viewport illustrated in FIG. 19G follows from a similar one displayed in FIGS. 19B, except that in FIG. 19G, user interface 18004 of Application B is no longer displayed in the viewport, and user interface 18014 has similar opacity to the opacity of user interface 18002. In some embodiments, the viewport illustrated in FIG. 19G follows from the viewport illustrated in FIGS. 19B, after computer system 101 detects a user input corresponding to a request to close user interface 18004. Further details about closing, hiding, or ceasing a user interface is provided in reference to the flow diagram description of method 23000.

While user interface 18004 is not displayed in the viewport, computer system detects a user input corresponding to a request to display user interface 18004 of Application D (e.g., an air pinch input, an air tap input, a pinch input, a tap input, an air pinch and drag input, an air drag input, a drag input, a click and drag input, a gaze input, and/or other input). Examples of such a user input includes a selection input to a representation of Application D displayed on home menu user interface 8012, or a user input corresponding to selection of a selectable user interface object associated with Application D from an application user interface that is different from home menu user interface 8012. For example, the user input corresponds to a selection input directed to a selectable user interface object such as a hyperlink displayed in an email message, and Application D corresponds to a browser application that is used to display content associated with the hyperlink.

In response to detecting the user input for displaying user interface 18004 of Application B, and in accordance with a determination that first criteria are not met, computer system 101 displays user interface 18004 of Application B at a default location within the viewport, as illustrated in FIG. 19H. Further details about characteristics of the default location are described with reference to the flow diagram for method 23000.

Figure 19I:
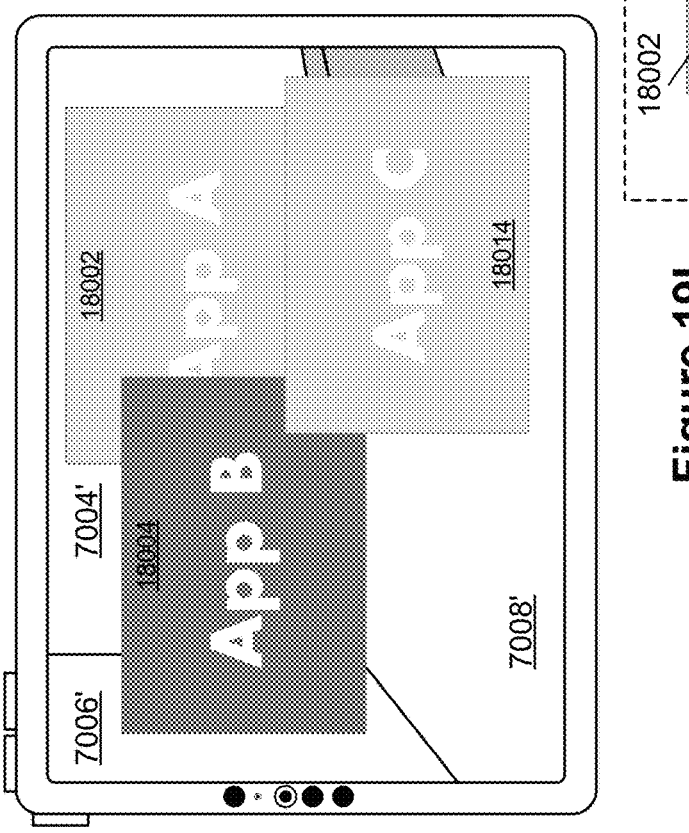

In response to detecting the user input for displaying user interface 18004 of Application B, and in accordance with a determination that first criteria are met, computer system 101 displays user interface 18004 of Application B at its last location (e.g., prior to computer system 101 detecting the user input to close the user interface of Application B), as illustrated in FIG. 19I. In some embodiments, displaying user interface 18004 at its last location also includes visually emphasizing user interface 18004 relative to other already-displayed user interfaces in the viewport (e.g., user interface 18002 and user interface 18004 are visually deemphasized relative to the user interface 18004 of Application B, as illustrated in FIG. 19I and top view 19013).

The position of the re-displayed user interface 18004 along the depth dimension, as shown in top view 19013, matches the depth position of the user interface 18004 when it was last displayed (as shown in top view 19001), which is between user interface 18002 and user interface 18014. In contrast, in some embodiments, user interface 18004 is displayed closer to the viewpoint of the user compared to other user interfaces (e.g., user interface 18002 and 18014, as shown in the top view 19011 of FIG. 19H), when it is re-displayed at the default location.

In some embodiments, the first criteria include a requirement that user input corresponding to the request to display the closed application is detected with a first time threshold from the request to close the application. In some embodiments, the first time threshold is less than 60 seconds, less than 120 seconds, less than 600 seconds, less than 30 minutes, or a different time threshold. Placing a smaller first time threshold reduces data retention demands on the computer system 101 for retaining information about a last displayed location of the closed user interface and other content data of the closed user interface.

In some embodiments, the first criteria include a requirement that the current viewport associated with the current viewpoint of the user from which the user input for redisplaying user interface 18004 is detected includes the last location at which user interface 18004 was displayed prior to being closed or dismissed.

As illustrated in FIGS. 19B and 191, the last location of user interface 18004 is close to a corner of the three-dimensional environment, between wall 7006 and wall 7004, to a left side of representation 7014' of physical object 7014. In contrast, in FIG. 19J, the viewport shows portions of the three-dimensional environment mainly to a right side of representation 7014' of physical object 7014, and does not show any portion of wall 7006. As a result, the viewport illustrated in FIG. 19J, from which the user input corresponding to the request to display user interface 18004 is detected, does not include the location of user interface 18004 where it was last displayed.

In response to detecting the user input for displaying user interface 18004 of Application B, and in accordance with a determination that first criteria are not met, computer system 101 displays user interface 18004 of Application B at a default location within the viewport, as illustrated in FIG. 19J. In some embodiments, user interface 18004 is displayed closer to the viewpoint of the user compared to other user interfaces (e.g., user interface 18002 and 18014, as shown in top view 19017 of FIG. 19J), when it is re-displayed at the default location. Further details about characteristics of the default location are described with reference to the flow diagram for method 23000.

FIGS. 19K-19N show examples of displaying a user interface of an application in response to detecting a user input (e.g., an air pinch input, an air tap input, a pinch input, a tap input, an air pinch and drag input, an air drag input, a drag input, a click and drag input, a gaze input, and/or other input) that corresponds to selecting a representation of the application from a user interface other than home menu user interface 8012.

Figures 19K, 19L:
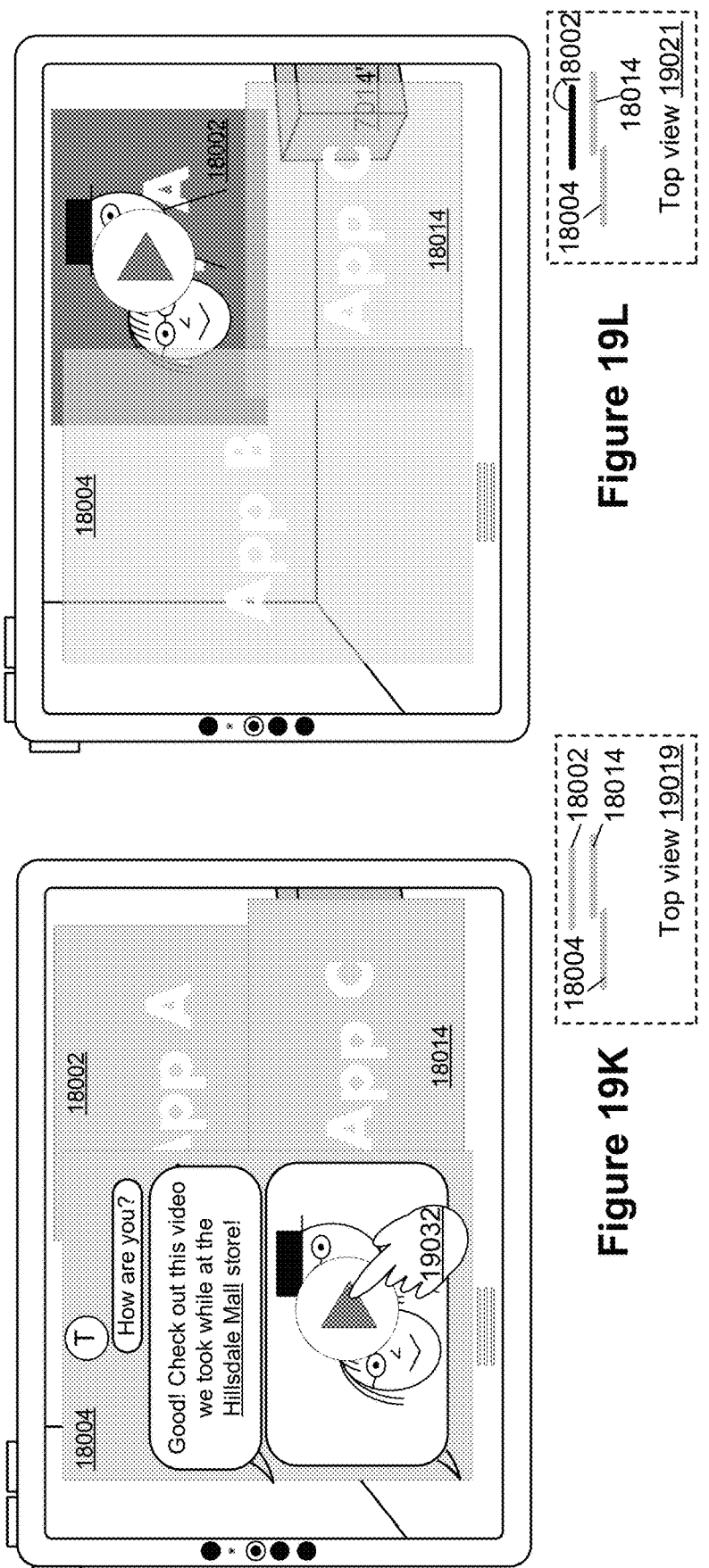

FIG. 19K shows an example in which user interface 18004 of Application B corresponds to a user interface of an instant messaging application, and user interface 18002 of Application A corresponds to a user interface of a media playback application. In some embodiments, user interface 18004 of Application B corresponds to a user interface of a browser application, a user interface of a mail application, or a user interface of other applications. In response to detecting user input 19032 directed to a selectable media item, such as a video clip, displayed in a message of the instant messaging application, and in accordance with a determination that user interface 18002 is a user interface of a media playback application that is activatable to begin playback of the media item, computer system 101 visually emphasizes user interface 18002 of the media application and updates content displayed on user interface 18002 to include a preview (e.g., a static preview, or a static frame of a video clip) of the media item (e.g. a video clip, a photo, or an audio clip) displayed in the message of the instant messaging application, as illustrated in FIG. 19L. Top view 19019 shows that user interface 18004 is displayed at a location closer to a viewpoint of the user than user interfaces 18002 and 18014. In some embodiments, user interface 18014 is a different user interface of the same application as user interface 18004 from which the former is launched.

FIG. 19M illustrates detecting user input 19034 directed to a hyperlink in a message of the instant messaging application. In some embodiments, a selection input directed to the hyperlink launches a first application, such as a browser application. In some embodiments, a selection input directed to the hyperlink launches a second application different from the first application, such as a map application.

FIG. 19N illustrates that in response to detecting user input 19034 directed to a hyperlink that launches a map application (FIG. 19M), in accordance with a determination that none of the user interfaces displayed in the viewport corresponds to a user interface of the map application, computer system 101 launches user interface 18016 of the map application. For simplicity of illustration, the map application is symbolically labeled as Application D in FIG. 19N, and content of the map application is not illustrated in the main user interface element of user interface 18016. The position of user interface 18016 is displayed at a location that corresponds to user interface 18002 of the instant messaging application, from which user interface 18016 was launched. In some embodiments, user interface 18016 is shifted up and to a side of user interface 18002 (e.g., a centroid of user interface 18016 is laterally offset and/or vertically offset from a centroid of user interface 18002). The offset between user interface 18016 and user interface 18004 allows application selection affordances (e.g., grabbers) for each of the two user interfaces to remain visible and accessible to the user. In some embodiments, user interface 18016 is displayed offset along a simulated depth dimension, with respect to user interface 18004, from a viewpoint of the user. For example, the newly displayed user interface 18016 is positioned closer to a viewpoint of the user, relative to the user interface of the original application (e.g., instant messaging application user interface 18004) from which the newly displayed user interface is launched. Top view 19023 shows user interface 18016 being offset to the right and forward, in a depth dimension, relative to user interface 18004. In some embodiments, user interface 18016 is visually emphasized relative to other user interfaces displayed in the viewport.

Additional descriptions regarding FIGS. 19A-19N are provided below in reference to method 23000 described with respect to FIG. 23.

FIGS. 20A-20X illustrate example techniques for automatically rearranging overlapping objects in a mixed-reality three-dimensional environment. FIG. 24 is a flow diagram of an exemplary method 24000 for automatically rearranging overlapping objects in a mixed-reality three-dimensional environment. The user interfaces in FIGS. 20A-20X are used to illustrate the processes described below, including the processes in FIG. 24.

FIG. 20A illustrates a view of a three-dimensional environment 20000' that is visible to a user, such as user 7002 in FIG. 7A, via a display generation component of computer system, such as display generation component 7100 of computer system 101, as described in further detail with reference to FIG. 7A. The view of the three-dimensional environment 20000' (also called view 20000' for case of reference) of FIG. 20A includes a representation (or optical view) of a portion of physical environment 7000 that includes physical walls 7004 and 7006, floor 7008, and physical object 7014, as described herein with reference to FIG. 7A. For example, view 20000' includes representations of objects in physical environment 7000 (e.g., digital passthrough as captured by one or more cameras of computer system 101) or optical views of objects in the physical environment (e.g., optical passthrough as visible through one or more transparent or semi-transparent portions of display generation component 7100). For example, in FIG. 20A, view 20000' includes representations (or optical views) of wall 7004', wall 7006', floor 7008', and box 7014', as described herein with reference to FIGS. 7A-7B.

In addition, view 20000' includes one or more computer-generated objects displayed via display generation component 7100, such as an application user interface 20022 and a home user interface 20100 (e.g., which are not representations or optical views of a physical region in physical environment 7000) that includes application icons A1 20002, A2 20004, A3 20006, A4 20008, A5 20010, A6 20012, A7 20014, A8 20016, and A9 20018 (also collectively called application icons A1 20002-A9 200018 or application icons 20002-20018) (e.g., which are not representations or optical views of physical objects in physical environment 7000). Home user interface 20100 corresponds to a user interface for launching applications via inputs directed to application icons A1 20002-A9 200018 (e.g., via a pluck gesture as described in further detail with reference to FIGS. 11A-11L and method 17000 of FIG. 17). In some embodiments, elements of home user interface 20100 itself other than the application icons are not visible or displayed. For example, the dashed outline that delineates home user interface 20100 in top view 20040 is included in FIGS. 20A, 20C, and 20U for illustrative purposes and optionally is not displayed in view 20000'. In some embodiments, home user interface 20100 operates (and is optionally visually represented) in accordance with techniques described with reference to home user interface 1120, described in further detail with reference to FIGS. 11A-11L (e.g., specifically, applications are launched via a pluck gesture directed toward an application icon in home user interface 20100 in accordance with techniques described with reference to home user interface 1120 in FIGS. 11A-11L and method 17000 of FIG. 17). Further, in some embodiments, home user interface 20100 is scrolled in accordance with the techniques described in FIGS. 7A-7I (e.g., with reference to home user interface 8012) and method 1200 of FIG. 12. View 20000' further includes application user interface 20022 that is computer-generated (e.g., as opposed to a representation or optical view of a physical object).

With reference to FIGS. 20A-20X, gaze and/or air gestures, including direct or indirect pinch gestures, are used to interact with virtual objects in view 20000' (e.g., application icons A1 20002-A9 200018, application user interface 20022 and/or other computer-generated content), according to some embodiments. In some embodiments, touch inputs detected via a touch sensitive surface (e.g., touch-sensitive surface of display generation component 10100 or trackpad 10102 in FIG. 10A) are used to interact with application virtual objects in view 20000' in addition to or alternatively to using air gestures and/or gaze.

With reference to FIGS. 20A-20X, top view 20040 illustrates virtual objects of view 20000' as seen from above (e.g., instead of seen from the front as in view 20000'). For example, top view 20040 illustrates that, looking from above, application icons A1 20002, A2 20004, and A3 20006 are visible while application icons A4 2008 and A7 20014 are occluded by application icon A1 20002, application icons A5 20010 and A8 20016 are occluded by application icon A2 20004, and application icons A6 20012 and A9 20018 are occluded by application A3 20006 (e.g., the occlusion when looking from above occurs because application icons A1 20002-A9 200018 are displayed at the same distance from user 7002, e.g., on the same plane or platter). Further, both view 20000' and top view 20040 illustrate that application user interface 20022 is displayed behind application icons A1 20002-A9 200018 from a viewpoint of user 7002.

In some embodiments, when an application is launched, such as application Ap8, and a respective user interface of the launched application both occludes and is in depth conflict with pre-existing one or more application user interfaces (e.g., application user interfaces of applications Ap3 and/or Ap5) in a three-dimensional environment (e.g., in view 20000'), the computer system automatically shifts the pre-existing one or more application user interfaces, such that at least a threshold amount of visibility of the pre-existing one or more application user interfaces is maintained, as described in further detail below with reference to FIGS. 20A-20F.

In FIG. 20A, the computer system 101 detects user input 20020 directed to application icon A5 20010 that requests to launch application Ap5 that corresponds to application icon A5 20010. In some embodiments, the user input 20020 is an air gesture (e.g., a pinch gesture) performed with hand 7020 or 7022 of user 7002 (see FIG. 7A). In some embodiments, user input 20020 is a direct air gesture or an indirect air gesture performed while user 7002's attention is directed to application icon A5 20010. In some embodiments, user input 20020 is a pluck gesture, as described herein in with reference to FIGS. 11A-11L and method 17000. In some embodiments, user input 20020 is a tap detected on a touch-sensitive surface of display generation component 7100.

FIG. 20B illustrates a transition from FIG. 20A in response to detecting user input 20020. In response to detecting user input 20020 that requests to launch application Ap5 that corresponds to application icon A5 20010, the computer system launches application Ap5 and displays application user interface 20024 of application Ap5. In some embodiments, in conjunction with launching application Ap5, the computer system 101 ceases to display application icons A1 20002-A9 200018 of home user interface 20100. Techniques for placing a launched application in view 20000' are described in further detail with reference to FIGS. 9A-9P and FIGS. 18A-18G. In some embodiments, application user interface 20024 is displayed in front of application user interface 20022 from a viewpoint of user 7002, as illustrated in top view 20040 in FIG. 20B. In some embodiments, rules for automatically rearranging overlapping and conflicting user interfaces are not applied to objects that are viewed by (e.g., or made available for viewing) and/or accessed (e.g., or made accessible) by multiple users, e.g., in a shared session. In some embodiments, application user interface 20022 is viewed by (e.g., or made available for viewing) in a shared session between multiple users (e.g., that are remotely connected). Accordingly, even though application user interface 20024 completely overlaps application user interface 20022 in FIG. 20B, the location of application user interface 20022 in view 20000' is maintained, as described in more detail below with reference to FIGS. 20C-20E.

Further, in the scenario of FIG. 20B, the computer system detects input 20026 directed at a hardware button, e.g., side button 20025 located on a side of a housing of computer system 101. In some embodiments, input 20026 requests to display home user interface 20100. In some embodiments, input 20026 includes multiple or single presses detected on the side button 20025. In response to detecting input 20026 directed to side button 20025, the computer system displays home user interface 20100, as illustrated in FIG. 20C.

Figures 20C, 20D:
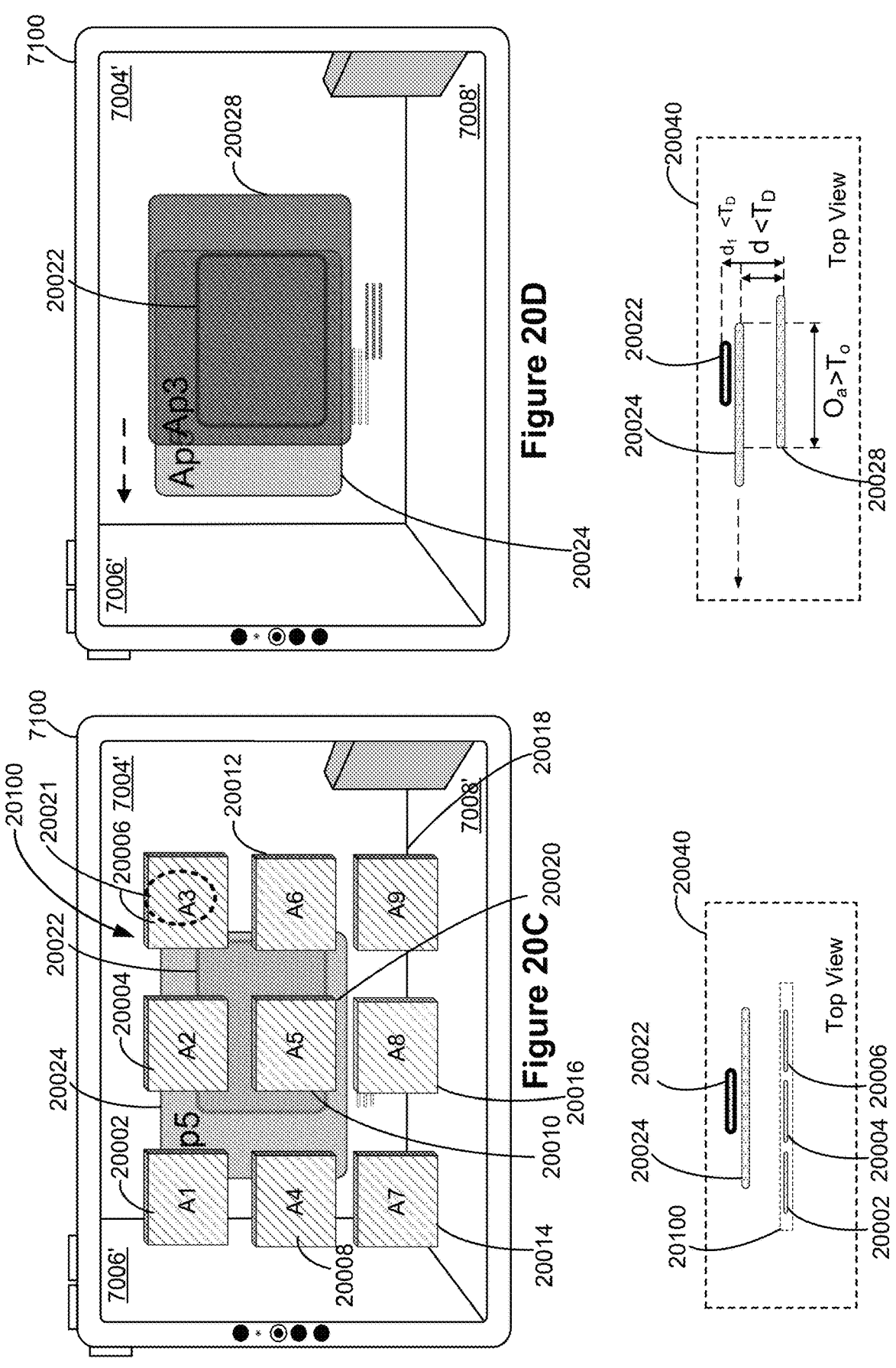

FIG. 20C illustrates a transition from FIG. 20B in response to detecting input 20026 directed to side button 20025. In response to detecting input 20026 directed to side button 20025, application icons A1 20002-A9 200018 of home user interface 20100 are redisplayed in view 20000'. As illustrated in top view 20040 in FIG. 20C, application icons A1 20002-A9 200018 of home user interface 20100 are displayed in front of application user interface 20024 from a viewpoint of user 7002. Further, in FIG. 20C, user input 20021 (e.g., a pluck gesture or other air gesture) directed to application icon A3 20006 is detected. Use input 20021 requests to launch application Ap3 that corresponds to application icon A3 20006.

FIG. 20D is a transition from FIG. 20C in response to detecting user input 20021. In response to detecting user input 20021 that requests to launch application Ap3 that corresponds to application icon A3 20006, the computer system launches application Ap3 and displays application user interface 20028. As illustrated in top view 20040 in FIG. 20D, application user interface 20028 displayed in front of application user interfaces 20024 and 20022 from a viewpoint of user 7002. Further, application user interface 20028 overlaps and/or occludes application user interfaces 20024 and 20022 (e.g., from a viewpoint of user 7002) by more than an occlusion threshold $T_o$. For example, the amount of overlap $O_a$ between application user interface 20028 and application user interface 20024 (e.g., from a viewpoint of user 7002) is greater than the occlusion threshold $T_o$, e.g., $O_a > T_o$ (as illustrated in top view 20040 in FIG. 20D). Also, application user interface 20028 is in depth conflict with application user interfaces 20024, such that a difference in depth (e.g., along a z axis of the three-dimensional environment) between the location of application user interfaces 20024 and application user interface 20028 is less than depth threshold TD from the viewpoint of the user. For example, the distance d (e.g., along a z axis of the three-dimensional environment) between application user interface 20028 and application user interfaces 20024 (e.g., from a viewpoint of user 7002) is less than the depth threshold $T_D$, e.g., d<TD (as illustrated in top view 20040 in FIG. 20D). Also, application user interface 20028 is in depth conflict with application user interface 20022, such that a difference in depth between the location of application user interface 20022 and application user interface 20028 is less than depth threshold TD from the viewpoint of the user. For example, the distance $d_1$ between application user interface 20028 and application user interface 20022 (e.g., from a viewpoint of user 7002) is less than the depth threshold TD, e.g., $d_1 < T_D$ (as illustrated in top view 20040 in FIG. 20D). In the scenario of FIG. 20D, in which application user interface 20028 both occludes and is in depth conflict with a pre-existing application user interface 20024, the computer system automatically shifts the pre-existing application user interface 20024, as described in further detail with reference to FIG. 20E.

Figure 20E:
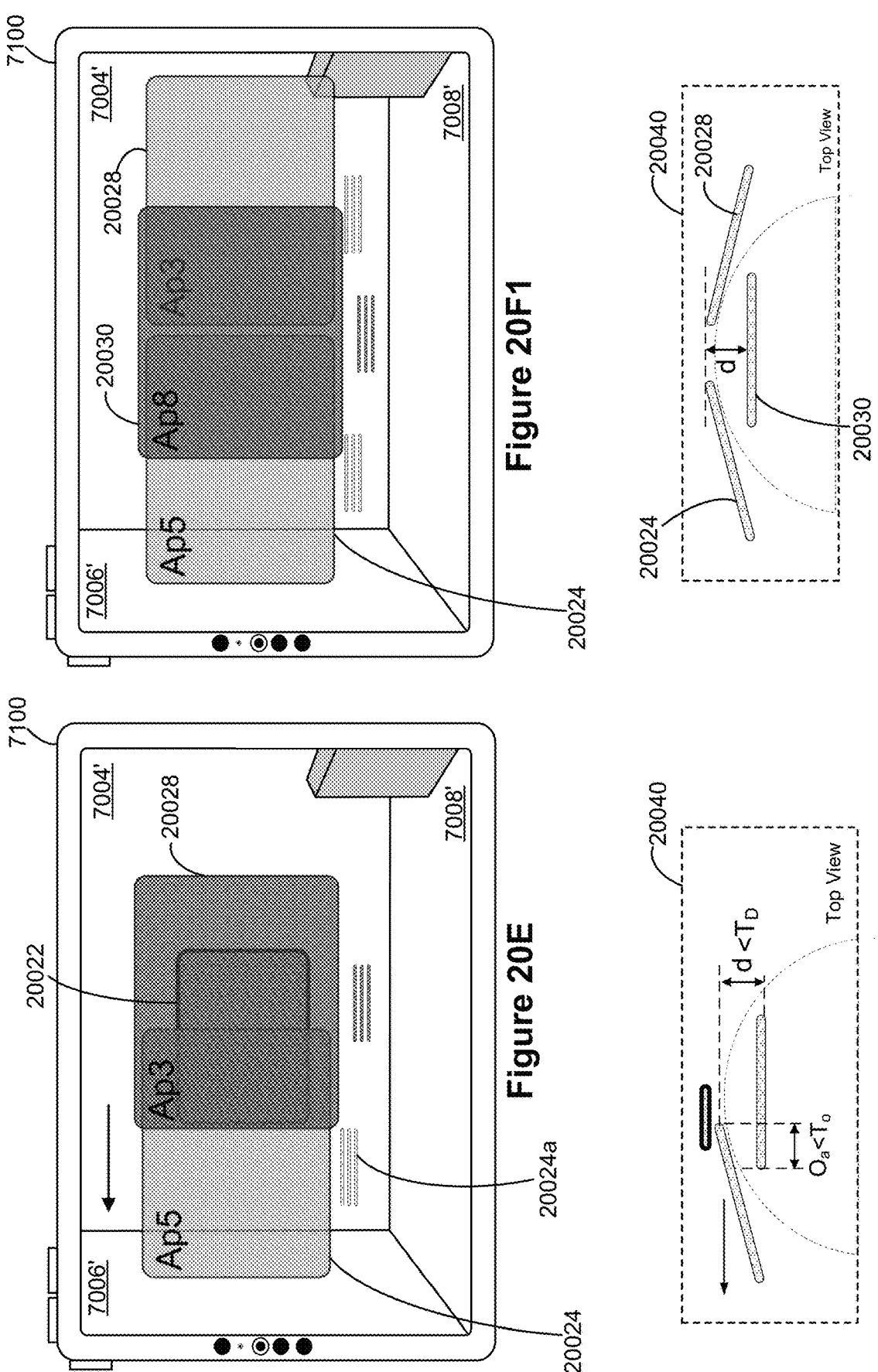

FIG. 20E illustrates a transition from FIG. 20D, in which the computer system 101 shifts (e.g., automatically shifts) application user interface 20024 in accordance with a determination that the amount of overlap $O_a$ between application user interface 20028 and application user interface 20024 from a viewpoint of user 7002 is greater than the occlusion threshold $T_o$ (e.g., $O_a > T_o$) and that difference in depth d between the location of application user interface 20024 and application user interface 20028 is less than the depth threshold $T_D$ from the viewpoint of the user (e.g., $d < T_D$). In some embodiments, application user interface 20024 is shifted laterally and/or vertically. In the scenario of FIG. 20E, application user interface 20024 is shifted laterally in a leftward direction. In some embodiments, application user interface 20024 is shifted laterally along a surface of a spherical coordinate system that is centered around a portion of user 7002's body, as illustrated in top view 20040 of FIG. 20E.

In some embodiments, application user interface 20024 is moved (e.g., laterally) by an amount necessary to maintain at least a threshold amount of application user interface 20024 visible (e.g., un-occluded or unobstructed by application user interface 20028) from the viewpoint of user 7002. In some embodiments, application user interface 20024 is moved by an amount necessary to maintain at least a threshold amount of grabber affordance 20024a visible, where grabber affordance 20024a is used for moving application user interface 20024 (e.g., or for manipulating, such as by repositioning, resizing, or otherwise moving application user interface 20024, or for performing one or more other operations with application user interface 20024). In some embodiments, application user interface 20024 is moved by an amount necessary to reduce the amount of overlap $O_a$ between application user interface 20028 and application user interface 20024 (e.g., from the viewpoint of user 7002) to less than the occlusion threshold $T_o$. In the scenario of FIG. 20E, the computer system 101 moves application user interface 20024 by an amount necessary to reduce the amount of overlap $O_a$ between application user interface 20028 and application user interface 20024 (e.g., from the viewpoint of user 7002) to less than the occlusion threshold $T_o$, e.g., $O_a < T_o$, as illustrated in top view 20024. In some embodiments, application user interface 20024 is moved by an amount that corresponds to at least a half the width of the larger user interface from application user interface 20024 and application user interface 20028. In some embodiments, such as in the scenario of FIG. 20E, application user interface 20024 is moved laterally without changing the distance of application user interface 20024 from the viewpoint of the user, e.g., the distance d between application user interface 20024 and application user interface 20028 is maintained. In some embodiments, application user interface 20028 briefly occludes application user interface 20024 (e.g., upon computer system 101 launching application Ap3) before the computer system reduces the amount of overlap $O_a$ between application user interface 20028 and application user interface 20024 from the viewpoint of user 7002.

In some embodiments, in a scenario in which application user interface 20028 and application user interface 20024 are different sizes (e.g., one is larger than the other), the amount of overlap $O_a$ and/or the occlusion threshold $T_o$ determined with respect to the larger or the smaller user interface from application user interfaces 20028 and 20024, or alternatively, with respect to the user interface, of application user interfaces 20028 and 20024, furthest from the viewpoint of user 7002.

In some embodiments, if user 7002 changes their viewpoint, the amount of overlap $O_a$ and/or the distance d between application user interface 20028 and application user interface 20024 are measured from the changed viewpoint of user 7002.

In the scenario of FIGS. 20D-20E, in which application user interface 20028 both occludes (e.g., by more than the occlusion threshold $T_o$) and is in depth conflict with a pre-existing application user interface 20022 (e.g., $d_1 < T_D$) that is being viewed in a session shared between multiple users, the computer system maintains position of application user interface 20022 (e.g., as opposed to automatically shifting the pre-existing application user interface 20024), as illustrated in FIG. 20E. For example, the computer system maintains position application user interface 20022 because it is shared between multiple users (e.g., to avoid objects that are only being viewed by a single user from affecting the position of objects that are shared).

In some embodiments, the same rules with respect to reducing occlusion that are applied to two virtual objects are also applied when more than two virtual objects, such as application user interfaces 20024 and 20028 are being occluded by another object (e.g., a newly displayed, launched, and/or resized object), such as application user interface 20030 corresponding to application Ap8, as described below with respect to FIG. 20F (e.g., FIGS. 20F1, 20F2 and 20F3, where a user interface analogous to the user interface shown in FIG. 20F3 is shown on HMD 7100*a* in FIG. 20F1).

FIG. 20F illustrates a transition from FIG. 20E in response to displaying application user interface 20030 corresponding to application Ap8. After application user interface 20022 (e.g., which had been shared in a session among multiple users) is closed or dismissed in FIG. 20E, one or more user inputs (e.g., a button press, a crown rotation, an air pinch input, an air tap input, a pinch input, a tap input, an air pinch and drag input, an air drag input, a drag input, a click and drag input, a gaze input, and/or other input) are detected that request display of application user interface 20030 of application Ap8 (e.g., optionally one user input that launches the home screen user interface 20100 and another user input similar to user input 20021 but directed to application icon A8 20010). In response to requesting to display application user interface 20030, the computer system 101 displays application user interface 20030 in front of application user interfaces 20024 and 20028 from a viewpoint of user 7002 (e.g., as illustrated in top view 20040 in FIG. 20F) (e.g., optionally upon launching application Ap8, user interface 2030 of application Ap8 is displayed at a default, system-determined location). In this scenario in which application user interface 20030 occludes multiple user interfaces, the same rules for reducing occlusion (e.g., by shifting pre-existing user interfaces) are applied. For example, the computer system 101 automatically shifts application user interface 20028 (e.g., relative to its prior position, as shown in FIG. 20E) laterally in a rightward direction in accordance with a determination that an amount of overlap $O_a$ between application user interface 20030 and application user interface 20028 is more than the (e.g., permitted) occlusion threshold $T_o$ and that the distance between application user interface 20030 and application user interface 20028 is less than the depth threshold $T_D$ (e.g., to maintain sufficient visibility of application user interface 20028). Further, the computer system 101 maintains position of application user interface 20024 (e.g., at the same position as in FIG. 20E) in accordance with a determination that an amount of overlap $O_a$ between application user interface 20030 and application user interface 20024 is less than the occlusion threshold $T_o$ (e.g., because more than a threshold amount of the partially occluded application user interface 20024 is visible). In the scenario of FIGS. 20F, application user interface 20028 is moved laterally in a rightward direction without changing a distance between application user interface 20028 and user 7002.

Figures 20G, 20H:
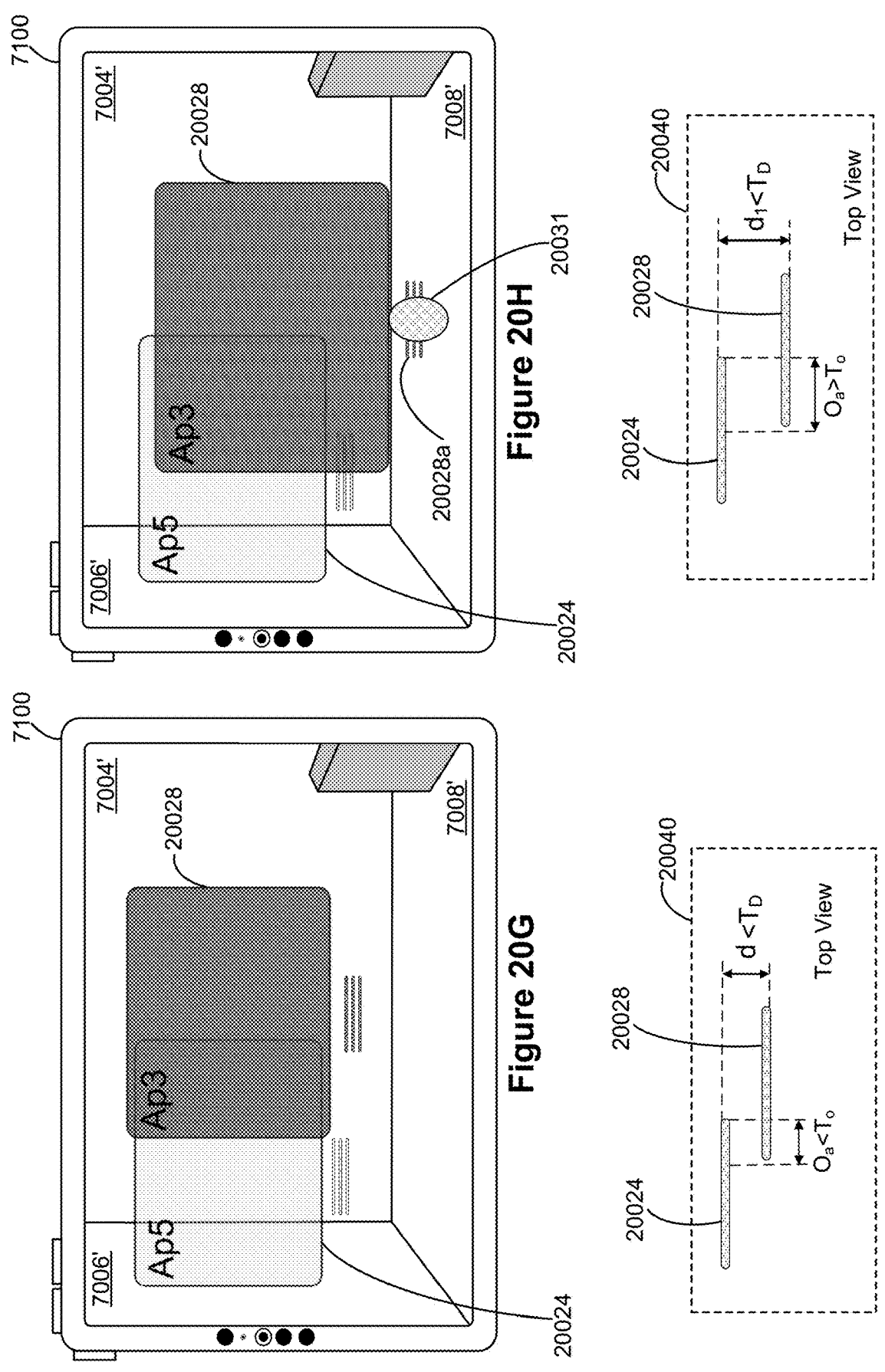

In some embodiments, if an underlying object (e.g., application user interface 20028 of application Ap3) is shifted from an initial position to an updated position by the computer system 101 because the underlying object is occluded by a conflicting object (e.g., one that is a less than the depth threshold $T_D$ apart), the computer system 101 shifts back the underlying object to the initial position when the conflicting object is closed or dismissed (e.g., application user interface 20028 of application Ap3 is returned back to the center) as described in further detail below with reference to FIG. 20G.

FIG. 20G illustrates a transition from FIG. 20F when application user interface 20030 of application Ap8 is closed (or dismissed), where application user interface 20030 of application Ap8 occluded application user interface 20028 of application Ap3 by more than the occlusion threshold $T_o$ before application user interface 20028 of application Ap3 was shifted to an updated position. In response to detecting that the application user interface 20030 (e.g., the conflicting user interface) is closed, the computer system automatically shifts back application user interface 20028 of application Ap3 from the updated position back to the position that application user interface 20028 of application Ap3 was in before it was shifted (e.g., a respective position in FIG. 20E before application user interface 20030 of application Ap8 was displayed, as shown in FIG. 20F). In the scenario in FIG. 20G, even though application user interface 20028 of application Ap3 that is shifted back overlaps application user interface 20024 of application Ap5 (and is less than the depth threshold $T_D$ apart from application user interface 20024 of application Ap5), application user interface 20024 of application Ap5 is not shifted (e.g., remains stationary) because the amount of overlap $O_a$ is less than the occlusion threshold $T_o$ (e.g., $O_a < T_o$ as illustrated in top view 20040 in FIG. 20G).

In some embodiments, the computer system 101 also shifts back to an initial position an underlying object (e.g., application user interface 20024 of application Ap5) when a conflicting object is moved away or removed, such that the depth conflict between the underlying object and the conflicting object is removed (e.g., as described in further detail below with respect to FIGS. 20H-20J), and/or more than a threshold amount of visibility (e.g., from the viewpoint of the user) of the underlying object results from removing or moving the conflicting object away.

FIG. 20H illustrates that application user interface 20028 of application Ap3 overlaps that application user interface 20024 of application Ap5 by more than the occlusion threshold $T_o$ (e.g., $O_a > T_o$ as illustrated in top view 20040 in FIG. 20H) and that application user interface 20028 is less than the depth threshold $T_D$ distance away from that application user interface 20024 (e.g., from the viewpoint of the user) (e.g., distance $d_1$ between application user interface 20028 and application user interface 20024 is less than $T_D$, e.g., $d_1 < T_D$ as illustrated in top view 20040 in FIG. 20H). In the scenario of FIG. 20H, the computer system 101 detects user input 20031 (e.g., an air pinch input, an air tap input, a pinch input, a tap input, an air pinch and drag input, an air drag input, a drag input, a click and drag input, a gaze input, and/or other input) directed to grabber affordance 20028*a* that is used to move application user interface 20028 of application Ap3. In response to user input 20031, the computer system moves application user interface 20028 towards user 7002, as illustrated in FIG. 20I.

Figures 20I, 20J:
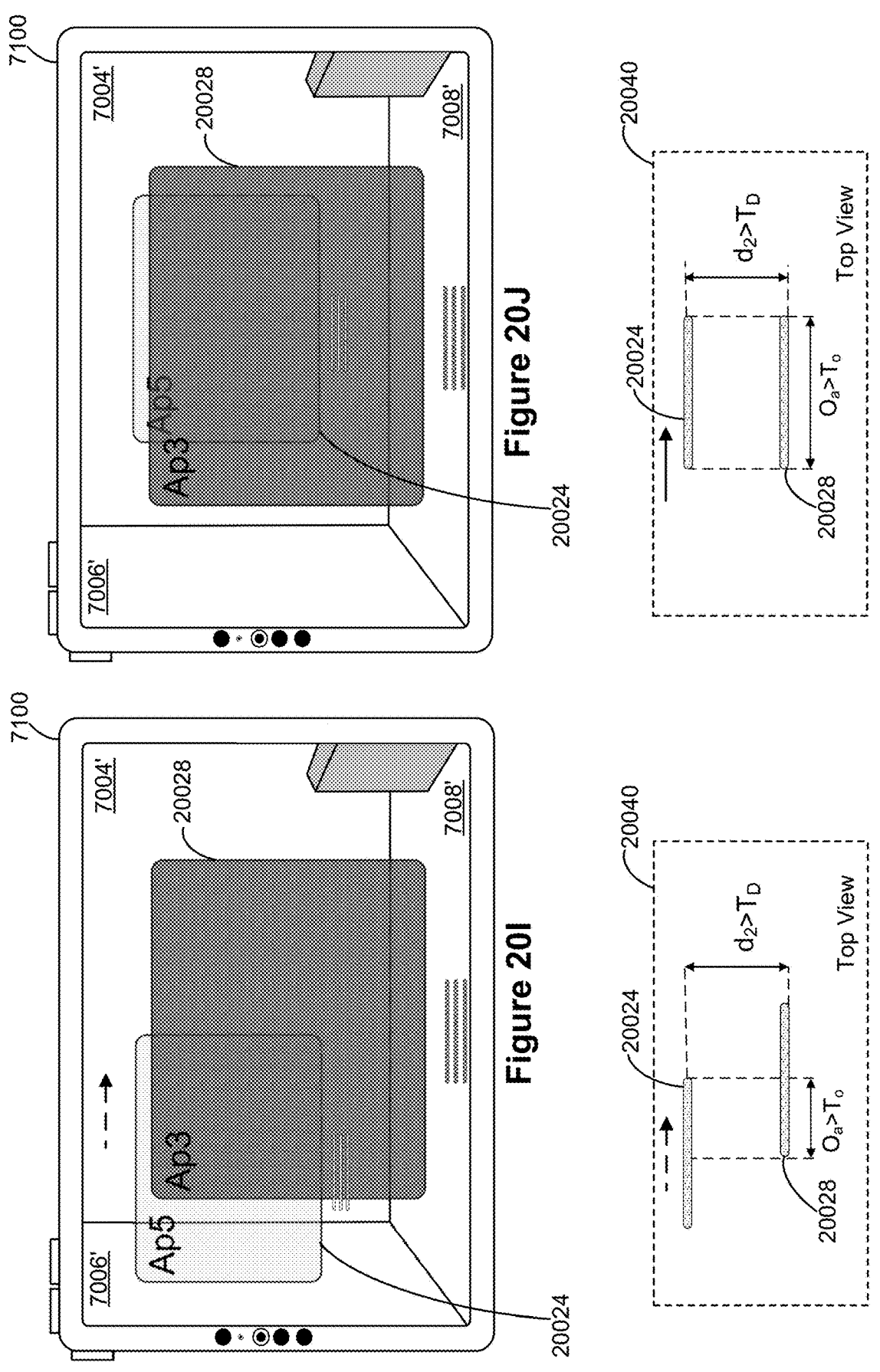

FIG. 20I illustrates a transition from FIG. 20H in response to detecting detects user input 20031 that moves application user interface 20028 towards user 7002. FIG. 20I illustrates that application user interface 20028 is moved towards user 7002 (e.g., along a z axis of the three-dimensional environment), resulting in an amount of separation (e.g., distance $d_2$) between application user interface 20028 and application user interface 20024 that is more than the depth threshold $T_D$ (e.g., distance $d_2$ between application user interface 20028 and application user interface 20024 is more than $T_D$, e.g., $d_2 > T_D$ as illustrated in top view 20040 in FIG. 20I). In accordance with a determination that application user interface 20028 and application user interface 20024 are no longer in depth conflict (e.g., $d_2 > T_D$), the computer system 101 automatically shifts back application user interface 20024 to a position occupied by application user interface 20024 before it was occluded by application user interface 20028 (e.g., the position of application user interface 20024 of application Ap5 in FIG. 20D), as described in further detail below with respect to FIG. 20J.

In some embodiments, in the scenarios of FIGS. 20F-20G and 20H-20J in which an application user interface (e.g., 20028 in FIG. 20G and 20024 in FIG. 20J) is automatically shifted back to an initial position from an updated position after a depth conflict and/or an occlusion conflict is removed (e.g., because an overlaying user interface is closed or moved away), the computer system forgoes shifting if the application user interface was displayed at the updated position for more than a threshold amount of time.

FIG. 20J is a transition from FIG. 20I in response to detecting that application user interface 20028 is moved towards user 7002 by an amount that results in application user interface 20028 being separated from application user interface 20024 (e.g., along a z axis of the three-dimensional environment)) by more than the depth threshold $T_D$. In accordance with a determination that application user interface 20028 and application user interface 20024 are no longer in depth conflict (e.g., $d_2 > T_D$) (e.g., because application user interface 20028 is moved towards user 7002 and away from application user interface 20024), the computer system 101 automatically shifts back application user interface 20024 to a position occupied by application user interface 20024 before it was occluded by application user interface 20028 (e.g., position of application user interface 20024 of application Ap5 in FIG. 20D). In the scenario of FIG. 20J, even though the amount of overlap $O_a$ between application user interface 20024 of application Ap5 and application user interface 20028 of application Ap3 is more than the occlusion threshold $T_o$ (e.g., $O_a > T_o$ as illustrated in top view 20040 in FIG. 20J), after application user interface 20028 is moved towards user 7002, application user interface 20024 is not shifted from its prior position (e.g., because application user interface 20028 and application user interface 20024 are not in depth conflict).

Figures 20K, 20L:
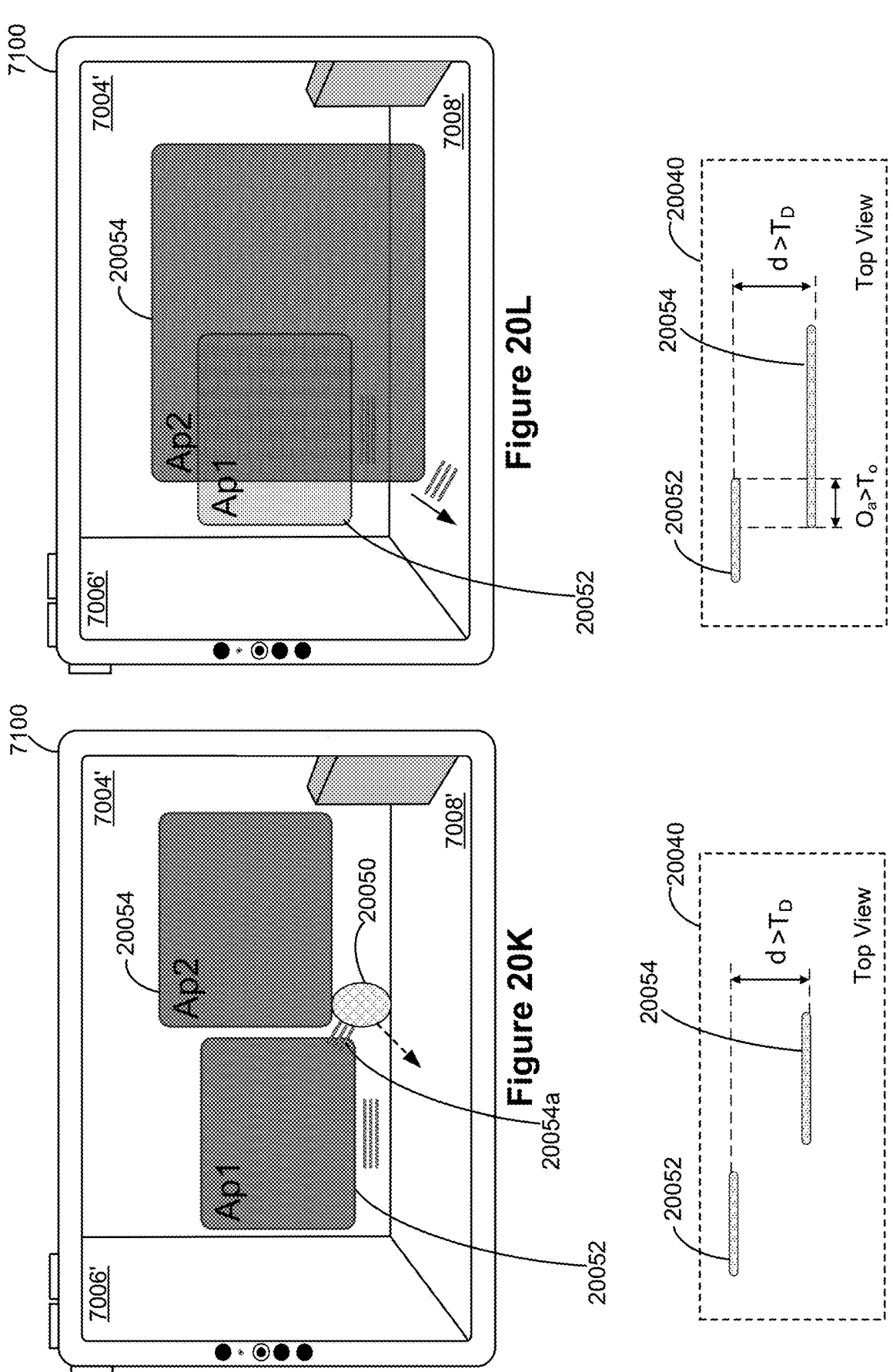
Figures 20M, 20N:
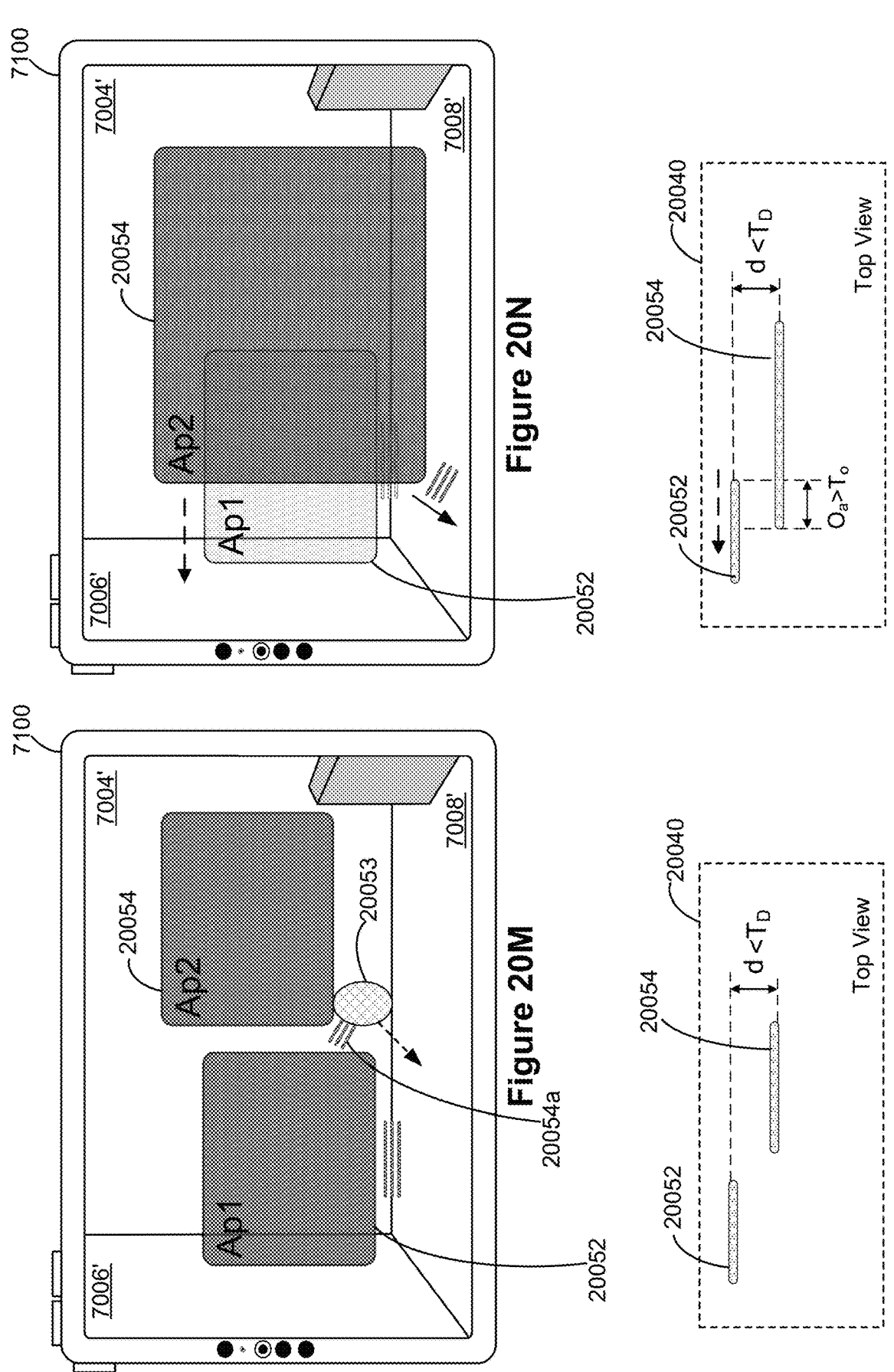

In some embodiments, when a respective object is resized (e.g., user interface 20054 of application Ap2, as shown in FIGS. 20M-20N), such that the respective object both occludes and is in depth conflict with a pre-existing object (e.g., user interface 20052 of application Ap1), the computer system 101 automatically shifts the pre-existing object, such that at least a threshold amount of visibility of the pre-existing object is maintained, as described in further detail below with reference to FIGS. 20M-20O. In contrast, when a respective object is resized, such that the respective object occludes a pre-existing object by more than the permitted occlusion threshold $T_o$ but is not in depth conflict with the pre-existing object, the computer system 101 does not shift the pre-existing object, as described in further detail with reference to FIGS. 20K-20L.

In FIG. 20K, user interface 20052 of application Ap1 and user interface 20054 of application Ap2 are not overlapping (e.g., from the viewpoint of the user 7002) and have a difference in depth that is more than a respective threshold depth $T_D$ from the viewpoint of the user (e.g., as illustrated in top view 20040 in FIG. 20K). In FIG. 20K, the computer system 101 detects user input 20050 (e.g., an air pinch input, an air tap input, a pinch input, a tap input, an air pinch and drag input, an air drag input, a drag input, a click and drag input, a gaze input, and/or other input), directed towards resize affordance 20054a, that requests to resize (e.g., enlarge) user interface 20054 of application Ap2.

FIG. 20L illustrates a transition from FIG. 20K in response to detecting user input 20050 that requests to enlarge user interface 20054. In the scenario of FIG. 20L, user interface 20054 of application Ap2 is enlarged, such that it overlaps user interface 20052 of application Ap1 by more than the occlusion threshold $T_o$ (e.g., the amount of overlap $O_a$ between user interface 20052 and user interface 20054 is more than the occlusion threshold $T_o$ as illustrated in top view 20040 of FIG. 20L, e.g., $O_a > T_o$). However, because user interface 20052 of application Ap1 and user interface 20054 of application Ap2 have a difference in depth that is more than a respective threshold depth $T_D$ from the viewpoint of the user, the position of user interface 20052 of application Ap1 (e.g., the one that is being occluded) is maintained (e.g., as opposed to being shifted as described below with reference to FIGS. 20M-20O).

In FIG. 20M, user interface 20052 of application Ap1 and user interface 20054 of application Ap2 are not overlapping (e.g., from the viewpoint of the user 7002) and have a difference in depth that is less than a respective threshold depth $T_D$ from the viewpoint of the user (e.g., as illustrated in top view 20040 in FIG. 20M) (e.g., in contrast to FIG. 20K in which user interfaces 20052 and 20054 have a difference in depth that is more than the respective threshold depth $T_D$). In FIG. 20K, the computer system 101 detects user input 20053, directed towards resize affordance 20054a, that requests to resize (e.g., enlarge) user interface 20054 of application Ap2.

FIG. 20N illustrates a transition from FIG. 20M in response to detecting user input 20053 that requests to enlarge user interface 20054 of application Ap2. In the scenario of FIG. 20N, user interface 20054 of application Ap2 is enlarged, such that it overlaps user interface 20052 of application Ap1 by more than the occlusion threshold $T_o$ (e.g., the amount of overlap $O_a$ between user interface 20052 and user interface 20054 is more than the occlusion threshold $T_o$ as illustrated in top view 20040 of FIG. 20L, e.g., $O_a > T_o$). In accordance with a determination that the amount of overlap $O_a$ between user interface 20052 and user interface 20054 is more than the occlusion threshold $T_o$ and that user interface 20052 of application Ap1 and user interface 20054 of application Ap2 are in depth conflict (e.g., $d < T_D$ as illustrated in top view 20040 in FIG. 20N), the computer system 101 automatically shifts the underlying or occluded user interface, such as user interface 20052 of application Ap1. In some embodiments, user interface 20052 of application Ap1 is moved to an extent necessary to reduce the amount of overlap $O_a$ between application user interface 20052 and application user interface 20054 (e.g., from the viewpoint of user 7002) to less than the occlusion threshold $T_o$. In the scenario of FIG. 20N, user interface 20052 of application Ap1 is moved in a leftward direction.

Figures 20O, 20P:
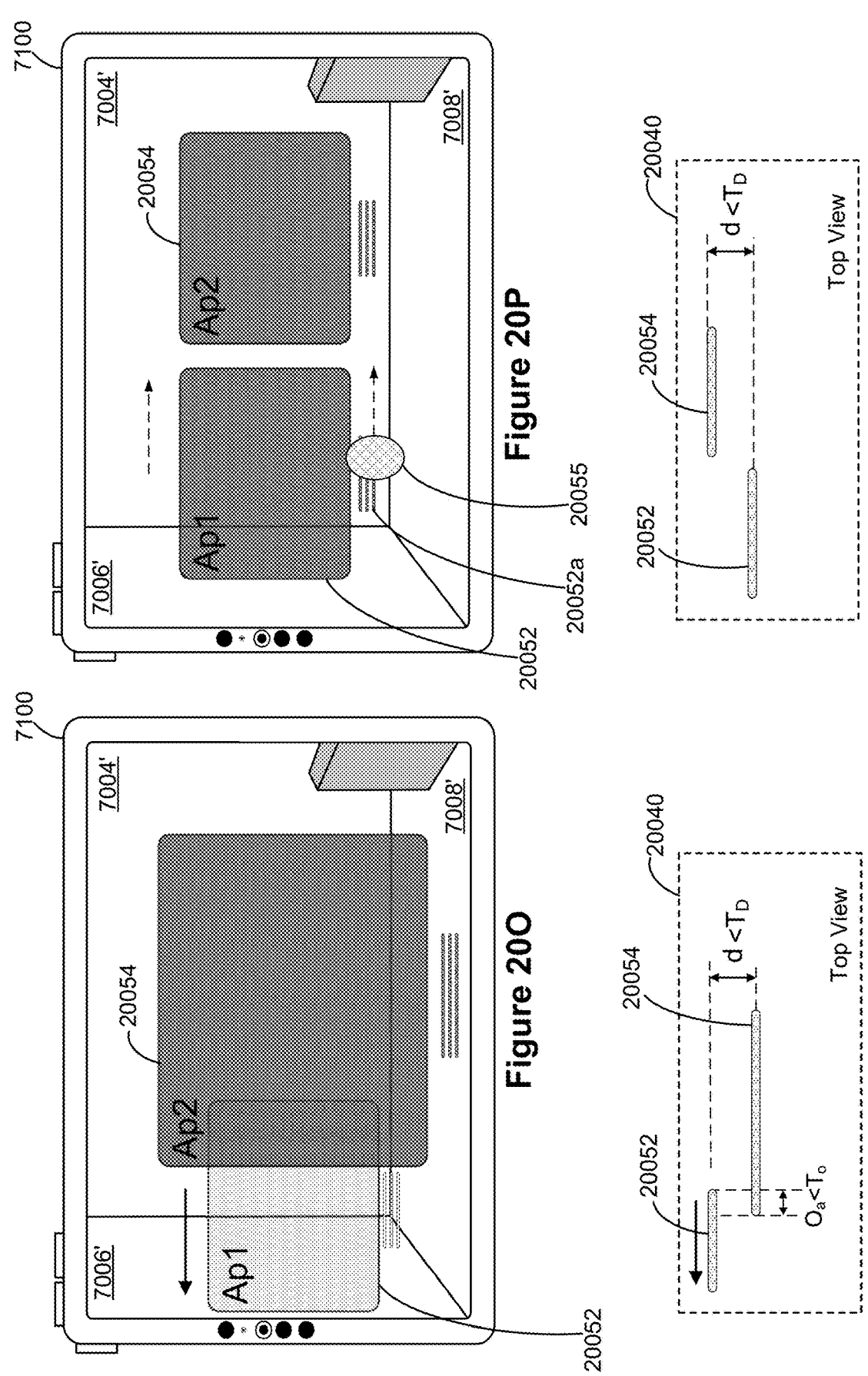

FIG. 20O illustrates a transition from FIG. 20N after the computer system 101 shifts user interface 20052 of application Ap1 in the leftward direction. As illustrated in top view 20040 in FIG. 20O, the amount of overlap $O_a$ between application user interface 20054 and application user interfaces 20052 (e.g., from the viewpoint of user 7002) is reduced to an amount that is less than the occlusion threshold $T_o$ (e.g., $O_a < T_o$) (optionally without changing respective depths at which user interface 20052 of application Ap1 and/or user interface 20054 of application Ap2 are displayed).

In some embodiments, when a respective object is moved (e.g., user interface 20052 of application Ap1), such that the respective object both occludes and is in depth conflict with a pre-existing object (e.g., user interface 20054 of application Ap2), the computer system 101 automatically shifts the pre-existing object, such that at least a threshold amount of visibility of the pre-existing object is maintained, as described in further detail below with reference to FIGS. 20P-20R. In contrast, when a respective object is moved (e.g., user interface 20052 of application Ap1), such that the respective object occludes a pre-existing object (e.g., user interface 20054 of application Ap2) by more than the permitted occlusion threshold $T_o$ but is not in depth conflict with the pre-existing object, the computer system 101 does not shift the pre-existing object, as described in further detail with reference to FIGS. 20S-20T.

In FIG. 20P, user interface 20052 of application Ap1 and user interface 20054 of application Ap2 are not overlapping (e.g., from the viewpoint of the user 7002) and have a difference in depth that is less than a respective threshold depth $T_D$ from the viewpoint of the user (e.g., as illustrated in top view 20040 in FIG. 20P) (e.g., user interface 20052 of application Ap1 is in depth conflict with user interface 20054 of application Ap2). In FIG. 20P, the computer system 101 detects user input 20055 (e.g., an air pinch input, an air tap input, a pinch input, a tap input, an air pinch and drag input, an air drag input, a drag input, a click and drag input, a gaze input, and/or other input) directed towards grabber affordance 20052a requesting to move user interface 20052 of application Ap1 in a direction of user interface 20054 of application Ap2 (e.g., in the rightward direction, optionally while substantially maintaining a respective distance of user interface 20052 from user 7002).

Figures 20Q, 20R:
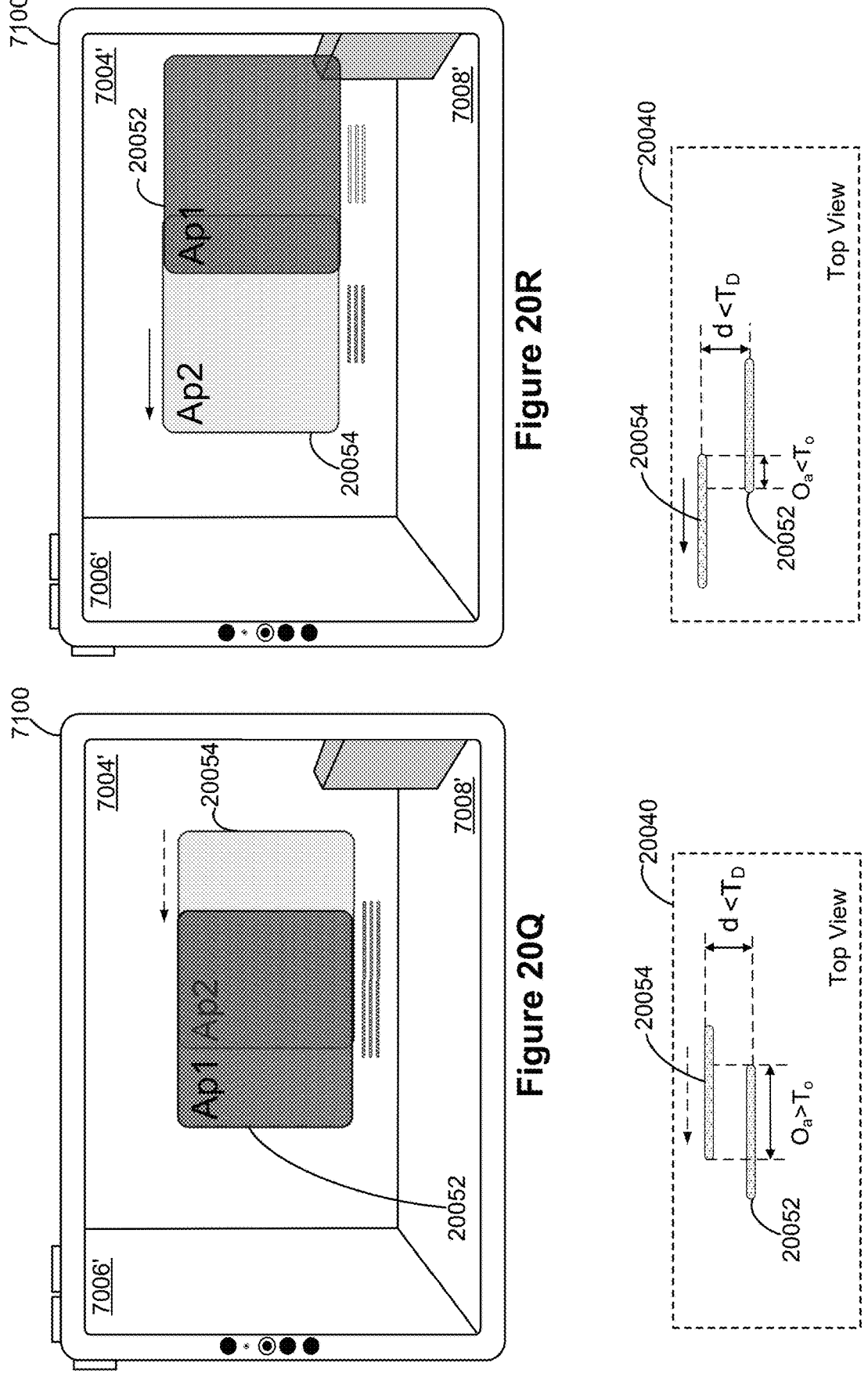

FIG. 20Q illustrates a transition from FIG. 20P in response to detecting user input 20055 (e.g., in FIG. 20P) moving user interface 20052 of application Ap1 in the direction of user interface 20054 of application Ap2. In the scenario of FIG. 20Q, user interface 20052 of application Ap1 is moved to an extent that user interface 20052 overlaps (e.g., from the viewpoint of the user) user interface 20054 by more than the occlusion threshold $T_o$ (e.g., the amount of overlap $O_a$ between user interface 20052 and user interface 20054 is more than the occlusion threshold $T_o$ as illustrated in top view 20040 of FIG. 20Q, e.g., $O_a > T_o$). In accordance with a determination the amount of overlap $O_a$ between user interface 20052 and user interface 20054 is more than the occlusion threshold $T_o$ and that user interface 20052 of application Ap1 and user interface 20054 of application Ap2 are in depth conflict (e.g., $d < T_D$ as illustrated in top view 20040 in FIG. 20Q), the computer system 101 automatically shifts the underlying or occluded user interface, such as user interface 20054 of application Ap2. In some embodiments, user interface 20054 of application Ap2 is (e.g., automatically) moved or shifted to an extent necessary to reduce the amount of overlap $O_a$ between application user interface 20052 and application user interface 20024 (e.g., from the viewpoint of user 7002) to less than the occlusion threshold $T_o$. In some embodiments, the underlying or occluded user interface, such as user interface 20054, is moved in the same direction as the direction in which the overlaying user interface is moved (e.g., in response to a user input such as an air pinch input, an air tap input, a pinch input, a tap input, an air pinch and drag input, an air drag input, a drag input, a click and drag input, a gaze input, and/or other input) (e.g., in the scenario of FIG. 20Q user interface 20054 would be moved in the rightward direction because user interface 20052 is moved in the rightward direction). In some embodiments, the underlying or occluded user interface is pushed in the opposite direction of the direction in which the overlaying user interface is moved (e.g., in response to detecting a user input such as an air pinch input, an air tap input, a pinch input, a tap input, an air pinch and drag input, an air drag input, a drag input, a click and drag input, a gaze input, and/or other input). For example, in the scenario in FIG. 20Q-20R, user interface 20052 is moved in the rightward direction in response to a user input (e.g., user input 20055 (e.g., an air pinch input, an air tap input, a pinch input, a tap input, an air pinch and drag input, an air drag input, a drag input, a click and drag input, a gaze input, and/or other input), as shown in FIG. 20P), whereas user interface 20054 slides underneath user interface 20052 in the opposite, e.g., in the leftward direction.

FIG. 20R illustrates a transition from FIG. 20Q after the computer system 101 shifts the underlying (e.g., or occluded) interface 20054 of application Ap2 in the leftward direction. As illustrated in top view 20040 in FIG. 20R, the amount of overlap $O_a$ between user interface 20052 and user interfaces 20054 (e.g., from the viewpoint of user 7002) is reduced to an amount that is less than the occlusion threshold $T_o$ (e.g., $O_a < T_o$) (optionally without changing a respective depth at which user interface 20052 and/or user interface 20054 are displayed) (e.g., $d < T_D$ as illustrated in top view 20040 in FIG. 20R).

In some embodiments, in the scenarios of FIGS. 20P-20R, in which the computer system 101 shifts the underlying (e.g., or occluded) interface 20054 of application Ap2 in accordance with a determination that the overlaying (e.g., conflicting) user interface 20052 of application Ap1 is moved such that the overlaying (e.g., conflicting) user interface 20052 both occludes and is in depth conflict with the underlying (e.g., or occluded) interface 20054 of application Ap2, the computer system 101 forgoes shifting the underlying interface 20054 in accordance with a determination that the overlaying user interface 20052 is moved too fast (e.g., the speed of movement of the overlaying user interface is more than a threshold amount of time).

In some embodiments, when a respective object is moved (e.g., user interface 20052 of application Ap1), such that the respective object occludes a pre-existing object (e.g., user interface 20054 of application Ap2) by more than the permitted occlusion threshold $T_o$ but is not in depth conflict with the pre-existing object, the computer system 101 does not shift the pre-existing object, as described in further detail with reference to FIGS. 20S-20T (e.g., in contrast to FIGS. 20P-20R in which the overlapping objects are in depth conflict).

Figures 20S, 20T:
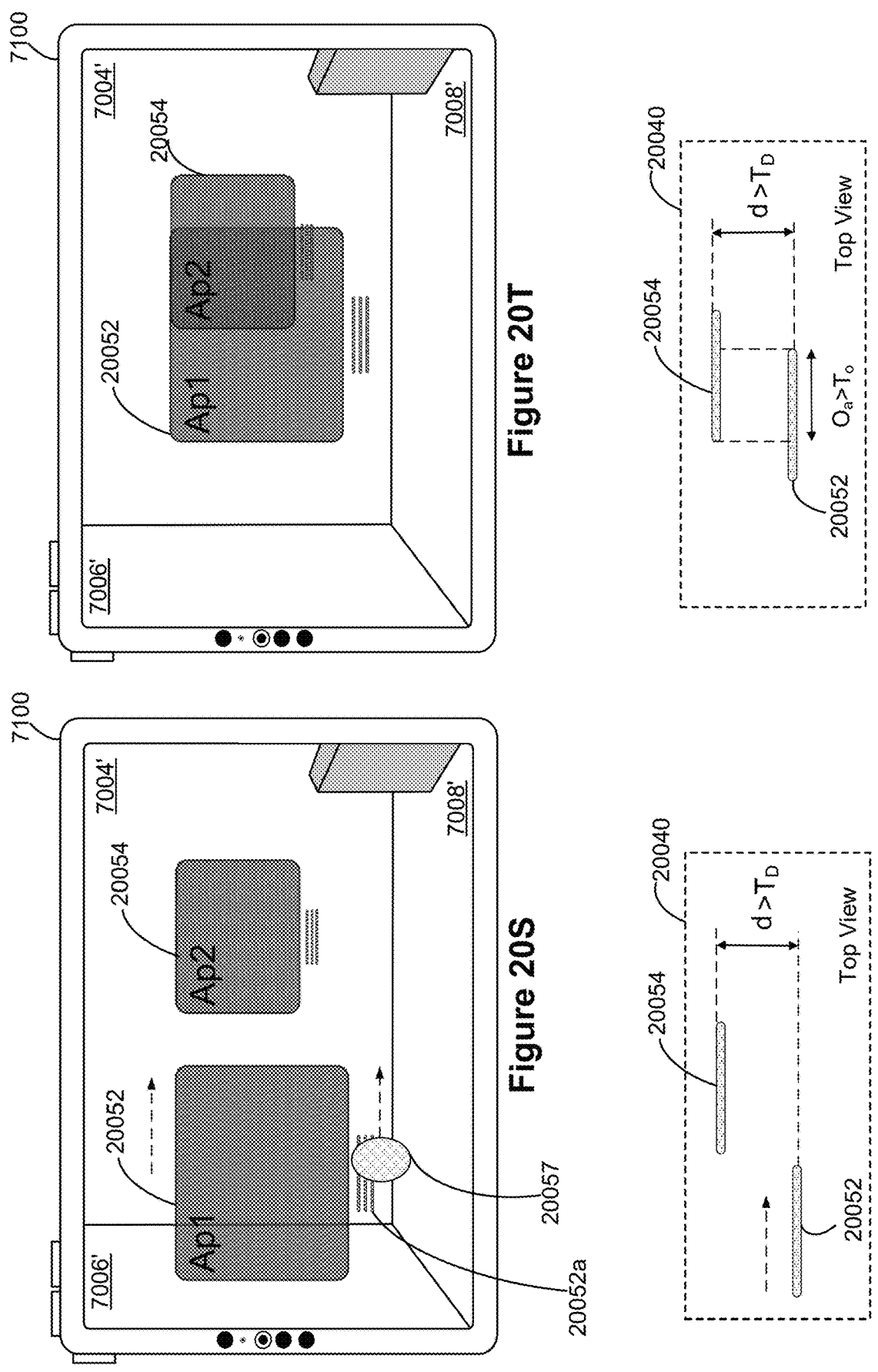

In FIG. 20S, user interface 20052 of application Ap1 and user interface 20054 of application Ap2 are not overlapping (e.g., from the viewpoint of the user 7002) and have a difference in depth that is more than a respective threshold depth $T_D$ from the viewpoint of the user (e.g., as illustrated in top view 20040 in FIG. 20S) (e.g., user interface 20052 of application Ap1 is not in depth conflict with user interface 20054 of application Ap2). In FIG. 20S, the computer system 101 detects user input 20057 (e.g., an air pinch input, an air tap input, a pinch input, a tap input, an air pinch and drag input, an air drag input, a drag input, a click and drag input, a gaze input, and/or other input) directed towards grabber affordance 20052a requesting to move user interface 20052 of application Ap1 in a direction of user interface 20054 of application Ap2 (e.g., rightward direction) (e.g., while substantially maintaining a respective distance of user interface 20052 from user 7002).

FIG. 20T illustrates a transition from FIG. 20S after the computer system 101 moved user interface 20052 of application Ap1 in a direction of user interface 20054 of application Ap2 (e.g., in response to user input 20057). In the scenario of FIG. 20T, user interface 20051 of application Ap1 is moved by such an amount or extent that user interface 20052 overlaps (e.g., from the viewpoint of the user) user interface 20054 by more than the occlusion threshold $T_o$ (e.g., the amount of overlap $O_a$ between user interface 20052 and user interface 20054 is more than the occlusion threshold $T_o$ as illustrated in top view 20040 of FIG. 20T, e.g., $O_a > T_o$). However, because user interface 20052 of application Ap1 and user interface 20054 of application Ap2 have a difference in depth that is more than a respective threshold depth $T_D$ from the viewpoint of the user, the position of user interface 20052 of application Ap1 (e.g., the one that is being occluded) is maintained (e.g., as opposed to being shifted as described above with reference to FIGS. 20P-20R).

In some embodiments, when an application is launched, such as application Ap8, and a respective user interface of the launched application occludes a pre-existing user interface, such as user interface 20024 of application Ap5, by more than a respective occlusion threshold $T_o$, but the respective user interface and pre-existing user interface are not in depth conflict, the computer system 101 maintains position of the pre-existing user interface even though less than a respective amount of the pre-existing user interface is visible (e.g., as opposed to automatically shifting the pre-existing user interface to reduce the amount of occlusion or overlap, as described herein with reference to FIGS. 20A-20F).

Figures 20U, 20V:
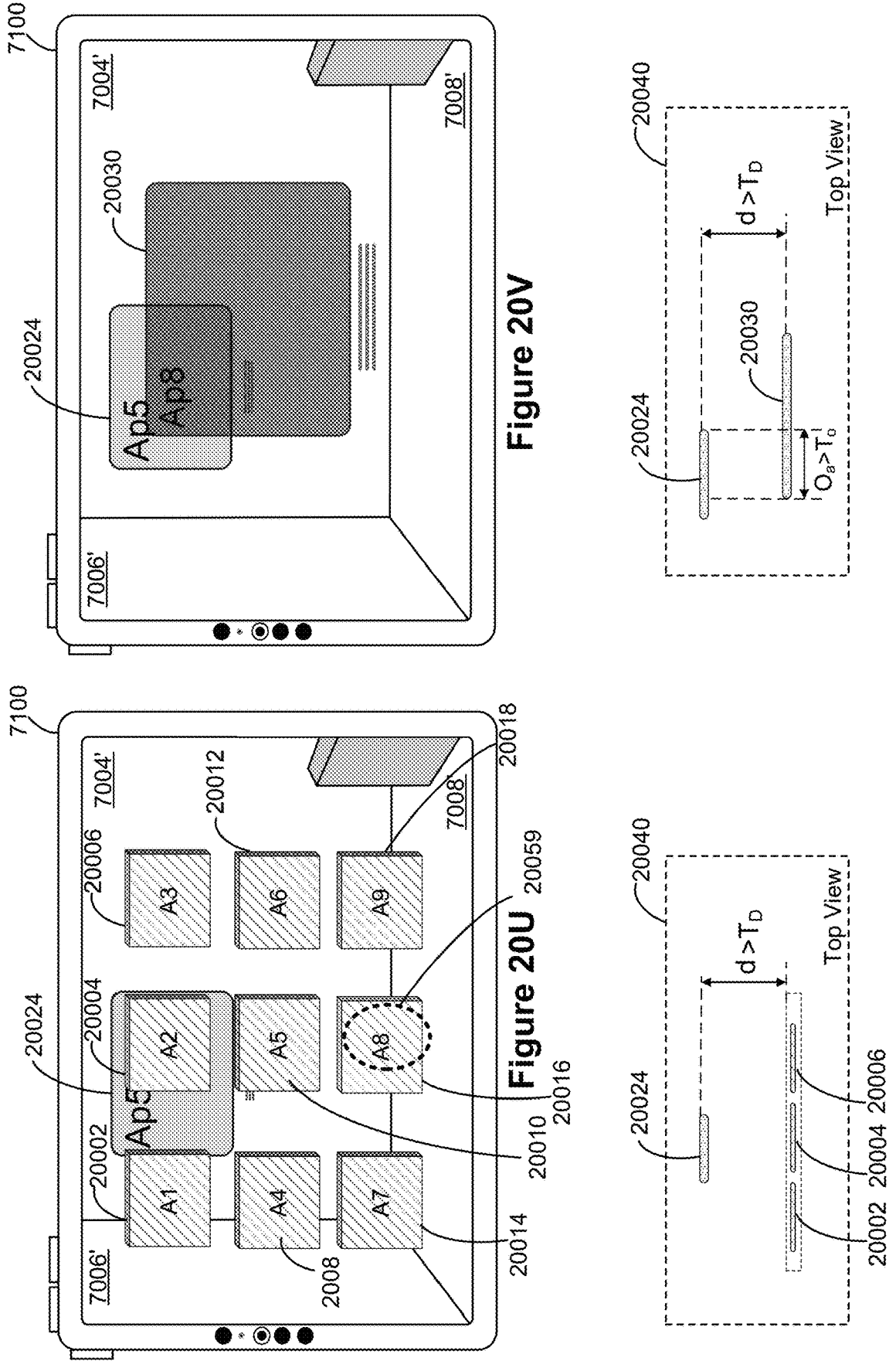

FIG. 20U illustrates that user interface 20024 of application Ap5 is displayed behind application icons A1 20002-A9 200018 of home user interface 20100, from the viewpoint of user 7002. The distance d between user interface 20024 and application icons A1 20002-A9 200018 of home user interface 20100 is more than a respective threshold depth $T_D$, as illustrated in top view 20040 in FIG. 20U. Further, in the scenario of FIG. 20U, user input 20059 (e.g., an air pinch input, an air tap input, a pinch input, a tap input, an air pinch and drag input, an air drag input, a drag input, a click and drag input, a gaze input, and/or other input) directed to application icon A8 20016 is detected. User input 20059 (e.g., an air pinch input, an air tap input, a pinch input, a tap input, an air pinch and drag input, an air drag input, a drag input, a click and drag input, a gaze input, and/or other input) corresponds to a request to launch application Ap8 that corresponds to application icon A8 20016.

FIG. 20V is a transition from FIG. 20U after application Ap8 is launched and user interface 20030 of application Ap8 is displayed. As illustrated in top view 20040 in FIG. 20V, application user interface 20030 of Ap8 is displayed in front of application user interface 20024 of Ap5 (e.g., from a viewpoint of user 7002). Further, user interface 20030 of application Ap8 overlaps and/or occludes application user interface 20024 of application Ap5 (e.g., from a viewpoint of user 7002) by more than an occlusion threshold $T_o$. For example, the amount of overlap $O_a$ between user interface 20030 and application user interface 20024 (e.g., from a viewpoint of user 7002) is greater than the occlusion threshold $T_o$, e.g., $O_a > T_o$ (as illustrated in top view 20040 in FIG. 20D).

However, because user interface 20030 of application Ap8 and user interface 20024 of application Ap5 are sufficiently far apart (e.g., have a difference in depth that is more than a respective threshold depth $T_D$ from the viewpoint of the user), the position of user interface 20024 of application Ap5 (e.g., the one that is being occluded) is maintained (e.g., as opposed to being shifted as described above with reference to FIGS. 20A-20F).

In some embodiments, when an application is launched and a respective user interface of the launched application both occludes and is depth conflict with one or more pre-existing user interfaces, the one or more pre-existing user interfaces shift in different directions. For example, in FIGS. 20W-20X, after application Ap3 is launched and user interface 2066 is displayed, as shown in FIG. 20X, pre-existing user interface 2062 shifts in a lateral direction whereas user interface 2064 in a vertical direction (e.g., but, optionally, without a change in depth from the viewpoint of the user) to reduce the amount of overlap.

Additional descriptions regarding FIGS. 20A-20X are provided below in reference to method 24000 described with respect to FIG. 24.

FIGS. 21A-21Y illustrate example techniques for reconfiguring a home menu user interface in a mixed-reality three-dimensional environment. FIG. 25 is a flow diagram of an exemplary method 25000 for reconfiguring a home menu user interface in a mixed-reality three-dimensional environment. The user interfaces in FIGS. 21A-21Y are used to illustrate the processes described below, including the processes in FIG. 25.

FIG. 21A illustrates a view of a three-dimensional environment 2000' that is visible to a user, such as user 7002 in FIG. 7A, via a display generation component of computer system, such as display generation component 7100 of computer system 101, as described in further detail with reference to FIG. 7A. The view of the three-dimensional environment 20000' (also called view 20000' for ease of reference) of FIG. 21A includes a representation (or optical view) of a portion of physical environment 7000. For example, view 20000' of FIG. 21A includes representations (or optical views) of wall 7004', wall 7006', floor 7008', and box 7014', as described herein with reference to FIGS. 7A-7B.

In addition, view 20000' in FIG. 21A includes one or more computer-generated objects displayed via display generation component 7100, such as a home menu user interface 21100 that includes an arrangement of application icons A1 21002, A2 21004, A3 21006, A4 21008, A5 21010, A6 21012, A7 21014, A8 21016, and A9 21018 (also collectively called application icons A1 21002-A9 210018 or application icons 21002-21018), and page navigation element 21022 (e.g., which are not representations or optical view of a physical region in physical environment 7000). In some embodiments, home menu user interface 21100 has multiple sections (e.g., a multi-section arrangement of application icons, including application icons 21002-21018 arrangement on a first section of home menu user interface 21100). The page navigation element 21022 indicates both the total number of sections (sometimes referred to as pages) in the home menu user interface 21100 and the position of a respective section, currently displayed in view 20000', in a sequence of sections of the home menu user interface 21100. For example, in the scenario of FIGS. 21A-21R home menu user interface 21100 includes four sections or pages, each of the four indicated by a respective page indicator icon (e.g., a circle) in page navigation element 21022, such as page indicator icon 21022a, page indicator icon 21022b, page indicator icon 21022c, and page indicator icon 21022d. In the scenario of FIGS. 21A-21J, the first page of home menu user interface is displayed in view 2000' and this is indicated by the page indicator icon 21022a (e.g., a filled circle indicates currently displayed page, whereas unfilled circles in the page navigation element 21022 illustrated remaining pages that are not currently displayed, such as page indicator icons 21022b, 21022c, and 21022d). In some embodiments, visibility of page navigation element 21022 is displayed on the currently displayed page of home menu user interface 21100 and other pages of home menu user interface 21100 and optionally visibility of page navigation element 21022 is maintained when pages of home menu user interface 21100 are scrolled (e.g., in conjunction with indicating which page is currently active by changing the appearance of a respective page indicator icon).

Home menu user interface 21100 corresponds to a user interface for launching applications via inputs directed to application icons, such as application icons A1 21002-A9 210018. In some embodiments, home menu user interface 21100 operates (and is optionally visually represented) in accordance with techniques described with reference to home user interface 1120, described in further detail with reference to FIGS. 11A-11L (e.g., specifically, applications are launched via a pluck gesture directed toward an application icon in home menu user interface 21100 in accordance with techniques described with reference to home user interface 1120 in FIGS. 11A-11L and method 17000 of FIG. 17). Further, in some embodiments, home menu user interface 21100 is scrolled in accordance with the techniques described in FIGS. 7A-7I (e.g., with reference to home user interface 8012) and method 1200 of FIG. 12.

With reference to FIGS. 21A-21Y, gaze and/or air gestures, including direct or indirect air gestures, such as pinch gestures, long pinch gestures, pinch and drag gestures, or double pinch gestures are used to interact with virtual objects in view 20000' (e.g., application icons A1 21002-A9 210018, pages 21072-21078 of home user menu interface 21100 and/or other computer-generated content in view 20000'), according to some embodiments. In some embodiments, touch inputs detected via a touch sensitive surface (e.g., touch-sensitive surface of display generation component 10100 or trackpad 10102 in FIG. 10A) are used to interact with application virtual objects in view 20000' in addition to or alternatively to using air gestures and/or gaze.

In some embodiments, when an icon reconfiguration mode is active, positions and/or availability of application icons in an arrangement of a home menu user interface (e.g., an arrangement of application icons 21002-21018 in home menu user interface 21100) can be adjusted in response to user inputs (e.g., in contrast, positions and/or availability of application icons in a normal mode (e.g., a non-reconfiguration mode) are not adjustable, as is the case in the scenario of FIGS. 21A-21B), as described in further detail with respect to FIGS. 21A-21L. In conjunction with activating the icon reconfiguration mode (e.g., after, before, in response to, or in response to an event that cause the device to do enter the icon reconfiguration mode, substantially simultaneously with activating the icon reconfiguration mode, or concurrently with activating the icon reconfiguration mode), passthrough portions of a three-dimensional environment, such as view 2000' are visually deemphasized, as shown in FIGS. 21C-21L, relative to an arrangement of application icons included in a home user interface, such application icons A1 21002-A9 210018 included in a first page of home menu user interface 21100 or other application icons included in other pages of home menu user interface 21100.

In some embodiments, the icon reconfiguration mode is invoked by selecting a "reconfiguration mode" affordance, such as control 21024a, displayed in a menu for reconfiguring a home menu user interface, such as menu 21024, as described in further detail with reference to FIGS. 21A-21C.

In the scenario of FIG. 21A, while a first page of home menu user interface 21100 is displayed (e.g., indicated by page indicator 21022a), the computer system detects a user input 21020 (e.g., an air pinch input, an air tap input, a pinch input, a tap input, an air pinch and drag input, an air drag input, a drag input, a click and drag input, a gaze input, and/or other input) directed to application icon 21010 in home menu user interface 21100. In some embodiments, user input 21020 is a long pinch (e.g., indirect air gesture) performed with user 7002's hand while application icon 21010 has input focus (e.g., while application icon 21010 has been selected by a concurrently and/or previously detected gaze input, selected by a concurrently or previously detected pointer input, and/or selected by a concurrently and/or previously detected gesture input). In some embodiments, the long pinch is a direct air gesture performed at a location in the physical environment 7000 that corresponds to the region of application icon 21010 in view 2000'. In response to the detection of user input 21020, menu for reconfiguring a home screen 21024 (also referred to as menu 21024) is displayed in FIG. 21B.

FIG. 21B illustrates that, in response to user input 21020, menu 21024 is displayed. In the scenario of FIG. 21B, menu 21024 includes two control options: control option 21024a for activating the icon reconfiguration mode (e.g., sometimes referred to as reconfiguration affordance), and control option 21024b for deleting a currently selected application icon, such as application icon 21010. In the scenario of FIG. 21B, in conjunction with displaying menu 21024, the computer system 101 visually emphasizes the selected application icon 21010 (e.g., enlarges, highlights, move towards user 7002 along a z axis (e.g., or depth axis) of the three-dimensional environment) relative to other application icons of application icons A1 21002-A9 210018 that are not selected. Visually emphasizing the selected application icon 21010 indicates that menu 21024 is displayed in the context of application icon 21010 and that controls that are pertinent to an application icon (e.g., control option 21024b for deleting a currently selected application icon), will perform operation with respect to the selected application icon 21010.

In the scenario of FIG. 21B, computer system 101 detects input 21021 selecting control option 21024a for activating the icon reconfiguration mode. In response to detection of the selection of control option 21024a, computer system 101 activates the icon reconfiguration mode. In the icon reconfiguration mode, positions and/or availability of application icons in an arrangement of a home menu user interface (e.g., an arrangement of application icons 21002-21018 in home menu user interface 21100) can be adjusted in response to user inputs, as described below in further detail with respect to FIGS. 21C-21L.

In some embodiments, upon activation of the first reconfiguration mode, passthrough portions that are in the current viewport (e.g., passthrough portions of view 2000' in FIGS. 21C-21L) are visually deemphasized (e.g., by darkening, obscuring, reducing brightness, reducing opacity and/or reducing size) and appearance of application icons included in the currently displayed page of home menu user interface 21100 are changed (e.g., application icons A1 21002-A9 210018 of home menu user interface 21100), as shown in FIGS. 21C-21D.

FIG. 21C (e.g., FIGS. 21C1 and 21C2) illustrates that, upon activation of the icon reconfiguration mode, passthrough portions of view 2000' are darkened. In the scenario of FIGS. 21C, walls 7004' and 7006, and floor 7008' and physical object 7014' are darkened. In conjunction with darkening passthrough portions of view 2000', appearance of the currently displayed page of home menu user interface 21100, including application icons A1 21002-A9 210018, is changed upon activation of the icon reconfiguration mode, as shown in FIGS. 21C-21D. For example, in the scenario of FIGS. 21C, a respective "delete" icon is displayed near the top left corner of application icons A1 21002-A9 210018, e.g., icon 21022*a* near top left corner of application icon A1 21002. The delete icons associated with a respective application icon of application icons A1 21002-A9 210018 are used for deleting the respective application icon from (e.g., removing the respective icon from home menu user interface 21100). For example, icon 21022*a* when selected (e.g., via a tap or air gesture) causes the computer system 101 to delete application icon A1 21002 from the first page of home menu user interface 21100. Further, upon activating of the icon reconfiguration mode, Cancel control 21026 and Done control 21028 are displayed. Cancel control 21026, when selected, causes the computer system to exit the icon reconfiguration mode without persisting any changes that may have been made to the availability and/or positions of application icons in home menu user interface 21100, whereas Done control 21028 when selected, causes the computer system to exit the icon reconfiguration mode while also persisting any changes that may have been made to the availability and/or positions of application icons in home menu user interface 21100.

FIG. 21D (e.g., FIGS. 21D1 and 21D2) illustrates that, upon activation of the icon reconfiguration mode and optionally while the icon reconfiguration mode is active, application icons A1 21002-A9 210018 are jiggling (e.g., tilting left and right) to indicate that the placement locations of the application icons A1 21002-A9 210018 can be adjusted in accordance with user inputs (e.g., in contrast to the scenario in FIGS. 21A-21B in which the home menu user interface 21100 is a normal mode (e.g., non-reconfiguration mode) and application icons A1 21002-A9 210018 remain stationary at their respective locations in the arrangement of application icons A1 21002-A9 210018). In some embodiments, the jiggling of application icons A1 21002-A9 210018 is a movement that is animated (e.g., optionally continuously while the icon reconfiguration mode is active). In the scenario of FIGS. 21D, the computer system detects user input 21030 (e.g., an air pinch input, an air tap input, a pinch input, a tap input, an air pinch and drag input, an air drag input, a drag input, a click and drag input, a gaze input, and/or other input) directed to application icon A5 21010. User input 21030 includes a selection input (e.g., selecting application icon A5 21010) followed by a movement input requesting to move application icon A5 21010 from second column on the second row of the arrangement of application icons A1 21002-A9 210018 to a position in between application icon A1 21002 and application icon A2 21004 in the first row of the arrangement of application icons A1 21002-A9 210018, as illustrated by the dashed arrow in FIG. 21D. In some embodiments, user input 21030 is an air gesture, such as a direct or indirect air gesture (e.g., a pinch and drag gesture). In some embodiments, user input 21030 is a touch-gesture detected on a touch-sensitive surface (e.g., a trackpad, touch-sensitive display, and/or other touch-sensitive surface).

Figures 21E, 21F:
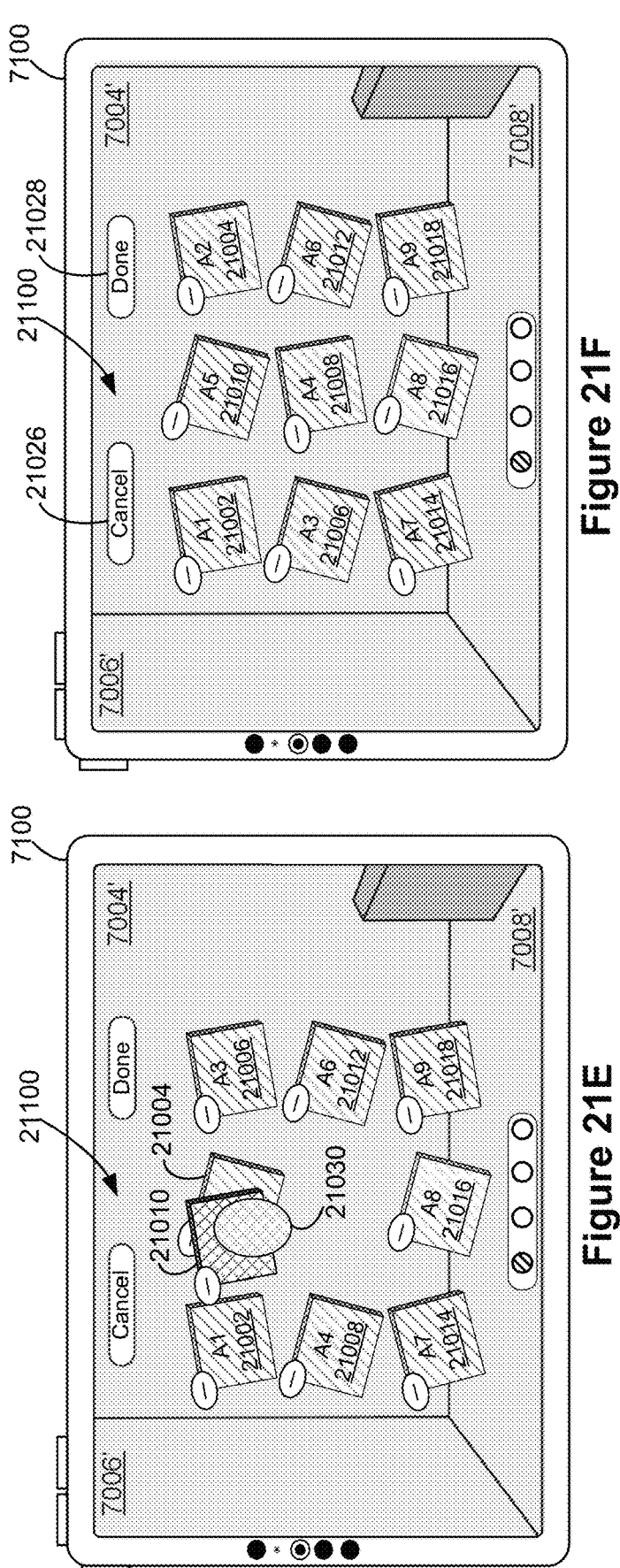

FIG. 21E shows a transition from FIG. 21C in response to the detection of user input 21030. FIG. 21E illustrates an intermediate state of the arrangement of application icons A1 21002-A9 210018 while user 7002 is dragging application icon A5 21010 in accordance with (e.g., responsive to) user input 21030. In the scenario of FIGS. 21D, the computer system 101 detects end of user input 21030 (e.g., a lift off, depinch, or other release input) that drops application icon A5 21010 slightly over application icon A2 21004 at a location approximately in between application icon A1 21002 and application icon A2 21004.

FIG. 21F shows a transition from FIG. 2D in response to the detecting that application icon A5 21010 is dropped at the position in between application icon A1 21002 and application icon A2 21004 in the first row of the arrangement of application icons A1 21002-A9 210018. In response to detecting that application icon A5 21010 is dropped, the computer system 101 automatically shifts application icons A2 21004-A4 21008, e.g., application icons A2 21004-A4 21008 are shifted by one position in a rightward direction to make room for application icon A5 21010 in the second column of the first row in the arrangement of application icons A1 21002-A9 210018. For example, application icon A2 21004 is moved to third column from the second column in the first row, application icon A3 21006 is moved from the third column (e.g., last) on the first row down to the second row in the first column of the second row, and application icon A4 21008 is moved from the first column in the second row to the second column in the second row. Remaining application icons A6 21012-A9 21018 are not shifted or positioned. The computer system 101 animates the movement shifting application icons A2 21004-A4 21008 to provide visual feedback to user 7002 that the repositioning of application icon A5 21010 is successfully completed. In some embodiments, the rearrangement of application icons A1 21002-A9 210018 in the scenario in FIG. 21F can be persisted upon selecting Done control 21028. In some embodiments, the computer system 101 automatically shifts application icons while respective one or more other applications icons are being moved (e.g., before the respective one or more applications are dropped to an updated position in the arrangement) (e.g., illustrated in FIG. 21I).

In some embodiments, the icon reconfiguration mode can be invoked using different techniques. In the scenario of FIGS. 21A-21C, the icon reconfiguration mode is invoked in response to selecting a "reconfiguration mode" affordance (e.g., control 21024*a*) displayed in a menu (e.g., menu 21024). In other scenarios, the icon reconfiguration mode is invoked in response to a long pinch gesture (e.g., an air gesture, such as an index and thumb finger of user 7002's hand making contact with one another for a threshold amount of time while the user 7002's hand remains stationary by not moving more than a threshold amount during the threshold amount of time) directed to an application icon (e.g., of application icons 21002-21018) in home menu user interface 21100. For example, activating the icon reconfiguration mode in response a long air pinch gesture (e.g., without the need for movement input), such as long pinch gesture 280, is described in further detail below with reference to FIGS. 28E-28F. In some embodiments, the long pinch gesture is indirect or direct air gesture. In some embodiments, the icon reconfiguration mode is directly invoked in response to the long pinch gesture (e.g., without the need for other conditions to be met or other inputs to be provided by user 7002, such as selecting a control in a menu or a movement input). In some embodiments, optionally, the long pinch gesture causes the computer system to display a menu for reconfiguring a home menu (e.g., menu 21024 in FIG. 21B). In other scenarios, the icon reconfiguration mode is invoked in response to a detection of a pinch and drag gesture (e.g., an air gesture) directed to an application icon (e.g., of application icons 21002-21018) in home menu user interface 21100. For example, selecting and dragging an application icon of application icons 21002-21018 causes the computer system 101 to directly invoke the icon reconfiguration (e.g., without the need for other conditions to be met or other inputs to be provided by user 7002, such as invoking a menu and/or selecting a menu option).

In some embodiments, the computer system 101 displays at least partially (e.g., reveals) at least some application icons of an adjacent page (e.g., the second page of home menu user interface 21100) in accordance with a determination that an application icon, such as application icon A5 21010 is moved (e.g., dragged) from a position in a currently displayed page towards the adjacent page, as described in further detail below with reference to FIGS. 21G-21L.

Figures 21G, 21H:
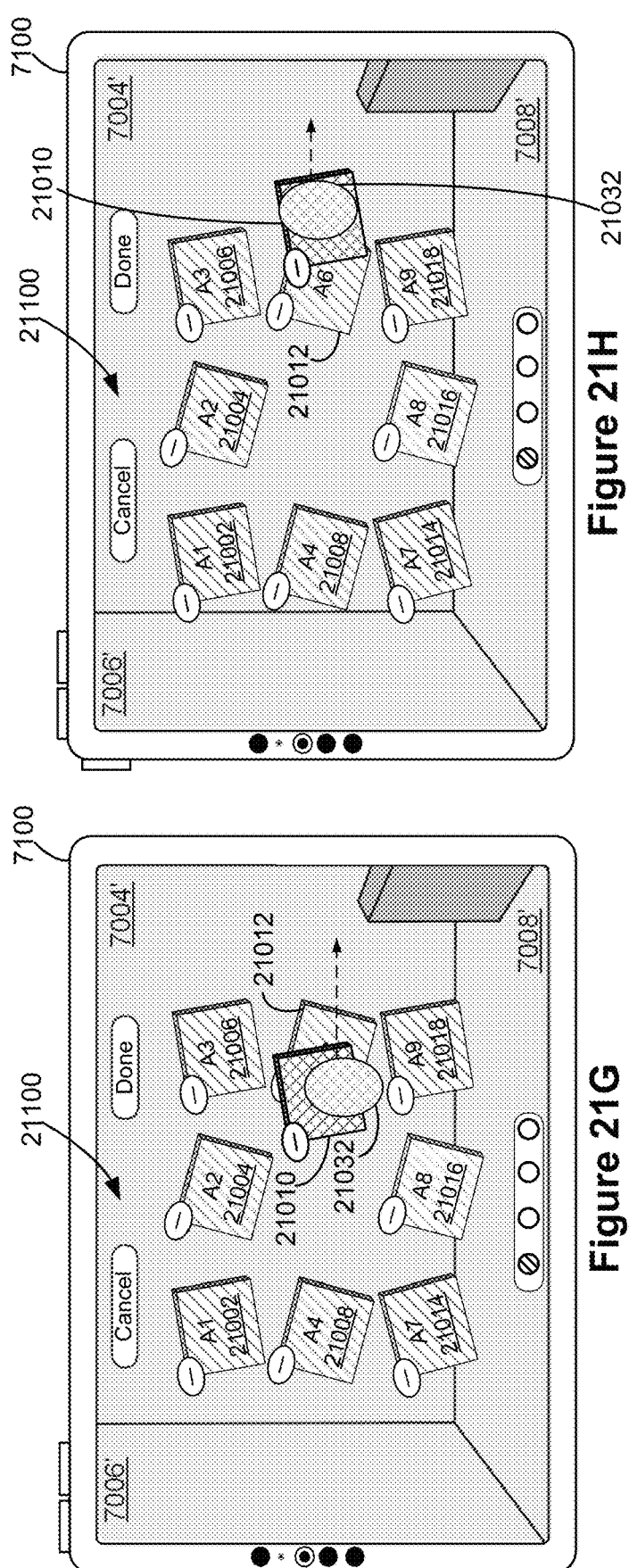

FIG. 21G shows a transition from FIG. 21C in response to the detection of user input 21032 (e.g., an air pinch input, an air tap input, a pinch input, a tap input, an air pinch and drag input, an air drag input, a drag input, a click and drag input, a gaze input, and/or other input). In some embodiments, user input 21032 is an air gesture, such as a direct or indirect air gesture (e.g., a pinch and drag gesture). In some embodiments, user input 21032 is a touch-gesture detected on a touch-sensitive surface (e.g., a trackpad, touch-sensitive display, and/or other touch-sensitive surface). User input 21032 includes a selection input (e.g., selecting application icon A5 21010) followed by a movement input requesting to move application icon A5 21010 in a rightward direction towards the right edge (e.g., border or side) of the viewport and thus towards the second page of home menu user interface 21100 (e.g., the second page is not yet visible in the scenario of FIG. 21G). FIGS. 21G-21H FIG. 21E illustrates an intermediate state of the arrangement of application icons A1 21002-A9 210018 while user 7002 is dragging application icon A5 21010 in accordance with (e.g., responsive to) user input 21032.

Figures 21I, 21J:
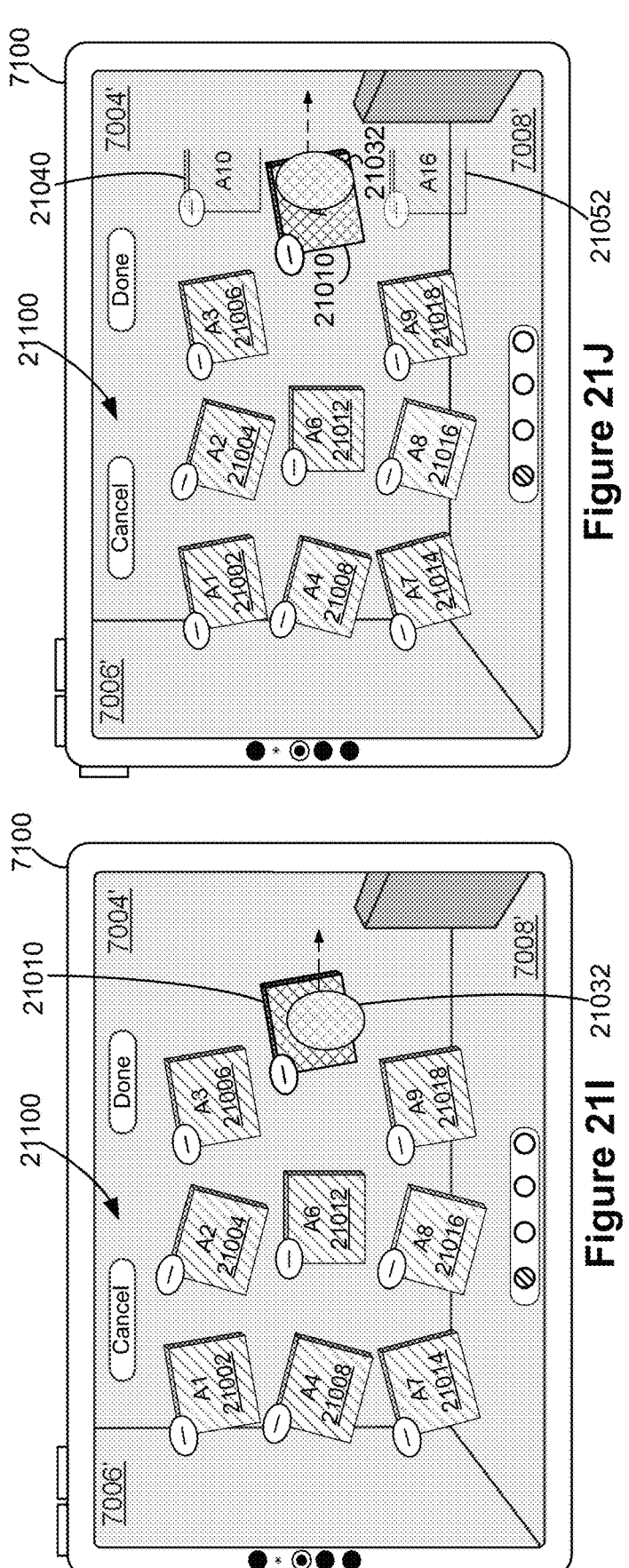

In some embodiments, before an application icon, such as application icon A5 21010, is dragged close enough to an adjacent page (e.g., the second page on the right side in the scenario of FIG. 21G-21I), application icons included in the adjacent page remain hidden, as illustrated in FIG. 21G-21I, and upon detecting that the application icon has moved close enough to the adjacent page, some application icons included in the adjacent page are at least partially revealed, as illustrated in FIG. 21J.

FIG. 21H shows a transition from FIG. 21G in response to the detection of further movement input included in user input 21032 in the rightward direction towards the right edge. FIG. 21E illustrates an intermediate state of the arrangement of application icons A1 21002-A9 210018 in accordance with (e.g., responsive to) user input 21032 before the movement of input 21032 (e.g., that drags application icon A5 21010) meets a threshold amount of movement or has moved to less than a threshold distance away from the right edge of the viewport. In particular in the scenario of FIG. 21H, application icon A5 21010 has moved closer to the right edge (e.g., pass application icon A6 21012) but not close enough to the second page. Accordingly, application icons included in the second page remain hidden, as illustrated in FIG. 21H.

FIG. 21I illustrates an intermediate state of the arrangement of application icons A1 21002-A9 210018 in accordance with (e.g., responsive to) user input 21032. In the scenario of FIG. 21I, the movement of input 21032 (e.g., that drags application icon A5 21010) has not yet met the threshold amount of movement or has not yet moved to less than the threshold distance away from the right edge of the viewport, as in FIG. 21H, but in contrast to FIG. 21H, application icon A6 21012 has shifted in a leftward direction to make room for application icon A5 21010 (e.g., even though the application icon A5 21010 is not dropped).

Figures 21K, 21L:
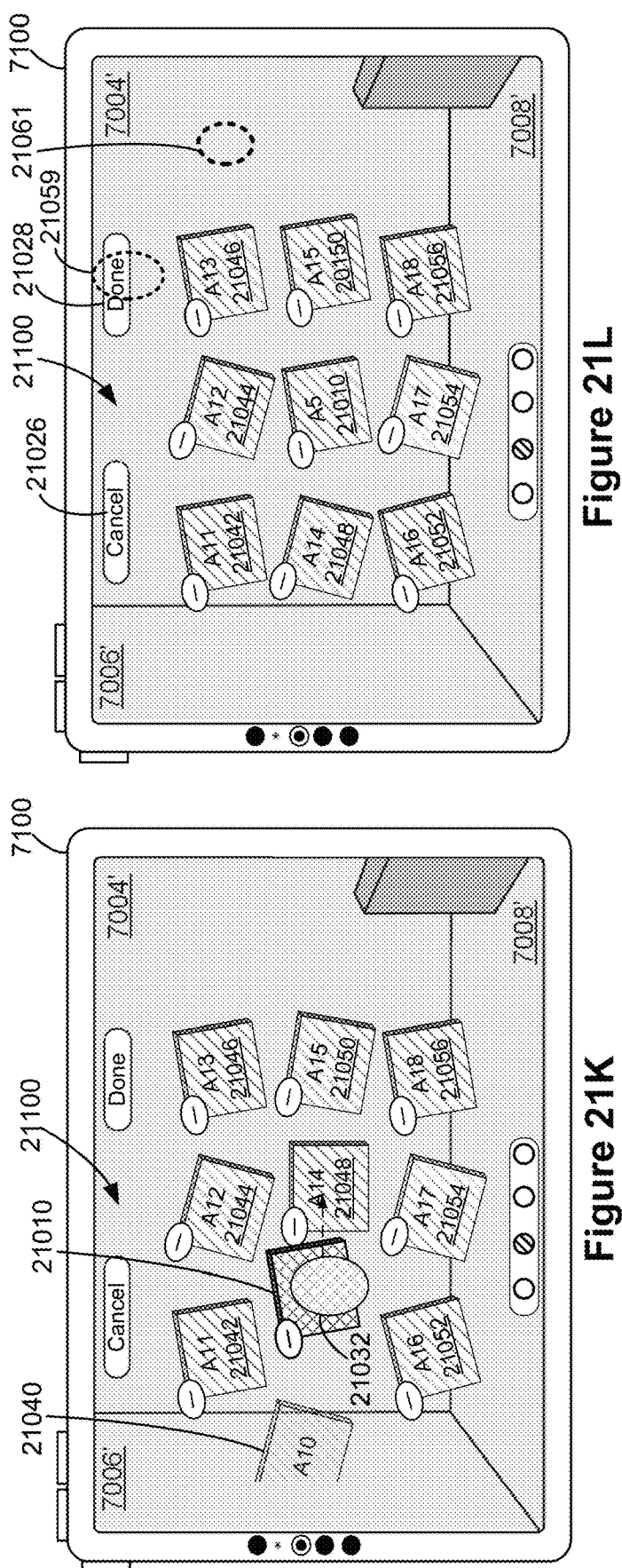

In some embodiments, if an application icon, such as application icon A5 21010, that is being moved from a location in a first page (e.g., currently displayed) in a direction of a second page (e.g., not yet displayed) is moved and held for more than a threshold amount of time outside the arrangement of application icons included in the first page (e.g., the arrangement of application icons A1 21002-A4 21008 and A6 21012-A9 210018) towards the second page, the arrangement of application icons in the second page gradually slide over or move in place of the arrangement of application icons in the first page and the arrangement of application icons in the first page gradually slide off (or cease to be displayed) from display, as described in further detail with respect to FIGS. 21J-21K.

FIG. 21J shows a transition from FIG. 21I in response to the detection of further movement input included in user input 21032 in the rightward direction towards the right edge. FIG. 21J illustrates an intermediate state of the arrangement of application icons included in home menu user interface 21100 in accordance with (e.g., responsive to) user input 21032. In the scenario of FIG. 21J, in accordance with a determination that the movement dragging application icon A5 21010 towards the right edge of the viewport met the threshold amount of movement or moved to less than the threshold distance away from the right edge, the computer system 101 automatically (e.g., without further user input needed to switch to the second page) reveals (e.g., displays) at least partially some application icons included in the second page (e.g., application icon A10 21040 and application icon A16 21052) before displaying the second page entirely (e.g., in contrast to the scenarios in FIGS. 21H-21J in which application icons included in the second page remain hidden because the movement threshold has not been met or because the application icon A5 21010 that is moved is more than the threshold distance away from the right edge).

In the scenario of FIG. 21J, the computer system 101 detects that application icon A5 21010, which is being relocated from a location in the first page (e.g., currently displayed) in a direction of the second page (e.g., not yet displayed), is held for more than a threshold amount of time outside the arrangement of application icons included in the first page (e.g., the arrangement of application icons A1 21002-A4 21008 and A6 21012-A9 210018) towards the second page (e.g., on the right side of the first page).

FIG. 21K is a transition from FIG. 21J in response to the detection of further movement input included in user input 21032 in the rightward direction towards the second page that is located on the right side of the first page. FIG. 21K illustrates that, in response to detection that application icon A5 21010 is held for more than a threshold amount of time outside the arrangement of application icons included in the first page (e.g., the arrangement of application icons A1 21002-A4 21008 and A6 21012-A9 210018) towards the second page, the arrangement of application icons in the second page gradually slide over or move (e.g., automatically) in place of the arrangement of application icons in the first page and the arrangement of application icons in the first page gradually slide off (or cease to be displayed) from display in view 20000'. In the scenario of FIG. 21K, page indicator icon 21022*b* changes appearance (e.g., from unfilled circle in FIG. 21J to pattern-filled circle in FIG. 21K) to indicate that the second page is now currently displayed in view 20000'. Further, as the application icon A5 21010 is moved into the arrangement of application icons in the second page, application icon A10 21034, which is part of the arrangement of application icons in the second page, slides off the second page and moves to the first page to make room for application icon A5 21010 in the arrangement of application icons in the second page. Before application icon A5 21010 is added to the arrangement of application icons in FIGS. 21K-21L, the second page of home menu user interface 21100 includes an arrangement of application icons A10 21040, A11 21042, A12 21044, A13 21046, A14 21048, A15 21050, A16 21052, A17 21054, and A18 21056 (also collectively called application icons A10 21040-A18 20056 or application icons 21040-20018).

FIG. 21K illustrates an intermediate state of home menu user interface 21100 after the computer system 101 automatically displayed the second page in place of the first page (e.g., responsive to input 21032) and while application icon A5 21010 continues to be held and moved (e.g., before application icon A5 21010 is dropped). As FIG. 21K illustrates, the page navigation element 21022 is displayed even when switching from one page to another of home menu user interface 21100 irrespective of whether the home menu user interface 21100 is in the icon configuration mode or not. The Cancel control 21026 and Done control 21028 are displayed while the first configuration mode continues to be active, even when switching from one page to another of home menu user interface 21100, as illustrated in FIG. 21K.

FIG. 21L illustrates a transition from FIG. 21K in response to detecting that application icon A5 21010 is dropped into a location in the second page. In the scenario of FIG. 21L, application icon A5 21010 is dropped in a location in the second page that was occupied by application icon A14 21048 before application icon A5 21010 moved over (e.g., or moved onto) or near previous location of application icon A14 21048 (e.g., location of application icon A14 21048 in FIG. 21K). In response to detecting that the application icon A5 21010 is dropped, the computer system automatically moves application icon A14 21048 away (e.g., shifts application icon A14 21048 by one position to the left) to make room for the dropped application icon A5 21010. After the rearrangement of home menu user interface 21100, the second page includes an arrangement of applications icons A11 21042-A14 20048, A5 21010, and A15 21060-A18 21056, where application A5 21010 was added to the second page in response to user input 21032, and application icon A10 21040 slid off from the second page into the first page, and application icons A11 21042, A12 21044, and A13 21046 shifted by one position to take the space that was freed by the relocation of application icon A10 21040.

In some embodiments, the icon reconfiguration mode can be exited in various ways, and depending on the manner of exiting changes made to the positions and/or availability of application icons in home menu user interface are kept or not. In some embodiments, icon reconfiguration mode in response to an input (e.g., an air pinch input, an air tap input, a pinch input, a tap input, an air pinch and drag input, an air drag input, a drag input, a click and drag input, a gaze input, and/or other input) selecting Cancel control 21026. For example, in the scenario of FIG. 21L, selecting Cancel control 21026 causes the computer system 101 to exit the icon reconfiguration mode and to cancel the rearrangement of application icons that was performed in accordance with (e.g., or responsive to) user input 21032. For example, when user 7002 navigates to the second page of home menu user interface 21100 after the cancelation, the second page includes applications A10 21040-A18 20056 (e.g., the second page is in the state the second page was in before activation of the first reconfiguration mode).

In some embodiments, the computer system 101 exits the icon reconfiguration mode in response to user input 21061 that is directed to a location in view 2000' that is outside the arrangement of application icons, such as outside the 3×3 grid that is formed by the arrangement of application icons A11 21042-A14 20048, A5 21010, and A15 21060-A18 21056. In some embodiments, exiting the icon reconfiguration mode in response to an input (e.g., an air pinch input, an air tap input, a pinch input, a tap input, an air pinch and drag input, an air drag input, a drag input, a click and drag input, a gaze input, and/or other input) directed outside the arrangement of application icons cancels any changes made to the positions and/or availability of application icons of home menu user interface 21100 while in the icon reconfiguration mode, and restores the state of the home menu user interface 21100 before activation of the first reconfiguration mode.

In some embodiments, the computer system 101 exits the icon reconfiguration mode in response to an input (e.g., an air pinch input, an air tap input, a pinch input, a tap input, an air pinch and drag input, an air drag input, a drag input, a click and drag input, a gaze input, and/or other input) selecting Done control 21028. For example, in FIG. 21L, the computer system 101 detects an input 21059 selecting Done control 21028 (e.g., an air pinch gesture, an air tap, or other air gesture or touch gesture). In response to input 21059 selecting Done control 21028, the computer system exits the icon reconfiguration mode (e.g., restores the home menu user interface 21100 to a normal mode in which the positions and/or availability of application icons are not adjustable) and persists the rearrangement of application icons that was performed in accordance with (e.g., or responsive to) user input 21032, as illustrated in FIG. 21M.

Figures 21M, 21N:
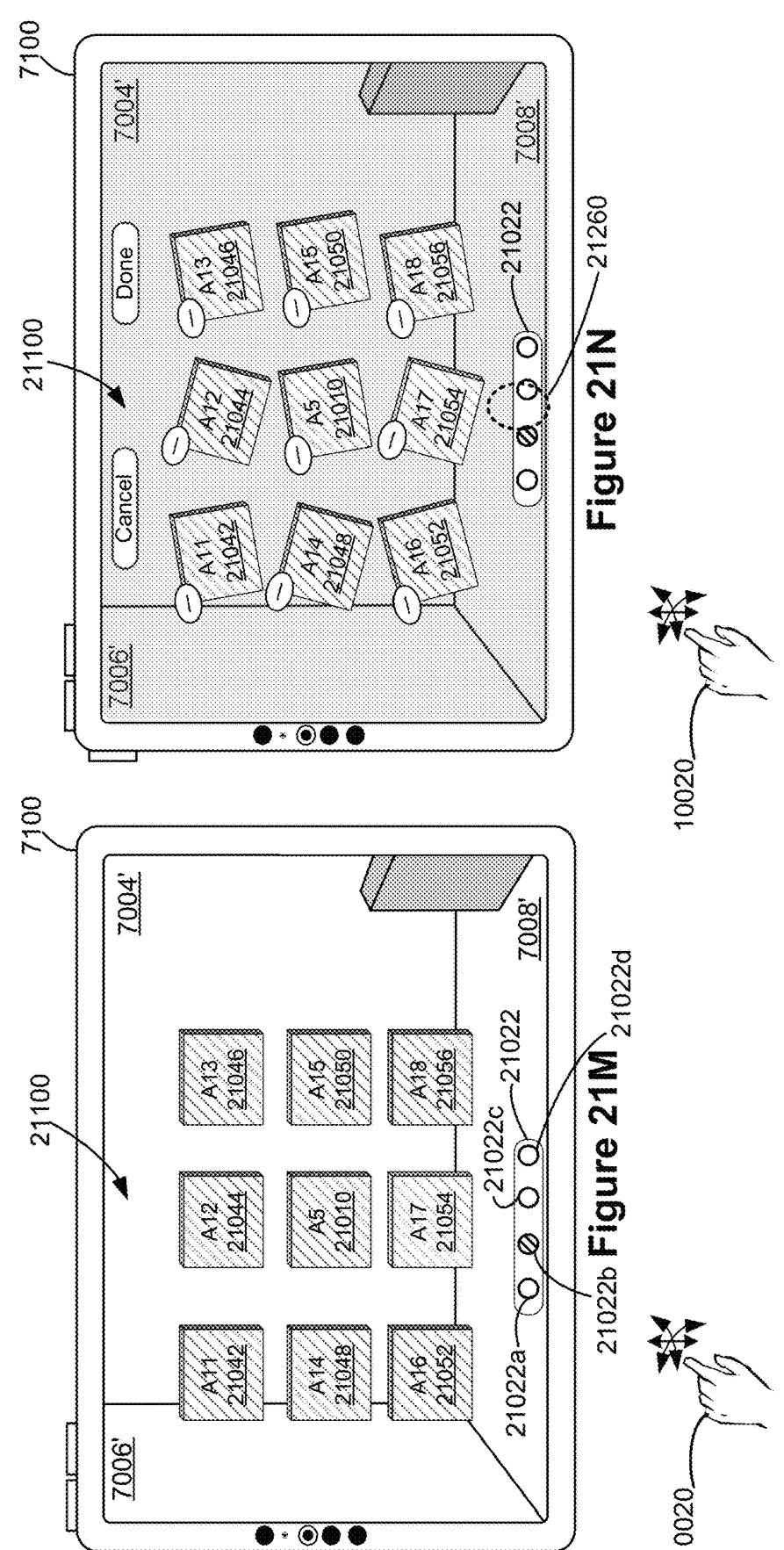

FIG. 21M illustrates a transition from FIG. 21L in response to input 21059 (e.g., an air pinch input, an air tap input, a pinch input, a tap input, an air pinch and drag input, an air drag input, a drag input, a click and drag input, a gaze input, and/or other input) selecting Done control 21028. In response to input 21059 selecting Done control 21028, the computer system exits the first reconfiguration mode and displays the second page in the normal the normal mode keeping the rearrangements made to the home user interface in response to user input 21032. For example, the second page includes an arrangement of applications icons A11 21042-A14 20048, A5 21010, and A15 21060-A18 21056, where application A5 21010 was added to the second page in response to user input 21032, and application icon A10 21040 slid off from the second page into the first page in response to user input 21032, and application icons A11 21042, A12 21044, and A13 21046 shifted by one position to take the space that was freed by the relocation of application icon A10 21040.

In some embodiments, application icons A1 21002-A9 21018 in the first page of home menu user interface 21100 are curved (FIG. 21A), and application icons A11 21042-A14 21048, application icon A5 21010 and A15 21050-A18 21056 in the second page of home menu user interface 21100 are curved (FIG. 21M).

In some embodiments, while a page reconfiguration mode is active, positions and/or availability of pages of a home menu user interface (e.g., pages 21072-21078 of home menu user interface 21100) can adjusted in response to user inputs, as described in further detail with respect to FIGS. 21N-21L. In conjunction with activating the page reconfiguration mode (e.g., after, before, in response to, or in response to an event that cause the device to do enter the page activation mode, substantially simultaneously with activating the page reconfiguration mode, or concurrently with activating the page reconfiguration mode), passthrough portions of a three-dimensional environment, such as view 2000' are visually deemphasized, as shown in FIGS. 21O-21P.

In some embodiments, the icon reconfiguration mode is invoked by selecting page navigation element, such as page navigation element 21022, as described in further detail with reference to FIG. 21N.

In the scenario of FIG. 21N, the second page of home menu user interface 21100, including page navigation element 21022, is displayed in view 20000' (e.g., after the rearrangement of application icons performed in response to user input 21032) in the first reconfiguration mode. The computer system 101 detects user input 21260 selecting page navigation element 21022 (e.g., an air gesture, such as a pinch, a long pinch, an air tap, or other air gesture or touch gesture). In response to user input 21260 selecting page navigation element 21022, home menu user interface 21100 directly enters the page reconfiguration mode (e.g., from the icon reconfiguration mode), as described in further detail below with reference to FIG. 21O.

Figure 21O:
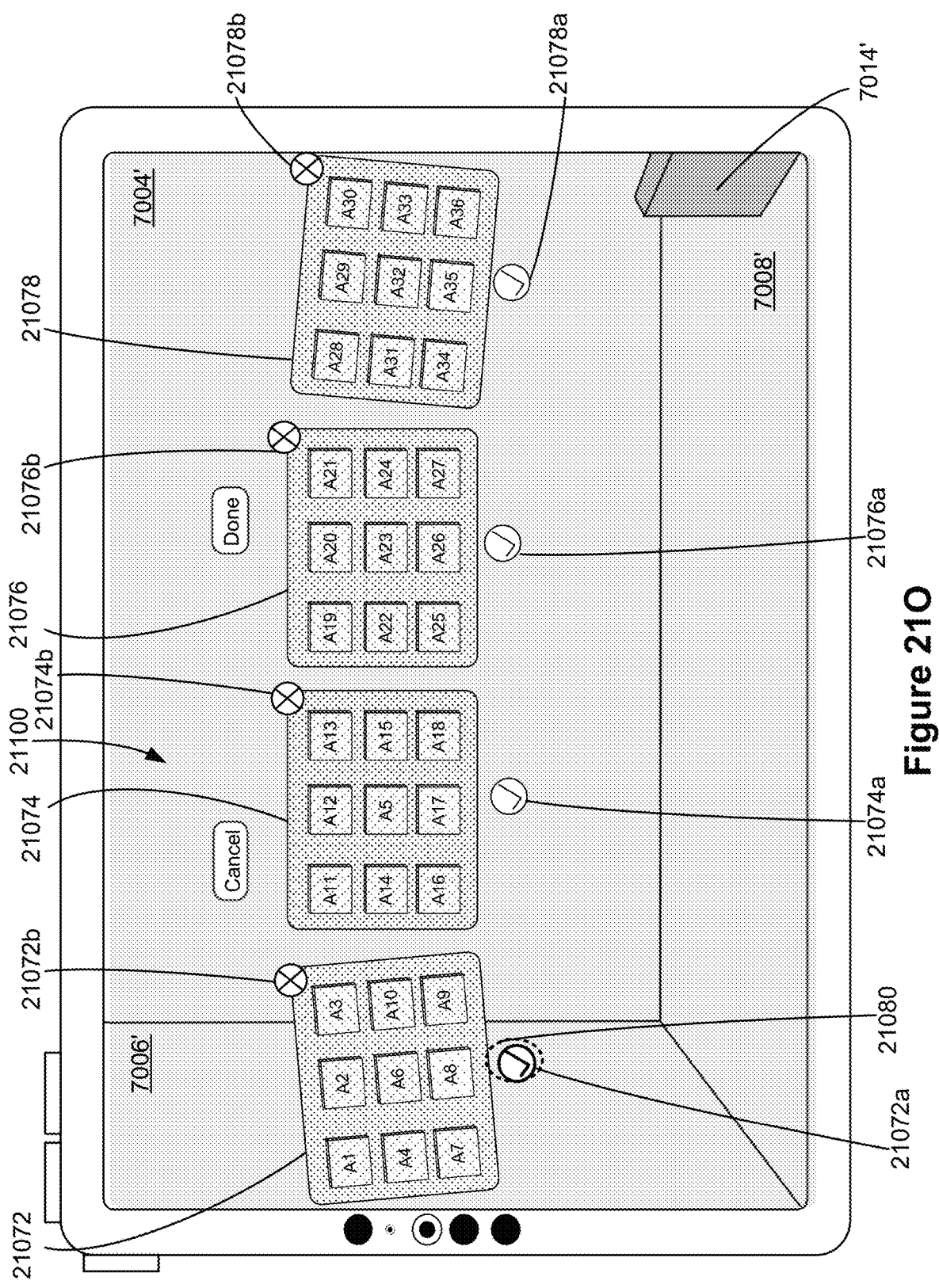
Figure 21P:
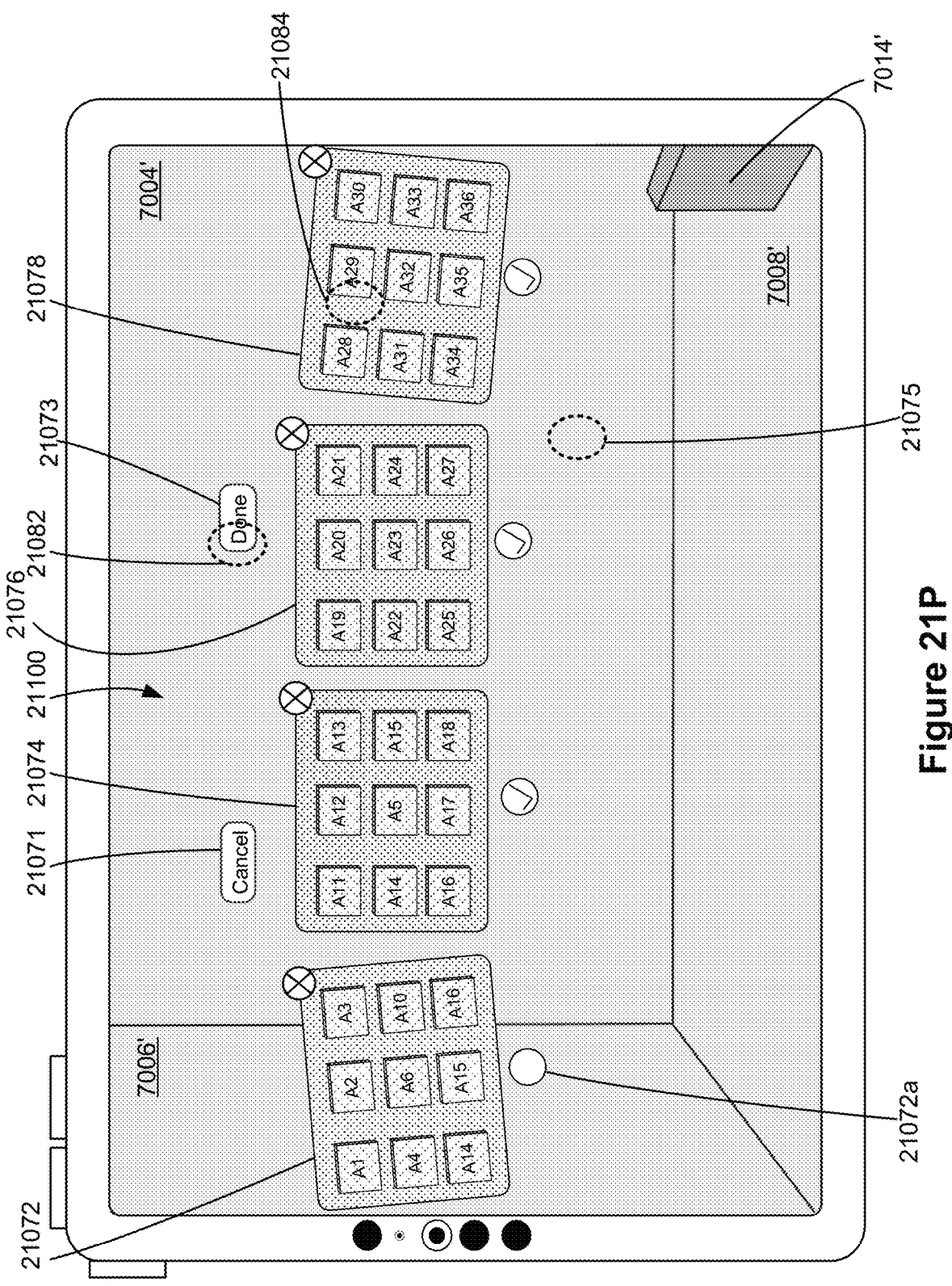

FIG. 21O illustrates a transition from FIG. 21L upon activation of the page reconfiguration mode. In response to user input 21260 selecting page navigation element 21022, home menu user interface 21100 directly enters the page reconfiguration mode (e.g., from the icon reconfiguration mode). In the page reconfiguration mode, representations of the pages (e.g., reduced scale representations) that are included in home menu user interface 21100 are revealed and concurrently displayed in view 2000'. In the scenario of FIG. 21O, the computer system 101 concurrently displays representations of four pages because home menu user interface 21000 includes four pages. For example, page representation 21072 represents the first page, page representation 21074 represents the second page, page representation 21076 represents the third page, and page representation 21078 represents the fourth page in the sequence of pages home menu user interface 21000 (also collectively called page representations 21072-21078). In the scenario of FIG. 21O, upon activation of the page reconfiguration mode, page representations 21072-21078 are pushed back away from the viewpoint of the user (e.g., relative to the distance from the viewpoint of the user 7002 at which the arrangement of application icons in the home menu user interface 21100 are displayed).

In some embodiments, entering the page reconfiguration mode from the icon reconfiguration mode keeps the changes made in the icon reconfiguration mode to the positions and/or availability of application icons in home menu user interface 21100. For example, page representation 21072 that represents the first page includes application icons application icons A10 that was moved from the second page and does not include application icon A5 21010 was moved to the second page, and also includes the change in position of application icon A6 from the last column to the second column. Also, page representation 21074 includes include application icon A5 21010, which was not there prior the user input 21032, and also includes change in positions of application icons A11, A12, A13, and A14.

In some embodiments, upon entering the page reconfiguration mode, passthrough portions of view 2000' are darkened, e.g., visibility of walls 7006' and 7004', floor 700' and physical object 7014' is reduced, as illustrated in FIGS. 21O-21P. In some embodiments, passthrough portions of view 20000' are visually deemphasized relative to page representations 21072-21078. In some embodiments, passthrough portions of view 20000' were already darkened upon entering the icon reconfiguration mode, and in such scenario, passthrough portions of view 20000' are darkened to a greater extent when entering the page reconfiguration mode relative to visibility of the passthrough portions in view 20000' in the icon reconfiguration mode.

The page representations 21072-21078 are each associated with a respective "delete" icon displayed near the top right corner of respective page representations 21072-21078. For example, delete icon 21072b is associated with representation 21072 of the first page, delete icon 21074b is associated with representation 21074 of the second page, delete icon 21076b is associated with representation 21076 of the third page, and delete icon 21078b is associated with representation 21078 of the fourth page. A delete icon of delete icons 21072b, 21074b, 21076b, and 21078b, when selected cause the computer system 101 to delete a respective page. The page representations 21072-21078 are each associated with a respective selection affordance (e.g., a toggle, a checkbox, a hide/unhide button, and/or other user interface control) displayed near the bottom of the page representations. For example, selection affordance 21072a is associated with representation 21072 of the first page, selection affordance 21074a is associated with representation 21074 of the second page, selection affordance 21076a is associated with representation 21076 of the third page, and selection affordance 21078a is associated with representation 21078 of the fourth page. In the scenario of FIG. 21O, since the selection affordances of all four pages of home menu user interface 21100 are in a selected state (e.g., as illustrated by a checkmark), the four pages are accessible in the multipage home menu user interface 21100 outside of the page reconfiguration mode. For example, when a user navigates through the pages of home menu user interface 21100 pages that hidden pages (e.g., unselected by input directed to respective selection affordance) are not shown and pages that are not hidden (e.g., illustrated by a checkmark in the selection affordance) are displayed. In some embodiments, a hidden page is not deleted and can be unhidden by selecting the respective selection affordance.

In the scenario of FIG. 21O, the computer system 101 detects input 21080 (e.g., an air pinch input, an air tap input, a pinch input, a tap input, an air pinch and drag input, an air drag input, a drag input, a click and drag input, a gaze input, and/or other input) directed at selection affordance 21072a. In response to input 21080 selecting selection affordance 21072a, the computer system 101 hides the first page associated with selection affordance 21072a, such that when a user navigates through the pages of home menu user interface 21100 the first page is unavailable. In some embodiments, a selection affordance, such as selection affordance 21072a changes its appearance state, when activated, to indicate whether the corresponding page is currently included in the set of pages that are accessible in a multipage home menu user interface, such as home menu user interface 21100, by navigating through the pages of the multipage home screen user interface outside of the page reconfiguration mode (e.g., in the normal mode or in the icon reconfiguration mode), as described in further detail with as described in further detail below with reference to FIGS. 21P-21Q.

FIG. 21P illustrates a transition from FIG. 21O in response to input 21080 selecting selection affordance 21072a. In response, the appearance state of the selection affordance 21072a changes from checked to unchecked indicating that the first page associated with selection affordance 21072a is in a hidden state and is inaccessible when navigating the home menu user interface 21100 in the normal mode or in the icon reconfiguration mode.

In some embodiments, the page reconfiguration mode can be exited in various ways, and depending on the manner of exiting changes made to the positions and/or availability of pages in home menu user interface are kept or not. In some embodiments, the computer system 101 exits page reconfiguration mode in response to an input (e.g., an air pinch input, an air tap input, a pinch input, a tap input, an air pinch and drag input, an air drag input, a drag input, a click and drag input, a gaze input, and/or other input) selecting Cancel control 21071. For example, in the scenario of FIG. 21P, selecting Cancel control 21071 causes the computer system 101 to exit the page reconfiguration mode and to cancel the change made to availability of the first page (e.g., or responsive to) user input 21080. For example, when user 7002 navigates to the first page of home menu user interface 21100 after the cancelation, the first page will be displayed because the hiding action performed in response to user input 21080 is cancelled.

In some embodiments, the computer system 101 exits the icon reconfiguration mode in response to user input 21075 that is directed to a location in view 2000' that is outside the arrangement of page representations, such as outside the 1×4 grid that is formed by the arrangement of page representations 21072-21078 in FIG. 21P. In some embodiments, exiting the icon reconfiguration mode in response to an input (e.g., an air pinch input, an air tap input, a pinch input, a tap input, an air pinch and drag input, an air drag input, a drag input, a click and drag input, a gaze input, and/or other input) directed outside the arrangement of page representations 21072-21078 any changes made to the positions and/or availability of pages of home menu user interface 21100 while in the icon reconfiguration mode, and restores the state of the home menu user interface 21100 before activation of the first reconfiguration mode.

In some embodiments, the computer system 101 exits the page reconfiguration mode in response to an input (e.g., an air pinch input, an air tap input, a pinch input, a tap input, an air pinch and drag input, an air drag input, a drag input, a click and drag input, a gaze input, and/or other input) selecting Done control 21073. For example, in FIG. 21P, the computer system 101 detects an input 21082 (e.g., an air pinch input, an air tap input, a pinch input, a tap input, an air pinch and drag input, an air drag input, a drag input, a click and drag input, a gaze input, and/or other input) selecting Done control 21073 (e.g., an air pinch gesture, an air tap, or other air gesture or touch gesture). In response to input 21082 selecting Done control 21073, the computer system exits the page reconfiguration mode (e.g., restores the home menu user interface 21100 to a normal mode in which the positions and/or availability of application icons and/or pages are not adjustable) and persists the hiding action performed in response to user input 21080, as described in further detail below with respect to FIG. 21Q.

Figures 21Q, 21R:
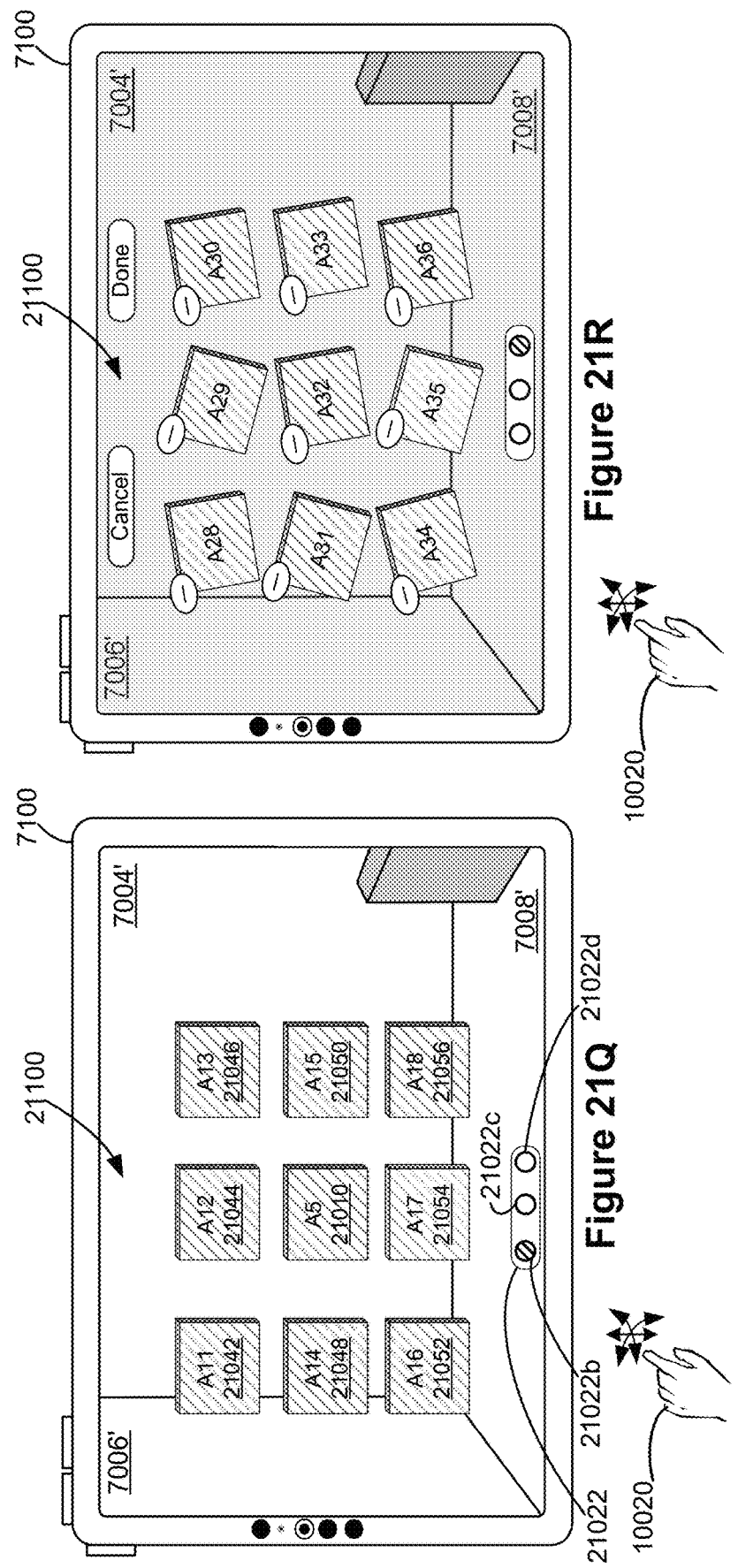

FIG. 21Q illustrates a transition from FIG. 21P in response to input selecting Done control 21073. In response to input 21082 selecting Done control 21073, the computer system exits the page reconfiguration mode and displays, in the normal mode, the respective page that was active before entering the page reconfiguration mode. In the scenario of FIGS. 21N-21P, because the second page was active when the computer system 101 entered the page reconfiguration mode (e.g., directly from the icon configuration mode of the second page), the second page is displayed in the normal mode in FIG. 21P. Since the change made to the availability of the first page are kept when exiting the page reconfiguration mode by selecting Done control 21073, the first page is hidden from display, and page navigation element 21022 includes one page indicator less, e.g., page indicator 21022a that corresponds to the first page is no longer visible. In some embodiments, the changes made to the availability and/or positions of application are also persisted when exiting the page reconfiguration mode by selecting Done control 21073, as illustrated in FIG. 21P (e.g., specifically application icon A5 21010 that was moved to the second page and that the shifting of positions of the application icons in the second page that was caused as a result are persisted).

In some embodiments, the computer system 101 exits the page reconfiguration mode in response to user input, such as input 21084, that is directed to a page representation, such as page representation 21078, and directly enters the icon reconfiguration mode for the page that corresponds to the selected page representation, such as the fourth page of home menu user interface 21100, as described in further detail with respect to FIG. 21R.

FIG. 21R illustrates a transition from FIG. 21P in response to input 21084 that is directed to page representation 21078. In response to input 21084, the computer system 101 selects page representation 21078 and directly enters the icon reconfiguration mode for fourth page that corresponds to the selected page representation 21078. In some embodiments, the changes made to the availability and/or positions of pages are also persisted when exiting the page reconfiguration mode by selecting a page representation, as illustrated in FIG. 21R (e.g., specifically the change of availability of the first page from available (e.g., unhidden) to unavailable (e.g., hidden) is kept). In the scenario of FIG. 21R, since the computer system 101 directly enters the icon reconfiguration mode for fourth page upon selecting page representation 21078, application icons A28-A36 are jiggling (e.g., tilting left and right) to indicate that the placement locations of the application icons can be adjusted in accordance with user inputs.

In some embodiments, the second page that is adjacent to the currently displayed first page can be displayed (e.g., revealed) in different ways. In the scenario of FIGS. 21J-21K, the second page is displayed in response to user input 21032 that moves (e.g., drags) application icon 21010 A5 from a location in the first page towards the second page. In yet another scenario, the second page can be revealed in response to a pinch gesture directed towards an application icon, such as application icon A5 21010, that is performed with a first hand of user 7002 and a drag gesture (e.g., in the leftward direction) that is performed with the opposite of user 7002. For example, instead of to moving application icon A5 21010 itself towards an adjacent page, as in the scenario of FIGS. 21G-21K, the application icon 21010 A5 is held (e.g., optionally substantially stationary) with the first hand 7002 (e.g., via an air pinch gesture) and the opposite hand of 7002 performs a drag or slide gesture (e.g., moving laterally in a leftward direction) that causes the computer system 101 to move the second page (e.g., which is on the right side of the first page) in place of the first page. In some embodiment, sliding the second page in place of the first page performed with an air pinch with one hand and movement input with the other requires that user 7002's attention is directed toward the arrangement of application icons (e.g., as opposed to outside of it). In yet another scenario, the second page can be revealed in response to an input directed to page navigation element 21020 (e.g., an air pinch and drag input) or an input directed to page indicator icon 21022b (e.g., corresponding to the second page). In other scenarios, the second page can be displayed in response to a scrolling input, as described in further detail below with reference to FIGS. 21S-21T).

In some embodiments, if a long pinch gesture, causing the computer system to display a menu for reconfiguring a home menu user interface (e.g., menu 21024), is followed by movement input (e.g., dragging in a leftward or rightward direction) without detecting prior selection of a "reconfiguration mode" affordance in menu 21024, the computer system 101 scrolls the arrangement of application icons in the home menu user interface (e.g., as opposed to entering the icon reconfiguration mode and/or readjusting positions of application icons), as described in further detail below with reference to FIGS. 21S-21T.

Figures 21S, 21T:
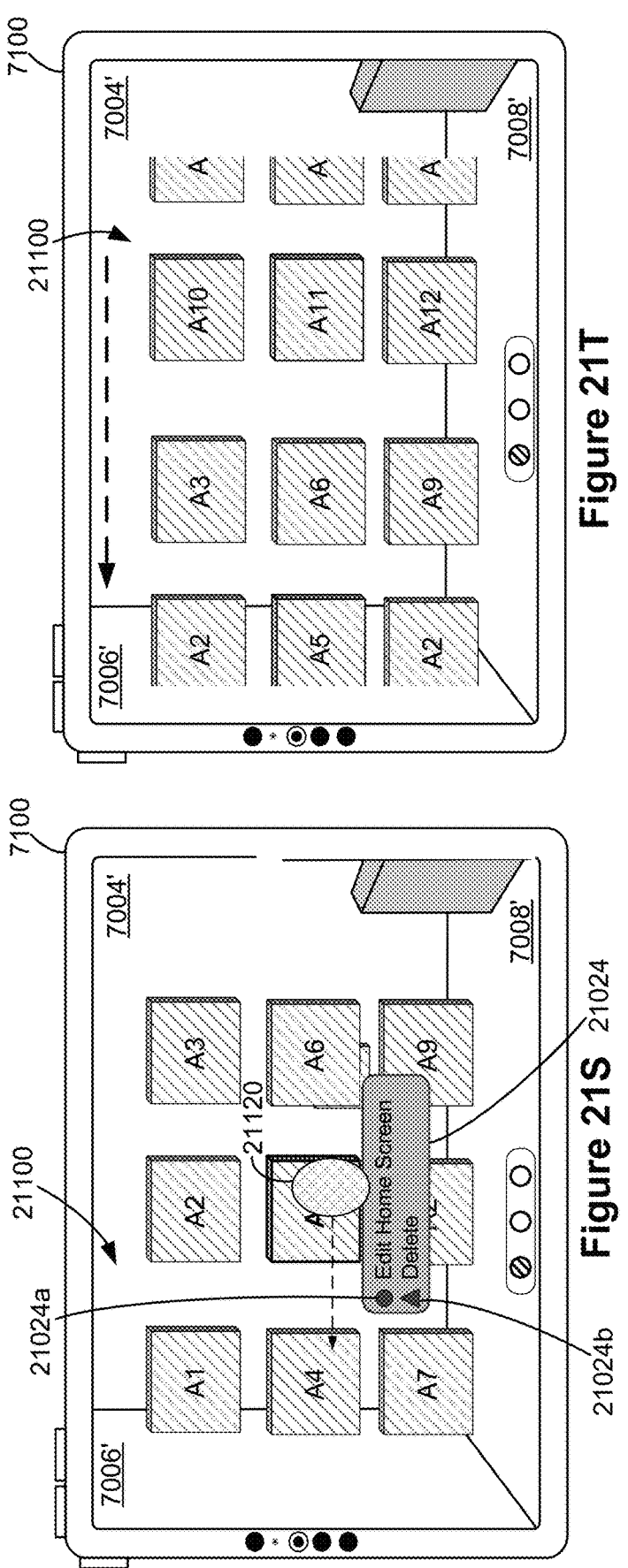

In FIG. 21S, menu 21024 for reconfiguring a home menu user interface is displayed in response to an input (e.g., an air pinch input, an air tap input, a pinch input, a tap input, an air pinch and drag input, an air drag input, a drag input, a click and drag input, a gaze input, and/or other input) that includes a long pinch gesture. Instead of selecting control 21024a (e.g., "reconfiguration mode" affordance) in menu 21024, a movement input 21120 is detected after performing the long pinch gesture and optionally while the pinch gesture is maintained. In response, instead of activating the icon reconfiguration mode, the computer system scrolls application icons in home menu user interface 21100 as illustrated in FIG. 21T. In some embodiments, the movement input 21120 is detected after detecting the long pinch gesture and after detecting an end (e.g., release) of the long pinch gesture (e.g., the long pinch gesture is released in order to perform the movement input 21120). In some embodiments, the movement input 21120 includes a pinch and drag gesture (e.g., a subsequent pinch gesture (following the end of the long pinch) and movement of the hand performing the subsequent pinch gesture while the subsequent pinch gesture is maintained), in response to which the computer system 101 scrolls application icons in home menu user interface 21100 as illustrated in FIG. 21T, instead of activating the icon reconfiguration mode.

Figures 21U, 21V:
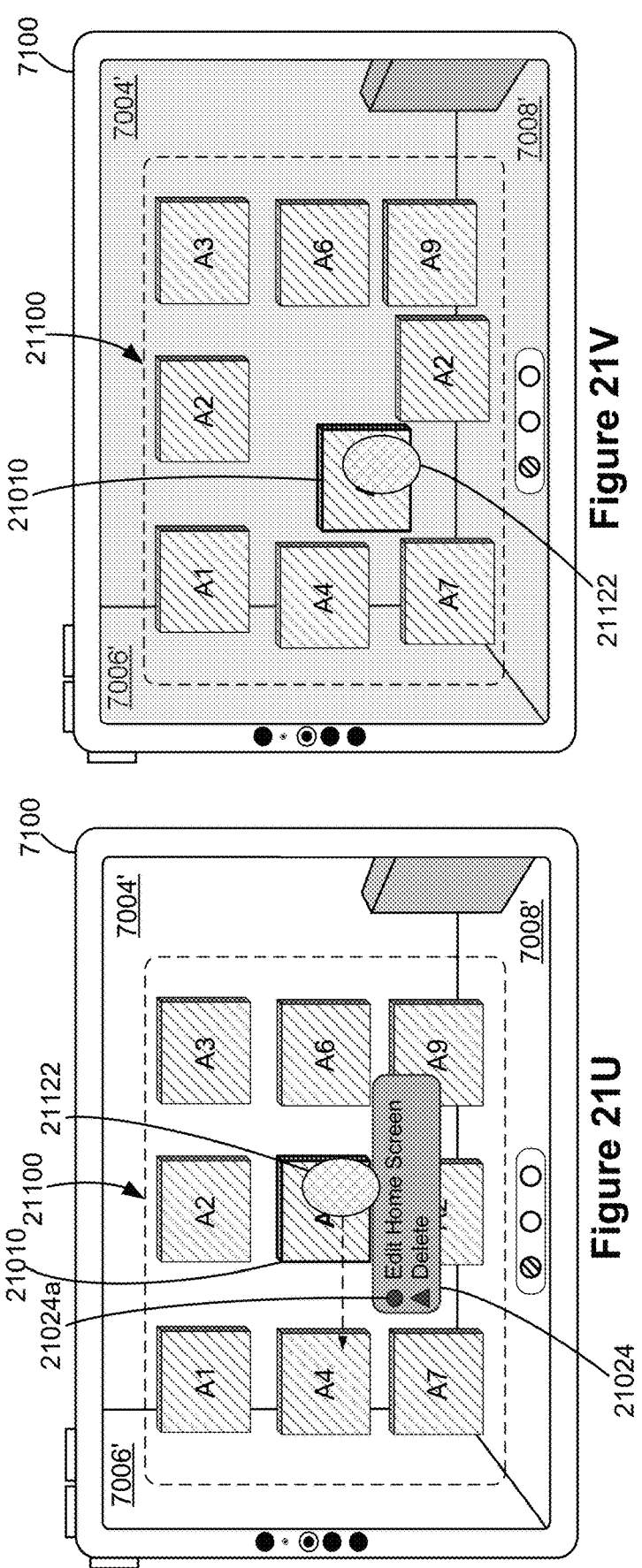

In some embodiments, while a menu for reconfiguring a home menu user interface is displayed, such as menu 21024, the computer system detects an input (e.g., an air pinch input, an air tap input, a pinch input, a tap input, an air pinch and drag input, an air drag input, a drag input, a click and drag input, a gaze input, and/or other input) that includes a selection input directed toward an application icon (e.g., application icon A5 21010) in an arrangement of icons and a movement input, such as input 21122 (e.g., instead of selection of a "reconfiguration mode" affordance in the menu 21024), as described below with reference to FIG. 21U. In response, in conjunction with initiating movement of the selected application icon, the computer system 101 enters the reconfiguration mode, visually deemphasizes passthrough portions in the viewport, as described below with reference to FIG. 21V. Further, in accordance with a determination that the selected application icon is moved more than a threshold distance (e.g., or is moved less than threshold distance away from optionally invisible borders of home menu user interface, such as home menu user interface 21100), the computer system 101 hides the home menu user interface (e.g., including hiding the arrangement of application icons), as described below with reference to FIG. 21X, and in accordance with a determination that the input directed toward the application icon ended (e.g., application icon A5 21010 is dropped) after the home menu user interface is hidden, the computer system 101 launches an application corresponding to the selected and moved application icon and displays a respective user interface, as described below with reference to FIG. 21Y.

FIG. 21U is analogous to FIG. 21S except that the input that is detected is input 21122 (e.g., as opposed to input 21120). In the scenario of FIG. 21U, while the menu 21024 for reconfiguring a home menu user interface is displayed (e.g., menu 21024 is optionally invoked or displayed in response to a long pinch directed to application icon A5 21010), the computer system detects input 21122 (e.g., an air pinch input, an air tap input, a pinch input, a tap input, an air pinch and drag input, an air drag input, a drag input, a click and drag input, a gaze input, and/or other input) directed toward application icon A5 21010 in the arrangement of application icons displayed in home menu user interface 21100. In some embodiments, input 21122 is a second portion of the input that invoked menu 21024, such as a movement input that is detected after the long pinch directed toward application icon A5 21010 continues to be detected and thus the second portion is detected while the application icon A5 21010 is already selected. In some embodiments, input 21122 is detected after detecting the long pinch gesture and after detecting an end (e.g., release) of the long pinch gesture (e.g., the long pinch gesture is released in order to perform input 21122). In some embodiments, input 21122 includes a different type of gesture than input 21120 (FIG. 21S). In some embodiments, input 21122 includes a selection input (e.g., a pinch or a long pinch gesture, optionally subsequent to the long pinch gesture that invoked menu 21024) selecting application icon A5 21010 followed by a movement input (e.g., dragging or moving application icon A5 21010). In response to input 21122 (e.g., specifically in response to the movement portion of input 21122), in conjunction with initiating movement of the selected application icon A5 21010, the computer system 101 enters the icon reconfiguration mode and deemphasizes visually pass-through portions in view 20000' (e.g., reduces brightness, opacity or otherwise darkening walls 7004' and 7006', and floor 7008', and physical object 7014'), as illustrated in FIG. 21V. In response to detecting further movement of input 21122 while application icon A5 21010 continues to be selected, the computer system 101 hides the home menu user interface 21100, as described below with reference to FIGS. 21W-21X.

Figures 21W, 21X:
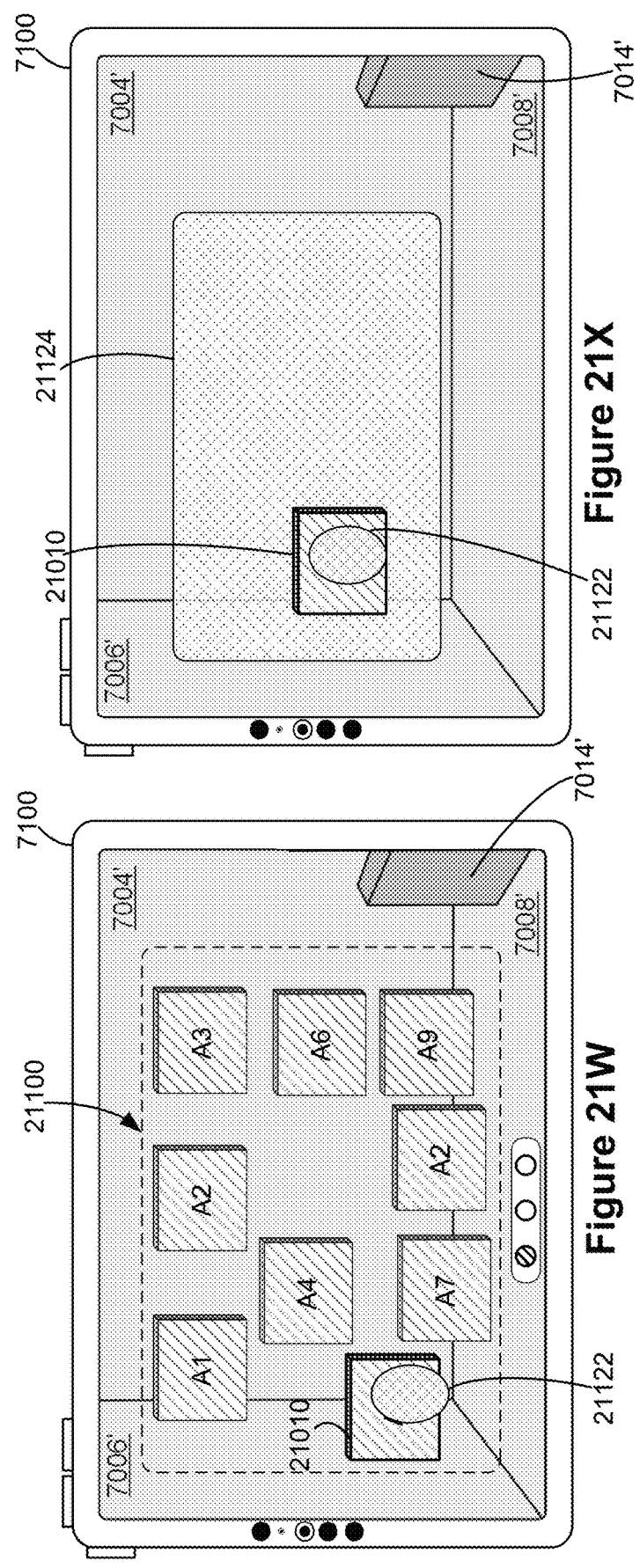
Figure 21Y:
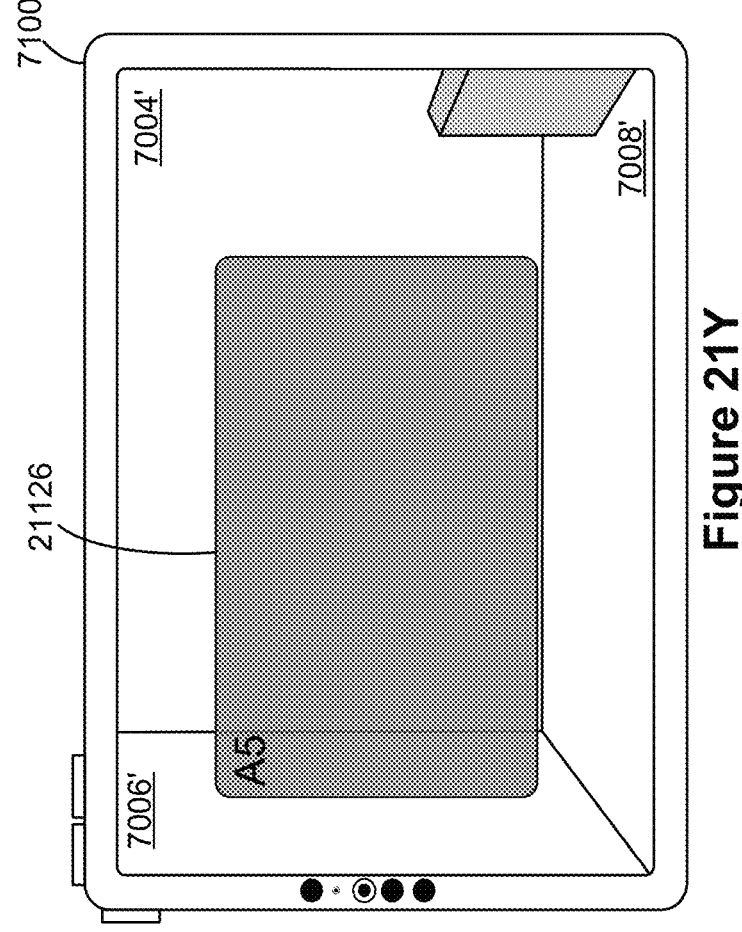

FIG. 21W is a transition from FIG. 21V in response to detecting further movement of input 21122 while application icon A5 21010 continues to be selected. In response to detecting further movement of input 21122 while application icon A5 21010 continues to be selected, and in accordance with a determination that the selected application icon A5 21010 is moved more than a threshold distance (e.g., or is moved less than threshold distance away from borders of home menu user interface 21100 (e.g., borders are not visible to user 7002 in view 20000' but are drawn for illustrative purposes only in the scenario of Figure), the computer system 101 hides the home menu user interface (e.g., including hiding the arrangement of application icons), as illustrated in FIG. 21X.

FIG. 21X is a transition from FIG. 21W in response to further movement of input 21122. In accordance with a determination that that the selected application icon A5 21010 is moved more than a threshold distance, the computer system 101 hides the home menu user interface (e.g., including hiding the arrangement of application icons), and displays an outline 21124 indicating the extent of the user interface of the application that is about to be launched.

FIG. 21Y is a transition from FIG. 21X in response to detecting that input 2122 ended (e.g., application icon A5 21010 is dropped in response to releasing the pinch). In response to detecting that input 2122 ended and in accordance with a determination that the input 2122 ended after the home menu user interface 21100 is hidden, the computer system 101 launches an application corresponding to the selected and moved application icon A5 21010 and displays a respective user interface 21126, as illustrated in FIG. 21Y. In the scenario of FIG. 21Y, user interface 21126 is displayed at a drop location of application icon A5 (e.g., centered around a drop location, in contrast to being displayed in place of home user interface 21010. In some embodiments, user interface 21126 is displayed in a default location or in user-defined location (e.g., based on the end of movement input 2122).

Additional descriptions regarding FIGS. 21A-21Y are provided below in reference to method 25000 described with respect to FIG. 25.

FIG. 22 is a flow diagram of an exemplary method 22000 for displaying a home menu user interface while one or more application user interfaces are present in a viewport of the three-dimensional environment, in accordance with some embodiments. In some embodiments, method 22000 is performed at a computer system (e.g., computer system 101 in FIG. 1A) including one or more display generation components (e.g., display generation component 120 in FIGS. 1A, 3, and 4, display generation component 7100 in FIG. 7A, a heads-up display, a display, a touchscreen, and/or a projector) and one or more input devices (e.g., color sensors, infrared sensors, and other depth-sensing cameras that point downward at a user's hand and/or forward from user 7002's head, a button, a dial, a rotatable input element, a switch, a moveable hardware input device, and/or a solid-state hardware input device). In some embodiments, the method 22000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 22000 are, optionally, combined and/or the order of some operations is, optionally, changed.

While displaying, via the one or more display generation components, one or more application user interfaces (e.g., including a first user interface for a first application and a second user interface for a second application) within a three-dimensional environment, the computer system detects (22002) a first input (e.g., a button press; an air gesture; a gaze input; and/or a tap input) corresponding to a request to display a home menu user interface (e.g., the home menu user interface includes representations of applications such as application icons that are activatable to launch applications, the home menu user interface also includes widgets, communication options, and/or affordances for displaying extended reality (XR) backgrounds); in response to detecting the first input, the computer system concurrently displays (22004) the home menu user interface and visually deemphasizes the one or more application user interfaces, wherein visually deemphasizing a respective application user interface includes displaying a change in one or more visual characteristics of the respective application user interface (e.g., including displaying a change in one or more visual characteristics of the first user interface and displaying a change in one or more visual characteristics of the second user interface). In some embodiments, the first user interface has a different set of changes than the second user interface, for example, the first user interface gets defocused, and both the first and second user interfaces are pushed back along a z-direction, visually deemphasizing the one or more application user interfaces includes displaying the application user interfaces with e.g., reduced opacity, reduced brightness, reduced size, and/or increased distance from the user. In some embodiments, the home menu user interface is superimposed over the application user interface. In some embodiments, objects (e.g., application icons, virtual user interface icons, and/or other objects) in the home menu user interface are either opaque or partially transparent, thereby blocking or obscuring corresponding portions of the application user interface. In some embodiments, those portions of the application user interface positioned behind the home menu user interface; in some embodiments, the home menu user interface comprises a platter with a plurality of objects on the platter, and the platter is either opaque or partially transparent, thereby blocking or obscuring those portions of the application user interface positioned behind the home menu user interface. For example, as described herein with reference to FIG. 18A, user interface 18002 of Application A and user interface 18004 of Application B are displayed in a viewport of the three-dimensional environment. In response to detecting user input 18006, computer system 101 concurrently displays home menu user interface 8012 and visually deemphasizes user interface 18002 of Application A and user interface 18004 of Application B as shown in FIGS. 18B, by moving user interfaces 18002 and 18004 further away from a viewpoint of the user, and/or decreasing an opacity, a brightness and/or a contrast of user interfaces 18002 and 18004. Concurrently displaying the home menu user interface and visually deemphasizing the one or more application user interfaces helps to reduce distraction (from the one or more applications) to the user while the user navigates the home menu user interface. Further, by visually deemphasizing the one or more applications, a user can easily add and/or work with multiple application user interfaces at any point in time. By displaying the one or more applications, albeit with a visual deemphasis, the user continues to be presented with relevant information from the one or more application while navigating the home menu user interface. Further, by displaying of the one or more applications with a visual deemphasis, interruptions to the user's workflow is reduced and the user does not need to provide additional input (e.g., an air pinch input, an air tap input, a pinch input, a tap input, an air pinch and drag input, an air drag input, a drag input, a click and drag input, a gaze input, and/or other input) in order for the one or more applications to be re-displayed, increasing operational efficiency of user-machine interactions.

In some embodiments, the one or more application user interfaces are displayed at a first set of one or more locations in an extended reality (XR) three-dimensional environment (e.g., each application user interface of the one or more application user interfaces is displayed at a respective location in the three-dimensional environment, and optionally each application user interface is displayed at a different respective location, e.g., a wholly or partially simulated environment that the user senses and/or interact with via an electronic system and where one or more characteristics of one or more virtual objects simulated in the XR environment are adjusted in a manner that comports with at least one law of physics). For example, as described herein with reference to FIG. 18A, user interface 18002 of Application A and user interface 18004 of Application B are displayed in an XR three-dimensional environment that includes representation 7008' of the floor and representation 7014' of physical object 7014. Displaying application user interfaces in an XR three-dimensional environment enables content from one or more application user interfaces to be displayed at different depths from a viewpoint of the user, without displaying additional controls.

In some embodiments, visually deemphasizing the one or more application user interfaces includes moving the one or more application user interfaces to a second set of one or more locations, wherein the second set of one or more locations are offset from the first set of one or more locations (e.g., along a direction away from a viewpoint of a user, so as to increase respective distances between the one or more application user interfaces and the viewpoint of the user). In some embodiments, visually deemphasizing the one or more application user interfaces includes changing (e.g., increasing, or decreasing) a distance between the one or more application user interfaces and the viewpoint of the user. In some embodiments, moving the one or more application user interfaces to a second set of one or more locations includes moving one application from one location to another and/or moving a first application and a second application to their respective new locations. For example, in response to detecting user input 18006 (FIG. 18A), computer system 101 displays home menu user interface 8012 and moves user interface 18002 of Application A and user interface 18004 of Application B, as shown in FIGS. 18B, further away from a viewpoint of the user, as depicted in top view 18003 of FIG. 18B. Displaying the one or more applications at corresponding locations that are offset from the respective locations, along a direction away from a viewpoint of a user helps to reduce distraction (from the one or more applications) to the user while the user navigates the home menu user interface. By offsetting the one or more applications along a direction away from a viewpoint of a user, the user can more easily direct her attention to the home menu user interface which is displayed closer to the user. Further, by offsetting the displaying of the one or more applications, a smooth transition to a subsequent task (e.g., navigating the home menu user interface) is provided without having to provide additional controls to the user, increasing operational efficiency of user-machine interactions.

In some embodiments, while concurrently displaying, via the one or more display generation components, the home menu user interface and visually deemphasizing the one or more application user interfaces, the computer system detects a second input (e.g., an air pinch input, an air tap input, a pinch input, a tap input, an air pinch and drag input, an air drag input, a drag input, a click and drag input, a gaze input, and/or other input) directed to (e.g., corresponding to, or on) a representation of a first application displayed in the home menu user interface; and in response to detecting the second input, the computer system displays an application user interface of the first application concurrently with displaying the one or more application user interfaces (e.g., the first application is different from the one or more application user interfaces already displayed prior to detecting the second input), including moving the one or more application user interfaces toward (e.g., or back to) the second set of one or more locations (e.g., by moving the one or more application user interfaces at least partially back toward the first set of one or more locations). For example, as described herein with reference to FIG. 18E, user interface 18002 of Application A, user interface 18004 of Application B, and home menu user interface 8012 are displayed in a viewport of the three-dimensional environment, with user interfaces 18002 and 18004 being positioned further from a viewpoint of the user, along a depth dimension. In response to detecting user input 18012 corresponding to a selection of representation 8028, computer system 101 displays user interface 18014 of Application C, which is associated with representation 8028, and moves user interface 18002 of Application A and user interface 18004 of Application B closer to the viewpoint of the user (from their prior locations denoted as 18002b and 18004b), as depicted in top view 18011 of FIG. 18F. At least partially reversing the moving of the one or more application user interfaces to the second set of one or more locations helps to reduce eye discomfort from having to readjust a viewing focal length (accommodation or the user's eye changing an optical power to maintain a clear image or focus on an object as its distance varies) to interacting with application user interfaces at different distances from the viewpoint of the user. By reversing the offset, a smooth transition to a subsequent task (e.g., interact with the one or more applications) is provided without having to provide additional controls to the user, increasing operational efficiency of user-machine interactions.

In some embodiments, while concurrently displaying the home menu user interface and visually deemphasizing the one or more application user interfaces, the computer system detects a third input (e.g., an air pinch input, an air tap input, a pinch input, a tap input, an air pinch and drag input, an air drag input, a drag input, a click and drag input, a gaze input, and/or other input) that is a same type of input as the first input (e.g., a button press; an air gesture; a gaze input; and/or a tap input, and/or the third input is another instance of the first input corresponding to a request to display the home menu user interface), and in response to detecting the third input, the computer system ceases to display the home menu user interface and the (e.g., visually deemphasized) one or more application user interfaces (e.g., including ceasing to display the one or more application user interfaces that were displayed concurrently when the home menu user interface was displayed in response to the first user input, and/or ceasing to display the one or more other application user interfaces that are outside of a viewport of the three-dimensional environment that was visible to a user when the third input was detected). For example, as described herein with reference to FIG. 18C, in response to detecting user input 18008 that is a same type of input as user input 18006 (FIG. 18B), computer system 101 ceases to display user interface 18002 of Application A, user interface 18004 of Application B and home menu user interface 8012, which were previously displayed in FIG. 18B. Ceasing to display both the home menu user interface and one or more application user interfaces using a single input reduces the number of inputs needed to free up portions of the viewport occupied by the home menu user interface and one or more application user interfaces.

In some embodiments, prior to detecting the third input (e.g., while concurrently displaying the home menu user interface and the visually deemphasized one or more application user interfaces), one or more portions of a physical environment corresponding to the three-dimensional environment are visible via the one or more display generation components (e.g., the one or more visible portions of the physical environment include digital and/or optical pass-through portions); and after detecting the third input (e.g., in conjunction with ceasing to display the home menu user interface and the one or more application user interfaces), the one or more portions of the physical environment corresponding to the three-dimensional environment continue to be visible via the one or more display generation components. For example, as described herein with reference to FIG. 18C, in response to detecting user input 18008 that is a same type of input as user input 18006 (FIG. 18B) detected while representation 7014' of a physical object 7014 that is present in the physical environment is displayed, computer system 101 continues to display representation 7014'. Continuing to have the one or more portions of the physical environment corresponding to the three-dimensional environment be visible via the one or more display generation components improves safety for the user, by allowing the user to be cognizant of the physical environment of the computer system (e.g., to respond to an emergency or other situations that require the user's attention or require the user to interact with the physical environment).

In some embodiments, while the home menu user interface and the one or more application user interfaces are not displayed (e.g., after ceasing to be displayed in response to the third input): the computer system detects a fourth input (e.g., an air pinch input, an air tap input, a pinch input, a tap input, an air pinch and drag input, an air drag input, a drag input, a click and drag input, a gaze input, and/or other input) corresponding to a request to display (e.g., reinvoke) the home menu user interface (e.g., the fourth input is another instance of the first input, the fourth input is another instance of the third input, and the fourth input is subsequent to the third input and the first input); and in response to detecting the fourth input corresponding to the request to display the home menu user interface, the computer system redisplays the home menu user interface and the one or more application user interfaces (e.g., that were displayed concurrently with the home menu user interface when the home menu user interface was displayed in response to detecting the first input; the home menu user interface and the one or more application user interfaces which ceased to be displayed in response to detecting the third input). In some embodiments, the one or more application user interfaces are redisplayed as visually deemphasized (e.g., having a same appearance as prior to ceasing to be displayed in response to detecting the third input). For example, as described herein with reference to FIG. 18E, in response to detecting user input 18010 (FIG. 18C) that is a same type of input as user input 18006 (FIG. 18A) and user input 18008 (FIG. 18B), computer system 101 redisplays home menu user interface 8012 and one or more application user interfaces that were previously dismissed by user input 18008. Concurrently displaying the home menu user interface and the one or more application user interfaces that were previously displayed with the home menu user interface reduces the number of inputs needed to resume interacting with the home menu user interface and/or the user interfaces of applications that were displayed prior to being dismissed.

In some embodiments, the fourth input corresponding to the request to display the home menu user interface is a same type of input as the first input corresponding to the request to display the home menu user interface (e.g., the fourth input is a repetition of the first input, and/or the fourth input is provided after the home menu user interface has ceased to be displayed (e.g., in response to detecting the third input, in response to launching an application from the home menu user interface, and/or in response to a user interaction with an opened application user interfaces displayed concurrently with the home menu user interface). For example, as described herein with reference to FIG. 18E, user input 18010 (FIG. 18C) is optionally a same type of input as user input 18006 (FIG. 18A) and user input 18008 (FIG. 18B). Using the same user input to launch the home menu user interface allows a user to access the home menu user interface without displaying additional controls.

In some embodiments, while displaying the home menu user interface, the computer system detects a fifth input (e.g., an air pinch input, an air tap input, a pinch input, a tap input, an air pinch and drag input, an air drag input, a drag input, a click and drag input, a gaze input, and/or other input)

directed to the home menu user interface; in response to detecting the fifth input directed to the home menu user interface: in accordance with a determination that the fifth input corresponds to selection of a respective representation of a software application executable on the computer system (e.g., of the one or more representations of software applications), the computer system ceases to display the home menu user interface. In some embodiments, in accordance with a determination that the fifth input corresponds to moving a respective application user interface (e.g., by an air drag directed to the respective application user interface, by a gaze input that meets a gaze dwell threshold followed by movement of the gaze, and/or by a gaze input in combination with voice input) displayed in a viewport of the three-dimensional environment, the computer ceases to display the home menu user interface. In some embodiments, the fifth input is a same type of input as the second input, or the fifth input is a different type of input from the second input, the home menu user interface includes one or more of (e.g., any combination of): one or more representations of software applications executable on the computer system; one or more representations of communication session participants (e.g., contacts, including persons or other entities, of a user of the computer system, with whom the user is enabled to initiate one or more communication sessions); and one or more representations of computer-generated (e.g., augmented reality, virtual reality, mixed reality, or other extended reality) three-dimensional environments. For example, as described herein with reference to FIG. 18F, in response to detecting user input 18012 (FIG. 18E) directed to representation 8028 that corresponds to a request to launch user interface 18014 of Application C, computer system 101 ceases to display home menu user interface 8012, which was previously displayed in FIG. 18E. Automatically dismissing the home menu user interface in response to detecting a user input corresponding to request to display a user interface of an application without requiring an additional user input to dismiss the home menu user interface reduces the number of inputs needed to begin interacting with the application, without displaying additional controls.

In some embodiments, wherein the fifth input directed to the home menu user interface includes a hand gesture (e.g., an air gesture such as an air tap, or a gaze input and pinch input). For example, as described herein with reference to FIG. 18E, user input 18012 is an air gesture (e.g., a pinch, or a long pinch) that is directed to representation 8028. Detecting the fifth input as an air gesture directed to the home menu user interface allows an application to be activated in a manner that is ergonomic and that reduces the amount of time needed to perform a respective operation on the computer system.

In some embodiments, in response to detecting the fifth input directed to the home menu user interface: in accordance with the determination that the fifth input is directed to the respective representation of the software application executable on the computer system (e.g., in conjunction with ceasing to display the home menu user interface), the computer system displays an application user interface of the software application (e.g., launching or opening the software application). For example, as described herein with reference to FIG. 18F, in response to detecting user input 18012 (FIG. 18E) directed to representation 8028, computer system 101 displays user interface 18014 of Application C, which corresponds to representation 8028. Displaying a user interface of an application corresponding to the selected representation reduces the number of inputs needed to begin interacting with the application.

In some embodiments, in response to detecting the fifth input directed to the home menu user interface: in accordance with the determination that the fifth input corresponds to selection of the respective representation of the software application executable on the computer system, the computer system displays the application user interface of the software application (e.g., launching or opening the software application) concurrently with the one or more application user interfaces that were displayed when the first input corresponding to the request to display the home menu user interface was detected. In some embodiments, the one or more application user interfaces continue to be displayed (albeit visually deemphasized) as the home menu user interface is displayed in response to the first input and as the home menu user interface is then dismissed in conjunction with displaying the application user interface of the software application in response to the fifth input. In some embodiments, the one or more application user interfaces continue to be visually deemphasized, or the visual deemphasis of the one or more application user interfaces is at least partially reversed, as the application user interface of the software application is displayed. In some embodiments, in accordance with the determination that the fifth input corresponds to selection of a representation of a different application, displaying an application user interface of the different application concurrently with the one or more application user interfaces that were displayed when the first input corresponding to the request to display the home menu user interface was detected. For example, as described herein with reference to FIG. 18F, in response to detecting user input 18012 (FIG. 18E) directed to representation 8028, computer system 101 displays user interface 18014 of Application C, concurrently with user interface 18002 and user interface 18004, which were already displayed at the time user input 18012 was detected. Displaying a user interface of an application concurrently with previously displayed applications in response to detecting a user input corresponding to a selection of a representation of the application reduces the number of inputs needed to begin interacting with the application while retaining the application content presented on the already displayed applications.

In some embodiments, displaying the application user interface of the software application includes displaying the application user interface of the software application at a first location that is spatially offset from respective locations of the one or more application user interfaces (e.g., offset from a location of a respective one of the one or more application user interfaces, which optionally continue to be displayed). In some embodiments, the application user interface of the software application is displayed in front of the foremost of the one or more application user interfaces, or behind the rearmost of the one or more application user interfaces. For example, as described herein with reference to FIG. 18F, user interface 18014 of Application C, displayed in response to detecting user input 18012, is spaced apart by depth offset 18032, as shown in top view 18011, from user interface 18002 and user interface 18004, which were displayed at the time user input 18012 was detected. Displaying the user interface of the newly launched application at a location that is spaced apart from one or more application user interfaces that were displayed when the user input to launch the application was detected automatically places the newly launched application at a location that reduces the need for the user to search within the viewport for the newly launched application, without displaying additional controls.

In some embodiments, wherein the first location is spatially offset from the respective locations of the one or more application user interfaces along a direction extending from (e.g., forward and backward from) a viewpoint of a user (e.g., along a z-dimension, along a depth dimension, and/or along a radial direction). For example, as described herein with reference to FIG. 18F, user interface 18014 of Application C, displayed in response to detecting user input 18012, is spaced apart by depth offset 18032, as shown in top view 18011, along a depth dimension, from user interface 18002 and user interface 18004. Displaying the user interface of the newly launched application at a location that is spaced apart along a depth dimension from one or more application user interfaces that were displayed when the user input to launch the application was detected automatically places the newly launched application at a location that reduces the need for the user to search within the viewport for the newly launched application, without displaying additional controls.

In some embodiments, the one or more application user interfaces are displayed at the respective locations prior to detecting the fifth input directed to the home menu user interface, and displaying the application user interface of the software application at the first location that is spatially offset (e.g., along a z-dimension, along a depth dimension, and/or along a radial direction) from the respective locations of the one or more application user interfaces (e.g., in response to detecting the fifth input and in accordance with the determination that the fifth input is directed to the respective representation of the software application) includes (or is performed in conjunction with) maintaining the respective locations of the one or more application user interfaces while displaying the application user interface of the software application at the first location. For example, as described herein with reference to FIG. 18F, user interface 18014 of Application C, displayed in response to detecting user input 18012, is displayed away from user interface 18002 and user interface 18004 by depth offset 18032, as shown in top view 18011, as well as being displayed in the lower right region of the viewport, laterally and vertically offset from user interface 18002 and user interface 18004, such that user interface 18002 and user interface 18004 remain visible. Displaying the user interface of the newly launched application at a location that is spaced apart from one or more application user interfaces that were displayed when the user input to launch the application was detected automatically places the newly launched application at a location that reduces the need for the user to search within the viewport for the newly launched application, without displaying additional controls, and that maintains visibility of the one or more application user interfaces that were already displayed.

In some embodiments, displaying the application user interface of the software application at the first location that is spatially offset (e.g., along a z-dimension, and/or along a radial direction) from the respective locations of the one or more application user interfaces includes (or is performed in conjunction with) displacing the one or more application user interfaces (e.g., in a direction away from the viewpoint of the user, such as backward in z direction, backward along a depth dimension, and/or backward along a radial direction) from prior respective locations of the one or more application user interfaces to the respective locations (e.g., the one or more application user interfaces having been displayed at the prior respective locations when the fifth input was detected and/or when the first input was detected). For example, as described herein with reference to FIG. 18F, in response to detecting user input 18012, computer system 101 moves user interface 18002 and user interface 18004 backwards from their previous depth positions shown in FIG. 18A (e.g., denoted as 18002*a* and 18004*a*, respectively, in top view 18011) while displaying user interface 18014 of Application C at a similar depth position as the previous positions of user interface 18002 and user interface 18004. Displaying the user interface of the newly launched application at a location, concurrently with displacing one or more application user interfaces that were displayed when the user input to launch the application was detected, automatically places the newly launched application at a location that reduces the need for the user to search within the viewport for the newly launched application, without displaying additional controls.

In some embodiments, while displaying the home menu user interface (e.g., in response to detecting the first input), the computer system detects a sixth input (e.g., an air pinch input, an air tap input, a pinch input, a tap input, an air pinch and drag input, an air drag input, a drag input, a click and drag input, a gaze input, and/or other input) directed to a first application user interface of the one or more application user interfaces (e.g., the sixth input is directed to one of the one or more application user interfaces that are visually deemphasized), and in response to detecting the sixth input directed to the first application user interface, the computer system ceases to display the home menu user interface. In some embodiments, in response to detecting the sixth input directed to the first application user interface (e.g., in conjunction with ceasing to display the home menu user interface), the visual deemphasis of the first application user interface and/or other application user interfaces of the one or more application user interfaces is at least partially reversed. For example, as described herein with reference to FIGS. 18B, while home menu user interface 8012 is displayed, in response to detecting user interaction with user interface 18002 by user input 18020, computer system 101 ceases display of home menu user interface 8012, as shown in FIG. 18D. Dismissing the home menu user interface in response to detecting a user interaction with an application without requiring an additional user input to first dismiss home menu user interface reduces the number of inputs needed to begin interacting with the application.

In some embodiments, the sixth input includes a gaze input and a selection input (e.g., an air gesture, or a voice command) directed to the first application user interface. For example, user input 18020 in FIG. 18B optionally includes a gaze input and a selection input, such as a gaze input and tap input, or a gaze input and a pinch input that is directed to user interface 18002 (e.g., to give focus to and/or select user interface 18002). Detecting a user input that includes a gaze input and a selection input allows a visually deemphasized user interface to be activated without displaying additional controls (e.g., without requiring an additional user input to dismiss home menu user interface) and that reduces the amount of time needed to begin interacting with the application associated with the visually deemphasized user interface.

In some embodiments, the sixth input includes a gaze input directed to the first application user interface and a movement input (e.g., a drag input from a hand movement). For example, user input 18020 in FIG. 18B optionally includes a gaze input and a movement input (e.g., a gaze and drag input, a tap and swipe input, and/or a pinch and drag input) that is directed to user interface 18002 (e.g., to move user interface 18002). Detecting a user input that includes a gaze input and a movement input allows a visually deemphasized user interface to be activated, and optionally repositioned, without displaying additional controls (e.g., without requiring an additional user input to dismiss home menu user interface) and reduces an amount of time needed to begin interacting with the application associated with the visually deemphasized user interface.

In some embodiments, in response to detecting the first input, the home menu user interface is displayed at a first home menu location in the three-dimensional environment, and the computer system detects a seventh input (e.g., a manual input to a hardware button provided on a housing of the computer system, a press input to the hardware button, a rotational input to the hardware button, an air gesture, a gaze input, a hand gesture, or a voice command) corresponding to a request to display the home menu user interface at a second home menu location within the three-dimensional environment, wherein the second home menu location is different from the first home menu location (e.g., and optionally more than a threshold distance or other spatial separation from the first home menu location, such as due to a current viewport of the three-dimensional environment having changed to include the second home menu location and optionally to exclude the first home menu location). In some embodiments, the previously displayed home menu user interface (e.g., in response to detecting the first input, or in response to detecting the fourth input) is not dismissed prior to detecting the input corresponding to the request to display the home menu user interface at the second home menu location. In some embodiments, the seventh input is detected after the previously displayed home menu user interface was dismissed (e.g., in accordance with a user interaction with an application (e.g., by the sixth input, or by a different input), or in response to a manual input to the computer system (e.g., by the third input, or by a different input)), in response to detecting the seventh input, concurrently displaying the home menu user interface at the second home menu location and the one or more application user interfaces, wherein the one or more application user interfaces are displayed behind the home menu user interface from a viewpoint of the user (e.g., further from a viewpoint of a user than the second home menu location is from the viewpoint of the user). For example, as described herein with reference to FIG. 18G, in response to detecting user input that corresponds to a request to display home menu user interface 8012 while the user is at current viewpoint 18021, computer system 101 resumes display of home menu user interface 8012 in a viewport associated with current viewpoint 18021 while concurrently displaying user interfaces 18002 and 18004 that were displayed in a viewport associated with a previous viewpoint 18023 together with home menu user interface 8012. Concurrently displaying the home menu user interface and the one or more application user interfaces at respective new locations in the three-dimensional environment reduces the number of inputs needed to resume interacting with the home menu user interface and/or user interfaces of applications displayed in a prior viewport at a different location.

In some embodiments, the seventh input is detected while a respective viewport of the three-dimensional environment is visible to the user and one or more additional application user interfaces are outside the respective viewport (e.g., not visible to the user while the user is viewing the respective viewport that is determined based on a viewpoint of the user), and in response to detecting the seventh input: the computer system concurrently displays the home menu user interface at the second home menu location and the one or more application user interfaces behind the home menu user interface, and displays the one or more additional application user interfaces that were outside the respective viewport of the three-dimensional environment (e.g., which was visible to the user prior to detecting the seventh input; while the home menu user interface was last displayed at a location distinct from the updated second home menu location, the one or more user interfaces were within the respective viewport, whereas the one or more additional application user interfaces were outside the respective viewport). In some embodiments, the first home menu location is within the respective viewport, and the second home menu is within a different viewport (e.g., that is at least a threshold displacement from the respective viewport); in some such embodiments, the one or more additional application user interfaces that are displayed concurrently with the home menu user interface at the second location were outside of both the respective viewport and the different viewport. In some embodiments, the one or more additional application user interfaces are displayed at one or more default locations relative to the home menu user interface at the second home menu location (e.g., behind the home menu user interface). For example, as described herein with reference to FIG. 18G, user interface 18016 and user interface 18018, which were not displayed in the viewport associated with a previous viewpoint 18023, are displayed together with home menu user interface 8012 in response to detecting user input that corresponds to a request to display home menu user interface 8012 while the user is at current viewpoint 18021. Displaying one or more application user interfaces displayed outside of a prior viewport at respective new locations in the three-dimensional environment reduces the number of inputs needed to resume interacting with user interfaces of applications displayed in the three-dimensional environment while the user was at a different location, and provides a visual reminder to the user of additional open user interfaces in the three-dimensional environment without displaying additional controls.

In some embodiments, aspects/operations of methods 12000, 13000, 14000, 15000, 16000, 17000, 23000, 24000, 25000, 27000, and 29000 may be interchanged, substituted, and/or added between these methods. For brevity, these details are not repeated here.

FIG. 23 is a flow diagram of an exemplary method 23000 for displaying a home menu user interface while one or more application user interfaces are present in a viewport of the three-dimensional environment, in accordance with some embodiments. In some embodiments, method 23000 is performed at a computer system (e.g., computer system 101 in FIG. 1A) including one or more display generation components (e.g., display generation component 120 in FIGS. 1A, 3, and 4, display generation component 7100 in FIG. 7A, a heads-up display, a display, a touchscreen, and/or a projector) and one or more input devices (e.g., color sensors, infrared sensors, and other depth-sensing cameras that point downward at a user's hand and/or forward from user 7002's head, a button, a dial, a rotatable input element, a switch, a moveable hardware input device, and/or a solid-state hardware input device). In some embodiments, the method 23000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 23000 are, optionally, combined and/or the order of some operations is, optionally, changed.

While displaying, via the one or more display generation components, a respective user interface, the computer system detects (23002) a first input (e.g., an air pinch input, an air tap input, a pinch input, a tap input, an air pinch and drag input, an air drag input, a drag input, a click and drag input, a gaze input, and/or other input) directed to (e.g., corresponding to, or on) a selectable user interface object corresponding to a first application (e.g., an application icon in home menu user interface, a link in an application user interface such as a hyperlink in a message, web browser or map application, or a representation of content that is associated with the first application such as a photo, video, or electronic document) displayed in the respective user interface; and in response to detecting (23004) the first input: in accordance with a determination that the first input is detected while a user interface of the first application is displayed at a first position within a viewport of a three-dimensional environment, the computer system visually emphasizes (23006) (e.g., increasing an opacity, increasing a contrast, increasing a brightness, increasing a size, or displaying a (rubber-banding) animation) the user interface of the first application at the first position. For example, as described herein with reference to FIGS. 19A-19B, in response to detecting user input 19002 corresponding to selection of representation 8022, and in accordance with a determination that a user interface associated with Application A, to which representation 8022 corresponds, is within the viewport, computer system 101 visually emphasizes user interface 18002 of Application A. Visually emphasizing the application user interface of the first application reminds the user that an instance of the first application is already open, without providing additional controls to the user, increases operational efficiency of user-machine interactions (e.g., not having to wait for the first application to load). Visually emphasizing the application user interface of the first application also makes it easier for the user to identify the relevant information (e.g., highlighting/emphasizing a relevant application user interface in a collection of application user interfaces). Visually emphasizing the application user interface of the first application also reduces a computing burden on the computer system to generate two instances of the application user interface of the first application, improving computing resource management of the computer system and prolonging a time before a battery of the computer system has to be recharged. Visually emphasizing the application user interface of the first application also helps to organize the three-dimensional environment within a field of view of the user, reducing clutter of redundant application user interfaces, improving an efficiency and productivity of the user when interacting with the computer system in a three-dimensional environment.

In some embodiments, the respective user interface is a home menu user interface (e.g., the home menu user interface includes representations of applications such as application icons that are activatable to launch applications, the home menu user interface also includes widgets, communication options, and/or affordances for displaying extended reality (XR) backgrounds; in some embodiments, the home menu user interface is superimposed over the application user interface; e.g., objects (e.g., application icons, virtual user interface icons, and other objects; in some embodiments, in the home menu user interface are either opaque or partially transparent, thereby blocking or obscuring corresponding portions of the application user interface (e.g., those portions of the application user interface positioned behind the home menu user interface); in some embodiments, the home menu user interface comprises a platter with a plurality of objects on the platter, and the platter is either opaque or partially transparent, thereby blocking or obscuring those portions of the application user interface positioned behind the home menu user interface). For example, as described herein with reference to FIG. 19A, user input 19002 corresponds to selection of representation 8022, which is displayed on home menu user interface 8012. Providing a home menu user interface allows a user to quickly access and navigate a collection of representations of applications and launch a user interface of an application of interest, without displaying additional controls.

In some embodiments, the respective user interface is an application interface (e.g., the user interface of the first application is launched based on selection of a selectable object corresponding to the first application in the user interface of a different application). For example, as described herein with reference to FIG. 19K, user input 19032 corresponds to selection of a selectable media item, which is displayed in an application interface of an instant messaging application. Displaying a user interface of an application of interest in response to detecting a user input corresponding to a selection of a selectable representation of the application from another application interface allows a user to quickly access the user interface of the application of interest, without displaying additional controls.

In some embodiments, in response to detecting the first input: in accordance with a determination that the first input is detected while a user interface of the first application is not displayed within the viewport of the three-dimensional environment, the computer system displays a user interface of the first application at a respective location relative to a location at which the respective user interface (e.g., the home menu user interface or the application user interface) was displayed prior to displaying the first application in some embodiments, the home menu user interface ceases to be displayed (e.g., in conjunction with the user interface of the first application being displayed at the respective location) in response to the detecting of the first input. In some embodiments, the computer system maintains display of the home menu user interface within the viewport of the three-dimensional environment (e.g., at the location of the home menu user interface when the first input was detected). In some embodiments, the respective user interface is an application user interface, and the user interface of the first application is displayed offset from the application user interface. In some embodiments, the user interface of the first application is displayed vertically offset and laterally (e.g., to a right or to a left) of the application user interface. In some embodiments, a grabber affordance of the application user interface and a grabber affordance of the user interface of the first application are both displayed in the viewport of the three-dimensional environment. In some embodiments, the grabber affordance of the application user interface is activatable to reposition the application user interface. For example, as described herein with reference to FIGS. 19A and 19D, in response to detecting user input 19002 corresponding to selection of representation 8022 (FIG. 19A), and in accordance with a determination that a user interface associated with Application D, to which representation 8022 corresponds, is not within the viewport, computer system 101 displays a user interface of the application corresponding to representation 8022 (e.g., user interface 18016 of Application D) at a default location, as illustrated in FIG. 19D. Displaying a user interface of an application at a default location in accordance with a determination that no user interface of the application is present in the viewport reduces the need for the user to search within the viewport for the user interface of the application. Displaying the application user interface at a respective location relative to the home menu user interface without displaying additional controls to the user increases operational efficiency of user-machine interactions. Displaying the application user interface at the respective location relative to the home menu user interface reduces or eliminates the need for the user to visually search for the launched application user interface throughout the three-dimensional dimension, improving an efficiency and productivity of the user when interacting with the computer system in a three-dimensional environment.

In some embodiments, visually emphasizing the user interface of the first application at the first position includes increasing an opacity of the user interface of the first application. For example, as described herein with reference to FIGS. 19B, computer system 101 visually emphasizes user interface 18002 of Application A by displaying user interface 18002 as more opaque (e.g., has a higher opacity, or is less translucent) than user interfaces 18004 and 18012, and also as more opaque than user interface 18002 immediately prior to detecting user input 19002 of FIG. 19A. Increasing an opacity of a user interface of the first application in accordance with a determination that the user interface of the first application is already present in the viewport reduces the need for the user to search within the viewport for the user interface of the first application.

In some embodiments, a user interface of a second application is displayed at a location closer to a viewpoint of a user than the user interface of the first application is to the viewpoint of the user, and in response to detecting the first input: in accordance with the determination that the first input is detected while a user interface of the first application is displayed at a first position within the viewport of the three-dimensional environment, the computer system forgoes visually emphasizing the user interface of the second application (e.g., in conjunction with (e.g., concurrently with, and/or while) visually emphasizing the user interface of the first application). In some embodiments, the computer system visually deemphasizes the user interface of the second application relative to the user interface of the first application (e.g., by forgoing visually emphasizing the user interface of the second application or preventing the second application from being visually emphasized, or by visually deemphasizing the user interface of the second application, while visually emphasizing the user interface of the first application). For example, as described herein with reference to FIGS. 19B, user interface 18004 of Application B and user interface 18014 of Application C are displayed at respective depth positions that are closer to the viewpoint of the user than the depth position of the visually emphasized user interface 18002. Computer system 101 prevents user interfaces 18004 and 18014 from being visually emphasized while user interface 18002 is visually emphasized, as shown in top view 19003 of FIG. 19B. Forgoing visually emphasizing the user interface of the second application that is closer to a viewpoint of the user while visually emphasizing the user interface of the application of interest allows the user to maintain focus on the application of interest without displaying additional controls.

In some embodiments, after visually emphasizing the user interface of the first application at the first position for a threshold amount of time: in accordance with a determination that attention criteria are not met with respect to the user interface of the first application (e.g., wherein the attention criteria require that a user direct their attention, such as their gaze, to the user interface of the first application in order for the attention criteria to be met), the computer system ceases to visually emphasize the user interface of the first application (e.g., by at least partially reversing the visual emphasis of the user interface of the first application at the first position). In some embodiments, in accordance with a determination that the attention criteria are met, the computer system continues visually emphasizing the user interface of the first application at the first position. For example, as illustrated in FIG. 19B in which user interface 18002 is visually emphasized, in accordance with a determination that attention of the user does not meet attention criteria with respect to user interface 18002 (e.g., gaze input 19016 of the user is not directed to user interface 18002, or does not persist, for at least a threshold length of time while user interface 18002 is visually emphasized, and/or the user interacts with other user interfaces), computer system 101 at least partially reverses the visual emphasis of user interface 18002 (e.g., by visually deemphasizing user interface 18002, and/or returning user interface 18002 to a state having similar visual characteristics as those of other user interfaces displayed within the viewport), as illustrated in FIG. 19F. Ceasing to visually emphasize a user interface of the first application automatically if the user does not pay sufficient attention to the visually emphasized user interface indicates to the user that the user interface of the first application is no longer in focus, without displaying additional controls.

In some embodiments, after visually emphasizing the user interface of the first application at the first position for the threshold amount of time: in accordance with a determination that the attention criteria are met with respect to the user interface of the first application (e.g., a gaze input of a user directed to the user interface of the first application meets a dwell time threshold, and/or a velocity of a gaze input over the user interface of the first application is less than a velocity threshold), the computer system continues to visually emphasize the user interface of the first application. For example, as shown in FIG. 19E, in accordance with a determination that attention 19006 of the user (e.g., a gaze input meeting a gaze dwell time threshold or other criteria) directed to user interface 18016 meets attention criteria, computer system 101 maintains the visual emphasis of user interface 18016. Top view 19005 shows visual emphasis of user interface 18016 relative to user interfaces 18002, 18004 and 18014. Continuing to visually emphasize a user interface of the first application as the user continues directing attention to the user interface automatically indicates to the user that the user interface of the first application is in focus, without displaying additional controls.

In some embodiments, after visually emphasizing the user interface of the first application at the first position for the threshold amount of time: in accordance with a determination that the attention criteria are met with respect to a user interface of a second application (e.g., a gaze input of the user directed to the user interface of the second application meets a dwell time threshold, and/or a velocity of a gaze input over the user interface of the second application is less than a velocity threshold), the computer system visually emphasizes the user interface of the second application (e.g., while ceasing to visually emphasize the user interface of the first application, or while maintaining visual emphasis of the user interface of the first application). For example, in response to detecting attention 19016 (see FIGS. 19B and 19F) of the user being directed to a different user interface, such as user interface 18014 of Application C, computer system 101 visually emphasizes user interface 18014 of Application C, in conjunction with or concurrently with visually deemphasizing user interface 18002, as illustrated in FIG. 19F. Top view 19007 shows visual emphasis of user interface 18014 relative to user interfaces 18002 and 18004. Visually emphasizing a user interface of a different application in accordance with a determination that the attention criteria are met with respect to the user interface of the different application automatically indicates to the user that the user interface of the different application is in focus and interactable with the user, without displaying additional controls.

In some embodiments, the computer system detects a second input (e.g., an air pinch input, an air tap input, a pinch input, a tap input, an air pinch and drag input, an air drag input, a drag input, a click and drag input, a gaze input, and/or other input) (e.g., the second input is directed to a close affordance displayed with a user interface of a respective application, such as the first application, or the second input is directed to a close affordance displayed on a user interface different from the user interface of the respective application); and in response to detecting the second input, the computer system ceases to display a user interface of a third application (e.g., the user interface of the third application is the user interface of the first application, the user interface of the third application is the user interface of a third application different from the first application, in some embodiments, the user interface of the third application is one of multiple user interfaces (e.g., of the third application and optionally of one or more other applications) that cease to be displayed (e.g., are hidden or closed) in response to detecting the second input. In some embodiments, in response to detecting the second input, the computer system ceases to display all user interfaces of the third application. In some embodiments, ceasing to display a user interface of an application includes ceasing to display the user interface of the application in a current viewport of the three-dimensional environment or anywhere in the three-dimensional environment. In some embodiments, ceasing to display a user interface of an application includes hiding the user interface of the application (e.g., transitions the user interface of the application from a foreground state to a background state) (e.g., information about a state and/or content of the user interface of the application is retained). In some embodiments, ceasing to display a user interface includes closing the user interface of the application (e.g., information about a state and/or content of the user interface of the application is not retained). For example, in the viewport of FIG. 19G, computer system 100 no longer displays user interface 18004 of Application B, in response to computer system 101 detecting a user input (e.g., an air pinch input, an air tap input, a pinch input, a tap input, an air pinch and drag input, an air drag input, a drag input, a click and drag input, a gaze input, and/or other input) corresponding to a request to close user interface 18004. Ceasing displaying of a user interface in response to detecting a user input to close the user interface reduces the number of inputs needed to free up one or more regions of the three-dimensional environment.

In some embodiments, after ceasing to display the user interface of the third application, the computer system detects a third input (e.g., an air pinch input, an air tap input, a pinch input, a tap input, an air pinch and drag input, an air drag input, a drag input, a click and drag input, a gaze input, and/or other input) corresponding to a request to display the user interface of the third application (e.g., an input corresponding to a request to relaunch the user interface of the third application, restart the third application on the computer system, or transition the user interface of the third application from a background state to a foreground state; the user interface of the third application is the same user interface of the third application that was previously closed, or the user interface is a different (e.g., a default, and/or a blank) user interface of the third application); in response to detecting the third input, the computer system redisplays the user interface of the third application. In some embodiments, the third input includes a user input corresponding to a selection of a respective representation of the third application displayed on a home menu user interface (e.g., displayed in response to a subsequent invocation of the home menu user interface). In some embodiments, the third input includes a user input corresponding to a selection of a selectable object in an application user interface. For example, while user interface 18004 of Application B is not displayed in the viewport as shown in FIG. 19G, computer system 101 detects a user input corresponding to a request to display user interface 18004 of Application B (e.g., a selection input to a representation of Application B displayed on home menu user interface 8012, or a user input corresponding to selection of a selectable user interface object associated with Application B from an application user interface that is different from home menu user interface 8012). Redisplaying a dismissed user interface of an application in response to detecting a third input reduces the number of inputs needed to resume display of the dismissed user interface.

In some embodiments, the second input is detected while the user interface of the third application is displayed at a third location in the three-dimensional environment (e.g., within a current viewport of the three-dimensional environment); and redisplaying the user interface of the third application includes, in accordance with a determination that the third input meets respective criteria, redisplaying the user interface of the third application at the third location (e.g., redisplaying only the user interface of the third application at the third location, or also redisplaying additional user interfaces of the third application that were previously closed, at the same respective locations as before being closed). For example, in response to detecting the user input for displaying user interface 18004 of Application B, and in accordance with a determination that first criteria are met, computer system 101 displays user interface 18004 of Application B at its last location (e.g., prior to computer system 101 detecting the user input to close the user interface of Application B), as illustrated in FIG. 19I. Displaying the user interface at a location where the user interface was dismissed reduces the need for the user to search within the viewport for the user interface without having to display additional controls.

In some embodiments, redisplaying the user interface of the third application includes, in accordance with a determination that the third input does not meet the respective criteria, redisplaying the user interface of the third application at a default location (e.g., the default location is different from the third location, and/or additional user interfaces of the third application are displayed at respective default locations). In some embodiments, the default location is a location having a respective spatial relationship to the location of a home menu user interface, which in some embodiments, and in some circumstances, is displayed in response to detecting the second input dismissing the user interface of the third application. For example, in response to detecting the user input for displaying user interface 18004 of Application B, and in accordance with a determination that first criteria are not met, computer system 101 displays user interface 18004 of Application B at a default location within the viewport, as illustrated in FIG. 19H. Displaying the user interface at a default location in accordance with a determination that respective criteria are not met reduces the need for the user to search within the viewport for the user interface without having to display additional controls.

In some embodiments, the respective criteria include a requirement that the third input was detected at a time interval that is greater than a first time threshold after the second input was detected (e.g., the first time threshold is greater than 60 seconds, or greater than 90 seconds, and/or the time interval is between the time the third input was detected and the time the second input was detected). For example, the first criteria include a requirement that user input corresponding to the request to display the closed application is detected with a first time threshold (e.g., less than 60 seconds, less than 120 seconds, less than 600 seconds, less than 30 minutes, or a different time threshold) from the request to close the application. Disambiguating whether to display the user interface at its previous location or at a default location based on the time between when the user interface was dismissed and when the request for relaunching the user interface was detected enables the user interface to be displayed at different locations, and at a location at which the user is more likely to expect to see the user interface displayed, reducing the need for the user to search in the viewport for the application user interface, without having to display additional controls.

In some embodiments, the respective criteria include a requirement that a viewport of the three-dimensional environment includes the third location when the third input is detected (e.g., the third location is where the user interface of the third application was displayed when dismissed in response to detecting the second input). For example, in FIGS. 19B and 191, the last location of user interface 18004 (e.g., prior to closing user interface 18004) is close to a corner of the three-dimensional environment, between wall 7006' and wall 7004'. In contrast, the viewport in FIG. 19J does not show any portion of wall 7006' and does not include the location of user interface 18004 where it was last displayed. In response to detecting the user input for displaying user interface 18004 of Application B while the viewport in FIG. 19J is displayed, computer system 101 displays user interface 18004 of Application B at a default location within the viewport, as illustrated in FIG. 19J. Disambiguating whether to display the user interface at its previous location or at a default location based on whether the current viewport includes a location where the user interface was previously displayed enables the user interface to be displayed at different locations, including at a default location if the previous location is not available for displaying the user interface, reducing the need for the user to search in the viewport for the application user interface, without having to display additional controls.

In some embodiments, in response to detecting the first input: in accordance with a determination that the first input is detected while a user interface of the first application is not displayed within the viewport of the three-dimensional environment, the computer system displays a user interface of the first application, including: in accordance with a determination that content of the first application is loaded within a threshold loading time (e.g., since detecting the first input directed to the representation of the first application), the computer system displays the user interface of the first application with the content of the first application; and in accordance with a determination that content of the first application is not loaded within the threshold loading time, the computer system displays an indication of the user interface of the first application without displaying content of the first application. In some embodiments, the indication of the user interface of the first application is a temporary application tile that serves as a placeholder user interface element for the user interface of the first application while content of the first application is being loaded for display in the user interface of the first application. In some embodiments, the indication of the user interface of the first application is not configured to be interactive. In some embodiments, the indication of the user interface of the first application provides limited information about the first application to the user, such as a size of the user interface of the first application, a shape of the user interface of the first application, a position of the user interface of the first application, a name of the first application, and/or other basic information. For example, as described herein with reference to FIG. 19C, in response to detecting user input 19002 corresponding to selection of representation 8022 for displaying a user interface of Application D, which is associated with representation 8022 and which is not already displayed in the viewport, and in accordance with a determination that a loading time for Application D is equal to or longer than a waiting time threshold, or in accordance with a determination that content related to Application D has not yet loaded, or has not yet completed loading, upon expiration of the waiting time threshold, computer system 101 displays a temporary frame 19004 at a location corresponding to where user interface 18016 would be displayed after the loading time has elapsed. In accordance with a determination that the loading time for Application D is shorter than the waiting time threshold, computer system 101 forgoes displaying the temporary frame 19004 illustrated in FIG. 19C, and directly displays user interface 18016 (e.g., at the default location of the viewport), as illustrated in FIG. 19D. Displaying an indication of the user interface of the first application without displaying content of the first application that is not yet available causes the computer system to automatically provide an indication to the user of a loading process of the user interface, reducing a likelihood of the user repeatedly selecting the representation corresponding to the first application due to a mistaken perception that computer system has not responded to the initial user input for displaying the user interface of the application.

In some embodiments, in response to detecting the first input: in accordance with a determination that the first input is detected while a user interface of the first application is not displayed within the viewport of the three-dimensional environment, the computer system displays a user interface of the first application, including: displaying a respective user interface element (e.g., a main user interface element, such as an application window or platter) of the user interface of the first application for a respective amount of time without displaying one or more auxiliary user interface elements of the user interface of the first application. In some embodiments, the one or more auxiliary user interface elements are distinct from (and optionally separate from) the main user interface element. In some embodiments, the one or more auxiliary user interface elements of the user interface of the first application are displayed within a threshold proximity to the main user interface element of the user interface of the first application. In some embodiments, the one or more auxiliary user interface elements are activatable to manipulate the main user interface element, optionally including: a navigation bar (e.g., for navigating content of the first application displayed in the user interface of the first application, such as navigating to next content or previous content, viewing content of a different tab or page, scrolling the content), forward and/or back buttons, scrollbars, tabs and/or other pagination indicators, or other navigation controls, an application selection affordance (e.g., for selecting and optionally repositioning/moving the user interface of the first application), a close affordance (e.g., for dismissing (e.g., closing or hiding) one or more user interfaces of the first application (e.g., including the main region and/or one or more, or all, auxiliary regions of the application user interface) and/or other applications), a resize affordance (e.g., for resizing the user interface of the first application in response to movement of the input corresponding to activation of the resize affordance), and/or other affordances or controls for manipulating display of the user interface of the first application. In some embodiments, the computer system detects an input corresponding to activation of the application selection affordance and, in response to detecting the input corresponding to the activation of the application selection affordance, initiates (e.g., enables a mode for) repositioning of user interface of the first application (e.g., in response to movement of the input corresponding to activation of the application selection affordance, the movement of the input optionally including movement in x-, y-, and/or z-directions or in polar, azimuthal, and/or radial directions in three-dimensional space). In some embodiments, activation of the resize affordance enables a mode in which user interface of the first application is configured to be resized in response to further input (e.g., movement of a user's hand performing an air gesture, movement of a touch input via a touch-sensitive surface, or other input). In some embodiments, in response to activation of the close affordance, the computer system ceases to display a window, tab, pop up, or other portion of user interface of the first application optionally without ceasing to display other user interfaces of other applications. For example, as described herein with reference to FIG. 19D, in response to detecting user input 19002 corresponding to selection of representation 8022 for displaying a user interface of Application D, which is associated with representation 8022 and which is not already displayed in the viewport, computer system 101 displays a main user interface element showing content of Application D in user interface 18016, without displaying auxiliary user interface elements. Displaying a respective user interface element for a respective amount of time without displaying the one or more auxiliary user interface elements, allows the content of the application to be displayed more quickly to the user.

In some embodiments, displaying the user interface of the first application includes, after displaying the respective user interface element for the respective amount of time without displaying the one or more auxiliary user interface elements, displaying the one or more auxiliary user interface elements concurrently with displaying (e.g., continuing to display) the user interface of the first application. In some embodiments, in response to detecting activation of an auxiliary user interface element that includes an application selection affordance, selecting and optionally repositioning/moving the user interface of the first application. In some embodiments, in response to detecting activation of an auxiliary user interface element that includes a close affordance, dismissing (e.g., closing or hiding) one or more user interfaces of the first application. In some embodiments, in response to detecting activation of an auxiliary user interface element that includes a navigation affordance, navigating to next content or previous content, viewing content of a different tab or page, or scrolling the content of the user interface of the first application. For example, as described herein with reference to FIG. 19E, auxiliary user interface elements such as application selection affordance or grabber 19008, close affordance 19010, resize affordance 19012, and resize affordance 19014 are automatically displayed, outside of the main user interface element of user interface 18016, optionally, in proximity to (e.g., within a threshold proximity of) the main user interface element of Application D, within, or after, a threshold amount of time the main user interface element associated with Application D is displayed in the viewport (e.g., initially without the auxiliary user interface elements, as shown in FIG. 19D. Displaying a respective user interface element for a respective amount of time without displaying the one or more auxiliary user interface elements allows the content of the application to be displayed more quickly, and automatically displaying the one or more auxiliary user interface elements concurrently with displaying the user interface of the first application after the respective amount of time, reduces the number of inputs needed for the user to interact with the one or more auxiliary user interface elements.

In some embodiments, aspects/operations of methods 12000, 13000, 14000, 15000, 16000, 17000, 22000, 24000, 25000, 27000, and 29000 may be interchanged, substituted, and/or added between these methods. For brevity, these details are not repeated here.

FIG. 24 is a flow diagram of an exemplary method 24000 for displaying a home menu user interface while one or more application user interfaces are present in a viewport of the three-dimensional environment, in accordance with some embodiments. In some embodiments, method 24000 is performed at a computer system (e.g., computer system 101 in FIG. 1A) including one or more display generation components (e.g., display generation component 120 in FIGS. 1A, 3, and 4, display generation component 7100 in FIG. 7A, a heads-up display, a display, a touchscreen, and/or a projector) and one or more input devices (e.g., color sensors, infrared sensors, and other depth-sensing cameras that point downward at a user's hand and/or forward from user 7002's head, a button, a dial, a rotatable input element, a switch, a moveable hardware input device, and/or a solid-state hardware input device). In some embodiments, the method 24000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 24000 are, optionally, combined and/or the order of some operations is, optionally, changed.

As described herein, method 24000 provides an improved mechanism for automatically rearranging overlapping objects (e.g., open windows executed by one or more applications) in a mixed-reality three-dimensional environment. If a first object is placed in the mixed-reality three-dimensional environment such that the first object occludes a pre-existing second object (e.g., an object that is already visible in the mixed-reality three-dimensional environment before the first object is placed) by more than a threshold amount (e.g., a percentage, proportion, and/or area) from a viewpoint of a user, and if the first object and the second object are also in a depth conflict (e.g., the first object and the second object are sufficiently close to each other in the depth dimension), the computer system automatically (e.g., without additional user inputs and/or conditions that need to be met) moves the pre-existing second object (e.g., the one that is being occluded by the first object), such that at least a threshold amount of visibility of the pre-existing second object is maintained. Automatically reducing occlusion between objects (e.g., thereby maintaining visibility and/or quick access to the objects) in mixed-reality three-dimensional environment reduces the number and/or complexity of inputs needed to rearrange objects, bring the objects to the foreground and/or otherwise interact with the objects in the mixed-reality three-dimensional environment, thereby making interaction with multiple objects more efficient.

A computer system displays (24002) a first object (e.g., the first object corresponds to an application window) at a first location that is a first distance from a viewpoint of a user in a view of a three-dimensional environment (e.g., the environment being a three-dimensional environment that includes one or more computer-generated portions (e.g., virtual content overlaid onto, projected onto, and/or replacing display of one or more portions of a representation or view of a physical environment) and optionally one or more passthrough portions (e.g., camera view, or direct passthrough)). The computer system detects (24004) an input (e.g., an air pinch input, an air tap input, a pinch input, a tap input, an air pinch and drag input, an air drag input, a drag input, a click and drag input, a gaze input, and/or other input) corresponding to a request to display a second object (e.g., the second object corresponds to an application window) at a second location that is a second distance from the viewpoint of the user in the view of the three-dimensional environment (e.g., a request to move, launch, open, or otherwise display the second object in the second location); in some embodiments, in response to detecting an input to launch or open the second object, the first object is temporarily hidden from display, or the first object is made transparent or is displayed with greater transparency, or the first object is hidden from display while a visual indication of location, size, and/or extent of the first object is displayed. In response to detecting (24006) the input corresponding to the request to display the second object at the second location: in accordance with a determination that displaying the second object at the second location results in (e.g., is associated with or corresponds to) more than a threshold amount (e.g., a percentage, proportion, area, etc.) of overlap between the first object and the second object from the viewpoint of the user (e.g. threshold amount of first object is overlapped and/or threshold amount of second object is overlapped) and that a difference in depth between the first location and the second location is less than a respective threshold depth, the computer system displays (24008) the first object at a third location and the second object at a fourth location (e.g., the third location is different from the fourth location; in some embodiments, the fourth location is the second location, e.g., the first object moves whereas the second object is displayed at the requested second location). The third location and the fourth location are selected such that less than the threshold amount of overlap between the first object and the second object is visible from the viewpoint of the user. For example, in the scenario of FIG. 20D, in which application user interface 20028 both occludes and is in depth conflict with a pre-existing application user interface 20024, the computer system automatically shifts the pre-existing application user interface 20024. Specifically, in the scenario of FIG. 20E, the computer system 101 shifts (e.g., automatically shifts) application user interface 20024 in accordance with a determination that the amount of overlap $O_a$ between application user interface 20028 and application user interface 20024 from a viewpoint of user 7002 is greater than the occlusion threshold $T_o$ (e.g., $O_a > T_o$) and that difference in depth d between the location of application user interface 20024 and application user interface 20028 is less than the depth threshold $T_D$ from the viewpoint of the user (e.g., $d<T_D$).

In some embodiments, the third location is different from the first location and/or the fourth location is different from the second location. For example, the first object is moved to an updated position (without moving the second object), the second object is moved to an updated position (without moving the first object), or both the first object and the second object are moved to respective updated positions. In some embodiments, if the first object is occluded by the second object from the viewpoint of the user resulting in more than the threshold amount of overlap, the first object and/or the second object are moved so that more than a predetermined portion of the first object is visible from the viewpoint of the user. In some embodiments, the first object and/or the second object are moved laterally or vertically (optionally without changing the respective distances at which the first object and/or second object are displayed from the viewpoint of the user). In some embodiments, in response to detecting the input corresponding to the request to display the second object at the second location, the computer system moves the first object in accordance with a determination that, if the first object remains at the first location and the second object is displayed at the requested second location, less than a threshold amount of the first object remains visible (e.g., from the viewpoint of the user) and the first object and the second object are in depth conflict (e.g., a difference in depth between the first object at the first location and the second object at the second location is less than the respective threshold depth from the viewpoint of the user. The computer system moves the first object to an updated location where more than a threshold amount of the first object remains (e.g., the threshold amount of visibility that is maintained is selected such that a user can select the first object, bring the first object to the foreground, and/or move the first object in three-dimensional environment). In some embodiments, if a respective amount (e.g., 1, 2, 3, 5, 10 inches and/or other small amount, percentage, and/or proportion) of the first object along the length and/or the width of the first object (e.g., in a vertical direction and/or horizontal direction) remains visible from the viewpoint of the user when the first object remains at the first location and the second object is displayed at the requested second location, the computer system forgoes moving (e.g., rearranging) the first object and the second object (e.g., the computer system ignores an overall amount of overlap between the first object and the second object, even if the amount of overlap is more than the threshold amount of overlap).

In some embodiments, prior to displaying the first object at the third location and the second object at the fourth location (e.g., prior to making the determination that displaying the second object at the second location results in more than the threshold amount of overlap between the first object and the second object from the viewpoint of the user), the computer system displays the second object at the second location for a respective amount of time without moving the first object from the first location to an updated position (e.g., the second object is displayed at the second location while the first object continues to be displayed at the first location, such that there is more than the threshold amount of overlap between the first object and the second object from the viewpoint of the user for the respective amount of time). For example, in the scenario of FIG. 20E, application user interface 20028 briefly occludes application user interface 20024 (e.g., upon computer system 101 launching application Ap3) before the computer system reduces the amount of overlap $O_a$ between application user interface 20028 and application user interface 20024 from the viewpoint of user 7002. In some embodiments, the second object briefly occludes the respective portion of the first object before reducing the overlap between the first object and the second object. In some embodiments, the second object is not displayed at the second location until the first object is moved away. For example, the computer system determines that displaying the second object at the second location results in more than the threshold amount of overlap between the first object and the second object from the viewpoint of the user and moves the first object before displaying the second object at the second location. Briefly occluding pre-existing object with an overlaying object before the computer system automatically shifts the pre-existing object to reduces the amount of overlap between the pre-existing object and the overlaying provides visual feedback to the user that an operation is successfully completed (e.g., request to display the overlaying object at a requested location where it overlaps with the pre-existing object), thereby reducing the number of inputs needed to interact needed to rearrange objects, bring the objects to the foreground and/or otherwise interact with the objects in the mixed-reality three-dimensional environment, thereby making interaction with multiple objects more efficient.

In some embodiments, in response to detecting the input corresponding to the request to display the second object at the second location: in accordance with a determination that the difference in depth (e.g., between the first location and the second location) is more than the respective threshold depth, the computer system forgoes displaying the first object at the third location and the second object at the fourth location. For example, in the scenario of FIGS. 20S-20T, the computer system 101 does not shift user interface 20054 of application Ap2 (e.g., a pre-existing object), even though user interface 20052 of application Ap1 occludes user interface 20054 of application Ap2 by more than the permitted occlusion threshold $T_o$, because user interface 20054 of application Ap2 and user interface 20052 of application Ap1 are not in depth conflict.

In some embodiments, in accordance with the determination that the difference in depth is more than the respective threshold depth, the computer system continues to display the first object at the first location and displays the second object at the requested second location. For example, the computer system forgoes reducing the overlap between the first object and the second object since the first object and the second object are far away from each other from the viewpoint of the user (e.g., such that one of first object or the second object is in the foreground and the other is in the background). Using depth conflict as a condition to determine whether to automatically shifts objects in the three-dimensional environment to reduce occlusion and improve visibility of objects, avoids excessive rearrangement of objects in a mixed-reality three-dimensional environment, especially of objects that are far away in the background, thereby making interaction with multiple objects more efficient.

In some embodiments, the threshold amount of overlap is determined with respect to the first object or the second object (e.g., displaying the second object at the second location while the first object is displayed at the first location would result in the threshold amount of the first object being overlapped and/or the threshold amount of the second object being overlapped). For example, in the scenario of FIG. 20E in which application user interface 20028 and application user interface 20024 are different sizes (e.g., one is larger than the other), the amount of overlap $O_a$ and/or the occlusion threshold $T_o$ are determined with respect to the larger or the smaller user interface from application user interfaces 20028 and 20024, or alternatively, with respect to the user interface of application user interfaces 20028 and 20024, furthest from the viewpoint of user 7002. Automatically reducing occlusion between objects (e.g., thereby maintain visibility and/or quick access to the objects) in mixed-reality three-dimensional environment, where the occlusion threshold is with respect to the larger or the smaller of the conflicting objects, reduces the number and/or complexity of inputs needed to rearrange objects, bring the objects to the foreground and/or otherwise interact with the objects in the mixed-reality three-dimensional environment, thereby making interactions with multiple objects more efficient.

In some embodiments, the respective threshold depth is determined based on (e.g., measured from) the viewpoint of the user. For example, in the scenario of FIG. 20D, the distance d between user interface 2028 and user interface 2024 is measured from the viewpoint of the user 7002. Also, in the scenario of FIG. 20D, the distance $d_1$ between user interface 2028 and user interface 2022 is measured from the viewpoint of the user 7002. In the scenarios of FIGS. 20G-20J, the distances d, $d_1$, and $d_2$ between user interface 20028 and user interface 20024 are measured from the viewpoint of the user 7002.

In some embodiments, the viewpoint of the user is a first viewpoint of the user, and the method 2400 includes detecting a change of a respective viewpoint of the user from the first viewpoint of the user to a second viewpoint of the user. In some embodiments, in the method 2400, the first object at the first location is displayed at a first perspective distance from a second viewpoint of the user that is different from the first viewpoint, and the second object at the second location is displayed at a second perspective distance from the second viewpoint of the user. The method 2400 includes, in response to detecting the input corresponding to the request to display the second object at the second location: in accordance with a determination that displaying the second object at the second location results in (e.g., is associated with or corresponds to) more than the threshold amount (e.g., a percentage, proportion, area, and/or other size measurement) of overlap between the first object and the second object from the second viewpoint of the user (e.g. threshold amount of first object is overlapped and/or threshold amount of second object is overlapped) and that a difference in depth between the first perspective location and the second perspective location is less than the respective threshold depth, displaying the first object at a third updated location (e.g., and/or optionally displaying the second object at a fourth updated location), wherein the third updated location is different from the first location. In some embodiments, the third updated location (and the optionally fourth updated location) is selected such that less than the threshold amount of overlap between the first object and the second object is visible from the second viewpoint of the user. Using depth conflict based on a distance from the viewpoint of the user as a condition to determine whether to automatically shifts objects in the three-dimensional environment, reduces occlusion and improves visibility of objects, and avoids excessive rearrangement of objects in a mixed-reality three-dimensional environment, especially of objects that are far away in the background, thereby making interactions with multiple objects more efficient.

In some embodiments, while displaying the first object at the third location, wherein the third location is different from the first location, and the second object at the fourth location, the computer system detects an input (e.g., an air pinch input, an air tap input, a pinch input, a tap input, an air pinch and drag input, an air drag input, a drag input, a click and drag input, a gaze input, and/or other input) corresponding to a request to move the second object from the fourth location to a different location; and in response to detecting the input corresponding to the request to move the second object from the fourth location to the different location: in accordance with a determination that displaying the first object at the first location and the second object at the different location results in less than the threshold amount of overlap (e.g., including no overlap) between the first object and the second object from the viewpoint of the user or that the difference in depth between the first object when displayed at the first location and the second object when displayed at the different location is at least the respective depth threshold: the computer system displays the second object at the different location; and redisplaying the first object at the first location. For example, in the scenarios of FIGS. 20G-20H, the computer system 101 shifts back to an initial position application user interface 20024 of application Ap5 (e.g., an underlying object) when interface 20028 of application Ap3 (e.g., a conflicting object) is moved away or removed, such that the depth conflict between application user interface 20024 of application Ap5 (e.g., the underlying object) and interface 20028 of application Ap3 (e.g., the conflicting object) is removed, and/or more than a threshold amount of visibility (e.g., from the viewpoint of the user) of user interface 20024 (e.g., the underlying object) results from removing or moving user interface 20028 (e.g., the conflicting object away). In some embodiments, the first object is displayed at the first location in conjunction with moving the second object from the fourth location to the different location. In some embodiments, the first object is moved back to its original location when the second object is moved to a new location where at least one of the following conditions is true: the overlap between the first object at the first location and the second object at the new location is not more than the threshold amount, and the difference in depth between the first object at the first location and the second object at the new location is at least the respective depth threshold. Automatically re-shifting an object back to its initial position before it was moved to an updated position in order to reduce occlusion with an overlaying object, restores position of the object (e.g., user-defined position) when a respective depth and/or occlusion conflict with an overlaying object no longer exist (e.g., because an overlaying object was moved), thereby reducing the number and/or complexity of inputs needed to rearrange objects, bring the objects to the foreground and/or otherwise interact with the objects in the mixed-reality three-dimensional environment, thereby making interaction with multiple objects more efficient.

In some embodiments, while displaying the first object at the third location, wherein the third location is different from the first location, and the second object at the fourth location, the computer system detects an input (e.g., an air pinch input, an air tap input, a pinch input, a tap input, an air pinch and drag input, an air drag input, a drag input, a click and drag input, a gaze input, and/or other input) corresponding to a request to cease to display the second object; and in response to detecting the input corresponding to the request to cease to display the second object: the computer system ceases to display the second object, and redisplays the first object at the first location (e.g., by moving the first object from the third location to the first location). In some embodiments, the computer system displays an animation of the movement of the first object from the third location to the first location. For example, in the scenario of FIG. 20G, in response to detecting that the application user interface 20030 (e.g., the conflicting user interface) is closed, the computer system automatically shifts back application user interface 20028 of application Ap3 from the updated position back to the position that application user interface 20028 of application Ap3 was in before it was shifted (e.g., a respective position in FIG. 20E before application user interface 20030 of application Ap8 was displayed, as shown in FIG. 20F). Automatically re-shifting an object back to its initial position before it was moved to an updated position in order to reduce occlusion with an overlaying object, restores position of the object (e.g., user-defined position) when a respective depth and/or occlusion conflict with an overlaying object no longer exist (e.g., because the overlaying object was closed or dismissed), thereby reducing the number and/or complexity of inputs needed to rearrange objects, bring the objects to the foreground and/or otherwise interact with the objects in the mixed-reality three-dimensional environment, thereby making interaction with multiple objects more efficient.

In some embodiments, while displaying the first object at the third location, wherein the third location is different from the first location, and the second object at the fourth location, the computer system detects a second input corresponding to a request to cease to display the second object at the fourth location (e.g., a request to cease to display the second object altogether or a request to move the second object from the fourth location to a different location); and in response to detecting the second input: the computer system ceases to display the second object at the fourth location (e.g., because the second object has been closed or because the second object has been moved to a different location); and in accordance with a determination that the second object was displayed at the fourth location for less than a respective threshold amount of time, the computer system redisplays the first object at the first location (e.g., by moving the first object from the third location to the first location); and in accordance with a determination that the second object was displayed at the fourth location for at least the respective threshold amount of time, the computer system maintains display of the first object at the third location. For example, in the scenarios of FIGS. 20F-20G and 20H-20J in which an application user interface (e.g., 20028 in FIG. 20G and 20024 in FIG. 20J) is automatically shifted back to an initial position from an updated position after a depth conflict and/or an occlusion conflict is removed (e.g., because an overlaying user interface is closed or moved away), the computer system forgoes shifting in accordance with a determination that the application user interface was displayed at the updated position for more than a threshold amount of time.

In some embodiments, the computer system displays an animation of the movement of the first object from the third location to the first location. In some embodiments, in addition to the condition that the respective threshold amount of time has not passed in order for the computer system to redisplay the first object at the first location, the computer system determines whether an additional condition is satisfied. For example, the computer system redisplays the first object at the first location also in accordance with a determination that an amount of overlap between the second object (e.g., if moved to a different location rather than closed) and the first object at the first location from the viewpoint of the user is not more than the threshold amount of overlap (e.g., less than the threshold amount of overlap, including no overlap due to the first and second object being sufficiently separated or due to the second object being no longer displayed) or the difference in depth between the second object and the first object displayed at the first location from the viewpoint of the user is at least the respective depth threshold. Forgoing automatic re-shifting of an object back to an initial position from an updated position when the object was displayed at the updated position for more than a threshold amount of time, avoids excessive rearrangement of objects in a mixed-reality three-dimensional environment, especially of objects that remain at their system-determined respective positions for long periods, thereby making interaction with multiple objects more efficient.

In some embodiments, in accordance with the third location of the first object being different from the first location of the first object, the third location is at least one of: to the left, to the right, above, or below the first location from the viewpoint of the user; and in accordance with the fourth location of the second object being different from the second location of the second object, the fourth location is at least one of: to the left, to the right, above, or below the second location from the viewpoint of the user. For example, in the scenario of FIG. 20E, application user interface 20024 is moved laterally without changing the distance of application user interface 20024 from the viewpoint of the user, e.g., the distance d between application user interface 20024 and application user interface 20028 is maintained. In some embodiments, displaying the first object at the third location includes moving the first object substantially laterally and/or vertically without moving the first object towards or away from the viewpoint of the user. For example, a distance between the user and the first object is substantially maintained while moving the first object from the first location to the third location (e.g., the first object is moved along a surface of a spherical coordinate system that has a center at a location of the user's body). In some embodiments, displaying the second object at the fourth location includes moving the second object substantially laterally and/or vertically without moving the second object towards or away from a viewpoint of the user. For example, a distance between the user and the second object is substantially maintained while moving the second object from an initial location to the fourth location (e.g., the object is moved along surface of a spherical coordinate system that has a center at a location of user's body). In some embodiments, in response to detecting the input corresponding to the request to display the second object at the second location, at least one of the first object and the second object is moved if displaying the second object at the second location would result in more than the threshold amount of overlap between the first object at the first location and the second object at the second location, and in some embodiments the movement of at least one of the first object and the second object is within a plane that extends in an x-direction (e.g., toward the left and right relative to the user) and in a y-direction (e.g., upward and downward relative to the user). Reducing occlusion of objects in a mixed-reality three-dimensional environment by automatically shifting objects sideways, without changing their respective depths or distances from the user, maintains objects within reach of the user and/or in the foreground, avoids excessive rearrangement of objects in a mixed-reality three-dimensional environment and reduces the number and/or complexity of inputs and making interaction with multiple objects more efficient.

In some embodiments, the input corresponding to the request to display the second object at the second location includes movement of the input (e.g., in accordance with movement of an input manipulator such as a portion of user's body, such as hand, wrist, head, or other input manipulator) (e.g., from an initial location that corresponds to (e.g., indicates) a location of the second object) to a respective location that corresponds to (e.g., indicates) the second location. In some embodiments, in response to detecting the movement of the input: in accordance with a determination that the movement of the input to the respective location that corresponds to (e.g., indicates) the second location is above a respective speed threshold, the computer system maintains display of the first object at the first location and the second object at the second location (e.g., without regard to whether displaying the first object at the first location and the second object at the second location results in more than the threshold amount of overlap between the first object and the second object); and in accordance with a determination that the movement of the input to the respective location that corresponds to the second location is not above the respective speed threshold, the computer system displays the first object at the third location and the second object at the fourth location (e.g., the third location and the fourth location being selected such that less than the threshold amount of overlap between the first object and the second object is visible from the viewpoint of the user). For example, in the scenarios of FIGS. 20P-20R, in which the computer system 101 shifts the underlying (e.g., or occluded) interface 20054 of application Ap2 in accordance with a determination that the overlaying (e.g., conflicting) user interface 20052 of application Ap1 is moved such that the overlaying (e.g., conflicting) user interface 20052 both occludes and is in depth conflict with the underlying (e.g., or occluded) interface 20054 of application Ap2, the computer system 101 forgoes shifting the underlying interface 20054 in accordance with a determination that the overlaying user interface 20052 is moved too fast (e.g., the speed of movement of the overlaying user interface is more than a threshold amount of time). In some embodiments, the display of the first object at the first location and the second object at the second location is maintained while the movement input above the respective threshold continues to be detected (e.g., the second object is dragged in the three-dimensional environment). In some embodiments, in response to detecting the end of the movement input (e.g., a depinch input while performing an air pinch gesture, a lift off gesture, ceasing to detect movement for more than a threshold period of time, or another input indicating an end of the gesture), wherein the second object is placed at the second location at the end of the movement input (e.g., the second object is dropped), location of the first object is updated (e.g., as opposed to maintained) resulting in a less than the threshold amount of overlap between the first object and the second object from the viewpoint of the user. In some embodiments, displaying the first object at the first location and the second object at the fourth location includes at least one of: moving the first object from the first location to the third location, wherein the third location is different from the first location; and moving the second object from the second location to the fourth location, wherein the fourth location is different from the second location. In some embodiments, if the movement of the input object is too fast, the computer system forgoes moving the first object and/or the second object to avoid responding to accidental inputs that are not intended to place the second object at the second location and avoid excessive or unnecessary movement of objects in the user interface, so as to reduce the risk of the user experiencing motion sickness.

Forgoing shifting an underlying object in the mixed-reality environment if the depth and/or occlusion conflict with the an overlaying objects is caused by fast movement of the overlaying object (e.g., the speed of movement of the overlaying user interface is more than a threshold amount of time), avoids excessive rearrangement of objects in a mixed-reality three-dimensional environment and reduces the number and/or complexity of inputs and making interaction with multiple objects more efficient.

In some embodiments, the input corresponding to the request to display the second object at the second location is received while the first object is displayed at the first location and a third object is displayed at a fifth location, wherein the third object is displayed at a third distance from the viewpoint of the user. In response to detecting the input corresponding to the request to display the second object at the second location: in accordance with a determination that displaying the second object at the second location results in (e.g., is associated with or corresponds to) more than the threshold amount (e.g., a percentage, proportion, and/or area) of overlap between the second object and the third object from the viewpoint of the user (e.g. threshold amount of second object is overlapped and/or threshold amount of third object is overlapped) and in accordance with a determination that a difference in depth between the second location and the fifth location is less than the respective threshold depth, the computer system displays the third object at an updated location (e.g., the updated location is different from the fifth location). The updated location is selected such that less than the threshold amount of overlap between the second object and the third object is visible from the viewpoint of the user. For example, in the scenarios of FIGS. 20D-20F and 20X, the conditions that define depth and/or occlusion conflicts that are used to automatically shifting objects in the mixed-reality environment are applied to multiple objects (e.g., more than two objects). For example, the first object and the third object move away to maintain a certain threshold amount of visibility of respective content that would otherwise be occluded by the second object at the second location. In some embodiments, in conjunction with (e.g., concurrently with, prior to, after, or substantially simultaneously) displaying the first object at the third location and the third object at the updated location, the computer system displays the second object at the requested second location. Applying the rules for shifting objects to reduce occlusion to multiple objects (e.g., more than two objects), automatically reduces occlusion between objects (e.g., thereby improving visibility and/or quick access to the objects) in mixed-reality three-dimensional environment, thereby reducing the number and/or complexity of inputs needed to rearrange objects, bring the objects to the foreground and/or otherwise interact with the multiple objects in the mixed-reality three-dimensional environment (e.g., improving multitasking).

In some embodiments, the first object moves in a first direction and the third object moves in a second direction different from the first direction. For example, in FIGS. 20W-20X, after application Ap3 is launched and user interface 2066 is displayed, as shown in FIG. 20X, pre-existing user interface 2062 shifts in a lateral direction whereas user interface 2064 in a vertical direction (e.g., but, optionally, without a change in depth from the viewpoint of the user) to reduce the amount of overlap. In some embodiments, both the first object and the third object move laterally (e.g., in opposite directions). In some embodiments, one of the first object and the third object moves laterally and the other one of the first object and the third object moves vertically. In some embodiments, the distance between the user and the first object is substantially maintained when the first object is moved in the first direction, and the distance between the user and the third object is substantially maintained when the third object is moved in the second direction. Automatically shifting pre-existing objects in different directions when an object that is moved, resized, and/or launched both occludes and is depth conflict with the pre-existing user interfaces, improves visibility of multiple objects in the mixed-reality three-dimensional environment, thereby reducing the number and/or complexity of inputs needed to rearrange objects, bring the objects to the foreground and/or otherwise interact with the multiple objects in the mixed-reality three-dimensional environment (e.g., improving multitasking).

In some embodiments, the computer system displays the first object at the third location including: in accordance with a determination that lateral movement of the first object results in more than the threshold amount of overlap with another object from the viewpoint of the user, the computer system moves the first object vertically (e.g., in an upward or downward direction as opposed to in a leftward or rightward direction; in some embodiments, in accordance with a determination that lateral movement of the first object results in less than the threshold amount of overlap with another object from the viewpoint of the user, the computer system forgoes moving the first object vertically); and the computer system displays the third object at the updated location including: in accordance with a determination that lateral movement of the third object results in more than the threshold amount of overlap with another object from the viewpoint of the user, the computer system moves the third object vertically (e.g., in an upward or downward direction as opposed to in a leftward or rightward direction). For example, in FIGS. 20W-20X, after application Ap3 is launched and user interface 2066 is displayed, as shown in FIG. 20X, pre-existing user interface 2062 shifts in a lateral direction whereas user interface 2064 in a vertical direction (e.g., but, optionally, without a change in depth from the viewpoint of the user) to reduce the amount of overlap. In some embodiments, in accordance with a determination that lateral movement of the third object results in less than the threshold amount of overlap with another object from the viewpoint of the user, the computer system forgoes moving the third object vertically. In some embodiments, priority is given to moving the first object and third object laterally as opposed to vertically unless moving laterally results in conflicts with other displayed objects. Automatically shifting pre-existing objects in different directions when an object that is moved, resized, and/or launched occludes and is in depth conflict with the pre-existing objects, improves visibility of multiple objects in the mixed-reality three-dimensional environment, thereby reducing the number and/or complexity of inputs needed to rearrange objects, bring the objects to the foreground and/or otherwise interact with the multiple objects in the mixed-reality three-dimensional environment (e.g., improving multitasking).

In some embodiments, the input corresponding to the request to display the second object at the second location corresponds to a request to launch a respective application, and the second object is a user interface of the respective application. For example, in the scenarios of FIGS. 20A-20F, when application Ap8 is launched, and a respective user interface 20030 of the launched application Ap8 is displayed (e.g., optionally upon launching application Ap8, user interface 2030 of application Ap8 is displayed at a default, system-determined location) causing both occlusion and in depth conflict with pre-existing one or more application user interfaces (e.g., application user interface 20028 of applications Ap3 and/or application user interface 20024 Ap5), the computer system automatically shifts the pre-existing one or more application user interfaces, such that at least a threshold amount of visibility of the pre-existing one or more application user interfaces is maintained. In some embodiments, the second location is a default location at which user interfaces for newly launched applications are displayed. In some embodiments, the more than the threshold amount (e.g., a percentage, proportion, and/or area) of overlap between the first object at the first location and the second object at the second location from the viewpoint of the user results in response to the request to launch the second object. For example, the request to display the second object at the second location corresponds to a request to launch the second object (e.g., open, start, or restart an application that corresponds to the second object). In some embodiments, the second object is displayed at the default location in response to the request to launch the second object (or the application corresponding to the second object). More details about placement of application windows, including default locations of application windows in response to launch requests, are described with reference to method 14000 and FIGS. 9A-9O. Automatically shifting pre-existing objects when an object is launched (e.g., an application is launched) to avoid occlusions and/or depth conflicts with the pre-existing objects, improves visibility of multiple objects in the mixed-reality three-dimensional environment, thereby reducing the number and/or complexity of inputs needed to rearrange objects, bring the objects to the foreground and/or otherwise interact with multiple objects in the mixed-reality three-dimensional environment (e.g., improving multitasking).

In some embodiments, the input corresponding to the request to display the second object at the second location corresponds to a request to resize the second object (e.g., by enlarging the second object to overlap more with the first object, or by shrinking the second object such that the amount of overlap exceeds a threshold percentage of the (reduced) area of the second object, or other change in size resulting in more than the threshold amount of overlap). For example, the request to display the second object at the second location includes a request to resize the second object. For example, in the scenarios of FIGS. 20M-20O, when user interface 20054 of application Ap2 is resized (e.g., as shown in FIGS. 20M-20N), such that the resizing user interface 20054 of application Ap2 causes both occlusion and depth conflict with user interface 20052 of application Ap1 (e.g., a pre-existing object), the computer system 101 automatically shifts the user interface 20052 of application Ap1, such that at least a threshold amount of visibility of the pre-existing object is maintained. Automatically shifting a pre-existing object when a resizing of another object causes both occlusion and depth conflict with the pre-existing objects, improves visibility of multiple objects in the mixed-reality three-dimensional environment, thereby reducing the number and/or complexity of inputs needed to rearrange objects, bring the objects to the foreground and/or otherwise interact with the multiple objects in the mixed-reality three-dimensional environment (e.g., improving multitasking).

In some embodiments, the input corresponding to the request to display the second object at the second location corresponds to a request to move the second object from an initial location to the second location. For example, the request to display the second object at the second location includes a request to move the second object from the initial location to the second location. For example, in the scenarios of FIGS. 20P-20R, when user interface 20052 of application Ap1 is moved, such that moving user interface 20052 of application Ap1 causes both occlusion and depth conflict with user interface 20054 of application Ap2 (e.g., pre-existing object), the computer system 101 automatically shifts user interface 20054 of application Ap2 (e.g., the pre-existing object), such that at least a threshold amount of visibility of the pre-existing object is maintained. Automatically shifting a pre-existing object when movement of another object causes both occlusion and depth conflict with the pre-existing objects, improves visibility of objects in the mixed-reality three-dimensional environment, thereby reducing the number and/or complexity of inputs needed to rearrange objects, bring the objects to the foreground and/or otherwise interact with the multiple objects in the mixed-reality three-dimensional environment (e.g., improving multitasking).

In some embodiments, the input corresponding to the request to display the second object at the second location includes an air gesture (e.g., an air pinch and drag, air tap and drag, or other air gesture including movement in or more directions). For example, user input 20055 that causes the computer system to move user interface 20052 (FIG. 20P), user input 20050 that causes the computer system to resize user interface 20054 (FIG. 20K), and user input 20021 that causes the computer system to launch application A3 and display user interface 20028, are air gestures. Automatically shifting a pre-existing object when movement, resizing, and/or launching of another object performed using air gestures causes both occlusion and depth conflict with the pre-existing object, improves visibility of objects in the mixed-reality three-dimensional environment, thereby reducing the number and/or complexity of inputs needed to rearrange objects, bring the objects to the foreground, and/or otherwise interact with the multiple objects in the mixed-reality three-dimensional environment (e.g., improving multitasking).

In some embodiments, moving the second object from the initial location to the second location includes moving the second object towards or away from the viewpoint of the user (e.g., thereby changing a radial distance between the second object and the viewpoint of the user). For example, in the scenarios of FIGS. 20G-20J, the movement of user interface 20028 that removes a depth conflict with user interface 20024, is movement towards the viewpoint of the user (e.g., in depth or z dimension). Automatically shifting a pre-existing object when movement of another object toward or away from the user causes both occlusion and depth conflict with the pre-existing object, improves visibility of objects in the mixed-reality three-dimensional environment, thereby reducing the number and/or complexity of inputs needed to rearrange objects, bring the objects to the foreground and/or otherwise interact with the multiple objects in the mixed-reality three-dimensional environment (e.g., improving multitasking).

The method of any of claims 16-18, wherein moving the second object from the initial location to the second location includes moving the second object vertically (e.g., in an upward or downward direction). For example, in the scenarios of FIGS. 20P-20R, the movement of user interface 20052 that causes both occlusion and depth conflict with user interface 20054, can be a vertical movement (e.g., as opposed to lateral movement as in FIGS. 20P-20R). Automatically shifting a pre-existing object when vertical movement of another object causes both occlusion and depth conflict with the pre-existing object, improves visibility of objects in the mixed-reality three-dimensional environment, thereby reducing the number and/or complexity of inputs needed to rearrange objects, bring the objects to the foreground and/or otherwise interact with the multiple objects in the mixed-reality three-dimensional environment (e.g., improving multitasking).

In some embodiments, the fourth location is the same as (e.g., is coincident with) the second location (e.g., the second object is displayed at the requested second location) and the first location is different from the third location (e.g., the first object is moved to maintain visibility, because otherwise the second object at second location would occlude the first object at the first location by more than the threshold amount of overlap); and the first object is moved from the first location to the third location by at least half a width of the wider object of the first object and the second object. In some embodiments, the first object moves by at least half the width of the widest object (e.g., widest among two or more objects that are in conflict). For example, in the scenario of FIGS. 20D-20E, application user interface 20024 (e.g., the occluded or underlying object) is moved by an amount that corresponds to at least a half the width of the larger user interface from application user interface 20024 and application user interface 20028 (e.g., the conflicting or overlaying object). Automatically shifting a pre-existing object when movement, resizing, and/or launching of another overlaying object, causes both occlusion and depth conflict with the pre-existing object, where the pre-existing object is moved by an amount that corresponds to at least half the width of the larger user from the pre-existing and the overlaying object, improves visibility of objects in the mixed-reality three-dimensional environment, thereby reducing the number and/or complexity of inputs needed to rearrange objects, bringing the objects to the foreground and/or otherwise interact with the multiple objects in the mixed-reality three-dimensional environment (e.g., improving multitasking).

In some embodiments, computer system maintains display (e.g., and visibility) of a first affordance for moving the first object, and maintains display of a second affordance for moving the second object. For example, in the scenario of FIGS. 20D-20E, application user interface 20024 is moved by an amount necessary to maintain at least a threshold amount of grabber affordance 20024a visible, where grabber affordance 20024a is used for moving application user interface 20024.

In some embodiments, the computer system detects an input (e.g., an air pinch input, an air tap input, a pinch input, a tap input, an air pinch and drag input, an air drag input, a drag input, a click and drag input, a gaze input, and/or other input) directed to the first object that includes a movement input. In response to detecting the input directed to the first object: in accordance with a determination that the input directed to the first object is directed to a portion of the first object that includes (e.g., or corresponds to) the first grabber affordance, the computer system moves the first object. In some embodiments, the input directed to the first grabber affordance is direct input that includes movement of a user's hand in the physical environment to a location in the three-dimensional environment that corresponds to the first grabber affordance, or an indirect input that includes an air gesture detected while user's attention is directed to the first grabber affordance. In response to detecting the input directed to the first object: in accordance with a determination that the input directed to the first object is directed to a portion of the first object that does not include the first grabber affordance, the computer system forgoes moving the first object (and optionally, performs a different operation).

In some embodiments, the computer system detects an input (e.g., an air pinch input, an air tap input, a pinch input, a tap input, an air pinch and drag input, an air drag input, a drag input, a click and drag input, a gaze input, and/or other input) directed to the second object that includes movement input. In response to detecting the input directed to the second object: in accordance with a determination that the input directed to the second object is directed to a portion of the second object that includes (e.g., or corresponds to) the second grabber affordance, the computer system moves the second object. In some embodiments, the input directed to the second grabber affordance is direct input that includes movement of a user's hand in the physical environment to a location in the three-dimensional environment that corresponds to the second grabber affordance, or an indirect input that includes an air gesture detected while user's attention is directed to the second grabber affordance. In response to detecting the input directed to the second object: in accordance with a determination that the input directed to the second object is directed to a portion of the second object that does not include the second grabber affordance, the computer system forgoes moving the second object (and optionally, performs a different operation). Automatically shifting a pre-existing object when movement, resizing, and/or launching of another overlaying object, causes both occlusion and depth conflict with the pre-existing object, where the pre-existing object is moved by an amount necessary to maintain at least a threshold amount of grabber affordance, improves visibility of objects in the mixed-reality three-dimensional environment, thereby reducing the number and/or complexity of inputs needed to rearrange objects, bring the objects to the foreground and/or otherwise interact with the multiple objects in the mixed-reality three-dimensional environment (e.g., improving multitasking).

In some embodiments, the first object is displayed at the third location and the second object is displayed at the fourth location (e.g., the third location being different from the first location and/or the fourth location being different from the second location) in accordance with a determination that the input corresponds to a request to move the second object from an initial location to the second location (e.g., in addition to determining that displaying the second object at the second location results in more than the threshold amount of overlap, and that less than the respective threshold depth separates the first location and the second location). In some embodiments, in accordance with a determination that the input does not correspond to a request to move the second object from the initial location to the second location (e.g., whether or not displaying the second object at the second location results in more than the threshold amount of overlap, and whether or not less than the respective threshold depth separates the first location and the second location), the computer system maintains display of the first object at the first location and displays the second object at the second location. In some embodiments, the rules for moving objects (e.g., application windows) to maintain visibility of the objects are applied when the conflicts between the objects are the result of moving at least one of the objects in the three-dimensional environment. In some embodiments, the same rules are not applied if the conflicts between the objects are the result of launching or resizing one of the objects (e.g., without moving (e.g., by translation) at least one of the objects). For example, in the scenarios of FIGS. 20P-20R, when user interface 20052 of application Ap1 is moved, such that moving user interface 20052 of application Ap1 causes both occlusion and depth conflict with user interface 20054 of application Ap2 (e.g., pre-existing object), the computer system 101 automatically shifts user interface 20054 of application Ap2 (e.g., the pre-existing object), such that at least a threshold amount of visibility of the pre-existing object is maintained. Using the manner in which occlusion is caused (e.g., because another object is moved, e.g., as opposed to launched or resized) as a condition to determine whether to automatically shift objects in the three-dimensional environment to reduce occlusion and improve visibility of objects, avoids excessive rearrangement of objects in a mixed-reality three-dimensional environment, thereby making interaction with multiple objects more efficient.

In some embodiments, displaying the second object at the second location results in more than the threshold amount of overlap between the first object and the second object from the viewpoint of the user, and the difference in depth between the first location and the second location is less than the respective threshold depth (e.g., hence, the third location at which the first object is accordingly displayed is different from the first location, and/or the fourth location at which the second object is accordingly displayed is different from the second location); and displaying the first object at the third location (e.g., in response to detecting the input corresponding to the request to display the second object at the second location) results in a respective amount (and in some circumstances, more than the threshold amount) of overlap between the first object and a different object from the viewpoint of the user (e.g. the threshold amount of the first object is overlapped and/or the threshold amount of the different object is overlapped). A difference in depth between the third location and a respective location of the different object is less than the respective depth threshold. For example, in the scenarios of FIGS. 20E-20F, instead of moving user interface 20028 in the rightward direction in a space where there is no other object, user interface 20028 of application Ap5 can be moved in leftward direction resulting in both occlusion and depth conflict with user interface 20024 of application Ap5. Automatically reducing occlusion between objects (e.g., thereby maintaining visibility and/or quick access to the objects) in mixed-reality three-dimensional environment reduces the number and/or complexity of inputs needed to rearrange objects, bring the objects to the foreground and/or otherwise interact with the objects in the mixed-reality three-dimensional environment, thereby making interaction with multiple objects more efficient.

In some embodiments, in response to detecting the input corresponding to the request to display the second object at the second location while a third object is displayed in the three-dimensional environment at a first location for the third object: in accordance with a determination that displaying the second object at the second location results in (e.g., is associated with or corresponds to) more than the threshold amount (e.g., a percentage, proportion, area, etc.) of overlap between the third object and the second object from the viewpoint of the user and the third object is a first type of object (e.g., an object that is allowed to be moved automatically), the computer system displays the third object at a second location for the third object that is shifted relative to the first location for the third object; and in accordance with a determination that displaying the second object at the second location results in (e.g., is associated with or corresponds to) more than the threshold amount (e.g., a percentage, proportion, area, etc.) of overlap between the third object and the second object from the viewpoint of the user and the third object is a second type of object (e.g., an object that is not allowed to be moved automatically) that is different from the first type of object, the computer system displays the third object at the first location for the third object (e.g., forgoing shifting the third object to the second location for the third object). For example, in the scenario of FIGS. 20D-20E, in which application user interface 20028 both occludes (e.g., by more than the occlusion threshold $T_o$) and is in depth conflict with a pre-existing application user interface 20022 (e.g., $d_1 < T_D$) that is being viewed in a session shared between multiple users, the computer system maintains position of application user interface 20022 (e.g., the shared object) (e.g., as opposed to automatically shifting the pre-existing application user interface 20024). In some embodiments in accordance with a determination that displaying the second object at the second location results in (e.g., is associated with or corresponds to) less than the threshold amount (e.g., a percentage, proportion, area, etc.) of overlap between the third object and the second object from the viewpoint of the user displaying the third object at the first location for the third object (e.g., forgoing shifting the third object to the second location for the third object) without regard to whether or not the third object is the first type of object or the second type of object. In some embodiments the second type of object is a type of object that is not moved automatically based on other objects overlapping it (e.g., an object that is shared with other participants in a real-time communication session, or a virtual display of a remote computer system such as a virtual display that shows a desktop user interface or system user interface of the remote computer system or a user interface of an application for a remote computer system). Maintaining position of an object that is shared in a session even when the object is in depth and occlusion conflict with other objects, avoids excessive rearrangement of objects in a mixed-reality three-dimensional environment, (e.g., by avoiding objects that are only being viewed by a single user from affecting the position of objects that are shared), thereby making interaction with multiple objects more efficient.

In some embodiments, aspects/operations of methods 12000, 13000, 14000, 15000, 16000, 17000, 22000, 23000, 25000, 27000, and 29000 may be interchanged, substituted, and/or added between these methods. For brevity, these details are not repeated here.

FIG. 25 is a flow diagram of an exemplary method 25000 for reconfiguring a home menu user interface, in accordance with some embodiments. In some embodiments, method 25000 is performed at a computer system (e.g., computer system 101 in FIG. 1A) including one or more display generation components (e.g., display generation component 120 in FIGS. 1A, 3, and 4, display generation component 7100 in FIG. 7A, a heads-up display, a display, a touchscreen, and/or a projector) and one or more input devices (e.g., color sensors, infrared sensors, and other depth-sensing cameras that point downward at a user's hand and/or forward from user 7002's head, a button, a dial, a rotatable input element, a switch, a moveable hardware input device, and/or a solid-state hardware input device). In some embodiments, the method 25000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 25000 are, optionally, combined and/or the order of some operations is, optionally, changed.

As described herein, method 25000 provides an improved mechanism for reconfiguring a home menu user interface for launching applications in a mixed-reality three-dimensional environment. In conjunction with initiating a process for reconfiguring the home menu user interface (e.g., including activating an icon reconfiguration mode or a page configuration mode) and while the home menu user interface is being reconfigured, passthrough portions of the environment are visually deemphasized (e.g., reduced in opacity, brightness, and/or darkening) relative to an arrangement of application icons included in the home user interface. Maintaining visibility while reducing prominence of passthrough portions system improves user physiological comfort by avoiding physiological discomfort associated with physical motion of the user that is not matched with environmental response in an a three-dimensional environment that is visible to the user, improves safety and multitasking by allowing a user to be cognizant of the physical environment while interacting with the home menu user interface (e.g., by allowing a user to recognize obstacles in the physical environment and/or reducing a feeling of being unbalanced) without the need to provide additional inputs (e.g., without the need to switch back and forth between viewing virtual content to viewing the physical environment), thereby reducing the number and complexity of inputs needed to reconfigure a home menu user interface in a mixed-reality three-dimensional environment.

The computer system displays (25002), via the display generation component, a first portion (e.g., a page of a multipage home screen for launching applications) of an arrangement of selectable user interface objects (e.g., icons for launching applications, initiating communication sessions, and/or displaying virtual environments) in a view of a three-dimensional environment (e.g., the environment being a three-dimensional environment that includes one or more computer-generated portions (e.g., virtual content overlaid onto, projected onto, and/or replacing display of one or more portions of a representation or view of a physical environment) that includes a view of a portion of a physical environment (e.g., one or more passthrough portions (e.g., camera view, or direct passthrough)) that is visible via the display generation component), wherein the first portion of the arrangement of selectable user interface objects includes a first plurality of selectable user interface objects.

The computer system, while the first portion of the arrangement of selectable user interface objects is visible, detects (25004), via the one or more input devices, a first input (e.g., a gaze input optionally in combination with an air pinch gesture, or in combination with an air pinch gesture maintained for more than a predetermined amount of time (e.g., long pinch)) corresponding to a request to initiate a process for moving one or more selectable user interface objects relative to the arrangement of selectable user interface objects.

In response to detecting the first input (25006), the computer system: reduces (25008) visual prominence of the portion of the physical environment in the view of the three-dimensional environment (e.g., portions of the physical environment that are visible via the display generation component are dimmed, blurred, darkened or otherwise their visual prominence is reduced relative to the multi-section arrangement of application icons) relative to a visual prominence of the first portion of the arrangement of selectable user interface objects; and initiates (25010) the process for moving the one or more selectable user interface objects relative to the arrangement of selectable user interface objects. For example, FIG. 22C illustrates that, upon activation of the first reconfiguration mode, passthrough portions of view 2000', such as walls 7004' and 7006, and floor 7008' and physical object 7014' are darkened or obscured. In some embodiments, initiating the process for moving the one or more selectable user interface objects corresponds to displaying a menu that includes an option for activating a first reconfiguration mode (e.g., a "reconfiguration mode" affordance). In the first reconfiguration mode, selectable user interfaces objects can be rearranged or repositioned in the arrangement, or the arrangement can otherwise be edited in response to further inputs directed to the arrangement. In some embodiments, initiating the process for moving the one or more selectable user interface objects includes selecting the option for activating the reconfiguration mode and, in response, activating the first reconfiguration mode. In some embodiments, initiating the process for moving the one or more selectable user interface objects (e.g., via an air pinch optionally in combination with a gaze input) corresponds to selecting the one or more selectable user interface objects and moving (e.g., dragging and/or otherwise changing a position of) the one or more selectable user interface objects. In some embodiments, initiating the process for moving the one or more selectable user interface objects corresponds to activating the reconfiguration mode in response to the first input (e.g., without the need to select a menu option or drag the one or more selectable user interface objects). In some embodiments, the first input corresponds to a long pinch gesture (e.g., as opposed to a short pinch that can select the one or more selectable user interface objects) or other input that causes the computer system to enter the reconfiguration mode. In some embodiments, the visual prominence of the portion of the physical environment remains reduced relative to the arrangement of selectable user interface objects while a first reconfiguration mode associated with the multi-sectional arrangement of application icons is activate (e.g., even while changes, such as movement of physical objects, occur in the portion of the physical environment and are reflected in the view of the physical environment that is visible via the display generation component). In some embodiments, as a viewpoint of the user moves (e.g., as the user moves a touchscreen device or turns their head while wearing a head-mounted display), a different portion of the physical environment is visible via the display generation component. The different portion of the physical environment is visible with the reduced prominence while the first reconfiguration mode is active (and/or while one or more selectable user interface objects in the arrangement are repositioned). In some embodiments, a first reconfiguration mode associated with the arrangement of selectable user interface objects is activated in accordance with a determination that the first input meets a first criteria (e.g., a duration criterion, such as a long air pinch gesture that is optionally followed by selecting a menu option or that is optionally followed by movement input in or more directions). In some embodiments, in the first reconfiguration mode, locations of the selectable user interface objects (e.g., application icons, widgets, or other objects) in the first portion (e.g., and/or section) or other portions of the arrangement are adjustable in response to movement inputs detected during the first reconfiguration mode. In some embodiments, prior detecting that the first input met the first criteria, the arrangement selectable user interface objects is in normal mode (e.g., a non-reconfiguration mode). In the normal mode, positions of the selectable user interface objects in the first portion and/or other portions of the arrangement of selectable user interface objects cannot be adjusted in response to inputs directed to one or more selectable user interface objects.

In some embodiments, the arrangement of selectable user interface objects is a multi-section arrangement of the selectable user interface objects; the first portion that includes the first plurality of selectable user interface objects corresponds to a first section of the multi-section arrangement of selectable user interface objects; and the multi-section arrangement of selectable user interface objects includes a second section that includes a second plurality of selectable user interface objects and is different form the first section of the multi-section arrangement. In some embodiments, the first section corresponds to a first page and the second section corresponds to a second page of multi-page home screen user interface. For example, home menu user interface 21100 in FIGS. 21A-21P includes multiple pages (e.g., four pages that include respective arrangements of application icons). Displaying and grouping selectable objects, such as application launch icons, in multiple sections, allows the number of selectable objects to increase without cluttering the three-dimensional environment with objects, thereby reducing the number and/or complexity of inputs needed to select an object and interact with other objects in the three-dimensional environment.

In some embodiments, in response to detecting the first input, the computer system: displays at least a subset of a second portion (e.g., a second section) of the arrangement of selectable user interface objects (and optionally displays, at least partially, one or more selectable user interface objects of a second plurality of selectable user interface objects included in the second portion), wherein the second portion is adjacent to the first portion. For example, the computer device displays less than all of the second portion in response to detecting the first input. For example, in the scenario of FIGS. 21G-21J, in accordance with a determination that the movement moving application A5 21010 towards the right edge meets a threshold amount of movement, the computer system 101 automatically reveals (e.g., displays), at least partially, application icon A10 21040 and/or application icon A16 21052 included in the adjacent second page (e.g., before displaying the second page entirely). In embodiments in which the first input causes the computer system to display a menu with an option for activating the first reconfiguration mode (e.g., before the first reconfiguration is activated), the displaying of at least some of the second portion is performed in response to one or more subsequent inputs (e.g., one or more inputs of one of the following types an air pinch input, an air tap input, a pinch input, a tap input, an air pinch and drag input, an air drag input, a drag input, a click and drag input, a gaze input, and/or other input), such as an input selecting the option for activating the first reconfiguration mode and optionally a movement input in one or more directions. In embodiments in which the first input causes the computer system to enter or activate the first reconfiguration mode (e.g., in response to a particular type of input, such as a long pinch), the displaying of at least some of the second portion is performed in response to the first input or in response to a subsequent input such as a movement input. In some embodiments, the movement input is optionally detected while the one or more selectable user interface objects are selected. In some embodiments, the at least some of the second portion is displayed while display of at least some of the first portion is maintained, as shown in FIG. 21J. Revealing portions of an adjacent page in accordance with a determination that the movement of an application icon towards the respective adjacent page meets a threshold amount of movement, provides visual feedback to the user about the progress of the movement and the content of the adjacent page, thereby reducing the number and/or complexity of inputs needed to move an object from one page to another (e.g., by continuously assisting and guiding the user and reducing accidental inputs and/or unsuccessful attempted inputs).

In some embodiments, displaying at least a subset of the second portion of the arrangement of selectable user interface objects is performed in accordance with a determination that the first input includes movement in one or more directions that is less than a threshold distance away from the second portion (e.g., less than a threshold distance away from a boundary where the second portion begins). For example, in the scenario of FIGS. 21G-21I, in accordance with a determination that the movement moving (e.g., dragging and/or otherwise repositioning) application A5 21010 towards the right edge meets a threshold amount of movement and/or has moved to less than a threshold distance away from the right edge, the computer system 101 automatically (e.g., without further user input needed to switch to the adjacent page) reveals (e.g., and/or displays), at least partially, application icon A10 21040 and application icon A16 21052 included in the second page before displaying the second page entirely (as illustrated in FIGS. 21G-21J). Revealing portions of an adjacent page in accordance with a determination that the movement of an application icon towards the respective adjacent page is less than a threshold distance away from a boundary where the second page begins, provides visual feedback to the user about the progress of the movement and the content of the adjacent page, thereby reducing the number and/or complexity of inputs needed to move an object from one page to another (e.g., by continuously assisting and guiding the user and reducing accidental inputs and/or unsuccessful attempted inputs).

In some embodiments, the computer system, after initiating the process for moving the one or more selectable user interface objects relative to the arrangement of selectable user interface objects, detects movement in one or more directions; and in response to detecting the movement in the one or more directions, moves the one or more selectable user interface objects in accordance with the movement in the one or more directions. For example, in FIGS. 21G-21K, application icon A5 21010 is moved in accordance with user input 21032 (e.g., in the rightward direction). In some embodiments, the movement in one or more directions is included in the first input. In some embodiments, the computer system enters the first reconfiguration mode in response to the movement in the one or more directions, such that the visual prominence of the portion of the physical environment is reduced in response to detecting the movement in one or more directions (e.g., as opposed to detecting a prior portion of the first input). In some embodiments, the movement in one or more directions is an input subsequent to the first input that is detected while the first reconfiguration mode is already activated or initiated (e.g., based on selection of the "reconfiguration mode" affordance). In some embodiments, a user uses two hands to move multiple user interface objects in the arrangement (or from a first portion of the arrangement to a second portion of the arrangement). For example, while a first user interface object is selected (e.g., via an air pinch and optionally in combination with a gaze input) and while the first user interface object is being held with a first hand, one or more other user interface objects are selected (e.g., one by one) in response to air gesture performed with the second hand (e.g., via air tap, air pinch, or air pinch in combination with a gaze input), thereby causing the computer system to group together the first user interface object and the one or more other user interface objects. In response to detecting subsequent movement inputs (e.g., while the first user interface object and the one or more other user interface object continue to be grouped), the computer system moves the group of the first user interface object and the one or more other user interface objects together in accordance with the subsequent movement inputs. In conjunction with initiating a process for reconfiguring the home menu user interface (e.g., by moving an application icon in accordance with a detected movement input) and while the home menu user interface is being reconfigured, passthrough portions of the environment are visually deemphasized (e.g., reducing opacity, brightness, and/or darkening) relative to an arrangement of application icons included in the home user interface, thereby improves safety and multitasking by allowing a user to be cognizant of the physical environment while interacting with the home menu user interface (e.g., by allowing a user to recognize obstacles in the physical environment and/or reducing a feeling of being unbalanced) without the need to provide additional inputs.

In some embodiments, reducing the visual prominence of the portion of the physical environment is performed in accordance with a determination that the first input meets first criteria (e.g., a duration criterion and/or one or more other criteria). For example, the icon reconfiguration mode illustrated in at least FIGS. 21C-21D in which passthrough portions of view 2000' are darkened, is optionally activated in response to a long pinch gesture directed to the arrangement of application icons A1 21002-A9 210018 (or a long pinch gesture directed to a specific icon in the arrangement, such as application icon A5 21010). In another example, passthrough portions of view 2000' are darkened in response to detecting a long pinch gesture directed to a specific icon in the arrangement, such as application icon A5 21010 in conjunction with initiating a drag gesture that moves application icon A5 21010. In some embodiments, in accordance with a determination that the first input does not meet the first criteria prior detecting the movement in the one or more directions, the computer system forgoes reducing visual prominence of the portion of the physical environment in the view of the three-dimensional environment. In some embodiments, the computer system reduces the visual prominence of the portion of the physical environment in response to selection of the "reconfiguration mode" affordance (e.g., via air tap or air pinch gesture optionally in combination with a gaze directed to the "reconfiguration mode" affordance) that is displayed. In conjunction with initiating a process for reconfiguring the home menu user interface (e.g., by moving an application icon in accordance with a detected movement input) and while the home menu user interface is being reconfigured, passthrough portions of the environment are visually deemphasized (e.g., reducing opacity, brightness, and/or darkening) relative to an arrangement of application icons included in the home user interface, thereby improving safety and multitasking by allowing a user to be cognizant of the physical environment while interacting with the home menu user interface (e.g., by allowing a user to recognize obstacles in the physical environment and/or reducing a feeling of being unbalanced) without the need to provide additional inputs.

In some embodiments, in response to detecting an end of an input that includes movement while a first selectable user interface object is selected after the process for moving the one or more selectable user interface objects relative to the arrangement of selectable user interface objects has been initiated, the computer system: in accordance with a determination that the movement (e.g., a lateral movement and/or movement in another direction) exceeds a threshold amount of movement in a first direction (e.g., in a direction of the second portion, such as in a leftward direction if the second portion is on the left side of the first portion or in a rightward direction if the second portion is on the right side of the first portion) when the input ends, moves the first selectable user interface object to a second portion of the arrangement of selectable user interface objects. For example, in the scenario of FIGS. 21J-21K, the second page is displayed in response to user input 21032 that moves (e.g., drags and/or repositions) application icon 21010 A5 towards the second page. In some embodiments, in conjunction with moving the first selectable user interface object to the second portion of the arrangement, the computer system ceases to display the first portion and displays the second portion of the arrangement (e.g., the computer system replaces display of the first portion (other than the first selectable user interface object) with display of at least a subset of the second portion (in some embodiments excluding one or more selectable user interface objects of the second portion that are displaced from the second portion by the first selectable user interface object that has been moved to the second portion)). In some embodiments, in accordance with a determination that the movement does not exceed the threshold amount of movement in the first direction when the input ends, the computer system forgoes moving the first selectable user interface object to the second portion of the arrangement of selectable user interface objects and/or restores the first selectable user interface object to the first portion of the arrangement. In conjunction with moving an application icon across different pages of a home menu user interface while the home menu user interface is being reconfigured, passthrough portions of the environment are visually deemphasized (e.g., reducing opacity, brightness, and/or darkening) relative to an arrangement of application icons included in the home user interface, thereby improving safety and multitasking by allowing a user to be cognizant of the physical environment while interacting with the home menu user interface (e.g., by allowing a user to recognize obstacles in the physical environment and/or reducing a feeling of being unbalanced) without the need to provide additional inputs.

In some embodiments, in response to detecting the first input (e.g., an input directed to a location in the arrangement of selectable user interface objects, where the location can include the one or more selectable user interface objects or a location in between some of the selectable user interface objects, or an input directed to the "reconfiguration mode" affordance), the computer system changes an appearance of the arrangement of selectable user interface objects. In some embodiments, changing the appearance of the arrangement of selectable user interface objects occurs before activation of the first reconfiguration mode and/or before reducing visual prominence of the portion of the physical environment in the view of the three-dimensional environment. In some embodiments, changing the appearance of the arrangement of selectable user interface objects occurs in conjunction with activation of the first reconfiguration mode (e.g., in case where a selection input subsequent to the first input is directed to the "reconfiguration mode" affordance). For example, in FIGS. 21C, upon activation of the icon reconfiguration mode, application icons A1 21002-A9 210018 start jiggling (e.g., tilting left and/or right) to indicate that the placement locations of the application icons A1 21002-

A9 210018 can be adjusted in accordance with user inputs in the first configuration mode (e.g., in contrast to the scenario in FIGS. 21A-21B in which the home menu user interface 21100 is a normal mode (e.g., non-reconfiguration mode) and application icons A1 21002-A9 210018 remain stationary at their respective locations). In some embodiments, changing the appearance of the arrangement of selectable user interface objects includes changing size of the selectable user interface objects or changing size of the one or more selectable user interface objects (e.g., without changing size of other user interface objects of the selectable user interface objects). In some embodiments, changing the appearance of the arrangement of selectable user interface objects includes changing opacity of the selectable user interface objects (e.g., some, less than all, or all, of the one or more selectable user interface objects). In some embodiments, the arrangement of selectable user interface objects is included in a virtual platter (e.g., and/or surface), and changing appearance of the arrangement of selectable user interface objects includes changing opacity of the virtual platter. Changing the appearance of the arrangement of selectable user interface objects upon invoking the reconfiguration mode (e.g., or upon initiating the process for moving selectable user interface objects) provides visual feedback to the user that the operation context has changed (e.g., positions of selectable objects that previously could not be adjusted can now be adjusted) thereby guiding and assisting the user when interacting with an arrangement of multiple selectable user interface objects.

In some embodiments, changing the appearance of the arrangement of selectable user interface objects includes changing a distance from a viewpoint of a user (e.g., in a depth dimension and/or along the z-axis) of at least one user interface object of the selectable user interface objects. In some embodiments, the one or more selectable user interface objects with respect to which the moving process is initiated are moved towards the viewpoint of the user and optionally other user interface objects in the arrangement are moved away from the viewpoint of the user. For example, application icon 21010 in FIG. 21B is moved towards user 7002 upon selection (e.g., in response user input 21020 detected in FIG. 21A). Moving an object towards the viewpoint of the user upon selection of the object provides visual feedback that the object is successfully selected, thereby guiding and assisting the user when interacting with an arrangement of multiple selectable user interface objects.

In some embodiments, the one or more selectable user interface objects (e.g., with respect to which the process for moving is initiated) are included in the first plurality of selectable user interface objects included in the first portion of the arrangement of selectable user interface objects. In some embodiments, after initiating the process for moving the one or more selectable user interface objects relative to the arrangement of selectable user interface objects, the computer system detects movement in one or more directions (e.g., laterally) (optionally the movement in the one or more directions is performed while the one or more selectable user interface objects are selected); and in response to detecting the movement in the one or more directions, the computer system displays (e.g., and/or reveals) one or more selectable user interface objects of a second plurality of user interface objects included in a second portion of the arrangement of selectable user interface objects, wherein the second portion is different from the first portion. In some embodiments, at least some selectable user interface objects (e.g., application icons or other user interface objects) of a second section of the multi-sectional arrangement of selectable user interface objects are displayed in response to dragging the one or more selectable user interface objects of the first plurality of selectable user interface objects. For example, in the scenario of FIG. 21J, in accordance with a determination that the movement dragging application icon A5 21010 towards the right edge of the viewport met the threshold amount of movement and/or moved to less than the threshold distance away from the right edge, the computer system 101 automatically (e.g., without further user input needed to switch to the second page) reveals (e.g., displays), at least partially, application icon A10 21040 and application icon A16 21052 included in the second page (e.g., before displaying the second page entirely). Revealing portions of one or more adjacent pages when relocating an application icon towards a respective adjacent page, provides visual feedback to the user about the progress of the movement and the content of the one or more adjacent page, thereby reducing the number and/or complexity of inputs needed to move an object from one page to another (e.g., by continuously assisting and guiding the user and reducing accidental inputs and/or unsuccessful attempted inputs).

In some embodiments, displaying the one or more selectable user interface objects of the second plurality of user interface objects included in the second portion of the arrangement of selectable user interface objects is performed in accordance with a determination that the movement in the one or more directions includes movement toward (e.g., in a direction of) the second portion (e.g., the one or more selectable user interface objects of the second plurality of user interface objects included in the second portion are not displayed in accordance with a determination that the movement in the one or more directions does not include movement toward the second portion). For example, because application A5 21010 is moved towards the right side of viewport revealed in FIGS. 21I-21K, the page that is on the right side of the first page is revealed, e.g., the second page of home menu user interface 21100 (e.g., as opposed to revealing portions of a page on the opposite left side). In some embodiments, the computer system displays the one or more selectable user interface objects of the second plurality of user interface objects in accordance with a determination that the movement toward the second portion includes at least a threshold amount of movement and/or is within a predetermined distance of the second portion. In some embodiments, the computer system displays the one or more selectable user interface objects of the second plurality of user interface objects in accordance with there being sufficient movement toward the second portion even when movement in other directions precedes and/or follows the movement in the direction of the second portion. Revealing portions of a respective adjacent page when relocating an application icon towards the respective adjacent page (e.g., without revealing portions of pages on a opposite side of the direction in which the application icon is moved), provides visual feedback to the user about the progress of the movement and the content of the adjacent page, thereby reducing the number and/or complexity of inputs needed to move an object from one page to another (e.g., by continuously assisting and guiding the user and reducing accidental inputs and/or unsuccessful attempted inputs).

In some embodiments, in accordance with a determination that the movement in the one or more directions includes movement in a first direction, the second portion of the arrangement of selectable user interface objects is located on a first side of the first portion of the arrangement of selectable user interface objects (e.g., the movement in the first direction is toward the first side of the first portion of the arrangement). In some embodiments, in accordance with a determination that the movement in the one or more directions includes movement in a second direction, wherein the second direction is different from the first direction (e.g., the second direction is opposite the first direction), the second portion of the arrangement of selectable user interface objects is located on a second side of the first portion of the arrangement of selectable user interface objects, wherein the second side is different from the first side (e.g., the second side is opposite the first side) (e.g., the movement in the second direction is toward the second side of the first portion of the arrangement). For example, because application A5 21010 is moved towards the right side of viewport revealed in FIGS. 21I-21K, the page that is on the right side of the first page is revealed, e.g., the second page of home menu user interface 21100 (e.g., as opposed to revealing portions of a page on the opposite left side). Revealing portions of a first respective adjacent page when relocating an application icon towards the first respective adjacent page (e.g., without revealing portions of a page on a opposite side of the direction in which the application icon is moved) and revealing portions of a second respective adjacent page when relocating an application icon towards the second respective adjacent page (e.g., without revealing portions of a page on a opposite side of the direction in which the application icon is moved), provides visual feedback to the user about the progress of the movement and the content of the adjacent page, thereby reducing the number and/or complexity of inputs needed to move an object from one page to another (e.g., by continuously assisting and guiding the user and reducing accidental inputs and/or unsuccessful attempted inputs).

In some embodiments, while the process for moving the one or more selectable user interface objects relative to the arrangement of selectable user interface objects is initiated: in response to detecting an input corresponding to a request to move a first selectable user interface object relative to the arrangement of selectable user interface objects, the computer system moves the first selectable user interface object from a first position in the arrangement of selectable user interface objects to a second position in the arrangement of selectable user interface objects, wherein the second position is different from the first position. In some embodiments, the input corresponding to the request to move the first selectable user interface object is part of the first input (e.g., movement included in the first input) or part of one or more subsequent inputs to the first input (e.g., movement included in the one or more subsequent inputs) detected while the process for moving the one or more selectable user interface objects relative to the arrangement of selectable user interface objects is initiated. In some embodiments, moving the first selectable user interface object from the first position to the second position includes, in response to detecting an end of the input (e.g., a depinch input while performing an air pinch gesture, a lift off gesture, or another input indicating an end of the gesture) corresponding to the request to move the first selectable user interface object relative to the arrangement of selectable user interface objects, repositioning user interface objects in the arrangement of selectable user interface objects. For example, computer system 101 automatically shifts application icons A2 21004-A4 21008 in response to detecting that application icon A5 21010 is moved from a position in the second column of the second row of the arrangement of application icons A1 21002-A9 210018 to a position in between application icon A1 21002 and application icon A2 21004 in the first row of the arrangement of application icons A1 21002-

A9 210018, as described with reference to FIGS. 21D-21E. In some embodiments, the second position of the first selectable user interface object in the arrangement of selectable user interface objects corresponds to a respective location of the first selectable user interface object when the end of the input is detected. In some embodiments, dropping the first selectable user interface object at a location that is different from an initial location of the first selectable user interface object causes the computer system to reposition at least some user interface objects in the arrangement. For example, user interface objects shift to fill the location that was emptied as a result of relocating the first selectable user interface object and/or user interface objects move to make room for the first selectable user interface object at the different location. While some user interface objects in the arrangement optionally move as a result of moving the first selectable user interface object even before the end of the input is detected, those movements are transient and subject to further modification, whereas as soon as the first user interface object is dropped at a different location, the updated positions of the user interface objects in the arrangement are maintained. Automatically rearranging objects in the arrangement (e.g., an arrangement of application icons) after a selected object (e.g., an application icon) is relocated and dropped to an updated position in the arrangement provides visual feedback to the user that the repositioning of the selected object is successfully completed, and reduces the number and/or complexity of user inputs needed to reposition and free space for the selected object.

In some embodiments, the one or more selectable user interface objects are included in the first plurality of selectable user interface objects in the first portion of the arrangement of selectable user interface objects, and a second portion of the arrangement of selectable user interface objects includes a second plurality of selectable user interface objects. In some embodiments, the second portion of the arrangement of selectable user interface objects is an adjacent portion to the first portion, in the arrangement of selectable user interface objects. In some embodiments, while displaying the first portion of the arrangement (optionally without displaying the second portion of the arrangement) (e.g., during the process for moving the one or more selectable user interface objects relative to the arrangement of selectable user interface objects), the computer system detects an input corresponding to a request to move a first selectable user interface object of the first plurality of selectable user interface objects relative to the arrangement of selectable user interface objects. In some embodiments, in response to detecting the input corresponding to the request to move the first selectable user interface object relative to the arrangement of selectable user interface objects, the computer system moves the first selectable user interface object relative to the arrangement of selectable user interface objects in accordance with the input; and in accordance with a determination that the first selectable user interface object is moved outside the first portion of the arrangement (e.g., and/or moved at least partially over the second portion of the arrangement) toward the second portion of the arrangement (e.g., at least a predetermined proximity from a boundary line of where the second portion begins), the computer system displays the second portion of the arrangement in place of the first portion of the arrangement. For example, in accordance with a determination that application icon A5 21010 is moved outside the arrangement of application icons included in the first page (e.g., the arrangement of application icons A1 21002-A4 21008 and A6 21012-A9 210018) towards the second page, the arrangement of application icons in the second page gradually slide over (e.g., without further user input or a requirement that other conditions be met) in place of the arrangement of application icons in the first page and the arrangement of application icons in the first page gradually slide off (and/or cease to be displayed) from display in view 20000', as illustrated in FIGS. 21J-21K. In some embodiments, in accordance with a determination that the first selectable user interface object is moved toward the second portion of the arrangement (at least a predetermined proximity from a boundary line of where the second portion begins) without moving the first selectable user interface object outside the first portion of the arrangement (e.g., and/or without moving over the second portion of the arrangement), the computer system forgoes displaying the second portion of the arrangement in place of the first portion of the arrangement. In some embodiments, in response to dragging the first user selectable object outside the first portion in the direction of the second portion, the second portion is revealed gradually (e.g., progressing through a plurality of intermediate display states during a transition that replaces display of the first portion of the arrangement (e.g., other than the first selectable user interface object) with display of the second portion of the arrangement). For example, the second portion of the arrangement gradually slides over or moves in place of the first portion of the arrangement and the first portion of the arrangement gradually slides off (or ceases to be displayed) from display. Automatically sliding over an arrangement of application icons in the second page (e.g., without further user input or a requirement that other conditions be met) in place of an arrangement of application icons in a first page in accordance with moving an application icon towards the arrangement of application icons in the second page, reduces the number and complexity of inputs needed to reconfigure a home menu user interface in a mixed-reality three-dimensional environment (e.g., reduces the number of input needed to move an application icon from one page to another).

In some embodiments, displaying the second portion of the arrangement in place of the first portion of the arrangement is performed in accordance with a determination that the first selectable user interface object is positioned outside the first portion of the arrangement for a threshold amount of time. For example, the user has to drag the first user selectable object outside the first portion in the direction of the second portion and hold for the threshold amount of time (e.g., at or substantially at (e.g., within a respective threshold distance of) a respective location, and/or at one or more locations that are all outside the first portion of the arrangement) before the computer systems begins to slide over the second portion of the arrangement in place of the first portion of the arrangement. For example, in accordance with a determination that application icon A5 21010 is held for more than a threshold amount of time outside the arrangement of application icons included in the first page (e.g., the arrangement of application icons A1 21002-A4 21008 and A6 21012-A9 210018) towards the second page, the arrangement of application icons in the second page gradually slide over (e.g., automatically) in place of the arrangement of application icons in the first page and the arrangement of application icons in the first page gradually slide off (or cease to be displayed) from display in view 20000', as illustrated in FIGS. 21J-21K. In some embodiments, in accordance with a determination that the first selectable user interface object is moved outside the first portion of the arrangement (or moved at least partially over the second portion of the arrangement) toward the second portion of the arrangement (e.g., at least a predetermined proximity from a boundary line of where the second portion begins) for less than the threshold amount of time, the computer system forgoes displaying the second portion of the arrangement in place of the first portion of the arrangement. Automatically sliding over an arrangement of application icons in the second page (e.g., without further user input or a requirement that other conditions be met) in place of an arrangement of application icons in a first page in accordance with a determination that an application icon is held for more than a threshold amount of time outside the arrangement of application icons included in the first page, reduces the number and complexity of inputs needed to reconfigure a home menu user interface in a mixed-reality three-dimensional environment (e.g., reduces the number of input needed to move an application icon from one page to another).

In some embodiments, the one or more selectable user interface objects are included in the first plurality of selectable user interface objects in the first portion of the arrangement of selectable user interface objects, and a second portion of the arrangement of selectable user interface objects includes a second plurality of selectable user interface objects. In some embodiments, during the process for moving the one or more selectable user interface objects relative to the arrangement of selectable user interface objects (e.g., while displaying the first portion of the arrangement (optionally without displaying the second portion of the arrangement)), the computer system detects an input (e.g., an air pinch input, an air tap input, a pinch input, a tap input, an air pinch and drag input, an air drag input, a drag input, a click and drag input, a gaze input, and/or other input) performed with a first hand (e.g., of a user); and in response to detecting the input performed with the first hand, moves the one or more selectable user interface objects relative to the arrangement of selectable user interface objects (e.g., in accordance with movement of the one or more inputs performed with the first hand). In some embodiments, the input performed with the first hand is or includes the first input that initiates the process for moving the one or more selectable user interface objects relative to the arrangement. In some embodiments, the input performed with the first hand is subsequent to the first input that initiates the process for moving the one or more selectable user interface objects relative to the arrangement. In some embodiments, the computer system detects an input (e.g., an air pinch input, an air tap input, a pinch input, a tap input, an air pinch and drag input, an air drag input, a drag input, a click and drag input, a gaze input, and/or other input) performed with a second hand (e.g., of the user, or of a different user) that is different from the first hand; and in response to detecting the input performed with the second hand, scrolls the arrangement of selectable user interface objects, including displaying the second portion of the arrangement in place of the first portion of the arrangement. For example, instead of moving application icon A5 21010 itself towards an adjacent page, as in the scenario of FIGS. 21G-21K, the application icon 21010 A5 is held (e.g., optionally substantially stationary) with the first hand 7020 of the user 7002 (e.g., via an air pinch gesture or other gesture) and the opposite hand 7022 of the user 7002 performs a drag or slide gesture (e.g., moving laterally in a leftward and/or rightward direction) that causes the computer system 101 to move the second page (e.g., which is on the right side (e.g., or left side) of the first page) in place of the first page. In some embodiments, the one or more inputs performed with the first hand include an air pinch gesture and/or other air gesture performed with the first hand. In some embodiments, the input performed with the second hand includes a movement input in one or more directions, including in the direction of the second portion. For example, a user can hold a selectable user interface object with one hand and use the other hand to scroll the arrangement, such as to move the second portion of the arrangement over (e.g., into focus, while moving the first portion of the arrangement out of focus). Relocating an application icon from one page to another using two hands, reduces the number and/or complexity of inputs needed to relocate an application icon across multiple pages, especially when the pages are not adjacent (e.g., one hand is used to hold a target application icon while the other hand is used to navigate through the pages until the target page is displayed).

In some embodiments, the scrolling of the arrangement of selectable user interface objects in response to detecting the input performed with the second hand is performed in accordance with a determination that the input performed with the second hand is detected while attention (e.g., a gaze input, selection input, or other attention) of a user (e.g., the user whose hand performs the scrolling input) is directed to the arrangement of selectable user interface objects (e.g., directed to a specific selectable user interface object or generally at a location within the arrangement but not any specific user interface object). For example, in the scenario of FIGS. 21G-21K, user 7002's attention needs to be directed toward the arrangement of application icons (e.g., as opposed to outside of it) in order to slide the second page in place of the first page in response to an air pinch with one hand and movement input with the other. In some embodiments, in accordance with a determination that the input performed with the second hand is detected while attention (e.g., a gaze input) of the user (e.g., the user whose hand performs the scrolling input) is directed outside of the arrangement of selectable user interface objects, the computer system forgoes scrolling of the arrangement of selectable user interface objects in response to detecting the input performed with the second hand. Using the user's attention as a precondition to automatically sliding over an arrangement of application icons in the second page (e.g., without further user input or a requirement that other conditions be met) in place of an arrangement of application icons in a first page when an application icon moved towards the second page, reduces the number and complexity of inputs needed to reconfigure a home menu user interface in a mixed-reality three-dimensional environment (e.g., reduces accidental inputs).

In some embodiments, the computer system detects one or more inputs, including the first input; and in response to detecting the one or more inputs, the computer system activates a first reconfiguration mode in which the arrangement of selectable user interface objects is modified in response to further inputs directed to the arrangement of selectable user interface objects. In some embodiments, in a case where the first input causes the computer system to display the menu that includes the "reconfiguration mode" affordance (e.g., a long pinch or other selection input while a user interface object is selected), the first reconfiguration mode is activated in response to an input subsequent to the first input that selects the "reconfiguration mode" affordance. In some embodiments, in a case where the first input corresponds to an input (e.g., an air pinch input, an air tap input, a pinch input, a tap input, an air pinch and drag input, an air drag input, a drag input, a click and drag input, a gaze input, and/or other input) selecting the "reconfiguration mode" affordance, the first reconfiguration mode is activated in response to the first input (e.g., as opposed to any subsequent inputs). For example, in the scenario of FIGS. 21A-21C, the icon reconfiguration mode is invoked in response to selecting a "reconfiguration mode" affordance (e.g., control 21024a) displayed in a menu (e.g., menu 21024). In some embodiments, in a case where the first input corresponds to selecting the one or more selectable user interface objects and moving (e.g., dragging and/or repositioning) the one or more selectable user interface objects, the first reconfiguration mode is also activated in response to the first input (e.g., as opposed to any subsequent input). In some embodiments, in a case where the first input corresponds to a long pinch gesture performed while a gaze is directed to the arrangement of selectable user interface objects, the first reconfiguration mode is also activated in response to the first input (e.g., as opposed to any subsequent input). In some embodiments, the visual prominence of the portion of the physical environment is reduced relative to the arrangement of selectable user interface objects in conjunction with activating the first reconfiguration mode, e.g., to indicate the change of operational context of the computer system. Entering a reconfiguration mode in conjunction with initiating a process for changing positions of one or more application icons, reduces the number and complexity of inputs needed to reconfigure a home menu user interface in a mixed-reality three-dimensional environment.

In some embodiments, during the process for moving the one or more selectable user interface objects relative to the arrangement of selectable user interface objects, the computer system activates a first reconfiguration mode in which the arrangement of selectable user interface objects is modified in response to one or more further inputs directed to the arrangement of selectable user interface objects, wherein, while the first reconfiguration mode is active, the selectable user interface objects are arranged at different angles (e.g., in a curved arrangement or with multiple planes angled toward the viewpoint of the user) around a viewpoint of a user (e.g., positioned on a virtual surface that curves around the viewpoint of the user). In some embodiments, the first portion (or section) of the arrangement of selectable user interface objects, when visible, is curved around the viewpoint of the user and the second portion (or section) of the arrangement of selectable user interface objects, when visible, is curved around the viewpoint. For example, application icons A1 21002-A9 21018 in the first page of home menu user interface 21100 are optionally displayed in a curved arrangement in FIG. 21A, and application icons A11 21042-A14 21048, application icon A5 21010 and A15 21050-A18 21056 in the second page of home menu user interface 21100 are optionally displayed in a curved arrangement in FIG. 21M. In some embodiments, individual user interface objects in the arrangement are curved around the viewpoint of the user. Positioning the selectable user interface objects on a virtual surface that curves around the viewpoint of the user helps the user easily access the user interface object by reaching out to, distinguishing, identifying and locating selectable user interface objects in the arrangement of objects, thereby reducing the number and/or complexity of inputs needed to interact with selectable user interface objects in the first reconfiguration mode (e.g., an icon reconfiguration mode).

In some embodiments, the first input corresponds to a gesture (e.g., an air pinch gesture or other gesture) that meets a duration criterion (optionally in combination with a criterion that the air pinch gesture is detected while a gaze input is directed to the arrangement of selectable user interface objects); and initiating the process for moving the one or more selectable user interface objects relative to the arrangement of selectable user interface objects includes activating a first reconfiguration mode in which the arrangement of selectable user interface objects is modified in response to further inputs directed to the arrangement of selectable user interface objects. For example, a long pinch gesture directed to application icon A5 21010 in FIG. 21A causes the computer system to directly activate the icon reconfiguration mode (e.g., FIG. 21C) (e.g., without the need to display menu 21024 and/or select control 21024a in FIG. 21B). In some embodiments, the visual prominence of the portion of the physical environment is reduced relative to the arrangement of selectable user interface objects in conjunction with activating the first reconfiguration mode, e.g., to indicate the change of operational context of the computer system. In some embodiments, in the first reconfiguration mode, respective positions of the selectable user interface objects are adjustable (e.g., relative to the arrangement of selectable user interface objects) in response to user input directed to a respective selectable user interface object that includes a movement input (e.g., an air pinch and drag input, an air drag input, a drag input, a click and drag input, a gaze input, and/or other movement input). In some embodiments, the input directed to the respective selectable user interface object is direct input that includes movement of a user's hand in the physical environment to a location in the three-dimensional environment that corresponds to the respective selectable user interface object, or an indirect input that includes an air gesture detected while user's attention is directed to the respective selectable user interface object. In response to detecting the input directed to the respective selectable user interface object, the computer system moves the respective selectable user interface object in accordance with (e.g., responsive to) the movement input, and, in conjunction with moving the respective selectable user interface object, the computer system automatically readjusts or shifts other selectable user interface objects in the arrangement (e.g., as described in further detail with respect to FIGS. 21D-21F). Entering a reconfiguration mode in response to a long pinch helps disambiguate user's intent between activating a reconfiguration mode and performing a different operation with respect to an application icon (e.g., activating an application) or with respect to the arrangement (e.g., scrolling the pages of the arrangement), thereby reducing the number and complexity of inputs needed to reconfigure a home menu user interface in a mixed-reality three-dimensional environment.

In some embodiments, initiating the process for moving the one or more selectable user interface objects relative to the arrangement of selectable user interface objects includes displaying a menu including one or more control options. That is, in some embodiments, the computer system displays the menu in response to detecting the first input and in accordance with a determination that the first input corresponds to a gesture (e.g., an air pinch gesture) that meets a duration criterion. In some embodiments, while displaying the menu including the one or more control options, the computer system detects a selection input directed to a first option of the one or more control options. In some embodiments, in response to detecting the selection input directed to the first option, the computer system activates a first reconfiguration mode in which the arrangement of selectable user interface objects is modified in response to further inputs directed to the arrangement of selectable user interface objects. For example, a long pinch gesture directed to application icon A5 21010 in FIG. 21A causes the computer system to display a menu, such menu 21024, for reconfiguring a home menu user interface (e.g., FIG. 21B). Entering a reconfiguration mode by selecting a reconfiguration mode affordance in a menu helps disambiguate the user's intent between activating a reconfiguration mode and performing a different operation with respect to an application icon (e.g., activating an application) or with respect to the arrangement (e.g., scrolling the pages of the arrangement), thereby reducing the number and complexity of inputs needed to reconfigure a home menu user interface in a mixed-reality three-dimensional environment.

In some embodiments, while displaying the menu including the one or more control options, the computer system, prior to detecting the selection input directed to the first option, detects an end of the first input followed by detecting a movement input (e.g., an air drag gesture or other gesture) in one or more directions relative to the arrangement of selectable user interface objects (e.g., one or more directions parallel to a plane or surface along which the arrangement of the plurality of icons is arranged). In some embodiments, in response to detecting the movement input in the one or more directions (e.g., before the first reconfiguration mode is activated), the computer system scrolls the arrangement of selectable user interface objects (e.g., displaying previously undisplayed selectable user interface objects and ceasing to display at least some selectable user interface objects). For example, as described herein with reference to FIGS. 21S-21T, while menu 21024 for reconfiguring a home menu user interface is displayed in response to an input that includes a long pinch gesture, if a movement input 21120 (FIG. 21S) is detected after release of the long pinch gesture is detected, the computer system scrolls application icons in home menu user interface 21100 as illustrated in FIG. 21T, instead of activating the icon reconfiguration mode. In some embodiments, the arrangement of selectable user interface objects is scrolled in accordance with the movement input (e.g., in accordance with direction and/or magnitude of the movement input). In some embodiments, scrolling the arrangement of selectable user interface objects is performed in accordance with a determination that the movement input (e.g., a lateral movement) meets a movement criterion (e.g., the movement input exceeds a threshold amount of movement). In some embodiments, the arrangement of selectable user interface objects is scrolled (e.g., or is based on) in a direction of the motion input, with a magnitude based on a magnitude of the motion input, and/or with a speed based on a speed of the motion input. Scrolling the application icons after the process for rearrangement of application icons is initiated (e.g., but not complete because a control for activating a reconfiguration mode is not yet selected) reduces the number and/or complexity of inputs needed to interact with the multi-page arrangement of application icons.

In some embodiments, while the first reconfiguration mode is active, the computer system detects a second input that includes an air pinch gesture performed while attention of a user is directed to a location outside of the arrangement of selectable user interface objects; and in response to detecting the second input (e.g., an air pinch gesture), the computer system: deactivates the first reconfiguration mode. For example, in the scenario of FIGS. 21L-21M, the computer system 101 exits the icon reconfiguration mode in response to user input 21061 that is directed to a location in view 2000' that is outside the arrangement of application icons, such as outside the 3×3 grid that is formed by the arrangement of application icons A11 21042-A14 21048, A5 21010, and A15 21050-A18 21056. In some embodiments, a state of the arrangement of selectable user interface objects when the first reconfiguration mode is deactivated (e.g., including any changes to positions of the selectable user interface objects made while the first reconfiguration mode was active) is maintained after the first reconfiguration mode is deactivated. In some embodiments, changes made to positions of the selectable user interface objects in the first reconfiguration mode are canceled when the first reconfiguration mode is canceled (e.g., if no user input that confirms the changes is detected before the first reconfiguration mode is deactivated). In some embodiments, whether or not the changes to the rearrangement are kept depends on the manner the first reconfiguration mode is exited (e.g., via the Done control 21028 or via the Cancel control 21026, as described in further detail with respect to FIGS. 21L-21M. In some embodiments, the first configuration mode is deactivated in response to selecting a control (e.g., Done control 21028 or via the Cancel control 21026) visible in the three-dimensional environment while the first reconfiguration mode is active. In some embodiments, the first reconfiguration mode is deactivated in response detecting an air pinch gesture performed while attention of the user is directed outside the arrangement of selectable user interface objects. In some embodiments, the first reconfiguration mode can be reactivated in a number of ways as described above, including: by initiating the process for moving the one or more selectable user interface objects (e.g., without the need to select a menu option); by selecting a menu option for activating a first reconfiguration mode (e.g., a "reconfiguration mode" affordance) (e.g., the menu is optionally displayed in response to initiating the process for moving the one or more selectable user interface objects); and/or by a long air pinch gesture directed at a respective selectable user interface object. Exiting a reconfiguration mode by detecting a pinch input (or, optionally, air pinch input) while gazing outside an arrangement of application icons or an arrangement of representation of pages, reduces the number and/or complexity of inputs and the amount of time needed to reconfigure a home menu user interface (e.g., by reducing the number of inputs to exit and/or renter a reconfiguration mode).

In some embodiments, during the process for moving the one or more selectable user interface objects relative to the arrangement of selectable user interface objects (e.g., after the first reconfiguration mode was activated), the computer system detects a third input that includes an air pinch gesture and movement in one or more directions, wherein the air pinch gesture is directed to a respective user interface object of the one or more user selectable interface objects (e.g., the air pinch gesture directly or indirectly selects the respective user interface object). In some embodiments, in response to detecting the third input (e.g., air pinch and drag), the computer system: in accordance with a determination that the air pinch gesture is maintained for a threshold amount of time (e.g., a long air pinch gesture) before the movement in the one or more directions included in the third input is detected, moves the respective user interface object relative to the arrangement of selectable user interface objects in accordance with the movement in the one or more directions included in the third input (e.g., in accordance with magnitude and/or directions of the movement in or more directions); and in accordance with a determination that the air pinch gesture is maintained for less than the threshold amount of time before the movement in the one or more directions included in the third input is detected, moves the arrangement of selectable user interface objects (e.g., scrolls the arrangement of selectable user interface objects) (e.g., in accordance with the movement in the one or more directions included in the third input). For example, as described herein with reference to FIGS. 21U-21V, the selected application icon A5 21010 is moved relative to home menu user interface 21100 in response to detection of input 21122, which is optionally one type of input such as a long pinch (e.g., exceeding a threshold pinch duration) and drag gesture, whereas, as described herein with reference to FIGS. 21S-21T, home menu user interface 21100 is scrolled in response to detection of input 21120, which is optionally a different type of input such as a pinch (e.g., a short pinch not exceeding the threshold pinch duration) and drag gesture. Using a duration of a pinch as criteria for disambiguating between changing a position of an icon and scrolling the arrangement of icons, reduces the number and/or complexity of inputs needed to reconfigure a home menu user interface.

In some embodiments, in response to detecting the third input (e.g., air pinch and drag), the computer system, in accordance with the determination that the air pinch gesture is maintained for the threshold amount of time (e.g., the long air pinch gesture) before the movement in the one or more directions included in the third input is detected, provides visual feedback with respect to the respective user interface object. For example, in response to a long pinch gesture directed to application icon A5 21010 in FIG. 21A, application icon A5 21010 pops out (e.g., moves toward the viewpoint of the user) and/or is enlarged relative to the rest of the application icons in the arrangement. In some embodiments, providing visual feedback includes changing the appearance of the respective user interface object, such as by enlarging the respective user interface object, changing opacity, and/or otherwise making the respective user interface object more prominent with respect to other selectable user interface objects in the arrangement. In some embodiments, providing visual feedback includes moving the respective user interface object towards the viewpoint of the user. In some embodiments, in conjunction with or alternatively to moving the respective user interface object towards the viewpoint of the user, other selectable user interface objects in the arrangement are moved away from the viewpoint of the user. Changing the appearance of the respective user interface object (e.g., by enlarging the respective user interface object, changing opacity, or otherwise making the respective user interface object more prominent with respect to other selectable user interface objects in the arrangement) provides visual feedback to the user that an operation context of the respective user interface object has changed.

In some embodiments, the arrangement of selectable user interface objects is a multipage arrangement that includes a first page that corresponds to the first portion that includes the first plurality of selectable user interface objects and a second page that corresponds to a second portion that includes a second plurality of selectable user interface objects. In some embodiments, the computer system detects a fourth input (e.g., air gesture, such as a pinch or a long pinch) that meets second criteria (e.g., an input (e.g., an air pinch input, an air tap input, a pinch input, a tap input, an air pinch and drag input, an air drag input, a drag input, a click and drag input, a gaze input, and/or other input) directed to a user interface element or affordance visible in the view of the three-dimensional environment). In some embodiments, the fourth input is detected while the first reconfiguration mode is active. In some embodiments, the fourth input is detected while the multipage arrangement of selectable user interface objects is in the normal mode (e.g., a non-reconfiguration mode). In some embodiments, the fourth input is detected while the first page of the multipage arrangement of selectable user interface objects (e.g., and no other pages) is visible in the view of the three-dimensional environment. In some embodiments, in response to detecting the fourth input, the computer system activates a second reconfiguration mode, including: concurrently displaying representations of a plurality of pages of the multipage arrangement of selectable user interface objects, including a first representation of the first page of the multipage arrangement of selectable user interface objects and a second representation of a second page of the multipage arrangement of selectable user interface objects, wherein the second page is different from the first page; and reducing visual prominence of the portion of the physical environment in the view of the three-dimensional environment (e.g., portions of the physical environment that are visible via the display generation component are dimmed, blurred, darkened or otherwise their visual prominence is reduced relative to the multi-section arrangement of application icons) relative to respective visual prominence of the representations of the plurality of pages of the multipage arrangement of selectable user interface objects. For example, in FIGS. 21O-21P, upon entering the page reconfiguration mode, page representations 21072-21078 of the pages in the home menu user interface 21100 are concurrently displayed in view 2000', and passthrough portions of view 2000' are darkened, e.g., visibility of walls 7006' and 7004', floor 7008' and physical object 7014' is reduced relative to page representations 21072-21078. In some embodiments, availability of one or more pages in the multipage arrangement of selectable user interface objects can be changed in accordance with user inputs in the second reconfiguration mode. For example, the availability of a page determines whether a page is displayed when the computer system navigates through a sequence of pages of the multipage arrangement in response to user inputs detected while the multipage arrangement is in the first reconfiguration mode or in the normal mode. In some embodiments, in the second reconfiguration mode, pages of the multipage arrangement of selectable user interface objects can be hidden or unhidden, deleted, new pages can be added, and the order in which the pages are displayed when the computer system navigates through the sequence of pages can be changed. Reducing prominence of pass-through portions in conjunction with activating a page reconfiguration mode, improves user physiological comfort by avoiding physiological discomfort associated with physical motion of the user that is not matched with environmental response in an a three-dimensional environment that is visible to the user and improves safety and multitasking by allowing a user to be cognizant of the physical environment while interacting with the home menu user interface (e.g., by allowing a user to recognize obstacles in the physical environment and/or reducing a feeling of being unbalanced) without the need to provide additional inputs (e.g., without the need to switch back and forth between viewing virtual content to viewing the physical environment), thereby reducing the number and complexity of inputs needed to reconfigure a home menu user interface in a mixed-reality three-dimensional environment.

In some embodiments, the multipage arrangement of selectable user interface objects is displayed at a first distance from a viewpoint of a user (e.g., the first page or the second page when visible in the view of the three-dimensional environment are displayed at first distance from the viewpoint of the user) (e.g., prior to detecting the fourth input). In some embodiments, the representations of the plurality of pages of the multipage arrangement of selectable user interface objects are displayed at a second distance from the viewpoint of the user, wherein the second distance is greater than the first distance. In some embodiments, the representations of the plurality of pages of the multipage arrangement of selectable user interface objects are pushed back away from the viewpoint of the user relative to the first distance at which the multipage arrangement of selectable user interface objects is displayed. For example, in the scenario of FIG. 21O, upon activation of the page reconfiguration mode, page representations 21072-21078 are pushed back away from the viewpoint of the user (e.g., relative to the distance from the viewpoint of the user 7002 at which the arrangement of application icons in the home menu user interface 21100 are displayed). Concurrently displaying reduced scale representation of pages of a home menu user interface upon entering a page reconfiguration mode, and pushing back the reduced scale representation of the pages away from the viewpoint of the user, allows displaying multiple pages concurrently, thereby reducing the number of inputs and/or the amount of time needed to change availability and/or positions of the respective pages.

In some embodiments, aspects/operations of methods 12000, 13000, 14000, 15000, 16000, 17000, 22000, 23000, 24000, 27000, and 29000 may be interchanged, substituted, and/or added between these methods. For brevity, these details are not repeated here.

FIGS. 26A-26R illustrate examples of placing an application user interface in a three-dimensional environment (e.g., so that it is visible via a viewport into the three-dimensional environment) based on the presence of one or more other application user interfaces in the three-dimensional environment and/or a position of the application user interface within the viewport. FIG. 27 is a flow diagram of an exemplary method 27000 for placing an application user interface in a three-dimensional environment based on the presence of one or more other application user interfaces in the three-dimensional environment. The user interfaces in FIGS. 26A-26R are used to illustrate the processes described below, including the processes in FIG. 27.

FIG. 26A is similar to FIG. 7A in showing an example physical environment 7000 that shows user 7002 interacting with computer system 101, except that FIG. 26A illustrates computer system 101 as a head-mounted device with head-mounted display 7100a worn on user 7002's head (e.g., instead of as a touchscreen with display 7100 held by user 7002, as shown in FIG. 7A).

Figures 26B, 26C:
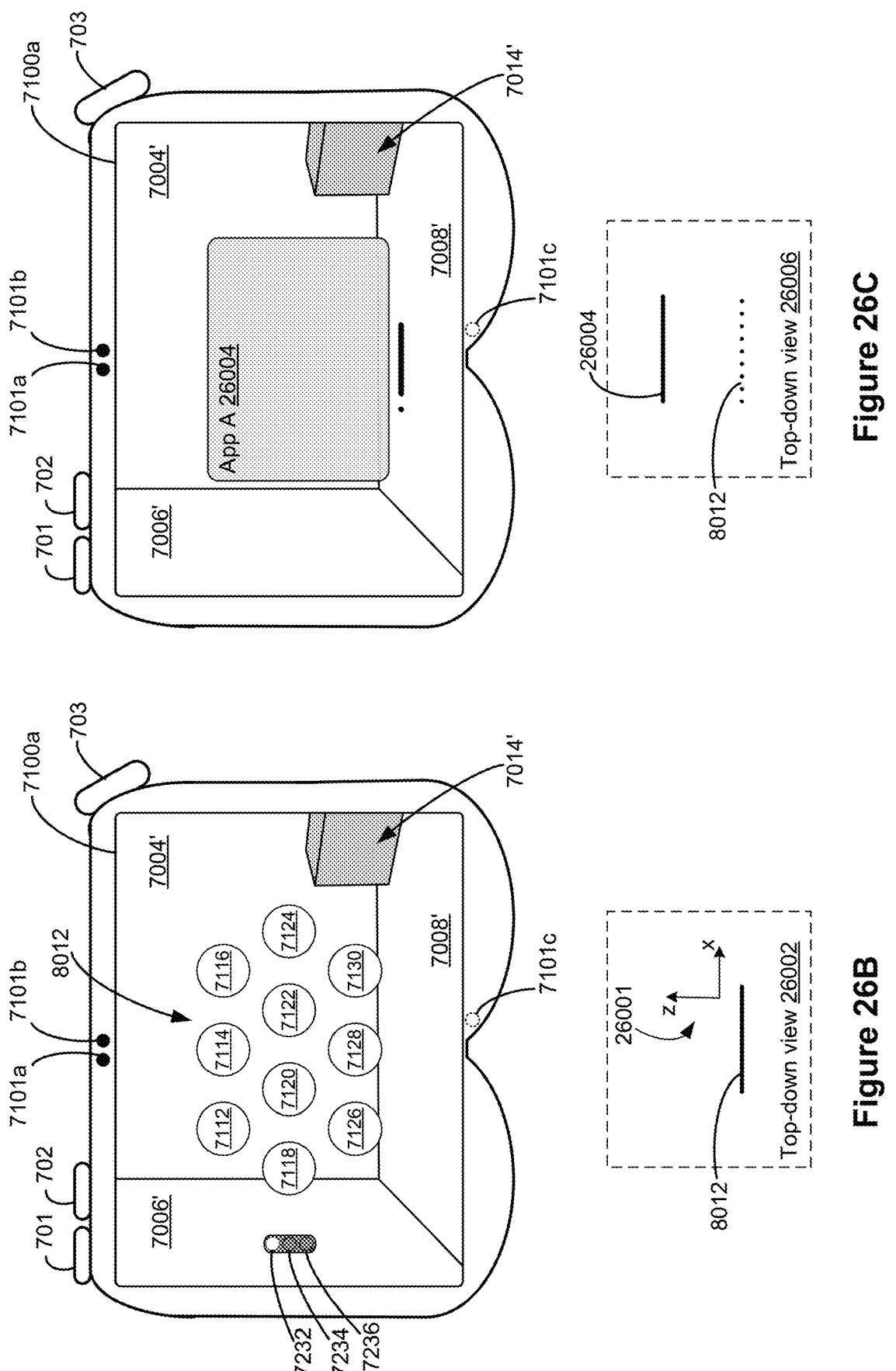

FIG. 26B shows a view of a three-dimensional environment that is visible to user 7002 via display generation component 7100a of computer system 101. Home menu user interface 8012 is also displayed in the viewport of the three-dimensional environment in FIG. 26B. In some embodiments, home menu user interface 8012 is displayed by computer system 101 in response to detecting a user input (e.g., a first user input on digital crown 703, such as a press input, a hand gesture such as an air gesture, a gaze and pinch gesture, a tap gesture, or a long press gesture). In some embodiments, computer system 101 displays home menu user interface 8012 at respective locations in the three-dimension environment according to a position (e.g., a standing position, a sitting position, or a sitting position on the floor) and/or an orientation (e.g., a head elevation, and/or a head rotation) of the user as described in reference to FIGS. 8A-8J. Similar to the three-dimensional environment 8003 described herein of FIG. 7B, the three-dimensional environment of FIG. 26B includes representations of objects in a physical environment such as physical environment 7000 of FIG. 26A (e.g., as captured by one or more cameras of computer system 101). For example, in FIG. 26B, the three-dimensional environment includes representation 7014' of physical object 7014, representations 7004' and 7006' of physical walls 7004 and 7006, respectively, and representation 7008' of physical floor 7008. Top-down view 26002 illustrates a position (e.g., a depth and a lateral position) of home menu user interface 8012 in a viewport of the three-dimensional environment. In some embodiments, a position of home menu user interface 8012 along a depth dimension is at or associated with a threshold depth. Coordinate diagram 26001 indicating the coordinate system of the three-dimensional environment for top-down view 26002, and all other top-down views in FIGS. 26C-26R, includes the z-axis (e.g., depth dimension, and/or along a radial direction) extending upwards while the x-axis extends to the right. The depth dimension (e.g., or z-direction, and/or a radial direction) extends into the page from the viewpoint of the user shown via display generation component 7100a in FIGS. 26B-26R, while the height dimension (e.g., or y-direction, and/or an altitude angle direction) extends up and down in the three-dimensional environment (e.g., relative to gravity) shown via display generation component 7100a in FIGS. 26B-26R.

In FIG. 26B, home menu user interface 8012 includes representations 7112, 7114, 7116, 7118, 7120, 7122, 7124, 7126, 7128, 7130 (also referred to collectively as representations 7112-7130) (e.g., analogous to the representations 7112-7132 described in reference to FIG. 7B, or a different set of representations) and tab 7232, tab 7234, and tab 7236 arranged substantially linearly on a left portion of home menu user interface 8012. Tab 7232 for displaying representations of software applications in home menu user interface 8012 is visually emphasized (e.g., highlighted or otherwise selected) in FIG. 26B. Non-visually emphasized tab 7234, for displaying representations of one or more other people with whom user 7002 is able to initiate or maintain (e.g., continue) communication or otherwise interact with, or who are capable of interacting with user 7002, and non-visually emphasized tab 7306 for displaying one or more virtual environments that can be displayed as (or in) the three-dimensional environment, are selectable by the user.

In response to detecting a user input (e.g., a hand gesture, such as a tap input or a pinch input, or a gaze input, and/or a different type of input) directed to a user interface element (e.g., a representation of an application, or an icon of an application) displayed in home menu user interface 8012, such as representation 7112 that corresponds to Application A, computer system 101 dismisses home menu user interface 8012 (e.g., ceases to display home menu user interface 8012) in conjunction with (e.g., prior to, or concurrently with) displaying application user interface 26004 of Application A (e.g., Application A is a web browsing application, a document editing application, a calendar application, an email application, or other application) as shown in FIG. 26C.

Top-down view 26006 in FIG. 26C shows the placement of application user interface 26004 relative to home menu user interface 8012. For example, home menu user interface 8012 is shown in dotted lines in top-down view 26006 at the previous position of home menu user interface 8012 as depicted in FIG. 26B (e.g., the same position as in top-down view 26002 of FIG. 26B), which was the position of home menu user interface 8012 prior to computer system 101 dismissing home menu user interface 8012 in conjunction with launching application user interface 26004 corresponding to representation 7112. Application user interface 26004 is positioned behind (e.g., along the depth dimension, further from the viewpoint of user 7002, and/or at a greater radial distance from the viewpoint of the user) a location where home menu user interface 8012 was previously displayed (e.g., the previous location of home menu user interface 8012 as shown in FIG. 26B). As shown in top-down view 26006, a surface of application user interface 26004 (e.g., the plane in which application user interface 26004 is displayed) is parallel to a surface of home menu user interface 8012 (e.g., the plane in which home menu user interface 8012 is or was displayed) at its previous location depicted in FIG. 26B.

In some embodiments, computer system 100 displays application user interface 26004 at a position relative to the position of home menu user interface 8012 in the manner described in reference to FIGS. 9A-9J (e.g., application user interface 26004 has a fixed spatial relationship to home menu user interface 8012 (FIG. 26B) that includes an offset along at least one dimension (e.g., a depth dimension, along the z-axis, and/or a height dimension, along the y-axis), or a different spatial relationship). In some embodiments, respective application user interfaces, including application user interface 26004, are displayed further from a viewpoint of the user along the depth dimension, relative to the threshold depth.

Figures 26D, 26E:
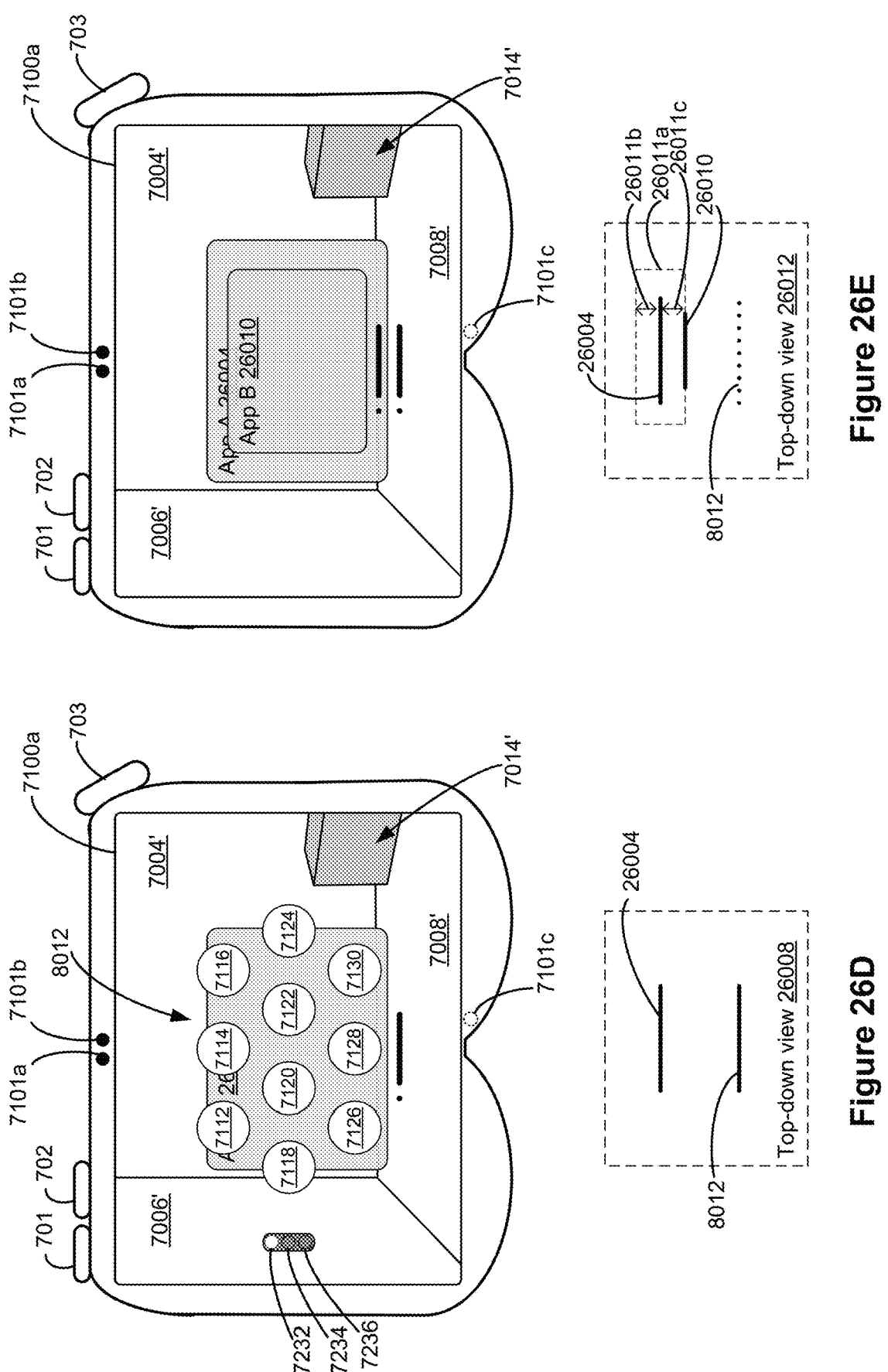

FIG. 26D illustrates that, in response to detecting a user input (e.g., a press input to the digital crown 703, or a different input), computer system 101 displays home menu user interface 8012 at a characteristic portion of the viewport (e.g., as described in reference to FIGS. 18B-18G), in front of (e.g., closer to a viewpoint of the user, in the depth dimension of the three-dimensional environment) and optionally concurrently with application user interface 26004.

Top-down view 26008 of FIG. 26D illustrates the respective locations of application user interface 26004 and home menu user interface 8012. In some embodiments, while displaying home menu user interface 8012 at the characteristic portion of the viewport, application user interface 26004 is displayed with reduced visual prominence as described in reference to FIGS. 18A-18G. While top-down view 26008 shows application user interface 26004 being maintained at the same depth position, in some embodiments, as described in reference to FIGS. 18B, application user interface 26004 is shifted away from the viewpoint of the user in the depth dimension (e.g., and thus appears smaller than shown in FIG. 26C), and/or is offset from its respective original position in one or more directions other than the depth dimension.

In response to detecting a user input (e.g., a hand gesture, such as a tap input or a pinch input, or a gaze input, and/or a different type of input) directed to a user interface element displayed in home menu user interface 8012, such as representation 7114 that corresponds to Application B, computer system 101 dismisses home menu user interface 8012 (e.g., ceases to display home menu user interface 8012) in conjunction with (e.g., prior to, or concurrently with) displaying application user interface 26010 of Application B as shown in FIG. 26E.

In some embodiments, as illustrated by the examples of FIG. 26E-26M, placement of an application user interface that is to be displayed in the viewport of the three-dimensional environment is determined based on one or more of the following: whether another application user interface (e.g., application user interface 26004) is already being displayed at a respective depth (e.g., a default depth as described in reference to FIGS. 9A-9O, and/or at a depth that does not conflict with the threshold depth) in the viewport, and/or whether the application user interface that is to be displayed would obscure more than a threshold amount of the application user interface that is already being displayed at the respective depth. In FIG. 26E, application user interface 26010 is displayed at a first distance from the viewpoint of the user that is offset along the depth dimension (e.g., z-direction, and/or a radial direction) from the application user interface already displayed at the respective depth, and without an offset along a height direction (e.g., y-direction, and/or an altitude angle direction) or a lateral direction (e.g., x-direction, and/or at a respective azimuthal angle with respect to the viewpoint of the user).

In particular, in the example of FIG. 26E, application user interface 26004 is displayed in the viewport prior to computer system 101 detecting the user input for invoking application user interface 26010. In some embodiments, as shown in top-down view 26012, application user interface 26004 is associated with zone 26011a within which other application user interfaces are not displayed (e.g., not permitted to be displayed, so as to avoid depth conflict with application user interface 26004). Zone 26011a includes first depth buffer 26011b behind (e.g., further away from the viewpoint of the user, and/or further away from home menu user interface 8012 at its previous position depicted in FIG. 26D) a plane of application user interface 26004, and second depth buffer 26011c in front of (e.g., closer to the viewport of the user, and/or closer to home menu user interface 8012 at its previous position depicted in FIG. 26D) the plane of application user interface 26004. In some embodiments, first depth buffer 2601 1b is equal in magnitude to second depth buffer 26011c. In some embodiments, as shown in the example of FIG. 26E, application user interface 26010 is positioned at the front edge of zone 26011a, in front of application user interface 26004.

In the example of FIG. 26E, application user interface 26010 is smaller than application user interface 26004 along both the height dimension (e.g., y-dimension, or an altitudinal direction) and the lateral dimension (e.g., x-dimension, or an azimuthal direction). As a result, a threshold amount (e.g., 3%, 5%, 10%, 20% or other percentage) of the application user interface already displayed in the viewport would remain visible when application user interface 26010 is displayed in front of application user interface 26004 at the front edge of zone 26011a, closer to the viewpoint of the user. In such scenarios, a characteristic portion (e.g., a central portion, a center, a top edge, or a lower edge) of application user interface 26010 is displayed in front of a corresponding characteristic portion of application user interface 26004, without a lateral offset or a height offset such that application user interface 26010 is centered, in an x-y plane, with respect to application user interface 26004.

Figures 26F, 26G:
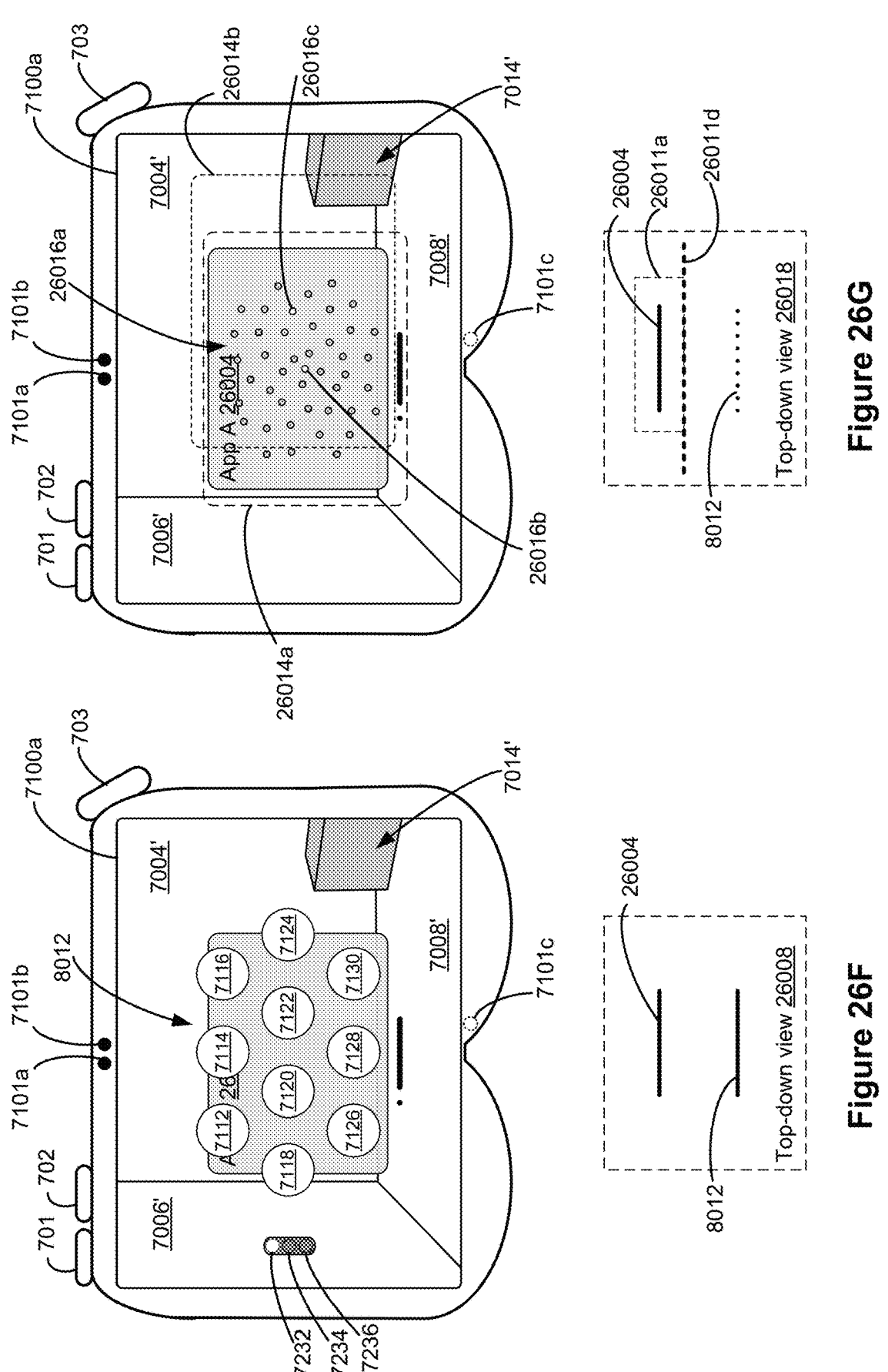

FIG. 26F is analogous to FIG. 26D, except for computer system 101 detecting a user input (e.g., a hand gesture, such as a tap input or a pinch input, or a gaze input, and/or a different type of input) directed to a different user interface element displayed in home menu user interface 8012, such as representation 7116 that corresponds to Application C. FIGS. 26F-261 illustrate examples in which the application user interface that is to be displayed (e.g., for Application C (FIG. 26H), and/or for Application D (FIG. 261)) has a surface that is larger than a surface of an application user interface already displayed in the viewport of the three-dimensional environment (e.g., user interface 26004 of Application A (FIG. 26F)).

In response to detecting the user input directed to representation 7116 (FIG. 26F), computer system 101 dismisses home menu user interface 8012 (e.g., ceases to display home menu user interface 8012) as shown in FIG. 26G. As described in reference to FIG. 26E, line 26011d in top-down view 26018 of FIG. 26G corresponds to the front edge of zone 26011a associated with application user interface 26004, which is displayed in the viewport of the three-dimensional environment prior to computer system 101 detecting the user input directed to representation 7116. Application user interface 26020 (FIG. 26H), which is a user interface of Application C that is associated with representation 7116, optionally launches at a depth indicated by line 26011d in top-down view 26018 of FIG. 26G, within the viewport of the three-dimensional environment in response to computer system 101 detecting the user input directed to representation 7116.

In FIG. 26G, frame 26014a shows an outline of an outer boundary of application user interface 26020 if the characteristic portion of application user interface 26020 were displayed at a height position and a lateral position that matches (e.g., overlaps and/or coincides with) the corresponding characteristic portion of application user interface 26004 (e.g., if application user interface 26020 were displayed at a first candidate location). For example, dot 26016b is located at a center portion of application user interface 26004 as well as at the corresponding center portion of frame 26014a. FIG. 26G thus shows that frame 26014a, if vertically and laterally centered on application user interface 26004, would fully overlap with application user interface 26004 (and in some embodiments, fully obscure application user interface 26004, which would no longer be visible to the user). In some embodiments, in accordance with a determination that application user interface 26020, if launched at the location corresponding to frame 26014a, would obscure more than a threshold amount (e.g., 3%, 5%, 10%, 20% or other percentage) of the application user interface 26004, computer system 101 displays application user interface 26020 with an offset along the height dimension (e.g., y-direction, and/or an altitude angle direction) and/or the lateral dimension, at the depth position indicated by line 26011d.

Figures 26H, 26I:
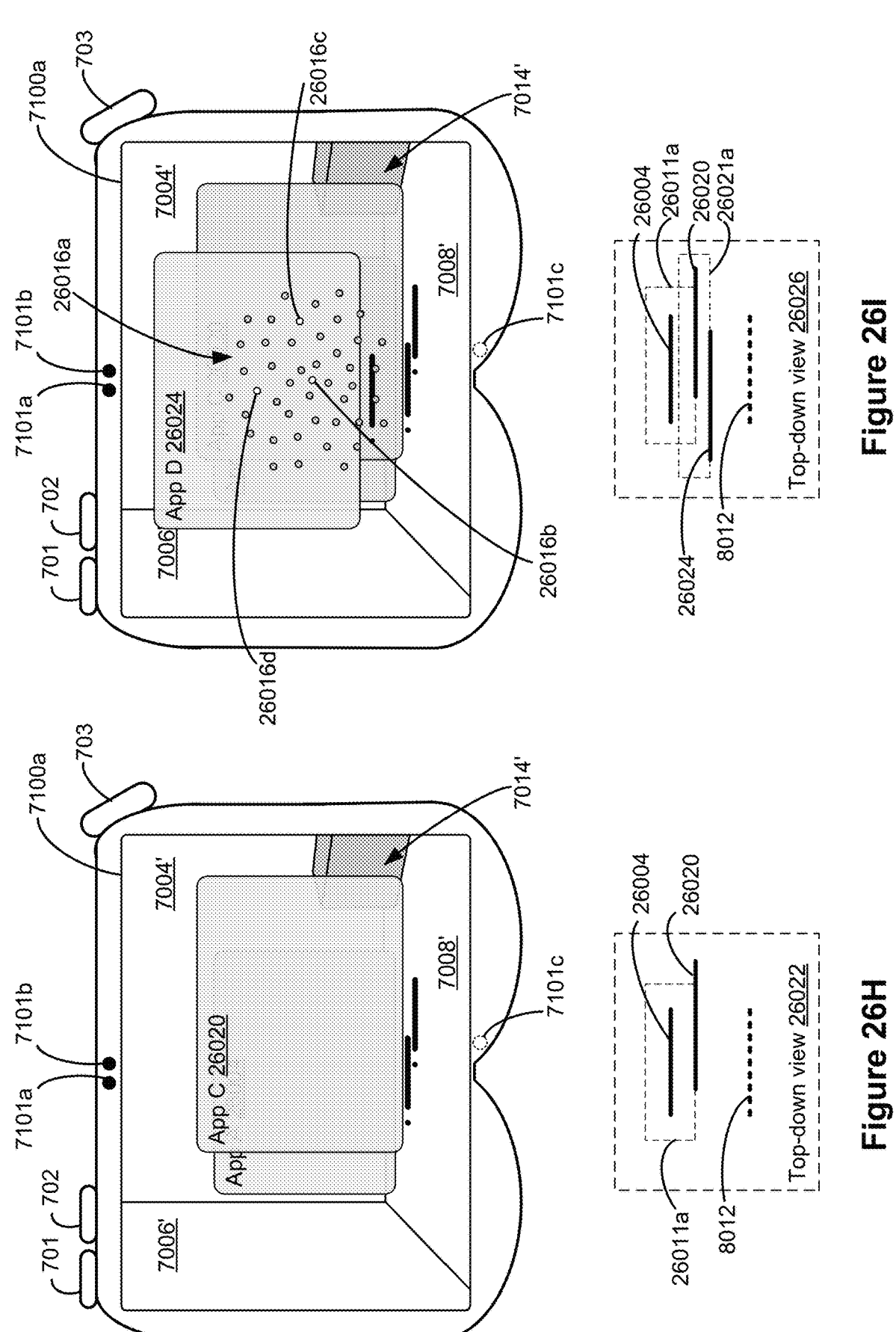

In some embodiments, as in the example shown in FIGS. 26G and 26H, computer system 101 selects the offset for positioning application user interface 26020 by searching for a respective location from a predefined set of locations. In some embodiments, the predefined set of locations forms a pattern that lacks a consistent directional trend. In some embodiments, the predefined set of locations forms a spiral pattern (e.g., an Archimedean spiral, a hyperbolic spiral, a Fermat's spiral, a phyllotaxis spiral, or other types of spiral pattern). The set of dots shown over application user interface 26004 in FIG. 26G represent an example phyllotaxis spiral pattern 26016a. In some embodiments, phyllotaxis spiral pattern 26016a is centered with respect to a characteristic portion of home menu user interface 8012, that was displayed, or would be displayed if invoked by the user at the current viewpoint of the user. Phyllotaxis spiral pattern 26016a includes dot 26016b (e.g., highlighted relative to the other dots in phyllotaxis spiral pattern 26016a except dot 26016c), which as noted above optionally corresponds to a characteristic portion (e.g., a central portion, the center, a position offset downwards from a center of home menu user interface 8012) of home menu user interface 8012. In some scenarios, computer system 101 traverses respective locations within phyllotaxis spiral pattern 26016a in a deterministic manner (e.g., sequentially from points within a first radius to points within a second radius larger than the first radius, or sequentially in a counterclockwise or clockwise direction), optionally starting from a central portion of phyllotaxis spiral pattern 26016a, to determine a location for positioning a characteristic portion of application user interface 26020 in a way that allows the threshold amount of application user interface 26004 to remain visible to the user in the viewport of the three-dimensional environment.

Highlighted dot 26016c in phyllotaxis spiral pattern 26016a is offset from highlighted dot 26016b along both a lateral dimension and a height dimension (e.g., dot 26016c is to the right of and higher than dot 26016b). In addition, dot 26016c is located at a center portion of frame 26014b, which shows an outline of an outer boundary of application user interface 26020 if the characteristic portion of application user interface 26020 were displayed at a height position and a lateral position based on dot 26016c (e.g., if application user interface 26020 were displayed at a second candidate location). Displaying application user interface 26020 at the position of frame 26014b would allow a left portion of application user interface 26004 to remain visible to the user. In accordance with a determination that the left portion of application user interface 26004 that remains visible to the user in the viewport of the three-dimensional environment includes more than the threshold amount of application user interface 26004, computer system 101 displays application user interface 26020 of Application C as shown in FIG. 26H, in which application user interface 26020 is centered at dot 26016c. Accordingly, top-down view 26022 in FIG. 26H shows application user interface 26020 offset to the right and slightly upward with respect to application user interface 26004 while being displayed at the front edge of zone 26011a.

In some embodiments, as described in reference to FIGS. 9K-9O and 19M-19N, an application user interface is launched in the viewport from user interface elements other than home menu user interface 8012. For example, the application user interface can be launched from a notification as shown in FIG. 9K-9L, or the application user interface can be launched from another application (e.g., a same application, or a different application), as shown in FIGS. 9N, 9O, 19M, and 19N.

FIG. 26I shows application user interface 26024 corresponding to Application D that is launched from home menu user interface 8012, from a notification, from another application, or other way of displaying an application user interface. Due to the presence, in the viewport of the three-dimensional environment, of application user interface 26020, and due to application user interface 26020 having associated zone 26021a within which no other application user interface is displayed (shown in top-down view 26026), computer system 101 positions application user interface 26024 at a front edge of zone 26021a, along a depth dimension, to avoid depth conflicts between application user interface 26024 and application user interface 26020.

Computer system 101 selects dot 26016d from phyllotaxis spiral pattern 26016a as the location on an x-y plane at the depth corresponding to the front edge of zone 26021a at which to display a characteristic portion (e.g., the center, and/or the central portion) of application user interface 26024. Dot 26016d, highlighted in phyllotaxis spiral pattern 26016a, is offset from dot 26016c along both a lateral dimension and a height dimension (e.g., dot 26016d is to the left of and higher than dot 26016b). Displaying the characteristic portion of application user interface 26024 at the position of dot 26016d allows a right portion and a bottom portion of application user interface 26020 to remain visible to the user. In accordance with a determination that the right portion and the bottom portion of application user interface 26020 remaining visible to the user in the viewport of the three-dimensional environment include more than the threshold amount of application user interface 26020, computer system 101 displays application user interface 26024 of Application D as shown in FIG. 26I, in which application user interface 26024 is centered at dot 26016*d*. In some embodiments, displaying the characteristic portion of application user interface 26024 at the position of dot 26016*d* also allows one or more portions of application user interface 26004 (e.g., a bottom left corner portion) to remain visible to the user.

Top-down view 26026 shows application user interface 26024 being offset to the left of both application user interface 26004 and application user interface 26020 while being displayed at the front edge of zone 26021*a*.

In some embodiments, as illustrated in the example of FIG. 26I, zone 26021*a* is smaller along the depth dimension compared to zone 26011*a*. In some embodiments, subsequently launched application user interfaces are optionally displayed progressively closer together as more application user interfaces are stacked toward a viewpoint of the user, as further illustrated in the example shown in FIG. 26J.

Figures 26J, 26K:
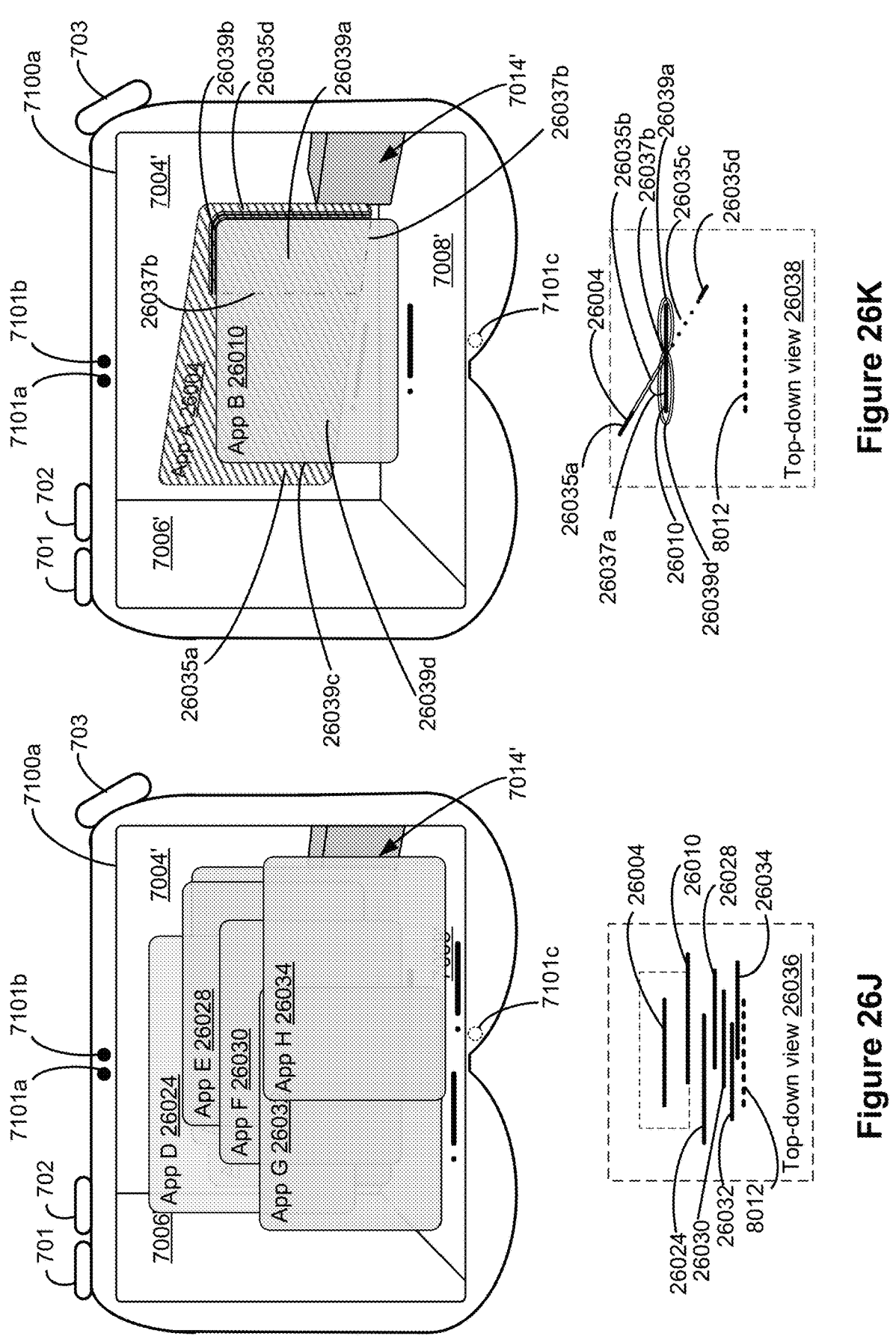

In FIG. 26J, four additional application user interfaces— application user interface 26028 associated with Application E, application user interface 26030 associated with Application F, application user interface 26032 associated with Application G, and application user interface 26034 associated with Application H—are displayed in front of application user interface 26024 (and application user interface 26004 and application user interface 26010). Each of the displayed application user interfaces is offset laterally and/or along a height dimension from a previously launched application user interface (e.g., launched immediately prior to, and/or the application user interface closest behind a respective application user interface) so that a threshold amount of at least the underlying application user interface is visible from the viewpoint of the user. In some embodiments, application user interfaces are displayed at depths further from the threshold depth associated with home menu user interface, as shown in top-down view 26036 of FIG. 26J. In some embodiments, an application user interface is launched at a respective location in the viewport of the three-dimensional environment relative to home menu user interface 8012, optionally as described in FIGS. 9A-9O, and one or more of the subsequently launched application user interfaces are displayed at depths that are between the depth of the last launched application user interface and the threshold depth associated with home menu user interface 8012.

In the examples of FIGS. 26E-26J, a surface of a newly displayed application user interface is parallel to a surface of the application user interface that was most recently launched (e.g., application user interface 26010 is parallel to application user interface 26004 in FIG. 26E, and application user interface 26024 is parallel to application user interface 26020 in FIG. 26I).

In contrast, in the example of FIG. 26K, a surface of already-displayed application user interface 26004 is displayed at an angle with respect to a surface of home menu user interface 8012. In response to detecting a user input for launching application user interface 26010, computer system 101 displays application user interface 26010 having an orientation such that a surface of application user interface 26010 is parallel to the surface of home menu user interface 8012. In some embodiments, in accordance with a determination that application user interface 26004 is angled by more than a threshold amount relative to home menu user interface 8012 (or more generally, relative to a viewpoint of the user), application user interface 26010 is displayed at the default location in FIG. 26K without offset along the depth dimension as described with respect to zones 26011*a* and 26021*a* in FIG. 26I and with respect to FIG. 26J. In some embodiments, in accordance with a determination that already-displayed application user interface 26004 is angled by less than the threshold amount, newly displayed application user interface 26010 is displayed with offset along the depth dimension, as described in more detail herein with reference to FIGS. 26L-26M.

Top-down view 26038 of FIG. 26K shows application user interface 26010 intersecting application user interface 26004 at angle 26037*a* (e.g., angle 26037*a* is at least as large as a threshold angle, and/or the threshold angle is at least 5°, at least 8°, or another value). Portions 26035*a* and 26035*b* on the left side of application user interface 26004 are further from the viewpoint of the user than application user interface 26010, with portion 26035*b* of application user interface 26004 being behind (e.g., obscured by) portion 26039*d* on the left side of application user interface 26010. Lines 26037*b* delineate portion 26039*a* of application user interface 26010 and are provided in the viewport of FIG. 26K for illustrative purposes and are optionally not displayed or not visible to the user. The position of the vertical segment of line 26037*b* at the vertical intersection between application user interface 26010 and application user interface 26004 is also indicated in top-down view 26038. Portion 26039*a* of application user interface 26010 is positioned further in the depth dimension from the viewpoint of the user than portions 26035*c* and 26035*d* of application user interface 26004. However, because application user interface 26010 is newly displayed and has focus, portions of application user interface 26010 are given visual prominence, and accordingly portion 26039*a* is displayed "breaking through" portion 26035*c* of application user interface 26004, so that application user interface 26010 is visible to the user as having a continuous surface, even though portion 26039*a* of application user interface 26010 is further away from the user than, and thus would be occluded by, portion 26035*c* of application user interface 26004. Instead, portion 26035*c* of application user interface 26004 is visually deemphasized and/or occluded by portion 26039*a* of application user interface 26010.

In some embodiments, because portion 26035*b* of application user interface 26004 is positioned behind and occluded by portion 26039*d* of application user interface 26010, border 26039*c* surrounding at least a part of portion 26039*d* (e.g., that is adjacent to visible portion 26035*a* of application user interface 26004) has a first visual effect (e.g., a solid border with a sharp demarcation of a periphery of application user interface 26010, and/or other visual effects). In some embodiments, in contrast, because portion 26039*a* of application user interface 26010 is positioned behind yet "breaking through" application user interface 26004, border 26039*b* surrounding at least a part of portion 26039*a* of application user interface 26010 (e.g., that is adjacent to visible portion 26035*d* of application user interface 26004) has a distinct, second visual effect (e.g., a gradient effect, and/or a feathered effect) compared to border 26039*c*.

In some embodiments, an application user interface is displayed at an angle to a surface (e.g., plane) of home menu user interface in response to movement (e.g., including rotation and/or tilting) of the application user interface relative to the three-dimensional environment. In some embodiments, alternatively or additionally, an application user interface is displayed at an angle to the plane of home menu user interface in response to movement of a viewpoint of the user (e.g., a body posture of the user, a position of the user, a head rotation of the user, or other user movement) relative to the application user interface in the three-dimensional environment. For example, application user interface 26004 is optionally launched at an orientation that is parallel to home menu user interface 8012, as shown in FIG. 26C, and subsequently a body posture of the user (e.g., a position of the user, a head rotation of the user) is changed prior to computer system 101 detecting a user input that corresponds to a request for displaying application user interface 26010. In response to detecting the user input corresponding to a request for displaying application user interface 26010 while computer system 101 displays the viewport of the three-dimensional environment with application user interface 26004 at an angle, application user interface 26010 is displayed in the viewport of the three-dimensional environment with the surface of application user interface 26010 at an orientation that is parallel to a surface of home menu user interface 8012.

Figures 26L, 26M:
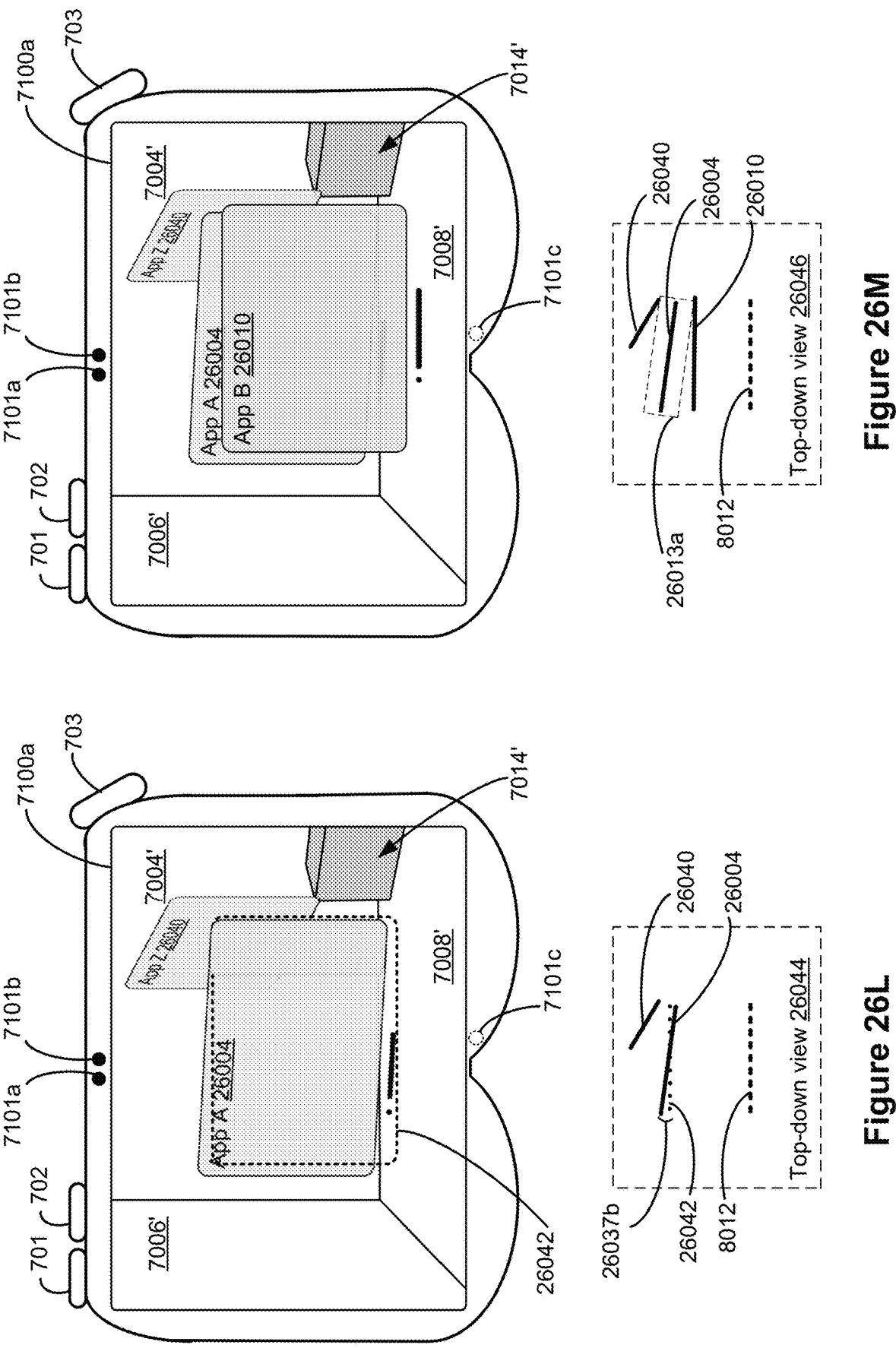

FIG. 26L illustrates a scenario in which two application user interfaces-application user interface 26004 of Application A and application user interface 26040 of Application Z—are already displayed in the viewport of the three-dimensional environment when a user input corresponding to a request for displaying application user interface 26010 is detected at computer system 101. In FIG. 26L, frame 26042 indicates a boundary of application user interface 26010 launching at the respective location in the viewport of the three-dimensional environment relative to home menu user interface 8012 in response to computer system 101 detecting the user input corresponding to a request for displaying application user interface 26010. Top-down view 26044 shows application user interface 26004 intersecting and making angle 26037b with frame 26042, indicating that if application user interface 26010 were displayed at the position of frame 26042, application user interface 26010 would intersect application user interface 26004. In accordance with a determination that application user interface 26004 is tilted by less than a threshold amount (e.g., angle 26037b is less than a threshold angle, and/or the threshold angle is at least 5°, at least 8°, or another value) with respect to frame 26042, application user interface 26010 is displayed with an offset along the depth dimension as shown in FIG. 26M, at or beyond a boundary of zone 26013a around application user interface 26004 (e.g., analogous to zones 26011a and 26021a described in reference to FIGS. 26E and 26I), such that no application user interface is displayed within zone 26013a. Optionally, zone 26013a is rotated with respect to application user interface 26010, as shown in FIG. 26M in the viewport via display generation component 7100a and in top-down view 26046.

In the examples of FIGS. 26L and 26M, application user interface 26040 is tilted by greater than a threshold amount with respect to a surface of application user interface 26010. In some embodiments, because (and optionally in accordance with a determination that) prior to application user interface 26010 being displayed, application user interface 26040 is not the application user interface that is closest to the viewpoint of the user, computer system 101 does not consider the position and angle (e.g., orientation) of application user interface 26040 in determining where to display application user interface 26010 (e.g., computer system 101 forgoes comparing an angle between application user interface 26040 and frame 26042 (e.g., as shown in the example of FIG. 26L). More generally, computer system 101 places the application user interface that is to be displayed by taking into account an application user interface that is closest to a respective viewpoint of the user (e.g., and closest to the intended position of the application user interface that is to be displayed in the viewport).

Figures 26N, 26O:
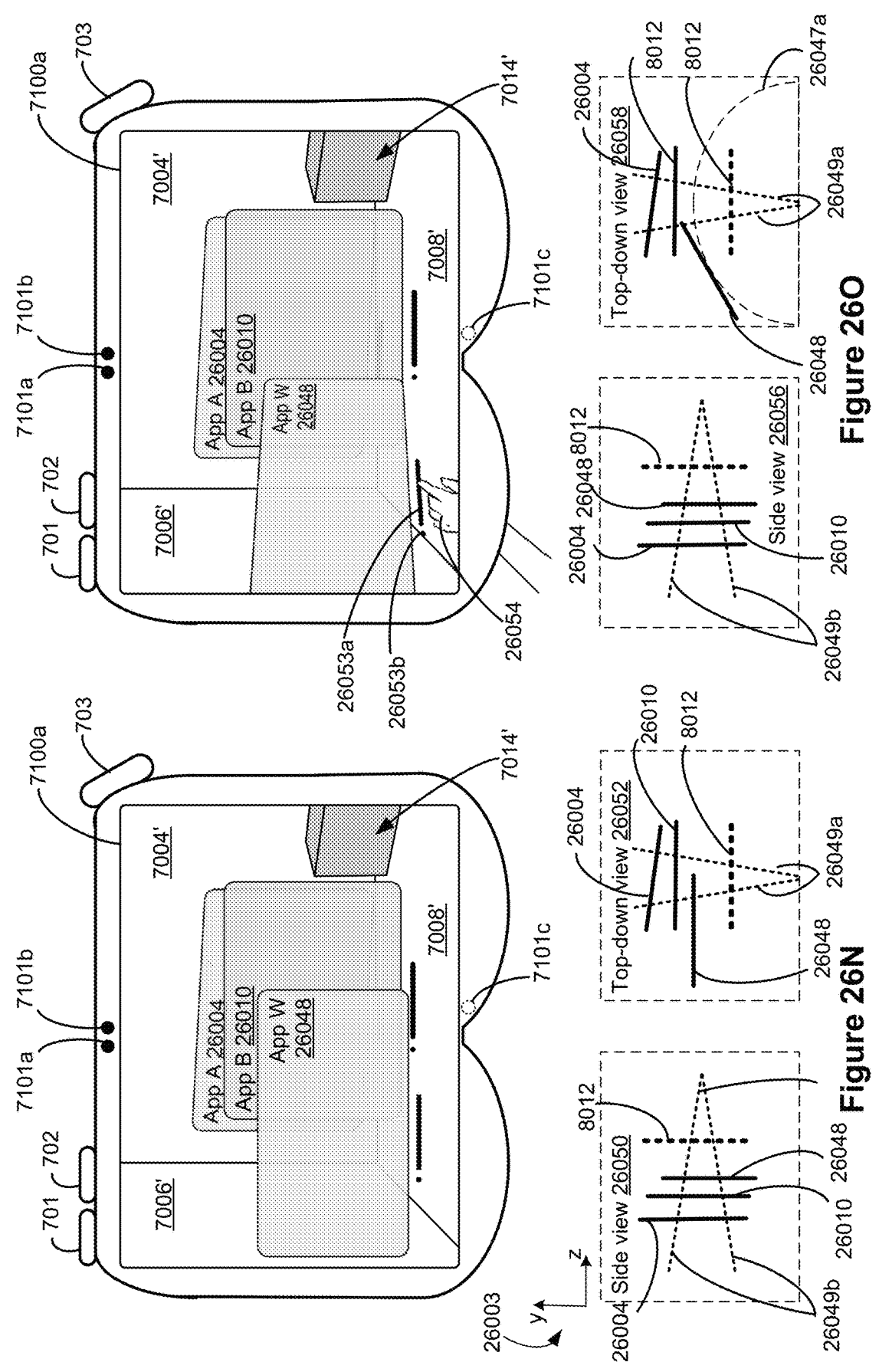
Figure 26P:
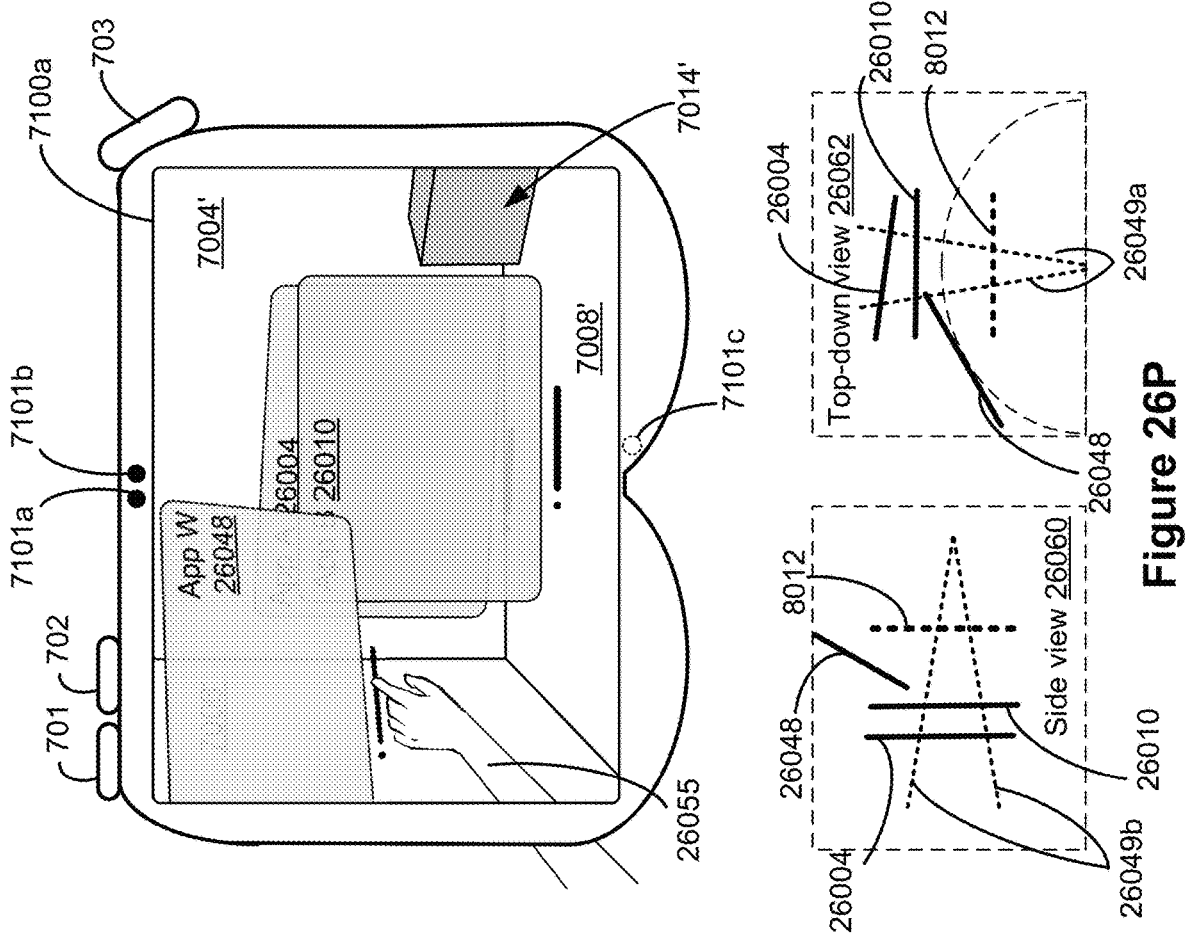
Figures 26Q, 26R:
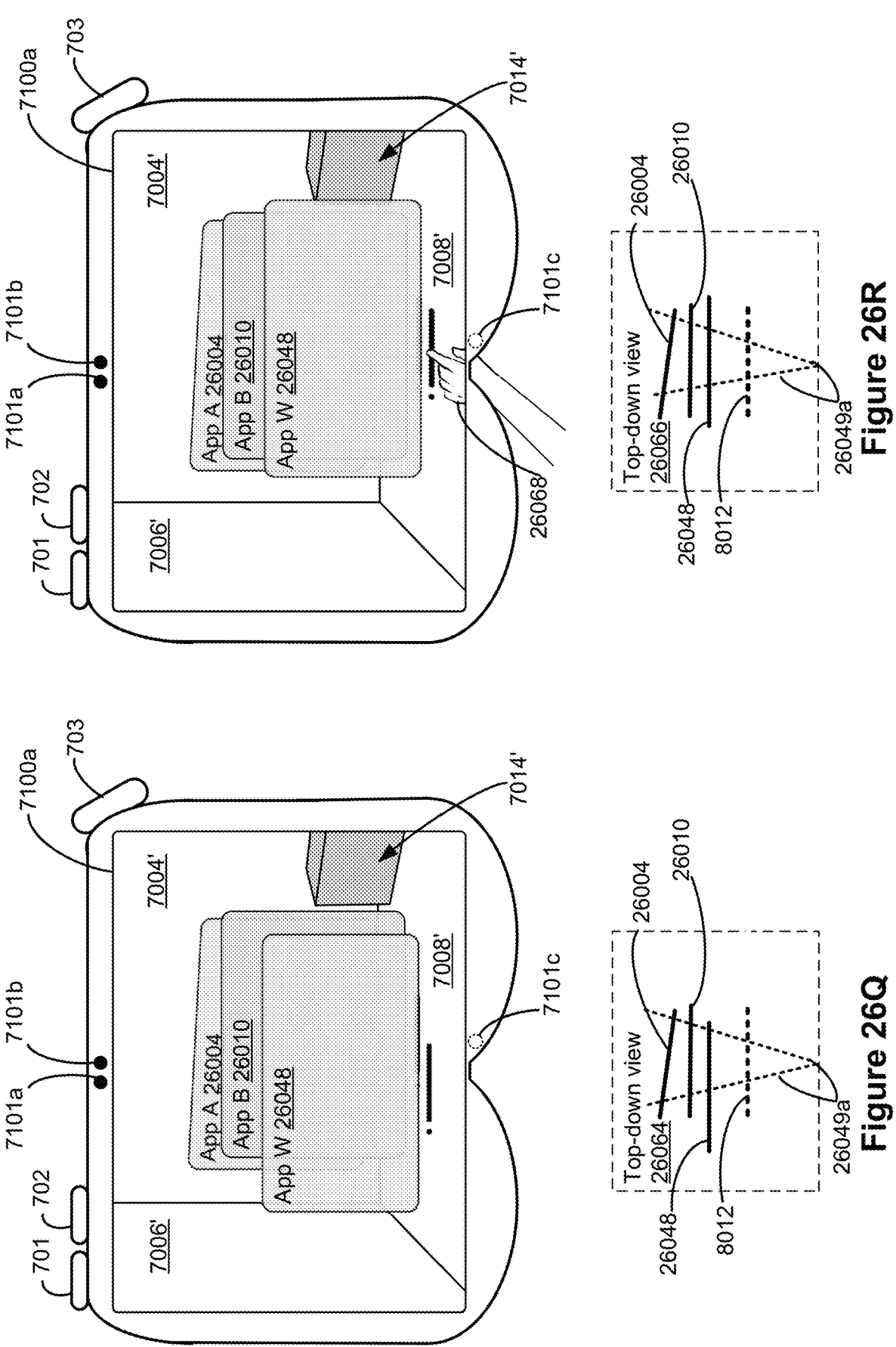

FIGS. 26N-26R show various behaviors of an application user interface in response to a user's input to select the application user interface, based on the location of the application user interface in the viewport of the three-dimensional environment. FIG. 26N is similar to FIG. 26M in the placement of application user interface 26004 and application user interface 26010. Instead of application user interface 26040, application user interface 26048 is displayed in the viewport shown in FIG. 26N, and is positioned closest to the viewpoint of the user, and parallel to a surface of home menu user interface 8012. Because application user interface 26048 is larger in at least one dimension (e.g., a width dimension, or a different dimension) than application user interface 26010 (e.g., the most recently displayed application user interface before application user interface 26048), application user interface 26048 is displayed in a laterally offset position, optionally based on the methods described in reference to FIGS. 26E-26I, that allows at least a threshold amount of application user interface 26010 to be visible from the viewpoint of the user.

In FIG. 26N, top-down view 26052 shows a characteristic portion (e.g., a central portion, a middle portion, or a different portion) along the lateral dimension of the viewport, demarcated by a pair of dotted lines 26049a. In some embodiments, an angle between the pair of dotted lines 26049a ranges from zero when the pair of dotted lines overlaps to an angle of 3°, 5°, 10°, or other angles. Side view 26050 shows respective heights and height positions of application user interface 26004, application user interface 26010, and application user interface 26048 in the viewport. A pair of lines 26049b in side view 26050 spanning the height dimension demarcates a characteristic portion of the viewport along the height dimension. Coordinate diagram 26003 indicating the coordinate system of the three-dimensional environment for side view 26050, and all other side views in FIGS. 26O-26P includes the y-axis (e.g., height-dimension, and/or an altitudinal direction) extending upwards while the z-axis extends to the right. The height dimension (e.g., or y-direction, and/or an altitude angle direction) extends up and down the viewports shown in FIGS. 26B-26R.

In FIG. 26O, in response to detecting user input 26054 that corresponds to selecting application user interface 26048, the computer system 101 tilts a plane of application user interface 26048 toward the viewpoint of the user, because application user interface 26048 (or a characteristic portion, such as a center, corner, midpoint of an edge, or other portion of application user interface 26048) is outside of (e.g., to the left of) the characteristic portion of the viewport in the lateral dimension as demarcated by the pair of dotted lines 26049a. In top-down view 26058, application user interface 26048 is tilted in such a way that a surface of application user interface 26048 is tangential to a curved or semi-spherical surface 26047a representing a respective (e.g., cylindrical or spherical) coordinate system centered around a portion of user 7002's body. For example, in FIG. 26O, a left portion of application user interface 26048 is moved more along the depth dimension toward the viewpoint of the user compared to a right portion of application user interface 26048. Side view 26056 shows that heights of the respective application user interfaces are not changed in response to user input 26054. Because application user interface 26048 is within the characteristic portion of the viewport along the height dimension as demarcated by the pair of lines 26049b, application user interface 26048 is not angled vertically. In some embodiments, the user input 26054 includes a user input directed at an auxiliary user interface element 26053a displayed at a lower periphery of application user interface 26048, such as a grabber (e.g., which can be used to reposition the application user interface 26048, and/or perform other manipulation of application user interface 26048). Another auxiliary user interface element 26053b, such as a close affordance (e.g., for closing or hiding application user interface 26048), is displayed close to and/or collinear to auxiliary user interface element 26053a.

In some embodiments, as the example in FIG. 26P shows, user input 26054 is followed by (or includes a subsequent portion that is) a subsequent movement input 26055 that corresponds to a request to reposition application user interface 26048 in the three-dimensional environment. In response to detecting movement input 26055, application user interface 26048 is repositioned higher in the viewport to a different vertical coordinate. In accordance with a determination that the higher position of application user interface 26048 is outside the characteristic portion of the viewport along the height dimension (as shown in side view 26060), computer system 101 tilts a surface of application user interface 26048 downwards toward a viewpoint of the user, such that a top portion of application user interface 26048 is moved more toward the viewpoint of the user along the depth dimension compared to a bottom portion of application user interface 26048. Top-down view 26062 shows that the lateral tilting of application user interface 26048 is unchanged from that shown in top-down view 26058 in FIG. 26O (e.g., due to application user interface 26048 continuing to be positioned at a same lateral coordinate outside of the characteristic portion of the viewport in the lateral dimension).

FIGS. 26Q-26R are similar to FIGS. 26N-26O except that application user interface 26048 (or the characteristic portion of application user interface 26048) in FIG. 26Q is displayed within the characteristic portion of the viewport demarcated by the pair of dotted lines 26049a, as shown in top-down view 26064. In FIG. 26R, in response to detecting user input 26068 that includes both a selection input and a movement input, computer system 101 displays application user interface 26048 in an updated position that is shifted laterally toward a right side of the viewport while a plane of application user interface 26048 remains parallel to home menu user interface 8012 as shown in FIG. 26R because, during the illustrated portion of user input 26068, application user interface 26048 (or the characteristic portion of application user interface 26048) is maintained within the characteristic portion of the viewport demarcated by the pair of dotted lines 26049a.

Additional descriptions regarding FIGS. 26A-26R are provided below in reference to method 27000 described with respect to FIGS. 26A-26R.

FIG. 27 is a flow diagram of an exemplary method 27000 for placing an application user interface in a viewport of a three-dimensional environment based on the presence of one or more other application user interfaces in the viewport and/or a position of the application user interface within the viewport, in accordance with some embodiments. In some embodiments, method 27000 is performed at a computer system (e.g., computer system 101 in FIG. 1A) that is in communication with a display generation component (e.g., display generation component 120 in FIGS. 1A, 3, and 4 or display generation component 7100 in FIG. 7A) (e.g., a heads-up display, a head-mounted device, a display, a touch-screen, a projector, or the like) and one or more input devices (e.g., one or more cameras (e.g., color sensors, infrared sensors, structured light scanners, and/or other depth-sensing cameras) that point downward at a user's hand, forward from the user's head, and/or that face the user; eye-tracking devices; user-held and/or user-worn controllers; a button; a dial; a rotatable input element; a switch; a moveable hardware input device; and/or other input hardware). In some embodiments, the method 27000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 27000 are, optionally, combined and/or the order of some operations is, optionally, changed.

The computer system displays (27002), in a viewport of a three-dimensional environment, a first application user interface at a respective location for the first application user interface that is at a respective depth position for the first application user interface (e.g., a respective distance along a depth dimension from a viewpoint of a user) (e.g., application user interface 26004 is displayed in the viewport of the three-dimensional environment (FIGS. 26C-26J)).

The computer system detects (27004) a first input corresponding to a request to display a second application user interface in the viewport of the three-dimensional environment (e.g., a request to display a user interface of an application from a home menu user interface, a request to display a user interface of an application from another application user interface, or a verbal request to a display user interface of an application) (e.g., a first input directed to home menu user interface 8012 (FIGS. 26D and 26F), user input 9202 directed to notification message 9204 (FIG. 9K), or user input 19034 directed to user interface 18004 that corresponds to a request to display user interface 18016 (FIGS. 19M-19N)).

In response to detecting the first input corresponding to the request to display the second application user interface (27006), the computer system displays (27008) the second application user interface at a respective location for the second application user interface that is at a respective depth position for the second application user interface (e.g., a respective distance along the depth dimension from the viewpoint of the user in the viewport of the three-dimensional environment), (e.g., application user interface 26010 is displayed in the viewport of the three-dimensional environment (FIG. 26E), application user interface 26020 is displayed in the viewport of the three-dimensional environment (FIG. 26H), or application user interface 26024 is displayed in the viewport of the three-dimensional environment (FIG. 26I)).

In accordance with a determination that the first application user interface is at a first location for the first application user interface with a first depth position for the first application user interface, the respective location for the second application user interface is (27012) at a first depth position for the second application user interface. In some embodiments, the first depth position for the second application user interface is different from the first depth position for the first application user interface (e.g., application user interface 26010 has a different depth position from the depth position of application user interface 26004 in FIG. 26E, application user interface 26020 has a different depth position from the depth position of application user interface 26004 in FIG. 26H). In some embodiments, the first depth position for the second application user interface is the same as the first depth position for the first application user interface (e.g., application user interface 26010 has the same depth position as the depth position of application user interface 26004 in FIG. 26K).

In accordance with a determination that the first application user interface is at a second location for the first application user interface with a second depth position for the first application user interface that is different from the first depth position for the first application user interface, the respective location for the second application user interface is (27014) at a second depth position for the second application user interface, different from the first depth position for the second application user interface. In some embodiments, the second depth position for the second application user interface is different from the second depth position for the first application user interface. (e.g., application user interface 26004 is at a second depth position for application user interface 26004 in the viewport of FIG. 26M that is different from the first depth position for application user interface 26004 in the viewport of FIG. 26C, and application user interface 26010 is at a second depth position for application user interface 26010 in the viewport of FIG. 26M that is different from the first depth position for application user interface 26010 in the viewport of FIG. 26E). In some embodiments, the second depth position for the second application user interface is the same as the second depth position for the first application user interface (e.g., application user interface 26004 is at a second depth position for application user interface 26004 in the viewport of FIG. 26K that is different from the first depth position for application user interface 26004 in the viewport of FIG. 26C, and application user interface 26010 is at a second depth position for application user interface 26010 in the viewport of FIG. 26K that is different from the first depth position for application user interface 26010 in the viewport of FIG. 26E and is the same as the second depth position for the application user interface 26010 in FIG. 26K).

Displaying a second application user interface at a respective depth position that depends on a depth position of a first application user interface allows the second application user interface to be placed at an ergonomic depth position, while allowing at least a portion of the first application user interface to be visible concurrently with the second application user interface, thereby reducing an amount of time needed to perform a respective operation on the computer system. Displaying the second application user interface at the respective depth position that accounts for the depth position of the first application user interface while maintaining the depth position of the first application user interface also reduces a user's risk of motion sickness by forgoing changing the depth position of the first application user interface.

In some embodiments, detecting the first input corresponding to the request to display the second application user interface includes detecting a user input (e.g., gaze input, pinch input, or tap input) directed to a representation of an application associated with the second application user interface displayed in a home menu user interface. For example, as described herein with reference to FIGS. 9A and 9B, in response to detecting user input 9002 directed to representation 8026 displayed in home menu user interface 8012 corresponding to the request to display application user interface 9004, computer system 101 displays application user interface 9004. As another example, in FIG. 26D, in response to detecting user input directed to representation 7114 displayed in home menu user interface 8012 corresponding to the request to display application user interface 26010, computer system 101 displays application user interface 26010 in FIG. 26E. Displaying a home menu user interface that includes a collection of selectable representations of different applications from which the second application user interface can be launched allows easier access to an application of interest, thereby reducing an amount of time needed to perform a respective operation on the computer system.

In some embodiments, the respective depth position for the second application user interface is selected so as to be different from a respective threshold depth position (e.g., at which application user interfaces are not to be displayed). In some embodiments, the respective threshold distance along the depth dimension is reserved for display of one or more system user interfaces, such as a home menu user interface. For example, as described herein with reference to FIG. 26J, the seven user application interfaces-application user interface 26004, application user interface 26010, application user interface 26024, application user interface 26028, application user interface 26030, application user interface 26032, and application user interface 26034—are displayed at respective depth positions that do not conflict with a respective threshold depth position associated with home menu user interface 8012. Selecting a depth position for the second application user interface that avoids conflicting with a respective threshold depth position allows the second application user interface to be placed at a depth position that is ergonomic. Displaying the second application user interface at the respective depth position that does not conflict with the respective threshold depth position also allows various content to be updated or displayed at the respective threshold depth position, without having to change the respective depth position of the second application user interface, reducing the risk of a user experiencing motion sickness.

In some embodiments, the respective threshold depth position is based on (e.g., is the distance of, or is determined relative to) a depth position of a home menu user interface associated with a viewpoint of a user. In some embodiments, the home menu user interface is displayed when the first input is detected. In some embodiments, the home menu user interface is not (e.g., is no longer) displayed when the first input is detected. In some embodiments, the depth position of the home menu user interface associated with the viewpoint of the user is a location where the home menu user interface would be displayed if invoked, and/or where home menu user interface was last displayed. For example, as described herein with reference to FIGS. 26C-26J, the respective threshold depth position is associated with a depth position of home menu user interface 8012. Displaying the second application user interface at the respective depth position that does not conflict with a respective threshold depth position allows content to be updated or displayed at the respective threshold depth position (e.g., a home menu user interface that, when invoked, is displayed or redisplayed at a consistent depth position) without having to change the respective depth position of the second application user interface, reducing the risk of a user experiencing motion sickness.

In some embodiments, the computer system detects a second input corresponding to a request to display a third application user interface in the viewport of the three-dimensional environment; and, in response to detecting the second input corresponding to the request to display the third application user interface, displays the third application user interface at a respective location for the third application user interface with a first depth position for the third application user interface, wherein the first depth position for the third application user interface is between the first depth position for the second application user interface and the respective threshold depth position (e.g., the third application user interface is closer to the viewpoint of the user than the second application user interface and further from the viewpoint of the user than the home menu user interface, a spacing between respective pairs of application user interface becomes progressively smaller the closer the application user interface is to the threshold depth position). For example, as described herein with reference to FIG. 26J, seven sequentially displayed user application interfaces- application user interface 26004, application user interface 26010, application user interface 26024, application user interface 26028, application user interface 26030, application user interface 26032, and application user interface 26034—are displayed at respective depth positions between a respective last displayed application user interface and the respective threshold depth position associated with home menu user interface 8012. Stacking subsequently launched application user interfaces at respective depth positions in a portion of the viewport between the most recently displayed application user interface and the threshold depth position allows the subsequently launched application user interfaces to be placed at respective depth positions that are ergonomic, while reducing a user's risk of motion sickness by forgoing changing respective depth positions of application user interfaces already displayed in the viewport.

In some embodiments, in accordance with a determination that an angle between a surface associated with the first application user interface and a surface associated with the second application user interface is larger than a threshold angle, the respective depth position for the second application user interface is the same as the respective depth position for the first application user interface. In some embodiments, in accordance with a determination that the angle between the surface associated with the first application user interface and the surface associated with the second application user interface is smaller than the threshold angle, the respective depth position for the second application user interface is different from the respective depth position for the first application user interface (e.g., the respective depth position for the second application user interface is offset from the respective depth position for the first application user interface such that the second application user interface is separated from the first application user interface along the depth dimension). For example, as described herein with reference to FIG. 26K, in accordance with a determination that angle 26037a between a surface associated with application user interface 26004 and a surface associated with application user interface 26010 is larger than a threshold angle, application user interface 26010 is displayed at a location in FIG. 26K without offset along the depth dimension from application user interface 26004 as described with respect to zones 26011a and 26021a in FIGS. 261 and 26J. In contrast, as described in reference to FIGS. 26L-26M, in accordance with a determination that already-displayed application user interface 26004 is angled by less than the threshold amount, newly displayed application user interface 26010 is displayed with offset along the depth dimension from application user interface 26004. Forgoing spacing the depth position of the second application user interface from a first application user interface when the first application user interface is tilted by more than a threshold amount allows the second application user interface to be placed at a respective depth position that is ergonomic, in contrast to the greater depth position offset for the second application user interface that would be required to avoid conflict with a more tilted first application user interface.

In some embodiments, the first application user interface is closer to a viewpoint of a user along a depth dimension than a fourth application user interface (and in some embodiments, any other application user interface) displayed in the viewport of the three-dimensional environment, and the method includes displaying the second application user interface at the respective location independently of (e.g., without regard to or ignoring) the fourth application user interface. In some embodiments, in accordance with a determination that the fourth application user interface is farther from the viewpoint of the user than the first application user interface, the fourth application user interface is disregarded in determining where to display the second application user interface (e.g., the computer system forgoes determining an angle between a surface associated with the fourth application user interface and the surface of the second application user interface). For example, as described herein with reference to FIGS. 26L-26M, prior to application user interface 26010 being displayed, application user interface 26040 is not the application user interface that is closest to the viewpoint of the user. As a result, computer system 101 does not consider the position and angle (e.g., orientation) of application user interface 26040 in determining where to display application user interface 26010 (e.g., computer system 101 forgoes comparing an angle between application user interface 26040 and frame 26042 (e.g., as shown in the example of FIG. 26L). Displaying the second application user interface at the depth position without taking into account application user interfaces that are not the closest to the depth position of the second application user interface reduces an amount of time needed to display the second application user interface in a viewport of the three-dimensional environment.

In some embodiments, in accordance with a determination that the second application user interface displayed at the respective location for the second application user interface intersects the first application user interface displayed at the respective location for first second application user interface, the computer system reduces a visual emphasis (e.g., reducing a brightness, contrast, saturation, and/or opacity) of a respective portion of the first application user interface that is closer to a viewpoint of the user than a corresponding respective portion of the second application user interface that would be obscured by the respective portion of the first application user interface. For example, as described herein with reference to FIG. 26K, application user interface 26010 intersects application user interface 26004. Application user interface 26010 is given visual prominence, because application user interface 26010 is newly displayed and has focus, and accordingly portion 26039a of application user interface 26010 is displayed "breaking through" portion 26035c of application user interface 26004, so that application user interface 26010 is visible to the user as having a continuous surface, even though portion 26039a of application user interface 26010 is further away from the user than, and thus would be occluded by, portion 26035c of application user interface 26004. Reducing the visual emphasis of a portion of a first application that would obscure a portion of a second application user interface allows content displayed on the second application user interface to be visible to the user, thereby reducing an amount of time needed to perform a respective operation on the computer system.

In some embodiments, displaying the second application user interface at the respective location for the second application user interface includes displaying the second application user interface with an orientation selected so that a plane of the second application user interface is parallel to a plane of a home menu user interface associated with a viewpoint of a user (e.g., wherein displaying the second application user interface at the second location includes displaying a plane of the second application user interface parallel to a plane of the most recently displayed home menu user interface and/or parallel to a plane of the home menu user interface when the home menu user interface is subsequently invoked from the same current viewpoint of the user). For example, as described herein with reference to FIG. 26C and top-down view 26006, a surface of application user interface 26004 (e.g., the plane in which application user interface 26004 is displayed) is parallel to a surface of home menu user interface 8012 (e.g., the plane in which home menu user interface 8012 is or was displayed) at the previous location of home menu user interface 8012 as depicted in FIG. 26B. Displaying the second application user interface to be parallel to a plane of a home menu user interface allows a user to more easily view content displayed in the second application user interface without having to adjust the viewport, reducing an amount of time needed to perform a respective operation on the computer system.

In some embodiments, while displaying the second application user interface with the plane of the second application user interface parallel to the plane of the home menu user interface, the computer system detects a user selection of the second application user interface (e.g., to initiate moving the second application user interface). In some embodiments, in response to detecting the user selection of the second application user interface: in accordance with a determination that the second application user interface is displayed beyond a threshold distance (e.g., angular distance) from a respective portion of the viewport (e.g., a respective location in the viewport, such as a center of the viewport or other location that is directly forward from the viewpoint of the user, or a region of the viewport that includes a threshold range of locations relative to the respective location), the computer system changes an orientation of the second application user interface so that the second application user interface is tilted toward the viewpoint of the user (e.g., animating a change in orientation or redisplaying the second application user interface at a changed orientation) (e.g., tilted to the right by moving the left edge of the second application user interface toward the viewpoint of the user if the second application user interface is sufficiently to the left of the characteristic portion of the viewport, or tilted to the left by moving the right edge toward the viewpoint of the user if the second application user interface is sufficiently to the right of the characteristic portion; and/or tilted downward by moving the top edge toward the viewpoint of the user if the second application user interface is sufficiently above the characteristic portion, or tilted upward by moving the bottom edge toward the viewpoint of the user if the second application user interface is sufficiently below the characteristic portion).

In some embodiments, the characteristic portion of the viewpoint includes a respective coordinate location in the viewport in a first dimension, such that the threshold distance in the first dimension is zero (e.g., the second application user interface is tilted toward the viewpoint of the user whenever the second application user interface is not at a particular lateral coordinate within the viewport (e.g., along an x-axis)). In some embodiments, the characteristic portion of the viewpoint includes a threshold range of coordinate locations in the viewport in a second dimension (e.g., the second application user interface remains parallel to the plane of the home menu user interface while the second application user interface is within the threshold range of coordinate locations and is tilted toward the viewpoint of the user whenever the second application user interface is above the threshold range of coordinate locations).

For example, as described herein with reference to FIG. 26O-26P, in response to detecting user input 26054 that corresponds to selecting application user interface 26048 and movement input 26055 that corresponds to repositioning application user interface 26048, the computer system 101 tilts a plane of application user interface 26048 toward the viewpoint of the user, because application user interface 26048 (or a characteristic portion, such as a center, corner, midpoint of an edge, or other portion of application user interface 26048) is outside of (e.g., to the left of and/or above) the characteristic portion of the viewport in the lateral dimension as demarcated by the pair of dotted lines 26049a and/or the pair of dotted lines 26049b. Tilting the second application user interface toward the viewpoint of the user in response to detecting a user selection of the second application user interface automatically adjusts the second application user interface to an orientation that facilitates a user's view of the content displayed in the second application user interface without any additional user input.

In some embodiments, in response to detecting the user selection of the respective second application user interface: in accordance with a determination that the second application user interface is displayed within the threshold distance from the respective portion of the viewpoint of the user, the computer system maintains display of (e.g., continuing to display) the second application user interface parallel to the plane of the home menu user interface (e.g., without tilting the respective user interface toward the viewpoint of the user). For example, as described herein with reference to FIGS. 26Q-26R, application user interface 26048 (or the characteristic portion of application user interface 26048) is displayed within the characteristic portion of the viewport demarcated by the pair of dotted lines 26049a, as shown in top-down view 26064, and, in response to detecting user input 26068 that includes both a selection input and a movement input, computer system 101 displays application user interface 26048 in an updated position while a plane of application user interface 26048 remains parallel to home menu user interface 8012 as shown in FIG. 26R because, during the illustrated portion of user input 26068, application user interface 26048 (or the characteristic portion of application user interface 26048) is maintained within the characteristic portion of the viewport demarcated by the pair of dotted lines 26049a (e.g., as well as between the characteristic portion, vertically, of the viewport demarcated by the pair of dotted lines 26049b in side view 26050 of FIG. 26N). Forgoing tilting the second application user interface toward the viewpoint of the user in response to detecting a user selection of the second application user interface when the second application user interface is less than a threshold distance from the user's viewpoint reduces an amount of time needed to perform a respective operation on the computer system.

In some embodiments, displaying the second application user interface at the respective location for the second application user interface includes laterally offsetting a respective portion (e.g., a central portion, a corner portion, or an edge portion) of the second application user interface from a respective portion (e.g., a central portion, a corner portion, or an edge portion) of the first application user interface. For example, as described herein with reference to FIG. 26H, displaying application user interface 26020 of Application C at the position of frame 26014*b* (FIG. 26G) allows a left portion of application user interface 26004 to remain visible to the user, so in FIG. 26H, application user interface 26020 is centered at dot 26016*c* in phyllotaxis spiral pattern 26016*a*, with dot 26016*c* being offset from highlighted dot 26016*b* (e.g., at which application user interface 26004 is centered) along both a lateral dimension and a height dimension (e.g., dot 26016*c* is to the right of and higher than dot 26016*b*). Displaying the second application user interface that is laterally or vertically offset from the first application user interface allows at least a portion of the first application user interface to be visible concurrently with the second application user interface, thereby reducing an amount of time needed to perform a respective operation on the computer system.

In some embodiments, while displaying the second application user interface at the respective location for the second application user interface at which the respective portion of the second application user interface is laterally offset from the respective portion of the first application user interface, an unobscured portion of the first application user interface is visible in the viewport of the three-dimensional environment (e.g., the location for the second application user interface is optionally selected so that the unobscured portion of the first application user interface has a minimum threshold size (e.g., to enable the user to more easily interact with the first application user interface)). For example, as described herein with reference to FIGS. 26G-26H, in accordance with a determination that displaying application user interface 26020 at the position of frame 26014*b* would allow a left portion of application user interface 26004 to remain visible to the user, computer system 101 displays application user interface 26020 at the position shown in FIG. 26H. Selecting a placement location for the second application user interface allows at least a portion of a previously displayed application user interface to be visible concurrently with the second application user interface, thereby reducing an amount of time needed to perform a respective operation on the computer system.

In some embodiments, laterally offsetting the respective portion of the second application user interface from the respective portion of the first application user interface includes: displaying the second application user interface such that the respective portion of the second application user interface is centered at a respective position (e.g., where the respective position is offset from the center of the spiral pattern) for the respective portion of the second application user interface from a plurality of candidate positions in a spiral pattern (e.g., centered on a location of a home menu user interface). For example, as described herein with reference to FIGS. 26G and 26I, computer system 101 traverses respective locations within phyllotaxis spiral pattern 26016*a* to determine a location for positioning a characteristic portion of application user interface 26020 in a way that allows the threshold amount of application user interface 26004 to remain visible to the user in the viewport of the three-dimensional environment, and to determine a location for position a characteristic portion of application user interface 26024 in a way that allows the threshold amount of application user interface 26020 to remain visible. Searching for a placement location of the second application user interface in a spiral pattern allows a suitable placement location to be more quickly identified due to the efficiency in exploring a given spatial region using candidate positions that are arranged in a spiral pattern, allowing the second application user interface to be more quickly displayed at the placement location that also allows a threshold amount of the first application user interface to remain visible to the user.

In some embodiments, laterally offsetting the respective portion of the second application user interface from the respective portion of the first application user interface includes: in accordance with a determination that displaying the respective portion of the second application user interface centered at a first position of a respective set of positions (e.g., arranged in a respective pattern) would result in less than a threshold amount of overlap between the second application user interface and the first application user interface, displaying the second application user interface such that the respective portion of the second application user interface is centered at the first position. In some embodiments, laterally offsetting the respective portion of the second application user interface from the respective portion of the first application user interface includes: in accordance with a determination that displaying the respective portion of the second application user interface centered at the first position would result in more than the threshold amount of overlap between the second application user interface and the first application user interface and that displaying the respective portion of the second application user interface centered at a second position of the respective set of positions would result in less than the threshold amount of overlap between the second application user interface and the first application user interface (e.g., and there are not other positions earlier in a respective order for which the respective portion of the second application user interface centered at the respective position of the respective set of positions would result in less than the threshold amount of overlap between the second application user interface and the first application user interface, and/or the respective order includes a candidate position closest to a center portion of the respective set of positions that is checked prior to all other positions within the respective set of positions, and/or a first group of candidate positions having a first radius from the center portion of the respective set of position is checked prior to a second group of candidate positions having a second radius from the center portion that is larger than the first radius), displaying the second application user interface such that the respective portion of the second application user interface is centered at the second position. In some embodiments, laterally offsetting the respective portion of the second application user interface from the respective portion of the first application user interface includes: in accordance with a determination that displaying the respective portion of the second application user interface centered at any of the first position and the second position would result in more than the threshold amount of overlap between the second application user interface and the first application user interface and that displaying the respective portion of the second application user interface centered at a third position of the respective set of positions would result in less than the threshold amount of overlap between the second application user interface and the first application user interface (e.g., and there are not other positions earlier in the respective order for which the respective portion of the second application user interface centered at the respective position of the respective set of positions would result in less than the threshold amount of overlap between the second application user interface and the first application user interface), displaying the second application user interface such that the respective portion of the second application user interface is centered at the third position. In some embodiments, a direction from the first position to the second position is different from a direction from the second position to the third position (e.g., the first position, the second position, and the third position are not collinear).

For example, as described herein with reference to FIGS. 26G and 26H, computer system 101 selects the offset for positioning application user interface 26020 by searching for a respective location from a predefined set of locations that lacks a consistent directional trend (e.g., in that successive pairs of candidate locations in phyllotaxis spiral 26016a being evaluated for placement of application user interface 26020 are offset in different directions relative to each other). Searching for a placement location of the second application user interface in a pattern that does not have a consistent directional trend allows a suitable placement location to be more quickly identified due to the efficiency in exploring a given spatial region using candidate positions that are arranged in a pattern that does not have a consistent directional trend, allowing the second application user interface to be more quickly displayed at the placement location that also allows a threshold amount of the first application user interface to remain visible to the user.

In some embodiments, displaying the second application user interface at the respective location for the second application user interface includes: in accordance with a determination that at least a threshold amount of the first application user interface is visible when the respective portion (e.g., central portion, corner portion, or edge portion) of the second application user interface is over the respective portion (e.g., central portion, corner portion, or edge portion) of the first application user interface (e.g., because the second application user interface is smaller than the first application user interface) (e.g., in one or more dimensions such as width, height, and/or thickness) (and optionally that displaying a central portion of the second application user interface over a respective portion of the first application user interface (e.g., laterally and vertically aligned, though optionally at different distances along the depth dimension) would result in more than a threshold amount of the first application user interface unobscured by the second application user interface and remaining visible in the viewport of the three-dimensional environment), displaying the respective portion of the second application user interface over the respective portion of the first application user interface (e.g., without laterally offsetting the respective portion of the second application user interface from the respective portion of the first application user interface). In some embodiments, displaying the second application user interface at the respective location for the second application user interface includes: in accordance with a determination that at less than the threshold amount of the first application user interface is visible when the respective portion of the second application user interface is over the respective portion of the first application user interface (e.g., because the second application user interface is not smaller than the first application user interface) (e.g., in one or more dimensions such as width, height, and/or thickness) (or that displaying the respective portion of the second application user interface over the respective portion of the first application user interface would result in less than the threshold amount of the first application user interface unobscured by the second application user interface and remaining visible in the viewport), laterally offsetting the respective portion of the second application user interface from the respective portion of the first application user interface.

For example, as described herein with reference to FIG. 26E, because a threshold amount of application user interface 26004 already displayed in the viewport would remain visible when application user interface 26010 is displayed in front of application user interface 26004 at the front edge of zone 26011a, a characteristic portion of application user interface 26010 is displayed in front of a corresponding characteristic portion of application user interface 26004, without a lateral offset or a height offset such that application user interface 26010 is centered, in an x-y plane, with respect to application user interface 26004. In another example, as described herein with reference to FIG. 26G, in accordance with a determination that application user interface 26020, if launched at the location corresponding to frame 26014a, would obscure more than a threshold amount of the application user interface 26004, computer system 101 displays application user interface 26020 with an offset along the height dimension and/or the lateral dimension, at the depth position indicated by line 26011d. Allowing the second application user interface to be displayed at a placement location without any lateral or vertical offset from the first application user interface when a threshold amount of the first application user interface remains visible reduces the amount of lateral and/or vertical readjustment of the user's gaze to view content displayed on the second application user interface while still enabling interaction with the first application user interface. When less than the threshold amount of the first application is visible, laterally and/or vertically offsetting the second application user interface allows at least a portion of the first application user interface to be visible concurrently with the second application user interface, thus making it easier to interact with the first application user interface, thereby reducing an amount of time needed to perform a respective operation on the computer system.

In some embodiments, aspects/operations of methods 12000, 13000, 14000, 15000, 16000, 17000, 22000, 23000, 24000, 25000, 27000, and 29000 may be interchanged, substituted, and/or added between these methods. For brevity, these details are not repeated here.

[CS13 UI Walkthrough] FIGS. 28A-28AI illustrate example techniques for reconfiguring a home menu user interface in an environment, such as a mixed-reality three-dimensional environment, in accordance with some embodiments. FIGS. 29A-29F are a flow diagram of an exemplary method 2900 for reconfiguring a home menu user interface in an environment, such as a mixed-reality three-dimensional environment, in accordance with some embodiments. The user interfaces in FIGS. 28A-28AI are used to illustrate the processes described below, including the processes in FIGS. 29A-29F.

FIGS. 28A-28D illustrate a view of a three-dimensional environment 28100' that is visible to a user, such as user 7002 in FIG. 7A, via a display generation component of a computer system, such as display generation component 7100a of computer system 101, as described in further detail with reference to FIG. 7A. The view of the three-dimensional environment 28100' (also called view 28100' for ease of reference) of FIG. 28A includes a representation (e.g., a camera view or an optical view) of a portion of physical environment 7000 (e.g., similar to the three-dimensional environment 8003 described herein with reference to FIG. 7B). For example, view 28100' of FIG. 28A includes representations (e.g., camera or optical views) of wall 7004', wall 7006', floor 7008', and box 7014', as described herein with reference to FIGS. 7A-7B.

Figures 28C, 28D:
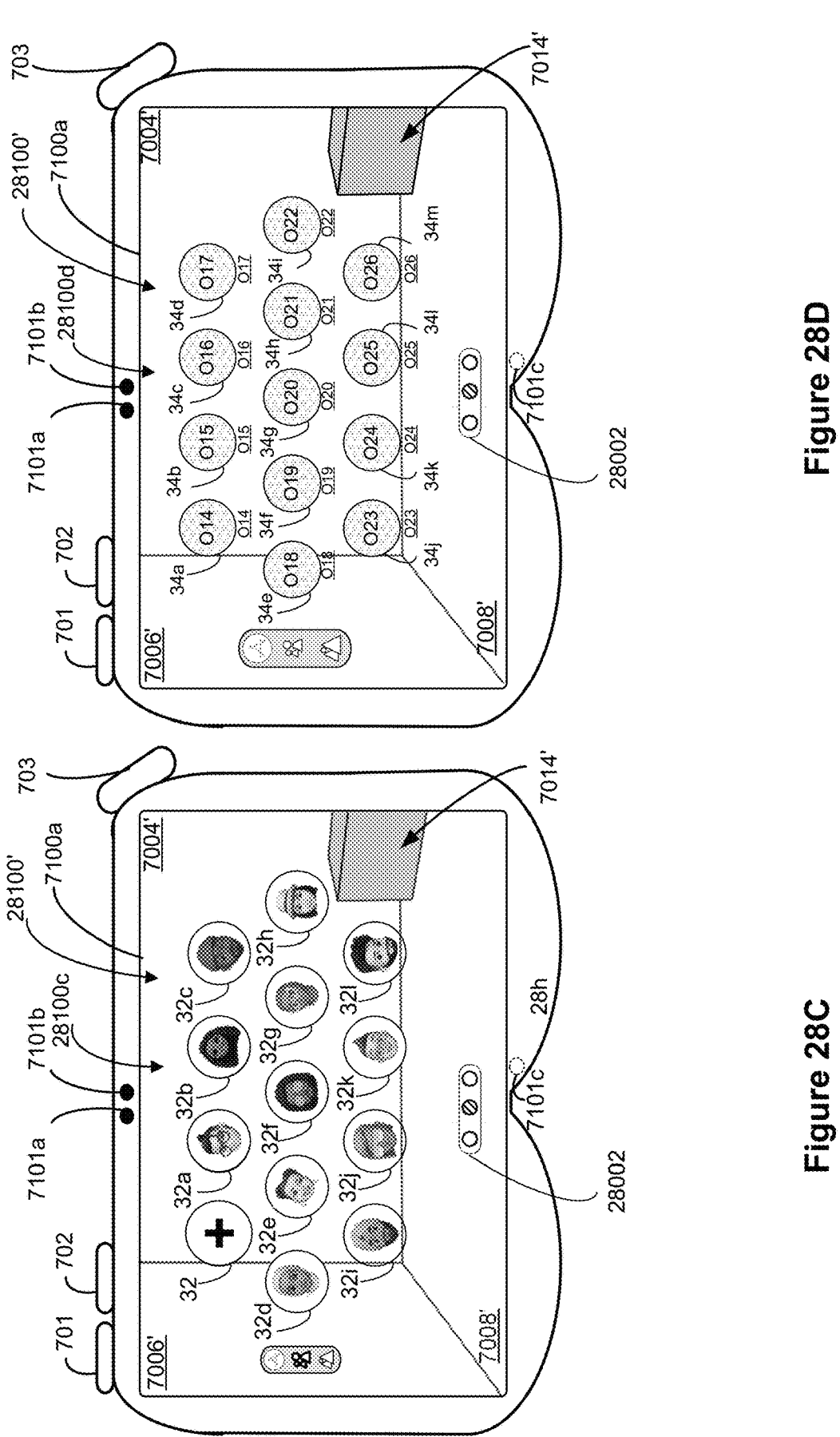

In addition to the representation (e.g., camera view or optical view) of the portion of physical environment 7000, view 28100' in FIG. 28A includes home menu user interface 28100a; view 28100' in FIG. 28B includes home menu user interface 28100b; view 28100' in FIG. 28C includes home menu user interface 28100c; and view 28100' in FIG. 28D includes home menu user interface 28100d. In some embodiments, a home menu user interface includes an arrangement of a collection of user interface objects optionally of the same object type. For example, home menu user interface 28100a in FIG. 28A includes an arrangement of a collection of application icons corresponding to software applications; home menu user interface 28100b in FIG. 28B includes an arrangement of a collection of virtual environment icons representing virtual environments that can be displayed (e.g., and in which a user can be immersed); and home menu user interface 28100c in FIG. 28C includes an arrangement of a collection of contact icons (e.g., representations of people or contacts with whom user 7002 can initiate or maintain a communication session).

In some embodiments, home menu user interfaces 28100a, 28100b, 28100c, and 28100d (also collectively referred to as 28100a-28100d) are similar to home menu user interface 8012 (e.g., described with reference to FIGS. 7A-7I; 8A-8J; 9A-9O; 18A-18G; 19A-19N), home user interface 1120 (described with reference to FIGS. 11A-11L), home user interface 20100 (described with reference to FIG. 20A-20X) and home user interface 21100 (described with reference to FIGS. 21A-21Y). In some embodiments, home menu user interfaces 28100a-28100d operate (and are optionally visually represented) in accordance with techniques described with reference to home user interface 1120, described in further detail with reference to FIGS. 11A-11L (e.g., specifically, applications can be launched via a pluck gesture directed toward an application icon in home menu user interface 21100 in accordance with techniques described with reference to home user interface 1120 in FIGS. 11A-11L and method 17000 of FIG. 17). In some embodiments, applications in home menu user interfaces 28100a-28100d are opened or launched in response to a pinch gesture (e.g., as opposed to a pluck gesture). Further, in some embodiments, home menu user interfaces 28100a-28100d are scrolled in accordance with the techniques described in FIGS. 7A-7I (e.g., with reference to home user interface 8012) and method 1200 of FIG. 12. In some embodiments, home menu user interfaces 28100a-28100d can be rearranged in accordance with the techniques described with reference to FIGS. 21A-21Y and method 25000 of FIG. 25.

In some embodiments, a home menu user interface (e.g., home menu user interface 28100a, home menu user interface 28100b, and home menu user interface 28100c, and home menu user interface 28100d) is a multi-section arrangement of a collection of user interface objects (e.g., optionally of the same type) that spans over more than one section (e.g., similar to home menu user interface 8012 as described in further detail above with reference to FIGS. 7A-7I). For example, home menu user interfaces 28100a-28100d each include multiple sections, in some embodiments. Similar to home user interface 8012, a total lateral dimension of the arrangement of a single collection (e.g., a collection of representations of applications or application icons) across multiple rows (e.g., three rows) exceeds a field of view of user 7002 that is visible via display generation component 7100a. In another example, the number of representations in a collection of representations exceeds the number of representations that make up or fit on a single page or section of the arrangement. In such cases, the collection of representations is divided into two or more sections (e.g., also referred to as sections), and the arrangement of the collection of user interface objects is displayed section-by-section (e.g., or page-by-page) to user 7002.

Similar to pagination indicator 7050 and page navigation element 21022, a section indicator object 28002 indicates both the total number of sections (sometimes referred to as pages) in a respective home menu user interface of home menu user interfaces 28100a-28100d and the position of a respective section, currently displayed in view 28100', in a sequence of sections of the respective home menu user interface. For example, in the scenario shown in FIGS. 28D-28AI, home menu user interface 28100d includes three sections or pages, each of the three sections indicated by a respective section indicator icon (e.g., a circle or dot) in section indicator object 28002, such as page indicator icon 28002a, page indicator icon 28002b, and page indicator icon 28002c. In the scenario of FIGS. 28A-28AI, the second page of home menu user interface is displayed in view 28100' and this is indicated by the page indicator icon 28002b (e.g., a filled circle indicates currently displayed page, whereas unfilled circles in the page navigation element 28002 illustrated remaining pages that are not currently displayed, such as section indicator icons 28002a and 28002c. In some embodiments, section indicator object 28002 is included in the currently displayed section of a home menu user interface and other sections (e.g., undisplayed sections or sections not in focus) of the home menu user interface. Optionally visibility of section indicator object 28002 is maintained when sections of home menu user interface 28100 are scrolled (e.g., in conjunction with indicating which section is currently active by changing the appearance of a respective page indicator icon). In some embodiments, section indicator object 28002 is displayed while a home user interface in the reconfiguration mode. In some embodiments, input directed to a respective section indicator icon of 28002a, 28002b, and 28002c, causes the computer system 100 to switch to a respective section corresponding to the selected section indicator icon. In some embodiments, other gestures directed to section indicator object 28002 cause the computer system 100 to switch from displaying one section to displaying another section of the home menu user interface (e.g., as an example of a multi-section arrangement of the collection of user interface objects). Although section indicator object 28002 is displayed at a bottom portion of home menu user interfaces 28100a-28100d, section indicator object 28002 may instead be positioned at a different portion (e.g., a top portion, or an edge portion) of home menu user interfaces 28100a-28100d.

Home menu user interface 28100a shown in FIG. 28A includes an arrangement of application icons (e.g., for launching or opening corresponding applications). For example, home menu user interface 28100a is multi-section arrangement of a collection of application icons (e.g., that includes three sections), and a subset of the collection of application icons that is included in the second section visible in view 28100' in FIG. 28A includes application icons 28a, 28b, 28c, 28d, 28c, 28f, 28g, 28h, 28i, 28j, 28k, 281 (also collectively referred to as application icons 28a-281), and folder icon 28m. Similar to the home screen user interface 8012, in some embodiments, application icons 28a-281 and folder icon 28m are arranged in a regular pattern (e.g., in a grid pattern, along a line, radially, circumferentially, and/or other patterns), as described in further detail with reference to FIGS. 7A-7I. In some embodiments, application icons 28a-28l correspond to various software applications that can be executed on computer system 101 (e.g., an email application, a web browser, a messaging application, a maps application, a video player, or an audio player, or other software application). In some embodiments, the sizes of application icons 28a-28l and folder icon 28m are the same (e.g., each having a size that is within a threshold variation such as ±1-5% of a respective size such as an average size of the application icon). In some embodiments, user input (e.g., a pinch input, a tap input, a gaze input, and/or other input) directed to one of application icons 28a-28l in home menu user interface 28100a launches a software application associated with the respective application icon. In some embodiments, application icon 28a, when selected, causes computer system 100 to open a TV application (as illustrated by the label "TV" below application icon 28a); application icon 28b, when selected, causes computer system 100 to open a music application (as illustrated by the label "Music" below application icon 28b); application icon 28c, when selected, causes computer system 100 to open a wellness application (as illustrated by the label "Wellness" below application icon 28c); application icon 28d, when selected, causes computer system 100 to open a calendar application (as illustrated by the label "Calendar" below application icon 28d); application icon 28e, when selected, causes computer system 100 to open a drawing application (as illustrated by the label "Drawing" below application icon 28c); application icon 28f, when selected, causes computer system 100 to open a browser application (as illustrated by the label "Browser" below application icon 28f); application icon 28g, when selected, causes computer system 100 to open a photos application (as illustrated by the label "Photos" below application icon 28g); application icon 28h, when selected, causes computer system 100 to open a settings application (as illustrated by the label "Settings" below application icon 28h); application icon 28i, when selected, causes computer system 100 to open an application store application (as illustrated by the label "App Store" below application icon 28i); application icon 28j, when selected, causes computer system 100 to open an email application (as illustrated by the label "Email" below application icon 28j); application icon 28k, when selected, causes computer system 100 to open a messages application (as illustrated by the label "Messages" below application icon 28k); application icon 28l, when selected, causes computer system 100 to open opening a recording application (as illustrated by the label "Recording" below application icon 28l); and folder icon 28m, when selected, causes computer system 100 to open a folder with additional application icons (as illustrated by the label "Apps" below folder icon 28m) in the collection of application icons. In some embodiments, folder icon 28m corresponds to folder 7150 as described with reference to FIG. 7A.

In FIG. 28B, home menu user interface 28100b visible in view 28100' includes a collection of icons corresponding to virtual environments (e.g., downloaded onto computer system 101). For example, home screen user interface 28100b includes an arrangement of virtual environment icons (e.g., each icon for opening a corresponding virtual environment). In some embodiments, home menu user interface 28100b is a system user interface for picking or selecting a virtual environment (e.g., environment picker user interface). Virtual environments, when activated or opened, cause the computer system 101 to display sound and visual effects that emulate an environment different from the physical one and reduce or eliminate visual and audible signals from the physical environment. Example environments can be immersive worlds of mountains, space, ocean, and/or various other environments. In some embodiments, the level of immersion in the virtual environments can be adjusted by a user. In some embodiments, home menu user interface 28100b is a multi-section arrangement of a collection of virtual environment icons (e.g., that includes three sections), and a subset of the collection of virtual environment icons that is included in the second section visible in view 28100' in FIG. 28B includes virtual environment icons 30a, 30b, 30c, 30d, 30c, 30f, 30g, 30h, 30i, 30j, 30k, 30l, and 30m (also collectively referred to as virtual environment icons 30a-30m). Similar to the home menu user interface 28100a, virtual environment icons 30a-30m are arranged in a regular pattern (e.g., in a grid pattern, along a line, radially, circumferentially, and/or other patterns). For example, in a gird of 4×5×4 (e.g., 4 icons in the top row, 5 icons in the middle row, and 4 icons in the bottom row, where the icons are in a zig zag arrangement, as illustrated in FIGS. 28A-28D with reference to home menu user interfaces 28100a-28100d, respectively). In some embodiments, a respective virtual environment icon of virtual environment icons 30a-30m, when selected, causes the computer system 100 to cease display or remove passthrough of the physical environment 7000 and display a virtual immersive environment corresponding to the selected virtual environment icon. In some embodiments, home menu user interface 28100b displays labels indicating the type of virtual environment under respective virtual environment icons 30a-30m.

In FIG. 28C, home menu user interface 28100c visible in view 28100' includes a collection of icons corresponding to contacts that are associated with the computer system 101 or with a user profile that is currently active on the computer system 101. For example, home menu user interface 28100b includes an arrangement of contact icons (e.g., for opening a user interface with a contact information or for initiating a communication with a corresponding contact). In some embodiments, home menu user interface 28100c is a system user interface for reviewing contact information, adding or deleting contact, and for initiating communication with a respective contact (e.g., a contact associated with computer system 101). In some embodiments, home menu user interface 28100c is a multi-section arrangement of a collection of contact icons (e.g., that includes three sections), and a subset of the collection of contact icons that is included in the second section visible in view 28100' in FIG. 28C includes contact icons 32a, 32b, 32c, 32d, 32c, 32f, 32g, 32h, 32i, 32j, 32k, and 32l (also collectively referred to as contact icons 32a-32l), and affordance 32 for adding a new contact. Similar to the home menu user interfaces 28100a and 28100b, contact icons 32a-30l are arranged in a regular pattern (e.g., in a grid pattern, along a line, radially, circumferentially, and/or other patterns). For example, in a gird of 4×5×4 (e.g., 4 icons in the top row, 5 icons in the middle row, and 4 icons in the bottom row, where the icons are in a zig zag arrangement, as illustrated in FIGS. 28A-28D with reference to home menu user interfaces 28100a-28100d, respectively). In some embodiments, a respective contact icon of contact icons 32a-32l, when selected, causes the computer system 100 to display a user interface with contact information corresponding to the selected contact icon and/ or providing means for initiating a communication with the contact (e.g., email, call, messaging, shared experience, file sharing, and/or other types of communications). In some embodiments, home user interface 28100c displays labels indicating the name of the contact under respective contact icons 32a-32l.

In some embodiments, while different multi-section arrangements are individually configurable, objects within a respective multi-section arrangement are only repositionable within different sections of the respective multi-section arrangement, but cannot be repositioned into a different multi-section arrangement for a different object type (e.g., app icons cannot be dragged and dropped into the arrangement for contacts or experiences, and vice versa). For example, application icons in home user interface 28100*a* can be repositioned across the different sections of home menu user interface 28100*a*, virtual environment icons in home menu user interface 28100*b* can be repositioned across the different sections of home menu user interface 28100*b*, and contact icons in home menu user interface 28100*c* can be repositioned across the different sections of home menu user interface 28100*c*, but app icons cannot be relocated to home menu user interface 28100*b* or home menu user interface 28100*c*, virtual environment icons cannot be relocated to home menu user interface 28100*a* or home menu user interface 28100*c*; and contact icons cannot be relocated to home menu user interface 28100*a* or home menu user interface 28100*b*, in accordance with some embodiments.

In some embodiments, the number of sections included in a home menu user interface depends on the number of respective objects that are included in the home menu user interface. For example, each section has a total number of placement locations that can be occupied by respective icons and are optionally arranged in a grid pattern (e.g., 3×4×3; 4×5×4; 5×6×5; and/or other number of placement locations and/or grid configurations), and the collection of icons are distributed into different sections of the home menu user interface (e.g., with, or without vacant placement locations in one or more sections).

In FIG. 28D, home menu user interface 28100*d* in view 28100' corresponds to a multi-section arrangement of user interface objects of the same type (e.g., application icons, contact icons, virtual environment icons, controls, or another collection of icons and/or objects that corresponds to objects of the same type). For example, home user interface 28100*d* in view 28100' in FIG. 28D displays the second section in a sequence of three sections of home menu user interface 28100*d*. The second section includes a subset of icons in the collection of icons in the home menu user interface 28100*d*. The subset of icons in the second section includes icon O14 34*a* (referred to as icon 34*a*), icon O15 34*b* (referred to as icon 34*b*), icon O16 34*c* (referred to as icon 34*c*), icon O17 34*d* (referred to as icon 34*d*), icon O18 34*e* (referred to as icon 34*c*), icon O19 34*f* (referred to as icon 34*f*), icon O20 34*g* (referred to as icon 34*g*), icon O21 34*h* (referred to as icon 34*h*), icon O22 34*i* (referred to as icon 34*i*), icon O23 34*j* (referred to as icon 34*j*), icon O24 34*k* (referred to as icon 34*k*), icon O25 34*l* (referred to as icon 34*l*), and icon O26 34*m* (referred to as icon 34*m*) (collectively referred to as icons 34*a*-34*m*). In some embodiments, home menu user interface 28100*d* corresponds to one of home user interfaces 28100*a*-28100*c*. In some embodiments, techniques, interactions, and user interfaces described in relation to home menu user interface 28100*d* in view 28100' are applicable to home menu user interfaces 28100*a*-28100*c*.

In some embodiments, a respective home menu user interface includes a tab menu for switching between the different collections of user interface objects (or different arrangements of user interface objects) included in a multi-arrangement home menu user interface that includes the respective home menu user interface and other home menu user interfaces (e.g., in multiple arrangements of the multi-arrangement home menu user interface). For example, home user interfaces 28100*a*-28100*d* display tab menu 28004 (shown in FIG. 28A) that includes tab 28004*a* that, when selected, causes the device 100 to display an arrangement of application icons (e.g., home screen user interface 28100*a*); tab 28004*b* that, when selected, causes the device 100 to display an arrangement of contact icons (e.g., home screen user interface 28100*b*); and tab 28004*c* that, when selected, causes the device 100 to display an arrangement of virtual environment icons (e.g., home screen user interface 28100*c*). Accordingly, a user can toggle between displaying home menu user interfaces of collections of icons corresponding to different types of objects (e.g., icons for applications, icons for contact, icons for virtual environments, icons for controls, and/or icons or objects of another type). In some embodiments, tab 28004*a* corresponds to tab 7231 for displaying the representations of software applications, as described with reference to FIGS. 7A-7I; tab 28004*b* corresponds to tab 7234 for displaying the representations of contacts associated with the computer system 100, as described with reference to FIGS. 7A-7I and FIGS. 26A-26R; and tab 28004*c* corresponds to tab 7234 for displaying the representations of virtual environments downloaded on the computer system 100, as described with reference to FIGS. 7A-7I and FIGS. 26A-26R. In some embodiments, when home menu user interface 28100*a* is displayed in view 28100', tab 28004*a* is shown as selected, when home user interface 28100*b* is displayed in view 28100', tab 28004*c* is shown as selected, and when home menu user interface 28100*c* is displayed in view 28100', tab 28004*b* is shown as selected. In some embodiments, the tab menu 28004 along with the multiple home menu user interfaces 28100*a*-28100*c* are referred to as a multi-arrangement home menu user interface, a respective home menu user interface of home menu user interfaces 28100*a*-28100*c* is referred to as a multi-section home menu user interface including a respective collection of user interface objects of a respective type (e.g., application icon type, environment icon type, contact icon type, or another object type). In some embodiments, when a respective multi-section home menu user interface is displayed in a normal mode, other multi-section home menu user interfaces are not displayed in the same view of the environment, and other sections of the respective multi-section menu user interface are also not displayed in the same view of the environment.

With reference to FIGS. 28A-28AI, gaze and/or air gestures, including direct or indirect air gestures, such as pinch gestures, long pinch gestures, pinch and drag gestures, or double pinch gestures are used to interact with virtual objects in view 28100' (e.g., application icons 28*a*-281 and folder icon 28*m* in home menu user interface 28100*a*; virtual environment icons 30*a*-30*m* in home menu user interface 28000*b*; contact icons 32*a*-321 and affordance 32 in home menu user interface 28100*c*; and/or icons in home menu user interface 28000*d*; sections of home user menu interface 28100*d*, and/or other computer-generated content in view 28100'), according to some embodiments. In some embodiments, touch inputs detected via a touch sensitive surface (e.g., touch-sensitive surface of display generation component 7100*a* or a trackpad 10102 in FIG. 10A) are used to interact with virtual objects in view 28100' in addition to or alternatively to using air gestures and/or gaze.

In some embodiments, when a reconfiguration mode of a multi-section home menu user interface is active (e.g., an icon reconfiguration mode), positions and/or availability of icons in an arrangement of icons in the multi-section home menu user interface (e.g., an arrangement of icons 28*a*-28*m* in home menu user interface 28100*a*; an arrangement of icons 30a-30m in home menu user interface 28100b; an arrangement of icons 32a-301 in home menu user interface 28100c; and/or an arrangement of icons 34a-34m in home menu user interface 28100d), can be adjusted in response to user inputs (e.g., in contrast, positions and/or availability of icons are not adjustable in a normal mode (e.g., a non-reconfiguration mode) of the multi-section home menu user interface, as is the case in the scenario of FIG. 28D where home menu user interface 28100d, serving as a representative of home menu user interfaces 28100a-28100c or another multi-section home menu user interface, is displayed in the normal mode. In conjunction with activating the icon reconfiguration mode (e.g., after, before, in response to, or in response to an event that cause the device to enter the reconfiguration mode, substantially simultaneously with activating the icon reconfiguration mode, or concurrently with activating the icon reconfiguration mode), the computer system 101 displays a preview of portions (e.g., one or more icons) of adjacent pages, as described in further detail with reference to FIGS. 28E-28F.

Figures 28E, 28F:
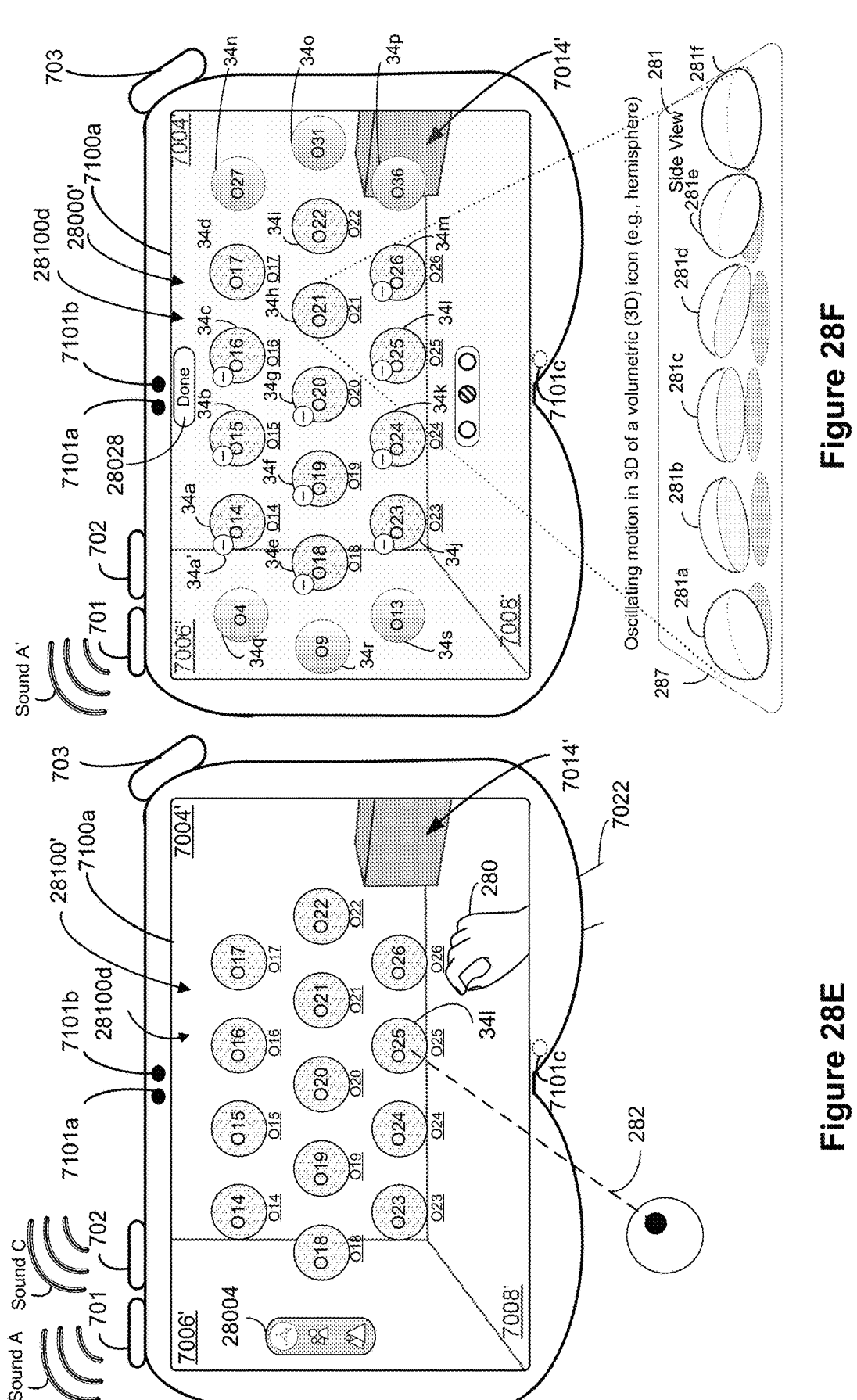

In FIG. 28E, the computer system 101 detects a long pinch gesture 280 performed with user 7002's hand, while icon 34l has input focus (e.g., gaze 282 of user 7002 is directed to icon 34l with less than a threshold amount of movement for at least a threshold amount of time, that causes the computer system 101 to put icon 34l in focus, ready to accept additional inputs). In some embodiments, an icon or other user interface object has an input focus as a result of a selection of the icon by a concurrently and/or previously detected gaze input, selected by a concurrently or previously detected pointer input, and/or selected by a concurrently and/or previously detected gesture input (e.g., where concurrently and/or previously means in relation to a hand gesture, such as a pinch gesture). For example, in FIG. 28E, icon 34l has input focus as a result of concurrently and/or previously detected gaze input of user 7002 directed to icon 34l. In some embodiments, gestures described in relation to FIGS. 28E-28I can be indirect or direct air gestures (e.g., performed at a location in the physical environment 7000 that corresponds to a region of a target object in view 28100'). In response to the detection of long pinch gesture 280 while icon 34l has input focus, the computer system 101 activates the icon reconfiguration mode for the multi-section home menu 28100d, as illustrated in FIG. 28F.

FIG. 28F is a transition from FIG. 28E in response to the detection of long pinch gesture 280 while icon 34l has input focus. In response, the computer system 101 activates the icon reconfiguration mode. In conjunction with activating the icon reconfiguration mode, computer system 101 displays a preview of portions (e.g., including a view of one or more icons) of one or more adjacent pages or sections. For example, the computer system displays in view 28100' in FIG. 28E, icons 34n, 340, and 34p included in the third section of the multi-section home screen interface 28100d (e.g., displayed in the right hand side relative to the icons 34a-34m in the second section), and icons 34q, 34r, and 34s included in the first section of the multi-section home screen interface 28100d (e.g., displayed in the left hand side relative to the icons 34a-34m in the second section). In some embodiments, if there is no adjacent section or page on the left side, right side, or both sides, the computer system 101 forgoes displaying any icons on the left side, right side, or both sides, respectively. In some embodiments, icons 34q, 34r, 34s, 34n, 340, and 34p are visually deemphasized relative to icons 34a-34m in the middle section (e.g., that is currently in focus). For example, icons 34q, 34r, 34s, 34n, 340, and 34p are dimmed, blurred, faded, made more translucent, reduced in size, receded away from the viewpoint, and/or otherwise visually deemphasized relative to their original appearances and the appearances of the icons in the second section. In some embodiments, instead of displaying portions of the adjacent pages, the computer system 101 displays some other indication of the adjacent pages in conjunction with activating the icon reconfiguration mode (e.g., partial frame or outline of the respective adjacent section, outline of placement locations for icons on the respective adjacent section, user interface elements that point to the adjacent page or indicate the adjacent page, and/or other visual indication). In embodiments where display generation component 7100 of computer system 101 is a head-mounted display, icons 34q, 34r, 34s, 34n, 340, and 34p are displayed in a peripheral region of a field of view of user 7002's eyes while looking at XR three-dimensional environment view 28100' via display generation component 7100a. In some embodiments, icons in the second section and the preview of icons in the adjacent sections are displayed on a curved surface, with the middle section closer to the viewpoint of the user, and the adjacent sections farther away from the viewpoint.

In some embodiments, in the reconfiguration mode, the computer system 101 displays delete affordances near icons that can be deleted (and/or uninstalled) and does not display delete affordance near application icons that cannot be deleted (e.g., such as applications that are part of the pre-installed applications on the operating system or system applications that a user cannot delete via inputs in the reconfiguration mode). For example, in conjunction with activating the reconfiguration mode and while home user interface 28100d is in the reconfiguration mode, the computer system 101 displays respective delete affordances on or near respective icons 34a, 34b, 34c, 34c, 34f, 34g, 34j, 34k, 341, and 34m for deleting the respective icons, such as delete affordance 34a' for deleting icon 34a, while application icons 34d, 34h, 34i are displayed without corresponding deletion affordances as their corresponding applications cannot be deleted from the computer system (e.g., uninstalled) by a user and/or in the reconfiguration mode, as illustrated in FIG. 28F. As shown in FIG. 28F, the preview of the adjacent pages that includes a view of icons 34q, 24r, and 34s of the first page of home menu user interface 28100d, and a view of icons 34n, 340, and 34p of the third page of home menu user interface 28100d, do not include respective deletion affordances for the icons in the adjacent pages, because icons displayed in the preview cannot gain input focus unless their corresponding section is currently in focus (e.g., becomes the currently displayed section).

In some embodiments, while the tab menu 28004 is displayed in view 28100' while home menu user interface 28100d is in the normal mode, the computer system 101 optionally ceases to display the tab menu 28004, in accordance with a determination that home menu user interface 28100d has transitioned into the icon reconfiguration mode (as illustrated in FIG. 28F while home user interface 28100d is the icon reconfiguration mode, compared with FIG. 28E while home user interface 28100d is in the normal mode). For example, the computer system can switch to a different multi-section home menu user interface (e.g., one that includes icons corresponding to a different type of objects) after finishing the rearrangement of the currently displayed home menu user interface (e.g., home user interface 28100d) and exiting the icon configuration mode, but switching to a different multi-section home menu user interface (e.g. between home menu user interfaces 28100a, 28100b, and 28100c) while the currently displayed multi-section home menu user interface is in the reconfiguration mode is not enabled, as illustrated by the missing tab menu 28004 (e.g., relative to FIG. 28E where home user interface 28100d is in normal mode) for switching between different multi-section home menu user interfaces, in FIG. 28F.

In some embodiments, in the reconfiguration mode, the computer system 101 displays a control for saving any changes or modifications that are made to the arrangement of icons included in the home menu user interface (e.g., that is currently active, visible, and/or in focus). For example, in conjunction with activating the reconfiguration mode and while home menu user interface 28100d is in the reconfiguration mode, the computer system 101 displays control 28028 in home menu user interface 28100d that, when selected, causes the computer system 101 to exit the icon reconfiguration mode while also maintaining any changes that were made to the home menu user interface 28100d (e.g., including the addition, deletion, and/or relocation of application icons in one or more sections of home menu user interface 28100d). In contrast, in some embodiments, other ways for exiting the reconfiguration mode (e.g., a gaze and pinch in an unoccupied location in view 28100') cause the computer system 101 to exit the icon reconfiguration mode without maintaining the changes made during the reconfiguration mode (e.g., addition, deletion, and/or relocation of icons made during the reconfiguration mode are reverted, and home menu user interface 28100d is restored to the state before entering the reconfiguration mode).

In some embodiments, in conjunction with activating the icon reconfiguration mode (e.g., in response to long pinch gesture 280 detected in FIG. 28E) and displaying the preview of icons on adjacent sections, the computer system 101 provides additional visual feedback that icons in the home scree can be repositioned, deleted, and/or rearranged. For example, while in the icon reconfiguration mode, icons 34a-34m oscillate in three dimensions to provide visual feedback of the operational state of the computer system 101. Example oscillating motions of icons 34a-34m while the home user interface 28100d is in the icon reconfiguration mode are illustrated using a single icon O21 34h in side view 281 in FIG. 28F. Side view 281 illustrates different intermediate states 281a, 281b, 281c, 281d, 281e, and 281f of the oscillating motion of icon O21 34h. In some embodiments, the oscillations of the respective icon O21 34h includes clockwise and counter-clockwise spinning motions and back and forward wobble motions of the respective icon O21 34h (e.g., relative to an anchor position associated with the respective icon, such as a center or central axis of the placement location for the respective icon, or the center or central axis of the icon itself).

In some embodiments, icons 34a-34m oscillate rotationally around respective centers, and/or axes that go through the respective centers of respective icons and perpendicular to a platter or surface, optionally not visible in view 28100' but illustrated in side view 281, on which icons 34a-34m are placed in the three-dimensional environment. In some embodiments, icons 34a-34m (and other icons in home screen user interface 28100 included in other sections) are volumetric or three-dimensional (e.g., as opposed to two dimensional), as illustrated in side view 281 in FIG. 28F. Optionally, icons 34a-34m have a convex, rounded, disc, or dome shape (e.g., such as a hemisphere or similar three-dimensional shape). In some embodiments, icons 34a-34m have synchronized movements or asynchronized movements in the lateral dimensions of the first arrangement and/or in the depth dimension relative to the viewpoint of the user. In some embodiments, the oscillations of different icons 34a-34m are synchronized and/or have the same amplitudes, phases, and/or frequencies. In some embodiments, the oscillations of different icons 34a-34m are asynchronized, and/or have the different amplitudes, phases, and/or frequencies. In some embodiments, the icons 34a-34m each oscillate around an anchor position (e.g., a center or central axis) as if the curved side of the respective icons 34a-34m are oscillating and/or wobbling on a flat surface (e.g., as if coins are dropped on a floor, imitating a plate spinning oscillation). In some embodiments, the sides of icons 34a-34m that are opposite of user 7002's viewpoint are optionally flat and parallel to a plane, such as plane 287, when in normal mode, and tilt and wobble back and forth relative to the plan in the depth dimension, as illustrated in side view 281 and as illustrated in top view 285 described below in relation to FIGS. 28L-28AI.

In some embodiments, while the home user interface 28100d is in the normal mode, as illustrated in FIG. 28E, the computer system 101 outputs a first ambient sound (optionally continuous ambient sound) to indicate that the computer system is 101 is operational and, optionally, that the home menu user interface 28100d is visible in view 28100', as illustrated by sound waves marked A in FIG. 28E. In some embodiments, the computer system 101 outputs the first ambient sound A while the computer system is running or while it is mounted on user 7002's head (e.g., and not necessarily dependent on whether a home menu user interface is visible). For example, the first ambient sound is played or outputted while the home menu user interface 28100d is displayed in view 28100' and is in the normal mode (e.g., as opposed to a reconfiguration mode). Optionally, the first ambient sound A is stopped, in accordance with a determination that the home menu user interface 28100d is no longer visible in view 28100' and optionally changed or replaced with a different ambient sound. In some embodiments, the first ambient sound A, optionally, spatially spans the three-dimensional environment and forms part of the three-dimensional experience in the environment, as opposed to audio feedback that is played in response to inputs and/or events that corresponds to an individual object in the environment. In some embodiments, in conjunction with activating the icon reconfiguration mode, the computer system 101 changes the output parameters of the first ambient sound. For example, after entering the icon reconfiguration mode, the computer system 101 reduces the volume of the ambient sound A, removes the ambient sound A, or changes the ambient sound A to a different ambient sound A', as illustrated by sound waves marked A' in FIG. 28F. In some embodiments, FIGS. 28F-28AI illustrate that the ambient sound A' is playing continuously while the home menu user interface 28100d is visible in view 28000' and is in the icon reconfiguration mode.

The ambient sounds A and A' that are playing in the environment (e.g., as part of the three-dimensional experience provided in the environment, and/or as an indication that a system user interface such as a multi-section home menu user interface is currently displayed in the environment) while the home menu user interface 28100d is displayed, respectively in normal mode and reconfiguration mode, are different from sounds that are generated by the computer system 101 in response to the detection of user input (e.g., gaze inputs and/or air gestures). For example, in FIG. 28E, the computer system generates a distinctive sound (e.g., a hover sound, or another type of audio feedback) in accordance with a determination that gaze 282 is directed to icon O26 341 (e.g., gaze 282 is maintained on icon O26 341 for more than a threshold amount of time to put icon O26

341 in focus). In some embodiments, the same distinctive sound is generated when the user 7002's gaze shifts from one icon to another or shifts the attention from one user interface object to another that causes the input focus to shift to the other icon or user interface object (e.g., to provide audio feedback that a respective user interface object is in focus). In some embodiments, the hover sound used in the normal mode is removed, changed, or replaced with a different hover sound (e.g., a sound that is lower in volume, higher in volume, higher in frequency, lower in frequency, or otherwise different in one or more audio qualities) while the home menu user interface 28100d is in the icon reconfiguration mode. For example, a different hover sound is generated when user 7002's gaze 294 is directed to icon O21 34h in FIG. 28L while home user interface 28100d is in the reconfiguration mode, as described in further detail with respect to FIG. 28L. In some embodiments, the hover sound indicating that user's attention is directed to a respective user interface object is different from the continuous ambient sounds A and A' indicating that a home user interface is visible. In some embodiments, the hover sound indicating that user's attention is directed to a respective user interface object is outputted while the continuous ambient sound A and/or ambient sound A' is continuously outputted. Further, in FIG. 28E, the computer system generates a distinctive sound (e.g., a selection input sound) in accordance with a determination that long pinch 280 is detected, as marked by sound waves C in FIG. 28E. In some embodiments, the computer system 101 generates the sound C when the hover sound associated with the gaze detected on icon 34l has been completed. In some embodiments, the computer system 101 generates the sound C to replace the hover sound associated with the gaze detected on icon 34l. In some embodiments, the computer system 101 ceases to generate and output the sound C (e.g., indicating a long pinch gesture), in accordance with a determination that the long pinch is released. In some embodiments, the hover sound indicating that user's attention is different from the selection input sound. In some embodiments, the selection input sound C is different from the continuous ambient sounds A and A' and is outputted while the continuous ambient sound A or A' is continuously outputted.

In some embodiments, in conjunction with activating the icon reconfiguration mode and displaying the preview of portions of the adjacent section(s) (e.g., displaying icons 34q, 34r, 34s, 34n, 340, and 34p) of the multi-section home menu user interface 28100d, passthrough portions of the three-dimensional environment in view 28100' in FIGS. 28F-28AI are visually deemphasized (e.g., darkened, blurred, made more translucent, less saturated, relative to the passthrough portions of the three-dimensional environment in view 28100' in FIG. 28E before activating the icon reconfiguration mode), as described in relation to FIGS. 21A-21Y, and 25. For example, in the icon reconfiguration mode, passthrough portions become darker while icons in home menu user interface 28100d maintain their brightness, as illustrated in FIGS. 28F-28AI.

Figures 28G, 28H:
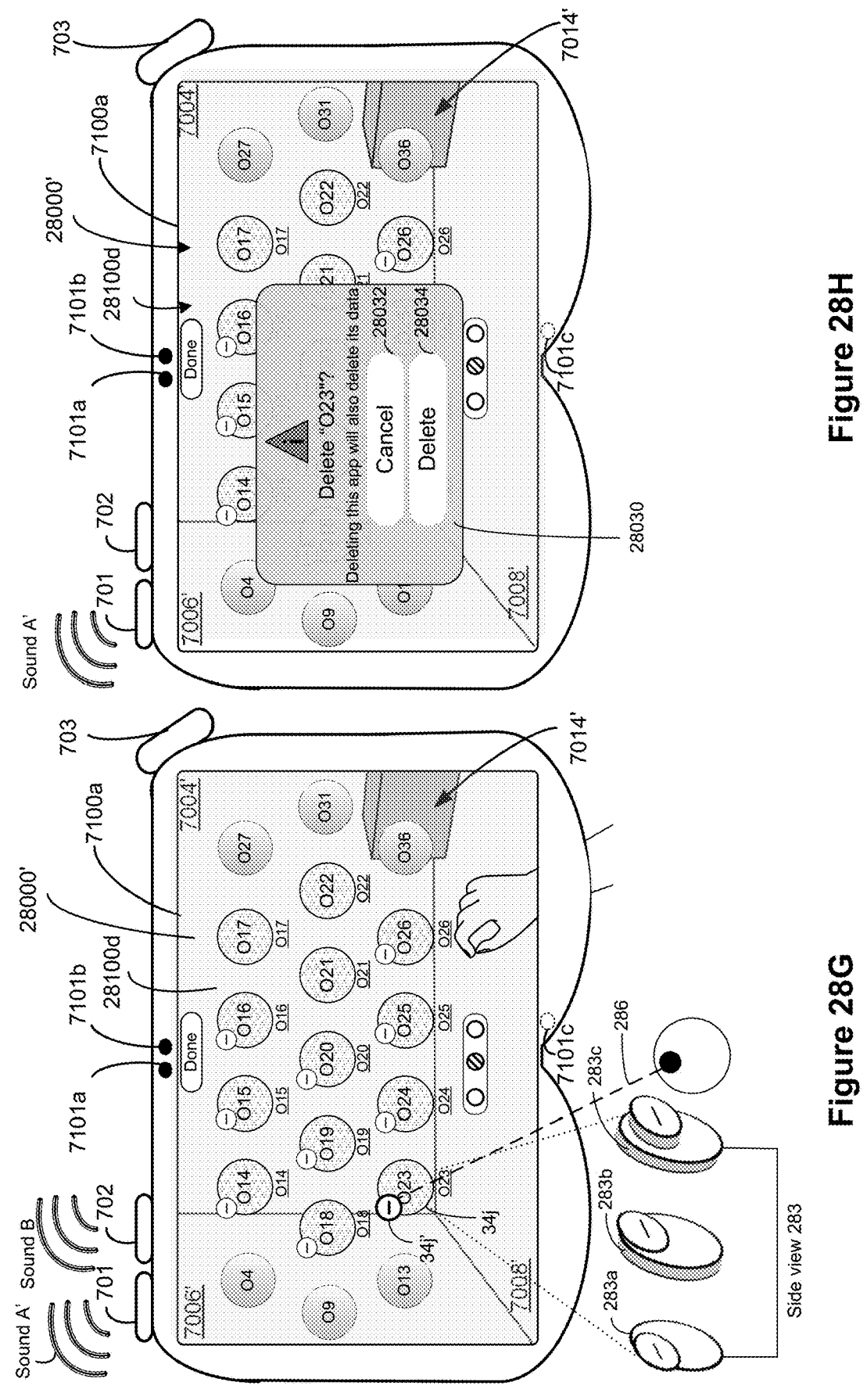

In FIG. 28G, the computer system 101 detects gaze 286 of user 7002 directed to delete affordance 34j' (e.g., with less than a threshold amount of movement for more than a threshold amount of time) that causes the computer system 101 to put delete affordance 34j' in focus. In response to gaze 286, the computer system 101 causes delete affordance 34j' to move towards the viewpoint of user 7002 and optionally to increase in size and/or otherwise become more visually emphasized (e.g., brighter, highlighted, less translucent, and other visual or non-visual emphasizing effect). For example, the delete affordance 34j' lifts off and moves away from icon 34j resulting in an increased gap in depth between delete affordance 34j' and icon 34j, as illustrated in side view 283. Side view 283 illustrate different intermediate states 283a, 283b, and 283c of the lifting off of delete affordance 34j' (e.g., away from icon 34j and towards the viewpoint of user 7002). In some embodiments, in response to gaze 286 directed at delete affordance 34j', the computer system 101 generates a hover sound in association with deletion affordance 34j. In some embodiments, the sounds that are outputted in response to user inputs (e.g., sound B for gazing at an icon, sound C for long pinch gesture directed to an icon, the hover sound for gazing at deletion affordance, and other audio feedback played in response to other types of input targeting an object or location in the environment) are spatial audio outputs, and for target objects located at different locations in the environment, the spatial qualities of the audio feedback are changed to indicate the spatial location of the target objects (e.g., objects, icons and/or affordances). In some embodiments, the ambient sounds played in the environment do not have a localized spatial location in the environment.

Further, in FIG. 28G, the computer system 101 detects a pinch gesture 284 performed with user 7002's hand while delete affordance 34j' of icon O23 34j has input focus (e.g., as a result of gaze input 286). In some embodiments, in response to detecting the pinch gesture 284, the computer system 101 generates and outputs a selection sound that is different from the selection sound C (e.g., corresponding to the long pinch gesture 280), as illustrated by the sound waves B in FIG. 28G (e.g., compared to the sound waves C in FIG. 28E). In some embodiments, the selection sound B is also different from the hover sound that is outputted in response to the gaze directed to an object, such as deletion affordance 34j' or icon 34j, in term of values for one or more audio output parameters (e.g., volume, wave patterns, frequency, and/or other parameters affecting audio qualities). In response to the detection of pinch gesture 284 while delete affordance 34j' is in focus, the computer system 101 optionally displays prompt 28030, as illustrated in FIG. 28H. In some embodiments, the computer system 101 forgoes displaying prompt 28030 and proceeds to the deletion in response to the detection of pinch gesture 284 while delete affordance 34j' is in focus (e.g., without the need for further conditions to be met or further user inputs).

FIG. 28H is a transition from FIG. 28G. In response to the detection of pinch gesture 284 while delete affordance 34j' is in focus, the computer system 101 displays prompt 28030. Prompt 28030 displays a warning that the action that was performed by the user would cause the computer system 101 to delete object and/or content corresponding to icon O23 34j. Further, prompt 28030 displays a control 28032 for canceling the deletion action and control 28034 for confirming the deletion action with respect to icon O23 34j.

Figures 28I, 28J:
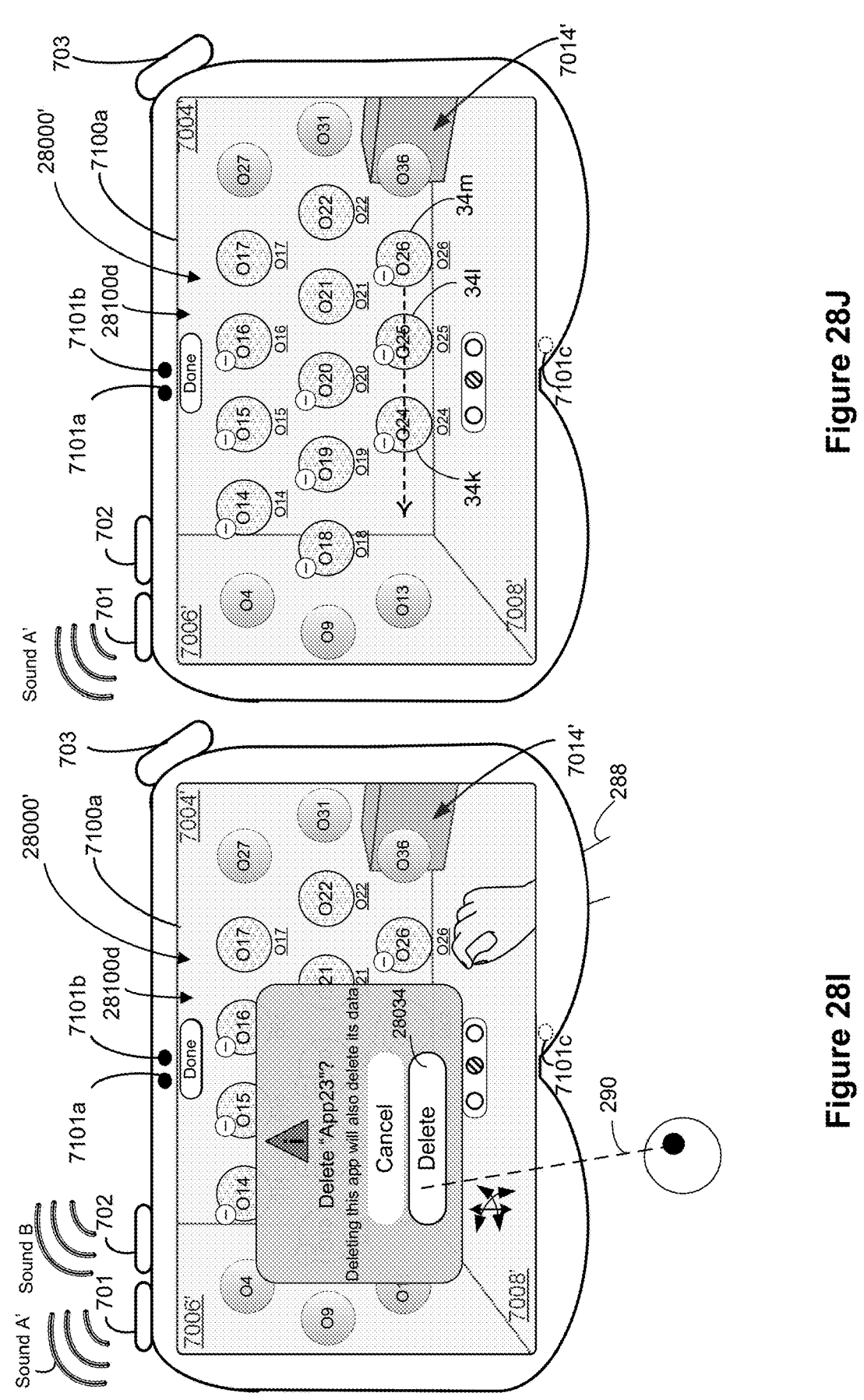

In FIG. 28I, the computer system 101 detects a pinch gesture 288 performed with user 7002's hand while control 28034 for confirming the deletion action has input focus (e.g., as a result of gaze 290 directed to control 28034). In response, the computer system 101 deletes icon O23 34j from the second section of the home menu user interface 28100d.

Figures 28K, 28L:
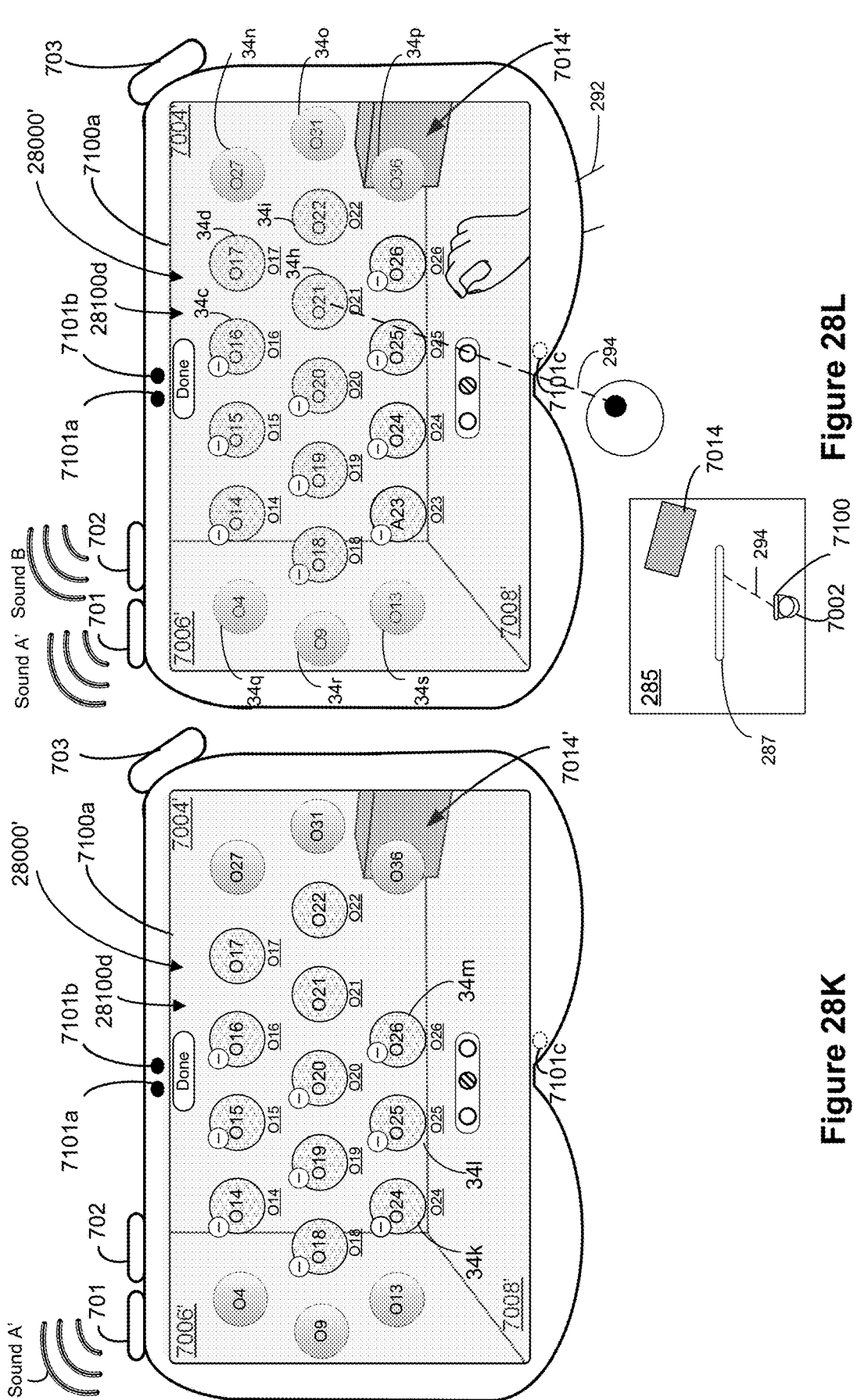

FIG. 28J is a transition from FIG. 28I in response to the detection of pinch gesture 288 while control 28034 for confirming the deletion action has input focus. In response to the detection of pinch gesture 288 while control 28034 for confirming the deletion action has input focus, the computer system 101 deletes icon O23 34j from the home user interface 28100*d* (e.g., as illustrated by the vacated placement location that was previously occupied by icon O23 34*j*). In some embodiments, the computer system 101 reflows or shift icons O24 34*k*, O25 341, and O26 34*m* (e.g., placed in placement locations in home menu user interface 28100*d* ordered after the placement location of the deleted icon O23 34*j*) to fill up the placement location that has been vacated by the deleted icon O23 34*j*, as illustrated in FIG. 28K. For example, icons O24 34*k*, O25 341, and O26 34*m* shift or move in a snake-like pattern in a leftward direction by one placement location. In some embodiments, since icons 34*k*, 341, and 34*m* are moving in the same row, icons 34*k*, 341, and 34*m* do not shift in the depth dimension toward or away from the viewpoint of the user.

FIG. 28K is a transition from FIG. 28J. FIG. 28K illustrates a state of home menu user interface 28100*d* after the computer system 101 deletes icon O23 34*j* and reflows icons 34*k*, 341, and 34*m* to fill in the placement location vacated by the deleted icon O23 34*j*.

In some embodiments, when an icon is being dragged or moved toward one or more other icons in the home menu user interface, the computer system 101 initially pushes those icons away from the icon that is being dragged. Accordingly, the computer system 101 continuously assists the user and provides dynamic feedback to the user that the computer system 101 is responding to user 7002's inputs. In some embodiments, this behavior is illustrated in FIGS. 28L-28R in which icon O21 34*h* is dragged around on home menu user interface 28100*d* and icons O22 34*i*, O13 34*d*, and icon O16 34 are pushed away from their respective placement locations and relative to the dragged icon O21 34*h*. In some embodiments, the dragged icon 34*h* has an enlarged size while being dragged around the home menu user interface 28100*d*. In some embodiments, the dragged icon 34*h* moves in the same plane or surface (or display layer) occupied by other icons (e.g., including icons that are not being pushed, or otherwise affected by the movement of the dragged icon 34*h*) while being dragged around the home menu user interface 28100*d*.

In some embodiments, a respective icon near the dragged icon 34*h* is pushed away from the dragged icon and/or the respective placement location of the respective icon, until the dragged icon crosses a midpoint of the respective icon or midpoint of the respective icon's placement location. For example, after the dragged icon has been dragged to within a threshold amount of distance of a respective pushed icon, and/or a respective pushed icon has been pushed by more than a threshold amount of distance away from its placement location, the computer system 101 stops pushing the respective pushed icon; and, in accordance with a determination that the dragged icon has crossed the midpoint of the respective pushed icon, the computer system 101 moves the respective pushed icon towards the dragged icon (e.g., as if the dragged icon has stopped pushing away the other icon and starts to pull the other icon back toward itself and/or back toward the other icon's placement location). In some embodiments, the computer system optionally slides the other icon underneath the dragged icon when moving the other icon toward the dragged icon and/or the placement location of the other icon, thereby moving out of the away of the dragged icon. In some embodiments, the dragged icon and the one or more other icons near the dragged icon move like air bubbles in water (e.g., repelling one another, before attracting one another). For example, in FIGS. 28S-28W, the computer system 101 pushes icon O20 30*g* away from the dragged icon O21 34*h* until the computer system 101 detects that the dragged icon O21 34*h* has crossed a midpoint of the pushed icon O20 34*g* and/or the midpoint of the placement location of the pushed icon O20 34*g*; and, in response, the computer system 101 reverses the movement of icon O20 34*g* and moves O20 34*g* towards and underneath the dragged icon O21 34*h*, thereby causing the dragged icon O21 34*h* to move into the placement location that was previously occupied by icon O20 34*g* (e.g., swapping the locations of the dragged icon 34*h* and the pushed icon 34*g*, in contrast to FIGS. 28L-28R in which the dragged icon O21 34*h* does not cross a midpoint of any of the icons and/or their placement locations). More details of the behaviors of the dragged icon and the pushed icons are provided below with respect to FIGS. 28L-28W.

FIG. 28L illustrates home menu user interface 28100*d* before icon O23 34*j* (also referred to as icon 34*j*) was deleted from home user interface 28100*d*. For example, home menu user interface 28100*d* in FIG. 28L is the same as home menu user interface 28100*d* in FIG. 28F. In FIG. 28L, the home menu user interface 28100*d* is in the icon reconfiguration mode (as illustrated indicated by the dimmed passthrough portions and delete affordances that are visible in view 28100'). Top view 285 illustrates the three-dimensional environment seen from above (e.g., as opposed to from the side). In some embodiments, icons 34*a*-34*m* in the current section of home user interface 28100*d* and other icons in home menu user interface 28100*d* are placed on the same plane 287 (e.g., also referred to as surface or platter, although shown as flat may have a slight curved shape or front profile on which icons are placed and/or anchored) that is in front of user 7002 (e.g., or user's 7002 viewpoint) (e.g., similar to home menu user interface 8012 in FIGS. 7A-7I or application icons A1 20002-A9 200018 in FIGS. 20A-20X). In FIG. 28L, top view 285 illustrates that user 7002 faces plane 287 that includes the icons of the currently displayed section of home menu user interface 28100*d*. For simplicity, the icons 34*a*-34*m*, 34*n*, 340, 34*p*, 34*q*, 34*r*, and 34*s* are omitted in top view 285 in FIGS. 28L-28AI (e.g., illustrating only plane 287 and a respective selected icon in top view 285). In some embodiments, plane 287 corresponds to virtual region 1020 described in relation to 10A-10Q or home user interface 1120 describe in relation to 11A-11L.

In FIG. 28L, the computer system 101 detects gaze 294 directed to icon O21 34*h* (also referred to as icon 34*h*) that puts icon 34*h* in focus. As described above, the computer system generates a hover sound (e.g., a hover sound with altered output parameters compared to the hover sound played in the normal mode) in response to the detection of gaze 294 that puts icon 34*h* in focus. Further, while icon 34*h* is in focus (e.g., as a result of gaze 294 directed to icon O21 34*h*), the computer system 101 detects pinch gesture 292. As described above, the computer system generates a selection sound B (e.g., a selection sound with altered output parameters compared to the selection sound played in the normal mode) in response to the detection of pinch gesture 292.

Figures 28M, 28N:
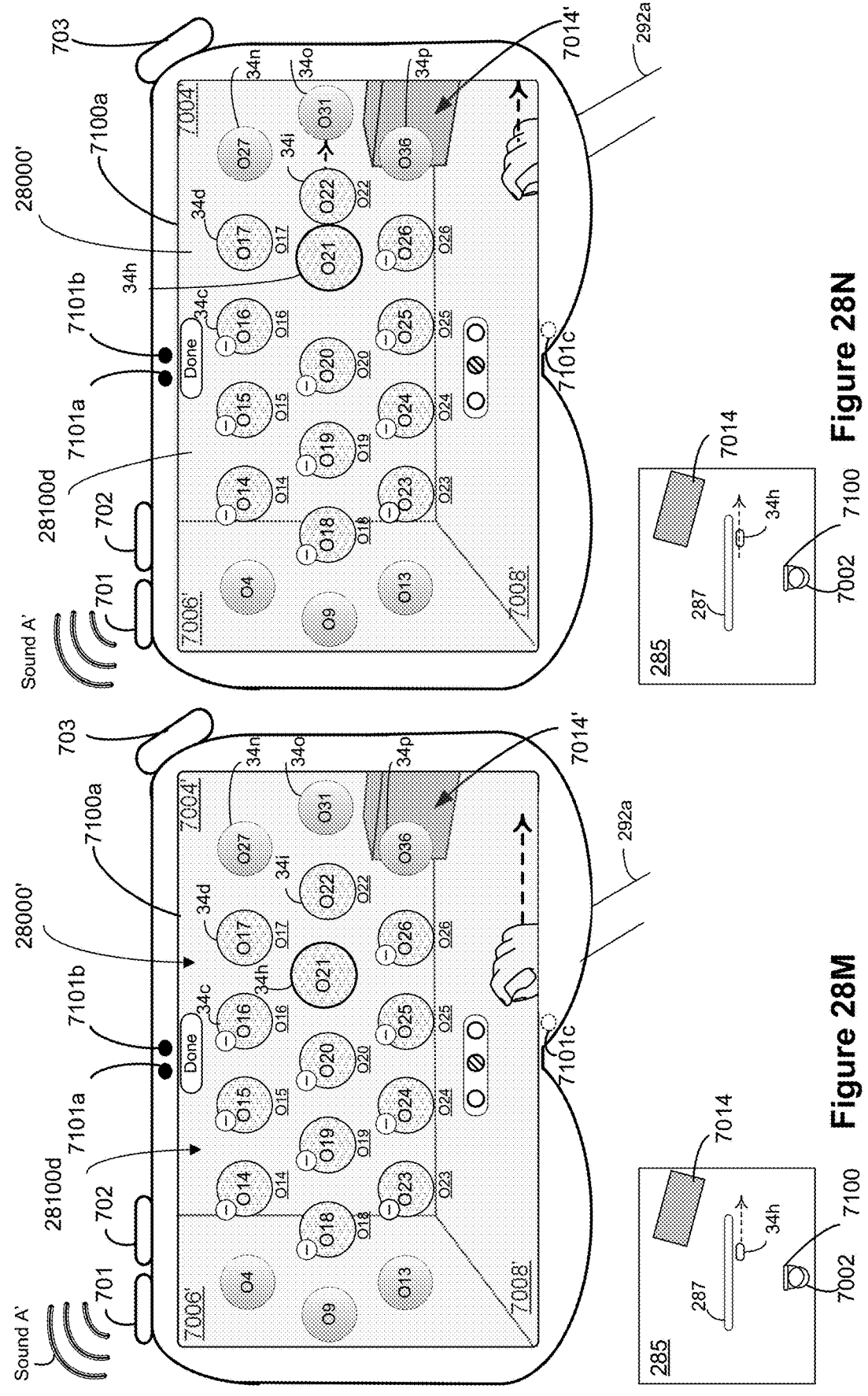

FIG. 28M is a transition from FIG. 28L in response to the detection of pinch gesture 292 while icon 34*h* is in focus. In response to the detection of pinch gesture 292 while icon 34*h* is in focus, the computer system 101 selects icon 34*h* and optionally moves icon 34*h* towards the user 7002 and away from plane 287 (e.g., moving the selected icon 34*h* closer to the viewpoint of the user 7002) resulting in an increased gap in depth between icon 34*h* and plane 287, as illustrated in top view 285. In some embodiments, in conjunction with moving icon 34*h* towards the viewpoint of user 7002 and away from plane 287, the computer system 101 enlarges icon 34*h*, highlights icon 34*h*, makes icon 34*h* less translucent or otherwise visually indicates that the computer system 101 has successfully selected icon 34*h* in response to the pinch gesture 292 detected while icon 34*h* is in focus, as illustrated in FIG. 28M. Further, in addition to moving icon 34*h* towards the viewpoint of user 7002 and away from plane 287, the computer system 101 removes a respective label describing icon 34*h* in response to the selection of icon 34*h* (e.g., in response to the detection of pinch gesture 292 while icon 34*h* is in focus). In some embodiments, once icon 34*h* is selected in response to the gaze 294 and pinch gesture 292, the icon 34*h* continues to be selected until the pinch gesture 292 is released (e.g., there is no need for user 7002's gaze to remain on icon 34*h*). Further, FIG. 28M illustrates that user 7002's hand is about to move in a rightward direction while icon 34*h* is selected, thereby dragging icon 34*h* towards icon 34*i*.

FIG. 28N is a transition from FIG. 28M in response to the detection of movement input 292*a*. Movement input 292*a* is detected while icon 34*h* remains selected (e.g., as a result of the pinch gesture 292 detected in FIG. 28M while icon 34*h* is in focus). In response to the detection of movement input 292*a* while icon 34*h* remains selected (e.g., while the pinch gesture is maintained by the hand performing the movement input 292*a*), the computer system 101 moves icon 34*h* in a rightward direction towards icon 34*i*. For example, in view 28100' icon 34*h* is moved closer or adjacent to icon 34*i* (e.g., in contrast to view 28100' in FIG. 28M), as additionally illustrated in top view 285 in which icon 34*h* has moved along the dashed arrow in accordance with the movement input 292*a*. Further, FIG. 28N illustrates that icon 34*i* is about to be pushed by icon 34*h* (e.g., as illustrated by the dashed arrow connected to icon 34*i*) in response to further movement in rightward direction of movement input 292*a* (e.g., as illustrated by the dashed arrow on user 7002's hand).

Figures 28O, 28P:
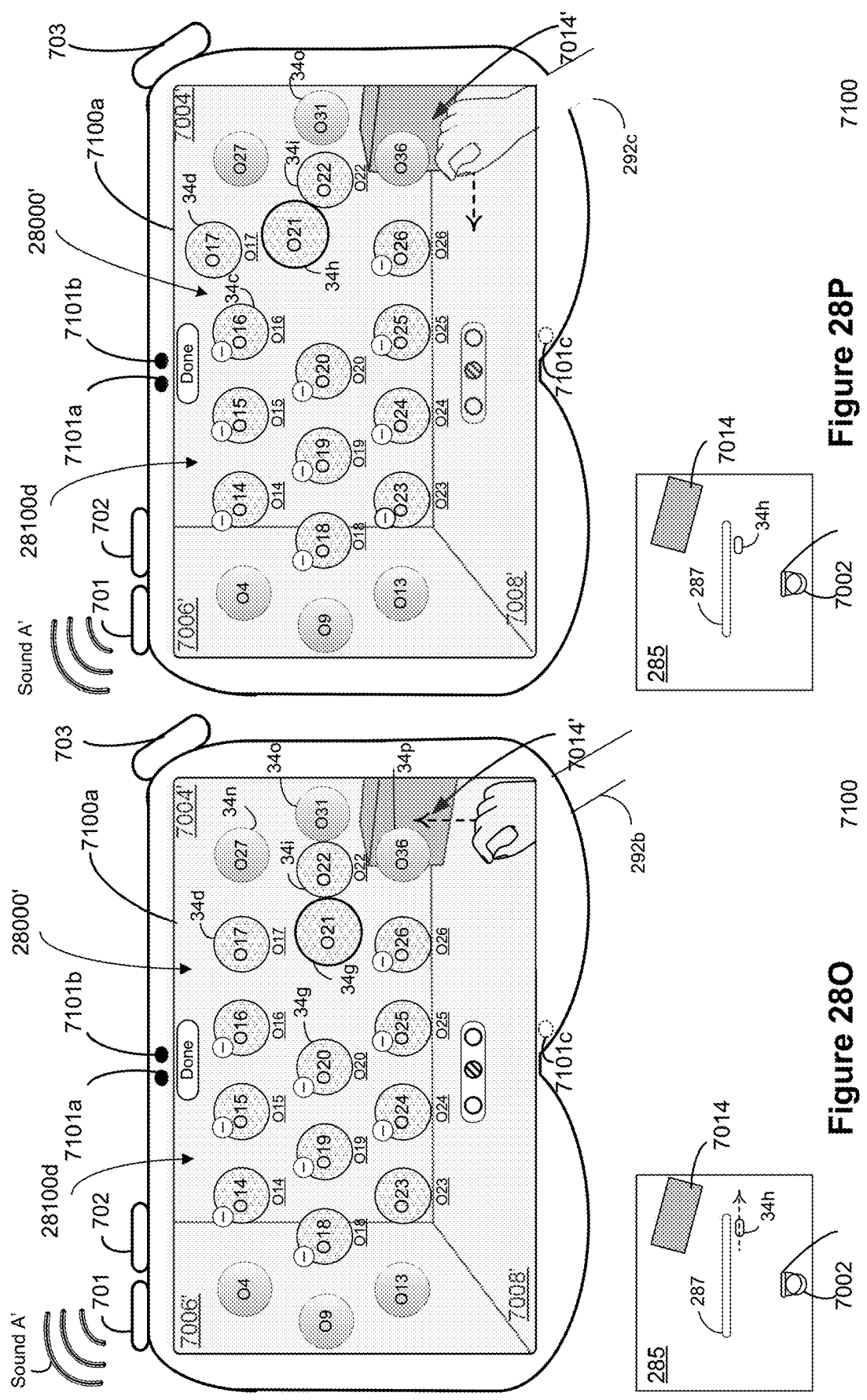

FIG. 28O is a transition from FIG. 28N in response to the detection of further movement in the rightward direction of movement input 292*a* while icon 34*h* is selected. For example, the additional movement of movement input 292*a* drags or moves icon 34*h* even closer to icon 34*i* and its placement location. In response to the detection of further movement in the rightward direction of movement input 292*a* while icon 34*h* is selected, the computer system 101 pushes icon 34*i* away from icon 34*h* (e.g., closer to an invisible edge of the currently displayed section of the home user interface 28100*d* and closer to icon 340 in the third section of home user interface 28100*d*). In some embodiments, in FIG. 28O, icon O21 34*h* has not crossed the midpoint of icon 34*i* (and/or, optionally, has not crossed the midpoint of the placement location of icon 34*i*) and, therefore, icon 34*i* does not slide underneath icon 34*h* vacating its placement location to make room for icon 34*h*, and does not move toward icon 34*h* (and/or does not move back toward the placement location of icon 34*i*). Further, FIG. 28O illustrates that the computer system 101 detects movement input 292*b* in an upward direction while icon 34*h* continues to be selected (e.g., as opposed to rightward direction as illustrated in FIGS. 28M-28N).

FIG. 28P illustrates a transition from FIG. 28O in response to the movement input 292*b* in the upward direction while icon 34*h* continues to be selected. For example, movement input 292*b* drags icon 34*h* towards icon 34*d* in the row above icon 34*h*. In response to the movement input 292*b* in the upward direction that moves icon 34*d* towards icon 34*d*, the computer system 101 moves icon 34*h* towards icon 34*d* and pushes icon 34*d* in accordance with a determination that icon 34*h* has moved within a threshold distance of icon 34*d* and/or the placement location of icon 34*d*.

For example, icon 34*d* is pushed way from icon 34*h* and/or away from the placement location of icon 34*d* in FIG. 28P, similar to how icon 34*i* is pushed away from icon 34*h* and/or away from the placement location of icon 34*i* in FIG. 28O. Further, as icon 34*h* is moved away from icon 34*i* (e.g., as a result of the upward movement input 292*b*), icon 34*i* moves toward its original position (e.g., toward the placement location of icon 34*i*) in home menu user interface in FIG. 28M before the drag input 292*a* is detected (e.g., partially reversing the movement of icon 34*i*), as illustrated in the gap between icon 34*i* and icon 340 in FIG. 28P relative to FIG. 28O. Further, FIG. 28P illustrates that the computer system 101 detects movement input 292*c* in a leftward direction while icon 34*h* continues to be selected (e.g., as opposed to rightward direction as illustrated in FIGS. 28M-28N and the upward direction illustrated in FIGS. 28O-28P).

Figures 28Q, 28R:
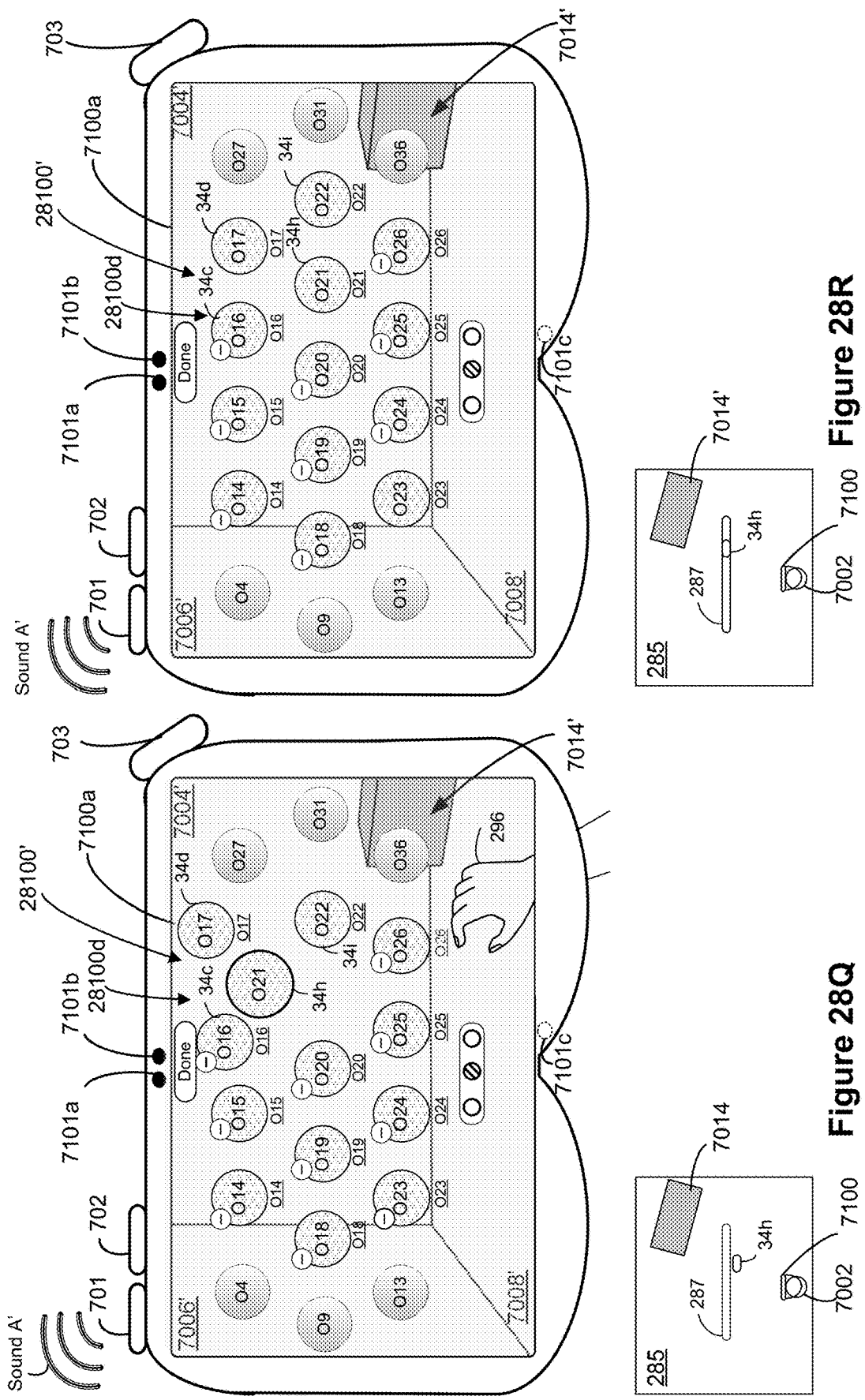

FIG. 28Q is a transition from FIG. 28P in response to the detection of movement input 292*c* in the leftward direction while icon 34*h* continues to be selected. As illustrated in FIG. 28Q, icon 34*h* is moved towards icon 34*c* while still pushing away icon 34*d*. In accordance with a determination that icon 34*h* is moved towards icon 34*c*, the computer system 101 pushes icon 34*c* away from the icon 34*h* and/or away from the placement location of icon 34*c*.

Accordingly, FIGS. 28M-28Q illustrate that while icon 34*h* being moved around, the computer system 101 pushes icons 34*i*, 34*d*, and 34*c* away from icon 34*h*. Further, since icon 34*h* has been moved away from icon 34*i* (e.g., more than a predetermined distance away from icon 34*i*) in response to the detection of first movement input 292*b* and then movement input 292*c*, the computer system 101 restores the position of icon 34*i* in FIG. 28Q to its original position in FIG. 28M (e.g., before icon 34*i* was pushed by the icon 34*h*). FIG. 28Q further illustrates that computer system 101 detects a release 296 of pinch gesture 292.

FIG. 28R is a transition from FIG. 28Q in response to the detection of the release 296 of pinch gesture 292. In response to the detection of release 296 of pinch gesture 292, the computer system 101 restores the location of icon 34*h* in the arrangement of icons 34*a*-34*m*. In some embodiments, in accordance with a determination that while icon 34*h* was moved around (in response to movement inputs 292*a*, 292*b*, and 292*c*), icon 34*h* did not cross a midpoint of any other icon (and/or, optionally, did not cross the midpoint of the placement locations of any other icons) in the arrangements of icon 34*a*-34*m* and/or did not move more than threshold amount toward another row in the arrangement of icons 34*a*-34*m*, the computer system 101 forgoes relocating icon 34*h* or changing the placement location of icon 34*h*, and forgoes relocating or changing the placement location of any other icon in the arrangement of icon 34*a*-34*m* (e.g., in contrast to FIGS. 28T-28W in which icon 34*h* is relocated within the same row, and in contrast to FIGS. 28X-28AC in which icon 34*h* is relocated to the row above). For example, in response to the detection of release 296 of pinch gesture 292, the computer system 101 restores locations of icons 34*h*, 34*d*, and 34*c* (e.g., the location of 34*i* was already restored in FIG. 28Q), as illustrated in FIG. 28R.

Further, in response to the detection of release 296 of pinch gesture 292, the computer system 101 snaps back icon 34*h* to plane 287 (e.g., moves icon 34*h* back onto the plane 287 along with the rest of icons 34*a*-34*m* in the arrangement of icons in view 28100'). For example, as illustrated in top view 28R, icon 34*h* is no longer displayed at a distance away from plane 287 as compared to FIGS. 28N-28Q before the detection of release 296 of pinch gesture 292. In some embodiments, restoring display of icon O21 34*h* at the respective position in the arrangement of icon 34a-34m includes reversing any lateral movement (e.g., vertical and/ horizontal movement) of icon O21 34h that was performed in response to movement inputs 292a, 292b, and 202c. In some embodiments, restoring display of icon O21 34h at the respective position in the arrangement of icon 34a-34m includes animating movement of icon O21 34h away from user 7002 and back towards plane 287 to the position in plane 2897 where icon O21 34h was located prior to being moved in response to inputs 292, 292a, 292b, and 292c. Similarly, restoring positions of icons 34i, 34d, and 34c includes reversing any lateral movements (e.g., vertical and/or horizontal movements) of icons 34i, 34d, and 34c that computer system 100 performed in response to movement of icon 34h.

In some embodiments, a respective icon in the arrangement of icons moves out of the away of an icon that is being dragged, in accordance with a determination that the icon that is being dragged moves more than a threshold amount towards a placement location of the respective icon and/or that the icon that is being dragged crosses or moves pass a midpoint of the respective icon. For example, FIGS. 28T-28W illustrate icon O20 34g sliding underneath icon O21 34h and moving out of the away of icon O21 34h, in accordance with a determination that icon O21 34h that is being dragged moves pass the midpoint of icon O20 34g. In some embodiments, when an icon moves within a row in the arrangement of icons in a home menu user interface (e.g., as opposed to changing rows), the icon does not move away in depth from the viewpoint user 7002 (or a viewpoint of user 7002) behind the plane 287 of the home menu user interface, whereas when an icon changes rows in the arrangement of icons, the icon moves away in depth from the viewpoint of user 7002 to a depth behind the plane 287 of the home menu user interface. For example, FIGS. 28T-28W illustrate that icon 34h is in front of plane 287 and icons 34g and 34f are on plane 287, while the icons 34h, icons 34g and 34f move within the same row (e.g., middle row in the arrangement of icons 34a-34m of home user interface 28100d). In contrast, FIGS. 28X-28AB, illustrate that icon 34d moves at a depth greater than the depth of plane 287 (e.g., sliding underneath plane 287 and other icons in plane 287) while icon 34d is being pushed to move from the top row to the middle row of the arrangement of icons 34a-34m. More details are provided with respect to FIGS. 28T-28W and 28X-28AB below.

Figures 28S, 28T:
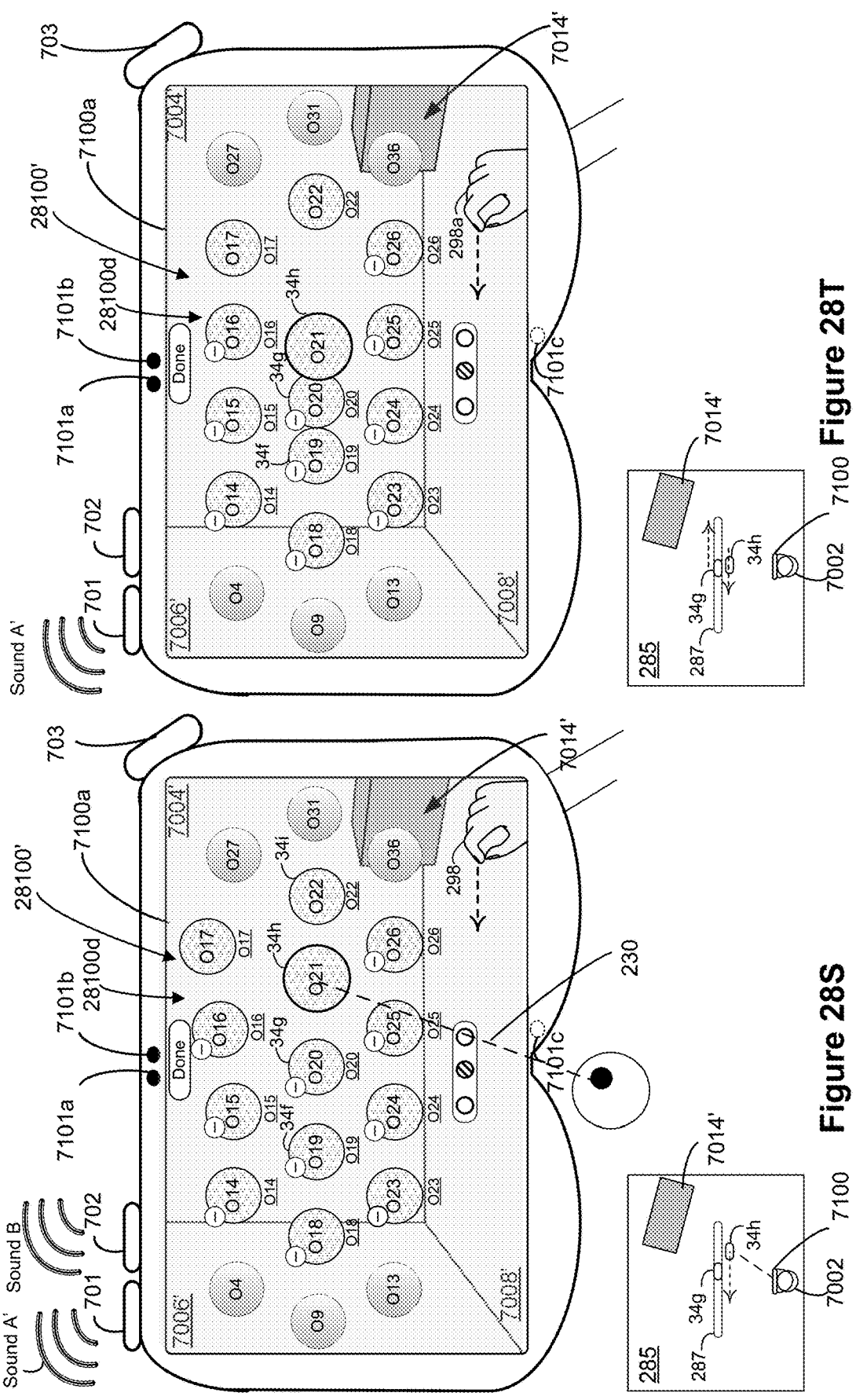

FIG. 28S illustrates the same home user interface 28100d in view 28100' as illustrated in FIG. 28F (e.g., same arrangement of icons and while the icon reconfiguration mode is active). In FIG. 28S, the computer system 101 detects gaze input 28230 of user 7002 directed to icon 34h (e.g., with less than a threshold amount of movement for more than a threshold amount of time) that causes the computer system 101 to put icon 34h in focus. In some embodiments, in response to detecting the gaze input 28230, the computer system 101 generates and outputs a hover sound indicating that user's attention has changed focus to icon 34h. Further, in FIG. 28S, the computer system 101 detects a pinch gesture 298 performed with user 7002's hand while icon 34h has input focus (e.g., as a result of gaze input 230). In response to the detection of pinch gesture 298 while icon 34h is in focus, the computer system 101 selects icon 34h and optionally moves icon 34h towards the viewpoint of the user 7002 and away from plane 287 (e.g., moving the selected icon 34h closer to the viewpoint of user 7002) resulting in an increased distance in depth between icon 34h and plane 287, as illustrated in top view 285. In some embodiments, if pinch gesture 298 was detected while home menu user interface 28100d is in the normal mode (e.g., as opposed to the icon reconfiguration mode), the computer system 101 opens the respective objects and/or content that corresponds to the selected icon 34h (e.g., opens a user interface of corresponding application, opens a user interface with respect to a corresponding contact, and/or opens a virtual environment). FIG. 28S further illustrates that user 7002's hand is about to move in a leftward direction, as illustrated by the dashed arrow. Top view 285 in FIG. 28S illustrates the position of icon 34h relative to icon 34g and the direction of movement of icon 34h towards icon 34g with a dashed arrow.

FIG. 28T is a transition from FIG. 28S in response to the detection of movement input 298a while the pinch gesture of the hand is maintained. Movement input 298a is detected while icon 34h is selected (e.g., as a result of the pinch gesture 298 detected in FIG. 28S while icon 34h is in focus). In response to the detection of movement input 298a while icon 34h is selected, the computer system 101 moves icon 34h in a leftward direction towards icon 34g, in accordance with direction and/or magnitude of movement input 298a. For example, in view 28100' in FIG. 28T, icon 34h is moved closer or adjacent to icon 34g (e.g., relative to view 28100' in FIG. 28S) in accordance with movement input 298a, as additionally illustrated in top view 285 in which icon 34h has moved along the dashed arrow in accordance with the movement input 292a. As illustrated in view 28100' in FIG. 28T, the computer system initially pushes icon 34g away from icon 34h and towards icon 34f. For example, in accordance with a determination that icon 34h has not moved more than a threshold amount towards the original placement location of icon 34g, and/or has not crossed the midpoint of icon 34g or the midpoint of the original placement location of icon 34g, the computer system 101 pushes icon 34g away from icon 34h (e.g., as opposed to towards icon 34h). Further, FIG. 28T illustrates that user 7002's hand is about to move further in the leftward direction while icon 34h remains selected (e.g., dragging icon 34h in response to continuously holding and not releasing the pinch gesture 298).

Figures 28U, 28V:
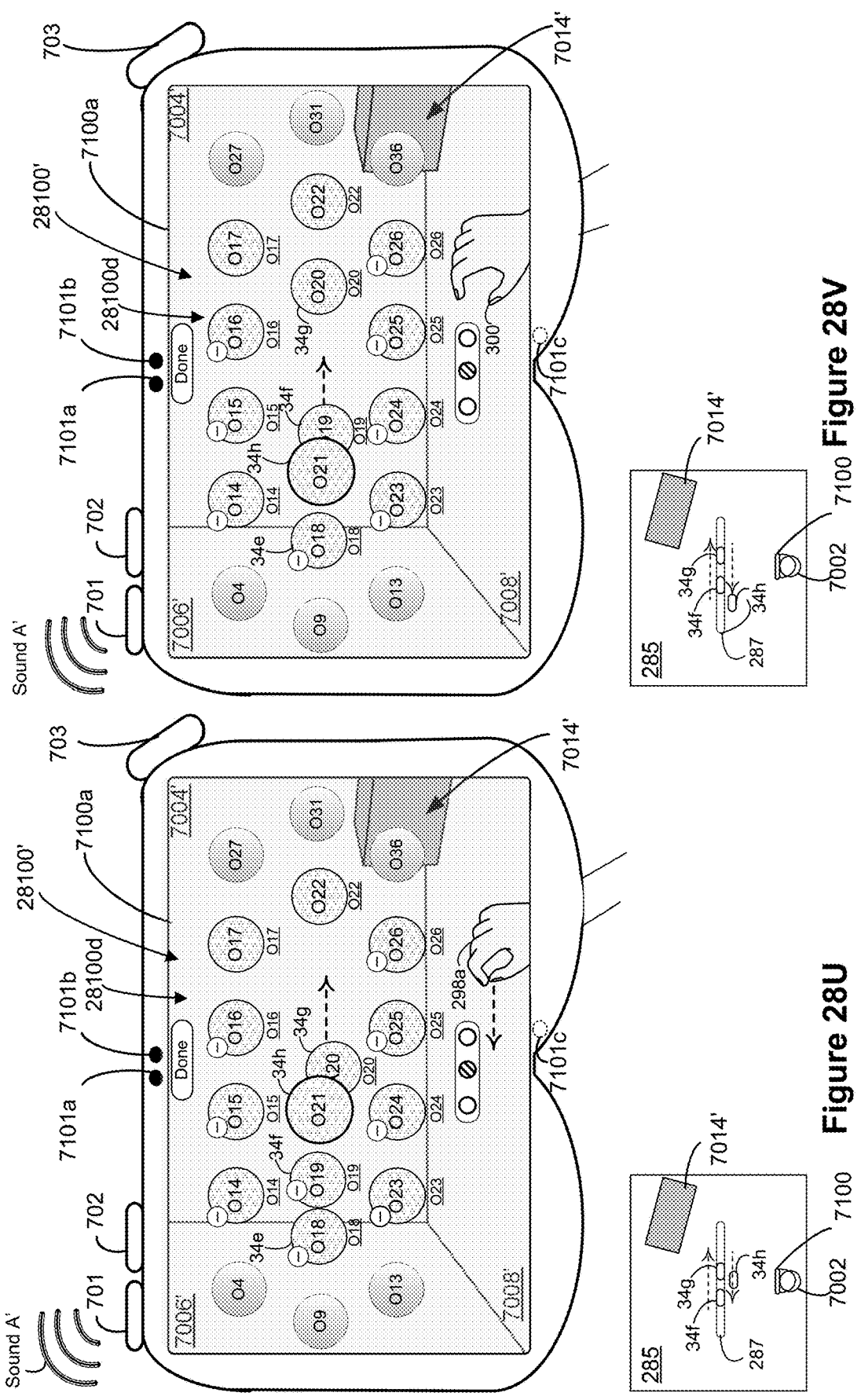

FIG. 28U illustrates a transition from FIG. 28T in response to the detection of further movement input 298a in the leftward direction while icon 34h is selected (e.g., remains selected via sustained pinch gesture 298). In response to the detection of further movement input 298a in the leftward direction while icon 34h is selected, the computer system 101 moves icon 34h further in the leftward direction towards the left edge of the view 28100' and/or left edge of the second section of home menu user interface currently shown via the display generation component 7100a, in accordance with speed, direction and/or magnitude of movement input 298a. In response to the detection of further movement in movement input 298a in the leftward direction while icon 34h is selected, and in accordance with a determination that that icon 34h has moved more than the threshold amount towards the original placement location of icon 34g, and/or has crossed the midpoint of icon 34g and/or the midpoint of the original placement location of icon 34g, the computer system 101 automatically stops pushing icon 34g away from icon 34h, starts moving icon 34g towards icon 34h, and slides icon 34g underneath icon 34h (e.g., to move icon 34g out of the way of icon 34h that is being dragged). For example, in view 28100' in FIG. 28U, in accordance with the continuation of movement input 298a while icon 34h is selected and in accordance with a determination that the conditions for swapping placement locations are met (e.g., the dragged icon 34*h* has crossed the midpoint of icon 34*g* towards which icon 34*h* is being dragged), the computer system 101 moves icon 34*g* from the left-hand side of icon 34*h* to the right-hand side of icon 34*h*, slides icon 34*g* underneath icon 34*h*, as illustrated in view 28100' shown in FIG. 28U. In FIG. 28U, icon 34*g* is displayed partially underneath icon 34*h* (e.g., icon 34*g* is visible partially occluded by icon 34*h* when viewed from the viewpoint of user 7002). Further, top view 285 in FIG. 28U illustrates that icon 34*h* has moved pass the midpoint of icon 34*g* along the dashed arrow that shows the direction of movement of icon 34*h* in accordance with movement input 298*a* in the leftward direction, and that icon 34*h* has now moved closer to icon 34*f*. Further, view 28100' in FIG. 28U illustrates that the computer system 101 initially moves icon 34*f* away from icon 34*h* that is being dragged towards the icon 34*f*. For example, icon 34*f* is displayed closer to icon 34*e* in FIG. 28U as compared to that shown in FIG. 28T. Further, top view 285 in FIG. 28*u* illustrates that while icons 34*g* and 34*f* move within the middle row (e.g., without changing rows), icons 34*g* and 34*f* remain displayed in plane 287 (e.g., at the same distance from viewpoint of user 7002), and that icon 34*h* that is being dragged remains in front of plane 287 and closer to the viewpoint of user 7002 than icons 34*g* and 34*f*.

Further, in FIG. 28U, the dashed arrow connected to icon 34*g* illustrates that icon 34*g* is about to further moved in the rightward direction in accordance with further movement of movement input 298*a* in the leftward direction that drags icon 34*h* further in toward the left edge of display generation component 7100*a*. Also, the dashed arrow connected to user 7002's hand illustrated that user 7002's hand is about to further move in the leftward direction.

FIG. 28V is a transition from FIG. 28U in response to the further movement of movement input 298*a* in the leftward direction. In response to the detection of further movement input 298*a* in the leftward direction while icon 34*h* is selected, the computer system 101 moves icon 34*h* further in the leftward direction towards left edge of display generation component 7100*a*, in accordance with the speed, direction and/or magnitude of movement input 298*a*. In response to the detection of further movement of movement input 298*a* in the leftward direction while icon 34*h* is selected, the computer system 101 moves icon 34*g* into the placement location that was previously occupied by icon 34*h* that is being dragged, thereby the computer system automatically moves icon 34*g* out of the way of icon 34*h* to fill up the vacated placement location in the arrangement of icons 34*a*-34*m*. Further, similar to icon 34*g*, icon 34*f* moves out of the way of icon 34*h* and slides underneath icon 34*h* in response to the detection of the further movement of movement input 298*a* in the leftward direction while icon 34*h* is selected, and in accordance with a determination that that the conditions for swapping placement locations have been met (e.g., in a manner analogous to that described above in relation to icon 34*g*), in FIG. 28V. Further, top view 285 in FIG. 28V illustrates that icon 34*h* has moved pass midpoint of icon 34*f* along the dashed arrow that shows direction of movement of icon 34*h* in accordance with movement input 298*a* in the leftward direction and that icon 34*h* has moved closer to icon 34*c*. Further, top view 285 in FIG. 28V illustrates that icon 34*h* has moved to the left-hand side of both icons 34*g* and 34*f*. Further, top view 285 illustrates that while icons 34*g* and 34*f* move within the middle row (e.g., without changing rows), icons 34*g* and 34*f* remain displayed at the same distance from the viewpoint of user 7002 in plane 287, and that icon 34*g* that is being dragged remains in front of plane 287, closer to the viewpoint of user 7002 as compared to icons 34*g* and 34*f*. Additionally, a release 300 of pinch gesture 298 is detected in FIG. 28V.

Figures 28W, 28X:
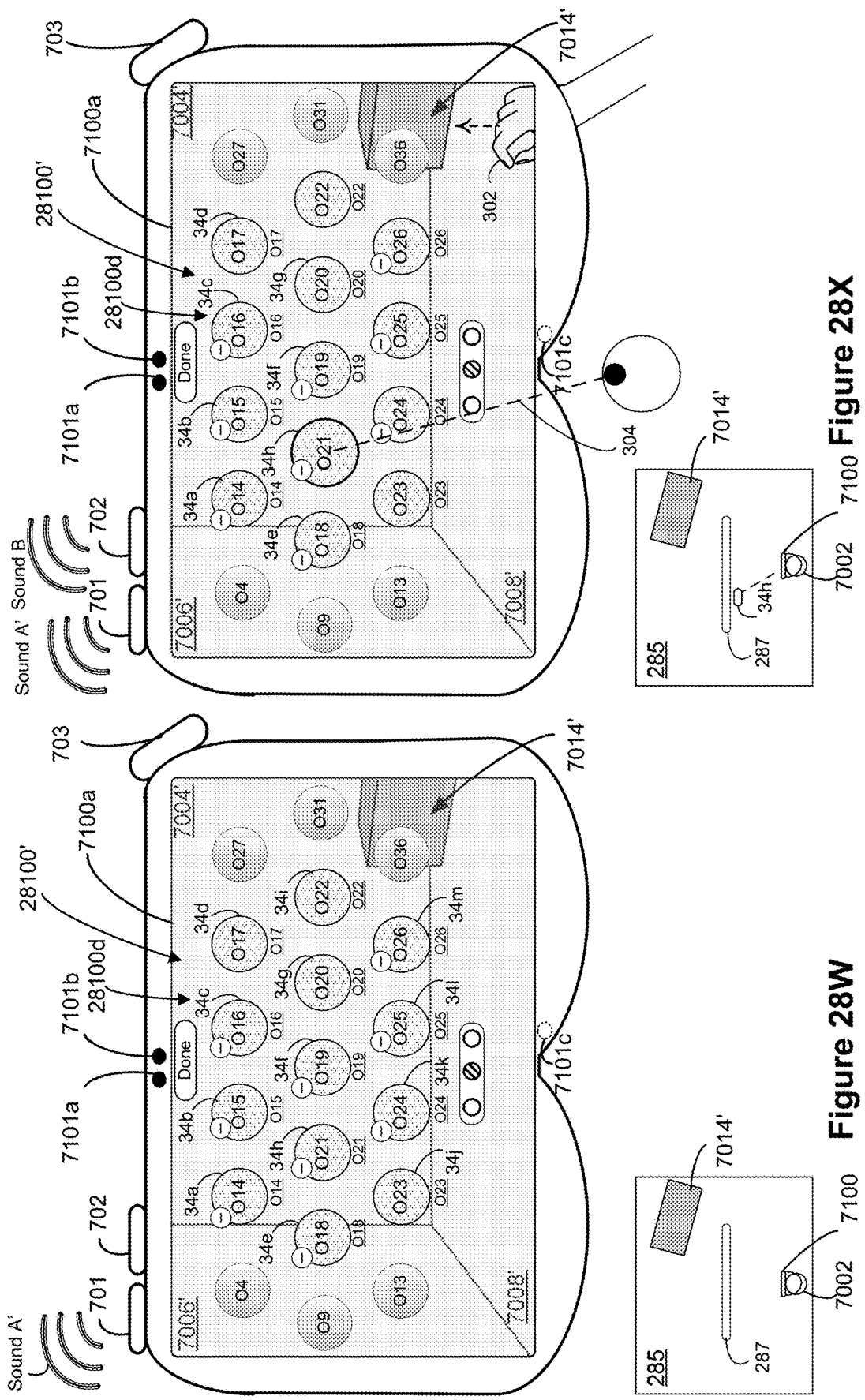

FIG. 28W is a transition from FIG. 28V in response to the detection of the release 300 of pinch gesture 298. In response to the detection of the release 300 of pinch gesture 298, the computer system 101 places icon 34*h* in the placement location previously occupied by icon 34*f* and shifts icon 34*f* to the placement location previously occupied by icon 34*g* (and icon 34*g* has already been moved to the placement location originally occupied by icon 34*h* in FIG. 28S). Accordingly, icon 34*h* has been moved within the middle row by two spots in the leftward direction and icons 34*f* and 34*g* has reflowed to make room for icon 34*h* that was dragged. FIG. 28W shows a stable state of the rearrangement of icons 34*h*, 34*g*, and 34*g* in home menu user interface 21800*d*, after the termination of pinch gesture 298 and movement input 298*a*.

As mentioned above, when an icon changes rows in the arrangement of icons during reflow caused by relocation of a dragged icon in the home menu user interface, the icon moves away in depth from the viewpoint of the user 7002, e.g., moves behind the plane 287 of the home menu user interface before moving toward the destination location in another row. For example, FIGS. 28X-28AB illustrate that icon 34*d* moves behind plane 287 while icon 34*d* is being reflowed from the top row to the middle of the arrangement of icons 34*a*-34*m*, due to the relocation of icon 34 by a drag input (e.g., pinch gesture 28302 that selects icon 34*h* followed by movement input 28302*a* while maintaining the pinch gesture 28302).

FIG. 28X illustrates the same home user interface 28100*d* in view 28100' as illustrated in FIG. 28W (e.g., after icons 34*h*, 34*g*, and 34*g* have been rearranged). In FIG. 28W, the computer system 101 detects gaze input 299 of user 7002 directed to icon 34*h* (e.g., with less than a threshold amount of movement for more than a threshold amount of time) that causes the computer system 101 to put icon 34*h* in focus (e.g., again). In some embodiments, in response to detecting the gaze input 299, the computer system 101 generates and outputs a hover sound indicating that user's attention is directed at icon 34*h*. Further, in FIG. 28X, the computer system 101 detects a pinch gesture 28302 performed with user 7002's hand while icon 34*h* has input focus (e.g., as a result of gaze input 299). In response to the detection of pinch gesture 28302 while icon 34*h* is in focus, the computer system 101 selects icon 34*h* and optionally moves icon 34*h* towards the viewpoint of user 7002 and away from plane 287 (e.g., moving the selected icon 34*h* closer to user 7002) resulting in a distance in depth between icon 34*h* and plane 287 (the other icons in home menu user interface 28100*d*), as illustrated in top view 285 in FIG. 28X. FIG. 28X further illustrates that user 7002's hand is about to move in an upward direction, as illustrated by the dashed arrow connected to hand 7002.

Figures 28Y, 28Z:
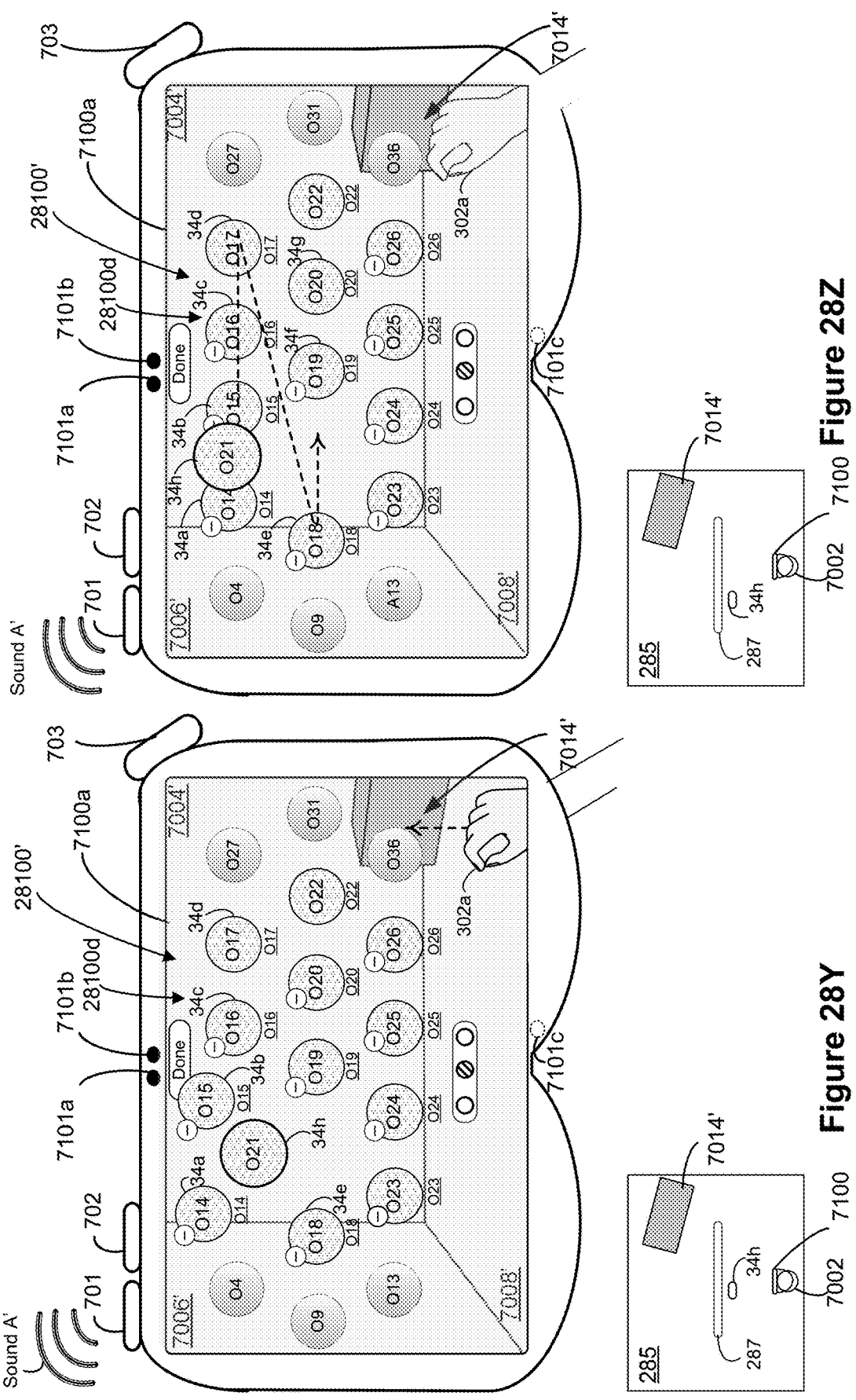
Figure 28A:
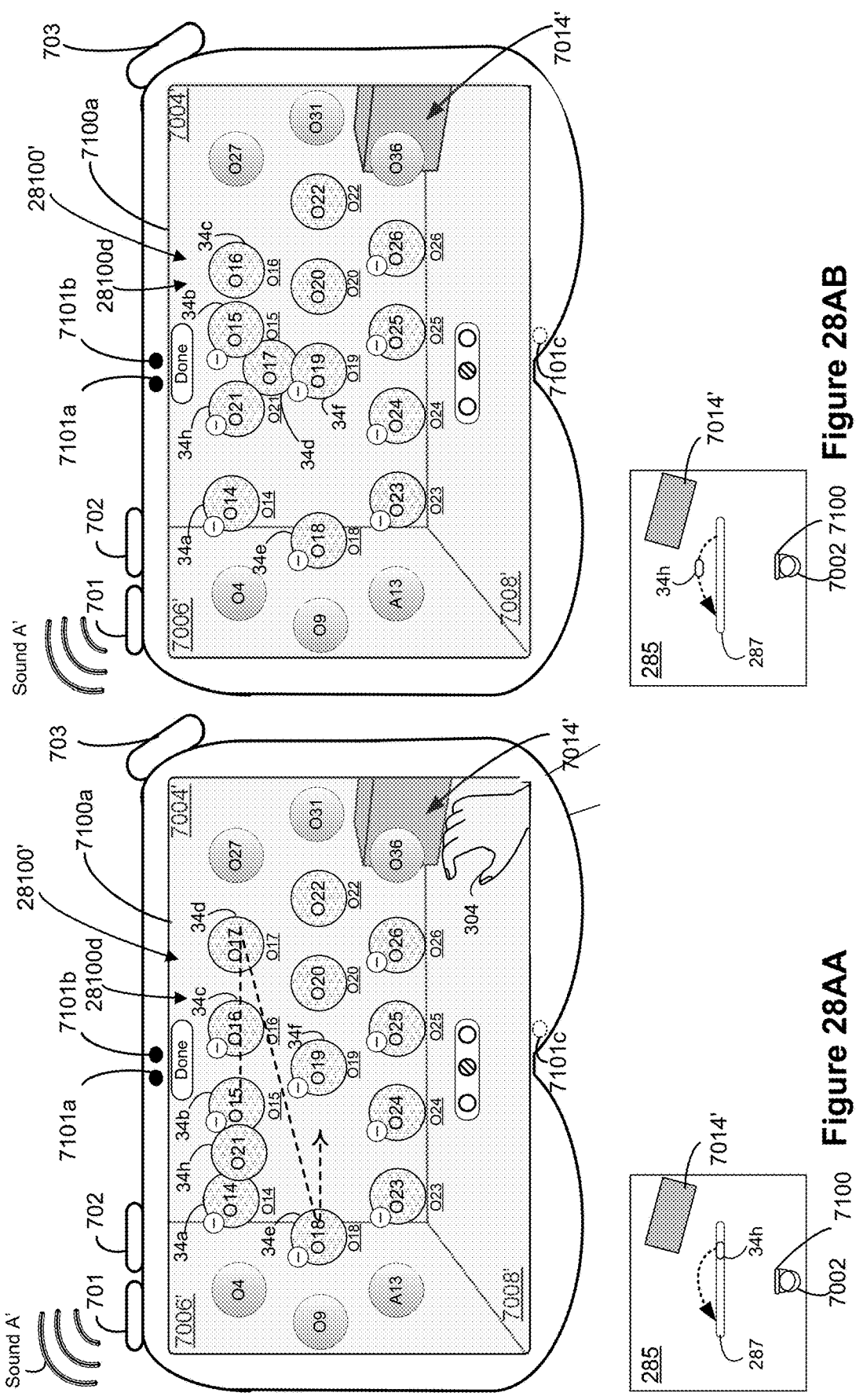
Figure 28A:
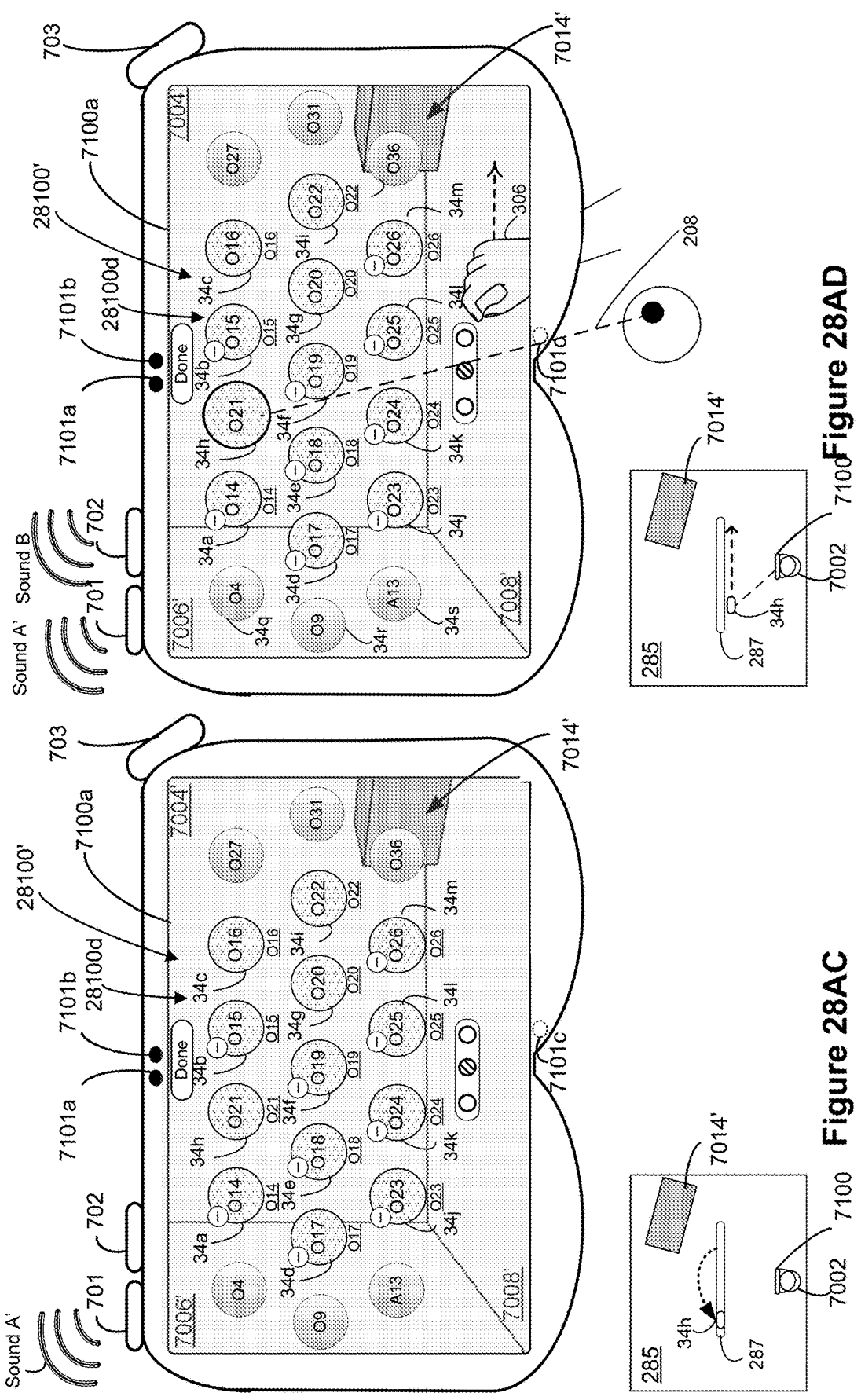
Figure 28A:
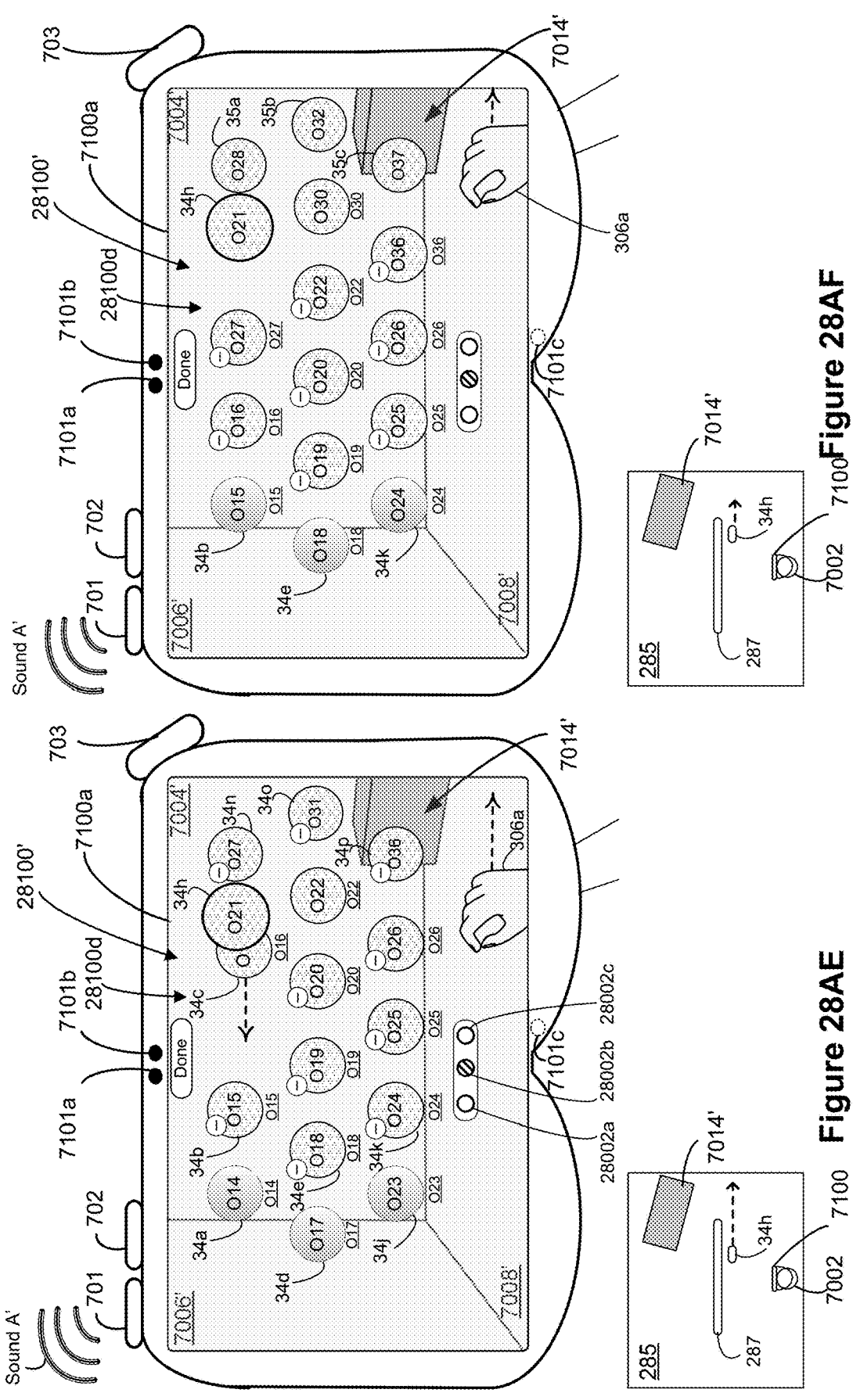
Figure 28A:
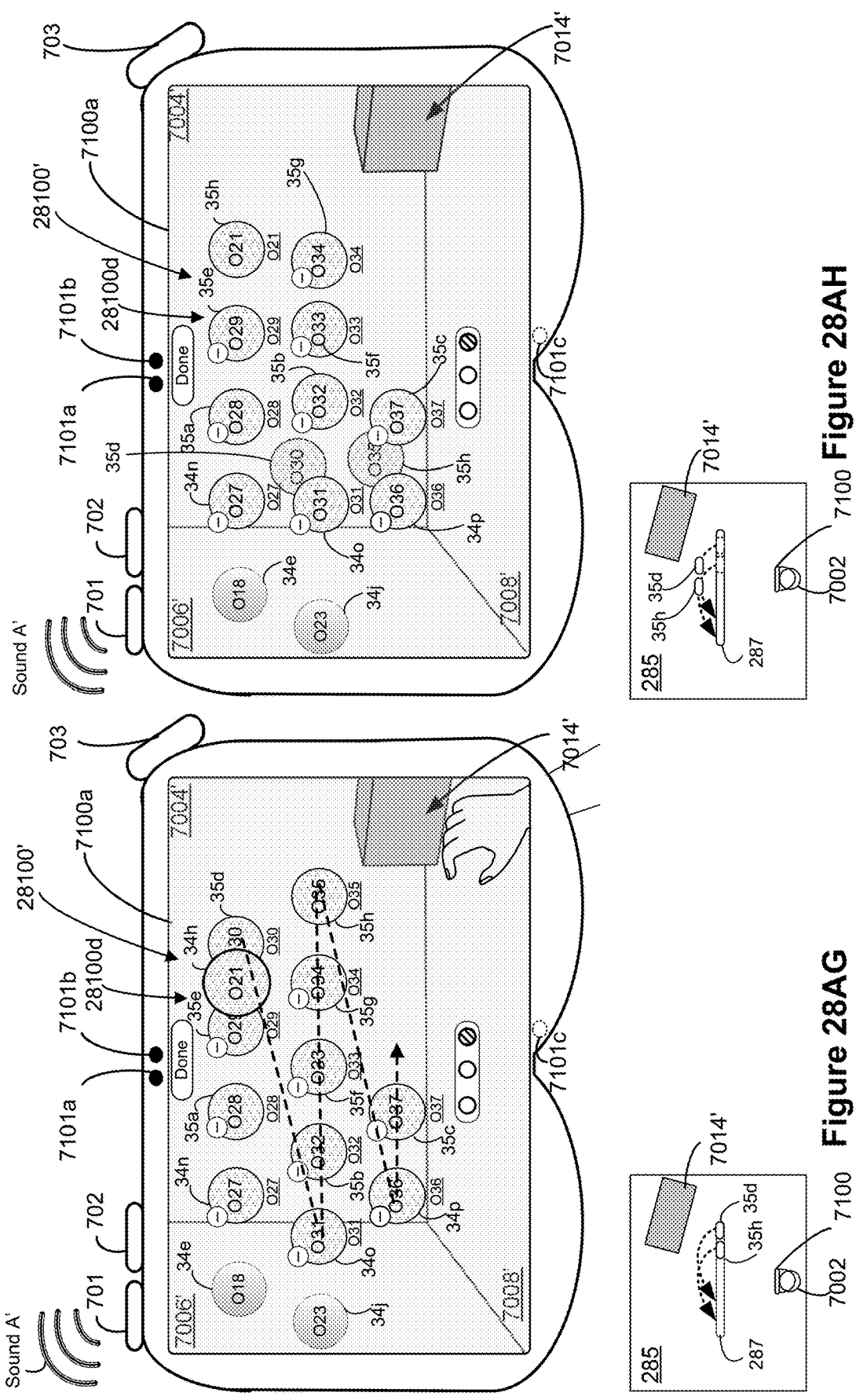
Figure 28A:
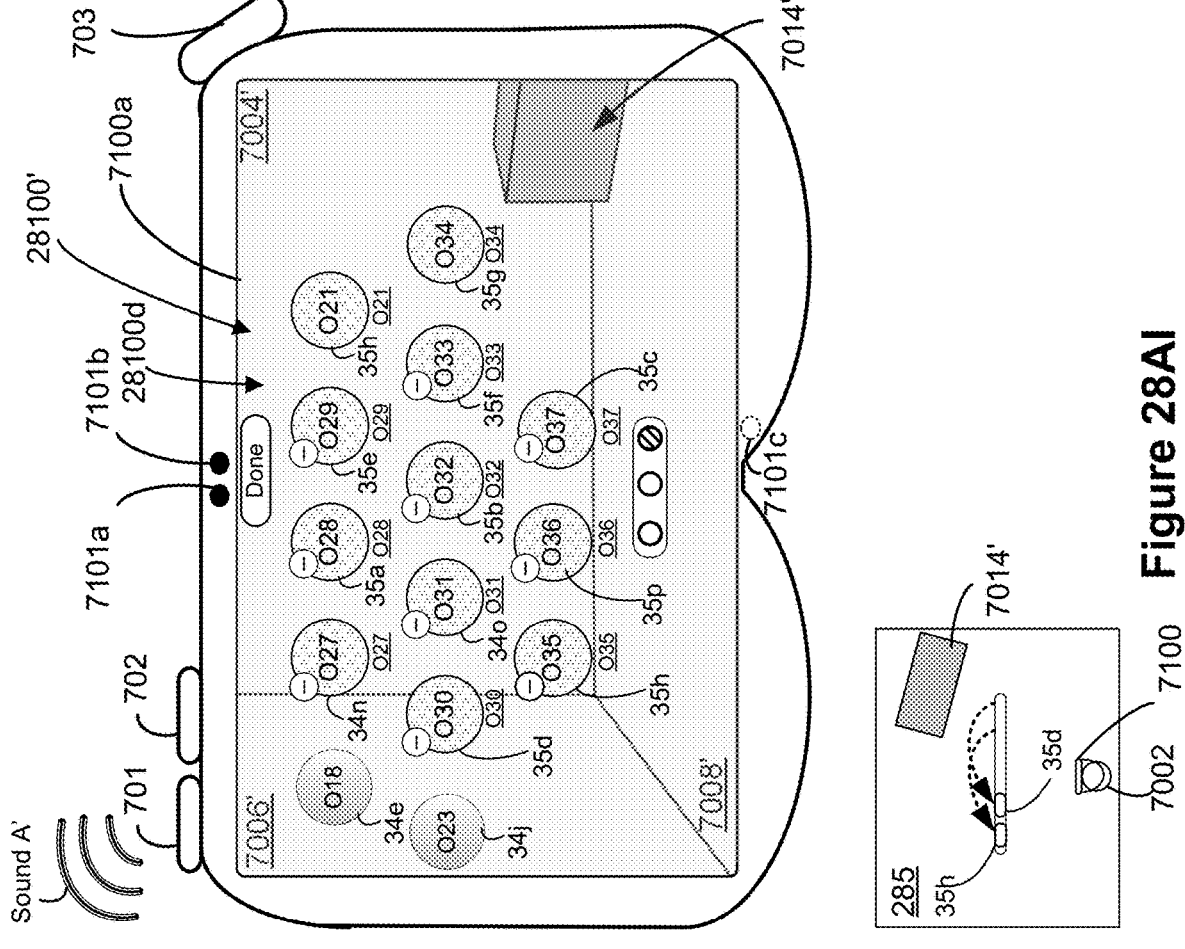

FIG. 28Y is a transition from FIG. 28X in response to the detection of movement input 28302*a* in the upward direction while icon 34*h* is selected (e.g., remain selected as pinch gesture 28302 is maintained). In response to the detection of movement input 28302*a* in the upward direction while icon 34*h* is selected, the computer system 101 moves icon 34*h* in the upward direction towards the top row and the top edge of view 28100' provided via display generation component 7100*a*, in accordance with the speed, direction and/or magnitude of movement input 28302*a*. In response to the detection of movement input 28302*a* in the upward direction while icon 34*h* is selected and in accordance with a determination that that icon 34*h* has moved less than the threshold amount towards the top row (e.g., there is more than ½ or ⅓ left of the distance between the top row and the middle row), the computer system 101 pushes icons 34*a* and 34*b* away from icon 34*h* that is being dragged (e.g., without moving icon 34*h* to the upper row and shifting icons in the top row along the top row to make room for icon 34*h*). Further, FIG. 28Y illustrates that user 7002's hand is about to move even further in the upward direction, as illustrated by the dashed arrow connected to hand 7002.

FIG. 28Z is a transition from FIG. 28Y in response to the detection of further movement of movement input 28302*a* in the upward direction while icon 34*h* is selected (e.g., remains selected while pinch gesture 28302 is maintained). In response to the detection of the further movement of movement input 28302*a* in the upward direction while icon 34*h* is selected, the computer system 101 moves icon 34*h* in the upward direction towards the top row and the top edge of view 28100' provided via display generation component 7100*a*, in accordance with the speed, direction and/or magnitude of the further movement of movement input 28302*a*. Further, in response to the detection of the further movement input 28302*a* in the upward direction while icon 34*h* is selected and in accordance with a determination that the movement of icon 34*h* has met the conditions for changing rows (e.g., icon 34*h* has moved to a position less than a threshold distance away from the top row or is within the top row), the computer system 101 hovers icon 34*h* over the second placement location in the top row, e.g., between icon 34*a* and 34*b*. Further, the dashed arrow in FIG. 28Z illustrates a movement path (also referred to as a snaking pattern or reflow path) along which icons 34*b*, 34*c*, 34*d* and 34*c* that are ordered between the new placement location of icon 34*h* and the original placement location of icon 34*h*, are about to shift by one placement location in a snake-like pattern. In some embodiments, even though icon 34*h* has moves from the middle row to the top row laterally (e.g., hovered over the second placement location in the top row), the computer system 101 maintains the depth of icon 34*h* above plane 287 as icon 34*h* is displayed closer to the viewpoint of user 7002 while it is being dragged, as illustrated in top view 285 in FIG. 28Z.

FIG. 28AA is a transition from FIG. 28Z in response to the detection of release 305 of the pinch gesture 28302. In response to the detection of release 305 of the pinch gesture 28302, the computer system 101 places icon 34*h* in the placement location previously occupied by icon 34*b* and reflows icon 34*b*, 34*c*, 34*d* and 34*e* by one placement location along the movement path (also referred to as a reflow path or snaking pattern) illustrated by the dashed arrow (e.g., in a snake-like pattern from left to right and from top to bottom) to make room for icon 34*h*. Since the top row in the arrangement of icons 34*a*-34*m* was fully filled prior the relocation of icon 34*h* into the top row, one icon from the top row needs to move to the row below (e.g., the middle row) to make room for icon 34*h*. For example, top view 285 illustrates with a dashed line that icon 34*d* (e.g., last icon in the top row) is about to move to the row below, as a result of the relocation of icon 34*h* to the top row. While the user interfaces described herein are described with reference to a particular reflowing pattern, it should be understood that many other different reflowing patterns could be used where icons reflow vertically, horizontally, radially, or in another reflow pattern that is set by the computer system or selected by a user of the computer system.

FIG. 28AB illustrates an intermediate state of home menu user interface 28100*d* while the computer system 101 reflows icons 34*b*, 34*c*, 34*d* and 34*c*; and, in particular, while the computer system 101 reflows icon 34*d* from the top row to the row below (e.g., from the last position in the top row to the first position in the middle row, and/or directly from its original position in the top row to its destination position in another row), in response to the detection of release 305 of the pinch gesture 28302. Top view 285 illustrates movement of icon 34*d* along the path of the dashed arrow that icon 34*d* is flowing from the top row to the row below. Although the dashed arrow shows a curved path, in some embodiments, the icon 34*d* may be pushed back away from the viewpoint of the user first, and then travel in a plane parallel to the plan 287 in a straight line, and then move toward the viewpoint to rejoin plan 287 at its destination location in the second row. In contrast to icon 34*d*, icons 34*b*, 34*c*, and 34*e* remain displayed at the same distance from the viewpoint of the user 7002 (e.g., at distance at which plane 287 is displayed from the viewpoint of user 7002) as icons 34*b*, 34*c*, and 34*c* move within the same row and within plane 287. For example, icons 34*b* and 34*c* are moved from the second and third placement locations in the top row, to the third and fourth placement locations in the top row, respectively; and icon 34*c* is about to move to second placement location from the first placement location in the middle row in view 28100' in FIG. 28AB, e.g., waiting for icon 34*d* to get sufficiently close to the first placement location in the middle row).

FIG. 28AC illustrates a transition from FIG. 28AB after icons 34*b*, 34*c*, 34*d* and 34*c* have reflowed to make room for icon 34*h* that has been relocated from the second placement location in the middle row to the second placement location in the top row. FIG. 28AC illustrates a steady state of home menu user interface 28100*d* after icons 34*h*, 34*b*, 34*c*, 34*d* and 34*e* have been rearranged (e.g., in response to movement input 28302*a* dragging icon 34*h* from the middle row to the upper row in the arrangement of icons 34*a*-34*m*). As illustrated in top view 285 in FIG. 28AC, icon 34*d* has returned to plane 287 where it was located before it was reflowed from the top row to the middle row. For example, icon 34*d* is displayed at the same distance from the viewpoint of user 7002 as the rest of icons 34*a*-34*m* in home user interface 28100*d*. In addition, icon 34*h* is also returned to plan 287 and now resides in the top row of the second section of home menu user interface 28100*d*, as shown in FIG. 28AC, after the release 305 of pinch gesture 28302 in FIG. 28AA.

In some embodiments, as described above in relation to FIG. 28F, the computer system 101 displays a preview of adjacent section(s) (or page(s)) in conjunction with activating the icon reconfiguration mode. For example, in FIG. 28F-28AC, the preview of the adjacent sections includes dimmed representations of icons 34*n*, 340, and 34*p* from the third section (a section ordered after the currently displayed section), and dimmed representations of icons 34*q*, 34*r*, and 34 from the first section (a section ordered before the currently displayed section). The preview of adjacent sections in the reconfiguration mode indicates to a user that one or more icons can be dragged to the adjacent sections from the currently displayed section. For example, FIGS. 28AD-28AI illustrate that icons 34*h* is dragged from the second section to the third section of the home menu user interface 28100*d* while the icon reconfiguration mode is active. In some embodiments, is illustrated in FIG. 28F-28AC, while the icon reconfiguration mode is active, the preview of the adjacent sections continues to be displayed. In some embodiments, the arrangement of icons in home user interface 28100*d* cannot be modified while in the normal mode.

Analogous to FIGS. 21G-21L that illustrate relocation of icon A5 21010 from the first page to the second page of home user interface 21100 (e.g., while home user interface 21100 is in the icon reconfiguration mode), FIGS. 28AD-28AI illustrate relocation of icon 34h from the second section to the third section of home user interface 28100d, in accordance with some embodiments. In contrast to FIGS. 21G-21L, preview of adjacent sections in 28AD-28AI are displayed without the additional condition that icon 34h is first dragged towards the adjacent section (e.g., whereas, in FIGS. 21G-21, application icons included in the adjacent page remain hidden until the application icon has moved close enough to the adjacent page). In some embodiments, it advantageous to display the preview of adjacent pages or section without the need to first move an icon towards the edges of the display generation component 7100a (e.g., reduces the number of inputs and/or time needed to relocate an icon to an adjacent page as the visual feedback of the preview indicates to the user that an icon can be moved towards the adjacent sections without first having to move the icon). In some embodiments, techniques applied with respect the relocation of icon A5 21010 from the first page to the second page of home user interface 21100 in FIGS. 21G-21L optionally also apply to the relocation of icon 34h from the second section to the third section of home menu user interface 28100d.

In some embodiments, the preview of the first section and the third section adjacent to the currently displayed second section of the home menu user interface 28100' includes a view of only a small subset of icons in the adjacent sections (e.g., an edge column, or the last icon from each row). In some embodiments, the view of the subset of icons from the adjacent sections do not include labels for the icons, and optionally changes the appearance of the icons to a point that the identities of the icons are less discernable compared to when their section becomes the currently displayed section of the home menu user interface.

FIG. 28AD illustrates the same home user interface 28100d shown in FIG. 28AC after icon 34h has been moved from the middle row to the top row. While home menu user interface 28100d is in the icon reconfiguration mode, the computer system 101 detects gaze input 28208 of user 7002 directed to icon 34h (e.g., with less than a threshold amount of movement for more than a threshold amount of time) that causes the computer system 101 to put icon 34h in focus (again). In some embodiments, in response to detecting the gaze input 28208, the computer system 101 generates and outputs a hover sound indicating that user's attention is directed to icon 34h. Further, in FIG. 28AD, the computer system 101 detects a pinch gesture 298 performed with user 7002's hand while icon 34h has input focus (e.g., as a result of gaze input 308). In response to the detection of pinch gesture 28306 while icon 34h is in focus, the computer system 101 selects icon 34h and optionally moves icon 34h towards the viewpoint of user 7002 and away from plane 287 (e.g., lifting off icon 34h toward the viewpoint of user 7002), resulting in an increased distance in depth between icon 34h and plane 287, as illustrated in top view 285 of FIG. 28AD. FIG. 28AD further illustrates that user 7002's hand is about to move in a rightward direction, as illustrated by the dashed arrow connected to user 7002's hand. Top view 285 in FIG. 28AD illustrates position of icon 34h relative plane 287 and the direction of movement of icon 34h towards the right edge of view 28100' provided via display generation component 7100a, with a dashed arrow connected to icon 34h.

FIG. 28AE is a transition from FIG. 28AD in response to the detection of movement input 28306a. Movement input 28306a is detected while icon 34h is selected (e.g., as a result of maintaining the pinch gesture 28306 detected in FIG. 28AD while icon 34h is in focus). In response to the detection of movement input 28306a while icon 34h is selected, the computer system 101 moves icon 34h in a rightward direction from the second section to the third section, in accordance with speed, direction and/or magnitude of movement input 28306a. FIG. 28AE illustrates a transitional state of home menu user interface 28100d while icon 34h is being dragged towards the next (adjacent) section. FIG. 28AE illustrates that icon 34h has been dragged towards the third section (e.g., towards the right edge of view 28100' provided via display generation component 7100a) but that the third section is still not displayed fully in view 28100'. In some embodiments, as icon 34h is being dragged towards the third section, icon 34a, 34d, and 34j that were displayed on the leftmost edge in the arrangement of the second section in FIG. 28AD (e.g., the icons that were displayed in the first placement locations in each row of the currently displayed section in FIG. 28AD) start to move leftward and reduce in visual prominence (e.g., dimmed and faded away), and the dimmed versions of icons 34q, 34r, and 34s have completely moved out of view 28100' indicating that the arrangement is scrolled, as shown in FIG. 28AE. Further, view 28100' in FIG. 28AE illustrates that icons 34n, 340, and 24p in the third section (e.g., the icons in the leftmost edge of the arrangement in the third section, and/or icons in the first placement locations in each row of the third section) that were previously dimmed have faded in and have moved leftward and are no longer dimmed in view 28100'. Further, FIG. 28AE illustrates that icon 34c is sliding underneath icon 34h to make room for icon 34h while icon 34h is being dragged rightward. In other words, the arrangement of icons in view 28100' are being scrolled due to the rightward movement of the dragged icon 34h, and icons on the leftmost edge of the second section fade away while icons on the leftmost edge of the adjacent third section fade in in view 28100'.

FIG. 28AF is a transitional state of home menu user interface 28100d while icon 34h is dragged further rightward (or icon 34h is held within a threshold distance of the right edge of the viewport through which view 28100' is visible) in accordance with the movement input 28306a in the rightward direction. FIG. 28AF is a transition from FIG. 28AE. FIG. 28AF illustrates that icons from the third section continue to move leftward and fade in while icons from the second section continue to move leftward and fade out from view 28100'. For example, as icon 34h is being dragged towards the third section of home menu user interface 28100d, icon 34b, 34c, and 34k that are displayed leftmost in the remaining portion of the second section in FIG. 28AF move leftward and fade away, and the dimmed versions of icons 34a, 34d, and 34j have moved out of view 28000' indicating that icons in the arrangement are scrolled. Further, icons 35a, 35b, and 35c from the second placement locations in the first, second, and third rows of the third section have appeared in view 28100', joining icons 34n, 340, and 34p from the third section. Further, FIG. 28AF illustrates that icon 34c has moved underneath icon 34h and taken the second placement location in the top row of the second section (e.g., the placement location vacated by icon 34h).

FIG. 28AG illustrates that icon 34h has been dragged to the third section (now fully displayed as the currently displayed section of home menu user interface 28100d in view 28100') and towards the last placement location in the top row of the third section. FIG. 28AG is a transitional state of home menu user interface 28100*d* while icon 34*h* is dragged. In some embodiments, because the computer system 101 has switched to displaying the third section in response to the movement input 28306*a* dragging icon 34*h*, the section indicator 28002*c* is visually highlighted to indicate that the third section is now the currently displayed section in view 28100' (e.g., relative to section indicators 28002*b* that is no longer highlighted). The dashed arrow in FIG. 28AG illustrates the movement path (also referred to as reflow path or snaking pattern) of icons in the arrangement that the computer system 101, according to which the computer system automatically shift the icons to make room for icon 34 that is being dragged to the last placement location in the top row of the third section of the multi-section arrangement of home menu user interface 28100*d*.

In FIG. 28AG, the computer system 101 is about to automatically reflow icon 35*d* from the last placement location in the top row to the first placement location in the middle row, and reflow the icon 35*h* from the last placement location in the middle row to the first placement location in the last row. Accordingly, icons 35*d* and 35*h* are about to change rows and, therefore, first move backward in depth to positions behind plane 287, as illustrated by the dashed arrows in top view 285 in FIG. 28AG, and then move toward their respective new positions in another row. In some embodiments, icons 35*d* and 35*h* move in the same plane behind plane 287. In some embodiments, icons 35*d* and 35*h* have different movement paths that do not cross one another (e.g., on different planes or surfaces behind plane 287). Further, the computer system 101 is about to automatically reflow or shift icons 340, 35*b*, 35*f*, and 35*g* by one placement location to the right within the middle row and reflow or shift icons 34*p* and 35*c* by one placement location to the right within the last row. Accordingly, icons 340, 35*b*, 35*f*, 34*g*, 34*p*, and 35*c* that move within their respective rows to make room for icon 34*h* would not move behind plane 287 (e.g., in contrast to the icons 35*d* and 35*h* that move behind place 287 as they are reflowing to change rows). Further, because the second section now has one less icon (e.g., icon 34*h* has been moved to the third section), icons on the second page have shifted by one placement location and the last placement location in the last row is now empty, as illustrated in view 28100' shown in FIG. 28AG.

FIG. 28AH is a transition state illustrating the reflowing of icons in the third section to make room for icon 34*h* that has been relocated from the top row in the second section to the last position in the top row in the third section. As described above in relation to FIG. 28AG, computer system 101 automatically reflows icon 35*d* from the last placement location in the top row to the first placement location in the middle row and reflows icon 35*h* from the last placement location in the middle row to the first placement location in the last row in the third section of home menu user interface 28100*d*. View 28100' in FIG. 28AH illustrates an intermediate state in which the icons that are changing rows are flowing along the movement path illustrated with dashed arrow in FIG. 28AG, after a release of pinch gesture 28306 has been detected while icon 34*h* is over the last placement location in the top row (shown in FIG. 28AG). Further, top view 285 in FIG. 28AH illustrates that icons 35*d* and 35*h* are moving behind plane 287 while icons 35*d* and 35*h* are changing rows and moving toward their new positions in the different rows.

FIG. 28AI illustrates a steady state of home menu user interface 28100*d* after icon 34*h* has been relocated from the second section to the third section and icons in the third section have shifted to make room for icon 34*h* in the third section. In particular, top view 285 illustrates that icons 35*d* and 35*h* that changed rows are no longer behind plane 287 and are placed back in their respective new positions in plane 287. Furthermore, icon 34*h* also returned to plane 287 after being inserted into the last placement location in the first row of the third section in home menu user interface 28100*d*. If the computer system exits the reconfiguration mode now (e.g., in response to selection of the "Done" button 28028), the home menu user interface 28100*d* is displayed in the state shown in FIG. 28D (e.g., without the preview of the adjacent second section (e.g., the view of icons 34*e* and 34*j* of the second section), except that the currently displayed section would be the third section (e.g., including icons 34*n*, 35*a*, 35*c*, 34*h*, 35*d*, 340, 35*b*, 35*f*, 35*g*, 35*h*, 35*p*, and 35*c*), rather than the second section. In this example, since the third section is the last section of home menu user interface 28100*d*, there is no preview of another section on the right side of the third section, when the third section is the currently displayed section in the normal mode.

FIGS. 29A-29F are flow diagrams of an exemplary method 29000 for rearranging a home menu user interface in a mixed-reality three-dimensional environment, in accordance with some embodiments. In some embodiments, method 29000 is performed at a computer system that is in communication one or more display generation devices (e.g., one or more display devices, such as touch-screen displays, projectors, head-mounted displays, LCD displays, LED displays, displays that include video and/or physical pass-through portions, and other types of displays) and one or more input devices (29002). In some embodiments, the method 29000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 29000 are, optionally, combined and/or the order of some operations is, optionally, changed.

As described herein method 2900, provides an improved mechanism for reconfiguring a multi-section arrangement of a collection of user interface objects, optionally, of the same type (e.g., a home menu user interface with application icons for opening application, an environment picker user interface, and/or a communication initiation user interface) in a mixed-reality three-dimensional environment is provided. While a respective section of the multi-section arrangement is displayed, the computer system detects an input for activating the reconfiguration mode (e.g., for rearranging user interface objects in the multi-section arrangement). In response to the input for activating the reconfiguration mode, the computer system activates the reconfiguration mode (optionally providing visual feedback that the reconfiguration mode is active, such as oscillating the user interface objects in three dimensions around their respective axes). In conjunction with activating the reconfiguration mode, the computer system displays preview of the adjacent sections, if any, of the multi-section arrangement, including optionally displaying some of the user interface objects that are located in the adjacent sections (e.g., optionally visually deemphasized or dimmed relative to user interface objects on the respective, currently in focus, section). Displaying a preview of the adjacent sections (or other indication of the adjacent sections) in conjunction with activating the reconfiguration mode, assists a user and provides guidance to the user that moving a selected user interface object from the respective section to a different, adjacent section, is a valid configuration (e.g., one that the computer system can perform), thereby reducing the number of input and/or time needed to relocate a selected user interface object from one section to another in the multi-section arrangement. Further, the preview of the adjacent sections in the reconfiguration mode, is displayed prior to, or without the need for, movement input that drags a selected user interface object towards a respective adjacent page of the two adjacent pages, thereby reducing the number of input and/or time needed to needed to rearrange a home menu user interface in a mixed-reality three-dimensional (e.g., the user does not have to drag the user interface object to discover whether there is an adjacent section or whether the dragged user interface object can be relocated to the adjacent section).

The computer system displays (29004), via the one or more display generation components, a first view of an environment (e.g., a two-dimensional user interface and/or a two-dimensional window that is capable of displaying indications of differences in depths (e.g., via simulated shadows, virtual parallax effects, visual obscuring, and/or other visual effects), or a three-dimensional environment such as a three-dimensional virtual reality environment, a three-dimensional augmented reality environment, and/or a three-dimensional extended reality environment), including displaying a first section of a first multi-section arrangement of a first plurality of user interface objects (e.g., the first multi-section arrangement is a multi-section arrangement of a collection of selectable icons for launching applications, a multi-section arrangement of a collection of icons for communicating with contacts, a multi-section arrangement of a collection of icons for displaying AR/VR experiences and/or virtual environments, a multi-section arrangement of a collection of controls for accessing and/or activating different device functions, a multi-section arrangements of a collection of another type of icons or mix of multiple types of icons) in the first view of the environment (e.g., at a first depth and a first position in the pseudo-three-dimensional environment or in the three-dimensional environment), wherein the first section of the first multi-section arrangement of the first plurality of user interface objects includes a first subset of the first plurality of user interface objects. For example, the first subset of the first plurality of user interface objects is a subset of the collection of application icons when the first multi-section arrangement of the first plurality of user interface objects is a multipage arrangement of a plurality of application icons for different applications, or a subset of the collection of icons for contacts when the first multi-page arrangement of the first plurality of user interface objects is a multipage arrangement of a plurality of representations of users or contacts, or a subset of the collection of icons for experiences and/or virtual environments when the first multi-page arrangement of the first plurality of user interface objects is a multipage arrangement of a plurality of representations of three-dimensional experiences and/or virtual environments, or a subset of the collection of controls when the first multipage arrangement of the first plurality of user interface objects is a multipage arrangement of a plurality of controls for different control functions of the computer system, or a subset of a collection of another type of icons when the first multipage arrangement of the first plurality of user interface objects is another multipage arrangement of objects of a first object type or functionality. In some embodiments, a home menu user interface includes two or more multi-section arrangements, where each multi-section arrangement corresponds to a respective type of objects (e.g., application icons, contacts, experiences, and/or other object types). In some embodiments, different multi-section arrangements are individually configurable, and objects within a respective multi-section arrangement are only repositionable within different sections of the respective multi-section arrangement, but cannot be repositioned into a different multi-section arrangement for a different object type (e.g., app icons cannot be dragged and dropped into the arrangement for contacts or experiences, and vice versa). In some embodiments, the home menu user interface includes the first multi-section arrangement of the first plurality of user interface objects, and a second multi-section arrangement of a second plurality of user interface objects (e.g., of a different object type from the first plurality of user interface objects). In some embodiments, the home menu user interface optionally includes single-section arrangement of user interface objects of a respective object type when the total number of user interface objects of the respective object type does not exceed a first threshold number of objects (e.g., a single page arrangement is sufficient to include all of the objects of the respective object type). In some embodiments, a single section arrangement is automatically transformed into a multi-section arrangement when more than the threshold number of objects are added to the arrangement; and a multi-section arrangement is automatically transformed into a single section arrangement when one or more sections are vacated due to deletion and/or repositioning of objects from the one or more sections.

While the computer system displays, via the one or more display generation components, the first section of the first multi-section arrangement of the first plurality of user interface objects in the first view of the environment (e.g., in a normal mode, without displaying other sections of the first multi-section arrangement of the first plurality of user interface objects), the computer system detects (29006), via the one or more input devices, one or more first user inputs (e.g., a single user input, or a sequence of two or more user inputs) that correspond to a request to activate the first reconfiguration mode for the first multi-section arrangement of the first plurality of user interface objects (e.g., a long pinch and hold input detected while a gaze is directed to a user interface object in the first section of the first multi-section arrangement, a pinch-hold input followed by a drag input directed to a user interface object in the first section of the first multi-section arrangement, a pinch and hold input directed to a user interface object followed by selection of an option displayed in response to the pinch and hold input, and/or other user inputs that trigger an icon reconfiguration mode for the home screen user interface), wherein respective positions of one or more user interface objects in the first multi-section arrangement of the first plurality of user interface objects are adjustable by a user (e.g., once in the first reconfiguration mode, the user interface objects can be dragged relative to the first section and to other sections of the first multi-section arrangement, and placed in a different position in the first multi-section arrangement, and optionally, causing additional sections to be created and/or other objects to be reflowed and repositioned in the first multi-section arrangement). In some embodiments, the environment is a mixed reality, augmented reality, or virtual reality three-dimensional environment.

The method 2900 further includes, in response to detecting the one or more first user inputs that correspond to a request to activate a first reconfiguration mode for the first multi-section arrangement of the first plurality of user interface objects, the computer system displays (29008), via the one or more display generation components, the first multi-section arrangement of the first plurality of user interface objects in the first reconfiguration mode (e.g., with visual feedback to indicate that the first multi-section arrangement is in a user-configurable state, such as animating the user interface objects, and/or pushing the first section of the first multi-section arrangement to a greater z depth), including concurrently displaying the first section of the first multi-section arrangement of the first plurality of user interface objects, and a view of a first portion (e.g., all, or less than all) of a second section of the first multi-section arrangement of the first plurality of user interface objects (e.g., a preview of the second section that includes a view of an edge portion of the second section and/or one or more user interface objects (e.g., a partial subset of the user interface objects included in the second section of the multi-section arrangement, and optionally translucent and/or dimmed versions of the user interface objects) from the second section of the first multi-section arrangement, arranged in accordance with the layout of the second section of the first multi-section arrangement), wherein the view of the first portion of the second section of the first multi-section arrangement includes first content (e.g., an edge of the second section, and/or user interface objects from a second subset of the first plurality of user interface objects that is included in the second section of the first multi-section arrangement) that was not displayed with the first section of the first multi-section arrangement before the first multi-section arrangement of the first plurality of user interface objects is displayed in the first reconfiguration mode (e.g., the preview of the second section is displayed as part of the visual feedback to indicate that the first reconfiguration mode has been activated, and also provides context for dragging and/or repositioning the user interface objects between the first section and the second section). For example, in FIG. 28E, in response to the detection of long pinch gesture 280 while icon 34*l* has input focus, the computer system 101 activates the icon reconfiguration mode, and, in conjunction with activating the icon reconfiguration mode, computer system 101 displays a preview of portions of the adjacent sections of home user interface 28100*d* (e.g., icons 34*m*, 34*n*, and 340 included in the next section in the multi-section home user interface 28100*d* and icons 34*p*, 34*q*, and 34*r* included in the previous section of the multi-section home screen interface 28100*d*), as illustrated in FIG. 28F.

In some embodiments, a first multi-section arrangement corresponds to a collection of objects of a first respective type that are arranged over multiple sections. In some embodiments, a second multi-section arrangement corresponds to a collection of objects of a second respective type, different from the first respective type, that are arranged over multiple sections. In some embodiments, a third multi-section arrangement corresponds to a collection of objects of a third respective type, different from the first and second respective types, that are arranged over multiple sections. For example, user interface objects of the first respective type correspond to application icons (e.g., for launching corresponding applications); user interface objects of the second respective type correspond to contact icons (e.g., for viewing and/or communicating with corresponding contacts that are saved or associated with the computer system or a user account); and/or user interface objects of the third respective type correspond to environment icons (e.g., activating corresponding virtual environments). In some embodiments, user interfaces and/or input mechanisms described with respect to the method 29000 can be used for any multi-section arrangement that includes user interface objects of the first, second, and/or third respective types. For example, entering the first reconfiguration mode and/or inputs or technique for reconfiguring a respective multi-section arrangements apply to collections that includes application icons, contact icons, and/or environment icons.

In some embodiments, displaying the first section of the first multi-section arrangement of the first plurality of user interface objects in the first reconfiguration mode, in response to detecting the one or more first user inputs that correspond to a request to activate the first reconfiguration mode for the first multi-section arrangement of the first plurality of user interface objects, includes (29010): concurrently displaying, via the one or more display components, a view of a first portion of a third section of the first multi-section arrangement (e.g., a preview of the third section that includes a view of an edge portion of the third section and/or one or more user interface objects (e.g., a partial subset of the user interface objects included in the third section of the first multi-section arrangement, and optionally translucent and/or dimmed versions of the user interface objects) from the third section of the first multi-section arrangement, arranged in accordance with the layout of the third section of the first multi-section arrangement) and the view of the first portion of the second section of the first multi-section arrangement, with the first section of the first multi-section arrangement (e.g., the first section corresponds to a currently displayed page of a first multipage arrangement, the first portion of the third section and the first portion of the second section respectively correspond to a preview of a previous page and a preview of a next page of the currently displayed page of the first multipage arrangement, displayed on two opposite sides of the currently displayed page). In some embodiments, the view of the first portion of the third section of the multi-section arrangement includes second content (e.g., an edge of the third section, and/or user interface objects from a third subset of the first plurality of user interface objects that is included in the third section of the multi-section arrangement) that was not displayed with the first section of the first multi-section arrangement before the first multi-section arrangement of the first plurality of user interface objects is displayed in the first reconfiguration mode (e.g., the preview of the third section is displayed as part of the visual feedback to indicate that the first reconfiguration mode has been activated, and also provides context for dragging and/or repositioning the user interface objects between the first section and the third section). For example, in FIG. 28E, in response to the detection of long pinch gesture 280 while icon 34*l* has input focus, the computer system 101 activates the icon reconfiguration mode, and, in conjunction with activating the icon reconfiguration mode, computer system 101 displays a preview of portions of the adjacent sections of home user interface 28100*d* (e.g., icons 34*m*, 34*n*, and 340 included in the next section in the multi-section home user interface 28100*d* and icons 34*p*, 34*q*, and 34*r* included in the previous section of the multi-section home screen interface 28100*d*), as illustrated in FIG. 28F. In some embodiments, the second section is adjacent to the first section and the third section is adjacent to the first section. In some embodiments, the first section, the second section, and the third section correspond to respective pages of a multi-page user interface. In some embodiments, the second section corresponds to a succeeding page (e.g., subsequent to a page corresponding to the first section), and the third section corresponds to a preceding page (e.g., previous to the page corresponding to the first section). In some embodiments, the second section corresponds to a preceding page (e.g., previous to a page corresponding to the first section), and the third section corresponds to a succeeding page (e.g., subsequent to the page corresponding to the first section). In some embodiments, when the first section is the starting section of the multi-section arrangement, the computer system does not display a preview of any previous sections and optionally displays an indication that there is no section preceding the first section, or temporarily creates a blank section preceding the first section and displays a preview of the blank section; and when the first section is the last section of the multi-section arrangement, the computer does not display a preview of any subsequent sections and optionally displays an indication that there is no section succeeding the first section, or temporarily creates a blank section succeeding the first section and displays a preview of the blank section. Displaying a preview of contents of a previous section (e.g., representations of a subset of the icons on the previous section or other indication of the previous section) in conjunction with activating the reconfiguration mode, assists a user and provides guidance to the user that moving a selected user interface object from the respective section to a previous, adjacent section, is a valid configuration (e.g., one that the computer system can perform), thereby reducing the number of input and/or time needed to relocate a selected user interface object from one section to another in the multi-section arrangement.

In some embodiments, the second section of the first multi-section arrangement of the first plurality of user interface objects includes (29012) a second subset of the first plurality of user interface objects (e.g., different from the first subset of the first plurality of user interface objects), and the first content, included in the first portion of the second section of the multi-section arrangement that is displayed in response to detecting the one or more first user inputs, includes one or more user interface objects (e.g., all, or less than all) of the second subset of the first plurality of user interface objects. For example, in FIG. 28E, in response to the detection of long pinch gesture 280 while icon 34*l* has input focus, the computer system 101 activates the icon reconfiguration mode, and, in conjunction with activating the icon reconfiguration mode, computer system 101 displays a preview of portions of the adjacent sections of home user interface 28100*d* (e.g., icons 34*m*, 34*n*, and 340 included in the next section in the multi-section home user interface 28100*d* and icons 34*p*, 34*q*, and 34*r* included in the previous section of the multi-section home screen interface 28100*d*), as illustrated in FIG. 28F. In some embodiments, the second section corresponds to a subsequent page of the first multipage user interface that is ordered after a currently displayed page of the first multipage user interface, and the first portion of the second section corresponds to a preview of the subsequent page of the first multipage user interface. In some embodiments, the second section corresponds to a previous page of the first multipage user interface that is ordered before a currently displayed page of the first multipage user interface, and the first portion of the second section corresponds to a preview of the previous page of the first multipage user interface. Displaying a subset of the icons in the preview of a previous section (e.g., representations of the icons on the previous section or other indication of the previous section) in conjunction with activating the reconfiguration mode, assists a user and provides guidance to the user that moving a selected user interface object from the respective section to a previous, adjacent section, is a valid configuration (e.g., one that the computer system can perform), thereby reducing the number of input and/or time needed to relocate a selected user interface object from one section to another in the multi-section arrangement.

In some embodiments concurrently displaying the first section of the first multi-section arrangement of the first plurality of user interface objects with the view of the first portion of the second section of the first multi-section arrangement of the first plurality of user interface objects, includes (29014): displaying, via the one or more display components, the first section of the first multi-section arrangement with a first set of display property values (e.g., a first set of values for brightness, size, color saturation, contrast, translucency, opacity, and/or other display properties that affect visual prominence) that corresponds to a first level of visual prominence, and displaying, via the one or more display components, the first portion of the second section of the first multi-section arrangement with a second set of display property values (e.g., a second set of values for brightness, size, color saturation, contrast, translucency, opacity, and/or other display properties that affect visual prominence) that corresponds to a second level of visual prominence that is less than the first level of visual prominence. For example, in FIG. 28F, icons 34*m*, 34*n*, and 340 included in the preview of next section in the multi-section home user interface 28100*d* and icons 34*p*, 34*q*, and 34*r* included in the preview of previous section of the multi-section home screen interface 28100*d*) are dimmed relative to icons 34*a*-34*m* in the middle section, as illustrated in FIG. 28F. In some embodiments, the first portion of the second section of the first multi-section arrangement, including an edge portion of the second section and/or one or more user interface objects from the second subset of the first plurality of user interface objects, is displayed with a blurred, faded, dimmed, reduced size, increased translucency, and/or with lower opacity, as compared to the first section of the first multi-section arrangement, including the edge portions and the first subset of the first plurality of user interface objects. In some embodiments, the first section is in focus when the request to enter the first reconfiguration mode is detected, and the preview of the previous or subsequent sections (e.g., also referred to as pages) are displayed with less visual emphasis (e.g., blurred, dimmed, reduced, made translucent, pushed back, and/or otherwise reduced in visual prominence) to provide visual feedback that there are additional user interface objects in the second and/or third section while also indicate that the second and/or third sections are not yet in focus. Displaying a preview of sections adjacent a current section (e.g., representations of the icons on the adjacent section or other indication of the adjacent sections) with less visual emphasis relative to the current section in conjunction with activating the reconfiguration mode, assists a user and provides guidance to the user that moving a selected user interface object from the current section to a previous or subsequent, adjacent section, is a valid configuration (e.g., one that the computer system can perform), thereby reducing the number of input and/or time needed to relocate a selected user interface object from one section to another in the multi-section arrangement.

In some embodiments, an improved mechanism for reconfiguring a multi-section arrangement of a collection of user interface objects, optionally, of the same type (e.g., a respective arrangement of a multi-arrangement home menu user interface that include a collection of application icons, a collection of icons for contacts, a collection of icons for environments and/or experiences, a collection of controls, or a collection of objects of another object type or multiple object types) in an environment (e.g., mixed-reality three-dimensional environment, or another type of environment) is provided. While a respective section of the multi-section arrangement is displayed, the computer system detects an input for activating the reconfiguration mode (e.g., for rearranging user interface objects in the multi-section arrangement). In response to the input for activating the reconfiguration mode, the computer system activates the reconfiguration mode (optionally providing visual feedback that the reconfiguration mode is active, such as oscillating the user interface objects around their respective axes). In conjunction with activating the reconfiguration mode, the computer system displays preview of the adjacent sections, if any, of the multi-section arrangement, including option- ally displaying some of the user interface objects that are located in the adjacent sections (e.g., optionally visually deemphasized or dimmed relative to user interface objects on the respective section). Displaying a preview of the adjacent sections (or other indication of the adjacent sec- tions) in conjunction with activating the reconfiguration mode, assists a user and provides guidance to the user that moving a selected user interface object from the respective section to a different, adjacent section, is a valid configura- tion (e.g., one that the computer system can perform), thereby reducing the number of input and/or time needed to relocate a selected user interface object from one section to another in the multi-section arrangement. Further, the pre- view of the adjacent sections in the reconfiguration mode, is displayed prior to, or without the need for, movement input that drags a selected user interface object towards a respec- tive adjacent page of the two adjacent pages, thereby reduc- ing the number of input and/or time needed to needed to rearrange a home menu user interface in a mixed-reality three-dimensional (e.g., the user does not have to drag the user interface object to discover whether there is an adjacent section or whether the dragged user interface object can be relocated to the adjacent section).

In some embodiments, displaying the first section of the first multi-section arrangement of the first plurality of user interface objects in the first reconfiguration mode, includes (29018), displaying, for a respective user interface object of one or more user interface objects of the first plurality of user interface objects (e.g., one or more user interface objects in the first section of the first multi-section arrange- ment when the first section is the currently displayed section and/or is in focus, and one or more user interface objects of another section of the first multi-section arrangement when said another section is the currently displayed section and/or is in focus), the computer system displays a respective deletion affordance (e.g., a deletion affordance that was not displayed when the first multi-section arrangement was displayed in the normal mode, prior to detecting the input (e.g., a long air pinch gesture detected while the user' attention is directed to a user interface object in the first subset of the first plurality of user interface objects, or another user input for triggering the first reconfiguration mode) that caused the computer system to display the first multi-section arrangement in the first reconfiguration mode), that when selected, causes the computer system to remove the respective user interface object from the first multi- section arrangement of the first plurality of user interface objects (e.g., hidden from the first multi-section arrange- ment, but optionally remains on the computer system, or deleted from the first plurality of user interface objects and removed from the computer system). In some embodiments, in the first reconfiguration mode (e.g., also referred to as icon reconfiguration mode), icons in the sections of the multi-section arrangement can be deleted, added, or reposi- tioned (e.g., moved from one section of the multi-section arrangement to another). In some embodiments, activating the first reconfiguration mode from the first section of the first multi-section arrangement, includes displaying, for icons in the first section (e.g., for some or all icons in the first section), respective delete affordances that, when selected, cause the computer system to delete the respective icons from the first section without moving the respective icons to other sections of the first multi-section arrangement. In some embodiments, a delete affordance is displayed near or at a respective icon that it controls. In some embodiments, some, less than all, user interface objects are displayed with respective deletion affordances, while some, less than all, user interface objects are displayed without respective dele- tion affordances (e.g., because deletion is not permitted by the computer system). For example, in conjunction with activating the reconfiguration mode and while home user interface 28100*d* is in the reconfiguration mode, the com- puter system displays a delete affordance near respective icons 34*a*, 34*b*, 34*c*, 34*c*, 34*f*, 34*g*, 34*j*, 34*k*, 341, and 34*m* for deleting a respective icon, such as delete affordance 34*a'* for deleting the icon 34*a*, while delete affordances for application icons 34*d*, 34*h*, 34*i* are not displayed as the corresponding applications cannot be deleted from the com- puter system (e.g., uninstalled), as illustrated in FIG. 28F. In some embodiments, in addition to or instead of the deletion affordance, the computer system optionally displays other affordances that correspond to other operations that can be performed with respect to the respective user interface object (e.g., updating, downloading, and/or other operations) and/or that correspond to status information related to the respective user interface object (e.g., number of unread notifications, number of unread messages, number of missed calls, or other status information). Displaying affordances (e.g., near respective objects) that correspond to operations that can be performed with respect to the respective user interface objects in the multi-section arrangement, in con- junction with activating the reconfiguration mode, provides additional controls for a user to reconfigure the multi-section arrangement and provides visual feedback to the user that such controls are available in the reconfiguration mode (e.g., indicating that the computer system in a state in which operations that are not available in the normal state of the multi-section arrangement).

In some embodiments, displaying the respective deletion affordance for the respective user interface object includes (29020) displaying the respective deletion affordance with a first appearance (e.g., having a first set of values for one or more display properties, such as size, display depth, color, saturation, brightness, translucency, opacity, resolution, and/ or other display properties), and the method 2900 includes: while displaying, via the one or more display components, the respective deletion affordance for the respective user interface object with the first appearance (e.g., in accordance with a determination that the user's attention is not currently directed to the respective user interface object and that the home menu user interface is displayed in the first recon- figuration mode), the computer system detects, via the one or more input devices, that attention of a user (e.g., as determined based on a location of a gaze input and/or other indications of the user's attention) is directed to the respec- tive deletion affordance for the respective user interface object (e.g., the attention is maintained on the respective deletion affordance for at least a threshold amount of time with less than a threshold amount of movement); and in response to detecting that the attention of the user is directed to the respective deletion affordance for the respective user interface object, displaying, via the one or more display components, the respective deletion affordance with a sec- ond appearance (e.g., having a second set of values for one or more display properties, such as size, display depth, color, saturation, brightness, translucency, opacity, resolution, and/or other display properties) different from the first appearance. For example, in some embodiments, in accordance with a determination that a user's gaze has moved to the respective deletion affordance (or the respective user interface object), the respective user interface object is displayed at a reduced depth (e.g., closer to a viewpoint of the user) and the respective delete affordance corresponding the respective user interface is visually emphasized (e.g., highlighted, made less translucent, more opaque, darker, having greater contrast, enlarged, and/or otherwise enhanced in visual prominence). For example, in response to gaze 286 of user 7002 directed at delete affordance 34*j'* for more than a threshold amount of time that causes the computer system 101 to put delete affordance 34*j'* in focus, the computer system 101 causes delete affordance 34*j'* to move towards the viewpoint of user 7002 and optionally to increase in size. In some embodiments, in response to detecting the attention of the user is directed to the respective deletion affordance, the computer system, optionally, outputs one or more non-visual outputs (e.g., non-spatial audio output, spatial audio output that corresponds to the location of the respective deletion affordance, non-localized tactile output, and/or localized tactile output that corresponds to the location of the respective deletion affordance). In some embodiments, in addition to or instead of the deletion affordance, the computer system optionally displays other affordances that correspond to other operations that can be performed with respect to the respective user interface object (e.g., updating, downloading, and/or other operations) and/or that correspond to status information related to the respective user interface object (e.g., number of unread notifications, number of unread messages, number of missed calls, or other status information), and in response to detecting that the user's attention is directed to the another affordance associated with the respective user interface object, the computer system changes the appearance of said other affordance and/or output non-visual outputs in an analogous manner as that described with respect to the deletion affordance, to indicate that the target of the user's attention is said other affordance. Changing the appearance of icons and/or affordances (e.g., moving in depth towards a viewpoint of the user, enlarging, highlighting, and/or other change in appearance) in accordance with a determination that user's attention is directed to the respective icons and/or affordances, assists and provides guidance to a user that the computer system is responding to user's gaze and indicates to the user which user interface element has input focus, thereby reducing the time and/or number of inputs needed to interact with user interface objects in a mixed-reality three-dimensional environment.

In some embodiments, while the respective deletion affordance for the respective user interface object is displayed (29022), the computer system detects, via the one or more input devices, an air pinch gesture (or, optionally, another type of selection input, such as an air tap gesture, a click input by a mouse, or an activation input by a controller); and in response to detecting the air pinch gesture, in accordance with a determination that the attention of the user is directed to the respective deletion affordance for the respective user interface object, the computer system removes the respective user interface object from the first section of the first multi-section arrangement of the first plurality of user interface objects (e.g., deleted from the computer system, and/or hidden from the first multi-section arrangement of the first plurality of user interface objects). For example, in FIGS.

28H-28K, the computer system deletes icon O23 34*j* in response to the detection of pinch gesture 284 while delete affordance 34*j'* is in focus (e.g., as a result of gaze input 286), and optionally in response to an additional input confirming the deletion action (e.g., requested in response to the detection of pinch gesture 284 while delete affordance 34*j'* is in focus). In some embodiments, in response to detecting the air pinch gesture, in accordance with a determination that the attention of the user is not directed to the respective deletion affordance for the respective user interface object, the computer system maintains the respective user interface object in the first section of the first multi-section arrangement of the first plurality of user interface objects (e.g., forgoing removing the respective user interface object from the first section of the first multi-section arrangement of the first plurality of user interface objects). Deleting a respective user interface object (e.g., an icon) in the multi-section arrangement in response to a gaze and pinch gesture (e.g., optionally directed at a delete affordance), without the need to drag or more the user interface object, reduces the number of input and/or time needed to reconfigure the multi-section arrangement in a mixed-reality three-dimensional environment (e.g., needed to delete a user interface object from the multi-section arrangement).

In some embodiments, displaying the first section of the first multi-section arrangement of the first plurality of user interface objects in the view of the environment includes (29024): prior to displaying the first multi-section arrangement of the first plurality of user interface objects in the first reconfiguration mode (and after exiting the first reconfiguration mode), displaying, via the one or more display components, user interface objects in the first subset of the first plurality of user interface objects with less than a threshold amount of movement in a depth dimension that extends out from a viewpoint of the user (e.g., icons are stationary relative to one another, and relative to the environment before entering the first reconfiguration mode); and while displaying the first multi-section arrangement of the first plurality of user interface objects in the first configuration mode, the computer system displays, via the one or more display components, the user interface objects in the first subset of the first plurality of user interface objects with respective movements that include more than the threshold amount of movement in the depth dimension (and optionally more than the threshold amount of movement in one or more other dimensions) For example, in some embodiments, icons have synchronized movements or asynchronized movements in the lateral dimensions of the first arrangement and the depth dimension relative to the viewpoint of the user. In some embodiments, the icons oscillate in three dimensions independently of one another, or in a coordinated matter; and the movement of a respective icon in the three dimensions has different movement characteristics (e.g., direction, acceleration, and/or speed) and/or is asynchronized in the different dimensions to create a pseudo-random movement for the respective icon. In some embodiments, application icons in the first section oscillate in three dimensions to provide visual feedback that the multi-section arrangement is in the icon reconfiguration mode and icons can be repositioned and/or deleted in the icon reconfiguration mode. For example, in FIG. 28F oscillating motion of the icons 34*a*-34*m* while the home user interface 28100*d* is in the icon reconfiguration mode is illustrated with respect to a single icon O21 34*h* in side view 281. Side view 281 illustrate different intermediate states 281*a*, 281*b*, 281*c*, 281*d*, 281*c*, and 281*f* of the oscillating motion of icon O21 34*h*. Oscillating user interface objects in three dimensions while the reconfiguration mode of the multi-section arrangement is active, provide visual feedback of the operational state of the computer system, assists and provides guidance to the user that the oscillating user interface objects can be relocated, deleted, and otherwise rearranged thereby reducing the number of input and/or time needed to rearrange or otherwise modify the multi-section arrangement.

In some embodiments, displaying a respective user interface object in the first subset of the first plurality of user interface objects with a respective movement that includes more than the threshold amount of movement in the depth dimension includes (29026): displaying, via the one or more display components, oscillations of a first portion and a second portion of the respective user interface object relative to a respective anchor position (e.g., a center of the respective user interface object, the center of the placement location for the respective user interface object, and/or another reference location in the environment) of the respective user interface object in the depth dimension, wherein the first portion and the second portion of the respective user interface objects are located on opposing sides of the respective anchor position of the respective user interface object (e.g., the first and second portions are located on two opposing ends of a rim or edge of the respective user interface objects, and the respective anchor position is the center of the respective user interface object or a center of its placement location). In some embodiments, the first portion and the second portion of the respective user interface objects correspond to two opposing ends of the respective user interface object along a central axis that passes through the central plane or a surface of the respective user interface object. For example, if the respective user interface object is a circle, the first portion and second portion of the respective user interface object correspond to two ends of a radius of the circle; and, if the respective user interface object is a circular disc, the first portion and second portion of the respective user interface object correspond to two ends of a radius of a circular cross-section of the circular disc. The oscillations of the first portion and second portion of the respective user interface object includes rotational oscillation of the circle or circular disc around a center of the circle or circular disc, concurrently with (e.g., synchronized or asynchronized with, having the same or different oscillation phases, frequencies, and/or magnitudes) linear oscillations of the first portion and the second portion of the circle or circular disc in the depth direction, in some embodiments. In some embodiments, the oscillations of the respective user interface object includes clockwise and counter-clockwise spinning motions and back and forward wobble motions of the respective user interface object. For example, in FIG. 28F, oscillating motion of the icons 34a-34m while the home user interface 28100d is in the icon reconfiguration mode is illustrated with respect to a single icon O21 34h in side view 281. Side view 281 illustrate different intermediate states 281a, 281b, 281c, 281d, 281e, and 281f of the oscillating motion of icon O21 34h. In some embodiments, the oscillations of different user interface objects in the first subset of the first plurality of user interface objects are synchronized and/or have the same amplitudes, phases, and/or frequencies. In some embodiments, the oscillations of different user interface objects in the first subset of the first plurality of user interface objects are asynchronized, and/or have the different amplitudes, phases, and/or frequencies. In some embodiments, the icons in the multi-section arrangement are represented have a convex shape (e.g., shape like plates, coins, hemispheres, or truncated spheres) with at least one side (e.g., the side opposite of the viewpoint of the user) that is flat. In some embodiments, the icons oscillate around a central axis as if the curved side of the icons is oscillating and/or wobbling on a flat surface (e.g., as if coins are dropped on a floor). In some embodiments, the icons in the in the multi-section arrangement are three-dimensional objects with constrained freedom of motion in three orthogonal dimensions when displayed in the first reconfiguration mode. In some embodiments, the respective user interface object is a rigid object where different portions of the respective user interface objects do not move relative to one another when the respective user interface object is moving as a whole. In some embodiments, the respective user interface object is a rigid object where different portions of the respective user interface objects do not move relative to one another when the respective user interface object is moving as a whole relative to the environment. In some embodiments, the respective user interface object is not a rigid object and different portions of the respective user interface objects may flex, bend, and/or oscillate relative to one another when the respective user interface object is moving as a whole relative to the environment and/or when the respective user interface is held relatively stationary as a whole relative to the environment. Oscillating user interface objects (e.g., oscillate around a central axis as if the curved side of the user interface object is oscillating and/or wobbling on a flat surface) in three dimensions while the reconfiguration mode of the multi-section arrangement is active, provide visual feedback of the operational state of the computer system, assists and provides guidance to the user that the oscillating user interface objects can be relocated, deleted, and otherwise rearranged thereby reducing the number of input and/or time needed to rearrange or otherwise modify the multi-section arrangement.

In some embodiments, the first multi-section arrangement of the first plurality of user interface objects is part of a first user interface (e.g., a first system user interface, such as a home menu user interface or another system user interface that includes multiple arrangements for different object types) that further includes (29028) a second multi-section arrangement of a second plurality of user interface objects (and, optionally, a third multi-section arrangement of a third plurality of user interface objects, and a fourth multi-section arrangement of a fourth plurality of user interface objects), and the method 29000 includes: while displaying a respective section of the first multi-section arrangement of the first plurality of user interface object: in accordance with a determination that the first multi-section arrangement of the first plurality of user interface objects is not displayed in the first configuration mode, the computer system provides an input interface (e.g., navigation affordance, and/or input recognizer) for navigating from the first multi-section arrangement to the second multi-section arrangement of the first user interface navigation between different multi-section arrangements of the first user interface is permitted when the currently displayed multi-section arrangement is displayed in the normal mode (e.g., selection of a navigation affordance corresponding to the second multi-section arrangement, or another type of input cause navigation between different multi-section arrangements in the first user interface)); and in accordance with a determination that the first multi-section arrangement of the first plurality of user interface objects is displayed in the first configuration mode, the computer system forgoes providing the input interface (e.g., navigation affordance, and/or input recognizer) for navigating from the first multi-section arrangement to the second multi-section arrangement of the first user interface (e.g., navigation between different multi-section arrangements of the first user interface is not permitted when the currently displayed multi-section arrangement is displayed in the first reconfiguration mode (e.g., the navigation affordance corresponding to the second multi-section arrangement is not displayed, is grayed out, and/or other type of input that causes navigation between different multi-section arrangements in the first user interface is ignored or not recognized)). In some embodiments, the first configuration mode of the first multi-section arrangement of the first plurality of user interface objects only apply to the first multi-section arrangement of the first plurality of user interface objects and not to other multi-section arrangements; and to activate the respective configuration mode of another multi-section arrangement, the computer system needs to exit the first configuration mode and navigates to another multi-section arrangement (e.g., in response to a user selecting the navigation affordances corresponding to the different object types (e.g., affordances for applications, contacts, experiences or environments, and/or controls) displayed with a multi-section arrangement in the normal mode) and reenter the configuration mode in response to a user input provided while said other multi-section arrangement is displayed (e.g., in response to a long air pinch gesture directed to an icon in the currently displayed multi-section arrangement). For example, in FIG. 28F, a user can switch to a different home user interface (e.g., one that includes icons corresponding to objects of different type) after exiting the icon configuration mode for home user interface 28100*d* (e.g., after finishing the rearrangement of the home user interface that is currently visible and in focus), but the user cannot switch to a different home user interface (e.g. between home user interface 28100*a*, 28100*b*, and 28100*c*) while the currently visible home user interface is in the reconfiguration mode, as illustrated by the hidden tab menu 28004 for switching between different home user interface in FIG. 28F (e.g., missing relative to FIG. 28E where home user interface 28100*d* is in normal mode). Limiting the ability of a user to switch from a respective, currently active, multi-section arrangement with a first type of user interface objects, to a different multi-section arrangement with a second type of user interface objects, while the respective, currently active, multi-section arrangement is in the reconfiguration mode, reduces errors and/or unintended inputs that can cause the loss of changes or rearrangements made with respect to the respective, currently active, multi-section arrangement, thereby reducing the time and/or number of inputs needed to reconfigure a multi-section arrangement in a mixed-reality three-dimensional environment.

In some embodiments, while displaying the first section of the first multi-section arrangement of the first plurality of user interface objects in the first reconfiguration mode, the computer system detects (29030), via the one or more input devices, one or more second user inputs that meet object reflow criteria (e.g., the one or more second user inputs delete an existing user interface object and vacates a placement location ordered before another user interface object, move an existing user interface object and vacates a placement location ordered before another user interface object and/or push another user interface object out of its placement location, and/or insert a new user interface object into a placement location that precedes another user interface object or pushes another user interface object out of its placement location); and In some embodiments, the one or more second user inputs that meet the object reflow criteria cause one or more user interface objects in the first multi-section arrangement of the first plurality of user interface objects to reflow between object placement locations in the first multi-section arrangement. For example, deletion of a respective user interface object may cause other user interface object that are ordered after the respective user interface object to reflow to fill the vacated placement location of the respective user interface object, moving the respective user interface object from one placement location to another placement location may cause reflow of user interface objects to fill placement locations vacated by the respective user interface object and other reflowed user interface objects, and to vacate placement locations for insertion of the respective user interface object and other reflowed user interface objects, and/or adding a new user interface object may cause reflow of user interface objects to vacate placement locations for insertion of the new user interface object and/or the reflowed user interface objects. In response to detecting the one or more second user inputs that meet the object reflow criteria, reflowing one or more user interface objects in the first multi-section arrangement of the first plurality of user interface objects between object placement locations in the first multi-section arrangement, including: in accordance with a determination that a first user interface object of the one or more user interface objects that are being reflowed in the first multi-section arrangement is (e.g., with a starting placement location) in a first row of the first multi-section arrangement and is moving to a destination location (e.g., an intermediate destination of the first user interface object during reflow, or a final destination of the first user interface object as determined based on the source location that triggered the reflow) in a second row, different from the first row, of the first multi-section arrangement, moving the first user interface object toward the destination location in a path that is at least partially behind one or more other user interface objects in the first row of the first multi-section arrangement (and moves at least partially behind one or more objects in the second row of the first multi-section arrangement, and/or behind other rows of the first multi-section arrangement (e.g., the first user interface object is visually obscured by other user interface objects remaining in their rows while the first user interface object is moving toward its destination location in the second row)). For example, FIGS. 28AA-28AB, illustrates that icon 34*d* moves behind plane 287 (on which other icons in the arrangement of icons of home user interface 28100*d* are placed) while icon 34*d* is being pushed from the top row to the middle of the arrangement of icons 34*a*-34*m* of home user interface 28100*d*, whereas icon 34*d* was placed in the plane 287 before icon 34*d* was pushed to the row below, as illustrated in FIG. 28X. Pushing a respective icon behind a row of other icons or behind a plane on which other icons are located in the multi-section arrangement (e.g., the icon is pushed further away from a viewpoint of a user while other icons remain displayed at the same distance away from the viewpoint of the user) when the respective icon changes rows in the arrangement (e.g., as a result of automatic reflowing that is caused by changes made by a user in the arrangement), provides an additional visual feedback to a user that the respective icon is changing rows in the arrangement, thereby reducing the time needed to locate the respective icon in the arrangement after the arrangement has changed. For example, FIGS. 28AA-28AB, illustrates that icon 34*d* moves behind plane 287 (and further away from the view point of the user 7002) while icon 34*d* is being pushed from the top row to the middle of the arrangement of icons 34*a*-34*m* of home user interface 28100*d*, whereas icon 34*d* was placed in the plane 287 before icon 34*d* was pushed to the row below, as illustrated in FIG. 28X. Pushing a respective icon behind a row of other icons or behind a plane on which other icons are located in the multi-section arrangement (e.g., the respective icon is pushed further away from a viewpoint of a user while other icons remain displayed at the same distance away from the viewpoint of the user) when the respective icon changes rows in the arrangement (e.g., as a result of automatic reflowing that is caused by changes made by a user in the arrangement), provides an additional visual feedback to a user that the respective icon is changing rows in the arrangement, thereby reducing the time needed to locate the respective icon in the arrangement after the arrangement has changed.

In some embodiments, in response to detecting the one or more second user inputs that meet the object reflow criteria, in accordance with a determination that the first user interface object is in the first row of the first multi-section arrangement and is moving to a destination location (e.g., an intermediate destination of the first user interface object during reflow, or a final destination of the first user interface object as determined based on the source location that triggered the reflow) in the second row, different from the first row, of the first multi-section arrangement, the computer system pushes (29032) the first user interface object farther away from (e.g., backward in a depth dimension relative to) a viewpoint of a user (e.g., moving the first user interface object backward in depth relative to the viewpoint of the user, moving the first user interface object to a display layer that is behind the display layers of one or more other objects in the first row and/or the second row), before moving the first user interface object toward the destination location in the path that is at least partially behind one or more other user interface objects in the first row of the first multi-section arrangement. For example, FIGS. 28AA-28AB, illustrates that icon 34*d* moves behind plane 287 (and further away from the view point of the user 7002) while icon 34*d* is being pushed from the top row to the middle of the arrangement of icons 34*a*-34*m* of home user interface 28100*d*, whereas icon 34*d* was placed in the plane 287 before icon 34*d* was pushed to the row below, as illustrated in FIG. 28X. Pushing a respective icon behind a row of other icons or behind a plane on which other icons are located in the multi-section arrangement (e.g., the respective icon is pushed further away from a viewpoint of a user while other icons remain displayed at the same distance away from the viewpoint of the user) when the respective icon changes rows in the arrangement (e.g., as a result of automatic reflowing that is caused by changes made by a user in the arrangement), provides an additional visual feedback to a user that the respective icon is changing rows in the arrangement, thereby reducing the time needed to locate the respective icon in the arrangement after the arrangement has changed In some embodiments, in response to detecting the one or more second user inputs that meet the object reflow criteria, the reflowing the one or more user interface objects in the first multi-section arrangement of the first plurality of user interface objects between object placement locations in the first multi-section arrangement, includes (29034): in accordance with a determination that the first user interface object of the one or more user interface objects that are being reflowed in the first multi-section arrangement is (e.g., with a starting placement location) in the first row of the first multi-section arrangement and has a destination location (e.g., an intermediate destination of the first user interface object during reflow, or a final destination of the first user interface object as determined based on the source location that triggered the reflow) in the first row of the first multi-section arrangement, moving the first user interface object toward the destination location in a path that is at least partially in the first row of the first multi-section arrangement (e.g., forgoing moving the first user interface object backward in the depth dimension relative to the viewpoint of the user, but rather, keeping the first user interface object to in the same display layer as one or more other objects in the first row and/or the second row). In some embodiments, as the first user interface object is reflowed, its path is partially in its current row when it is still moving along the reflow path in its current row, and partially behind its current row and other rows of the first multi-section arrangement when it is being moved to another row (e.g., the row(s) above or the row(s) below the current row). In some embodiments, when the user interface objects are being reflowed in the first multi-section arrangements, multiple user interface objects may be moving simultaneously in the same view, and some (e.g., one, two, or more) of the multiple user interface objects are moving in their respective rows, and some (e.g., one, two, or more) of the multiple user interface objects are pushed the rows of the first multi-section arrangement and/or moving along paths behind the rows of the first multi-section arrangement, before rejoining their new row(s) in the first multi-section arrangement. For example, in FIGS. 28AG-2AH, icons 340, 35*e*, 35*f*, 34*p* and 35*i* that move within the same row to make room for icon 34*h* do not move behind plane 287, whereas icons 35*d* and 35*h* move behind place 287 as they are reflowing to change rows. Pushing a respective icon that is changing rows (e.g., as a result of automatic reflowing) behind a row of other icons or behind a plane on which other icons are located in the multi-section arrangement while forgoing pushing other icons that are relocated within the same row (e.g., as a result of automatic reflowing), provides an additional visual feedback to a user that the respective icon is changing rows in the arrangement while the other icons are not changing rows, thereby reducing the time needed to locate the respective icon in the arrangement after the arrangement has changed In some embodiments, displaying the first section of the first multi-section arrangement of the first plurality of user interface objects includes (29036): displaying, via the one or more display components, a respective accessory object for at least one user interface object of the first subset of the first plurality of user interface objects, concurrently with the at least one user interface object, wherein the at least one user interface object is displayed at a first depth, and the respective accessory object of the at least one user interface object is displayed at a second depth that is greater than the first depth (e.g., there is a non-zero gap between the at least one user interface object and its respective accessory object in the depth dimension; and/or the accessory object is lifted off from its corresponding user interface object in the depth direction). For example, in FIG. 28G, response to gaze 286 directed at delete affordance 34*j'* that puts delete affordance 34*j'* in focus, the computer system 101 causes delete affordance 34*j'* to move towards the viewpoint of user 7002. For example, the delete affordance 34*j'* lifts off and moves away from icon 34*j* resulting in a distance in depth between delete affordance 34*j'* and icon 34*jm*, as illustrated in side view 283 in FIG. 28G. In some embodiments, some or all of the user interface objects in the first section of the first multi-section arrangement (and other sections of the multi-section arrangement) have corresponding sets of one or more accessory objects, such as a deletion affordance, and/or a badge that indicates a status of the content that is associated with the user interface object (e.g., number of missed notifications, alerts for updating or downloading, number of unread messages, and/or other status information), and the accessory objects are displayed with a smaller depth than their corresponding user interface objects and appear to lift off from their corresponding user interface objects. In some embodiments, some or all of the accessory objects for a respective user interface object are not displayed and/or are not lifted off from the respective user interface object when the first multi-section arrangement is displayed in the normal mode; and the accessory objects for the respective user interface object are displayed and/or are lifted off from the respective user interface object when the first multi-section arrangement is displayed in the first reconfiguration mode. In some embodiments, some or all of the accessory objects for a respective user interface object are displayed with a smaller amount of gap in depth from the respective user interface object when the first multi-section arrangement is displayed in the normal mode; and the accessory objects for the respective user interface object are displayed with a greater amount of gap in depth from the respective user interface object when the first multi-section arrangement is displayed in the first reconfiguration mode. Displaying an accessory object at a distance in depth relative to a respective user interface object with which the accessory object is associated (e.g., the accessory object is displayed closer to a viewpoint of a user compared to the respective user interface object), assists and provides visual feedback to a user that the accessory object can be manipulated separately from the respective user interface objects, thereby reducing the time and/or number of inputs needed to interact with user interface objects and respective accessory objects in a mixed-reality three-dimensional environment.

In some embodiments, the respective accessory object of the at least one user interface object includes (29038) a control for initiating a first operation with respect to the at least one user interface object, when the respective accessory object is selected by a user input (e.g., the respective accessory object is a deletion affordance that when selected by an air pinch gesture in conjunction with a gaze input directed to the respective accessory object, causes the computer system to delete the at least one user interface object from the first section of the first multi-section arrangement). In some embodiments, the first operation includes operations other than deletion, such as an operation to update, to pin, to download, and/or other operations that is appropriate for the at least one user interface object. For example, in FIG. 28B, home user interface 28100b when in the reconfiguration mode can have badges displayed near respective virtual environment icons 30a-30m that indicate operations that can be performed with respect to the corresponding virtual environments. In another example, in FIG. 28C, home user interface 28100c when in the reconfiguration mode can have badges displayed near respective contact icons 32a-301 that indicate operations that can be performed with respect to the corresponding contacts. In another example, delete affordances are displayed near application icons 28a-28m when home user interface 2100a in FIG. 28A is in the icon reconfiguration state (e.g., as illustrated with respect to home user interface 28100d in FIG. 28F. Displaying an accessory object, corresponding a respective operation that can be performed with respect to a respective user interface object with which the accessory object is associated, at a distance in depth relative to the respective user interface object (e.g., the accessory object is displayed closer to a viewpoint of a user compared to the respective user interface object), assists and provides visual feedback to a user that the accessory object can be manipulated separately from the respective user interface objects to perform corresponding operations with performed with respect to the respective user interface object, thereby reducing the time and/or number of inputs needed to interact with user interface objects and respective accessory objects in a mixed-reality three-dimensional environment.

In some embodiments, the respective accessory object of the at least one user interface object includes (29040) a status indicator that indicates a current state of content associated with the at least one user interface object (e.g., a state of the application, contact, environment, or control associated with the at least one user interface object). In some embodiments, selection of the status indicator does not cause performance of an operation with respect to the at least one user interface object. In some embodiments, the status indicator also serves as a control that, when selected by a user input, changes the current state of the content associated with the at least one user interface object (e.g., from a first state to a second state, such as a pined/unpinned state, downloading started/downloading paused state, update scheduled/update suspended state, or other alternative states of the at least one user interface object). For example, in FIG. 28C, home user interface 28100c when in the reconfiguration mode can have badges displayed near respective contact icons 32a-301 that indicate whether a respective contact is pinned or unpinned (e.g., marked as favorite or not). Displaying an accessory object, corresponding a respective state of a respective user interface object with which the accessory object is associated, at a distance in depth relative to the respective user interface object (e.g., the accessory object is displayed closer to a viewpoint of a user compared to the respective user interface object), assists and provides visual feedback to a user that the state represented by the accessory object can change dynamically, thereby reducing the time and/or number of inputs needed to interact with user interface objects and respective accessory objects in a mixed-reality three-dimensional environment.

In some embodiments, the respective accessory object of the at least one user interface object includes (29042) a quantity indicator that indicates a current count of uncleared notifications associated with the at least one user interface object (e.g., number of missed calls, number of unread messages, number of uncleared tasks, and/or other counters). In some embodiments, selection of the quantity indicator does not cause performance of an operation with respect to the at least one user interface object. In some embodiments, the quantity indicator is displayed along with a control and/or status indicator for the at least one user interface object. For example, in FIG. 28C, home user interface 28100c when in the reconfiguration mode can have badges displayed near respective contact icons 32a-301 that indicate a quantify of uncleared notifications, if any, received from respective contacts. Displaying an accessory object, e.g., corresponding a badge with a number of uncleared notifications with respect a respective user interface object (e.g., a contact) with which the accessory object is associated, at a distance in depth relative to the respective user interface object (e.g., the accessory object is displayed closer to a viewpoint of a user compared to the respective user interface object), assists and provides visual feedback to a user that the state represented by the accessory object can change dynamically and/or separately from the respective user interface object, thereby reducing the time and/or number of inputs needed to interact with user interface objects and respective accessory objects in a mixed-reality three-dimensional environment In some embodiments, outputting, via one or more audio output devices, a first ambient sound (e.g., continuous ambient sound that is associated with the multi-section arrangement and/or optionally spatially spans the environment and forms part of the three-dimensional experience in the environment, as opposed to audio feedback that is played in response to inputs and/or events that corresponds to an individual object in the environment, or media playback of selected media items in a media player, the ambient sound optionally varies periodically, randomly and/or pseudo-randomly while the multi-section arrangement is displayed), while displaying the environment via the one or more display components, wherein outputting the first ambient sound includes (29044): in accordance with a determination that the first multi-section arrangement is not displayed in the first reconfiguration mode, the computer system outputs the first ambient sound with a first set of values for one or more audio output parameters (e.g., volume, spatial distribution, frequencies, melody, complexity, and/or audio quality) of the first ambient sound; and in accordance with a determination that the first multi-section arrangement is displayed in the first reconfiguration mode, the computer system outputs the first ambient sound with a second set of values, different from the first set of values, for the one or more audio output parameters of the first ambient sound, wherein the second set of values for the one or more audio output parameters of the first ambient sound corresponds to a reduced level of aural prominence (e.g., not generated, quieter, and/or less distracting) than the first set of values for the one or more audio output parameters of the first ambient sound (e.g., to indicate a change in the state of the environment as a whole and/or to indicate change in state of the multi-section arrangement to the reconfiguration mode). For example, before activating the icon reconfiguration mode in FIG. 28E (e.g., while home user interface 28100*d* is in the normal mode), the computer system 1010 generates and outputs a first ambient sound A (e.g., as illustrated by sound waves marked A in FIG. 28E), and, in conjunction with activating the icon reconfiguration mode, the computer system 101 reduces the volume of the ambient sound A, removes the ambient sound A, or changes the ambient sound A with a different ambient sound A', as illustrated by sound waves marked A' in FIG. 28F. Outputting a first ambient sound while the multi-section home arrangement is in the normal mode (e.g., before activating the reconfiguration mode), and changing, replacing, or reducing the volume of the ambient sound that is being outputted in the reconfiguration mode, provides audio feedback to a user (e.g., in addition to the visual feedback) of the operational state of the computer system, thereby reducing the time and/or number of inputs needed to interact with user interface objects in a mixed-reality three-dimensional environment.

In some embodiments, while displaying the view of the environment, including displaying the first section of the first multi-section arrangement of the first plurality of user interface objects (29046), the computer system detects, via the one or more input devices, a third user input that is directed to a respective object (e.g., an icon, a badge, a control, an affordance, and/or an accessory object) displayed in the first section of the first multi-section arrangement; and in response to detecting the third user input that is directed to the respective object (e.g., an icon, a badge, a control, an affordance, and/or an accessory object) displayed in the first section of the first multi-section arrangement, in accordance with a determination that the third user input meets first interaction criteria with respect to the respective object, the computer system outputs, via one or more audio output devices, a first audio output corresponding to the third user input that meets the first interaction criteria, including: in accordance with a determination that the first multi-section arrangement is not displayed in the first reconfiguration mode, the computer system outputs the first audio output with a third set of values for one or more audio output parameters (e.g., volume, spatial distribution, frequencies, melody, complexity, and/or audio quality) of the first audio output; and in accordance with a determination that the first multi-section arrangement is displayed in the first reconfiguration mode, the computer system outputs the first audio output with a fourth set of values, different from the third set of values, for the one or more audio output parameters of the first audio output, wherein the fourth set of values for the one or more audio output parameters correspond to a different (e.g., increased or reduced) level of audio prominence (e.g., quieter and/or changing at a slower rate, or louder and/or changing at a faster rate) than the third set of values for the one or more audio output parameters of the first audio output (e.g., to indicate a change in the state of the environment as a whole, as well as providing feedback for the user input). In some embodiments, different user input meeting different interaction criteria with respect to the respective object (e.g., gaze without gesture vs. gesture with gaze, or a first type of gesture vs. a second type of gesture) causes the computer system to generate different audio output as audio feedback, but depending on whether the first multi-section arrangement is displayed in the first reconfiguration mode or not in the first reconfiguration mode, the values for the one or more audio output parameters for a respective audio output are changed when outputting the respective audio output. In some embodiments, the computer system determines that the first interaction criteria are met with respect to an object, in response to detecting that a user's attention is directed to the object (e.g., as determined based on a location and/or duration of a gaze input directed to the object, and/or a location of a hovering contact or pointing device over the object). For example, in FIG. 28L, a different hover sound is generated when user 7002's gaze 294 is directed to icon O21 34*h* in FIG. 28L while home user interface 28100*d* is in the reconfiguration mode compared to the hover sound that is generated when user 7002's gaze 282 is directed to icon O26 341 in FIG. 28E while home user interface 28100*d* is in the normal mode, as described in relation to FIGS. 28E and 28L. In some embodiments, the computer system determines that the first interaction criteria are met with respect to an object, in response to detecting an air pinch gesture or another type of gesture or input (e.g., a touch-down of a contact on the object, or an activation input on a controller or another input device while a focus selector is on the object) that indicates the target of a subsequent input is the object. In some embodiments, an input that meets the first interaction criteria with respect to an object does not actually causes performance of an operation that corresponds to the object (e.g., a deletion operation corresponding to a deletion affordance, or a hide operation corresponding to a hide affordance), and it serves to indicate to the computer system the target of an intended operation before the user commits to the operation with another input and/or by maintaining the current input until one or more thresholds are met (e.g., a time threshold, an intensity threshold, or another input threshold). In some embodiments, the audio output(s) that are outputted as feedback for user inputs that meet different sets of interaction criteria are discrete outputs that cease to be outputted when the computer system detects that the user inputs have terminated. In some embodiments, the audio output(s) that are outputted in response to user inputs that meet interaction criteria are layered on top of the ambient sound that is continuously outputted while the environment is displayed. Outputting a first hover sound while the multi-section home arrangement is in the normal mode (e.g., before activating the reconfiguration mode), in accordance with a determination that user's attention has been directed to a user interface object in the multi-section arrangement sound, and changing, replacing, or reducing the volume of the hover sound that is being outputted in the reconfiguration mode, provides audio feedback to a user (e.g., in addition to the visual feedback) of the operational state of the computer system, thereby reducing the time and/or number of inputs needed to interact with user interface objects in a mixed-reality three-dimensional environment.

In some embodiments, aspects/operations of methods 12000, 13000, 14000, 15000, 16000, 17000, 22000, 23000, 24000, 25000, 27000, and 29000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system that is in communication with one or more display generation components and one or more input devices:
detecting a first input to the computer system to invoke a home menu user interface; and
in response to detecting the first input, displaying via the one or more display generation components the home menu user interface in a three-dimensional environment, including:
in accordance with a determination that a viewpoint of a user in the three-dimensional environment had a first elevation relative to a reference plane in the three-dimensional environment, displaying the home menu user interface at a first height in the three-dimensional environment; and
in accordance with a determination that the viewpoint of the user in the three-dimensional environment had a second elevation relative to the reference plane in the three-dimensional environment, wherein the second elevation is different from the first elevation, displaying the home menu user interface at a second height in the three-dimensional environment, wherein the second height is different from the first height.

2. The method of claim 1, wherein detecting the first input to the computer system to invoke the home menu user interface includes detecting a press input on the one or more input devices.

3. The method of claim 1, wherein detecting the first input to the computer system to invoke the home menu user interface includes detecting a hand gesture.

4. The method of claim 1, wherein:
in response to detecting the first input, displaying via the one or more display generation components the home menu user interface in the three-dimensional environment includes:
in accordance with a determination that the viewpoint of the user in the three-dimensional environment had a third elevation relative to the reference plane in the three-dimensional environment and the third elevation is within a first range of elevations, wherein the third elevation is different from the first elevation, displaying the home menu user interface at the first height in the three-dimensional environment.

5. The method of claim 4, wherein the first range of elevations includes elevations that are parallel to or lower than a horizontal plane extending from a viewpoint of a user in the three-dimensional environment.

6. The method of claim 1, wherein:
in response to detecting the first input, displaying via the one or more display generation components the home menu user interface in the three-dimensional environment includes:
in accordance with a determination that the viewpoint of the user in the three-dimensional environment had a fourth elevation relative to the reference plane in the three-dimensional environment, wherein the fourth elevation is different from the second elevation and both the fourth elevation and the second elevation are within a second range of elevations, displaying the home menu user interface at a third height in the three-dimensional environment, wherein the third height is different from the second height.

7. The method of claim 6, wherein the second range includes elevations higher than a horizontal plane extending from a viewpoint of a user in the three-dimensional environment.

8. The method of claim 1, wherein:
in response to detecting the first input, displaying via the one or more display generation components the home menu user interface in the three-dimensional environment includes:
in accordance with a determination that the viewpoint of the user in the three-dimensional environment had a fifth elevation relative to the reference plane in the three-dimensional environment that is within a third range of elevations, displaying the home menu user interface at a fourth height in the three-dimensional environment, a plane of the home menu user interface at the fourth height being perpendicular to a horizontal plane in the three-dimensional environment.

9. The method of claim 8, wherein the third range of elevations is different from a first range of elevations and different from a second range of elevations, the first range of elevations includes elevations that are parallel to or lower than a horizontal plane extending from a viewpoint of a user in the three-dimensional environment and the second range includes elevations higher than the horizontal plane extending from the viewpoint of the user in the three-dimensional environment.

10. The method of claim 8, wherein:
in response to detecting the first input, displaying via the one or more display generation components the home menu user interface in the three-dimensional environment, includes:
in accordance with a determination that the viewpoint of the user in the three-dimensional environment had a sixth elevation relative to the reference plane in the three-dimensional environment, wherein the sixth elevation is different from the fifth elevation, and the sixth elevation is within a fourth range of elevations, wherein the fourth range of elevations is different from the third range of elevations, displaying the home menu user interface such that a plane of the home menu user interface is tilted toward a viewpoint of the user in the three-dimensional environment.

11. The method of claim 1, wherein:

in response to detecting the first input, displaying via the one or more display generation components the home menu user interface in a three-dimensional environment includes:

in accordance with a determination that the viewpoint of the user in the three-dimensional environment had a first rotation about a vertical axis perpendicular to the reference plane, displaying the home menu user interface at a first rotational position in the three-dimensional environment corresponding to the first rotation; and in accordance with a determination that the viewpoint of the user in the three-dimensional environment had a second rotation about the vertical axis perpendicular to the reference plane, the second rotation being different from the first rotation, displaying the home menu user interface at a second rotational position in the three-dimensional environment corresponding to the second rotation, wherein the second rotational position is different from the first rotational position.

12. The method of claim 1, wherein:

in response to detecting the first input, displaying via the one or more display generation components the home menu user interface in a three-dimensional environment includes:

in accordance with a determination that the viewpoint of the user in the three-dimensional environment had an eighth elevation relative to a reference plane in the three-dimensional environment and a gaze of the user is directed at a first spatial location, displaying the home menu user interface at a seventh height in the three-dimensional environment; and in accordance with a determination that the viewpoint of the user in the three-dimensional environment had the eighth elevation relative to the reference plane in the three-dimensional environment and the gaze of the user is directed at a second spatial location distinct from the first spatial location, displaying the home menu user interface at the seventh height in the three-dimensional environment.

13. The method of claim 1, wherein displaying the home menu user interface at the first height in the three-dimensional environment includes displaying the home menu user interface at a respective height below a horizontal plane extending from a viewpoint of a user in the three-dimensional environment.

14. The method of claim 1, wherein displaying the home menu user interface includes displaying icons in the home menu user interface progressively in a concentric arrangement.

15. The method of claim 1, wherein displaying the home menu user interface includes increasing visual emphasis of icons displayed in the home menu user interface over time.

16. The method of claim 1, wherein an elevation of a viewpoint of the user with respect to the reference plane corresponds to an elevation of a user's head with respect to the reference plane.

17. The method of claim 1, including:

ceasing to display the home menu user interface;

detecting a second input to the computer system to invoke the home menu user interface after the home menu user interface has ceased to be displayed; and in response to detecting the second input, in accordance with a determination that the viewpoint of the user in the three-dimensional environment had a ninth elevation relative to the reference plane in the three-dimensional environment, wherein the ninth elevation is different from the first elevation and from the second elevation, displaying the home menu user interface at an eighth height in the three-dimensional environment.

18. The method of claim 1 including:

detecting a third input corresponding to a request to cease to display the home menu user interface; and in response to detecting the third input, ceasing to display the home menu user interface.

19. The method of claim 18, wherein ceasing to display the home menu user interface in response to detecting the third input includes ceasing to display the home menu user interface by transitioning icons displayed in the home menu user interface through a plurality of intermediate states with increasing amounts of deemphasis of the icons over time.

20. A non-transitory computer-readable storage medium storing one or more programs configured to be executed by one or more processors of a computer system that is in communication with one or more display generation components and one or more input devices, the one or more programs including instructions for:

detecting a first input to the computer system to invoke a home menu user interface; and in response to detecting the first input, displaying via the one or more display generation components the home menu user interface in a three-dimensional environment, including:

in accordance with a determination that a viewpoint of a user in the three-dimensional environment had a first elevation relative to a reference plane in the three-dimensional environment, displaying the home menu user interface at a first height in the three-dimensional environment; and in accordance with a determination that the viewpoint of the user in the three-dimensional environment had a second elevation relative to the reference plane in the three-dimensional environment, wherein the second elevation is different from the first elevation, displaying the home menu user interface at a second height in the three-dimensional environment, wherein the second height is different from the first height.

21. The non-transitory computer-readable storage medium of claim 20, wherein detecting the first input to the computer system to invoke the home menu user interface includes detecting a press input on the one or more input devices.

22. The non-transitory computer-readable storage medium of claim 20, wherein detecting the first input to the computer system to invoke the home menu user interface includes detecting a hand gesture.

23. The non-transitory computer-readable storage medium of claim 20, wherein:

in response to detecting the first input, displaying via the one or more display generation components the home menu user interface in the three-dimensional environment includes:

in accordance with a determination that the viewpoint of the user in the three-dimensional environment had a third elevation relative to the reference plane in the three-dimensional environment and the third elevation is within a first range of elevations, wherein the third elevation is different from the first elevation, displaying the home menu user interface at the first height in the three-dimensional environment.

24. The non-transitory computer-readable storage medium of claim 23, wherein the first range of elevations includes elevations that are parallel to or lower than a horizontal plane extending from a viewpoint of a user in the three-dimensional environment.

25. The non-transitory computer-readable storage medium of claim 20, wherein:

in response to detecting the first input, displaying via the one or more display generation components the home menu user interface in the three-dimensional environment includes:

in accordance with a determination that the viewpoint of the user in the three-dimensional environment had a fourth elevation relative to the reference plane in the three-dimensional environment, wherein the fourth elevation is different from the second elevation and both the fourth elevation and the second elevation are within a second range of elevations, displaying the home menu user interface at a third height in the three-dimensional environment, wherein the third height is different from the second height.

26. The non-transitory computer-readable storage medium of claim 25, wherein the second range includes elevations higher than a horizontal plane extending from a viewpoint of a user in the three-dimensional environment.

27. The non-transitory computer-readable storage medium of claim 20, wherein:

in response to detecting the first input, displaying via the one or more display generation components the home menu user interface in the three-dimensional environment includes:

in accordance with a determination that the viewpoint of the user in the three-dimensional environment had a fifth elevation relative to the reference plane in the three-dimensional environment that is within a third range of elevations, displaying the home menu user interface at a fourth height in the three-dimensional environment, a plane of the home menu user interface at the fourth height being perpendicular to a horizontal plane in the three-dimensional environment.

28. The non-transitory computer-readable storage medium of claim 27, wherein the third range of elevations is different from a first range of elevations and different from a second range of elevations, the first range of elevations includes elevations that are parallel to or lower than a horizontal plane extending from a viewpoint of a user in the three-dimensional environment and the second range includes elevations higher than the horizontal plane extending from the viewpoint of the user in the three-dimensional environment.

29. The non-transitory computer-readable storage medium of claim 20, wherein:

in response to detecting the first input, displaying via the one or more display generation components the home menu user interface in a three-dimensional environment includes:

in accordance with a determination that the viewpoint of the user in the three-dimensional environment had a first rotation about a vertical axis perpendicular to the reference plane, displaying the home menu user interface at a first rotational position in the three-dimensional environment corresponding to the first rotation; and in accordance with a determination that the viewpoint of the user in the three-dimensional environment had a second rotation about the vertical axis perpendicular to the reference plane, the second rotation being different from the first rotation, displaying the home menu user interface at a second rotational position in the three-dimensional environment corresponding to the second rotation, wherein the second rotational position is different from the first rotational position.

30. The non-transitory computer-readable storage medium of claim 20, wherein:

in response to detecting the first input, displaying via the one or more display generation components the home menu user interface in a three-dimensional environment includes:

in accordance with a determination that the viewpoint of the user in the three-dimensional environment had an eighth elevation relative to a reference plane in the three-dimensional environment and a gaze of the user is directed at a first spatial location, displaying the home menu user interface at a seventh height in the three-dimensional environment; and in accordance with a determination that the viewpoint of the user in the three-dimensional environment had the eighth elevation relative to the reference plane in the three-dimensional environment and the gaze of the user is directed at a second spatial location distinct from the first spatial location, displaying the home menu user interface at the seventh height in the three-dimensional environment.

31. The non-transitory computer-readable storage medium of claim 20, wherein displaying the home menu user interface at the first height in the three-dimensional environment includes displaying the home menu user interface at a respective height below a horizontal plane extending from a viewpoint of a user in the three-dimensional environment.

32. The non-transitory computer-readable storage medium of claim 20, wherein the one or more programs include instructions for:

ceasing to display the home menu user interface;

detecting a second input to the computer system to invoke the home menu user interface after the home menu user interface has ceased to be displayed; and in response to detecting the second input, in accordance with a determination that the viewpoint of the user in the three-dimensional environment had a ninth elevation relative to the reference plane in the three-dimensional environment, wherein the ninth elevation is different from the first elevation and from the second elevation, displaying the home menu user interface at an eighth height in the three-dimensional environment.

33. A computer system that is in communication with one or more display generation components and one or more input devices, the computer system comprising:

one or more processors; and memory storing one or more programs configured to be executed by the one or more processors, the one or more programs including instructions for:

detecting a first input to the computer system to invoke a home menu user interface; and in response to detecting the first input, displaying via the one or more display generation components the home menu user interface in a three-dimensional environment, including:

in accordance with a determination that a viewpoint of a user in the three-dimensional environment had a first elevation relative to a reference plane in the three-dimensional environment, displaying the home menu user interface at a first height in the three-dimensional environment; and in accordance with a determination that the viewpoint of the user in the three-dimensional environment had a second elevation relative to the reference plane in the three-dimensional environment, wherein the second elevation is different from the first elevation, displaying the home menu user interface at a second height in the three-dimensional environment, wherein the second height is different from the first height.

34. The computer system of claim 33, wherein detecting the first input to the computer system to invoke the home menu user interface includes detecting a press input on the one or more input devices.

35. The computer system of claim 33, wherein detecting the first input to the computer system to invoke the home menu user interface includes detecting a hand gesture.

36. The computer system of claim 33, wherein:

in response to detecting the first input, displaying via the one or more display generation components the home menu user interface in the three-dimensional environment includes:

in accordance with a determination that the viewpoint of the user in the three-dimensional environment had a third elevation relative to the reference plane in the three-dimensional environment and the third elevation is within a first range of elevations, wherein the third elevation is different from the first elevation, displaying the home menu user interface at the first height in the three-dimensional environment.

37. The computer system of claim 36, wherein the first range of elevations includes elevations that are parallel to or lower than a horizontal plane extending from a viewpoint of a user in the three-dimensional environment.

38. The computer system of claim 33, wherein:

in response to detecting the first input, displaying via the one or more display generation components the home menu user interface in the three-dimensional environment includes:

in accordance with a determination that the viewpoint of the user in the three-dimensional environment had a fourth elevation relative to the reference plane in the three-dimensional environment, wherein the fourth elevation is different from the second elevation and both the fourth elevation and the second elevation are within a second range of elevations, displaying the home menu user interface at a third height in the three-dimensional environment, wherein the third height is different from the second height.

39. The computer system of claim 38, wherein the second range includes elevations higher than a horizontal plane extending from a viewpoint of a user in the three-dimensional environment.

40. The computer system of claim 33, wherein:

in response to detecting the first input, displaying via the one or more display generation components the home menu user interface in the three-dimensional environment includes:

in accordance with a determination that the viewpoint of the user in the three-dimensional environment had a fifth elevation relative to the reference plane in the three-dimensional environment that is within a third range of elevations, displaying the home menu user interface at a fourth height in the three-dimensional environment, a plane of the home menu user interface at the fourth height being perpendicular to a horizontal plane in the three-dimensional environment.

41. The computer system of claim 40, wherein the third range of elevations is different from a first range of elevations and different from a second range of elevations, the first range of elevations includes elevations that are parallel to or lower than a horizontal plane extending from a viewpoint of a user in the three-dimensional environment and the second range includes elevations higher than the horizontal plane extending from the viewpoint of the user in the three-dimensional environment.

42. The computer system of claim 33, wherein:

in response to detecting the first input, displaying via the one or more display generation components the home menu user interface in a three-dimensional environment includes:

in accordance with a determination that the viewpoint of the user in the three-dimensional environment had a first rotation about a vertical axis perpendicular to the reference plane, displaying the home menu user interface at a first rotational position in the three-dimensional environment corresponding to the first rotation; and in accordance with a determination that the viewpoint of the user in the three-dimensional environment had a second rotation about the vertical axis perpendicular to the reference plane, the second rotation being different from the first rotation, displaying the home menu user interface at a second rotational position in the three-dimensional environment corresponding to the second rotation, wherein the second rotational position is different from the first rotational position.

43. The computer system of claim 33, wherein:

in response to detecting the first input, displaying via the one or more display generation components the home menu user interface in a three-dimensional environment includes:

in accordance with a determination that the viewpoint of the user in the three-dimensional environment had an eighth elevation relative to a reference plane in the three-dimensional environment and a gaze of the user is directed at a first spatial location, displaying the home menu user interface at a seventh height in the three-dimensional environment; and in accordance with a determination that the viewpoint of the user in the three-dimensional environment had the eighth elevation relative to the reference plane in the three-dimensional environment and the gaze of the user is directed at a second spatial location distinct from the first spatial location, displaying the home menu user interface at the seventh height in the three-dimensional environment.

44. The computer system of claim 33, wherein displaying the home menu user interface at the first height in the three-dimensional environment includes displaying the home menu user interface at a respective height below a horizontal plane extending from a viewpoint of a user in the three-dimensional environment.

45. The computer system of claim 33, wherein the one or more programs include instructions for:

ceasing to display the home menu user interface;

detecting a second input to the computer system to invoke the home menu user interface after the home menu user interface has ceased to be displayed; and in response to detecting the second input, in accordance with a determination that the viewpoint of the user in the three-dimensional environment had a ninth elevation relative to the reference plane in the three-dimensional environment, wherein the ninth elevation is different from the first elevation and from the second elevation, displaying the home menu user interface at an eighth height in the three-dimensional environment.

\* \* \* \* \*